US010461436B2

(12) United States Patent
Hill et al.

(10) Patent No.: US 10,461,436 B2
(45) **Date of Patent: *Oct. 29, 2019**

(54) ENHANCED MAGNETIC LOSS Y-PHASE HEXAGONAL FERRITE FOR MAGNETODIELECTRIC ANTENNA APPLICATIONS

(71) Applicant: SKYWORKS SOLUTIONS, INC., Woburn, MA (US)

(72) Inventors: Michael David Hill, Frederick, MD (US); Srinivas Polisetty, Frederick, MD (US); Constance M. Griffith, Harpers Ferry, WV (US)

(73) Assignee: SKYWORKS SOLUTIONS, INC., Woburn, MA (US)

( * ) Notice: Subject to any disclaimer, the term of this patent is extended or adjusted under 35 U.S.C. 154(b) by 363 days.

This patent is subject to a terminal disclaimer.

(21) Appl. No.: 15/371,521

(22) Filed: Dec. 7, 2016

(65) Prior Publication Data

US 2017/0169921 A1 Jun. 15, 2017

Related U.S. Application Data

(60) Provisional application No. 62/266,340, filed on Dec. 11, 2015.

(51) Int. Cl.

| | |
|---|---|
| ***H01Q 17/00*** | (2006.01) |
| ***H01F 1/34*** | (2006.01) |
| ***C04B 35/26*** | (2006.01) |

(52) U.S. Cl.

CPC ....... *H01Q 17/004* (2013.01); *C04B 35/2633* (2013.01); *H01F 1/348* (2013.01); *C04B 2235/3201* (2013.01); *C04B 2235/3213* (2013.01); *C04B 2235/3224* (2013.01); *C04B 2235/3241* (2013.01); *C04B 2235/3251* (2013.01); *C04B 2235/3256* (2013.01); *C04B 2235/3258* (2013.01); *C04B 2235/3262* (2013.01); *C04B 2235/3275* (2013.01); *C04B 2235/3279* (2013.01); *C04B 2235/3284* (2013.01); *C04B 2235/3286* (2013.01); *C04B 2235/3287* (2013.01); *C04B 2235/3293* (2013.01); *C04B 2235/3418* (2013.01); *C04B 2235/6562* (2013.01); *C04B 2235/6567* (2013.01); *C04B 2235/767* (2013.01)

(58) Field of Classification Search

CPC .... H01F 1/348; C04B 35/2608; H01Q 17/004
See application file for complete search history.

(56) References Cited

U.S. PATENT DOCUMENTS

| | | | | |
|---|---|---|---|---|
| 8,228,059 | B2 * | 7/2012 | Iwasaki | C04B 35/2633 324/244.1 |
| 10,032,547 | B2 * | 7/2018 | Hill | C04B 35/26 |

* cited by examiner

*Primary Examiner* — C Melissa Koslow
(74) *Attorney, Agent, or Firm* — Lando & Anastasi, LLP

(57) ABSTRACT

A hexagonal ferrite material includes a Y phase hexagonal ferrite material having the composition $Sr_2Co_2Fe_{12}O_{22}$ or $Sr_{2-x}Na_xCo_{2-x}Sc_xFe_{12}O_{22}$, 0<x<2, doped with a trivalent element, a tetravalent element, and/or a transition metal.

20 Claims, 263 Drawing Sheets

| | Composition-1 | Weight of Composition-1 | Composition-2 | Weight of Composition-2 | Composition-3 | Weight of Composition-3 | Total weight in gr |
|---|---|---|---|---|---|---|---|
| A1B1 | 3003354 ($Sr_{1.6}Na_{0.4}Sc_{0.4}Co_{1.6}Fe_{12}O_{22}$) | 42.4 | $SrCO_3$ | 1.84 | $Fe_2O_3$ | 6.08 | 50.32 |
| A2B1 | 3003354 ($Sr_{1.6}Na_{0.4}Sc_{0.4}Co_{1.6}Fe_{12}O_{22}$) | 44.97 | $SrCO_3$ | 0.92 | $Fe_2O_3$ | 4.23 | 50.12 |
| A3B1 | 3003354 ($Sr_{1.6}Na_{0.4}Sc_{0.4}Co_{1.6}Fe_{12}O_{22}$) | 47.56 | | | $Fe_2O_3$ | 2.37 | 49.93 |
| A4B1 | 3003354 ($Sr_{1.6}Na_{0.4}Sc_{0.4}Co_{1.6}Fe_{12}O_{22}$) | 45.13 | CoO | 0.71 | $Fe_2O_3$ | 4.24 | 50.08 |
| A5B1 | 3003354 ($Sr_{1.6}Na_{0.4}Sc_{0.4}Co_{1.6}Fe_{12}O_{22}$) | 42.7 | CoO | 1 | $Fe_2O_3$ | 6.12 | 49.82 |
| A1B2 | 3003354 ($Sr_{1.6}Na_{0.4}Sc_{0.4}Co_{1.6}Fe_{12}O_{22}$) | 43.62 | $SrCO_3$ | 1.83 | $Fe_2O_3$ | 4.9 | 50.35 |
| A2B2 | 3003354 ($Sr_{1.6}Na_{0.4}Sc_{0.4}Co_{1.6}Fe_{12}O_{22}$) | 46.19 | $SrCO_3$ | 0.92 | $Fe_2O_3$ | 3.04 | 50.15 |
| A3B2 | 3003354 ($Sr_{1.6}Na_{0.4}Sc_{0.4}Co_{1.6}Fe_{12}O_{22}$) | 48.78 | | | $Fe_2O_3$ | 1.18 | 49.96 |
| A4B2 | 3003354 ($Sr_{1.6}Na_{0.4}Sc_{0.4}Co_{1.6}Fe_{12}O_{22}$) | 46.36 | CoO | 0.5 | $Fe_2O_3$ | 3.05 | 49.91 |
| A5B2 | 3003354 ($Sr_{1.6}Na_{0.4}Sc_{0.4}Co_{1.6}Fe_{12}O_{22}$) | 43.93 | CoO | 1 | $Fe_2O_3$ | 4.93 | 49.86 |
| A1B3 | 3003354 ($Sr_{1.6}Na_{0.4}Sc_{0.4}Co_{1.6}Fe_{12}O_{22}$) | 44.84 | $SrCO_3$ | 1.83 | $Fe_2O_3$ | 3.72 | 50.39 |
| A2B3 | 3003354 ($Sr_{1.6}Na_{0.4}Sc_{0.4}Co_{1.6}Fe_{12}O_{22}$) | 47.42 | $SrCO_3$ | 0.92 | $Fe_2O_3$ | 1.86 | 50.2 |
| A3B3 | 3003354 ($Sr_{1.6}Na_{0.4}Sc_{0.4}Co_{1.6}Fe_{12}O_{22}$) | 50 | | | | | 50 |
| A4B3 | 3003354 ($Sr_{1.6}Na_{0.4}Sc_{0.4}Co_{1.6}Fe_{12}O_{22}$) | 47.59 | CoO | 0.5 | $Fe_2O_3$ | 1.86 | 49.95 |
| A5B3 | 3003354 ($Sr_{1.6}Na_{0.4}Sc_{0.4}Co_{1.6}Fe_{12}O_{22}$) | 45.16 | CoO | 1 | $Fe_2O_3$ | 3.75 | 49.91 |
| A1B4 | 3003354 ($Sr_{1.6}Na_{0.4}Sc_{0.4}Co_{1.6}Fe_{12}O_{22}$) | 46.06 | $SrCO_3$ | 1.83 | $Fe_2O_3$ | 2.54 | 50.43 |
| A2B4 | 3003354 ($Sr_{1.6}Na_{0.4}Sc_{0.4}Co_{1.6}Fe_{12}O_{22}$) | 48.63 | $SrCO_3$ | 0.92 | $Fe_2O_3$ | 0.68 | 50.23 |
| A3B4 | 3003354 ($Sr_{1.6}Na_{0.4}Sc_{0.4}Co_{1.6}Fe_{12}O_{22}$) | 49.64 | $SrCO_3$ | 0.29 | CoO | 0.16 | 50.09 |
| A4B4 | 3003354 ($Sr_{1.6}Na_{0.4}Sc_{0.4}Co_{1.6}Fe_{12}O_{22}$) | 48.81 | CoO | 0.5 | $Fe_2O_3$ | 0.68 | 49.99 |
| A5B4 | 3003354 ($Sr_{1.6}Na_{0.4}Sc_{0.4}Co_{1.6}Fe_{12}O_{22}$) | 46.39 | CoO | 1 | $Fe_2O_3$ | 2.56 | 49.95 |
| A1B5 | 3003354 ($Sr_{1.6}Na_{0.4}Sc_{0.4}Co_{1.6}Fe_{12}O_{22}$) | 47.28 | $SrCO_3$ | 1.83 | $Fe_2O_3$ | 1.36 | 50.47 |
| A2B5 | 3003354 ($Sr_{1.6}Na_{0.4}Sc_{0.4}Co_{1.6}Fe_{12}O_{22}$) | 49.19 | $SrCO_3$ | 1.04 | CoO | 0.06 | 50.29 |
| A3B5 | 3003354 ($Sr_{1.6}Na_{0.4}Sc_{0.4}Co_{1.6}Fe_{12}O_{22}$) | 49.28 | $SrCO_3$ | 0.58 | CoO | 0.32 | 50.18 |
| A4B5 | 3003354 ($Sr_{1.6}Na_{0.4}Sc_{0.4}Co_{1.6}Fe_{12}O_{22}$) | 49.36 | $SrCO_3$ | 0.12 | CoO | 0.56 | 50.04 |
| A5B5 | 3003354 ($Sr_{1.6}Na_{0.4}Sc_{0.4}Co_{1.6}Fe_{12}O_{22}$) | 47.61 | CoO | 1 | $Fe_2O_3$ | 1.37 | 49.98 |

FIG. 98C

| | Composition-1 | Weight of Composition-1 | Composition-2 | Weight of Composition-2 | Composition-3 | Weight of Composition-3 | Composition-4 | Weight of Composition-4 | Total weight in gr |
|---|---|---|---|---|---|---|---|---|---|
| A1B1 | 3003354 ($Sr_{1.6}Na_{0.4}Sc_{0.4}Co_{1.6}Fe_{12}O_{22}$) | 41.7 | $SrCO_3$ | 1.84 | $Fe_2O_3$ | 6.08 | $Sc_2O_3$ | 0.7 | 50.32 |
| A2B1 | 3003354 ($Sr_{1.6}Na_{0.4}Sc_{0.4}Co_{1.6}Fe_{12}O_{22}$) | 44.27 | $SrCO_3$ | 0.92 | $Fe_2O_3$ | 4.23 | $Sc_2O_3$ | 0.7 | 50.12 |
| A3B1 | 3003354 ($Sr_{1.6}Na_{0.4}Sc_{0.4}Co_{1.6}Fe_{12}O_{22}$) | 46.86 | | | $Fe_2O_3$ | 2.37 | $Sc_2O_3$ | 0.7 | 49.93 |
| A4B1 | 3003354 ($Sr_{1.6}Na_{0.4}Sc_{0.4}Co_{1.6}Fe_{12}O_{22}$) | 44.43 | CoO | 0.71 | $Fe_2O_3$ | 4.24 | $Sc_2O_3$ | 0.7 | 50.08 |
| A5B1 | 3003354 ($Sr_{1.6}Na_{0.4}Sc_{0.4}Co_{1.6}Fe_{12}O_{22}$) | 42 | CoO | 1 | $Fe_2O_3$ | 6.12 | $Sc_2O_3$ | 0.7 | 49.82 |
| A1B2 | 3003354 ($Sr_{1.6}Na_{0.4}Sc_{0.4}Co_{1.6}Fe_{12}O_{22}$) | 42.92 | $SrCO_3$ | 1.83 | $Fe_2O_3$ | 4.9 | $Sc_2O_3$ | 0.7 | 50.35 |
| A2B2 | 3003354 ($Sr_{1.6}Na_{0.4}Sc_{0.4}Co_{1.6}Fe_{12}O_{22}$) | 45.49 | $SrCO_3$ | 0.92 | $Fe_2O_3$ | 3.04 | $Sc_2O_3$ | 0.7 | 50.15 |
| A3B2 | 3003354 ($Sr_{1.6}Na_{0.4}Sc_{0.4}Co_{1.6}Fe_{12}O_{22}$) | 48.08 | | | $Fe_2O_3$ | 1.18 | $Sc_2O_3$ | 0.7 | 49.96 |
| A4B2 | 3003354 ($Sr_{1.6}Na_{0.4}Sc_{0.4}Co_{1.6}Fe_{12}O_{22}$) | 45.66 | CoO | 0.5 | $Fe_2O_3$ | 3.05 | $Sc_2O_3$ | 0.7 | 49.91 |
| A5B2 | 3003354 ($Sr_{1.6}Na_{0.4}Sc_{0.4}Co_{1.6}Fe_{12}O_{22}$) | 42.23 | CoO | 1 | $Fe_2O_3$ | 4.93 | $Sc_2O_3$ | 0.7 | 48.86 |
| A1B3 | 3003354 ($Sr_{1.6}Na_{0.4}Sc_{0.4}Co_{1.6}Fe_{12}O_{22}$) | 44.14 | $SrCO_3$ | 1.83 | $Fe_2O_3$ | 3.72 | $Sc_2O_3$ | 0.7 | 50.39 |
| A2B3 | 3003354 ($Sr_{1.6}Na_{0.4}Sc_{0.4}Co_{1.6}Fe_{12}O_{22}$) | 46.72 | $SrCO_3$ | 0.92 | $Fe_2O_3$ | 1.86 | $Sc_2O_3$ | 0.7 | 50.2 |
| A3B3 | 3003354 ($Sr_{1.6}Na_{0.4}Sc_{0.4}Co_{1.6}Fe_{12}O_{22}$) | 49.3 | | | $Fe_2O_3$ | 0 | $Sc_2O_3$ | 0.7 | 50 |
| A4B3 | 3003354 ($Sr_{1.6}Na_{0.4}Sc_{0.4}Co_{1.6}Fe_{12}O_{22}$) | 46.89 | CoO | 0.5 | $Fe_2O_3$ | 1.87 | $Sc_2O_3$ | 0.7 | 49.96 |
| A5B3 | 3003354 ($Sr_{1.6}Na_{0.4}Sc_{0.4}Co_{1.6}Fe_{12}O_{22}$) | 44.46 | CoO | 1 | $Fe_2O_3$ | 3.75 | $Sc_2O_3$ | 0.7 | 49.91 |
| A1B4 | 3003354 ($Sr_{1.6}Na_{0.4}Sc_{0.4}Co_{1.6}Fe_{12}O_{22}$) | 45.36 | $SrCO_3$ | 1.83 | $Fe_2O_3$ | 2.54 | $Sc_2O_3$ | 0.7 | 50.43 |
| A2B4 | 3003354 ($Sr_{1.6}Na_{0.4}Sc_{0.4}Co_{1.6}Fe_{12}O_{22}$) | 47.93 | $SrCO_3$ | 0.92 | $Fe_2O_3$ | 0.68 | $Sc_2O_3$ | 0.7 | 50.23 |
| A3B4 | 3003354 ($Sr_{1.6}Na_{0.4}Sc_{0.4}Co_{1.6}Fe_{12}O_{22}$) | 48.94 | $SrCO_3$ | 0.29 | CoO | 0.16 | $Sc_2O_3$ | 0.7 | 50.09 |
| A4B4 | 3003354 ($Sr_{1.6}Na_{0.4}Sc_{0.4}Co_{1.6}Fe_{12}O_{22}$) | 48.11 | CoO | 0.5 | $Fe_2O_3$ | 0.68 | $Sc_2O_3$ | 0.7 | 49.99 |
| A5B4 | 3003354 ($Sr_{1.6}Na_{0.4}Sc_{0.4}Co_{1.6}Fe_{12}O_{22}$) | 45.69 | CoO | 1 | $Fe_2O_3$ | 2.56 | $Sc_2O_3$ | 0.7 | 49.95 |
| A1B5 | 3003354 ($Sr_{1.6}Na_{0.4}Sc_{0.4}Co_{1.6}Fe_{12}O_{22}$) | 46.58 | $SrCO_3$ | 1.83 | $Fe_2O_3$ | 1.36 | $Sc_2O_3$ | 0.7 | 50.47 |
| A2B5 | 3003354 ($Sr_{1.6}Na_{0.4}Sc_{0.4}Co_{1.6}Fe_{12}O_{22}$) | 48.49 | $SrCO_3$ | 1.04 | CoO | 0.06 | $Sc_2O_3$ | 0.7 | 50.29 |
| A3B5 | 3003354 ($Sr_{1.6}Na_{0.4}Sc_{0.4}Co_{1.6}Fe_{12}O_{22}$) | 48.58 | $SrCO_3$ | 0.58 | CoO | 0.32 | $Sc_2O_3$ | 0.7 | 50.18 |
| A4B5 | 3003354 ($Sr_{1.6}Na_{0.4}Sc_{0.4}Co_{1.6}Fe_{12}O_{22}$) | 48.66 | $SrCO_3$ | 0.12 | CoO | 0.56 | $Sc_2O_3$ | 0.7 | 50.04 |
| A5B5 | 3003354 ($Sr_{1.6}Na_{0.4}Sc_{0.4}Co_{1.6}Fe_{12}O_{22}$) | 46.91 | CoO | 1 | $Fe_2O_3$ | 1.37 | $Sc_2O_3$ | 0.7 | 49.98 |

FIG. 99C

Data of μ' at 1 GHz

| | Composition-1 | Weight of Composition-1 | Composition-2 | Weight of Composition-2 | Composition-3 | Weight of Composition-3 | Composition-4 | Weight of Composition-4 | Total weight in gr |
|---|---|---|---|---|---|---|---|---|---|
| A1B1 | 3003354 ($Sr_{1.6}Na_{0.4}Sc_{0.4}Co_{1.6}Fe_{12}O_{22}$) | 41.7 | $SrCO_3$ | 1.84 | $Fe_2O_3$ | 6.08 | $NaHCO_3$ | 0.7 | 50.32 |
| A2B1 | 3003354 ($Sr_{1.6}Na_{0.4}Sc_{0.4}Co_{1.6}Fe_{12}O_{22}$) | 44.27 | $SrCO_3$ | 0.92 | $Fe_2O_3$ | 4.23 | $NaHCO_3$ | 0.7 | 50.12 |
| A3B1 | 3003354 ($Sr_{1.6}Na_{0.4}Sc_{0.4}Co_{1.6}Fe_{12}O_{22}$) | 46.86 | | | $Fe_2O_3$ | 2.37 | $NaHCO_3$ | 0.7 | 49.93 |
| A4B1 | 3003354 ($Sr_{1.6}Na_{0.4}Sc_{0.4}Co_{1.6}Fe_{12}O_{22}$) | 44.43 | CoO | 0.71 | $Fe_2O_3$ | 4.24 | $NaHCO_3$ | 0.7 | 50.08 |
| A5B1 | 3003354 ($Sr_{1.6}Na_{0.4}Sc_{0.4}Co_{1.6}Fe_{12}O_{22}$) | 42 | CoO | 1 | $Fe_2O_3$ | 6.12 | $NaHCO_3$ | 0.7 | 49.82 |
| A1B2 | 3003354 ($Sr_{1.6}Na_{0.4}Sc_{0.4}Co_{1.6}Fe_{12}O_{22}$) | 42.92 | $SrCO_3$ | 1.83 | $Fe_2O_3$ | 4.9 | $NaHCO_3$ | 0.7 | 50.35 |
| A2B2 | 3003354 ($Sr_{1.6}Na_{0.4}Sc_{0.4}Co_{1.6}Fe_{12}O_{22}$) | 45.49 | $SrCO_3$ | 0.92 | $Fe_2O_3$ | 3.04 | $NaHCO_3$ | 0.7 | 50.15 |
| A3B2 | 3003354 ($Sr_{1.6}Na_{0.4}Sc_{0.4}Co_{1.6}Fe_{12}O_{22}$) | 48.08 | | | $Fe_2O_3$ | 1.18 | $NaHCO_3$ | 0.7 | 49.96 |
| A4B2 | 3003354 ($Sr_{1.6}Na_{0.4}Sc_{0.4}Co_{1.6}Fe_{12}O_{22}$) | 45.66 | CoO | 0.5 | $Fe_2O_3$ | 3.05 | $NaHCO_3$ | 0.7 | 49.91 |
| A5B2 | 3003354 ($Sr_{1.6}Na_{0.4}Sc_{0.4}Co_{1.6}Fe_{12}O_{22}$) | 43.23 | CoO | 1 | $Fe_2O_3$ | 4.93 | $NaHCO_3$ | 0.7 | 49.86 |
| A1B3 | 3003354 ($Sr_{1.6}Na_{0.4}Sc_{0.4}Co_{1.6}Fe_{12}O_{22}$) | 44.14 | $SrCO_3$ | 1.83 | $Fe_2O_3$ | 3.72 | $NaHCO_3$ | 0.7 | 50.39 |
| A2B3 | 3003354 ($Sr_{1.6}Na_{0.4}Sc_{0.4}Co_{1.6}Fe_{12}O_{22}$) | 46.72 | $SrCO_3$ | 0.92 | $Fe_2O_3$ | 1.86 | $NaHCO_3$ | 0.7 | 50.2 |
| A3B3 | 3003354 ($Sr_{1.6}Na_{0.4}Sc_{0.4}Co_{1.6}Fe_{12}O_{22}$) | 49.3 | | | | | $NaHCO_3$ | 0.7 | 50 |
| A4B3 | 3003354 ($Sr_{1.6}Na_{0.4}Sc_{0.4}Co_{1.6}Fe_{12}O_{22}$) | 46.89 | CoO | 0.5 | $Fe_2O_3$ | 1.87 | $NaHCO_3$ | 0.7 | 49.96 |
| A5B3 | 3003354 ($Sr_{1.6}Na_{0.4}Sc_{0.4}Co_{1.6}Fe_{12}O_{22}$) | 44.46 | CoO | 1 | $Fe_2O_3$ | 3.75 | $NaHCO_3$ | 0.7 | 49.91 |
| A1B4 | 3003354 ($Sr_{1.6}Na_{0.4}Sc_{0.4}Co_{1.6}Fe_{12}O_{22}$) | 45.36 | $SrCO_3$ | 1.83 | $Fe_2O_3$ | 2.54 | $NaHCO_3$ | 0.7 | 50.43 |
| A2B4 | 3003354 ($Sr_{1.6}Na_{0.4}Sc_{0.4}Co_{1.6}Fe_{12}O_{22}$) | 47.93 | $SrCO_3$ | 0.92 | $Fe_2O_3$ | 0.68 | $NaHCO_3$ | 0.7 | 50.23 |
| A3B4 | 3003354 ($Sr_{1.6}Na_{0.4}Sc_{0.4}Co_{1.6}Fe_{12}O_{22}$) | 48.94 | $SrCO_3$ | 0.29 | CoO | 0.16 | $NaHCO_3$ | 0.7 | 50.09 |
| A4B4 | 3003354 ($Sr_{1.6}Na_{0.4}Sc_{0.4}Co_{1.6}Fe_{12}O_{22}$) | 48.11 | CoO | 0.5 | $Fe_2O_3$ | 0.68 | $NaHCO_3$ | 0.7 | 49.99 |
| A5B4 | 3003354 ($Sr_{1.6}Na_{0.4}Sc_{0.4}Co_{1.6}Fe_{12}O_{22}$) | 45.69 | CoO | 1 | $Fe_2O_3$ | 2.56 | $NaHCO_3$ | 0.7 | 49.95 |
| A1B5 | 3003354 ($Sr_{1.6}Na_{0.4}Sc_{0.4}Co_{1.6}Fe_{12}O_{22}$) | 46.58 | $SrCO_3$ | 1.83 | $Fe_2O_3$ | 1.36 | $NaHCO_3$ | 0.7 | 50.47 |
| A2B5 | 3003354 ($Sr_{1.6}Na_{0.4}Sc_{0.4}Co_{1.6}Fe_{12}O_{22}$) | 48.49 | $SrCO_3$ | 1.04 | CoO | 0.06 | $NaHCO_3$ | 0.7 | 50.29 |
| A3B5 | 3003354 ($Sr_{1.6}Na_{0.4}Sc_{0.4}Co_{1.6}Fe_{12}O_{22}$) | 48.58 | $SrCO_3$ | 0.58 | CoO | 0.32 | $NaHCO_3$ | 0.7 | 50.18 |
| A4B5 | 3003354 ($Sr_{1.6}Na_{0.4}Sc_{0.4}Co_{1.6}Fe_{12}O_{22}$) | 48.66 | $SrCO_3$ | 0.12 | CoO | 0.56 | $NaHCO_3$ | 0.7 | 50.04 |
| A5B5 | 3003354 ($Sr_{1.6}Na_{0.4}Sc_{0.4}Co_{1.6}Fe_{12}O_{22}$) | 46.91 | CoO | 1 | $Fe_2O_3$ | 1.37 | $NaHCO_3$ | 0.7 | 49.98 |

FIG. 100C

ENHANCED MAGNETIC LOSS Y-PHASE HEXAGONAL FERRITE FOR MAGNETODIELECTRIC ANTENNA APPLICATIONS

CROSS REFERENCE TO RELATED APPLICATIONS

This application claims the benefit of priority under 35 U.S.C. § 119(e) to co-pending U.S. Provisional Patent Application No. 62/266,340, titled "ENHANCED MAGNETIC LOSS Y-PHASE HEXAGONAL FERRITE FOR MAGNETODIELECTRIC ANTENNA APPLICATIONS," filed on Dec. 11, 2015, which is incorporated herein by reference in its entirety for all purposes.

BACKGROUND

Embodiments of the disclosure relate to methods of preparing compositions and materials useful in electronic applications, and in particular, useful in radio frequency (RF) electronic applications.

SUMMARY

Disclosed herein are embodiments of a method for doping a y-phase hexagonal ferrite material with potassium comprising providing a y-phase strontium hexagonal ferrite material and substituting at least some of the strontium and cobalt with a trivalent ion and potassium or a tetravalent ion and potassium to form a high resonant frequency hexagonal ferrite, the composition being $Sr_{2-x}K_xCo_{2-x}M_xFe_{12}O_{22}$ when a trivalent ion is used for the substitution, M being any trivalent ion, and the composition being $Sr_{2-2x}K_{2x}Co_{2-x}N_xFe_{12}O_{22}$ when a tetravalent ion is used for the substitution, N being any tetravalent ion.

In some embodiments, x can be between 0 and about 1.5 in the trivalent substitution and between 0 and about 0.75 in the tetravalent substitution. In some embodiments, the y-phase strontium hexagonal ferrite material can include $Sr_2Co_2Fe_{12}O_{22}$.

In some embodiments, M can be selected from the group consisting of Sc, Mn, In, Cr, Ga, Co, Ni, Fe, Yb, or any of the lanthanide ions. In some embodiments, N can be selected from the group consisting of Si, Ge, Ti, Zr, Sn, Ce, Pr, Hf, or Tb.

In some embodiments, substituting at least some of the strontium with potassium can include adding potassium carbonate to the y-phase strontium hexagonal ferrite material.

In some embodiments, the high resonant frequency hexagonal ferrite can have a loss factor below 1 at 1 GHz.

In some embodiments, the high resonant frequency hexagonal ferrite can have a composition of $Sr_{1.75}K_{0.25}Co_{1.75}Sc_{0.25}Fe_{12}O_{22}$ or $Sr_{1.75}K_{0.25}Co_{1.75}In_{0.25}Fe_{12}O_{22}$. In some embodiments, the high resonant frequency hexagonal ferrite can have a composition of $Sr_{0.5}K_{0.5}Co_{1.5}In_{0.5}Fe_{12}O_{22}$ or $Sr_{1.5}K_{0.5}Co_{1.5}In_{0.5}Fe_2O_{22}$.

Also disclosed herein are embodiments of an antenna for use in radio frequency operations comprising a y-phase strontium hexagonal ferrite material having at least some of the strontium and cobalt substituted out for a trivalent ion and potassium or a tetravalent ion and potassium to form a high resonant frequency hexagonal ferrite, the composition being $Sr_{2-x}K_xCo_{2-x}M_xFe_{12}O_{22}$ when a trivalent ion is used for the substitution, M being any trivalent ion, and the composition being $Sr_{2-2x}K_{2x}Co_{2-x}N_xFe_{12}O_{22}$ when a tetravalent ion is used for the substitution, N being any tetravalent ion.

In some embodiments, x can be between 0 and about 1.5 in the trivalent substitution and between 0 and about 0.75 in the tetravalent substitution. In some embodiments, the y-phase strontium hexagonal ferrite material can include $Sr_2Co_2Fe_2O_{22}$.

In some embodiments, M can be selected from the group consisting of Sc, Mn, In, Cr, Ga, Co, Ni, Fe, Yb, or any of the lanthanide ions. In some embodiments, N can be selected from the group consisting of Si, Ge, Ti, Zr, Sn, Ce, Pr, Hf, or Tb.

In some embodiments, the potassium can include potassium carbonate.

In some embodiments, the high resonant frequency hexagonal ferrite can have a loss factor below 1 at 1 GhZ.

In some embodiments, the high resonant frequency hexagonal ferrite can have a composition of $Sr_{1.75}K_{0.25}Co_{1.75}Sc_{0.25}Fe_{12}O_{22}$ or $Sr_{1.75}K_{0.25}Co_{1.75}In_{0.25}Fe_2O_{22}$. In some embodiments, the high resonant frequency hexagonal ferrite can have a composition of $Sr_{1.5}K_{0.5}Co_{1.5}In_{0.5}Fe_2O_{22}$ or $Sr_{1.5}K_{0.5}Co_{1.5}In_{0.5}Fe_2O_{22}$.

Also disclosed herein are embodiments of a potassium doped y-phase hexagonal ferrite material comprising a y-phase strontium hexagonal ferrite material having at least some of the strontium and cobalt substituted out for a trivalent ion and potassium or a tetravalent ion and potassium to form a high resonant frequency hexagonal ferrite, the composition being $Sr_{2-x}K_xCo_{2-x}M_xFe_{12}O_{22}$ when a trivalent ion is used for the substitution, M being any trivalent ion, and the composition being $Sr_{2-2x}K_{2x}Co_{2-x}N_xFe_{12}O_{22}$ when a tetravalent ion is used for the substitution, N being any tetravalent ion.

In some embodiments, x can be between 0 and about 1.5 in the trivalent substitution and between 0 and about 0.75 in the tetravalent substitution. In some embodiments, the y-phase strontium hexagonal ferrite material can include $Sr_2Co_2Fe_{12}O_{22}$.

In some embodiments, M can be selected from the group consisting of Sc, Mn, In, Cr, Ga, Co, Ni, Fe, Yb, or any of the lanthanide ions. In some embodiments, N can be selected from the group consisting of Si, Ge, Ti, Zr, Sn, Ce, Pr, Hf, or Tb.

In some embodiments, the potassium can include potassium carbonate.

In some embodiments, the high resonant frequency hexagonal ferrite can have a loss factor below 1 at 1 GHz.

In some embodiments, the high resonant frequency hexagonal ferrite can have a composition of $Sr_{1.75}K_{0.25}Co_{1.75}Sc_{0.25}Fe_{12}O_{22}$ or $Sr_{1.75}K_{0.25}Co_{1.75}In_{0.25}Fe_{12}O_{22}$. In some embodiments, the high resonant frequency hexagonal ferrite can have a composition of $Sr_{1.5}K_{0.5}Co_{1.5}In_{0.5}Fe_{12}O_{22}$ or $Sr_{1.5}K_{0.5}Co_{1.5}In_{0.5}Fe_{12}O_{22}$.

Disclosed herein are embodiments of a method for increasing the resonant frequency of a hexagonal ferrite material comprising providing a Y phase hexagonal ferrite material having the composition $Sr_2Co_2Fe_{12}O_{22}$ and doping the hexagonal ferrite with Na, K or other univalent alkali metal on an Sr site and charge compensating with scandium or indium on a cobalt site.

In some embodiments, the hexagonal ferrite material can be doped with silicon, aluminum, manganese, or any combination of the three. In some embodiments, the hexagonal ferrite can be doped with silicon, and the silicon acts as a grain growth inhibitor. In some embodiments, the hexagonal ferrite can be doped with manganese, and the manganese prevents reduction of the iron in the composition to $Fe^{3+}$.

In some embodiments, scandium can be used for charge compensating. In some embodiments, indium can be used for charge compensating.

In some embodiments, the hexagonal ferrite can have a loss factor of less than about 6 at a frequency of 1 GHz.

Also disclosed herein are embodiments of a hexagonal ferrite material having enhanced resonant frequency comprising a Y phase hexagonal ferrite material having the composition $Sr_2Co_2Fe_{12}O_{22}$, the material being doped with Na, K, or other univalent alkali metal on a Sr site and including scandium or indium on a cobalt site.

In some embodiments, the hexagonal ferrite material can be doped with silicon, aluminum, manganese, or any combination of the three. In some embodiments, the hexagonal ferrite can be doped with silicon, and the silicon acts as a grain growth inhibitor. In some embodiments, the hexagonal ferrite can be doped with manganese, and the manganese prevents reduction of the iron in the composition to $Fe^{3+}$.

In some embodiments, scandium can be used for charge compensating. In some embodiments, indium can be used for charge compensating.

In some embodiments, the hexagonal ferrite can have a loss factor of less than about 6 at a frequency of 1 GHz.

Also disclosed herein are embodiments of a radio frequency device comprising a Y phase hexagonal ferrite material having the composition $Sr_2Co_2Fe_{12}O_{22}$, the material being doped with Na, K, or other univalent alkali metal on a Sr site and including scandium or indium on a cobalt site.

In some embodiments, the hexagonal ferrite material can be doped with silicon, aluminum, manganese, or any combination of the three. In some embodiments, the hexagonal ferrite can be doped with silicon, and the silicon acts as a grain growth inhibitor. In some embodiments, the hexagonal ferrite can be doped with manganese, and the manganese prevents reduction of the iron in the composition to $Fe^{3+}$.

In some embodiments, scandium can be used for charge compensating. In some embodiments, indium can be used for charge compensating.

In some embodiments, the hexagonal ferrite can have a loss factor of less than about 6 at a frequency of 1 GHz.

Disclosed herein are embodiments of a magnetodielectric hexagonal ferrite comprising a y-phase strontium hexagonal ferrite material having sodium substituted for strontium and including a trivalent or tetravalent ion to form a magnetodielectric hexagonal ferrite, the composition of the magnetodielectric hexagonal ferrite being $Sr_{2-x}Na_xCo_{2-x}M_xFe_{12}O_{22}$ when a trivalent ion is used, where M is a trivalent ion, and the composition of the magnetodielectric hexagonal ferrite being $Sr_{2-2x}Na_{2x}Co_{2x}N_xFe_{12}O_{22}$ when a tetravalent ion is used, where N is a tetravalent ion.

In some embodiments, M can be selected from the group consisting of Al, Ga, Sc, Cr, Mn, In, Yb, Er, Y, or other lanthanide. In some embodiments, N can be selected from the group consisting of Si, Ge, Ti, Zr, Sn, Ce, Pr, Hf, or Tb. In some embodiments, x can be between 0 and about 1.5 in the trivalent substitution and between 0 and about 0.75 in the tetravalent substitution.

In some embodiments, the magnetodielectric hexagonal ferrite can have the composition $Sr_{1.75}Na_{0.25}Co_{1.75}M_{0.25}Fe_{12}O_{22}$. In some embodiments, the magnetodielectric hexagonal ferrite can have the composition $Sr_{1.5}Na_{0.5}Co_{1.5}M_{0.5}Fe_{12}O_{22}$.

In some embodiments, the loss factor of the magnetodielectric hexagonal ferrite can remain below 4 at frequencies up to 1 GHz. In some embodiments, the magnetodielectric hexagonal ferrite can have a permeability of between around 5 and around 6 up to 1 GHz.

Also disclosed herein are embodiments of a method for improving magnetic properties of a hexagonal ferrite material comprising substituting sodium into a y-phase strontium hexagonal ferrite material for strontium and charge balancing either using a trivalent or tetravalent ion to form a magnetodielectric hexagonal ferrite, the composition of the magnetodielectric hexagonal ferrite being $Sr_{2-x}Na_xCo_{2-x}M_xFe_{12}O_{22}$ when a trivalent ion is used, where M is a trivalent ion, and the compositions of the magnetodielectric hexagonal ferrite being $Sr_{2-2x}Na_{2x}Co_{2x}M_xFe_{12}O_{22}$ when a tetravalent ion is used, where N is a tetravalent ion.

In some embodiments, M can be selected from the group consisting of Al, Ga, Sc, Cr, Mn, In, Yb, Er, Y, or other lanthanide. In some embodiments, N can be selected from the group consisting of Si, Ge, Ti, Zr, Sn, Ce, Pr, Hf, or Tb. In some embodiments, x can be between 0 and about 1.5 in the trivalent substitution and between 0 and about 0.75 in the tetravalent substitution.

In some embodiments, the magnetodielectric hexagonal ferrite can have the composition $Sr_{1.75}Na_{0.25}Co_{1.75}M_{0.25}Fe_{12}O_{22}$. In some embodiments, the magnetodielectric hexagonal ferrite can have the composition $Sr_{1.5}Na_{0.5}Co_{1.5}M_{0.5}Fe_{12}O_{22}$.

In some embodiments, the loss factor of the magnetodielectric hexagonal ferrite can remain below 4 at frequencies up to 1 GHz. In some embodiments, the magnetodielectric hexagonal ferrite can have a permeability of between around 5 and around 6 up to 1 GHz.

Also disclosed herein are embodiments of a magnetodielectric antenna comprising a y-phase strontium hexagonal ferrite material having sodium substituted for strontium and including a trivalent or tetravalent ion to form a magnetodielectric hexagonal ferrite, the composition of the magnetodielectric hexagonal ferrite being $Sr_{2-x}Na_xCo_{2-x}M_xFe_{12}O_{22}$ when a trivalent ion is used, where M is a trivalent ion, and the composition of the magnetodielectric hexagonal ferrite being $Sr_{2-2-2x}Na_{2x}Co_{2x}N_xFe_{12}O_{22}$ when a tetravalent ion is used, where N is a tetravalent ion.

In some embodiments, M can be selected from the group consisting of Al, Ga, Sc, Cr, Mn, In, Yb, Er, Y, or another lanthanide. In some embodiments, N can be selected from the group consisting of Si, Ge, Ti, Zr, Sn, Ce, Pr, Hf, or Tb. In some embodiments, x can be between 0 and about 1.5 in the trivalent substitution and between 0 and about 0.75 in the tetravalent substitution.

In some embodiments, the magnetodielectric hexagonal ferrite can have the composition $Sr_{1.75}Na_{0.25}Co_{1.75}M_{0.25}Fe_{12}O_{22}$. In some embodiments, the magnetodielectric hexagonal ferrite can have the composition $Sr_{1.5}Na_{0.5}Co_{1.5}M_{0.5}Fe_{12}O_{22}$.

In some embodiments, the loss factor of the magnetodielectric hexagonal ferrite can remain below 4 at frequencies up to 1 GHz. In some embodiments, the magnetodielectric hexagonal ferrite can have a permeability of between about 5 and about 6 up to 1 GHz.

Disclosed herein are embodiments of a method for incorporating additional oxides to increase the magnetic properties of a hexagonal ferrite comprising providing a Y-phase hexagonal ferrite material and incorporating an oxide consistent with the stoichiometry of $Sr_3Co_2Fe_{24}O_{41}$, $SrFe_{12}O_{19}$ or $CoFe_2O_4$ to form an enhanced hexagonal ferrite material.

In some embodiments, the enhanced hexagonal ferrite material can be a single phase. In some embodiments, the enhanced hexagonal ferrite material can be two distinct phases.

In some embodiments, the Y-phase hexagonal ferrite material can include $Sr_{1.6}Na_{0.4}Co_{1.6}Sc_{0.4}Fe_{11}O_{22}$. In some embodiments, the oxide can include $CoFe_2O_4$. In some embodiments, the oxide can include $SrFe_{12}O_{19}$. In some embodiments, 2 wt. % of the oxide can be incorporated into the Y-phase hexagonal ferrite material.

In some embodiments, the enhanced hexagonal ferrite material can have a Q value of greater than about 20 at 800 MHz. In some embodiments, the enhanced hexagonal ferrite material can have a Q value of greater than about 15 at 1 GHz.

In some embodiments, the enhanced hexagonal ferrite material can have a permeability of between 6 and 8 from 800 MHz to 1 GHz. In some embodiments, the enhanced hexagonal ferrite material can have a dielectric constant of about 10-11.

Also disclosed herein are embodiments of an enhanced hexagonal ferrite having increased magnetic properties comprising a Y-phase hexagonal ferrite material, the Y-phase hexagonal ferrite material having an oxide consistent with the stoichiometry of $Sr_3Co_2Fe_{24}O_{41}$, $SrFe_{12}O_{19}$ or $CoFe_2O_4$ incorporated within.

In some embodiments, the enhanced hexagonal ferrite material can be a single phase. In some embodiments, the enhanced hexagonal ferrite material can be two distinct phases.

In some embodiments, the Y-phase hexagonal ferrite material can include $Sr_{1.6}Na_{0.4}Co_{1.6}Sc_{0.4}Fe_{11}O_{22}$. In some embodiments, the oxide can include $CoFe_2O_4$. In some embodiments, the oxide can include $SrFe_{12}O_{19}$. In some embodiments, 2 wt. % of the oxide can be incorporated into the Y-phase hexagonal ferrite material.

In some embodiments, the enhanced hexagonal ferrite material can have a Q value of greater than about 20 at 800 MHz. In some embodiments, the enhanced hexagonal ferrite material can have a Q value of greater than about 15 at 1 GHz.

In some embodiments, the enhanced hexagonal ferrite material can have a permeability of between 6 and 8 from 800 MHz to 1 GHz. In some embodiments, the enhanced hexagonal ferrite material can have a dielectric constant of about 10-11.

Also disclosed herein are embodiments of a radio frequency antenna for use in high frequency applications comprising a Y-phase hexagonal ferrite material, the Y-phase hexagonal ferrite material having an oxide consistent with the stoichiometry of $Sr_3Co_2Fe_{24}O_{41}$, $SrFe_{12}O_{19}$, or $CoFe_2O_4$ incorporated within to form an enhanced hexagonal ferrite material.

In some embodiments, the enhanced hexagonal ferrite material can be a single phase. In some embodiments, the enhanced hexagonal ferrite material can be two distinct phases.

In some embodiments, the Y-phase hexagonal ferrite material can include $Sr_{1.6}Na_{0.4}Co_{1.6}Sc_{0.4}Fe_{11}O_{22}$. In some embodiments, the oxide can include $CoFe_2O_4$. In some embodiments, the oxide can include $SrFe_{12}O_{19}$. In some embodiments, 2 wt. % of the oxide can be incorporated into the Y-phase hexagonal ferrite material.

In some embodiments, the enhanced hexagonal ferrite material can have a Q value of greater than about 20 at 800 MHz. In some embodiments, the enhanced hexagonal ferrite material can have a Q value of greater than about 15 at 1 GHz.

In some embodiments, the enhanced hexagonal ferrite material can have a permeability of between 6 and 8 from 800 MHz to 1 GHz. In some embodiments, the enhanced hexagonal ferrite material can have a dielectric constant of about 10-11.

Also disclosed herein is a hexagonal ferrite material comprising a Y phase hexagonal ferrite material having the composition $Sr_2Co_2Fe_{12}O_{22}$ doped with a tetravalent element.

Also disclosed herein is a hexagonal ferrite material comprising a Y phase hexagonal ferrite material having the composition $Sr_{2-x}Na_xCo_{2-x}Sc_xFe_{12}O_{22}$, $0<x<2$, doped with a tetravalent element.

In some embodiments, the tetravalent element substitutes for $Fe^{3+}$ ions on tetrahedral sites of the Y phase hexagonal ferrite material.

In some embodiments, the tetravalent element is one of Si, Ga, and Ge.

Also disclosed herein is a hexagonal ferrite material comprising a Y phase hexagonal ferrite material having the composition $Sr_2Co_2Fe_{12}O_{22}$ doped with a transition metal.

Also disclosed herein is a hexagonal ferrite material comprising a Y phase hexagonal ferrite material having the composition $Sr_{2-x}Na_xCo_{2-x}Sc_xFe_{12}O_{22}$, $0<x<2$, doped with a transition metal or Zn.

In some embodiments, the transition metal is one of Mn and Ni.

In some embodiments, the transition metal or Zn substitutes for Co ions on octahedral sites of the Y phase hexagonal ferrite material.

Also disclosed herein is a hexagonal ferrite material comprising a Y phase hexagonal ferrite material having the composition $Sr_2Co_2Fe_{12}O_{22}$ doped with one or more of Nb, Ta, V, W and Mo.

Also disclosed herein is a hexagonal ferrite material comprising a Y phase hexagonal ferrite material having the composition $Sr_{2-x}Na_xCo_{2-x}Sc_xFe_{12}O_{22}$, $0<x<2$, doped with one or more of Nb, Ta, V, W and Mo.

In some embodiments, the one or more of Nb, Ta, V, W and Mo substitutes for one of Co ions and Fe ions in the Y phase hexagonal ferrite material.

In some embodiments, the dopant element is present in the hexagonal ferrite at up to about 10 weight percent.

Also disclosed herein is a hexagonal ferrite material comprising a Y phase hexagonal ferrite material having the composition $Sr_2Co_2Fe_{12}O_{22}$ doped with one or more trivalent dopants selected from the group including Sc, Mn, In, Cr, Ga, Co, Ni, Fe, Yb, or a lanthanide ion and one or more tetravalent dopants selected from the group consisting of Si, Ge, Ti, Zr, Sn, Ce, Pr, Hf, or Tb.

Also disclosed herein is a hexagonal ferrite material comprising a Y phase hexagonal ferrite material having the composition $Sr_{2-x}Na_xCo_{2-x}Sc_xFe_{12}O_{22}$, $0<x<2$, doped with one or more trivalent dopants selected from the group including Sc, Mn, In, Cr, Ga, Co, Ni, Fe, Yb, or a lanthanide ion and one or more tetravalent dopants selected from the group consisting of Si, Ge, Ti, Zr, Sn, Ce, Pr, Hf, or Tb.

In some embodiments, the material has a deviation from the Y-phase stoichiometry of between zero and about five weight percent of one or more of Sr, Co, or Fe and/or one or more of the dopant components.

In some embodiments, x is about 0.4.

In some embodiments, the material exhibits a quality factor of up to about 20 at about 1 GHz.

In some embodiments, the material exhibits a real permeability of greater than about four at about 1 GHz.

Also disclosed herein is a radio frequency circuit element formed from an embodiment of a hexagonal ferrite material as disclosed herein.

In some embodiments, the radio frequency circuit element includes one or more of an antenna, a circulator, an isolator, and an inductor.

Also disclosed herein is a radio frequency circuit module including an embodiment of the radio frequency circuit element.

Also disclosed herein is an electronic device including the radio frequency circuit module.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
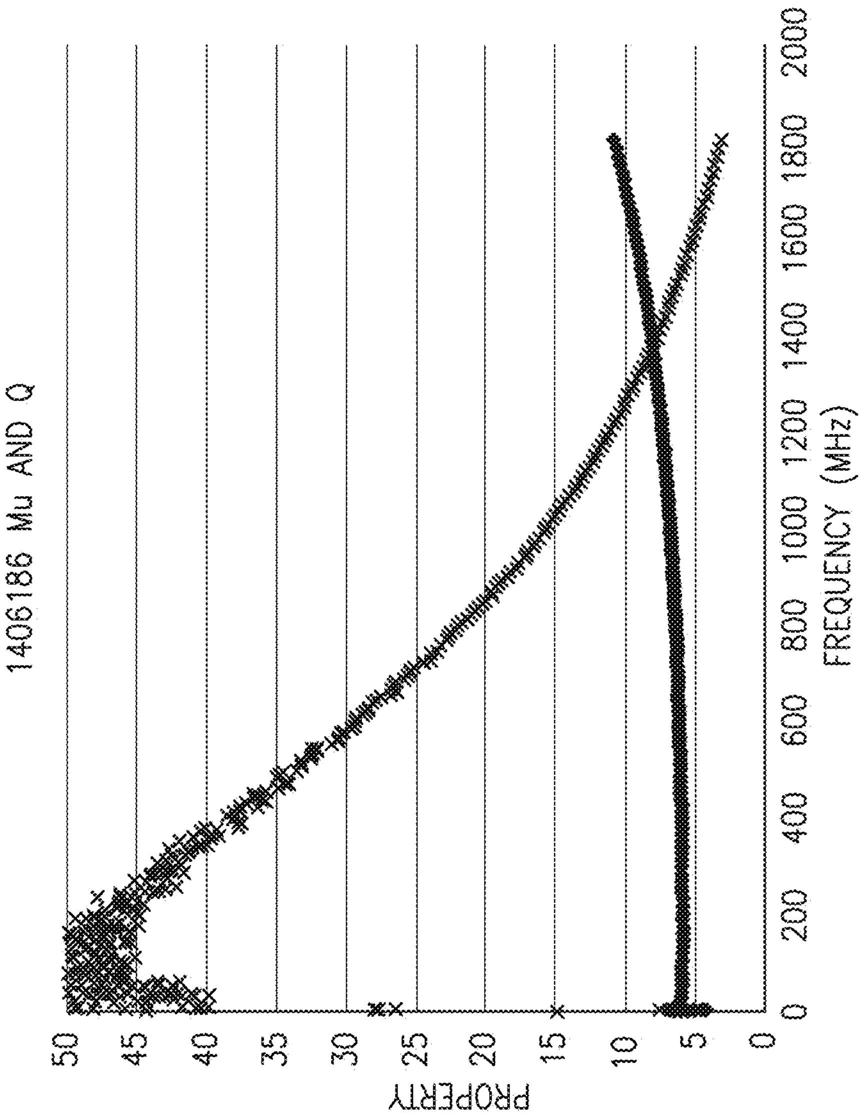
FIG. 1 illustrates permeability and quality factor v. frequency for an embodiment of a Y-phase hexagonal ferrite with an incorporated oxide.

Disclosed herein are embodiments of materials that can be advantageous as magnetodielectric materials. Magnetodielectric materials can be particularly useful in radio frequency (RF) devices such as antennas, transformers, inductors, circulators, and absorbers because of certain favorable material properties. For example, magnetodielectric materials can be useful for increasing the upper frequency limits of an antenna, which is largely determined by the resonant frequency of the material used. Additionally, some of the properties afforded by magnetic materials can be favorable miniaturizing factors, reduced field concentration, and better impedance match, all of which are advantageous for radio frequency devices. Further, as shown in FIG. 1, the permeability and magnetic Q of embodiments of the disclosed material can remain high even at higher frequencies, thus making the material advantageous for antennas.

Recent advances in magnetodielectric materials are driven in part by the desire to miniaturize high frequency antennas, thus reducing the overall footprint of the antenna, while maintaining desirable bandwidth, impedance, and low dielectric loss. Disclosed herein are materials and methods of making magnetodielectric materials that have improved resonant frequencies as well as low dielectric loss, thus providing for materials that are advantageous for use in, at least, radio frequency electronics.

Two figures of merit for antenna performance include the miniaturization factor and the bandwidth. First, the miniaturization factor is determined by the formula:

$$d_{eff}=d_o(\varepsilon_r\mu_r)^{-1/2}$$

where $d_{eff}/d_o$ is the miniaturization factor, $\varepsilon_r$ is the dielectric constant of the antenna material, and $\mu_r$ is the magnetic permeability of the antenna material. Both $\varepsilon_r$ and $\mu_r$ are dependent on frequency in magnetic oxide antennas. Second, the effective bandwidth (or efficiency) is determined by the formula:

$$\eta=\eta_o(\mu_r/\varepsilon_r)^{1/2}$$

where $\eta/\eta_o$ describes the efficiency (or bandwidth) of the material. This efficiency is maximized if $\mu_r$ is maximized. In addition if $\mu_r=\varepsilon_r$ there is a perfect impedance match to free space.

It can be advantageous for miniaturization to have both high dielectric constant and high permeability. Having high values can lead to improved miniaturization factors. Further, for the efficiency equation, it can be advantageous to have permeability greater to or equal to that of the dielectric constant. However, it can be advantageous to have both permeability and dielectric constant to be as high as possible. Accordingly, because embodiments of the described Y-phase hexagonal ferrite material have high permeability and high dielectric constant, and have a dielectric constant relatively close to permeability, they can be useful for antenna applications where a good impedance match to free space is desirable.

Hexagonal Ferrite

One class of materials that can have advantageous magnetic properties for magnetodielectric applications are hexagonal ferrites. Hexagonal ferrites, or hexaferrites, have magnetic properties that are directly linked to their crystal structure. For example, hexagonal ferrites all have magnetocrystalline anisotropy, where the response to an induced magnetic field has a preferred orientation through the crystal structure. Additionally, hexagonal ferrite systems, in particular, are desirable because of their high magnetic permeability and absorption at microwave (100 MHz-20 GHz) frequencies.

Figure 2:
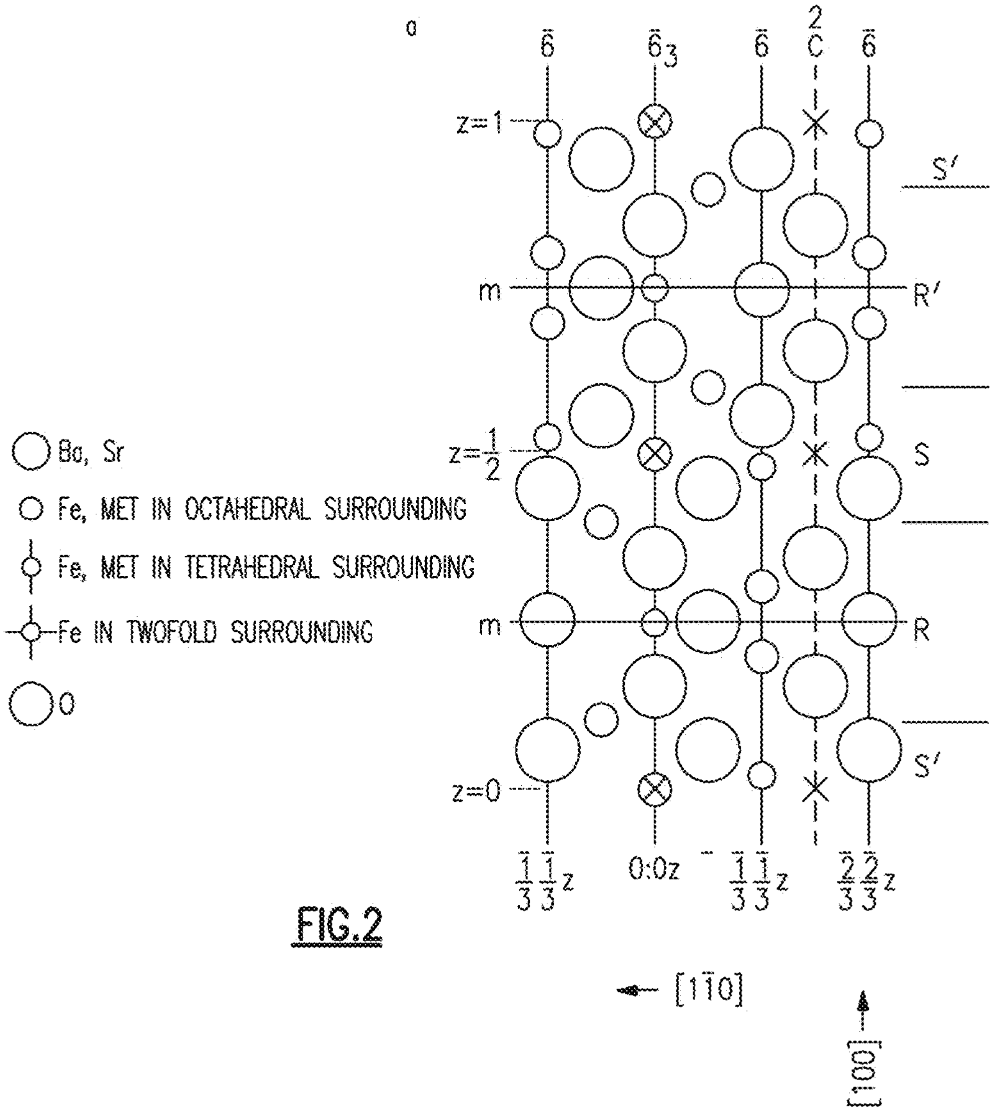
FIG. 2 illustrates the crystal structure of an embodiment of a Y-phase hexagonal ferrite.

Hexagonal ferrite crystal systems can include crystal structures that are generally intergrowths between magnetoplumbite and spinel structures containing strontium (Sr) or barium (Ba), a divalent cation such as iron (Fe), cobalt (Co), nickel (Ni) or manganese (Mn) and trivalent Fe. The hexagonal ferrite may be formed in a variety of different crystal structures based on the magnetoplumbite cell. These structures include M-phase ($SrFe_{12}O_{19}$), W-phase ($BaMe_2Fe_{16}O_{27}$), Y-phase ($Sr_2Me_2Fe_{12}O_{22}$) and Z-phase ($Ba_3Me_2Fe_{24}O_{42}$), as well as combinations of the structures. FIG. 2 illustrates the crystal structure of Y-phase hexagonal ferrite.

While typical hexagonal ferrites contain barium, the barium atoms can be substituted out for an atom of a similar size, such as strontium. Accordingly, the substitution of the barium atoms with strontium atoms should not negatively impact the properties of the material as the structure should retain generally the same shape. In fact, as shown below, the use of strontium instead of barium can allow for other processing methods that improve the magnetodielectric properties of the hexagonal ferrite.

One example hexagonal ferrite that can be particularly advantageous as a magnetodielectric material for use in, for example, high frequency antennas or other RF devices, is Y-phase strontium cobalt ferrite ($Sr_2Co_2Fe_{12}O_{22}$), commonly abbreviated as $Co_2Y$. Disclosed herein are embodiments of this class of Y-phase hexagonal ferrites, as well as methods of manufacturing them, having improved magnetic properties useful for RF applications, such as improved resonant frequencies, low magnetic loss, and high Q factor values.

Embodiments of the present disclosure teach methods and processing techniques for improving performance characteristics of hexagonal ferrite materials used in high frequency applications. Certain embodiments provide improved methods and processing techniques for manufacturing Y-phase hexagonal ferrite systems $Sr_2Co_2Fe_{12}O_{22}$ ($Co_2Y$) that have reduced magnetorestriction, improved resonant frequency, and extended magnetic permeability at higher frequencies.

Magnetodielectric Properties

Certain properties of a material can be advantageous for use in magnetodielectric applications, such as radio frequency antennas. These properties include, but are not limited to, magnetic permeability, permittivity, magnetic anisotropy, magnetic loss, and magnetic Q values.

Permeability is the measure of the ability of a material to support the formation of a magnetic field within itself. In other words, magnetic permeability is the degree of magnetization that a material obtains in response to an applied magnetic field. Accordingly, a higher magnetic permeability, or mu' or μ', allows for a material to support a higher magnetic field. Accordingly, it can be advantageous for a material for use in radio frequency applications to have high magnetic permeability.

Relative permeability and relative permittivity are properties indicative of the performance of a magnetic material in high frequency antenna applications. Relative permeability is a measure of the degree of magnetization of a material that responds linearly to an applied magnetic field relative to that of free space ($\mu_r=\mu/\mu_o$). Relative permittivity ($\varepsilon_r$) is a relative measure of the electronic polarizability of a material relative to the polarizability of free space ($\varepsilon_r=\varepsilon/\varepsilon_o$). Generally, permeability (μ) can be separated into two components: spin rotational $X_{sp}$ which is exhibited in response to high frequencies, and domain wall motion $X_{dw}$ which is damped out at microwave frequencies. Permeability can be generally represented by $\mu'=1+X_{dw}+X_{sp}$.

Unlike spinels, $Co_2Y$ systems typically have a non-cubic unit cell, planar magnetization, and an anisotropic spin-rotation component to permeability. Spin rotation anisotropy is also a consideration in preparing $Co_2Y$ for high frequency applications. Large anisotropy fields ($H_\theta$) are similar to applying an external magnetic field which increases resonant frequency, whereas small anisotropy fields ($H_\varphi$) improve permeability. $H_\theta$ is generally strong in hexagonal ferrites, such as $Co_2Y$. As such, domain formation out of the basal plane is suppressed and the material becomes self-magnetizing. The relationship between the permeability and the rotational stiffness can be represented by the formula $(\mu_o-1)/4\pi=(1/3)(M_s/H_\theta^A+M_s/H_\varphi^A)$. For isotropic rotational stiffness (as in spinels), the relationship can be represented as follows: $(\mu_o-1)/4\pi=(2/3)(M_s/H^A)$. For cases where $H_\theta^A$ does not equal to $H_\varphi^A$: $f_{res}$ $(\mu_o-1)=4/3\ \psi M_s\ [1/2\ (H_\theta^A/H_\varphi^A)+1/2\ (H_\varphi^A/H_\theta^A)]$. It is believed that the larger the difference in rotational stiffness, the greater the self-magnetization field, which could push the resonant frequency into the microwave region. Permeability drops quickly above the resonance frequency.

Another property of magnetodielectric antenna materials is the magnetic loss factor. The magnetic loss tangent describes the ability of the magnetic response in a material to be in phase with the frequency of the applied magnetic field (in this case from electromagnetic radiation) at a certain frequency. This is represented as $\tan\delta_m=\mu''/\mu'$. The Magnetic Q is the inverse of the magnetic loss tangent. $Q=1/\tan\delta_m$. For example, if a loss factor is high at a certain frequency, the material would not be able to operate at that frequency. Accordingly, it can be advantageous for a magnetodielectric material to have low magnetic loss tangent up to higher frequencies, such as those above 500 MHz, above 800 MHz, or above 1 GHz, as the material could then be used in applications at those high frequencies. Magnetic Q factors of above 20 are advantageous for some applications. This can be especially useful for antennas to select particular high frequency signals without interference from other signals at around the selected range.

Substitution with K

In some embodiments, improvements to a hexagonal ferrite material can be made by substituting potassium into the crystal structure of the Y-phase hexagonal ferrite material. This incorporation can be done with, or without, the other methods for improving magnetic properties disclosed herein.

To increase the resonant frequency of a material, such as the Y-phase hexagonal ferrite, small amounts of alkali metals can be doped into the composition. For example, lithium, sodium, potassium, and rubidium can all be doped into the hexagonal ferrite. In doing so, strontium atoms can be substituted out to make room for the alkali metals. The addition of alkali metal can prevent the reduction of iron to the $Fe^{2+}$ state. Since the alkali metal with a 1+ oxidation state substitutes for Sr with a 2+ oxidation state, it decreases the likelihood of $Fe^{3+}$ converting to $Fe^{2+}$ because, in this case, the average metal oxidation state becomes too low. Therefore, the reduction of iron during sintering is inhibited. By avoiding the reduction of iron, the threshold for the resonant frequency can be pushed higher than values that have been previously obtained. $Fe^{2+}$ decreases the resonant frequency and contributes to both the magnetic and the dielectric loss tangents. Accordingly, the increased resonant frequency along with the decreased magnetic loss tangent can then result in a corresponding increase in the magnetic Q factor, allowing for embodiments of the disclosed material to have advantageous use as a magnetodielectric material.

In some embodiments, potassium may be added as excess material to $Sr_2Co_2Fe_{12}O_{22}$ in, for example, the form of potassium carbonate. However, other potassium sources can be used as well. Further, the potassium can be substituted into the strontium site on the crystal structure. Potassium carbonate may be added in with the oxide blend in modest amounts and become incorporated into the structure during the heat treatment.

Strontium and potassium have different charges to their atoms, 2+ for strontium and 1+ for potassium (or sodium) and thus some charge balancing can be used to avoid any significant or harmful distortion of the crystal structure of the Y-phase hexagonal ferrite. In some embodiments, a trivalent or tetravalent species can be substituted in for cobalt (having a 2+ charge), which can compensate for the charge imbalance that occurs by substituting $K^+$ in for $Sr^{2+}$, thus leading to a properly balanced chemical structure. Accordingly, two series of compounds can be used, one for trivalent ion substitutions for cobalt and one for tetravalent ion substitutions of cobalt.

For trivalent ion substitution, the below example composition can be used in certain embodiments:

$$Sr_{2-x}K_xCo_{2-x}M_xFe_{12}O_{22} \text{ or } Sr_{2-x}Na_xCo_{2-x}M_xFe_{12}O_{22}$$

where M can be any trivalent ion. For example, M can be one or more of Sc, Mn, In, Cr, Ga, Co, Ni, Fe, Yb, Er, Y or any of the lanthanide ions. Further, x values can be in the range of from about 0 to about 1.5. with optimal materials obtained when 0.2<x<0.7.

For tetravalent ion substitution, the below example composition can be used in certain embodiments:

$$Sr_{2-2x}K_{2x}Co_{2x}N_xFe_{12}O_{22} \text{ or } Sr_{2-2x}Na_{2x}Co_{2-x}N_xFe_{12}O_{22}$$

where N can be any tetravalent ion. For example, N can be one or more of Si, Ge, Ti, Zr, Sn, Ce, Pr, Hf, or Tb. Again, x values can be in the range of from about 0 to about 0.75 with optimal materials obtained when 0.2<x<0.5

Figure 3:
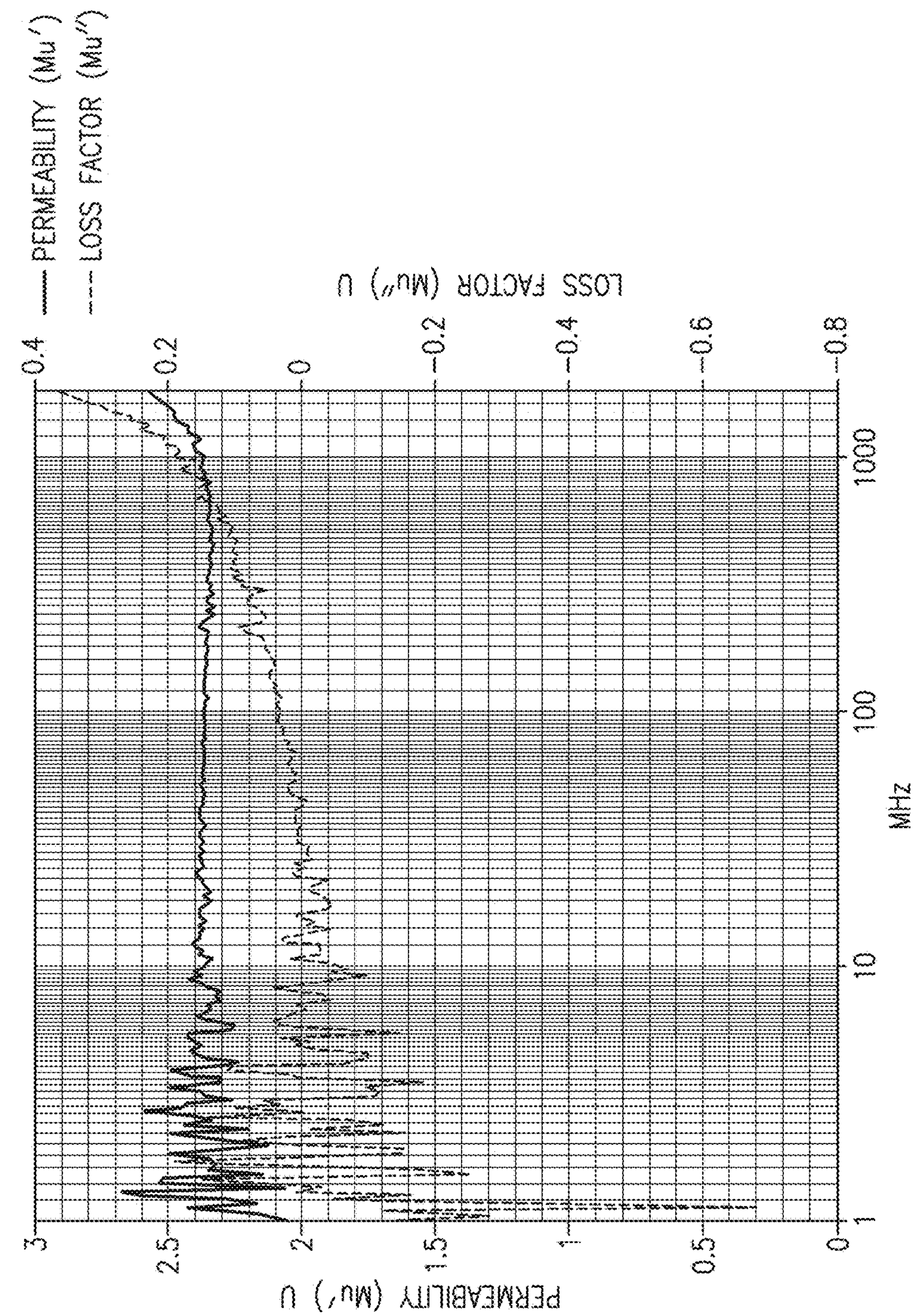
FIG. 3 illustrates permeability and loss factor v. frequency for an embodiment of Y-phase hexagonal ferrite without potassium carbonate.
Figure 4:
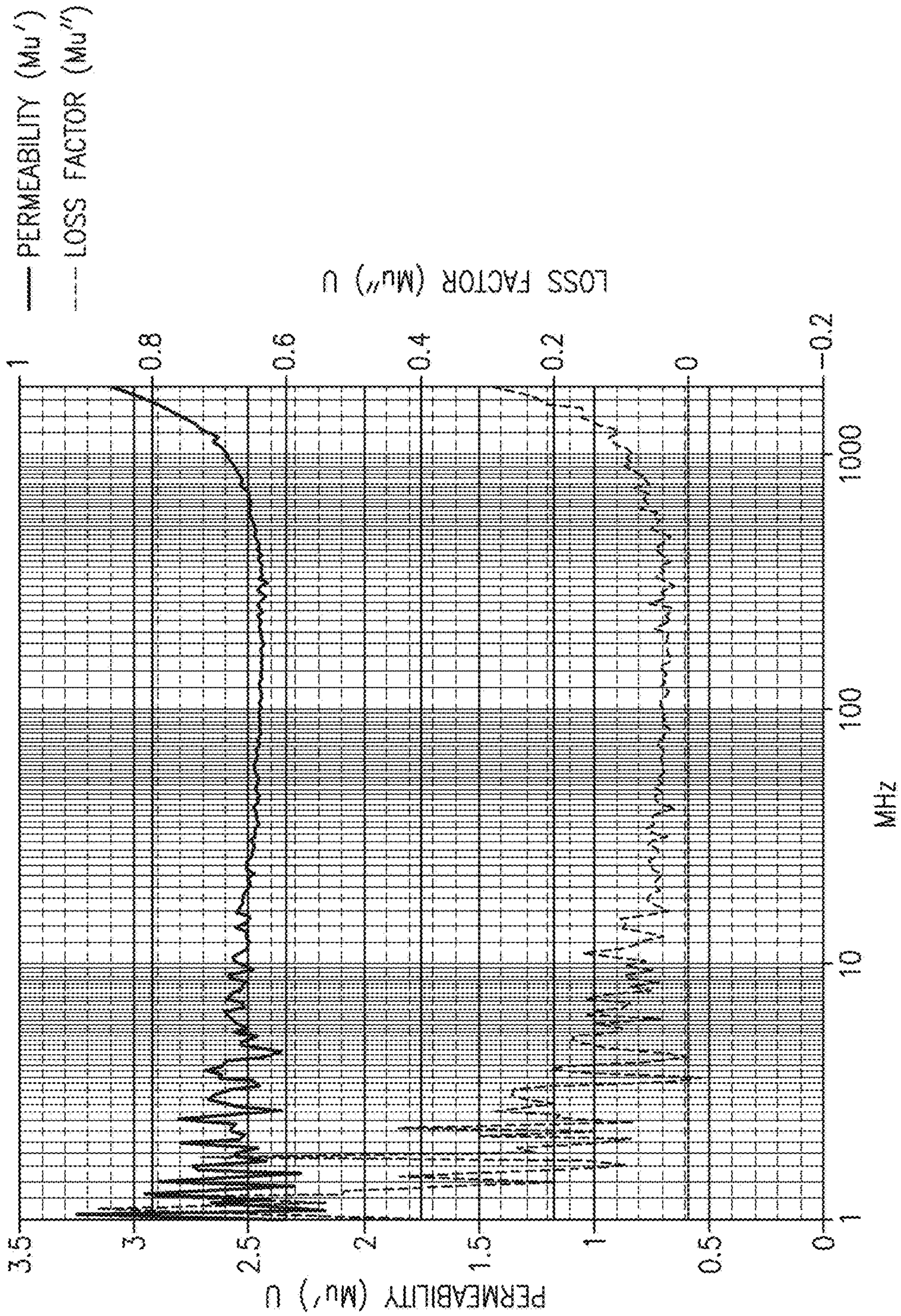
FIG. 4 illustrates permeability and loss factor v. frequency for an embodiment of Y-phase hexagonal ferrite with potassium carbonate.

FIGS. 3-4 show impedance spectra using the above disclosed substitution technique of adding potassium carbonate. Typically, the impedance spectra is performed using dielectric spectroscopy, also known as impedance spectroscopy or electrochemical impedance spectroscopy. The impedance spectra can show the different dielectric properties of a medium as a function of different frequencies.

In FIGS. 3-4, the impedance spectra shows both permeability (μ') as well as loss factor (μ") across a range of frequencies. It can be advantageous for magnetodielectric materials used in radio frequency applications to have a minimal change in properties across the range of frequencies, and in particular a minimal μ" and therefore a minimal loss tangent at those particular frequencies. When the loss tangent begins to increase or spike, the material would become unsuitable for antenna applications.

Along with minimizing the loss tangent spike, it can be advantageous to adjust the spike in loss tangent to as high a frequency as possible. As mentioned, when the loss tangent spikes at a particular frequency, the material becomes less useful at that frequency. So having a loss tangent spike at higher frequencies means that the material can be used at higher frequencies with minimized loss.

FIG. 3 illustrates the permeability without the incorporation of potassium carbonate. This is the pure sintered $Sr_2Co_2Fe_{12}O_{22}$.

As shown in FIG. 3, the μ" (loss factor) of the material can vary wildly at low frequencies. Further, as the frequency increases, μ" steadily increases until it begins a generally exponential growth.

On the other hand, FIG. 4 illustrates the permeability and loss factor for a $Sr_2Co_2Fe_{12}O_{22}$ wherein potassium carbonate is added in.

As shown in FIG. 4, the loss factor of an embodiment of the Y-phase hexagonal ferrite material is significantly lower than the one shown in FIG. 3. Further, the loss factor shown in FIG. 4 actually decreases as the frequency increases up to a certain point. In the ranges of around 100 MHz to about 800 MHz, the loss factor remains relatively stable at about 0.03, before increasing. However, even at the higher frequency of 1 GHz, the material still has a loss factor of around 0.1. Looking back at the previous FIG. 3 without potassium carbonate, it is clearly shown that the potassium carbonate addition greatly reduces the loss factor of the Y-phase hexagonal ferrite material, making it advantageous for high frequency radio frequency applications.

Figure 5:
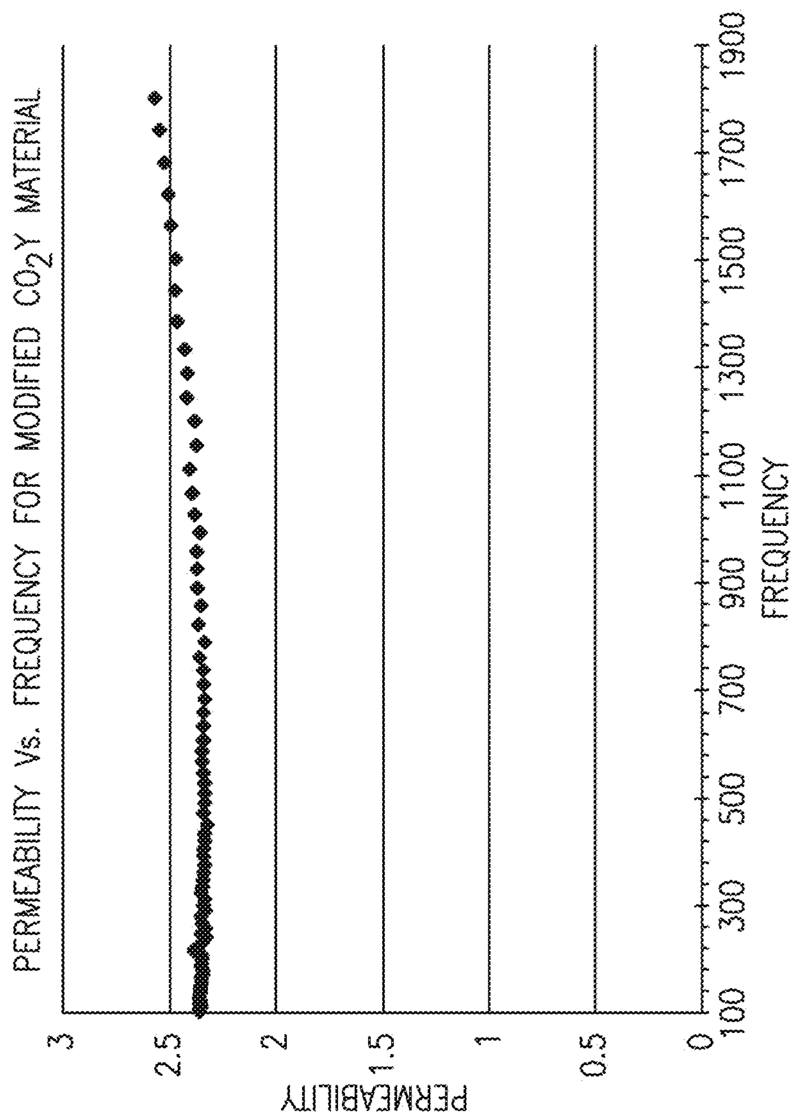
FIG. 5 illustrates permeability v. frequency for an embodiment of a Y-phase hexagonal ferrite without potassium carbonate.

Further, FIG. 5 shows a graph of permeability v. frequency for an embodiment of the disclosed material without the incorporation of potassium carbonate. As shown in FIG. 5, the permeability of the material remains relatively constant throughout the frequency ranges tested. Generally, the permeability of the material remains just under 2.5, though there is some increase as the tested frequency increases. The permeability increases to over 2.5 at approximately 160 MHz.

Figure 6:
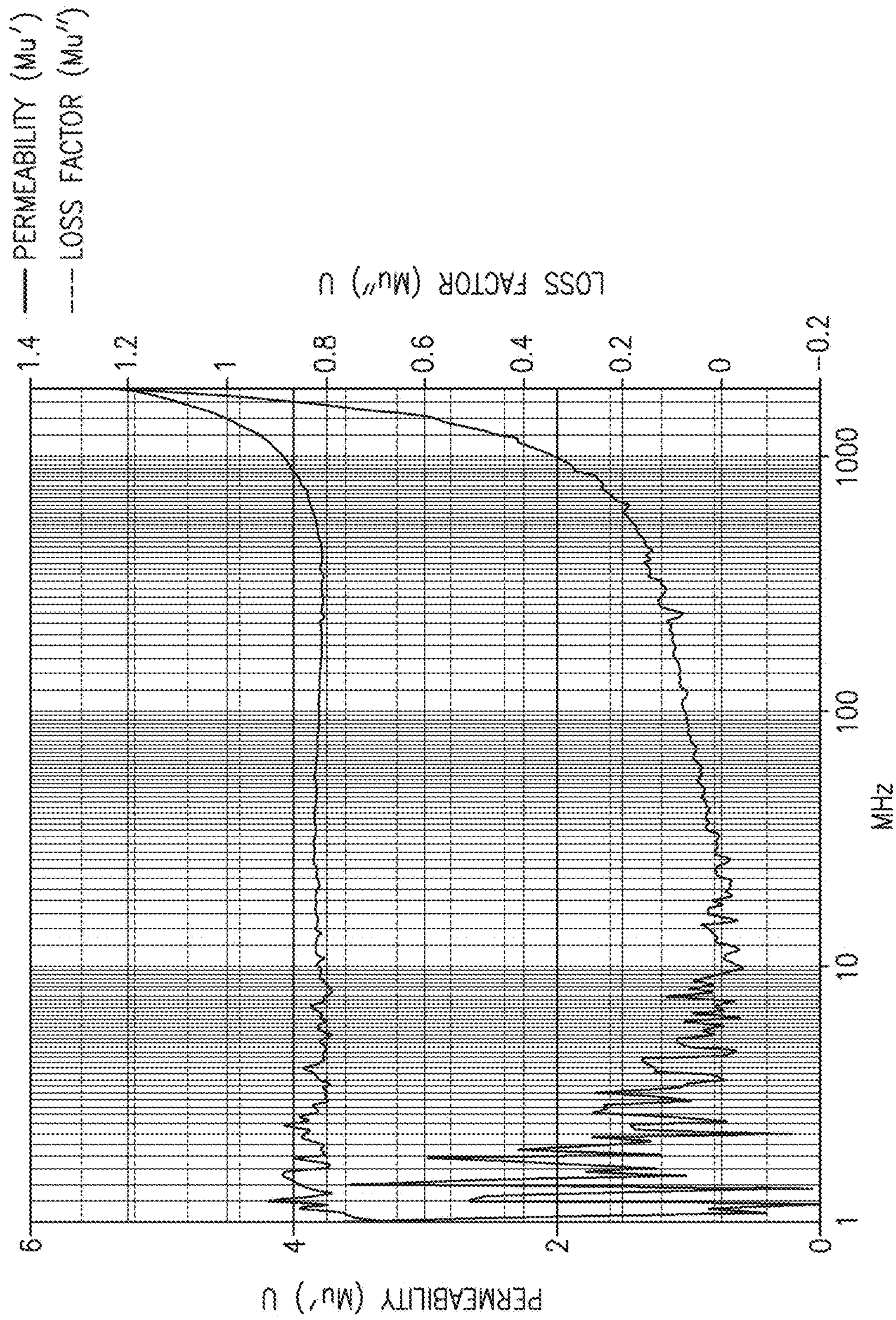
FIG. 6 illustrates permeability and loss factor v. frequency for an embodiment of Y-phase hexagonal ferrite having scandium and incorporating 0.25 wt. % potassium.

FIG. 6 illustrates the permeability and loss factor for a hexagonal ferrite material where M is Sc and where x=0.25.

As shown in FIG. 6, the μ" (loss factor) of an embodiment of the Y-phase hexagonal ferrite material is extremely low, reaching almost to 0. Even as the frequency increases to over 1 GHz, the material maintains loss factors of below 0.5. While maintaining the low loss factor, the material having the properties shown in FIG. 6 also exhibits a permeability of around 4.

Accordingly, because of the low loss factor and the high magnetic permeability, embodiments of the Y-phase hexagonal ferrite material discussed above can be advantageous for use as a magnetodielectric material, such as in a radio frequency antenna.

Figure 7:
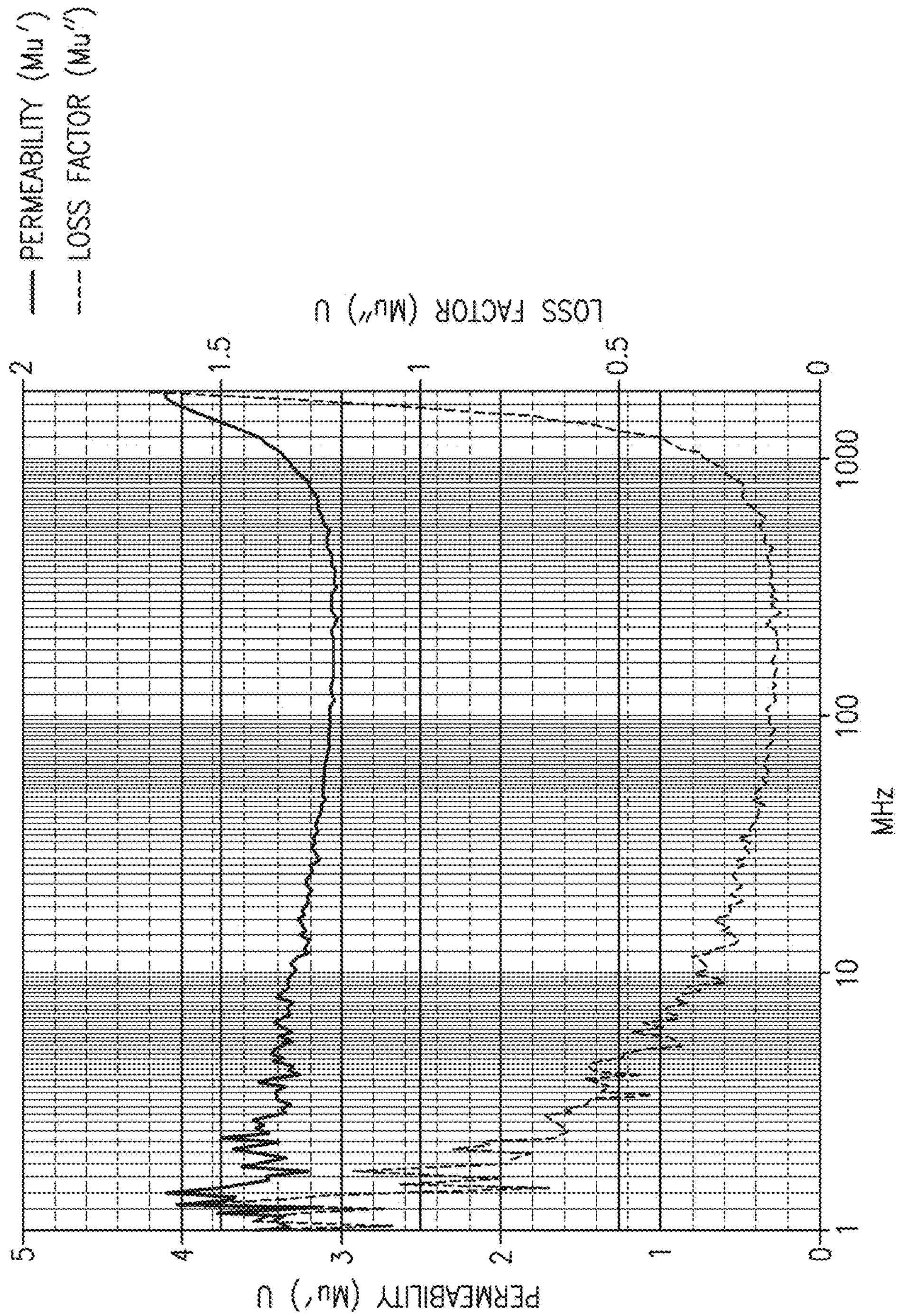
FIG. 7 illustrates permeability and loss factor v. frequency for an embodiment of Y-phase hexagonal ferrite having indium and incorporating 0.25 wt. % potassium.

FIG. 7 illustrates the permeability and loss factor for a hexagonal ferrite material where M is In and where x=0.25.

As shown in FIG. 7, the loss factor of an embodiment of the Y-phase hexagonal ferrite material is extremely low, reaching almost to 0. Even as the frequency increases to over 1 GHz, the material maintains loss factors of below 0.5. It is not until over 1 GHz that the loss factor of the material begins to spike.

Further, while maintaining the low loss factor, the material having the properties shown in FIG. 7 also exhibits a permeability of over 3, which is greater than the typical values for Y-phase hexagonal ferrite materials.

Accordingly, because of the low loss factor and the high magnetic permeability, embodiments of the Y-phase hexagonal ferrite material having the properties shown with respect to FIG. 7 can be advantageous for use as a magnetodielectric material, such as in a radio frequency antenna.

Figure 8:
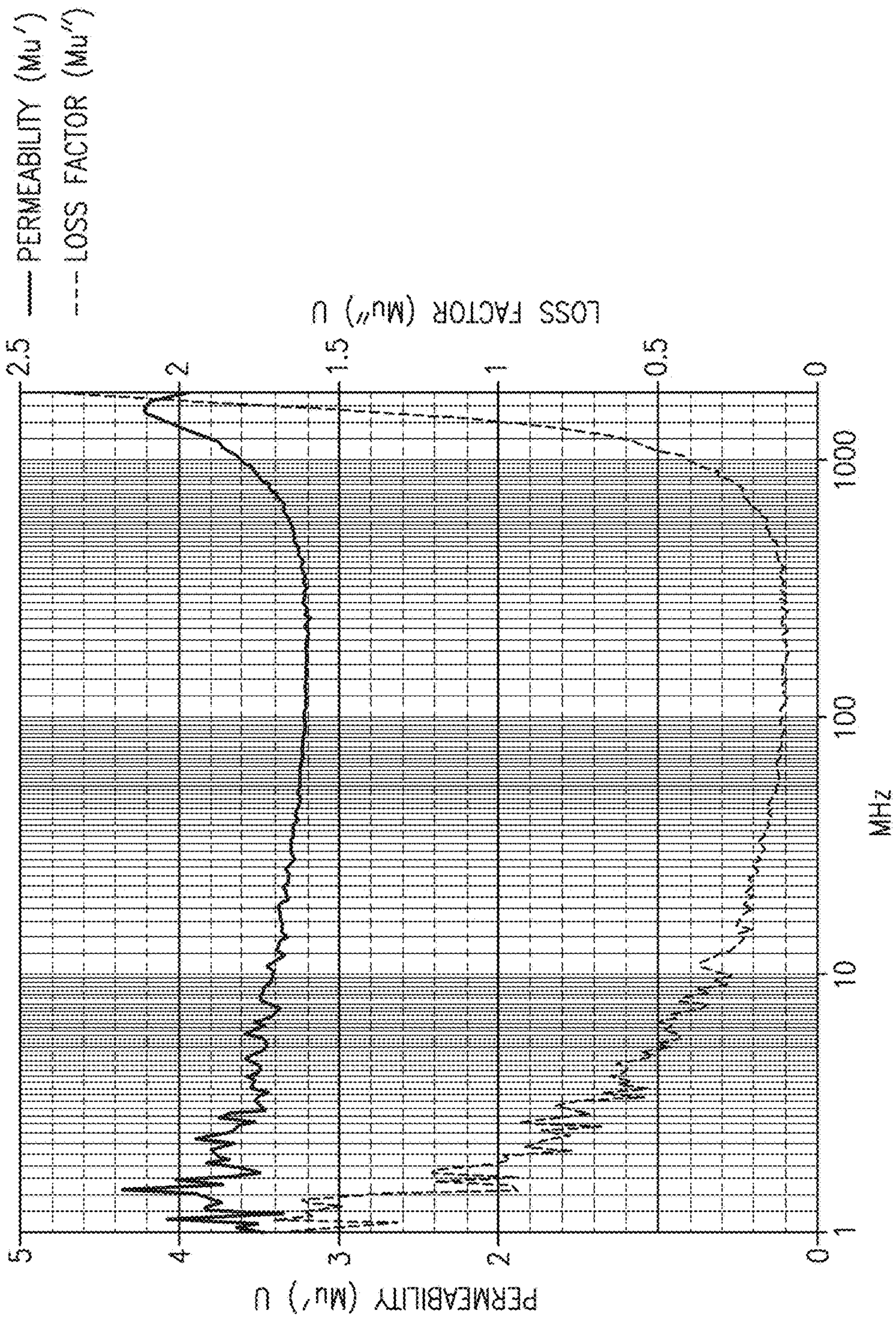
FIG. 8 illustrates permeability and loss factor v. frequency for an embodiment of Y-phase hexagonal ferrite having scandium and incorporating 0.5 wt. % potassium.

FIG. 8 illustrates the permeability and loss factor for a hexagonal ferrite material where M is Sc and where x=0.5.

As shown in FIG. 8, the loss factor of an embodiment of the Y-phase hexagonal ferrite material is extremely low, reaching almost to 0. Even as the frequency increases to over 1 GHz, the material maintains loss factors of below 1.

Further, while maintaining the low loss factor, the material having the properties shown in FIG. 8 also exhibits a permeability of about 3 to about 4, which is greater than the typical for a Y-phase hexagonal ferrite material.

Accordingly, because of the low loss factor and the high magnetic permeability, embodiments of the Y-phase hexagonal ferrite material having the properties shown with respect to FIG. 8 can be advantageous for use as a magnetodielectric material, such as in a radio frequency antenna.

Figure 9:
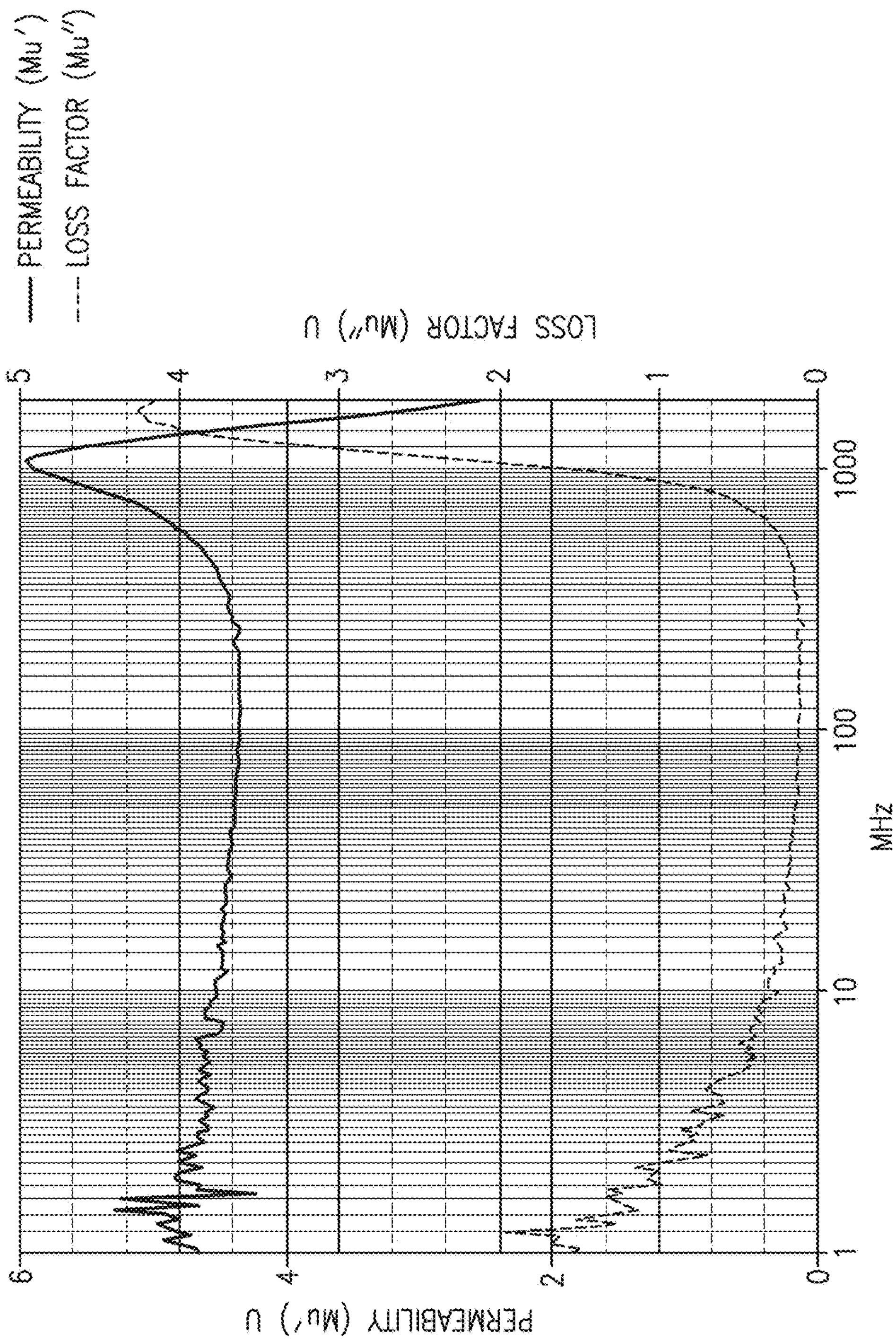
FIG. 9 illustrates permeability and loss factor v. frequency for an embodiment of Y-phase hexagonal ferrite having indium and incorporating 0.5 wt. % potassium.

FIG. 9 illustrates the permeability and loss factor for a hexagonal ferrite material where M is In and where x=0.5.

As shown in FIG. 9, the loss factor of an embodiment of the Y-phase hexagonal ferrite material is again extremely low, though slightly above that illustrated in the other figures described above. The loss factor reduces greatly to near 0 from about 100 MHz to about 800 MHz, when the loss factor starts increasing. However, even with the increase, the Y-phase hexagonal ferrite material maintains a loss factor of about 2 at 1 GHz.

Further, while maintaining the low loss factor, the material having the properties shown in FIG. 9 also exhibits a permeability of greater than 4, from about 4-5, which is over double that of standard Y-phase hexagonal ferrite materials. Further, it is noticeable that there is a large spike in permeability at around 1 GHz, where permeability increases to about 6. Therefore, at 1 GHz, embodiments of the material have a large permeability while still maintaining the relatively low loss factor.

Accordingly, because of the low loss factor and the high magnetic permeability, embodiments of the Y-phase hexagonal ferrite material having the properties shown with respect to FIG. 9 can be advantageous for use as a magnetodielectric material, such as in a radio frequency antenna.

Substitution with Na

While the disclosure above shows one method for improving the magnetic properties of a Y-phase hexagonal ferrite materials, different improvements can be made to the hexagonal ferrite material by substituting sodium into the crystal structure of the Y-phase hexagonal ferrite material. This incorporation can be done with, or without, the other methods for improving magnetic properties disclosed herein.

In some embodiments, sodium can be used as an atom to substitute into the crystal structure of the Y-phase strontium hexagonal ferrite. By incorporating sodium into the crystal structure, high magnetic permeability values can be achieved while maintaining high Q values, thus improving embodiments of the material for use as a magnetodielectric material.

In some embodiments, $Na^+$ can be used to substitute out some of the $Sr^{2+}$ atoms in the Y-phase hexagonal ferrite. The substitution can be performed through numerous methods, and the method of substitution is not limiting. For example, in some embodiments the substitution of strontium for sodium can be performed without charge compensation elsewhere in the lattice or with charge compensation through a coupled substitution in the Sr—Co—Y lattice.

However, strontium and sodium have different charges to their atoms, 2+ for strontium and 1+ for sodium, and thus some charge balancing can be used to avoid significant distortion of any crystal structure. In some embodiments, a trivalent or tetravalent species can be substituted in for cobalt (having a 2+ charge), which can compensate for the charge imbalance that occurs by substituting $Na^+$ in for $Sr^{2+}$. Accordingly, two series of compounds can be used, one for trivalent ion substitutions of cobalt and one for tetravalent ion substitutions of cobalt.

For trivalent ion substitution, the below example composition can be used:

$$Sr_{2-x}Na_xCo_{2-x}M_xFe_{12}O_{22}$$

where M is one or more trivalent cations such as Al, Ga, Sc, Cr, Mn, In, Yb, Er, Y or another lanthanide, though the trivalent ion is not limiting. Further, x values can be in the range of from about 0 to about 1.5, with optimal materials obtained when $0.2<x<0.7$.

For tetravalent ion substitution, the below equation can be used:

$$Sr_{2-2x}Na_{2x}Co_{2x}N_xFe_{12}O_{22}$$

where N can be one or more of Si, Ge, Ti, Zr, Sn, Ce, Pr, Hf, or Tb, though the tetravalent ion is not limiting. Further, x values can be in the range of from about 0 to about 1.5, with optimal materials obtained when $0.2<x<0.7$. For x=0.4, very high permeability values at low loss are also observed.

Figure 10:
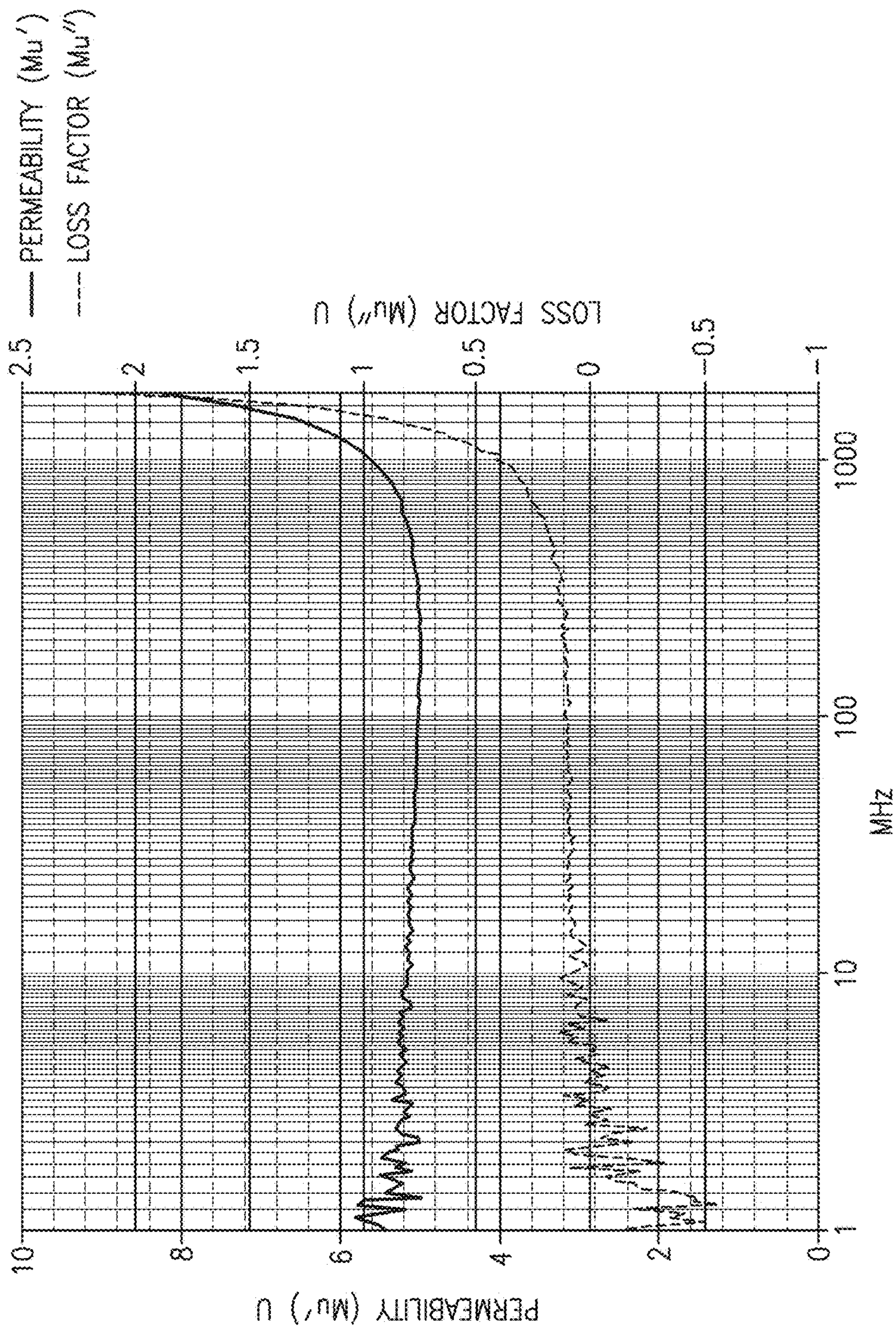
FIG. 10 illustrates permeability and loss factor v. frequency for an embodiment of Y-phase hexagonal ferrite having scandium and incorporating 0.25 wt. % sodium.
Figure 11:
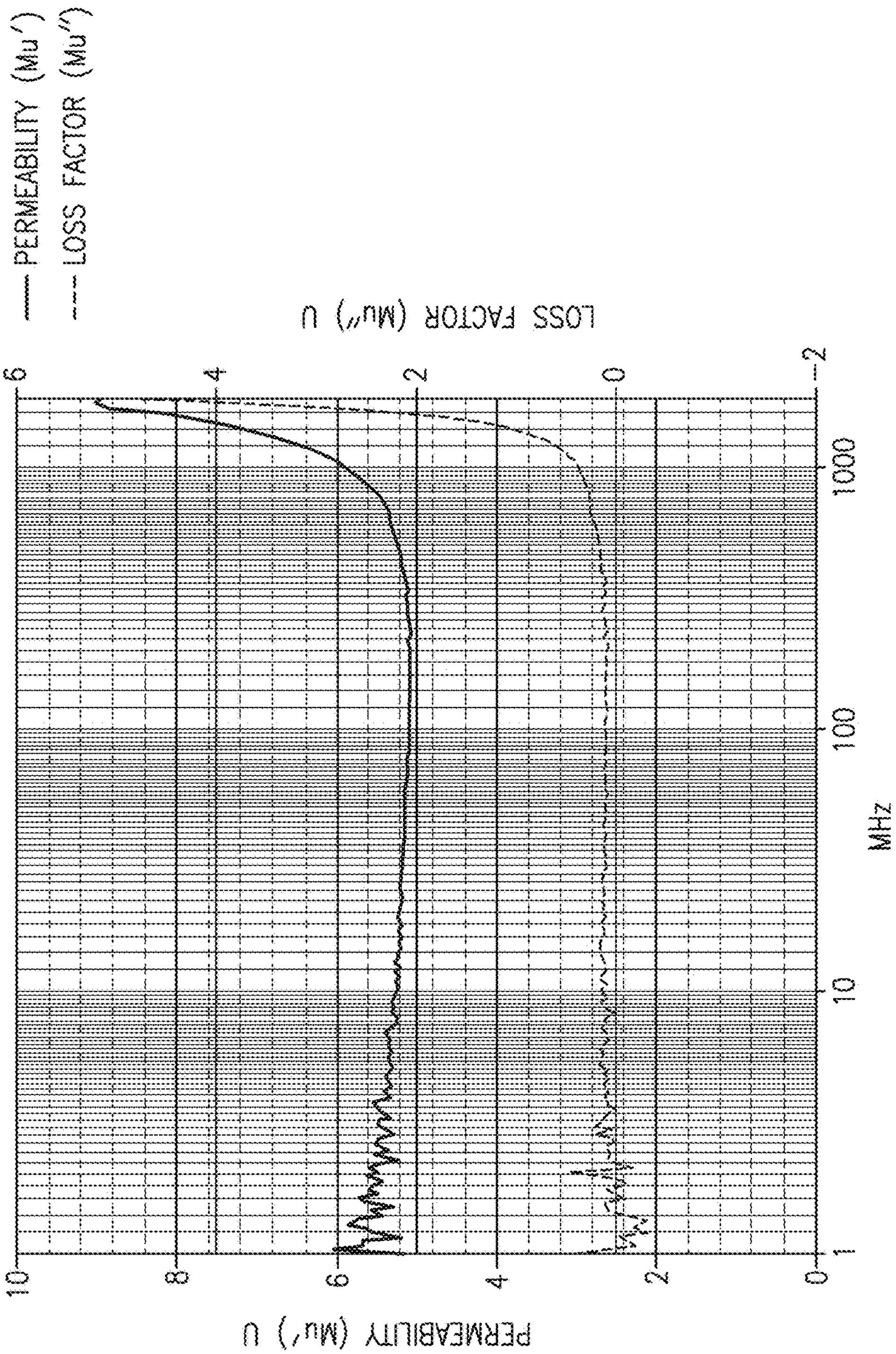
FIG. 11 illustrates permeability and loss factor v. frequency for an embodiment of Y-phase hexagonal ferrite having scandium and incorporating 0.5 wt. % sodium.

FIGS. 10-11 show impedance spectra using the above disclosed substitution technique. Typically, the impedance spectra is performed using dielectric spectroscopy, also known as impedance spectroscopy or electrochemical impedance spectroscopy. The impedance spectra can show the different dielectric properties of a medium as a function of different frequencies.

In FIGS. 10-11, the impedance spectra shows both permeability (μ') as well as loss factor (μ") across a range of frequencies. It can be advantageous for radio frequency applications to have minimal movement across the range of frequencies, which shows that there is minimal loss at those particular frequencies. At frequencies where the loss factor begins to spike, the material may experience more loss during use at those frequencies. At a certain point, the material would become unusable due to the high loss.

Along with minimizing the loss factor spike, it can be advantageous to adjust the spike in loss factor as far towards the high range of frequency as possible. As mentioned, in a frequency range where the loss factor spikes, the material becomes less useful in that frequency range. So having a loss factor spike at higher frequencies means that the material can be used at higher frequencies with minimized loss.

FIG. 10 illustrates the permeability and loss factor for a hexagonal ferrite material using Sc where x=0.25. Accordingly, the general equation is $Sr_{1.75}Na_{0.25}Co_{1.75}Sc_{0.25}Fe_{12}O_{22}$.

As shown in FIG. 10, the loss factor of an embodiment of the Y-phase hexagonal ferrite material does not rise above 1 until about 1 GHz. In fact, the loss factor of the hexagonal ferrite material remains relatively constant at around 0.75 from approximately 100 MHz up through approximately 800 MHz.

While maintaining the low loss factor, the material having the properties shown in FIG. 10 also maintains a permeability of around 5. This is over double the permeability that is found in typical Y-phase hexagonal ferrite materials.

Accordingly, because of the low loss factor and the high magnetic permeability, embodiments of the Y-phase hexagonal ferrite material having the properties shown with respect to FIG. 10 can be advantageous for use as a magnetodielectric material, such as in a radio frequency antenna.

FIG. 11 illustrates the permeability and loss factor for a hexagonal ferrite material using Sc where x=0.5. Accordingly, the general equation is $Sr_{1.5}Na_{0.5}Co_{1.5}Sc_{0.5}Fe_{12}O_{22}$.

As shown in FIG. 11, the loss factor of an embodiment of the Y-phase hexagonal ferrite material does not rise above 4 until well above 1 GHz. In fact, the loss factor of the hexagonal ferrite material remains relatively constant just above 2 up through approximately 800 MHz. Even at a frequency of 1 GHz, the material only has a loss factor of around 3. Accordingly, embodiments of this disclosed Y-phase hexagonal ferrite material are particularly suited for high resonant frequency antenna applications.

Additionally, while maintaining the low loss factor, the material having the properties shown in FIG. 11 also maintains a permeability of about 5 to about 6. This is over double to about triple the permeability that is found in typical Y-phase hexagonal ferrite materials.

Accordingly, because of the low loss factor and the high magnetic permeability, embodiments of the Y-phase hexagonal ferrite material having the properties shown with respect to FIG. 11 can be advantageous for use as a magnetodielectric material, such as in a radio frequency antenna.

Processing

Figure 12:
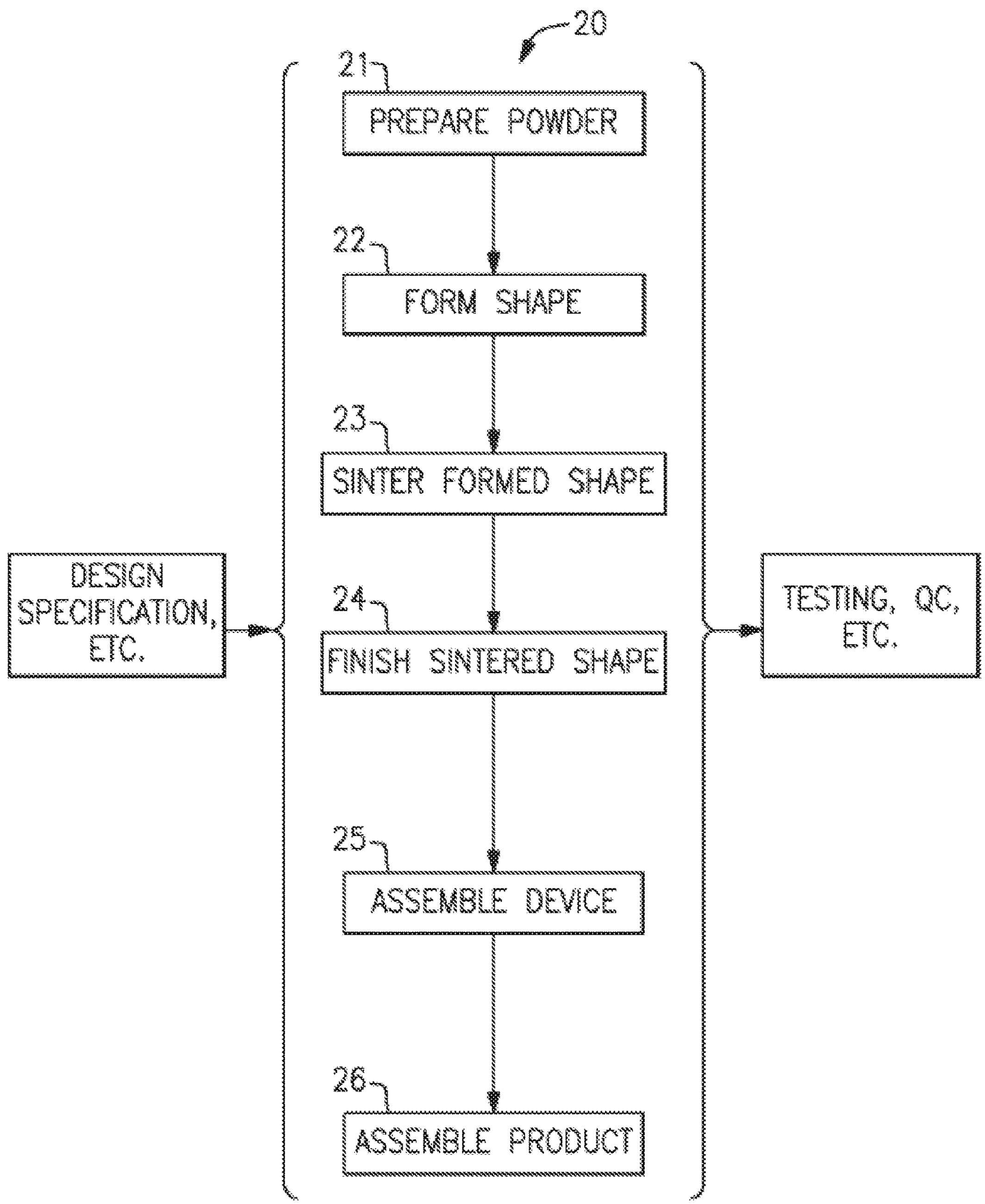
FIG. 12 shows an embodiment of a process that can be implemented to fabricate a ceramic material incorporating embodiments of Y-phase hexagonal ferrite.

FIGS. 12-16 illustrate processes for fabricating ferrite devices, such as radio frequency antennas, using one or more of the embodiments of the hexagonal ferrite materials disclosed herein and having one or more features as described herein. FIG. 12 shows a process 20 that can be implemented to fabricate a ceramic material having one or more of the foregoing properties. In block 21, powder can be prepared. In block 22, a shaped object can be formed from the prepared powder. In block 23, the formed object can be sintered. In block 24, the sintered object can be finished to yield a finished ceramic object having one or more desirable properties.

In implementations where the finished ceramic object is part of a device, the device can be assembled in block 25. In implementations where the device or the finished ceramic object is part of a product, the product can be assembled in block 26.

FIG. 12 further shows that some or all of the steps of the example process 20 can be based on a design, specification, etc. Similarly, some or all of the steps can include or be subjected to testing, quality control, etc.

The powder prepared can include one or more properties as described herein, and/or facilitate formation of ceramic objects having one or more properties as described herein.

Figure 13:
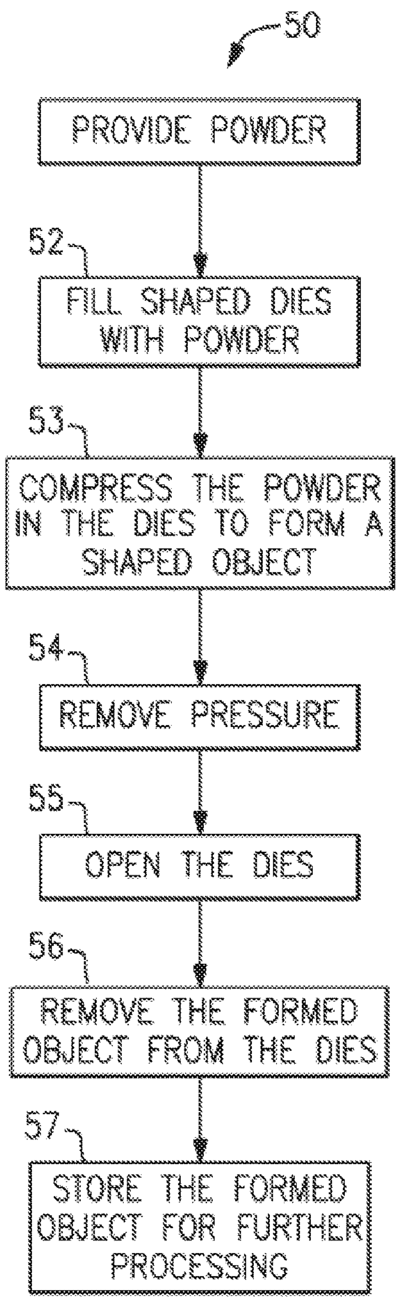
FIG. 13 shows an embodiment of a process that can be implemented to form a shaped object from powder material incorporating embodiments of Y-phase hexagonal ferrite.
Figure 14:
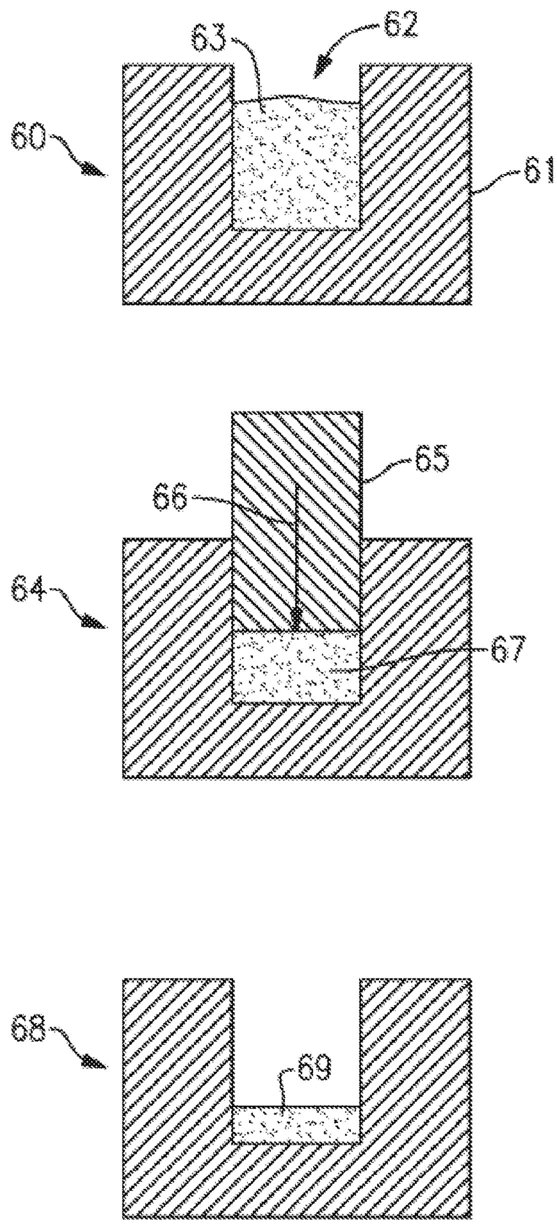
FIG. 14 shows examples of various stages of the process of FIG. 13.
Figure 15:
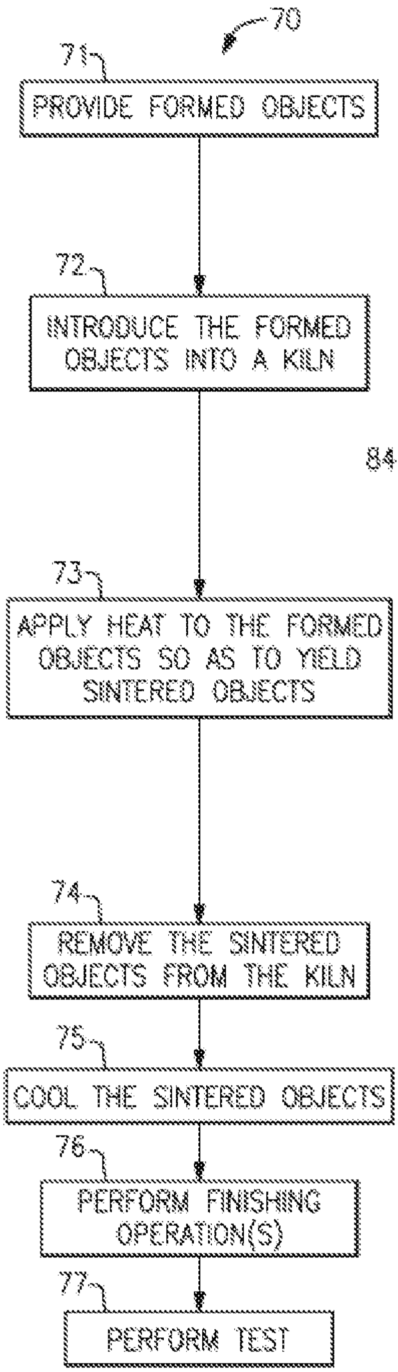
FIG. 15 shows an embodiment of a process that can be implemented to sinter formed objects such as those formed in the example of FIGS. 13 and 14.
Figure 16:
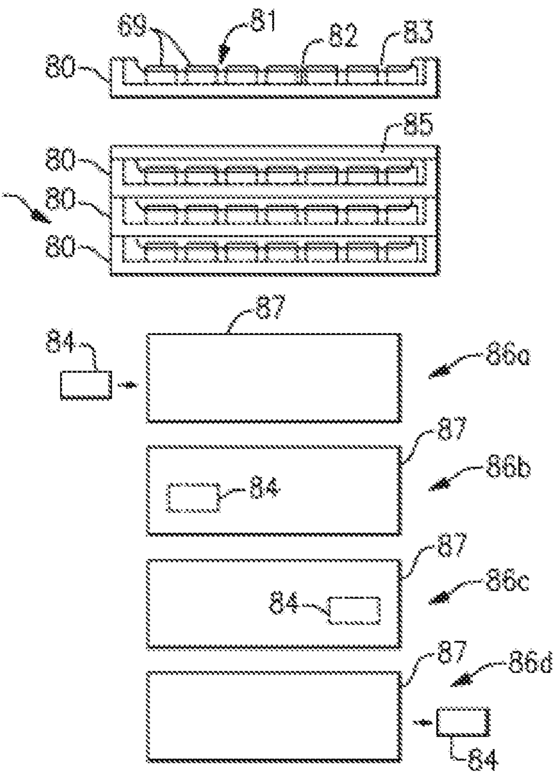
FIG. 16 shows examples of various stages of the process of FIG. 15.

In some implementations, powder prepared as described herein can be formed into different shapes by different forming techniques. By way of examples, FIG. 13 shows a process 50 that can be implemented to press-form a shaped object from a powder material prepared as described herein. In block 52, a shaped die can be filled with a desired amount of the powder. In FIG. 14, configuration 60 shows the shaped die as 61 that defines a volume 62 dimensioned to receive the powder 63 and allow such power to be pressed. In block 53, the powder in the die can be compressed to form a shaped object. Configuration 64 shows the powder in an intermediate compacted form 67 as a piston 65 is pressed (arrow 66) into the volume 62 defined by the die 61. In block 54, pressure can be removed from the die. In block 55, the piston 65 can be removed from the die 61 so as to open the volume 62. Configuration 68 shows the opened volume 62 of the die 61 thereby allowing the formed object 69 to be removed from the die. In block 56, the formed object 69 can be removed from the die 61. In block 57, the formed object can be stored for further processing. Additional forming methods familiar to those skilled in the art include but are not limited to isostatic pressing, tape casting, tape calendaring and extrusion In some implementations, formed objects fabricated as described herein can be sintered to yield desirable physical properties as ceramic devices. FIG. 15 shows a process 70 that can be implemented to sinter such formed objects. In block 71, formed objects can be provided. In block 72, the formed objects can be introduced into a kiln. In FIG. 16, a plurality of formed objects 69 are shown to be loaded into a sintering tray 80. The example tray 80 is shown to define a recess 83 dimensioned to hold the formed objects 69 on a surface 82 so that the upper edge of the tray is higher than the upper portions of the formed objects 69. Such a configuration allows the loaded trays to be stacked during the sintering process. The example tray 80 is further shown to define cutouts 83 at the side walls to allow improved circulation of hot gas at within the recess 83, even when the trays are stacked together. FIG. 16 further shows a stack 84 of a plurality of loaded trays 80. A top cover 85 can be provided so that the objects loaded in the top tray generally experience similar sintering condition as those in lower trays.

In block 73, heat can be applied to the formed objects so as to yield sintered objects, such as antennas. Such application of heat can be achieved by use of a kiln. In block 74, the sintered objects can be removed from the kiln. In FIG. 16, the stack 84 having a plurality of loaded trays is depicted as being introduced into a kiln 87 (stage 86*a*). Such a stack can be moved through the kiln (stages 86*b*, 86*c*) based on a desired time and temperature profile. In stage 86*d*, the stack 84 is depicted as being removed from the kiln so as to be cooled.

In block 75, the sintered objects can be cooled. Such cooling can be based on a desired time and temperature profile. In block 76, the cooled objects can undergo one or more finishing operations. In block 77, one or more tests can be performed.

Heat treatment of various forms of powder and various forms of shaped objects are described herein as calcining, firing, annealing, and/or sintering. It will be understood that such terms may be used interchangeably in some appropriate situations, in context-specific manners, or some combination thereof.

Substitution of Scandium, Silicon, and/or Manganese

For magnetodielectric antenna applications, it can be advantageous to have as high of a magnetic permeability as possible. Having high magnetic permeability can lead to many benefits for magnetodielectric applications, such as improved miniaturization factors, thus leading to smaller overall footprints of components, and impedance matching to free space. Further, it can be advantageous to have high resonant frequencies which can maximize the operating frequencies of the electronic devices that the material is incorporated into.

However, high permeability magnetic oxides which have typically been used for antenna applications in the prior art tend to have low resonance frequencies. The few materials that do have high resonance frequencies usually have low magnetic permeability, making them unsuitable for use in high frequency magnetodielectric applications. For example, $Sr_2Co_2Fe_{12}O_{22}$ (Sr—Co—Y phase) has a resonant frequency well above 1 GHz, but a permeability of only 2.

Previous solutions have been focused on increasing the resonant frequency of Z-phase hexagonal ferrite material (e.g. $Co_2Z$—$Ba_3Co_2Fe_{24}O_{41}$). Specifically, substitutions of alkali metals for the barium ion in $Co_2Z$ have been performed, as disclosed in U.S. Pat. Nos. 8,524,190 and 8,609,062, hereby incorporated by reference in their entireties. While the incorporation of alkali metals for the barium has increased the resonant frequency of the material, the useable frequency of the material may still be lower than desired. So while improvements in resonant frequency have been detailed in the above disclosure, they may not have significantly extended the useable frequency range for $Co_2Z$ materials.

Accordingly, disclosed herein are embodiments of a Y-phase strontium hexagonal ferrite material ($Co_2Y$) that can have both high magnetic permeability as well as high resonance frequencies, thus making the material advantageous for use in high frequency antenna applications.

In some embodiments, permeability can be doubled or tripled from the typical values using coupled substitution of an Sr—Co—Y phase hexagonal ferrite material. Further, the resonant frequency of the Y-phase hexagonal ferrite materials, relative to the Z-phase materials, can increase into the range of about 500 MHz to about 1 GHz, allowing for the material to be used for high frequency applications.

In some embodiments, an example Y-phase hexagonal ferrite that can be used for high frequency antenna components can have the equation:

$$Sr_{2-x}K_xCo_{2-x}M_xFe_{12}O_{22} \text{ or } Sr_{2-x}Na_xCo_{2-x}M_xFe_2O_{22}$$

where M is scandium or indium ($Sc^{3+}$ or $In^{3+}$). When scandium or indium is substituted for cobalt, this can lead to increased magnetic permeability. Most likely, this occurs because the cobalt, scandium, and indium all have a relatively similar ionic size according to their respective Shannon-Prewitt effective ionic radii. Cobalt has an ionic size of 0.885 angstroms while scandium and indium have ionic sizes of 0.885 angstroms and 0.94 angstroms, respectively. Accordingly, when these elements are substituted into the crystal structure of the $Co_2Y$ material, minimal deformation to the crystal structure is likely to occur. In fact, the scandium and cobalt have almost identical sizes.

Following the above equation, in some embodiments silica and/or aluminum can further be incorporated into a Sr—Co—Y or the Sc and Na co-substituted hexagonal ferrite material, thereby generally increasing the resonant frequency and permeability of the hexagonal ferrite material, providing for advantageous properties for radio frequency components. For example, in some embodiments, $Al^{3+}$ can be substituted in for $Fe^{3+}$, thereby adjusting the $Sr_2Co_2Fe_{12}O_{22}$ lattice.

In some embodiments, the composition can be $Sr_2Co_2Fe_{12-y}Al_yO_{22}$ or $Sr_{2-x}(K, Na)_xCo_{2-x}M_xFe_{12-y}Al_yO_{22}$ where M is scandium or indium ($Sc^{3+}$ or $In^{3+}$).

Further, silicon can be added into the $Sr_2Co_2Fe_{12}O_{22}$, $Sr_{2-x}(K, Na)_xCo_{2-x}M_xFe_{12}O_{22}$ or $Sr_{2-x}(K, Na)_xCo_{2-x}M_xFe_{12-y}Al_yO_{22}$ where M is scandium or indium ($Sc^{3+}$ or $In^{3+}$) to adjust the magnetic properties of the hexagonal ferrite material. For example, Si additions can act as a grain growth inhibitor and therefore be segregated at the grain boundaries, which can reduce magnetorestriction effects in sintered materials.

Moreover, $Mn^{3+}$ can be added into the hexagonal ferrite material to prevent $Fe^{3+}$ reduction, and thus improve the dielectric loss.

In some embodiments, silicon can be located in the grain boundaries of the crystal structure, while manganese and aluminum can be incorporated into the crystal structure, those this configuration is not limiting.

In some embodiments, the composition can be $Sr_2Co_2Fe_{12-y}Mn_yO_{22}$, $Sr_{2-x}K_xCo_{2-x}M_xFe_{12-y}Mn_yO_{22}$, or $Sr_{2-x}K_xCo_{2-x}M_xFe_{12-y-z}Mn_yAl_zO_{22}$ where M is scandium or indium ($Sc^{3+}$ or $In^{3+}$).

Figure 17:
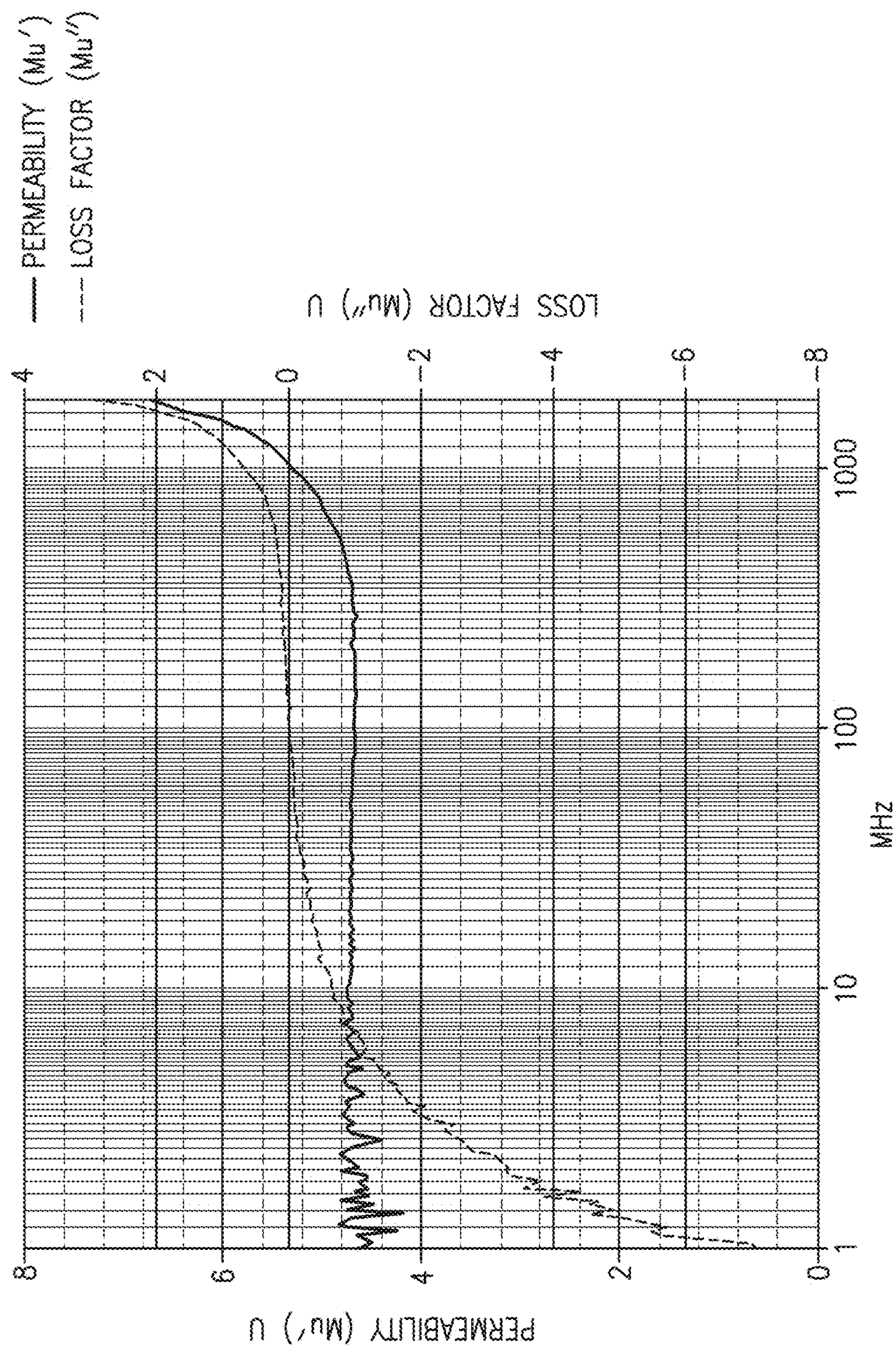
FIG. 17 illustrates permeability and loss factor v. frequency for an embodiment of a Y-phase hexagonal ferrite.
Figure 18:
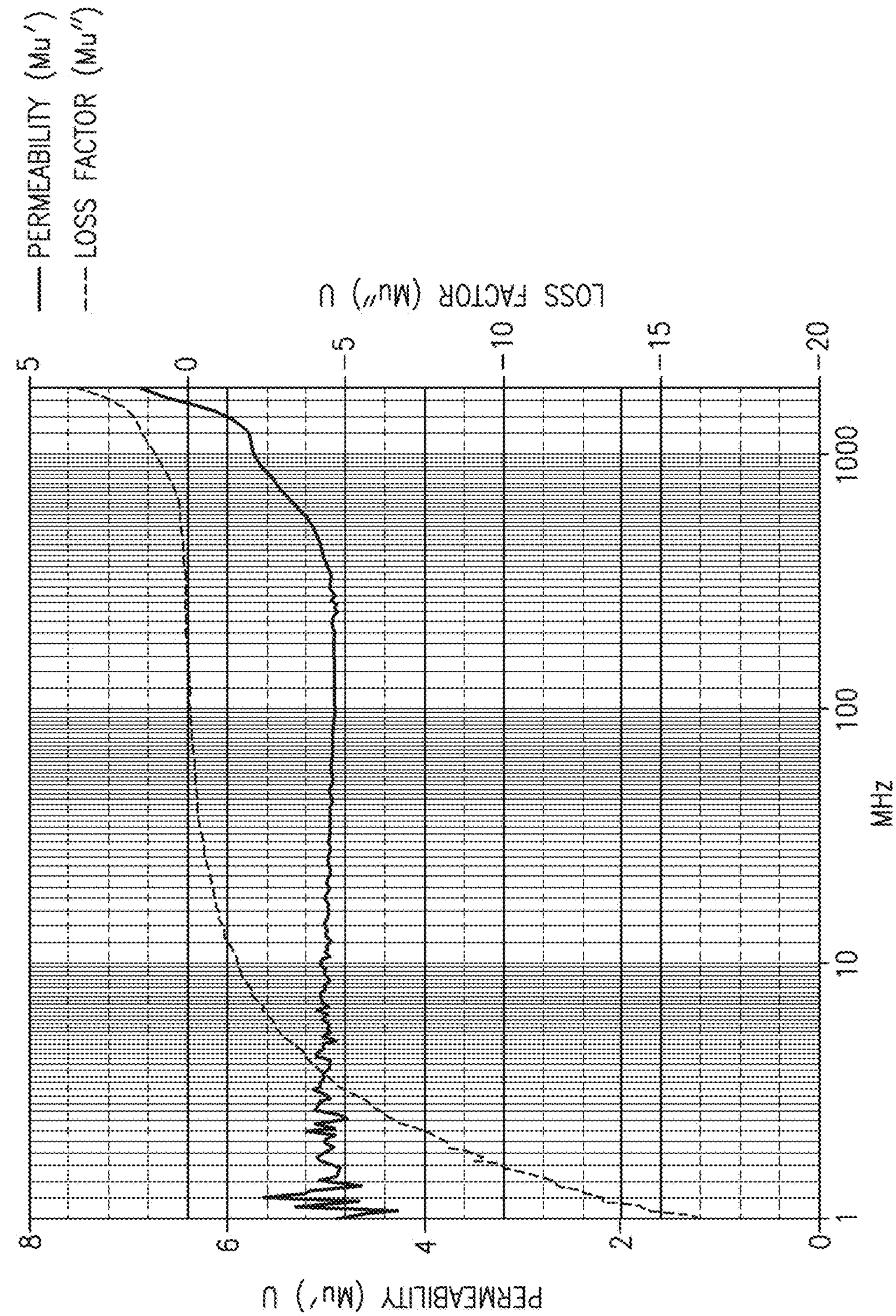
FIG. 18 illustrates permeability and loss factor v. frequency for an embodiment of a Y-phase hexagonal ferrite.

FIGS. 17-18 show impedance spectra using the above disclosed substitution technique. Typically, the impedance spectra is performed using dielectric spectroscopy, also known as impedance spectroscopy or electrochemical impedance spectroscopy. The impedance spectra can show the different dielectric properties of a medium as a function of different frequencies. Specifically, FIGS. 17-18 illustrate two different compositions of a Y-phase hexagonal ferrite including Sc, Al, Si, and Mn.

In FIGS. 17-18, the impedance spectra shows both permeability (μ') as well as loss factor (μ") across a range of frequencies. It can be advantageous for magnetodielectric materials used in radio frequency applications to have a minimal change in properties across the range of frequencies, and in particular a minimal μ" and therefore a minimal loss tangent at those particular frequencies. When the loss tangent begins to increase or spike, the material would become unsuitable for antenna applications.

Along with minimizing the loss tangent spike, it can be advantageous to adjust the spike in loss tangent to as high a frequency as possible. As mentioned, at a frequency where the loss tangent spikes, the material becomes less useful at that frequency. So having a loss tangent spike at higher frequencies means that the material can be used at higher frequencies with minimized loss.

FIG. 17 shows an embodiment of the above composition where x=0.3 and including Sc, thus forming $Sr_{1.7}Na_{0.3}Co_{1.7}Sc_{0.3}Fe_{11.5}Al_{0.5}O_{22}$. As shown, the loss tangent of the composition can be relatively minimized until higher resonant frequency spectrums. For example, the permeability of the material is approximately 5 up through over 500 MHz. While at this point the μ" (loss factor) and the loss tangent begins to steadily increase, the low μ" and loss tangent is retained even up to 1 GHz. This is a high permeability and low loss factor for such high frequencies, and shows that embodiments of the disclosed material is advantageous for high frequency applications.

FIG. 18 shows an embodiment of the above composition where x=0.4 and including Sc, thus forming $Sr_{1.6}Na_{0.4}Co_{1.6}Sc_{0.4}Fe_{11.5}Al_{0.5}O_{22}$. As shown, the loss tangent of the composition can be relatively minimized until higher resonant frequency spectrums. For example, the permeability of the material is approximately 5 up through over 500 MHz. While at this point the μ" (loss factor) and the loss tangent begins to steadily increase, the low μ" and loss tangent is retained even up to 1 GHz. This is a high permeability and low loss factor for such high frequencies, and shows that embodiments of the disclosed material is advantageous for high frequency applications.

Incorporation of Stoichiometric Oxides

While the disclosure above shows one method for improving the magnetic properties of a Y-phase hexagonal ferrite materials, improvements can also be made into the hexagonal ferrite material by incorporating second phase oxides into the hexagonal ferrite material. These second phase oxides can either dissolve into the main hexagonal phase structure, making it non-stoichiometric or may be incorporated into the ceramic as second phases. This incorporation can be done with, or without, the other methods for improving magnetic properties disclosed otherwise herein.

In some embodiments, oxides consistent with the stoichiometry of Z-Phase $Sr_3Co_2Fe_{24}O_{41}$ can be incorporated into embodiments of a Y-phase hexagonal ferrite material to improve certain magnetic properties of the material. Additionally, $CoFe_2O_4$ (with the spinel structure) or $SrFe_{12}O_{19}$ (with the magnetoplumbite structure) can be added to the Y-phase hexagonal ferrite material and may either dissolve in the Y-phase making it non-stoichiometric or exist as distinct second phases within the ceramic body. However, other oxides can be used as well and the specific oxide incorporated into the material is not limiting.

In some embodiments, the oxides can be incorporated into a specific Y-phase hexagonal ferrite composition. For example, these compounds can be incorporated into a structure of $Sr_{1.6}Na_{0.4}Co_{1.6}Sc_{0.4}Fe_{12}O_{22}$ to form a hexagonal ferrite material having improved properties. However, other compositions of Y-phase hexagonal ferrite can be used, and the type of Y-phase hexagonal ferrite in which the oxide is incorporated into is not limiting. These oxide additions can be advantageous as they can improve at least some of the magnetodielectric properties discussed above. Further, by the improved magnetic properties achieved through these additions, a number of compositions which can be used to synthesize magnetodielectric antenna materials can be used.

In some embodiments, a combination of $Sr_{1.6}Na_{0.4}Co_{1.6}Sc_{0.4}Fe_{12}O_{22}$ with 2 wt. % $Sr_3Co_2Fe_{24}O_{41}$ can lead to excellent properties for use as a magnetodielectric antenna material. For example, FIG. 1 shows Mu' (permeability) and magnetic Q data compared to a frequency applied to the hexagonal ferrite material. Therefore, the composition shows excellent properties even with the addition of the Z phase ($Sr_3Co_2Fe_{24}O_{41}$) material with a different stoichiometry than the base Y phase composition ($Sr_{1.6}Na_{0.4}Co_{1.6}Sc_{0.4}Fe_{11}O_{22}$).

As shown in FIG. 1, the Q factor of an embodiment of the disclosed Y-phase hexagonal ferrite material is extremely high at low frequency values. However, it is advantageous for the material to maintain high Q factor values even at higher frequencies, such as those between 500 MHz and 1 GHz or above. Embodiments of the disclosed material are able to maintain relatively high Q factors even at these high frequencies. While Q values do decrease as the applied frequency increases, the drop is not drastic. Accordingly, the embodiments of the disclosed hexagonal ferrite material still achieve high Q values at high frequencies.

For example, embodiments of the hexagonal ferrite material have a Q value of greater than about 20 at 800 MHz. Further, embodiments of the hexagonal ferrite material have a Q value of greater than about 15 at 1 GHz. Therefore, embodiments of the disclosed Y-phase hexagonal ferrite material can be used in higher frequency applications than are possible with current bulk materials.

Moreover, as shown in FIG. 1, the hexagonal ferrite material can maintain a high permeability throughout its frequency ranges even while having the high Q factor discussed above. As shown, the hexagonal ferrite material maintains a relatively even permeability, μ' of about 6, 7, or 8 through 800 MHz to 1 GHz. This permeability level is significantly higher than the typical permeability value of 2 for a basic Y-phase hexagonal ferrite structure. In fact, embodiments of the disclosed Y-phase hexagonal ferrite values can achieve permeability levels of 2 to 3 times that of standard Y-phase hexagonal ferrite materials at high frequencies. Accordingly, embodiments of the disclosed hexagonal ferrite material can achieve high Q values while also maintaining high permeability, thus making them advantageous for use in magnetodielectric antennas at frequencies between 500 MHz and 1 GHz.

Further, embodiments of the hexagonal ferrite material can have a dielectric constant (e.g., permittivity) of approximately 10-11. The relatively high permeability gives these materials a better impedance match to free space than $Sr_2Co_2Fe_{12}O_{22}$. Recall that when $\mu_r = \varepsilon_r$, there is a perfect impedance match to free space.

Table I illustrates magnetic permeability spectra of embodiments of substituted Sr—Co—Y phase hexagonal ferrites, such as using the methods described in detail above.

TABLE I

Magnetic Permeability Spectra

| | Sample (all added percents by weight) | | | | | | | | |
|---|---|---|---|---|---|---|---|---|---|
| | 500 MHz μ' | 500 MHz μ'' | 500 MHz Q | 750 MHz μ' | 750 MHz μ'' | 750 MHz Q | 1 GHz μ' | 1 GHz μ'' | 1 GHz Q |
| $Sr_2Co_2Fe_{12}O_{22}$ | 2.34 | .108 | 21.7 | 2.35 | .145 | 16.2 | 2.37 | .190 | 12.5 |
| $Sr_2Co_2Fe_{12}O_{22}$ + 0.1% $K_2CO_3$ | 2.47 | .050 | 49.4 | 2.53 | .072 | 35.1 | 2.60 | .091 | 28.6 |
| $Sr_{1.75}K_{0.25}Co_{1.75}Sc_{0.25}Fe_{12}O_{22}$ | 3.82 | .167 | 22.9 | 3.93 | .242 | 16.2 | 4.10 | .359 | 11.4 |
| $Sr_{1.5}K_{0.5}Co_{1.5}Sc_{0.5}Fe_{12}O_{22}$ | 3.28 | .148 | 22.2 | 3.42 | .233 | 14.7 | 3.63 | .411 | 8.83 |
| $Sr_{1.75}K_{0.25}Co_{1.75}In_{0.25}Fe_{12}O_{22}$ | 3.08 | .138 | 22.3 | 3.19 | .188 | 17.0 | 3.37 | .298 | 11.3 |
| $Sr_{1.5}K_{0.5}Co_{1.5}In_{0.5}Fe_{12}O_{22}$ | 4.64 | .204 | 22.7 | 5.21 | .540 | 9.65 | 5.92 | 1.61 | 3.68 |
| $Sr_{1.75}Na_{0.25}Co_{1.75}Sc_{0.25}Fe_{12}O_{22}$ | 5.12 | .181 | 28.3 | 5.31 | .285 | 18.6 | 5.66 | .421 | 13.4 |
| $Sr_{1.0}Na_{0.4}Co_{1.6}Sc_{0.4}Fe_{12}O_{22}$ | 6.12 | .227 | 27.0 | 6.42 | .356 | 18.0 | 6.92 | .531 | 13.0 |
| $Sr_{1.5}Na_{0.5}Co_{1.5}Sc_{0.5}Fe_{12}O_{22}$ | 5.23 | .179 | 29.2 | 5.44 | .266 | 20.5 | 5.91 | .401 | 14.7 |
| $Sr_{1.75}Na_{0.25}Co_{1.75}In_{0.25}Fe_{12}O_{22}$ | 1.67 | .034 | 49.1 | 1.68 | .046 | 36.5 | 1.70 | .056 | 30.4 |
| $Sr_{1.5}Na_{0.5}Co_{1.5}In_{0.5}Fe_{12}O_{22}$ | 1.83 | .025 | 73.2 | 1.83 | .056 | 32.7 | 1.85 | .064 | 28.9 |
| $Sr_{1.7}Na_{0.3}Co_{1.7}Sc_{0.3}Fe_{12}O_{22}$ + 0.5% $Al_2O_3$, 0.2% $MnO_2$ and 0.2% $SiO_2$ | 4.81 | .198 | 24.3 | 5.05 | .401 | 12.6 | 5.35 | .711 | 7.52 |
| $Sr_{1.6}Na_{0.4}Co_{1.6}Sc_{0.4}Fe_{12}O_{22}$ + 0.5% $Al_2O_3$, 0.2% $MnO_2$ and 0.2% $SiO_2$ | 5.11 | .183 | 27.9 | 5.48 | .482 | 11.4 | 5.74 | 1.04 | 5.52 |
| $Sr_{1.6}Na_{0.4}Co_{1.6}Sc_{0.4}Fe_{12}O_{22}$ + 2.0% $Sr_3Co_2Fe_{24}O_{41}$ | 6.17 | .185 | 33.4 | 6.47 | .275 | 23.5 | 6.95 | .442 | 15.72 |

Figure 19A:
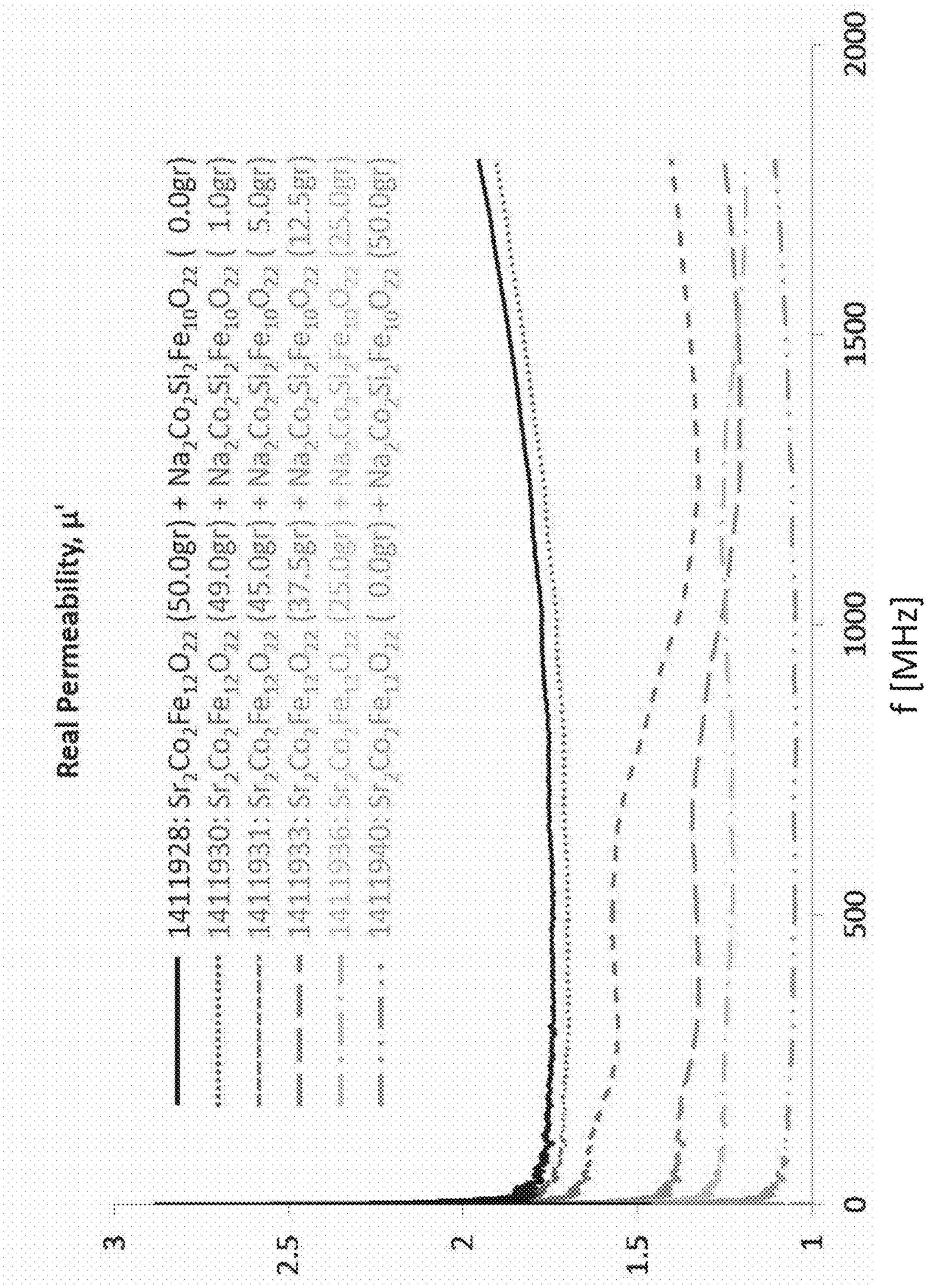
FIGS. 19A-100C illustrate the electrical properties v. frequency for embodiments of Y-phase hexagonal ferrites.

FIGS. 19A-100C illustrate the properties of Y phase hexaferrites based upon the $Sr_2Co_2Fe_{12}O_{22}$ material structure, but modified by the addition or substitution of various ones of the constituent elements.

Figure 19B:
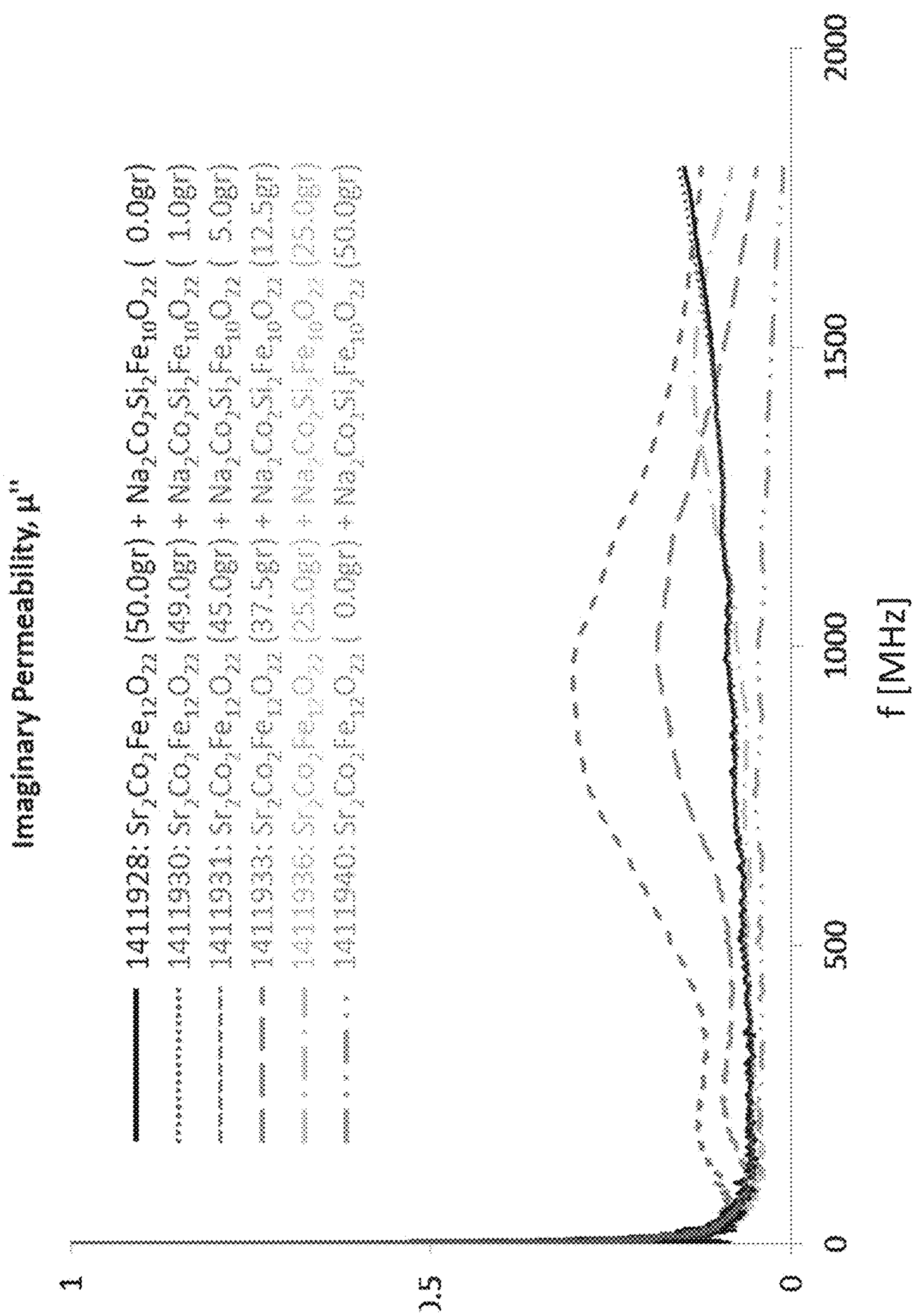
Figure 19C:
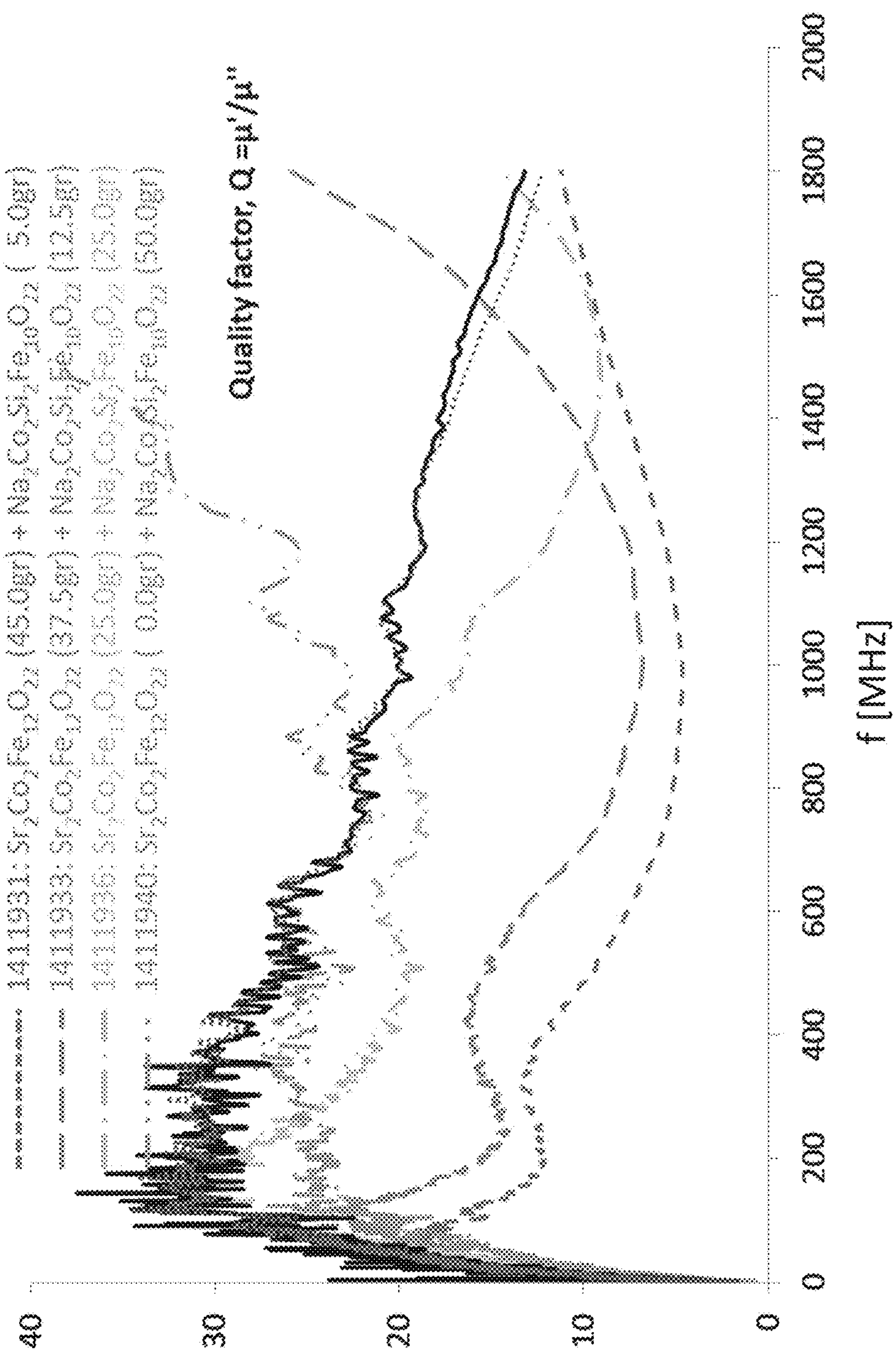
Figure 20A:
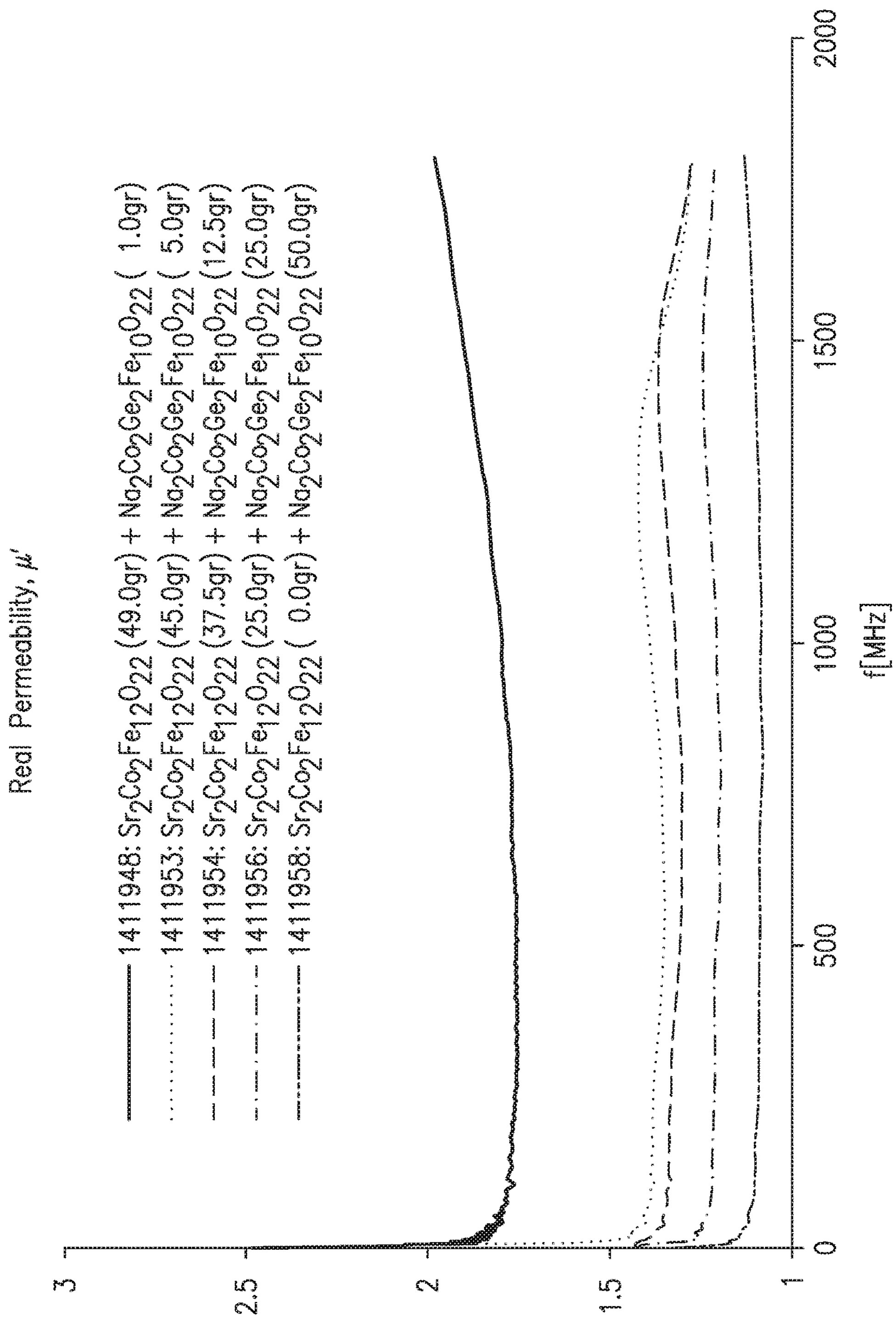
Figure 20B:
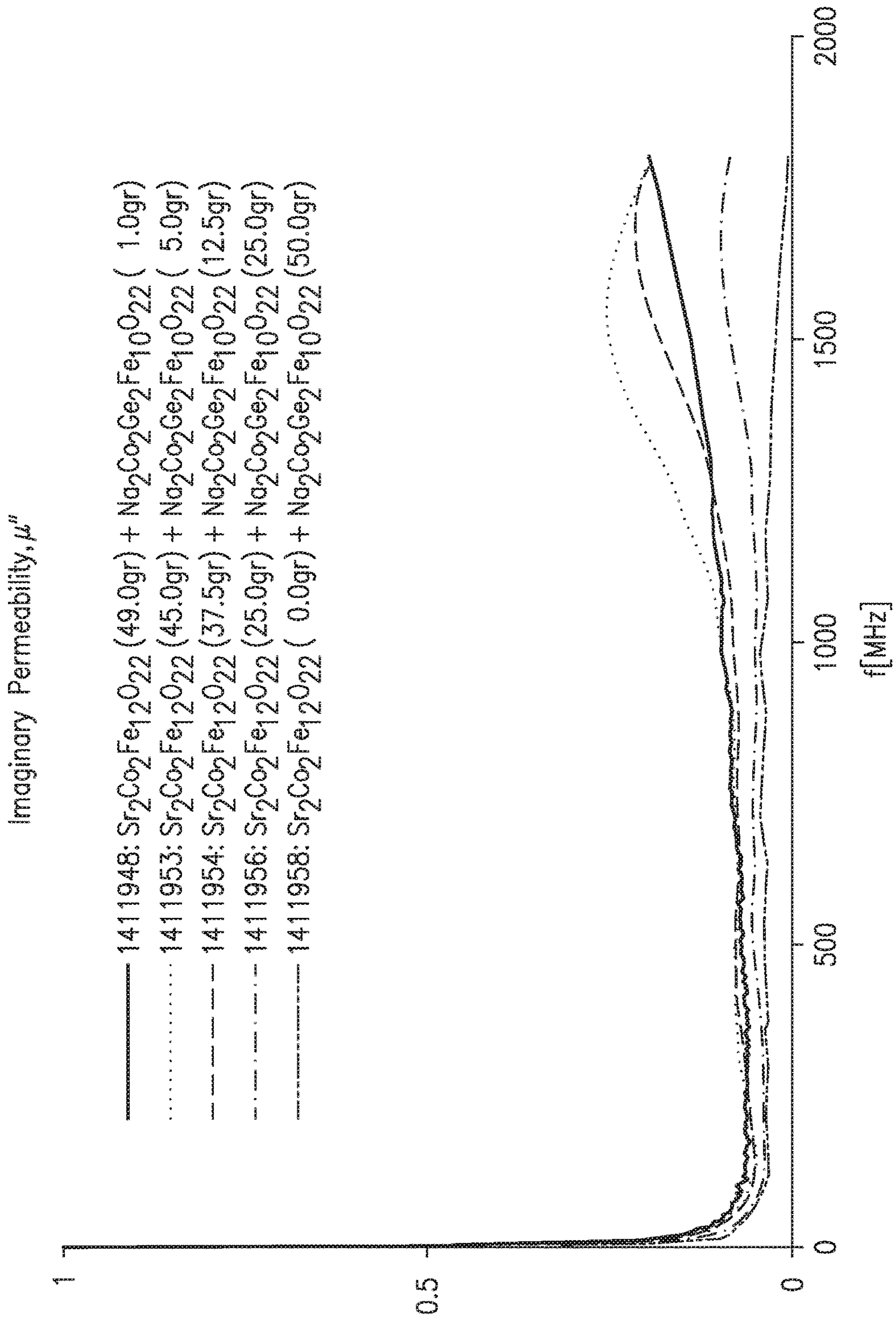
Figure 20C:
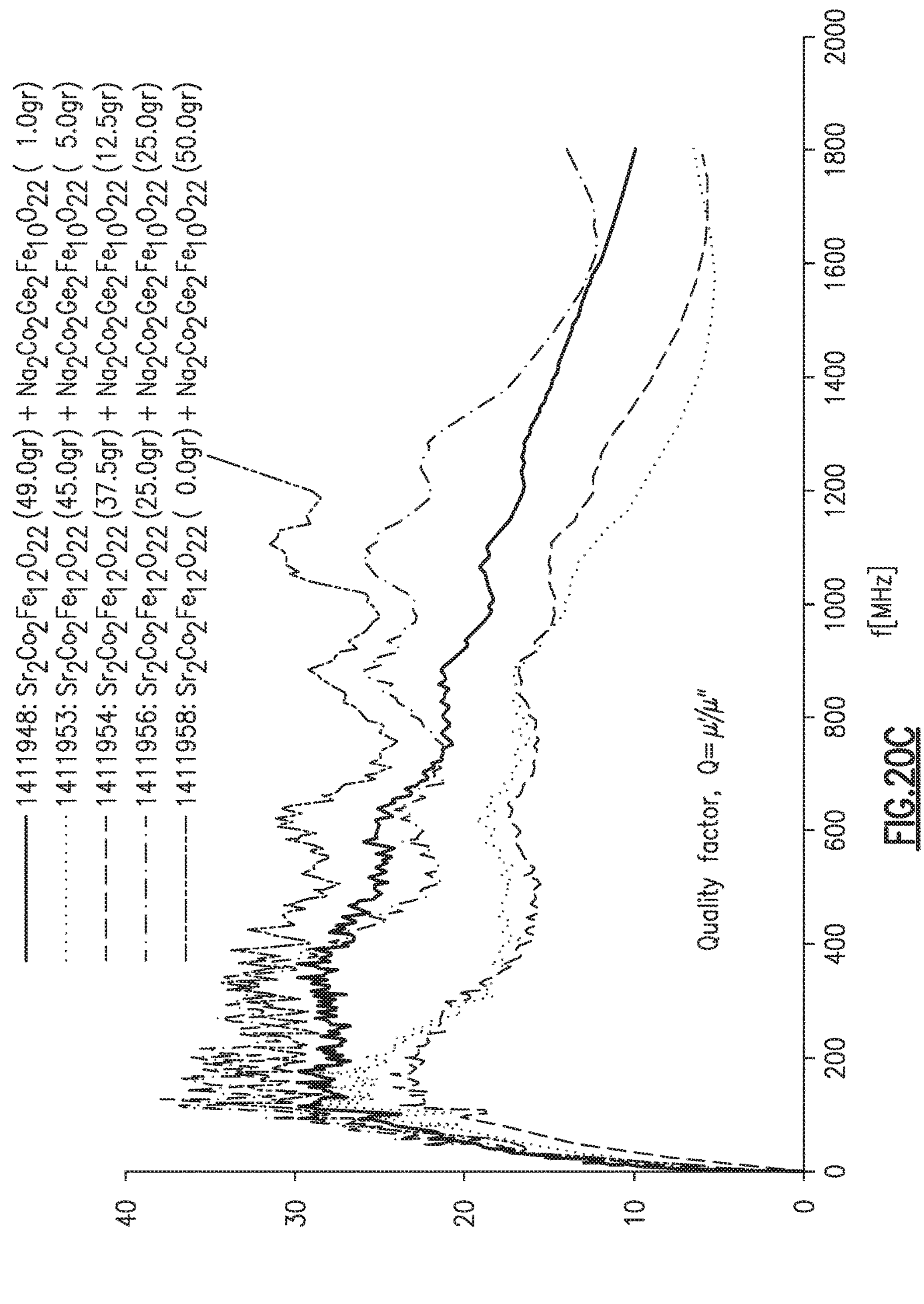
Figure 21A:
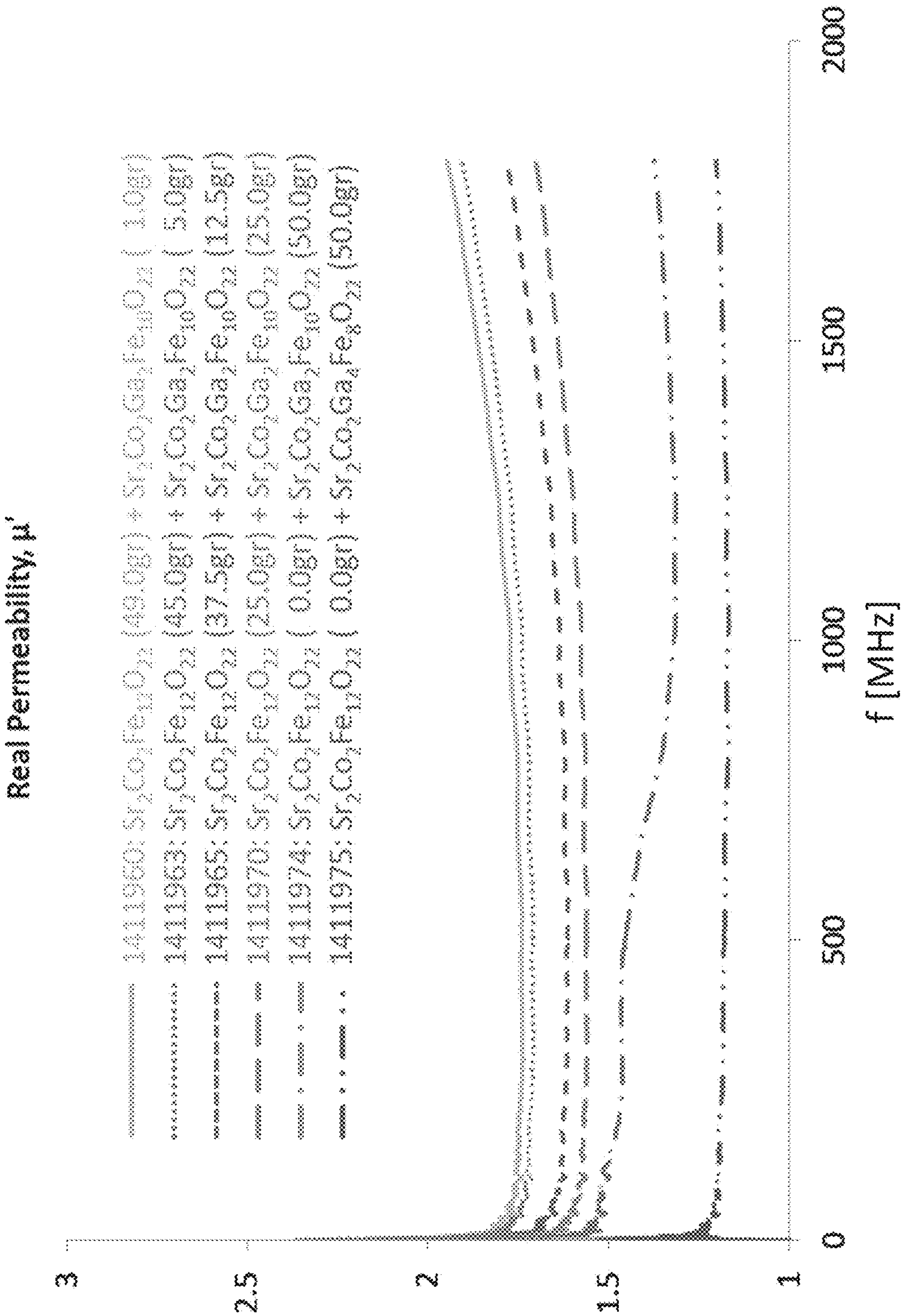
Figure 21B:
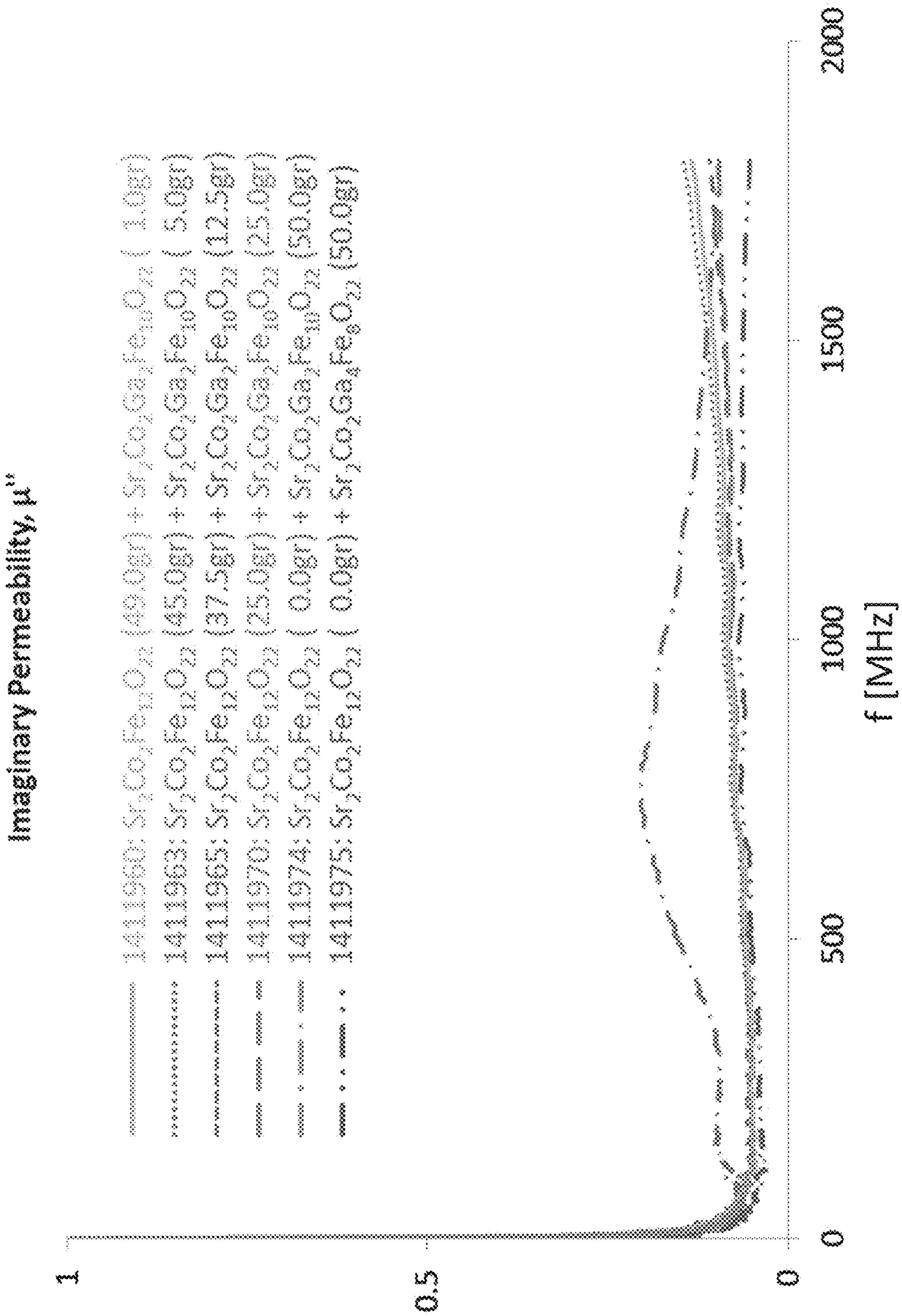
Figure 21C:
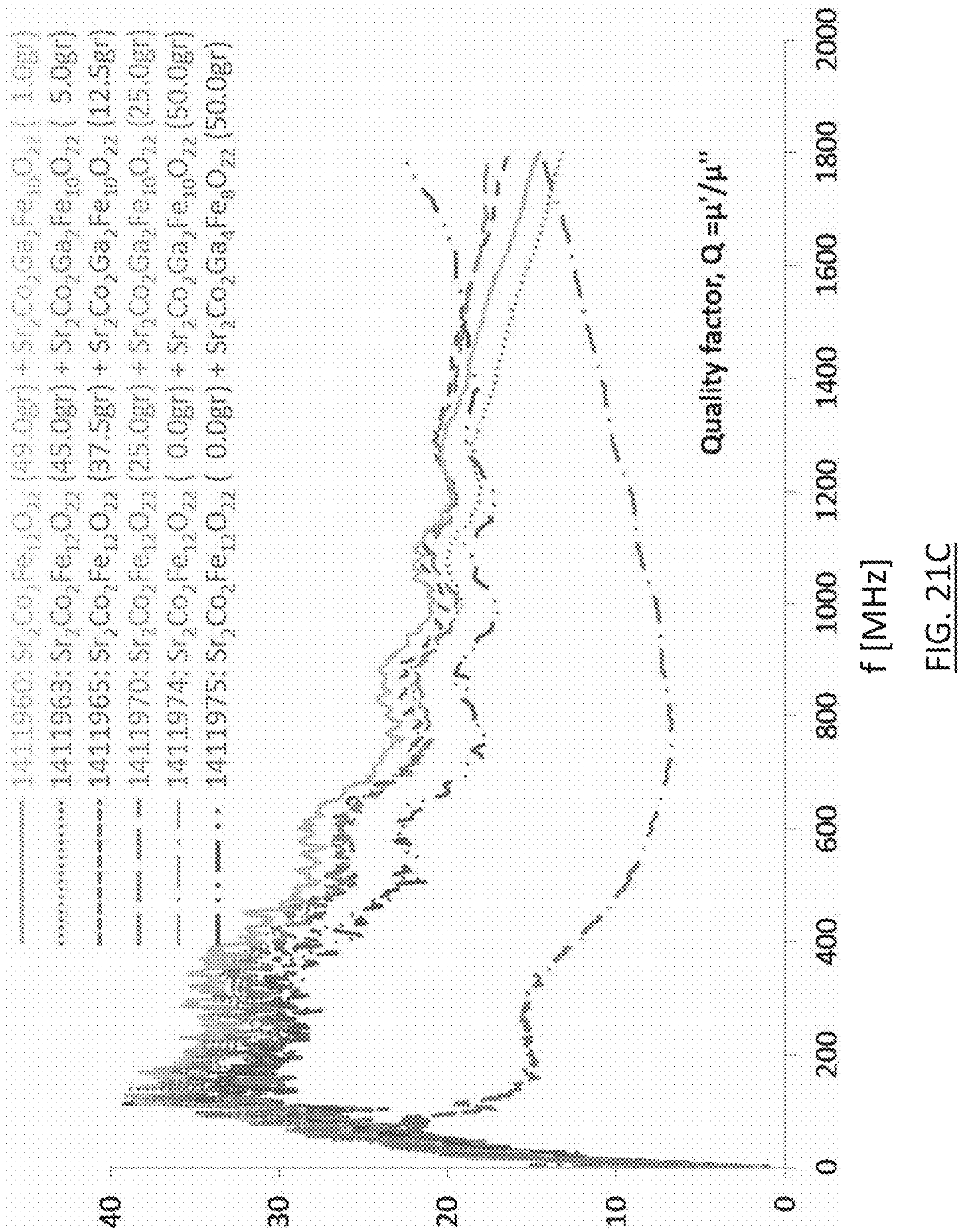
Figure 22A:
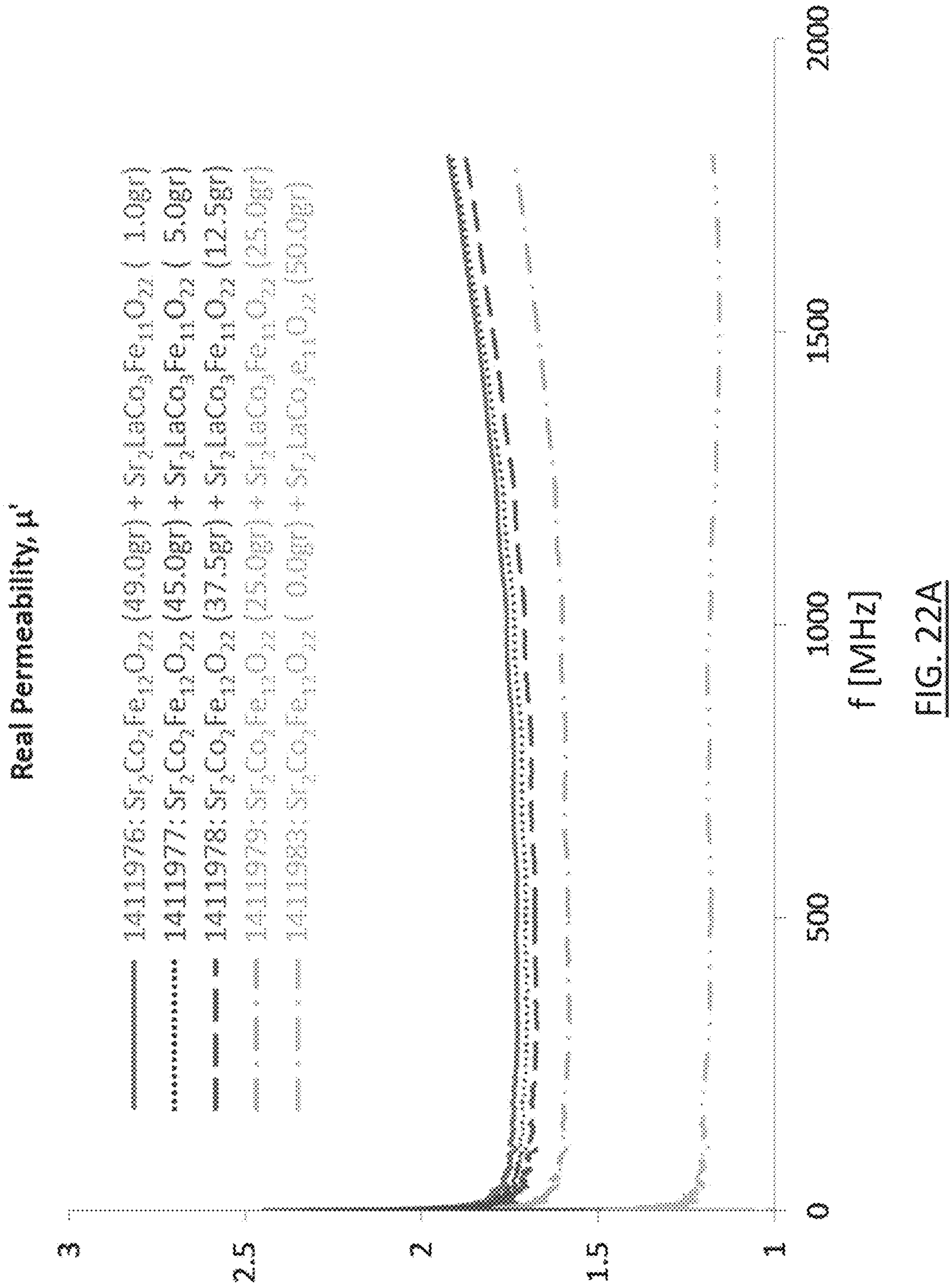
Figure 22B:
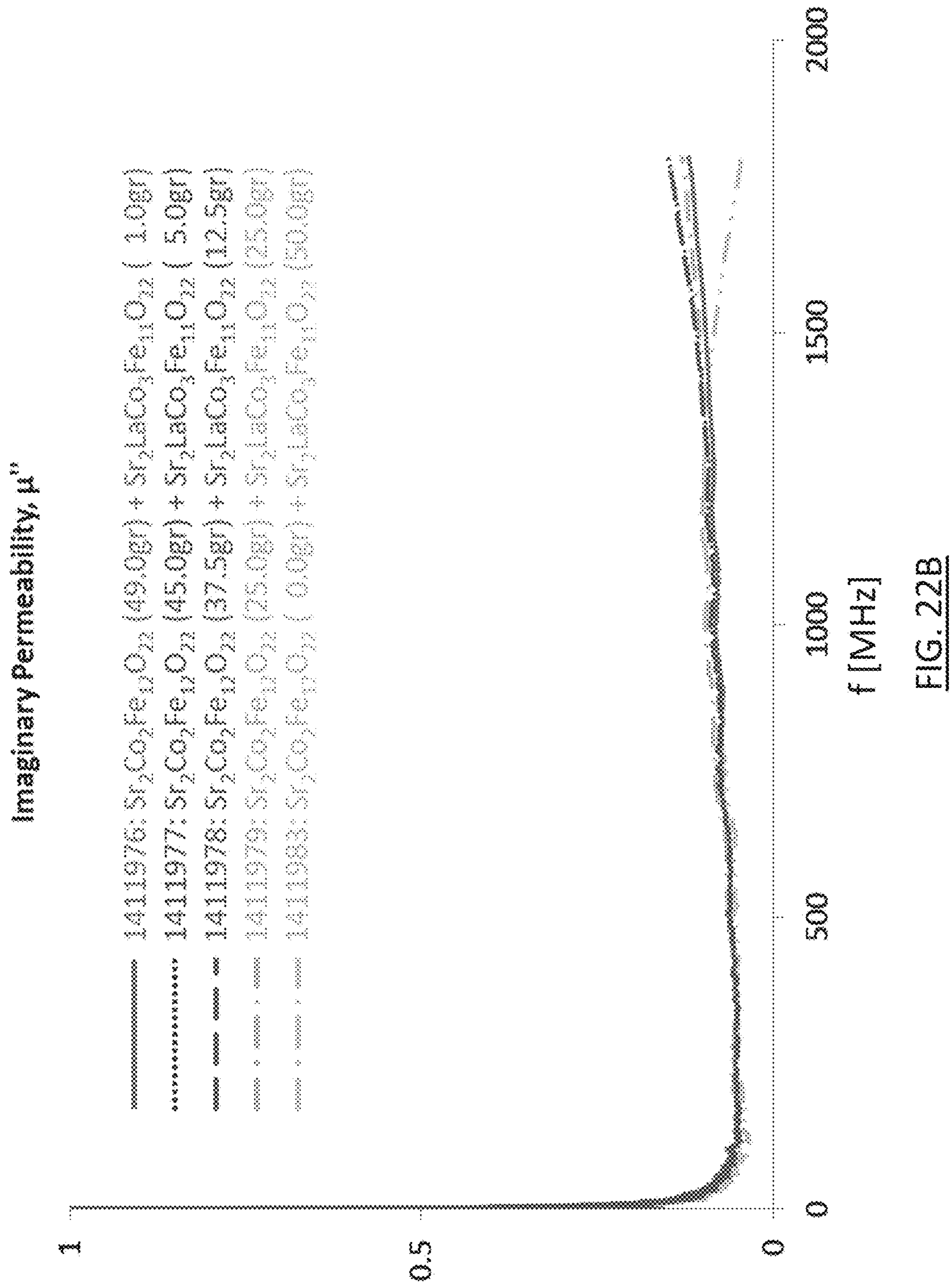
Figure 22C:
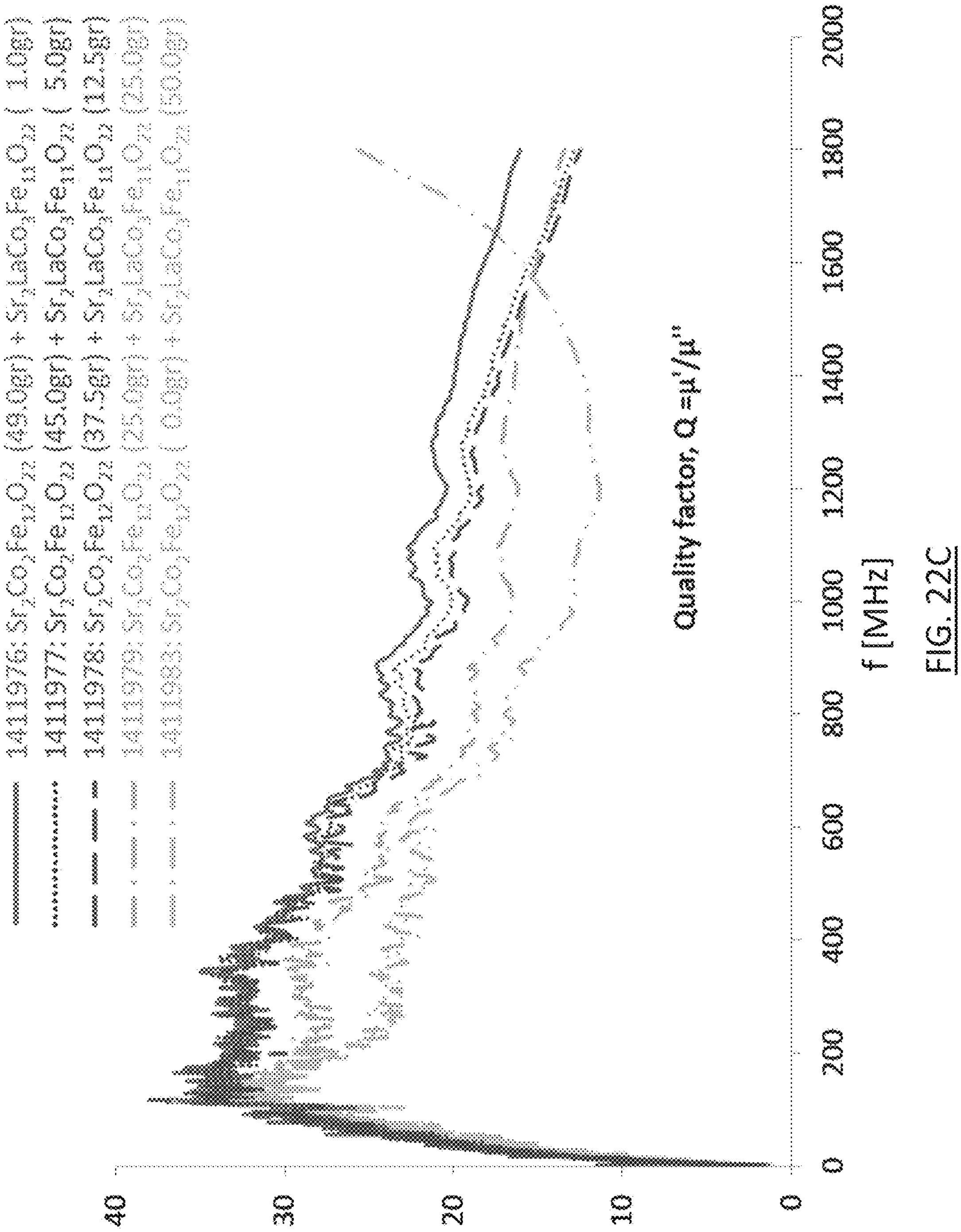
Figure 23A:
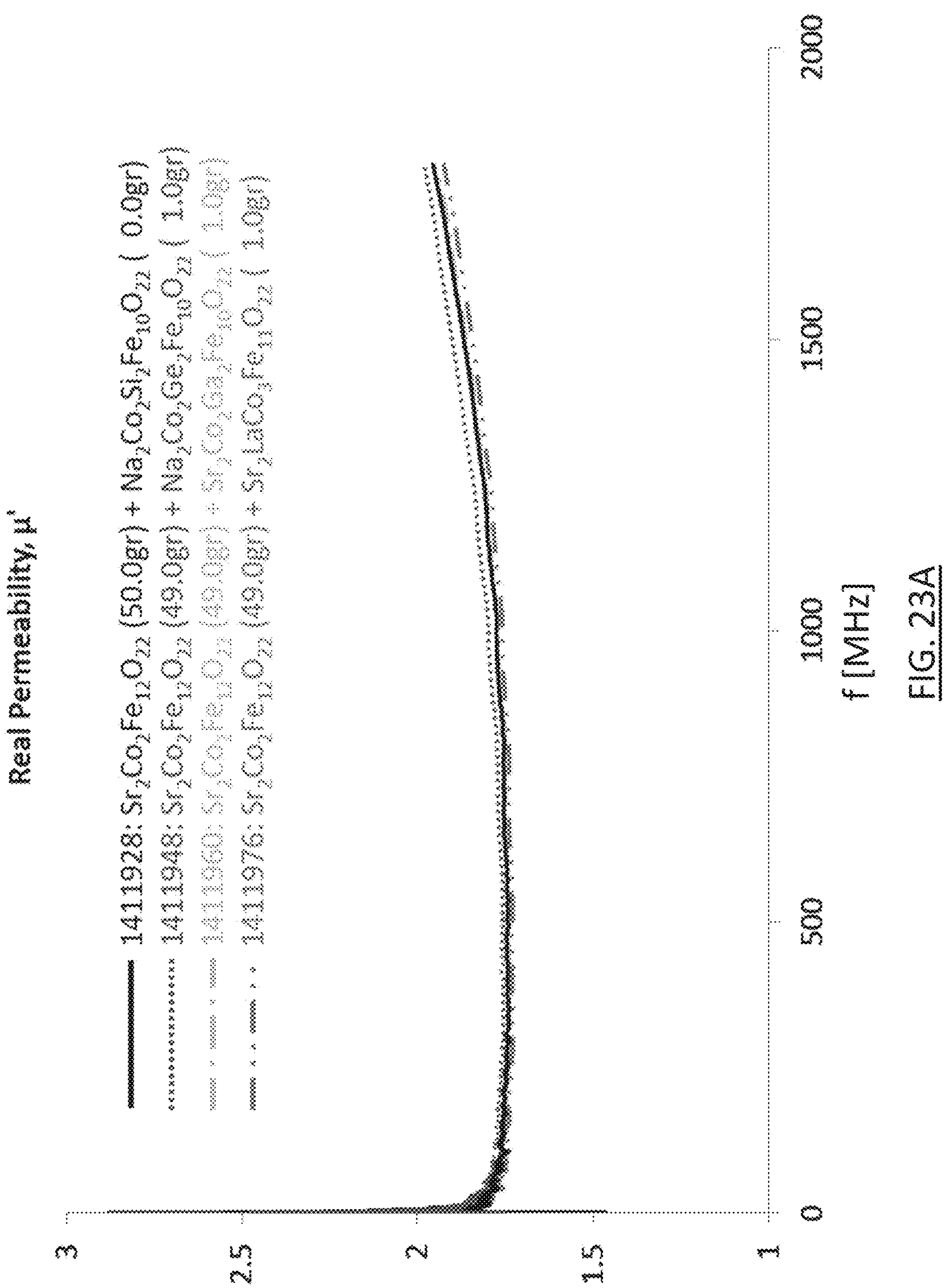
Figure 23B:
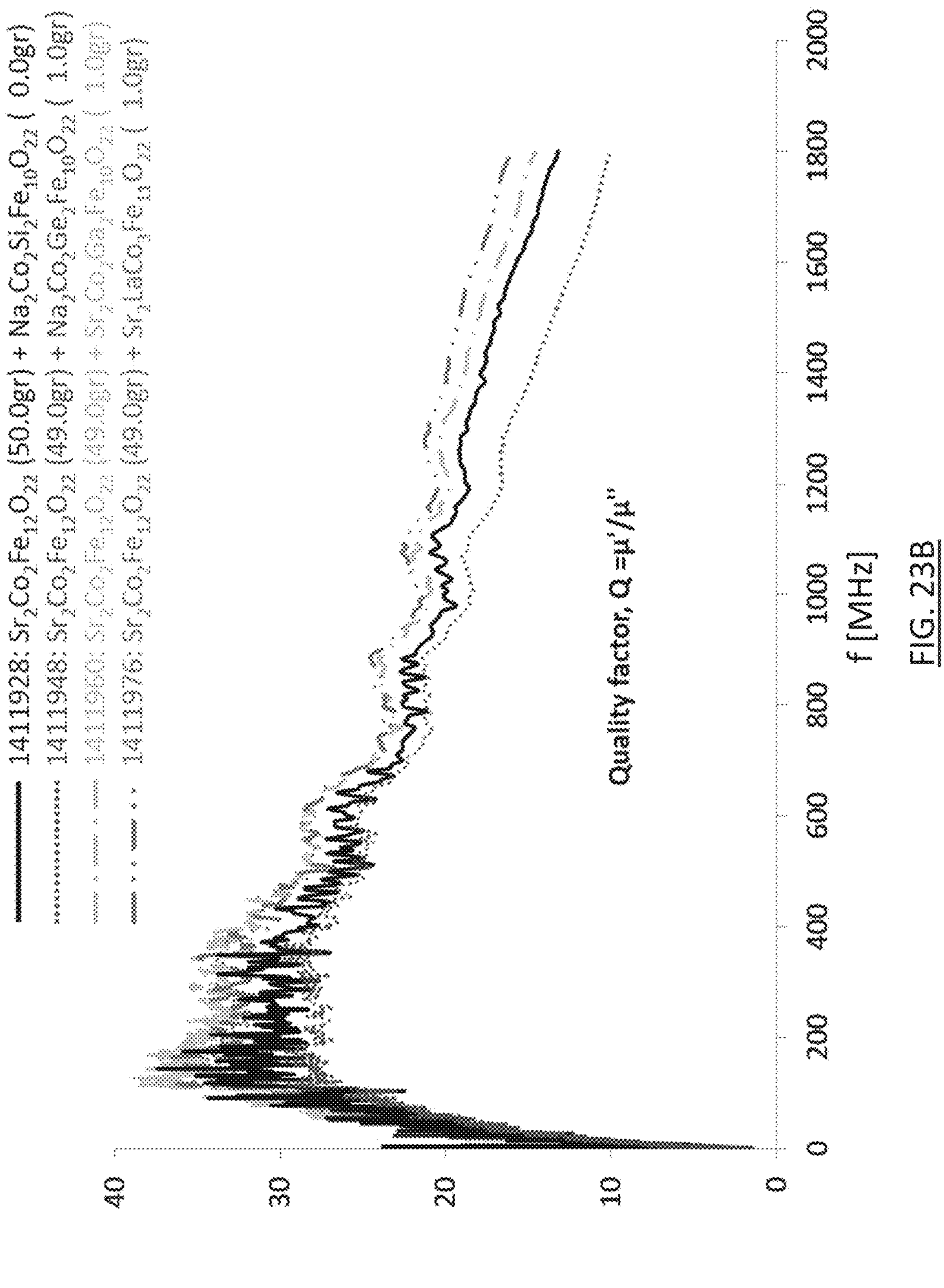
Figure 24A:
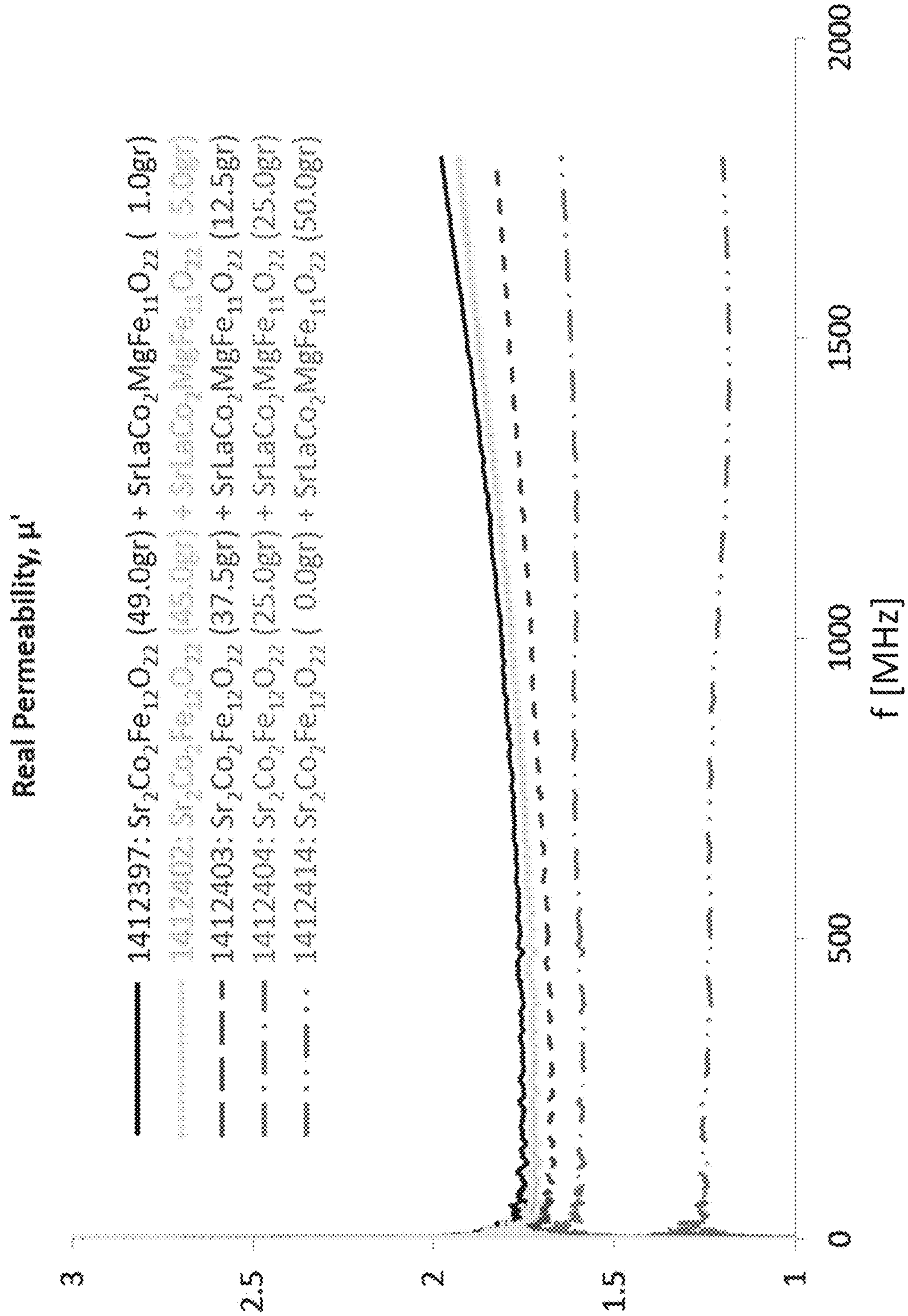
Figure 24B:
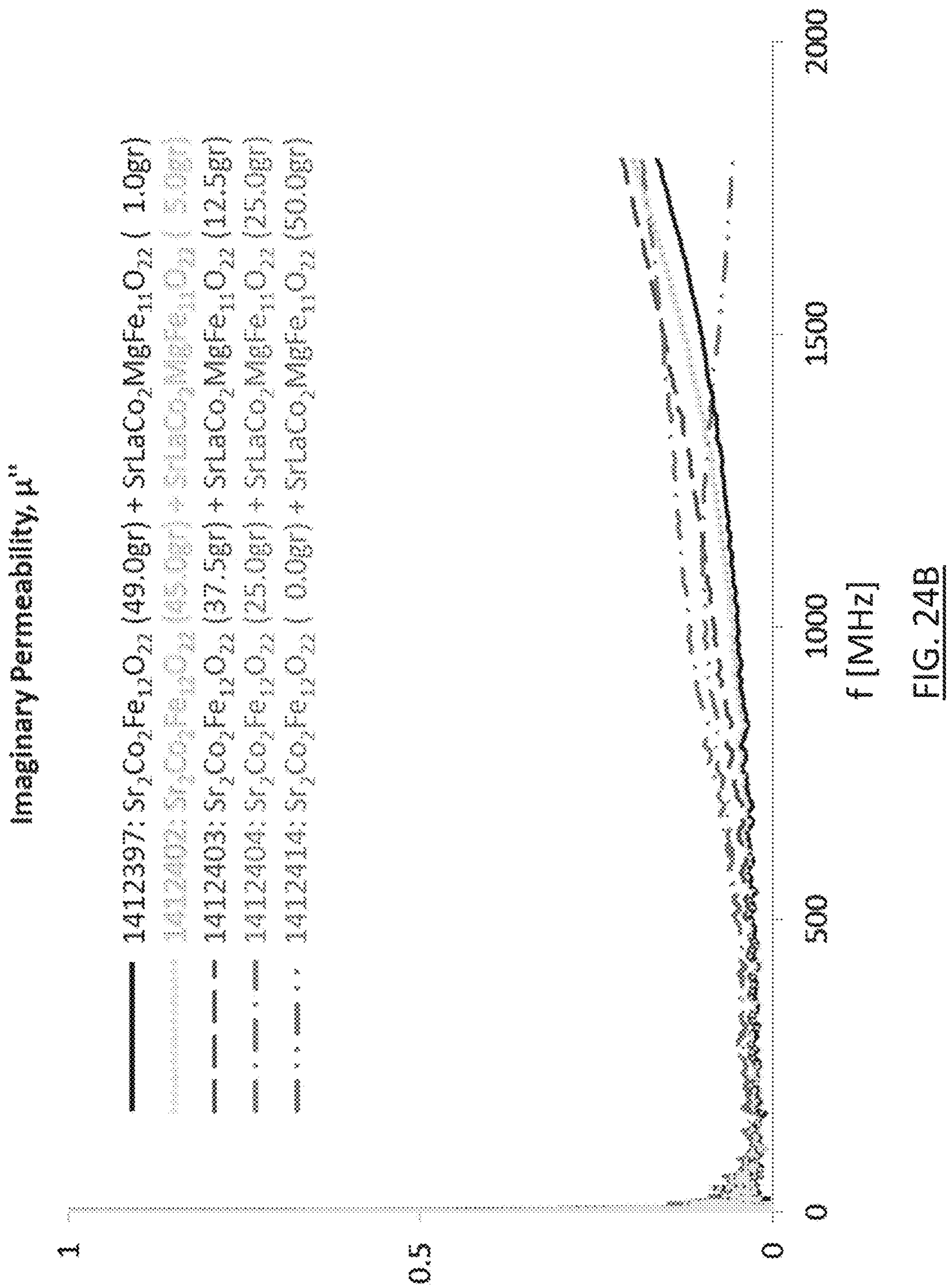
Figure 24C:
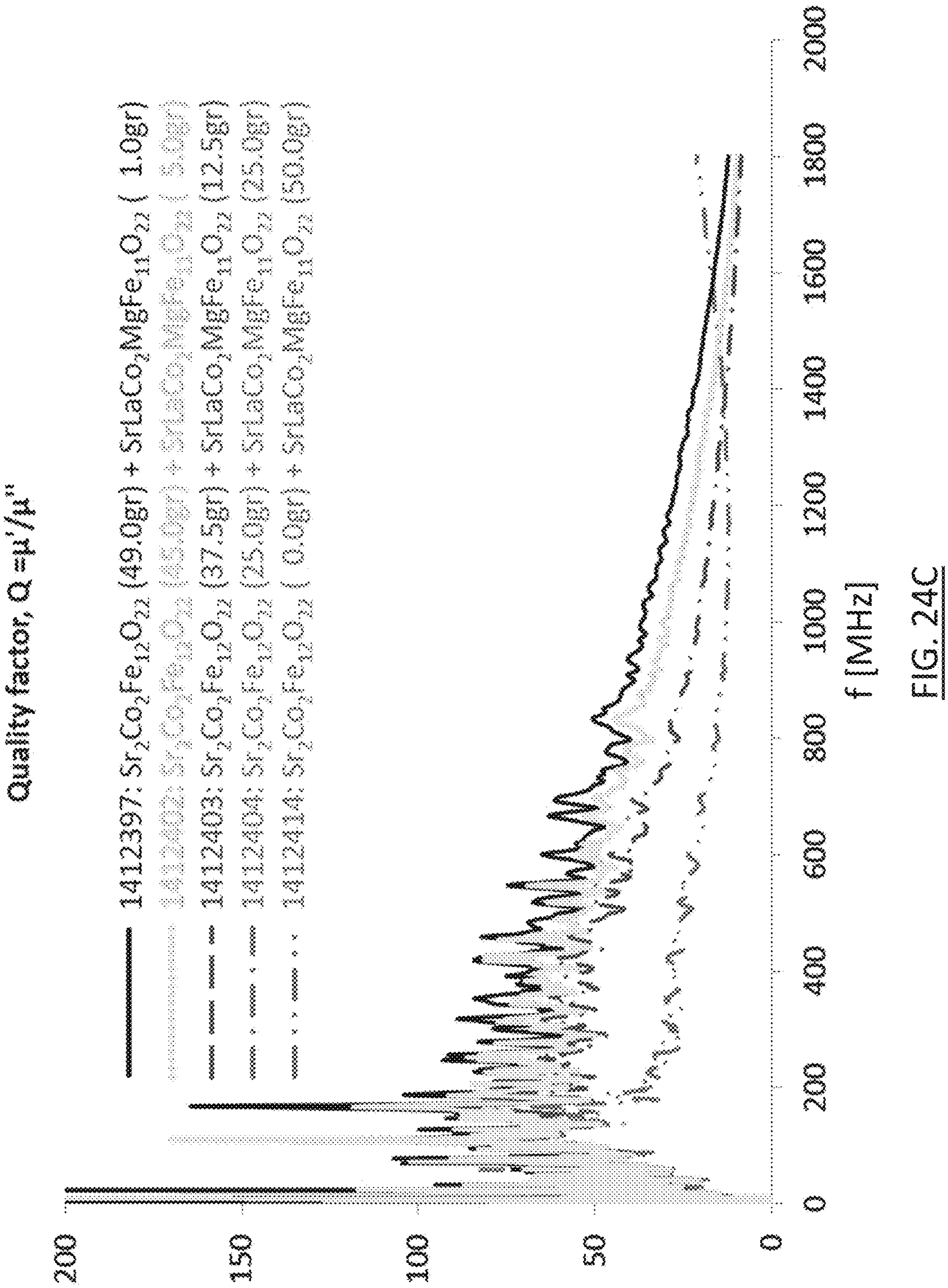
Figure 25A:
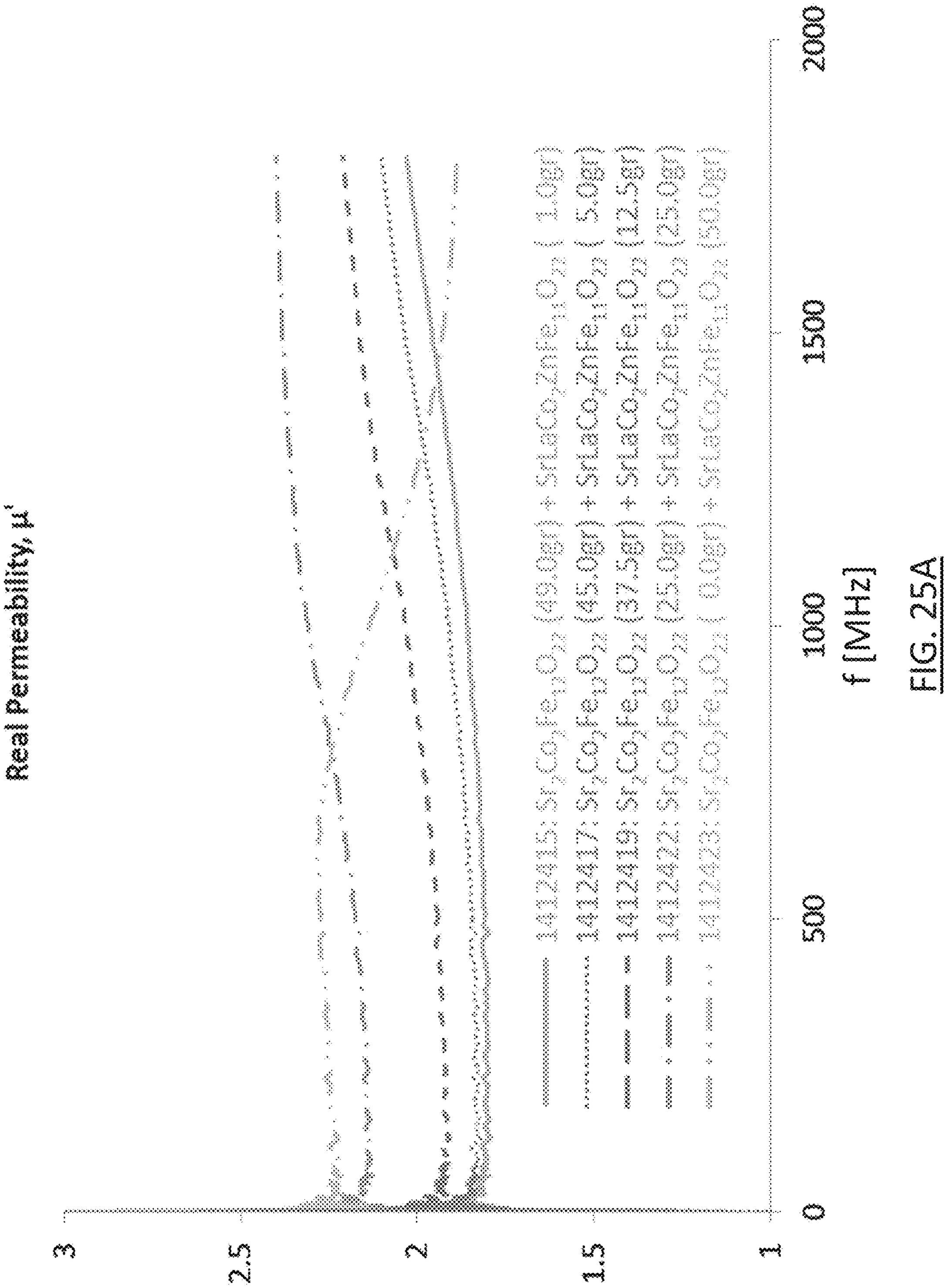
Figure 25B:
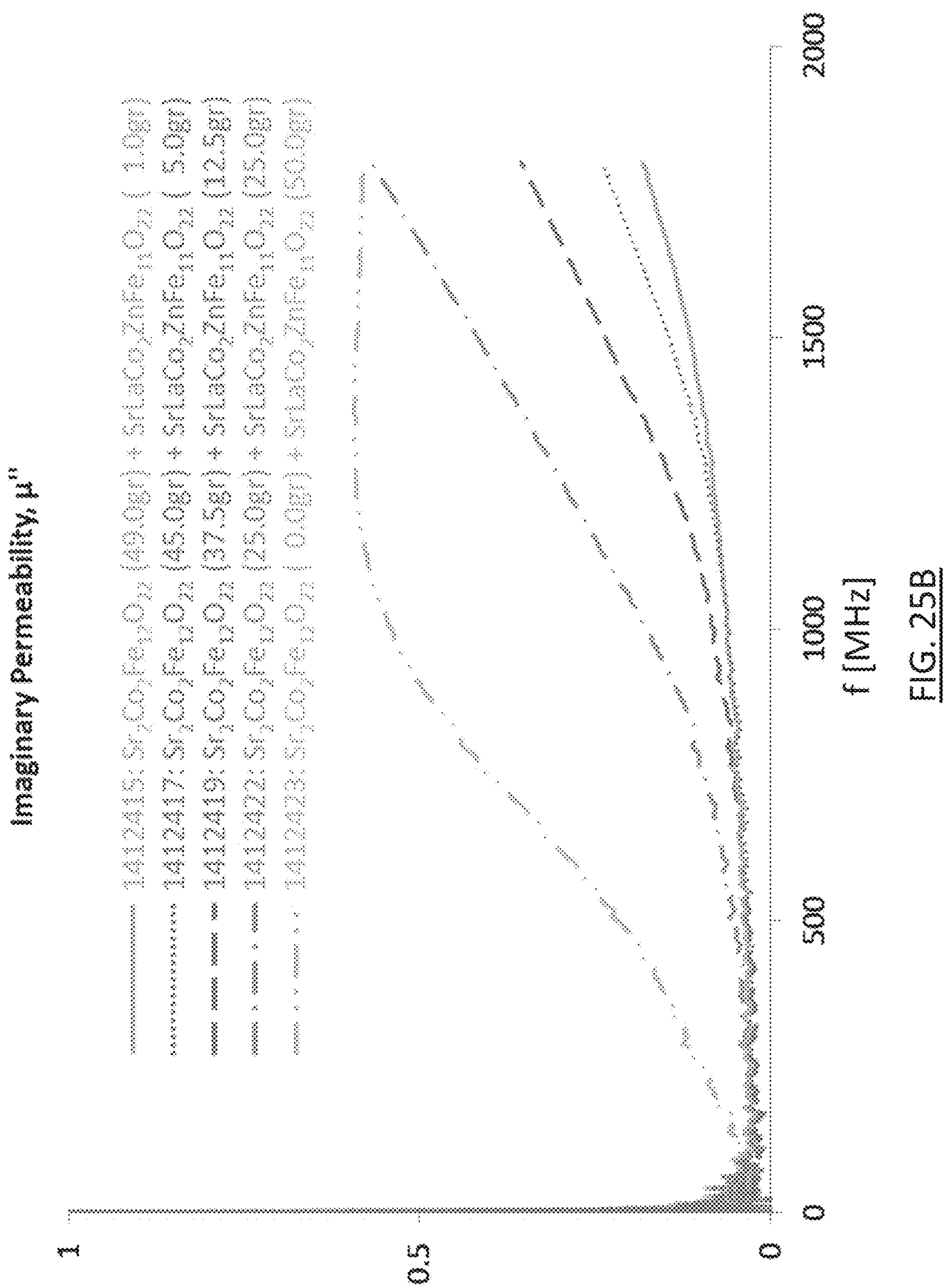
Figure 25C:
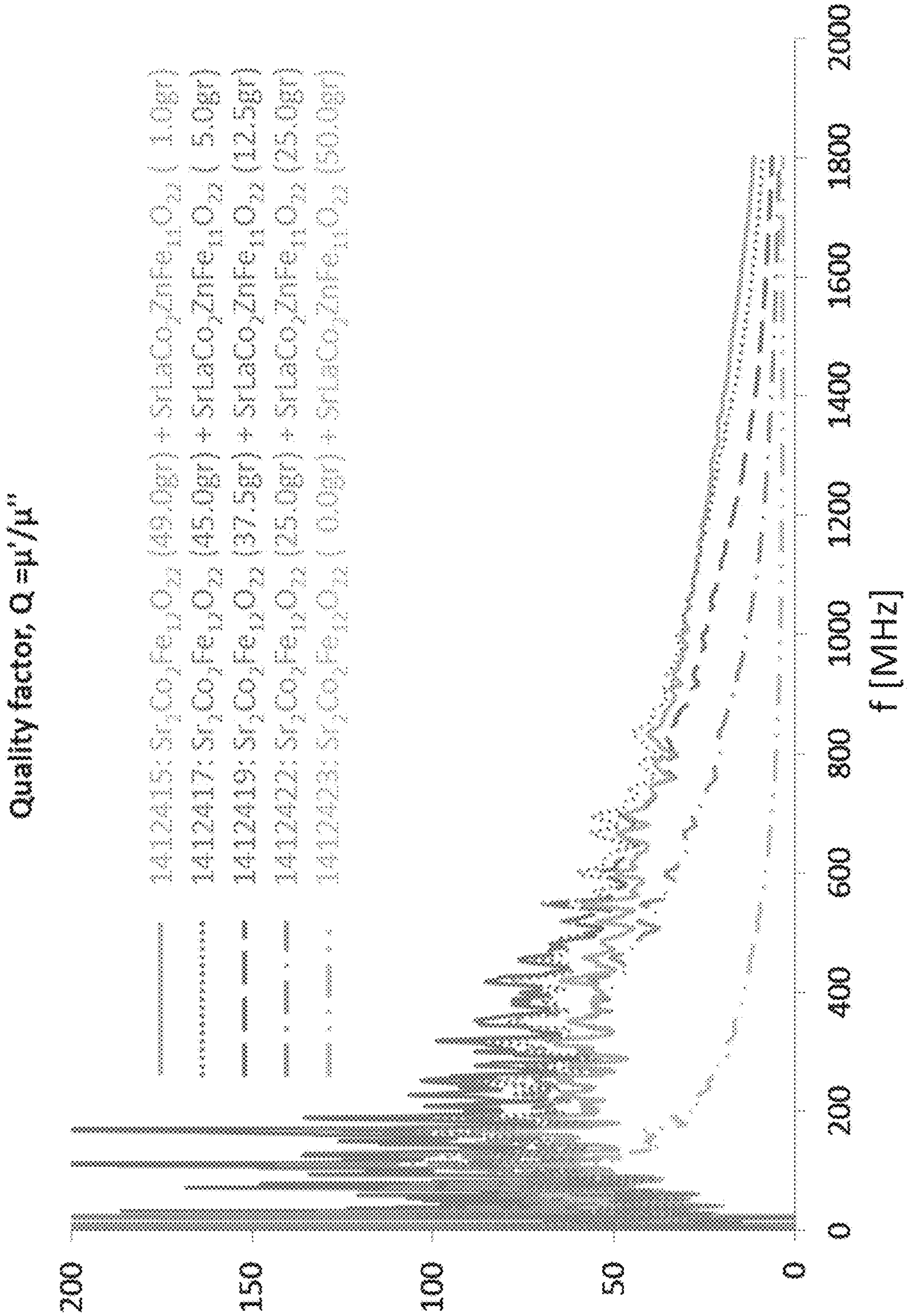
Figure 26A:
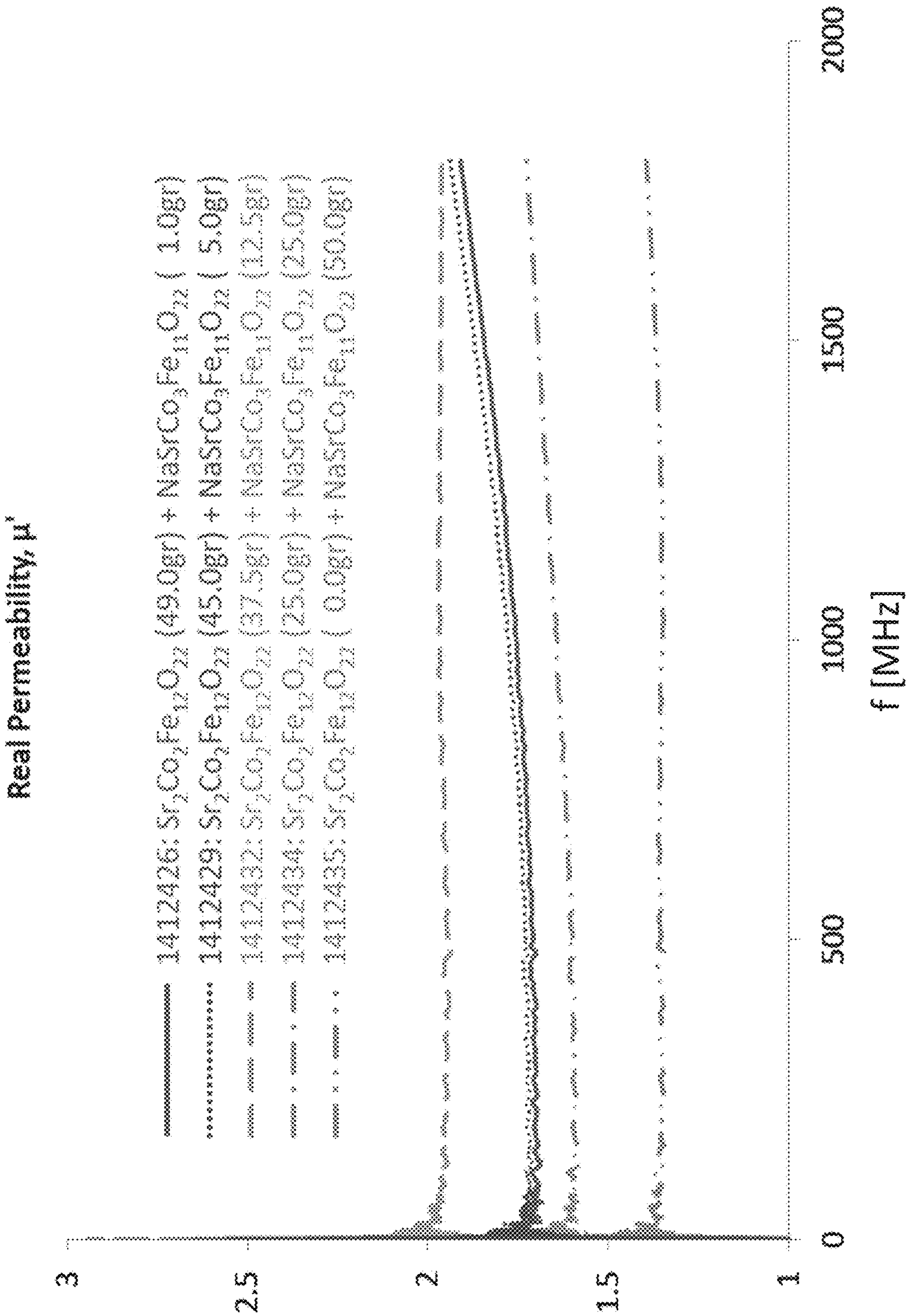
Figure 26B:
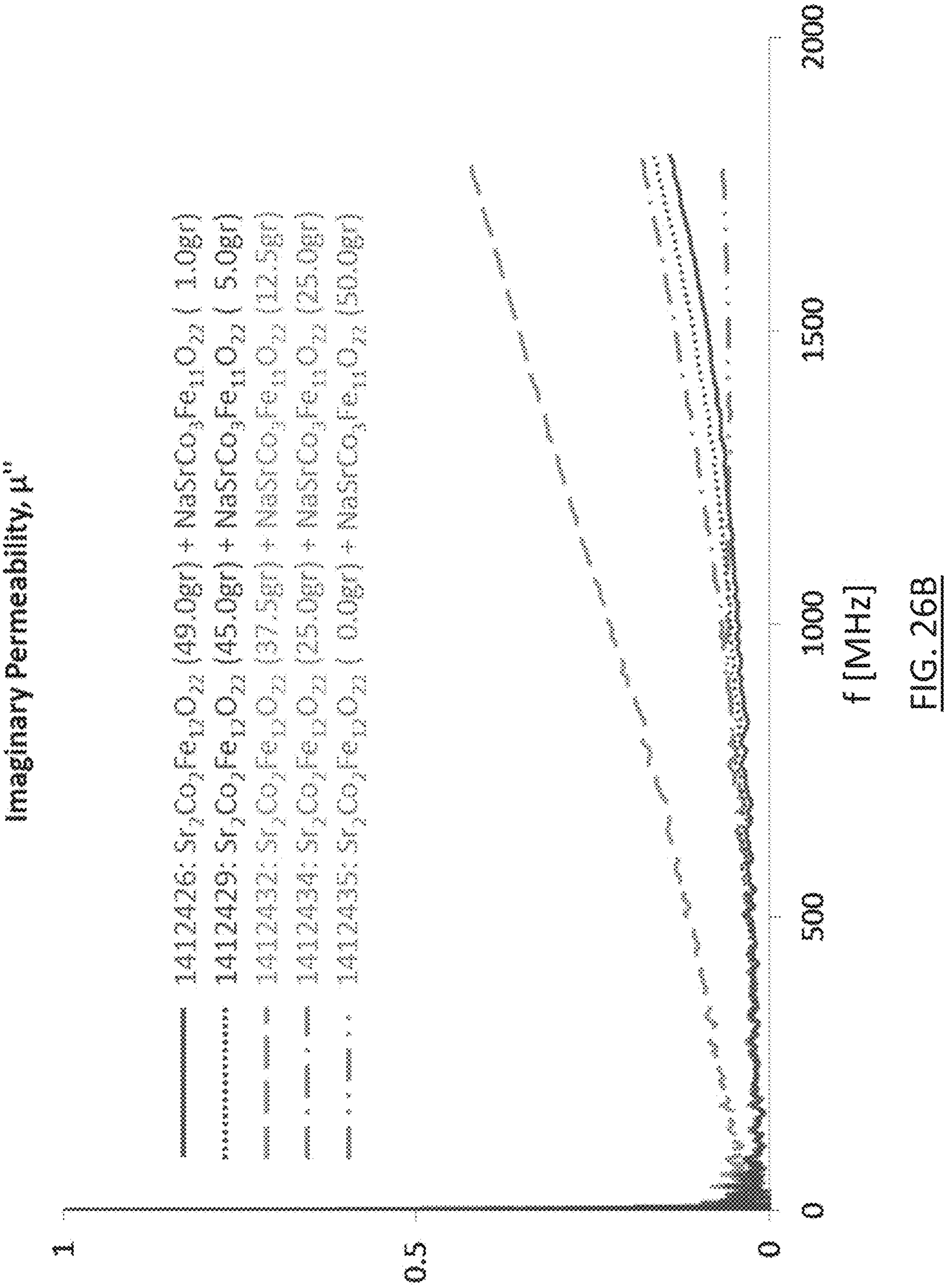
Figure 26C:
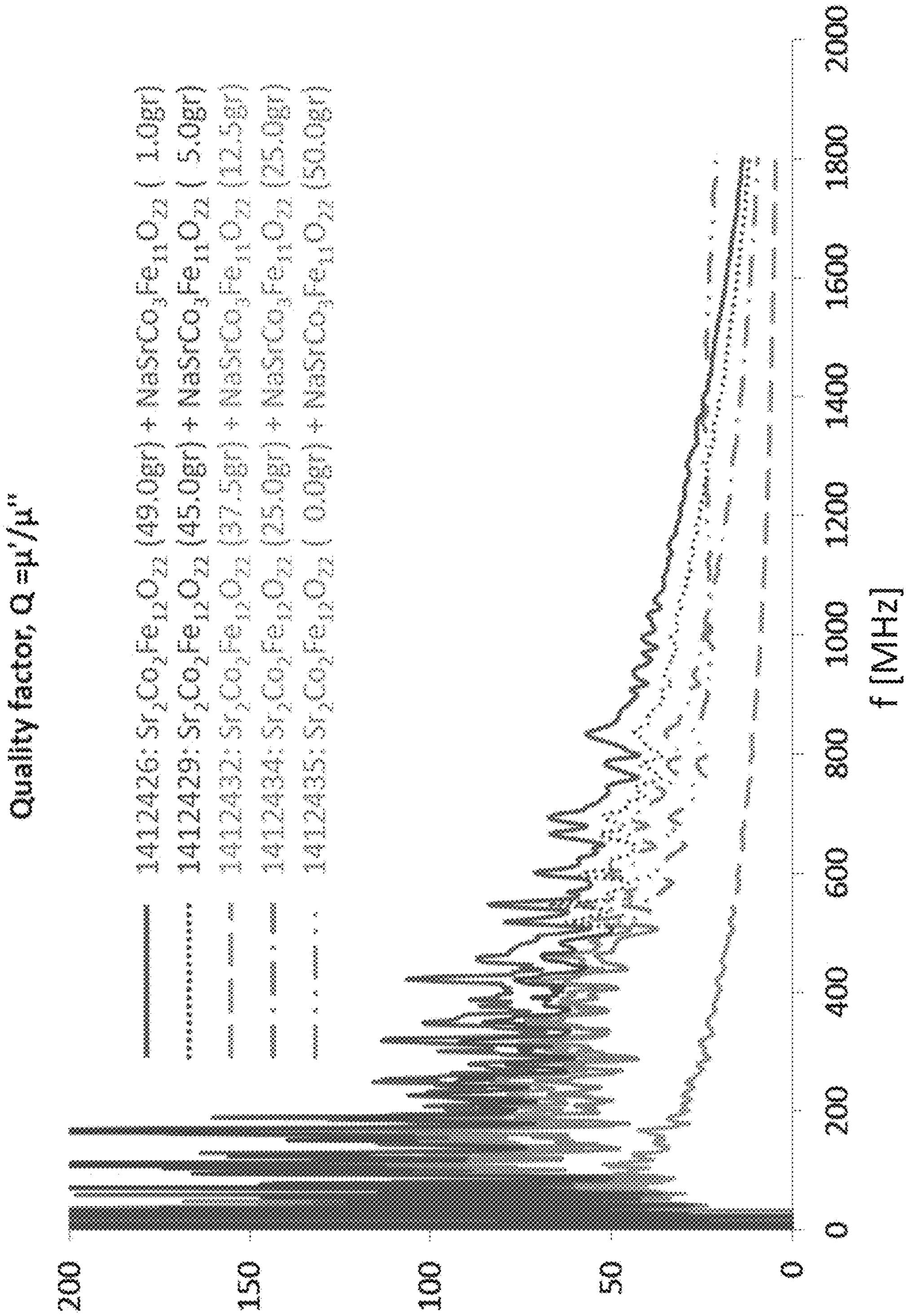
Figure 27A:
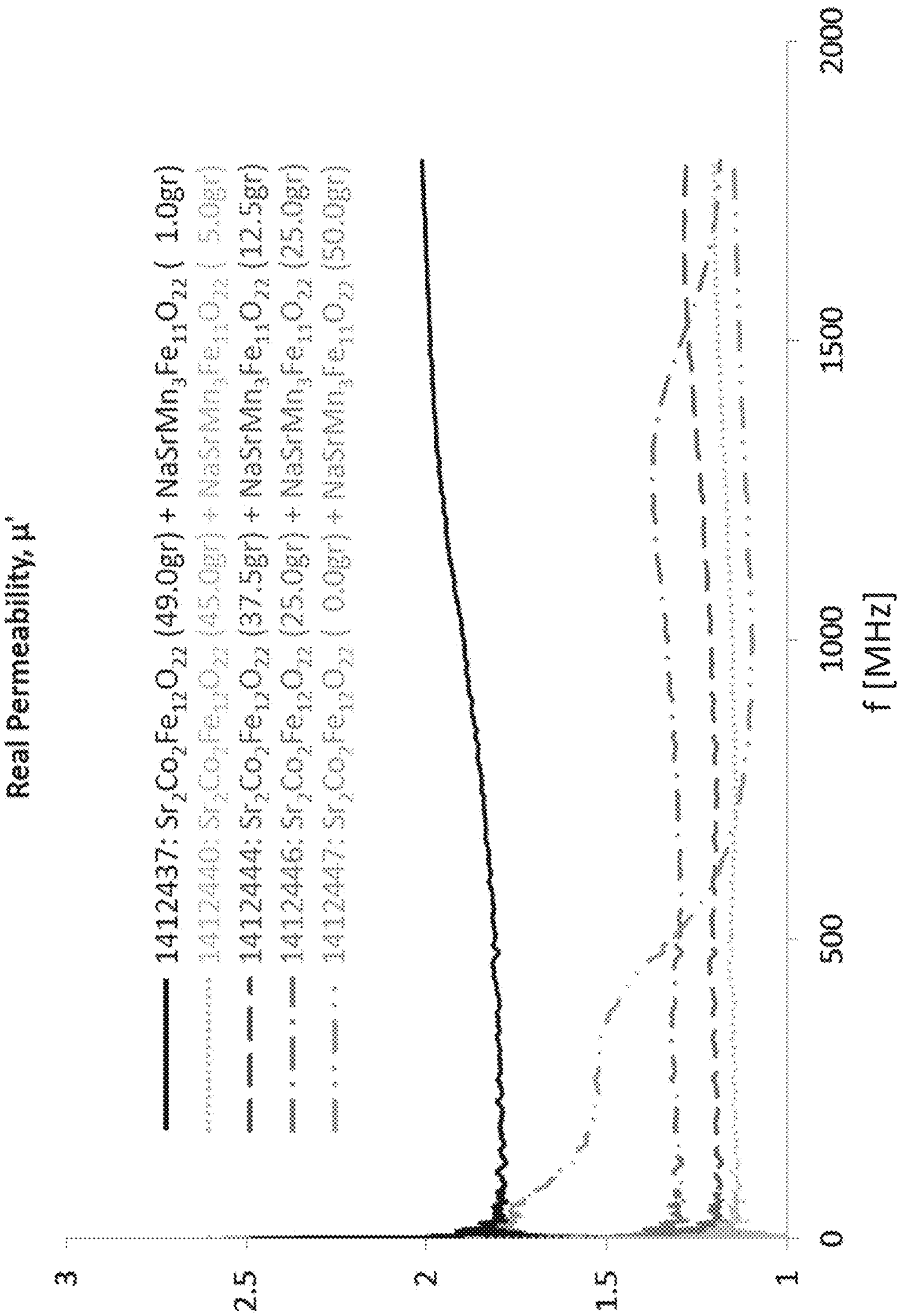
Figure 27B:
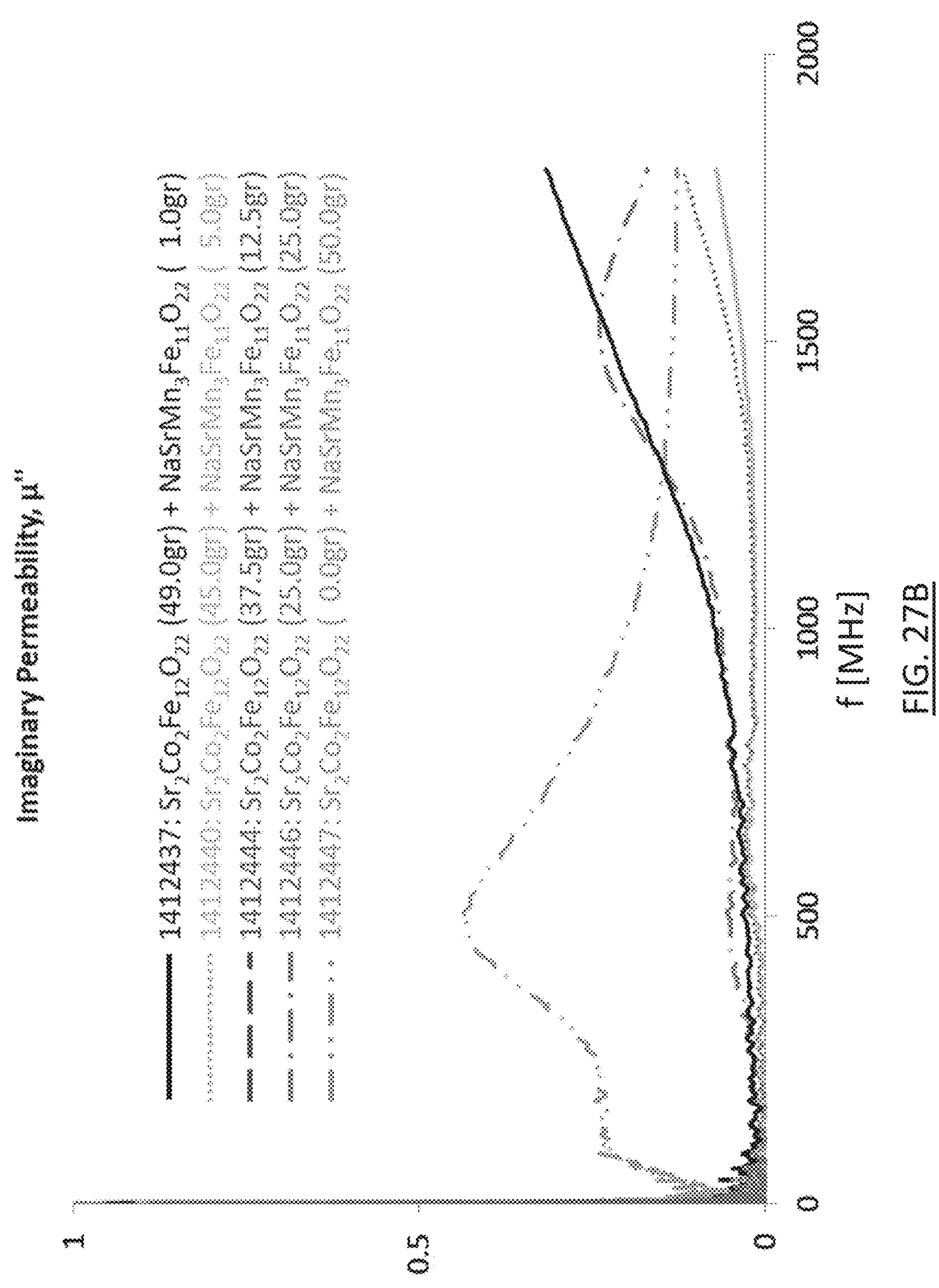
Figure 27C:
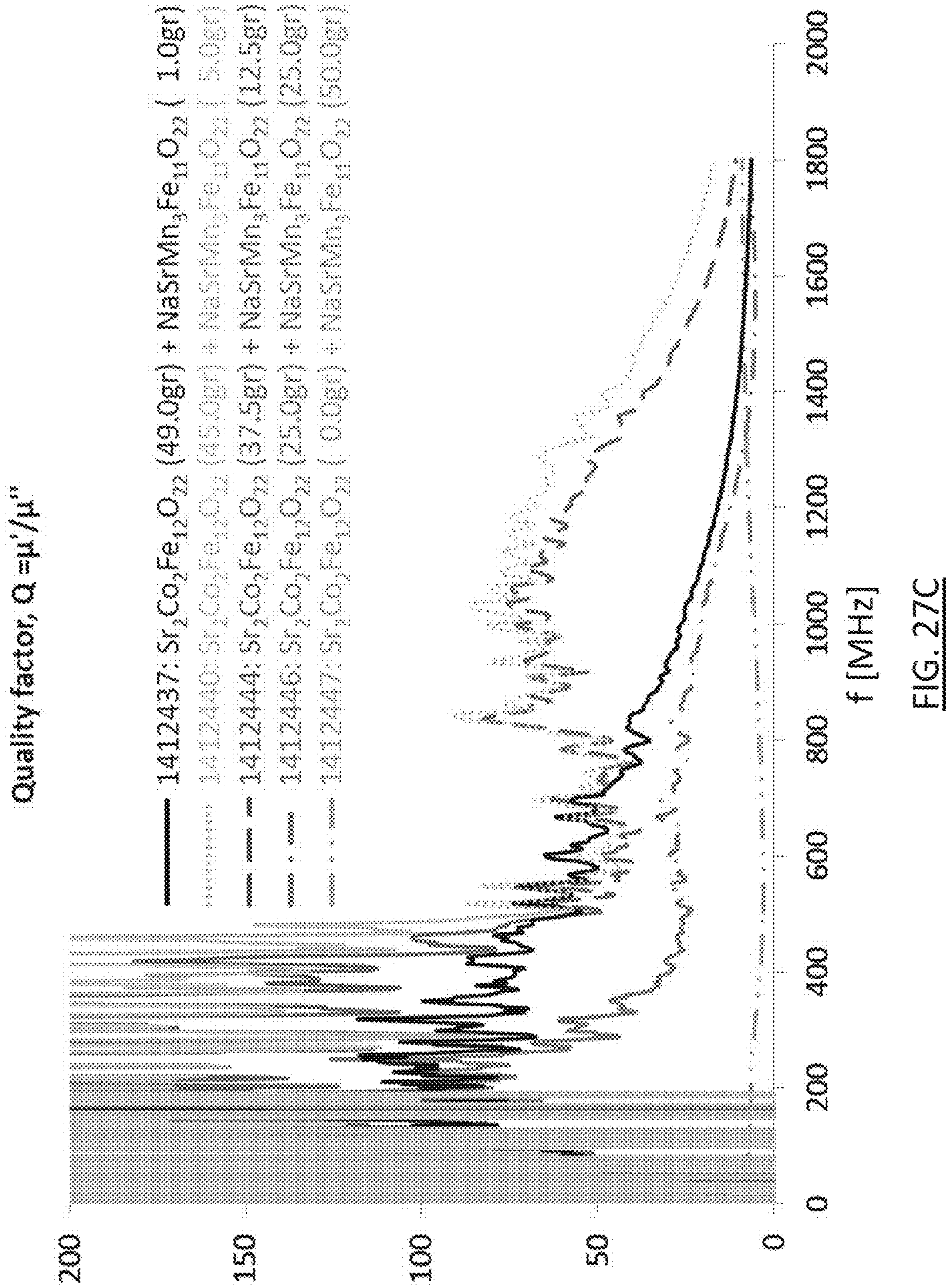
Figure 28A:
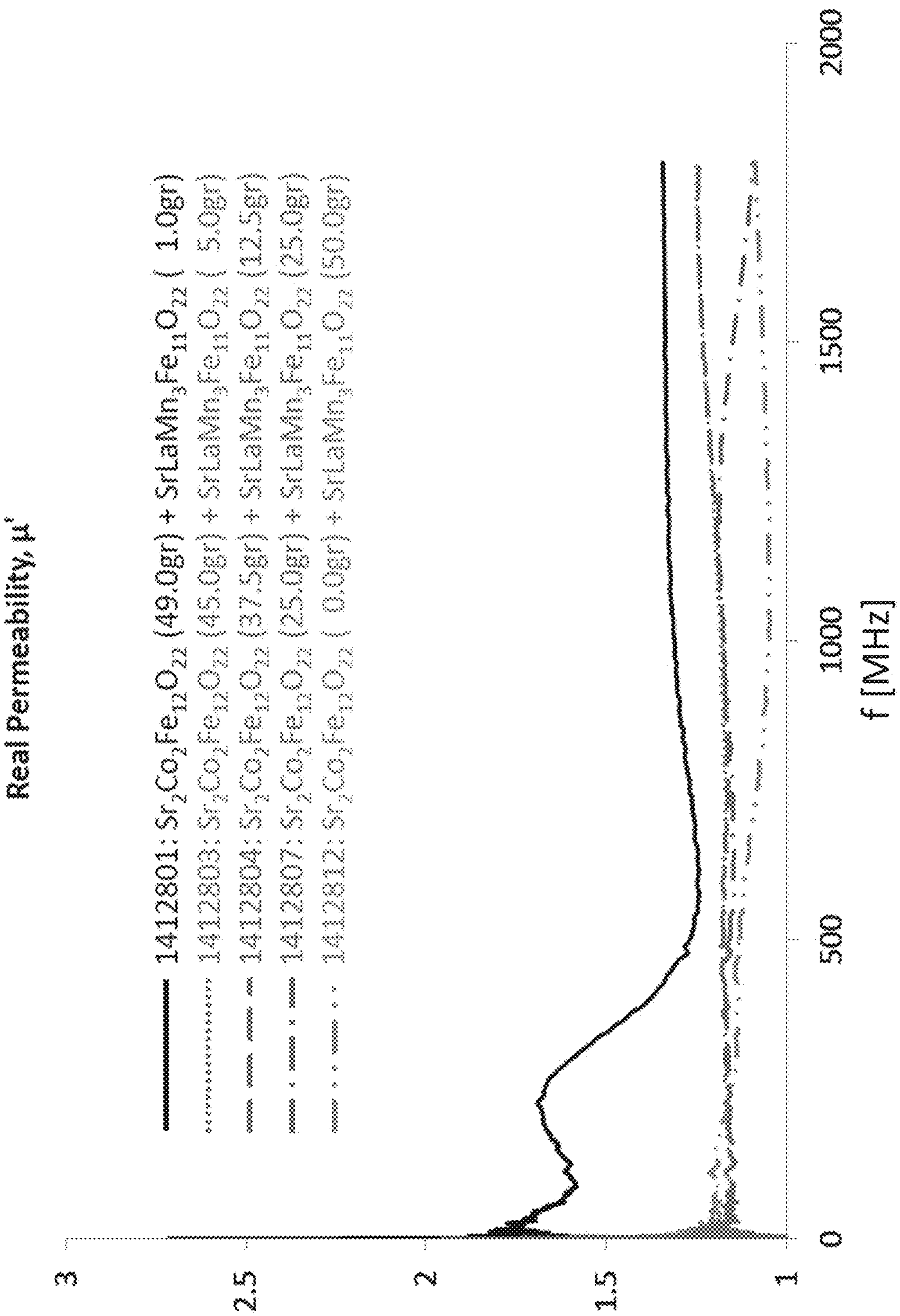
Figure 28B:
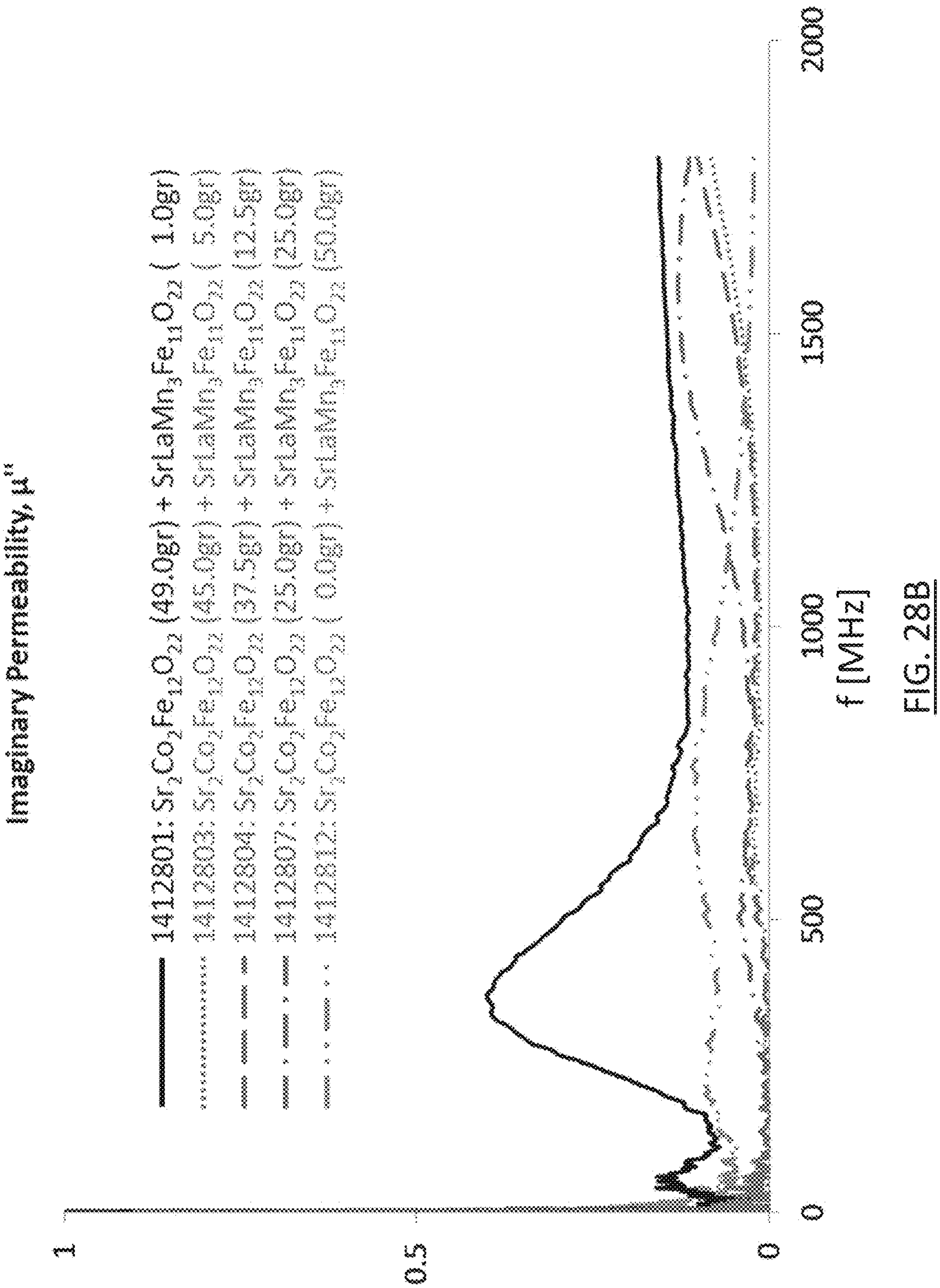
Figure 28C:
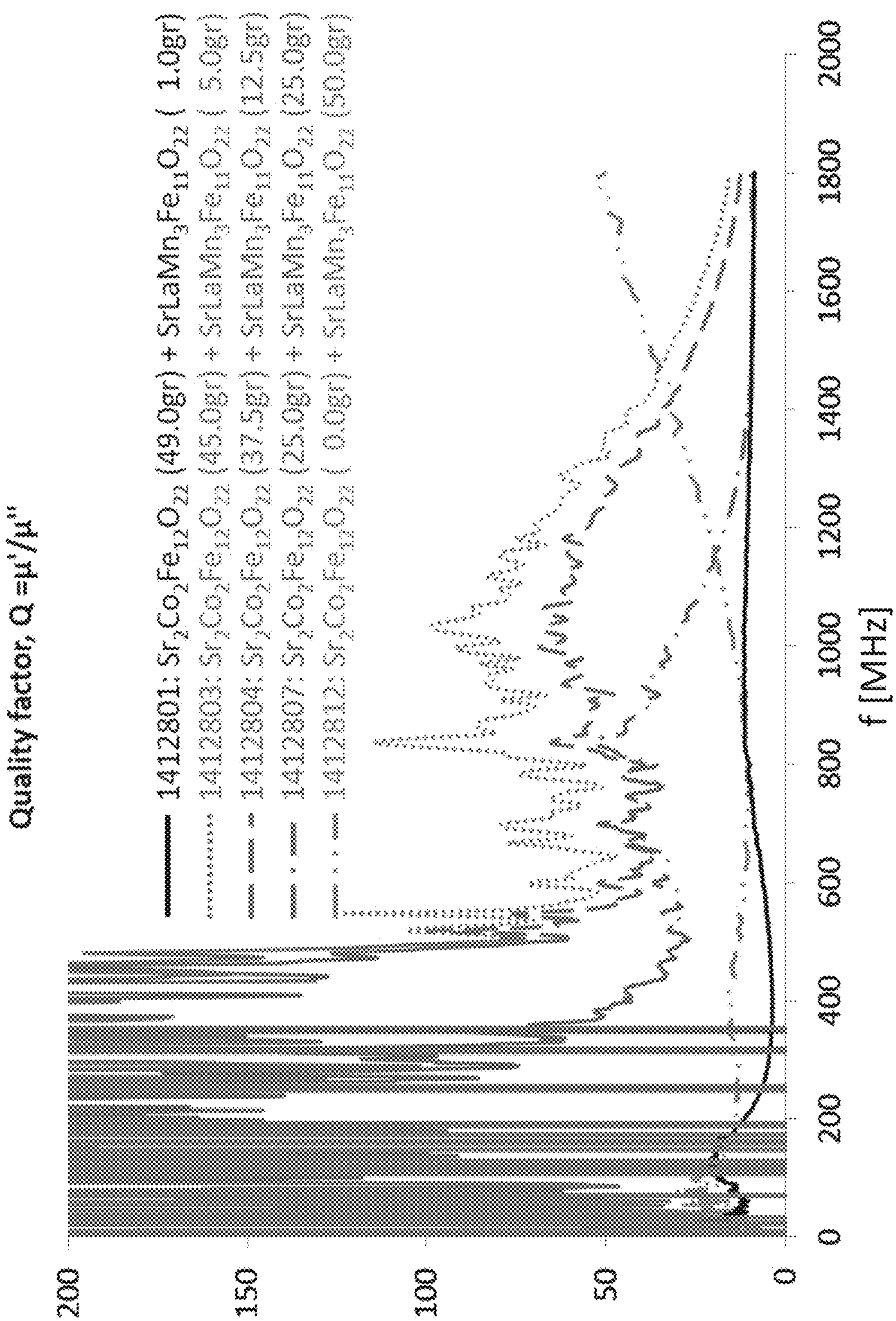
Figure 29A:
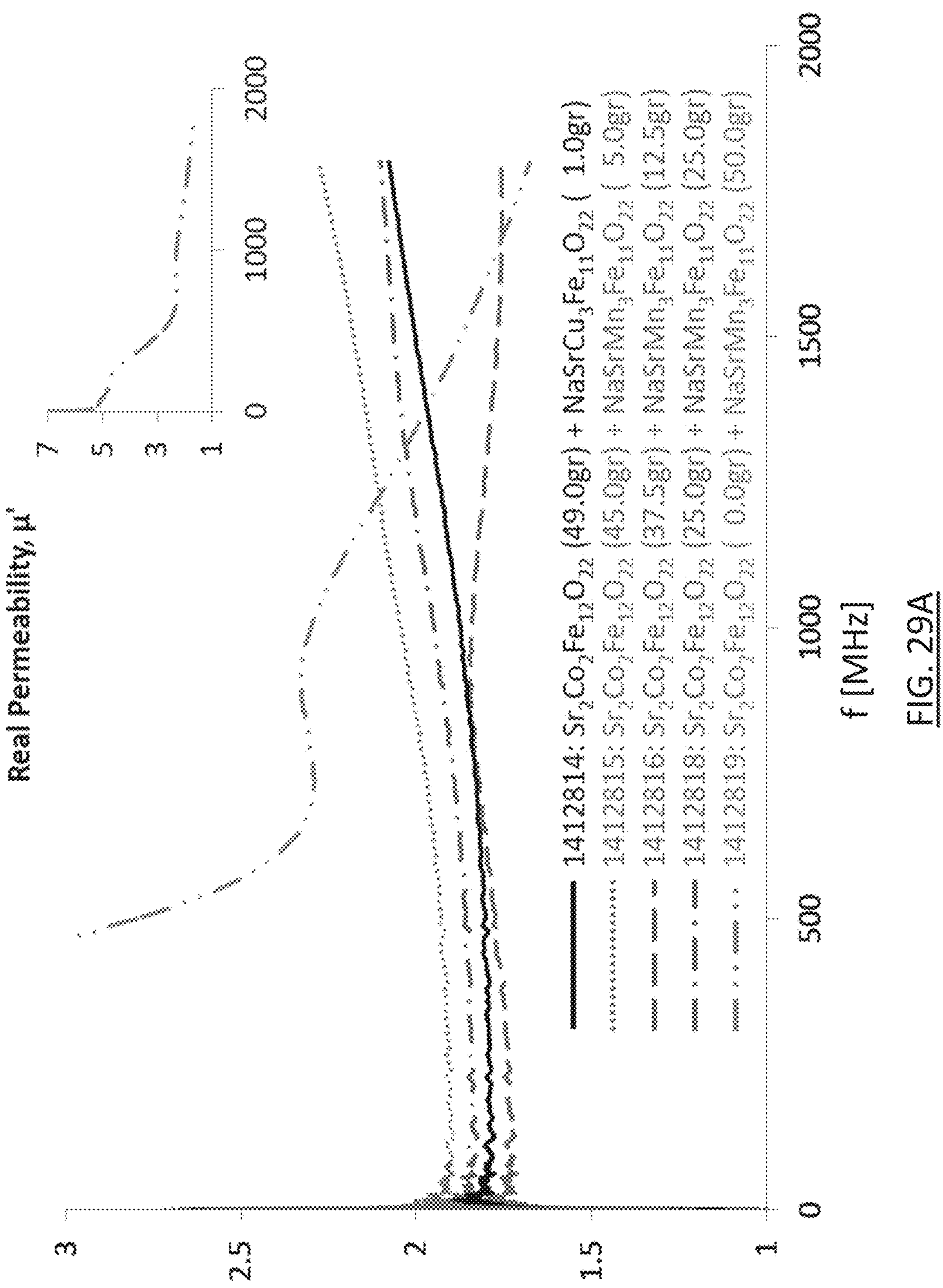
Figure 29B:
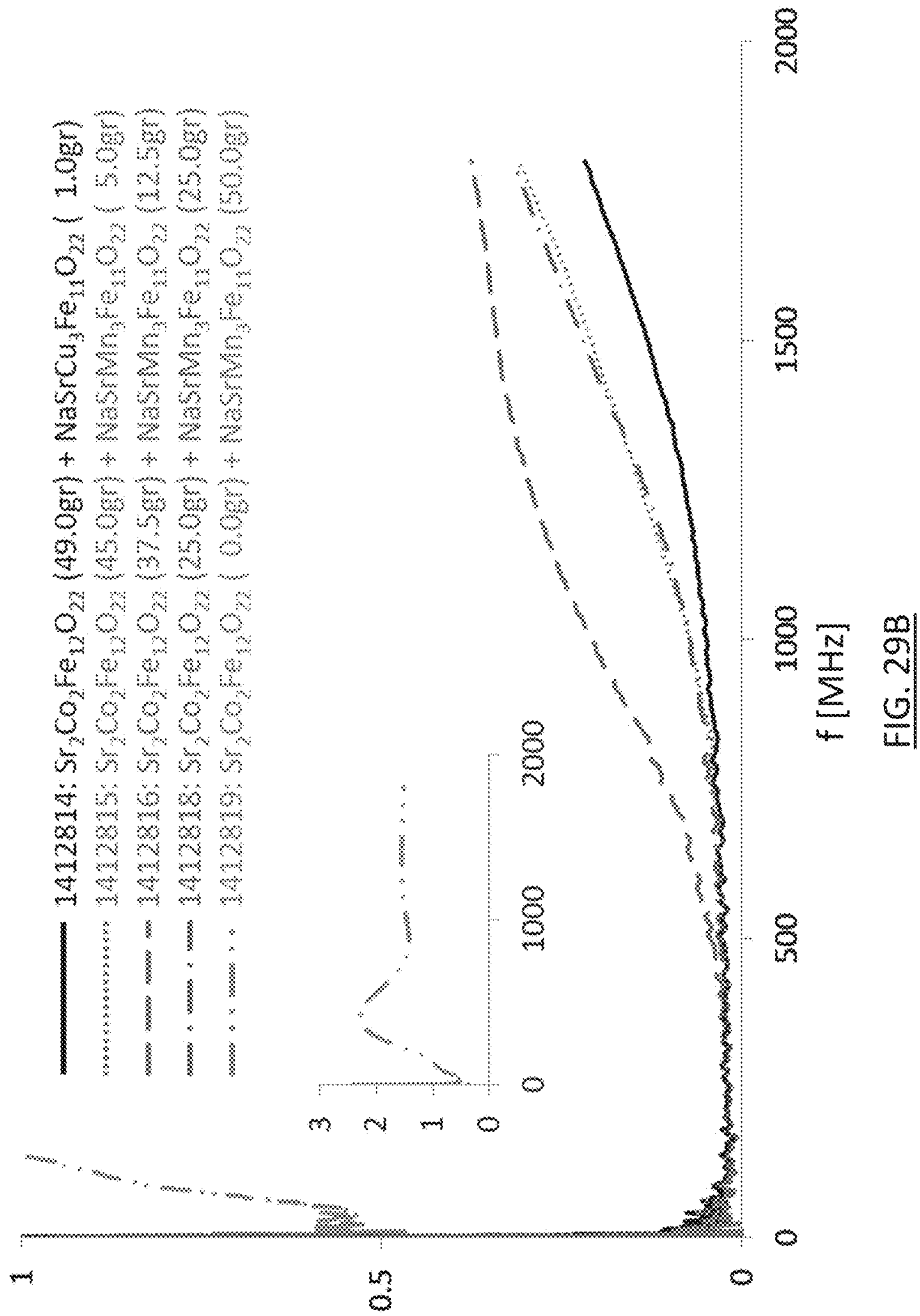
Figure 29C:
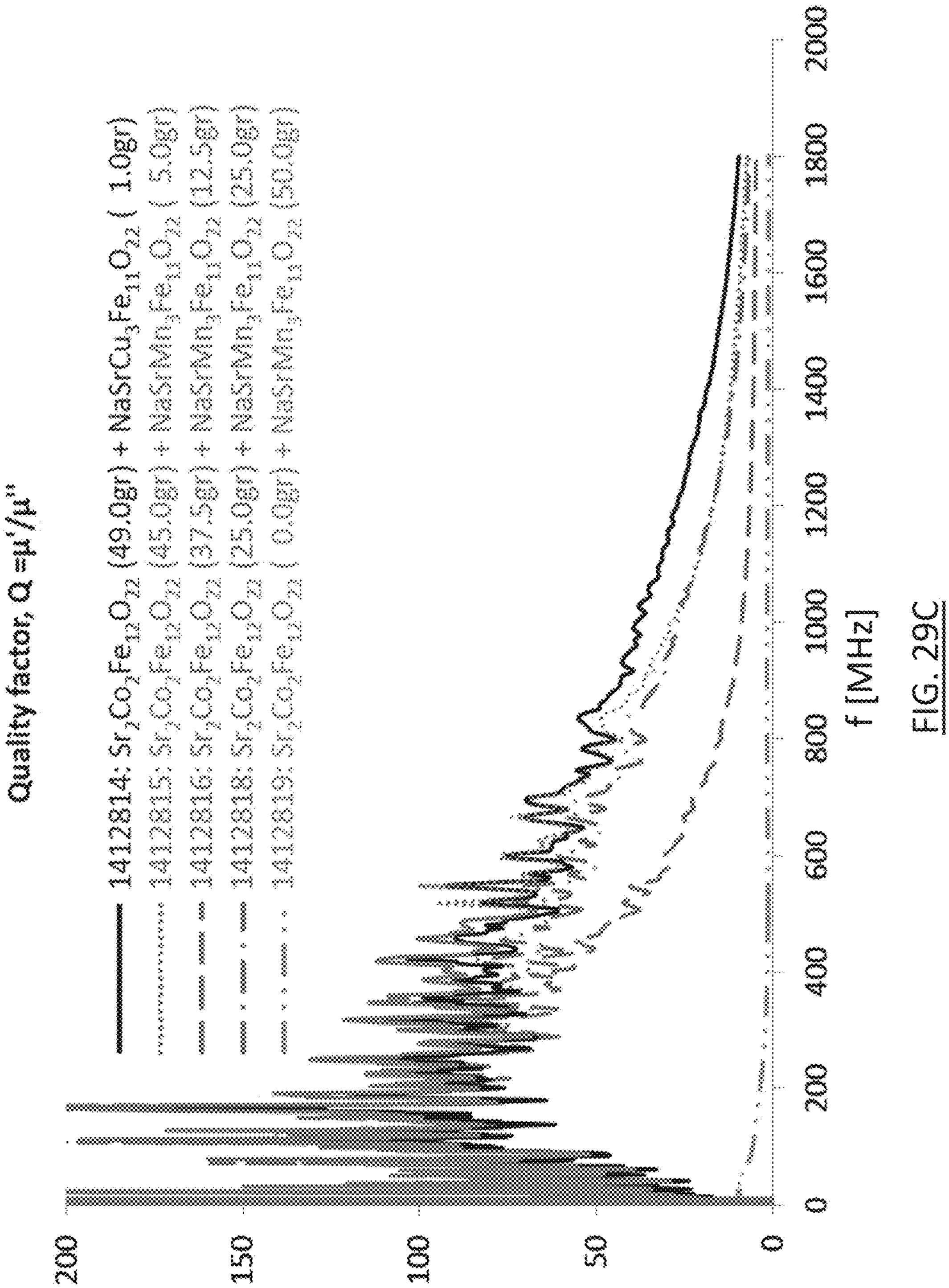
Figure 30A:
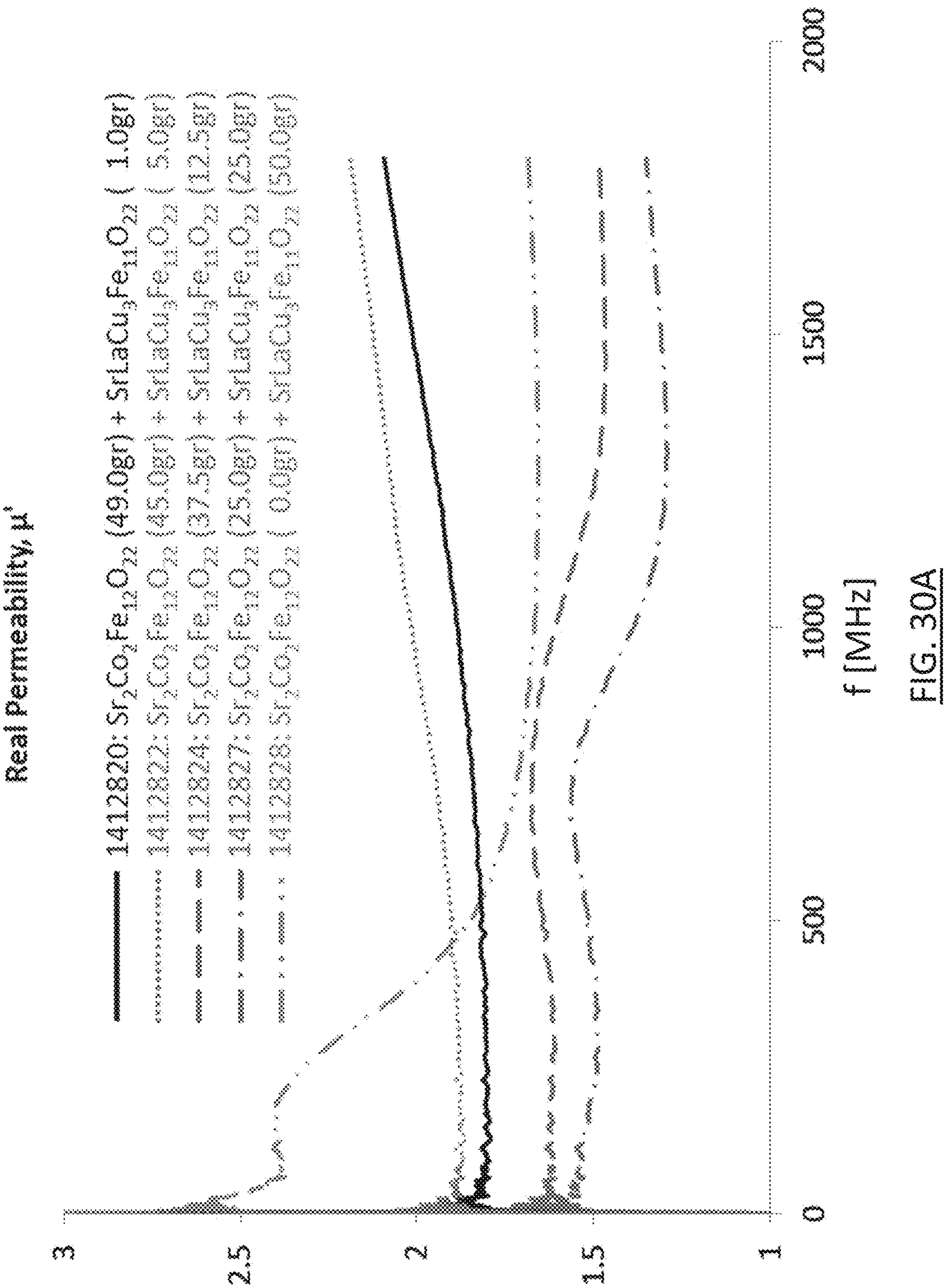
Figure 30B:
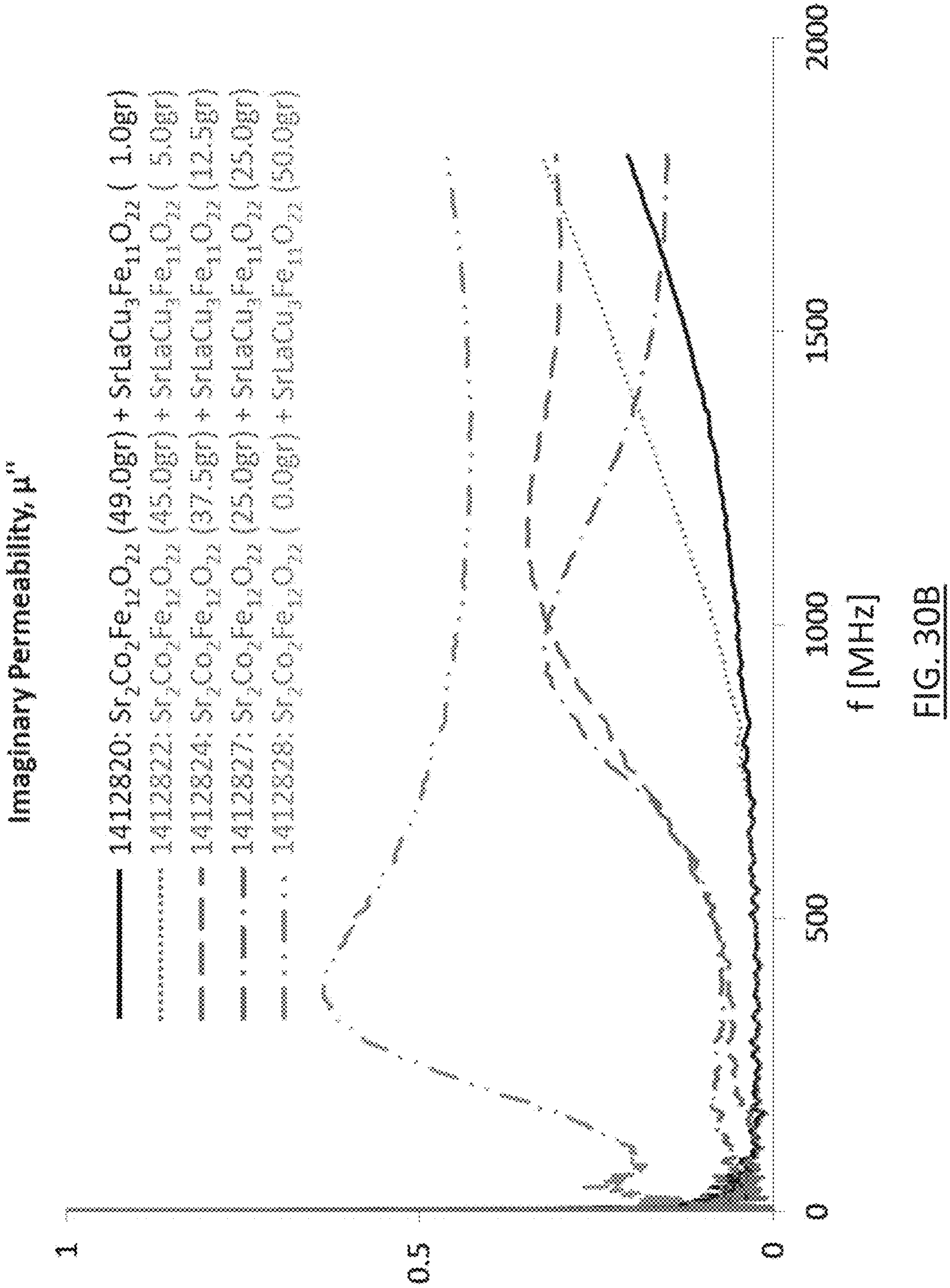
Figure 30C:
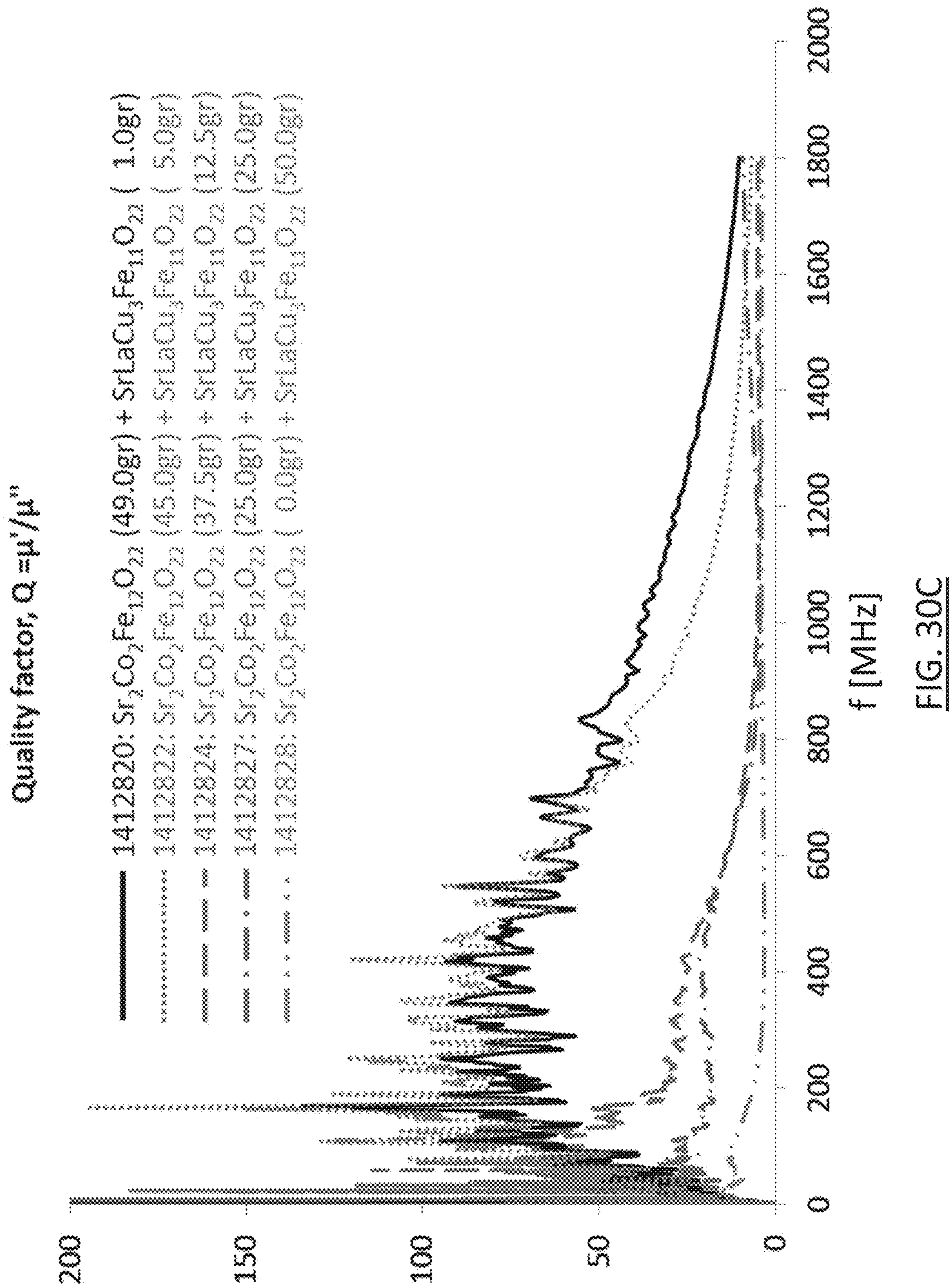
Figure 31A:
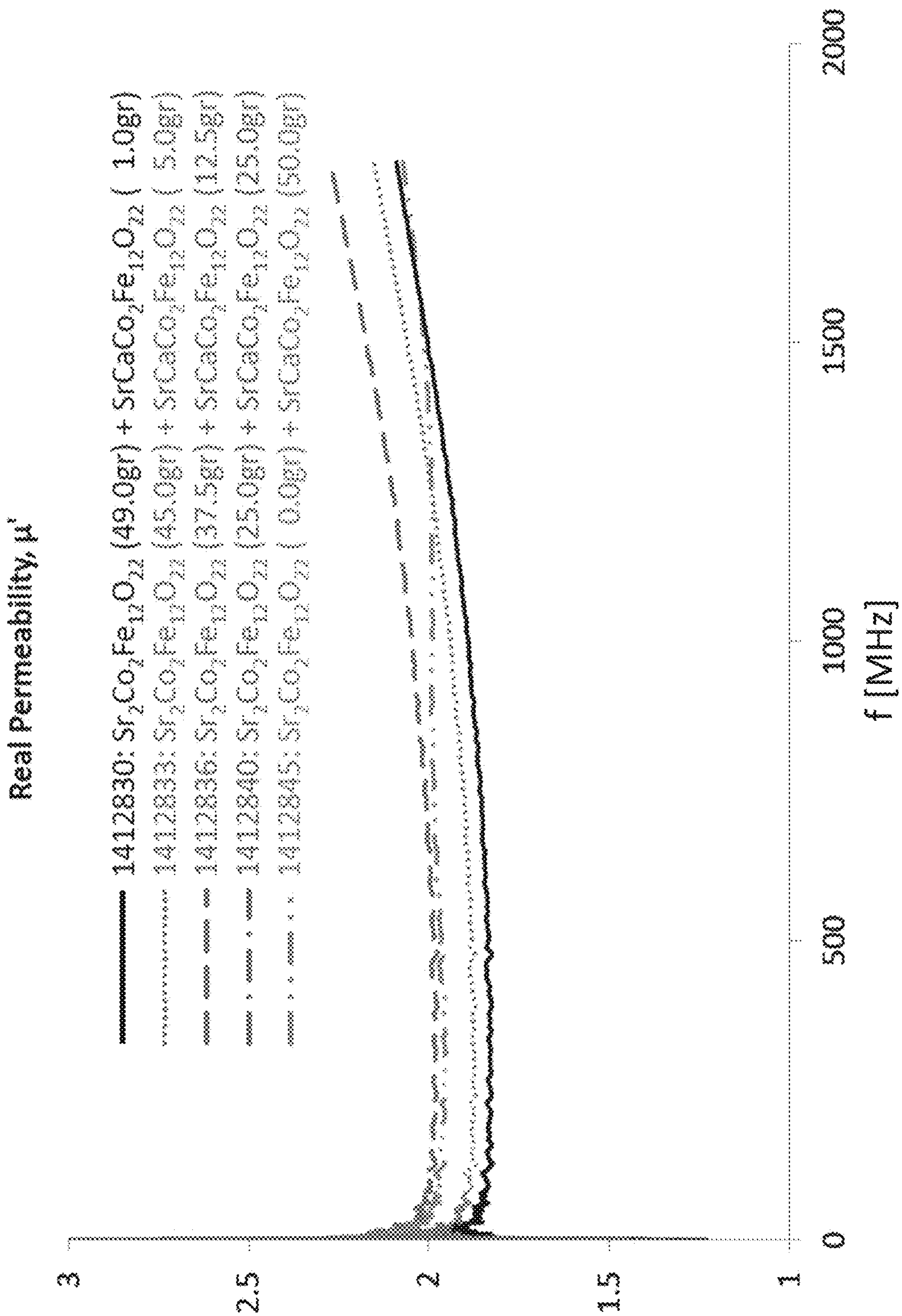
Figure 31B:
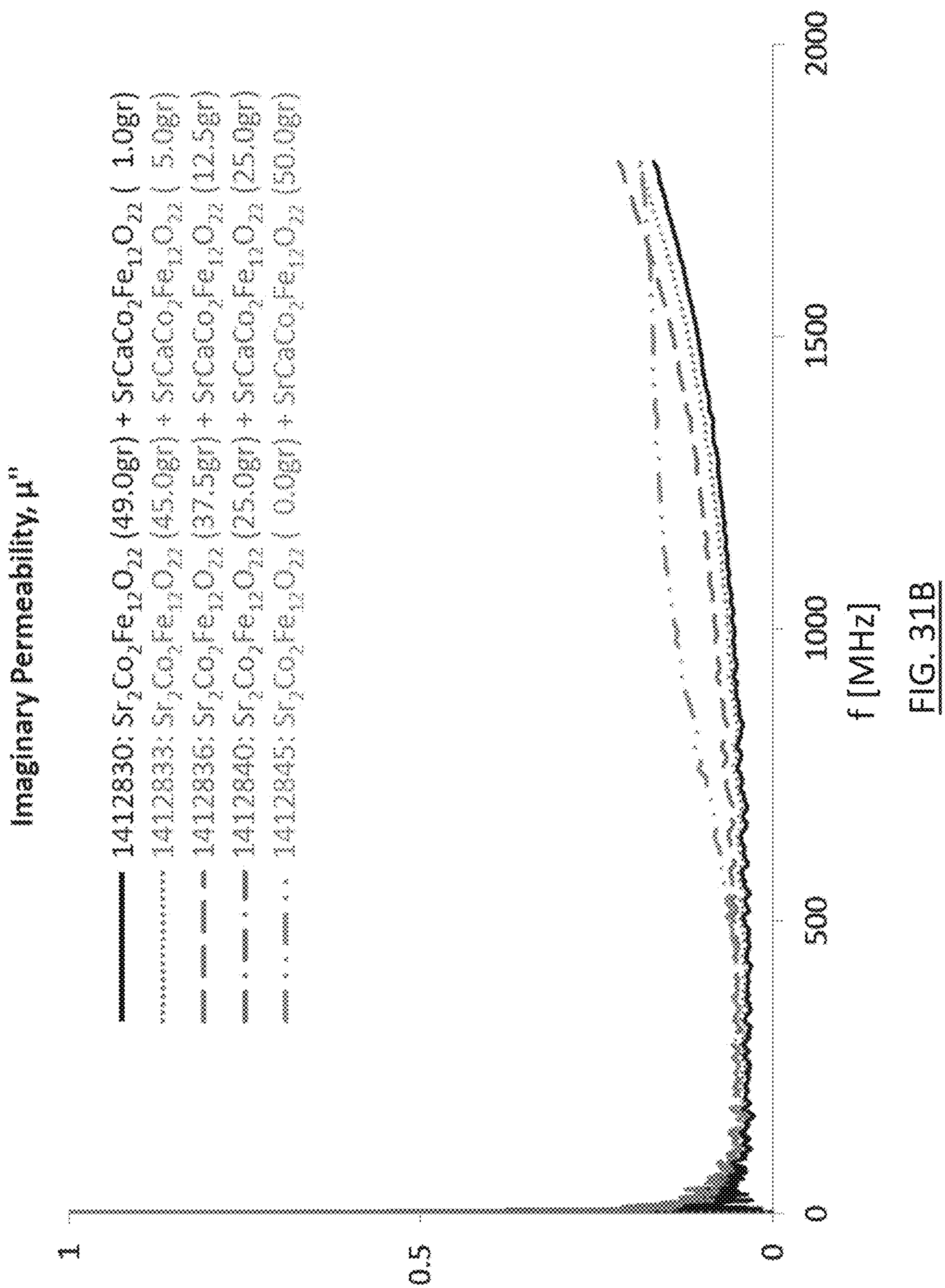
Figure 31C:
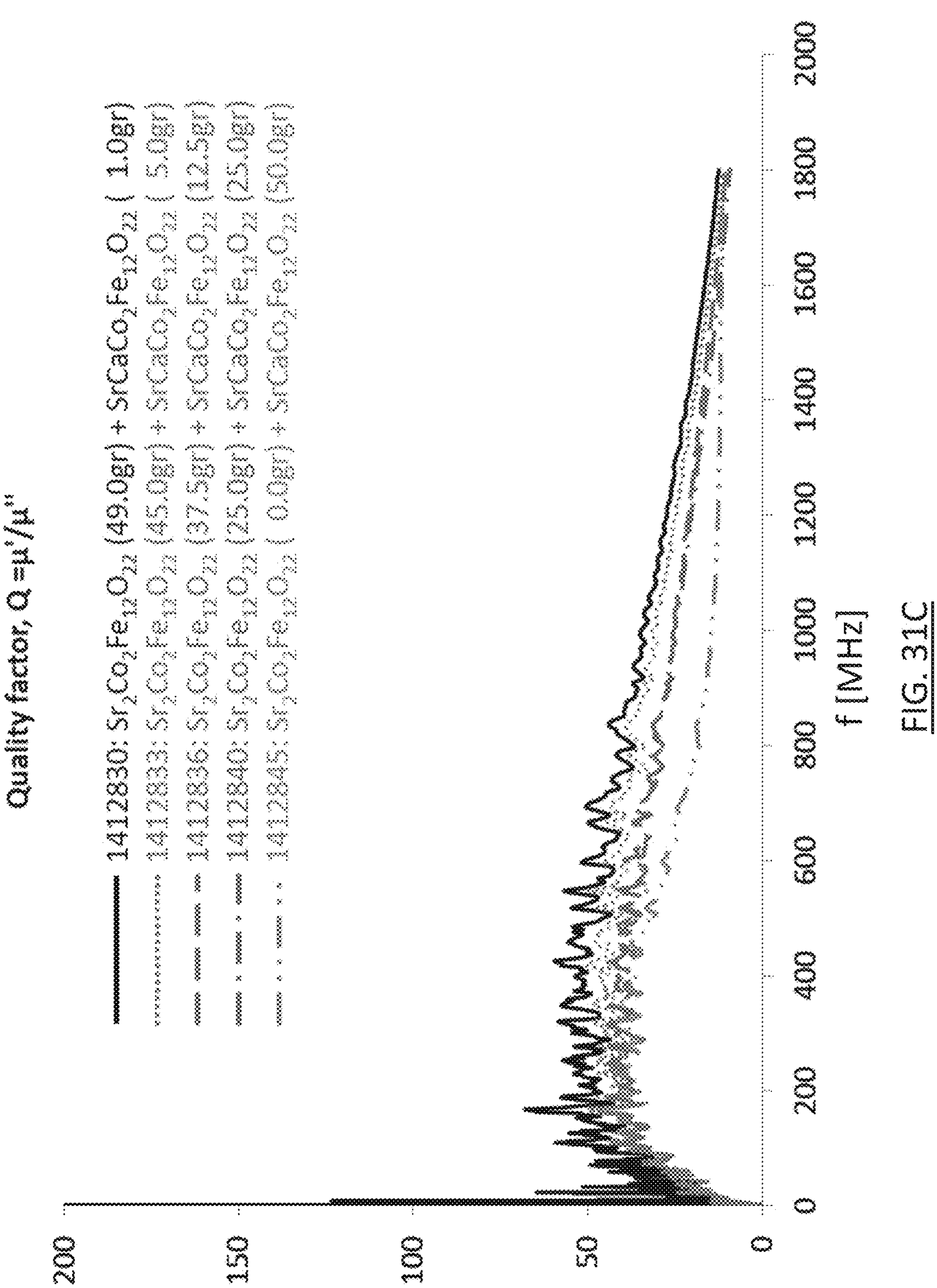
Figure 32A:
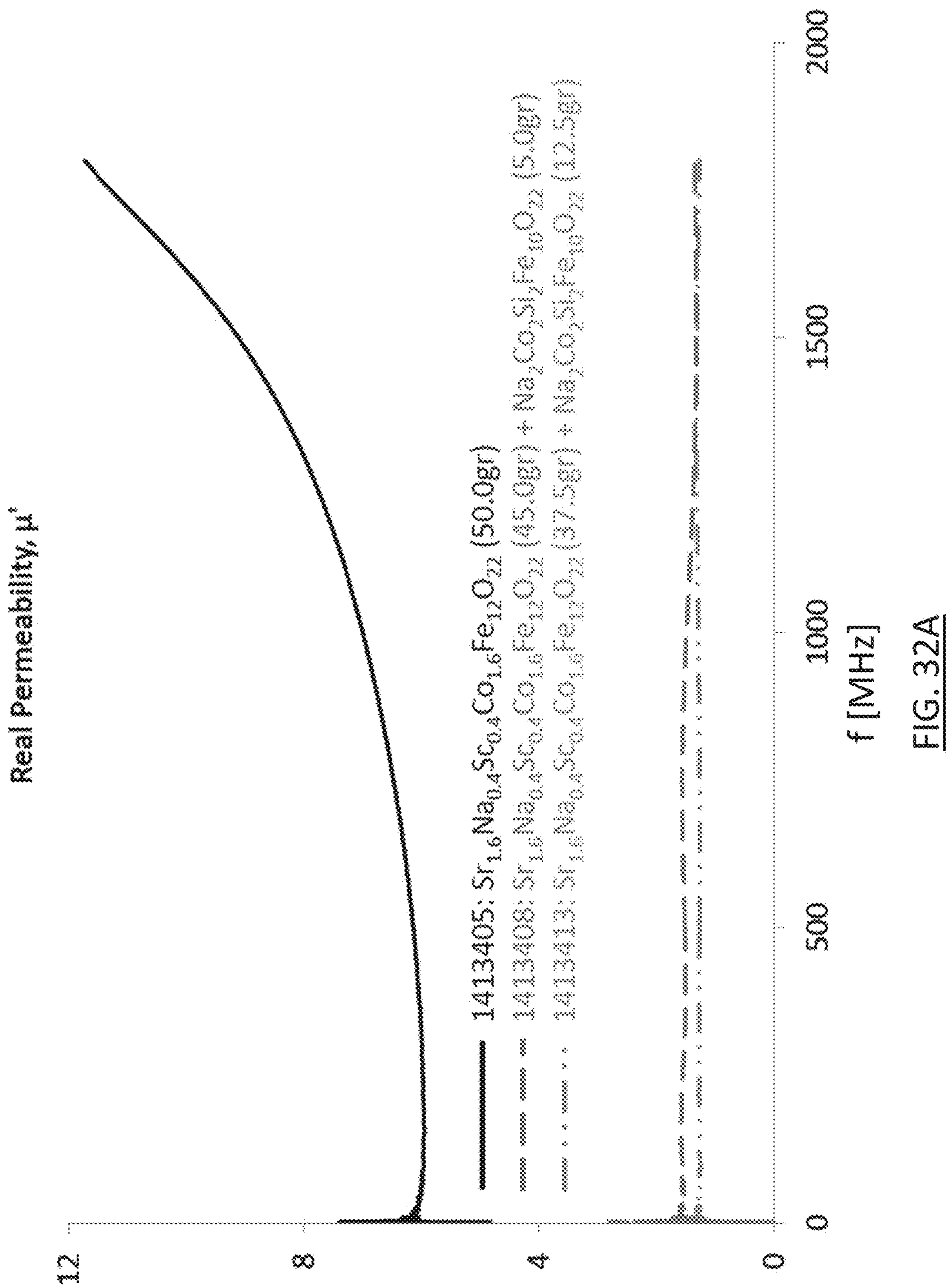
Figure 32B:
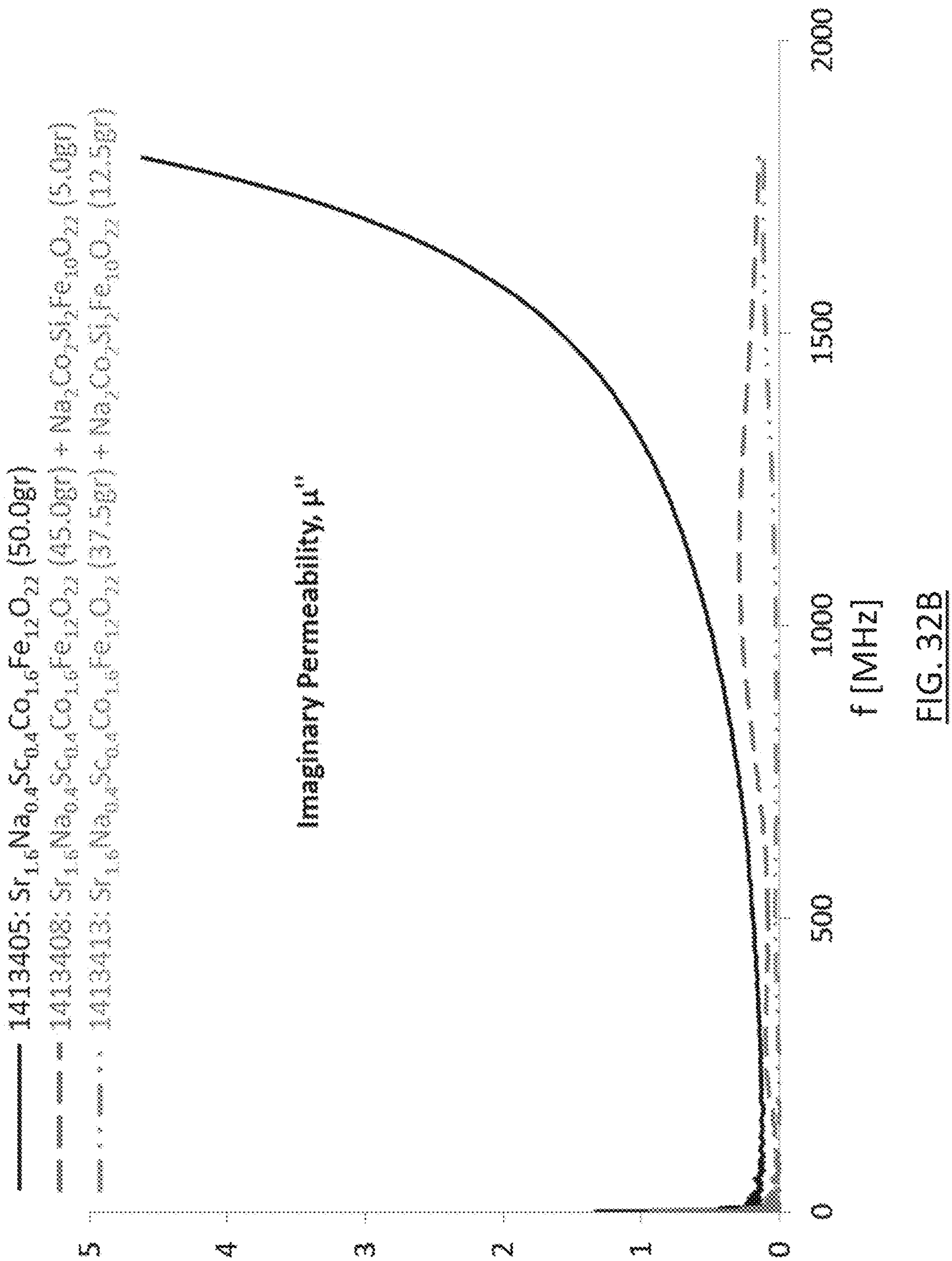
Figure 32C:
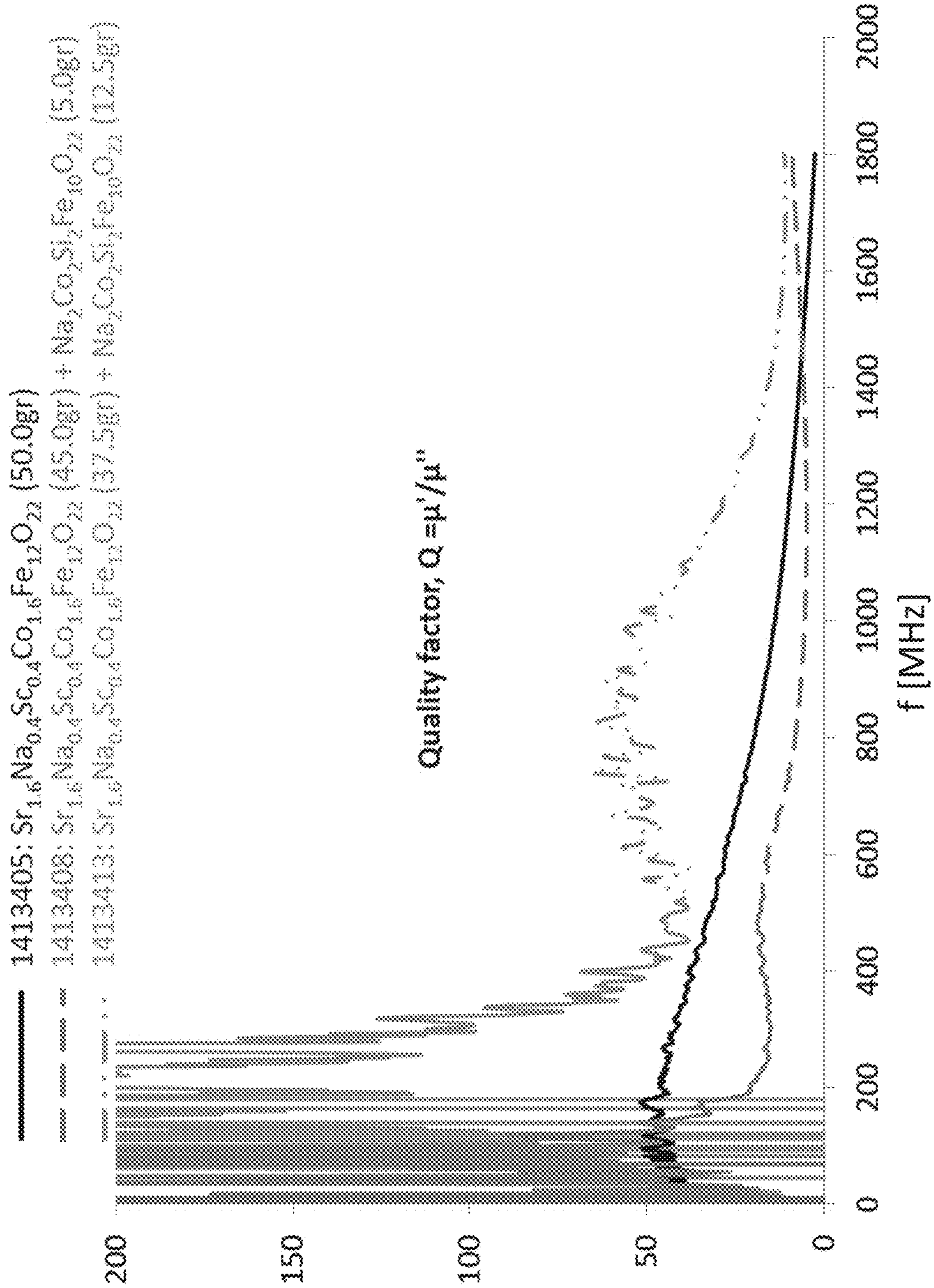
Figure 33A:
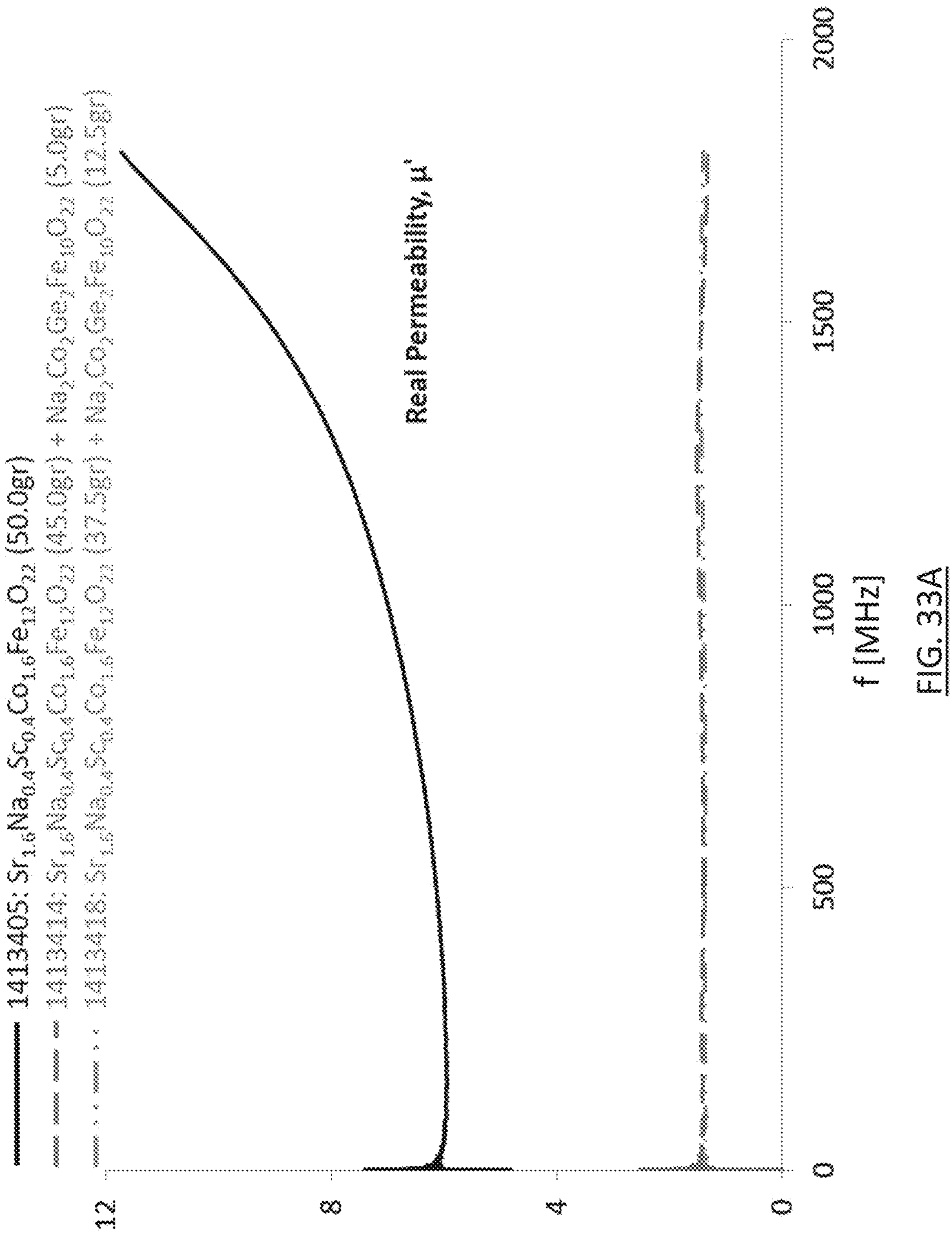
Figure 33B:
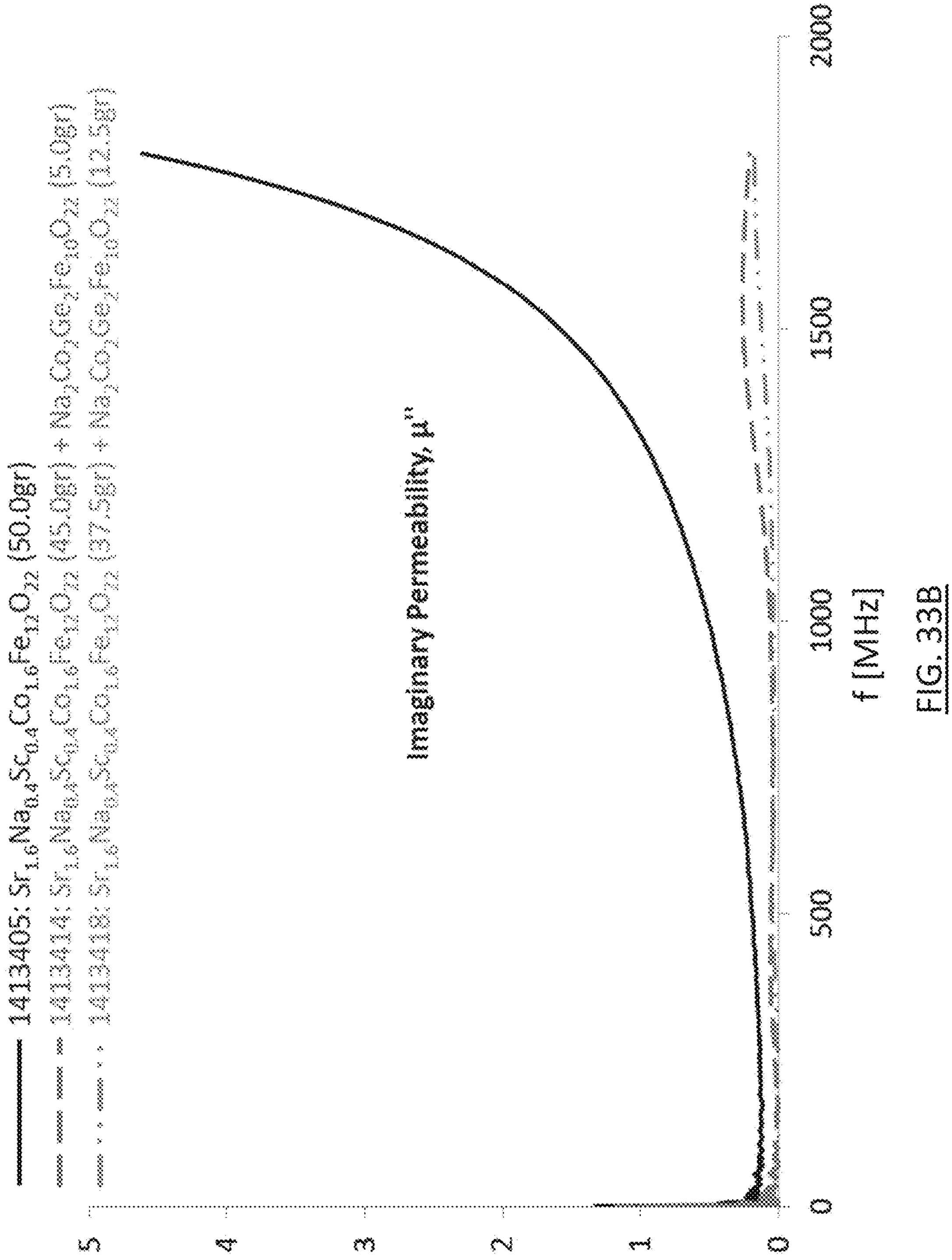
Figure 33C:
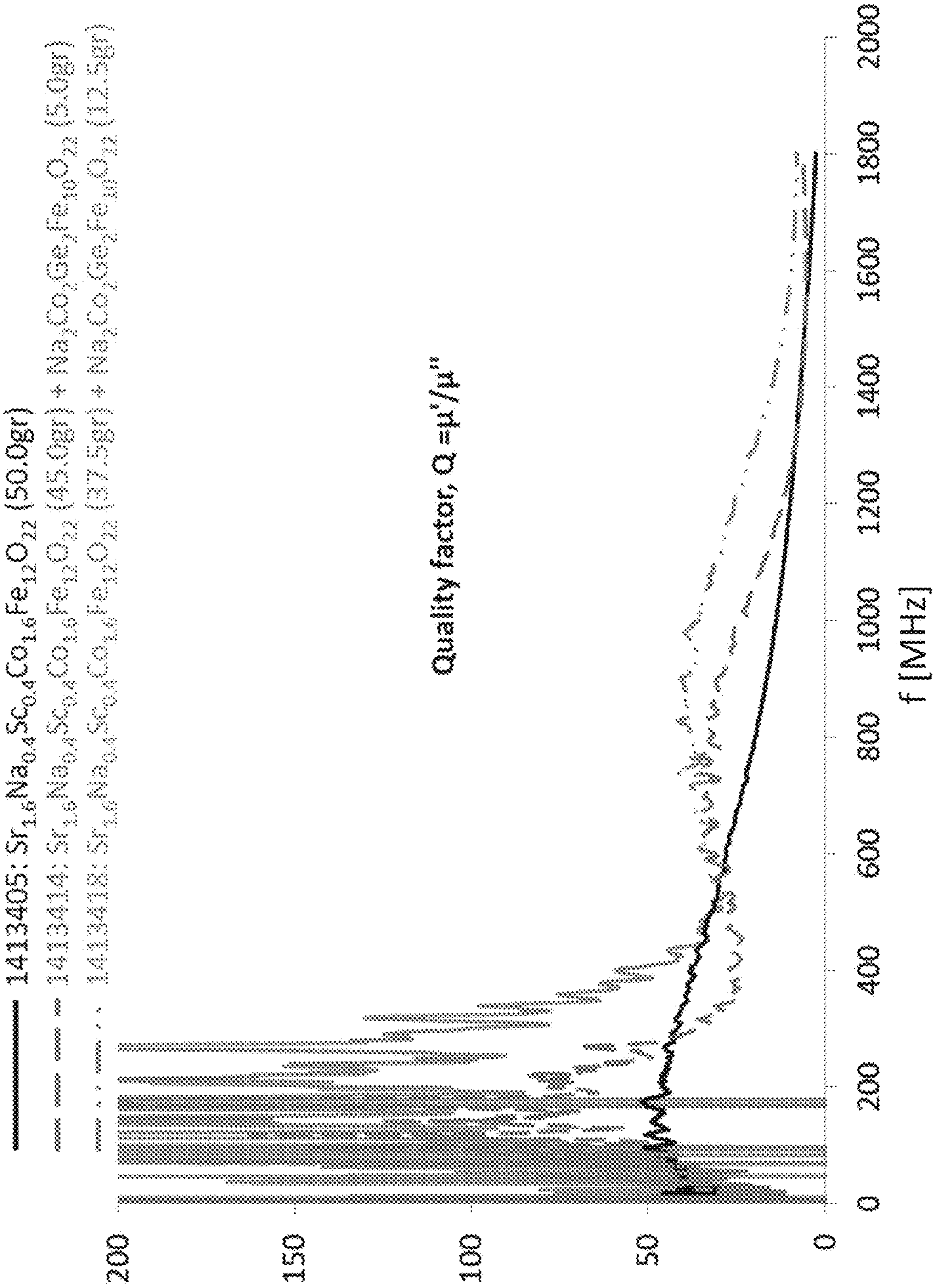
Figure 34A:
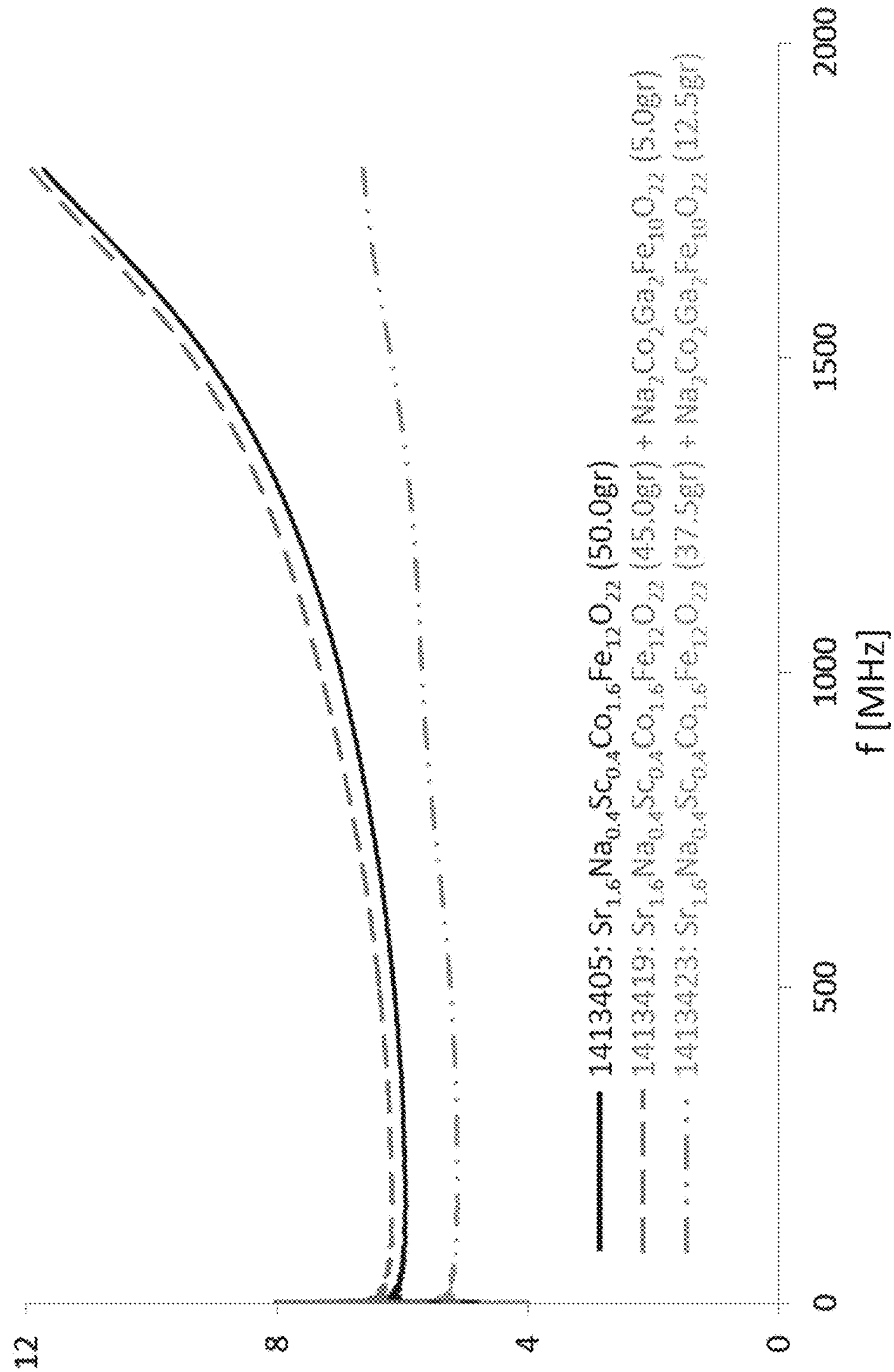
Figure 34B:
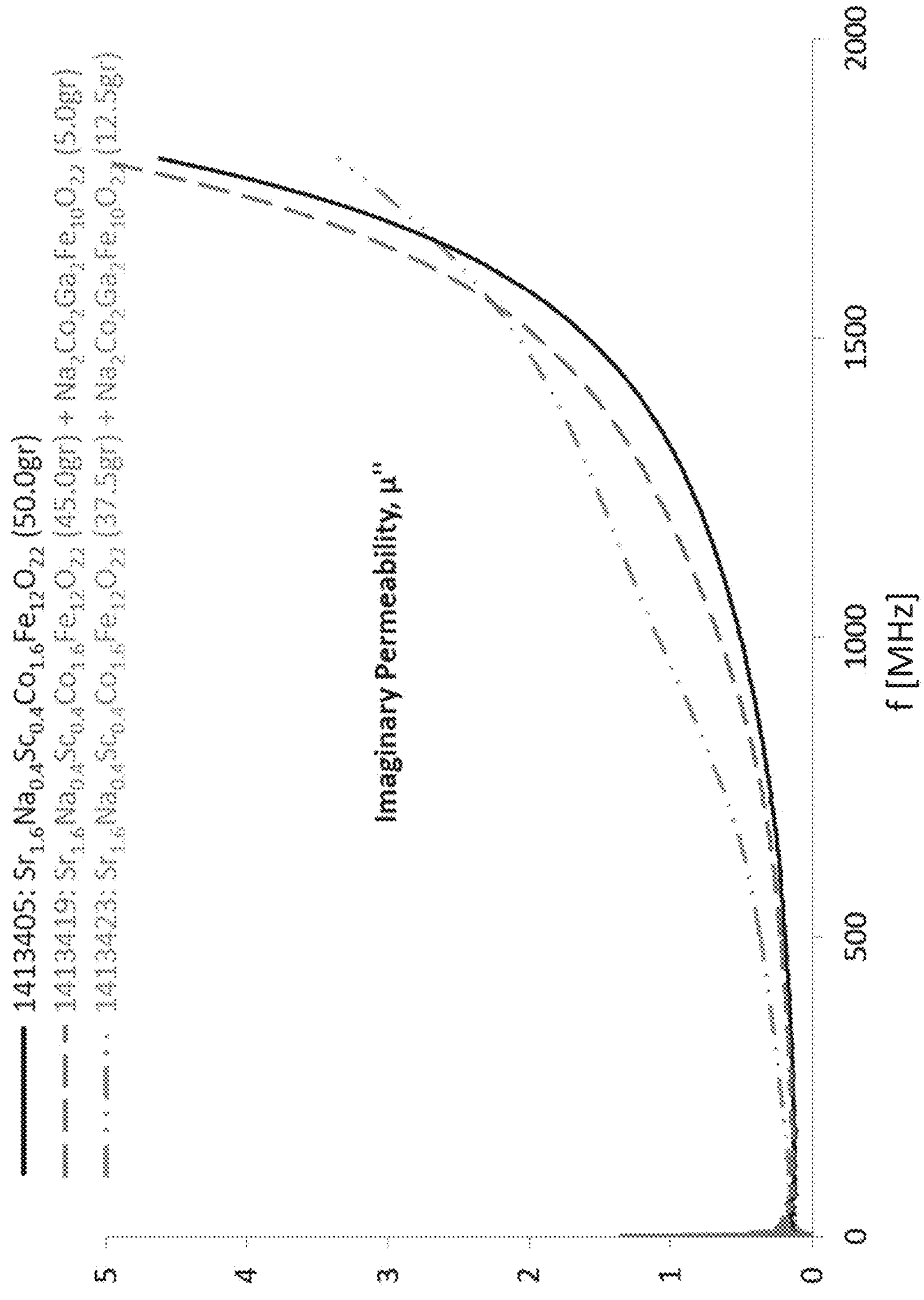
Figure 34C:
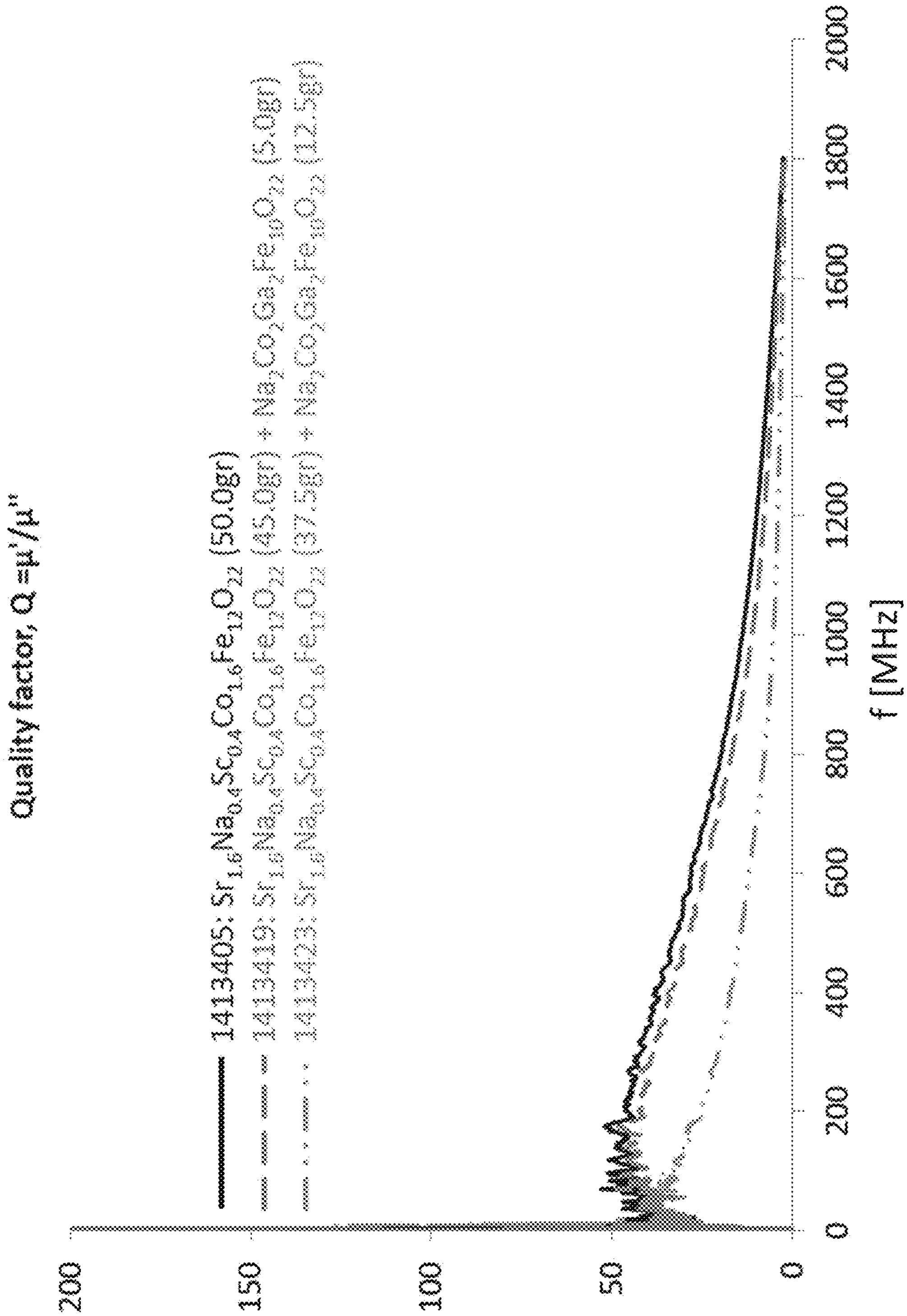
Figure 35A:
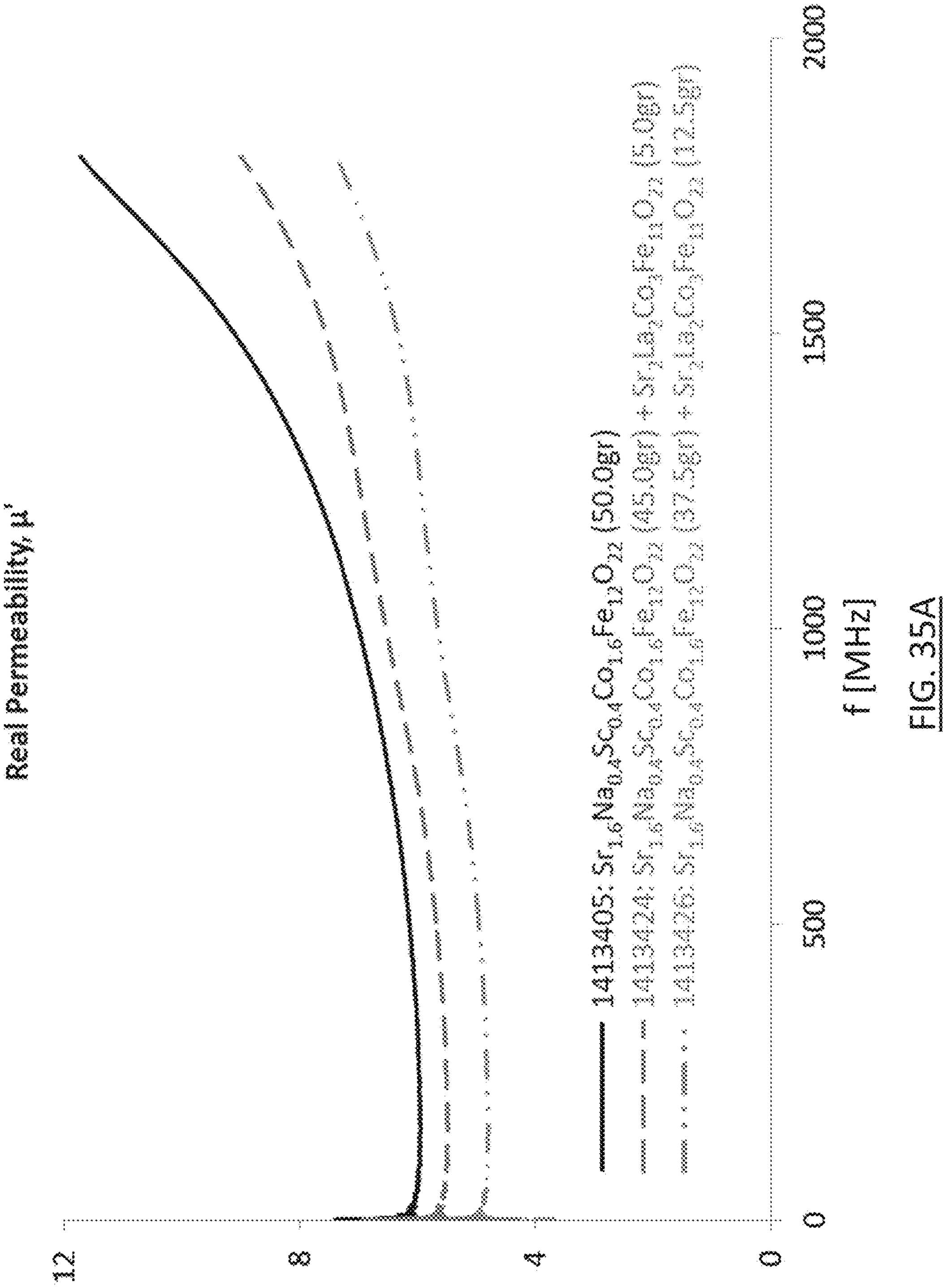
Figure 35B:
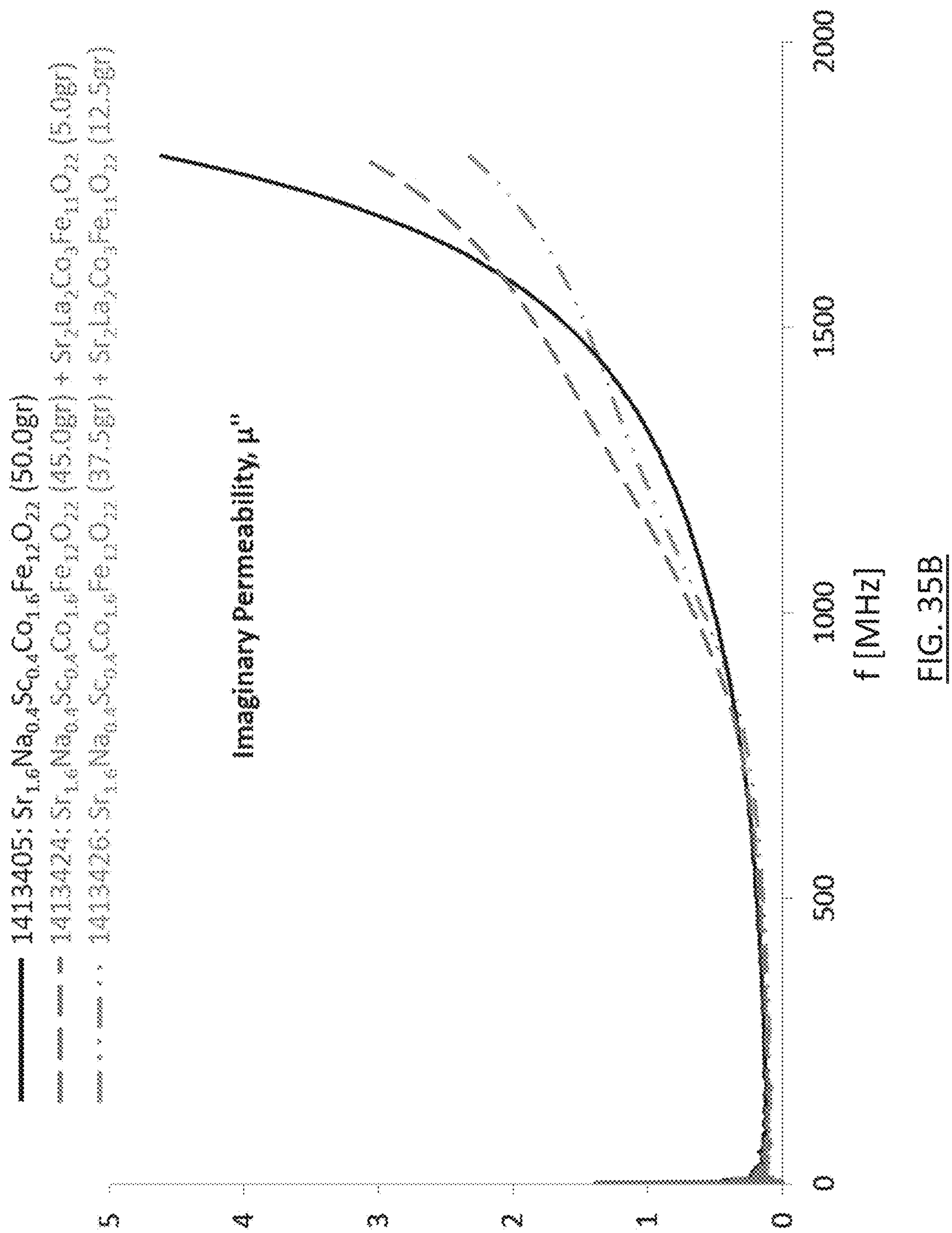
Figure 35C:
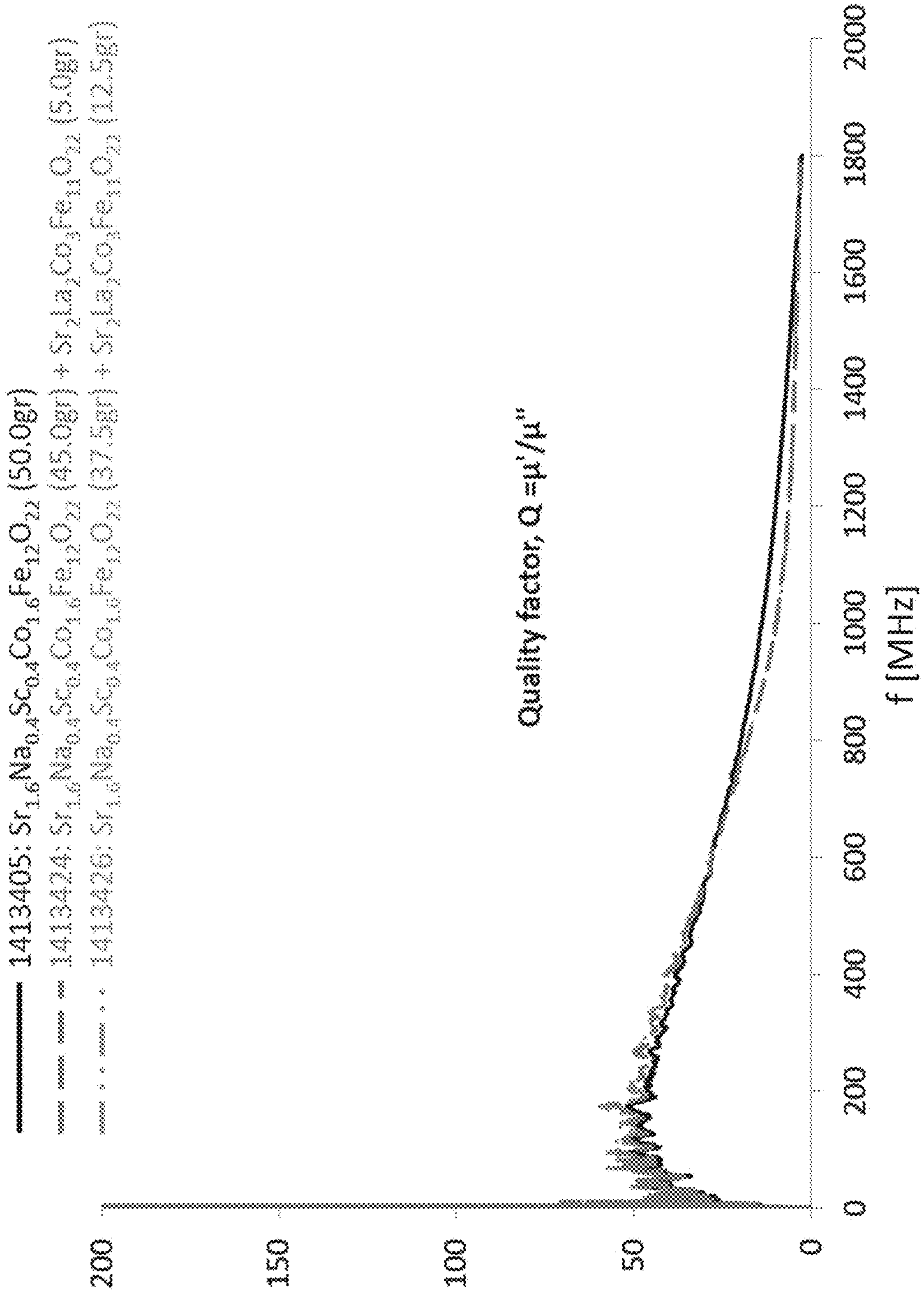
Figure 36A:
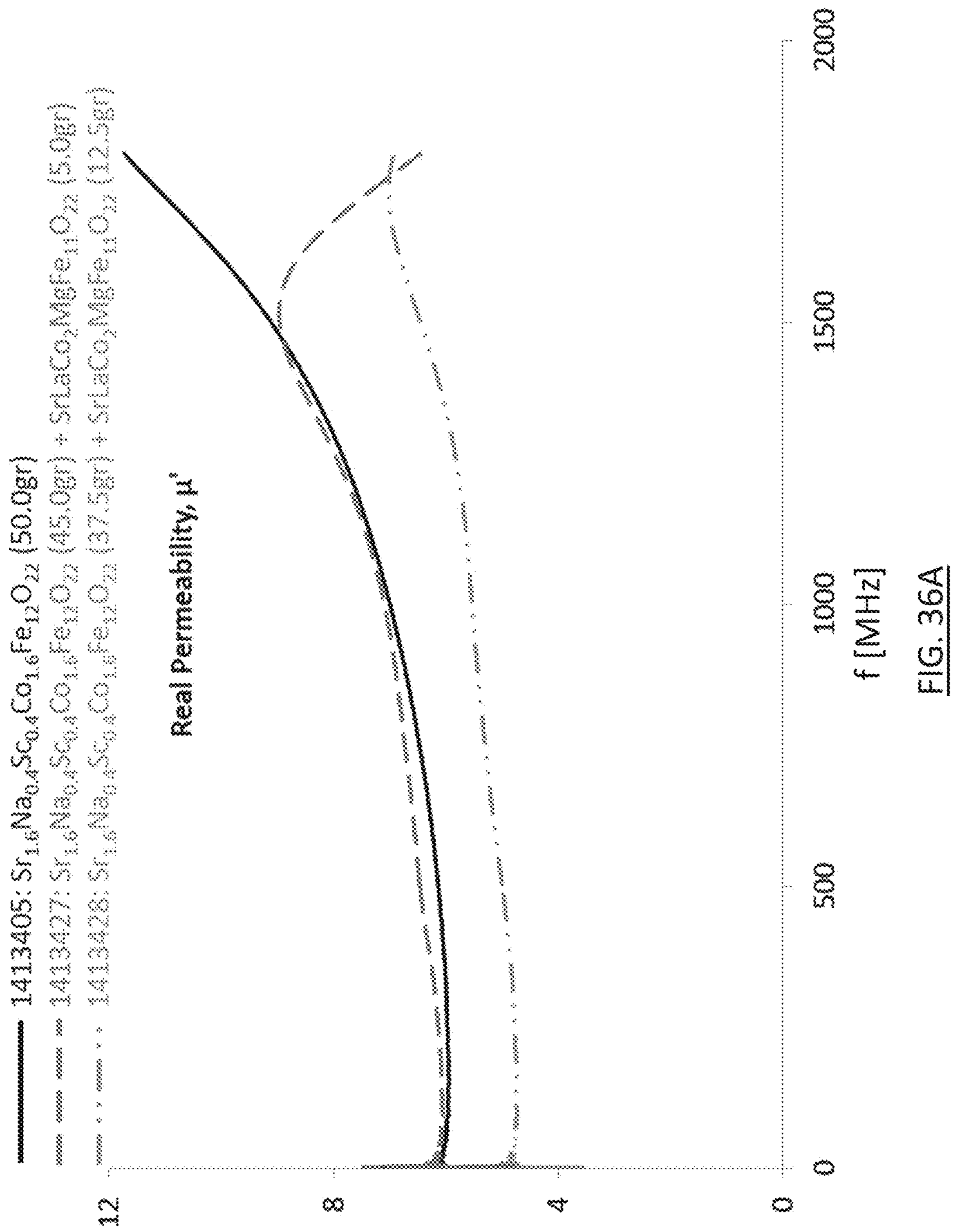
Figure 36B:
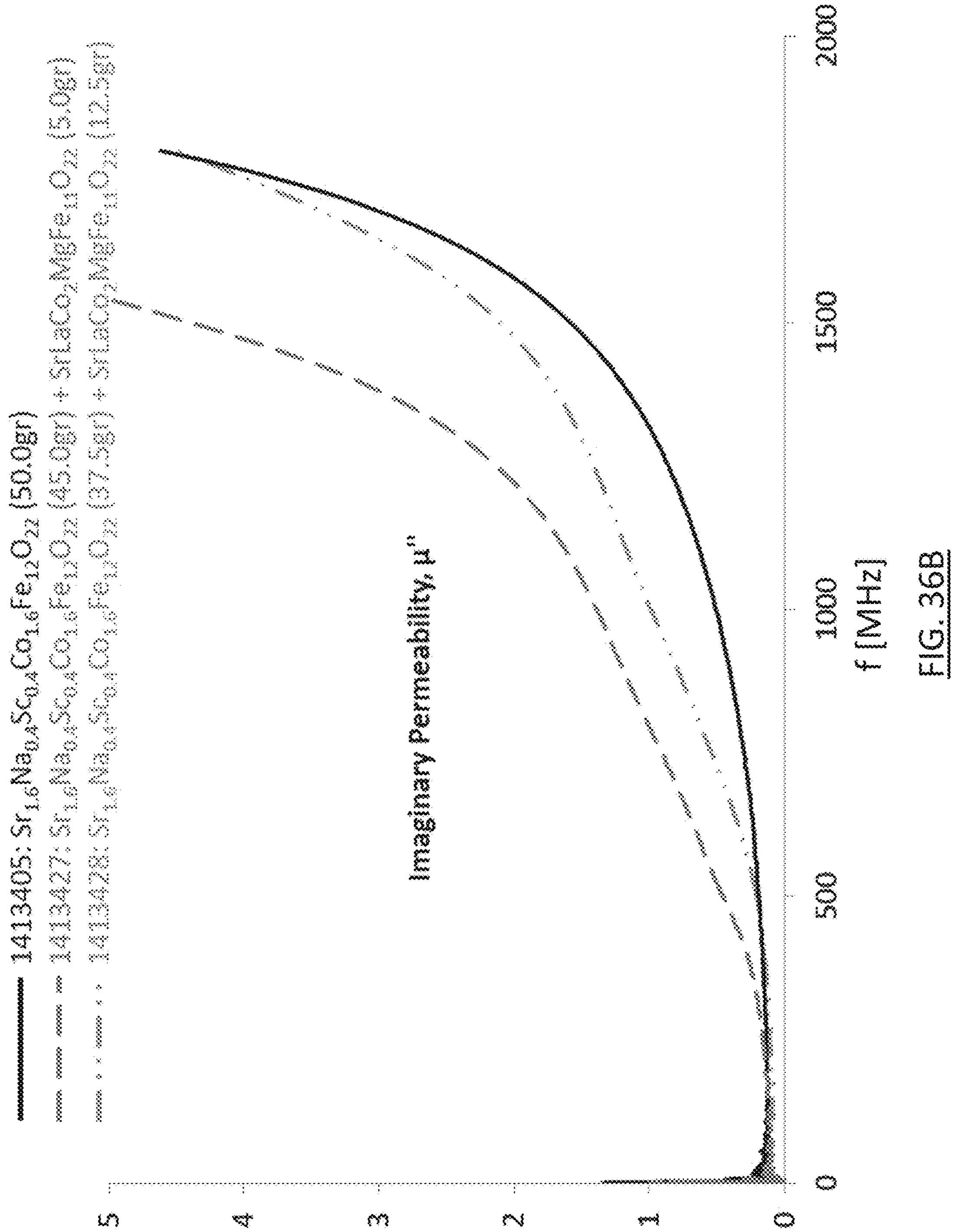
Figure 36C:
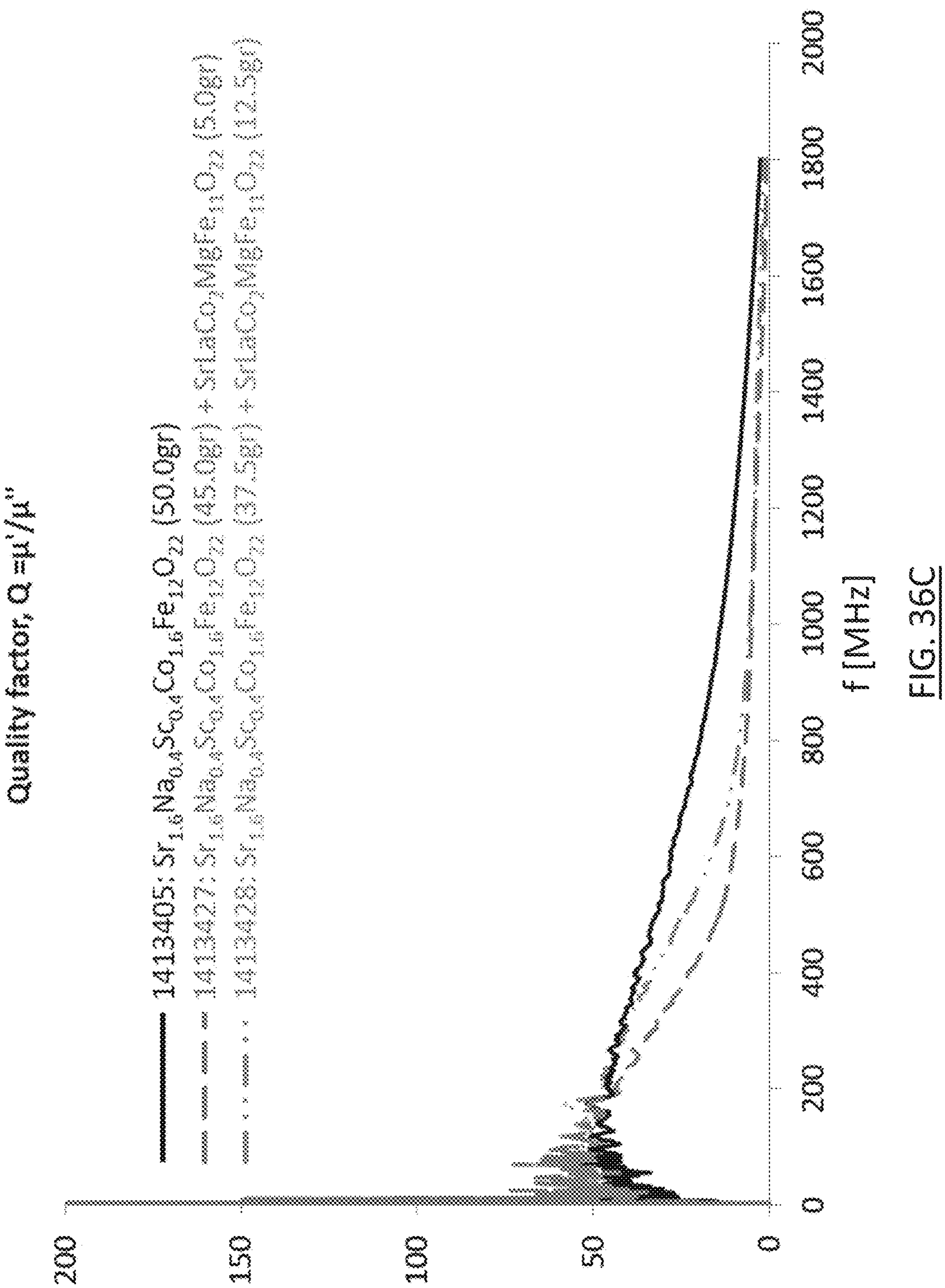
Figure 37A:
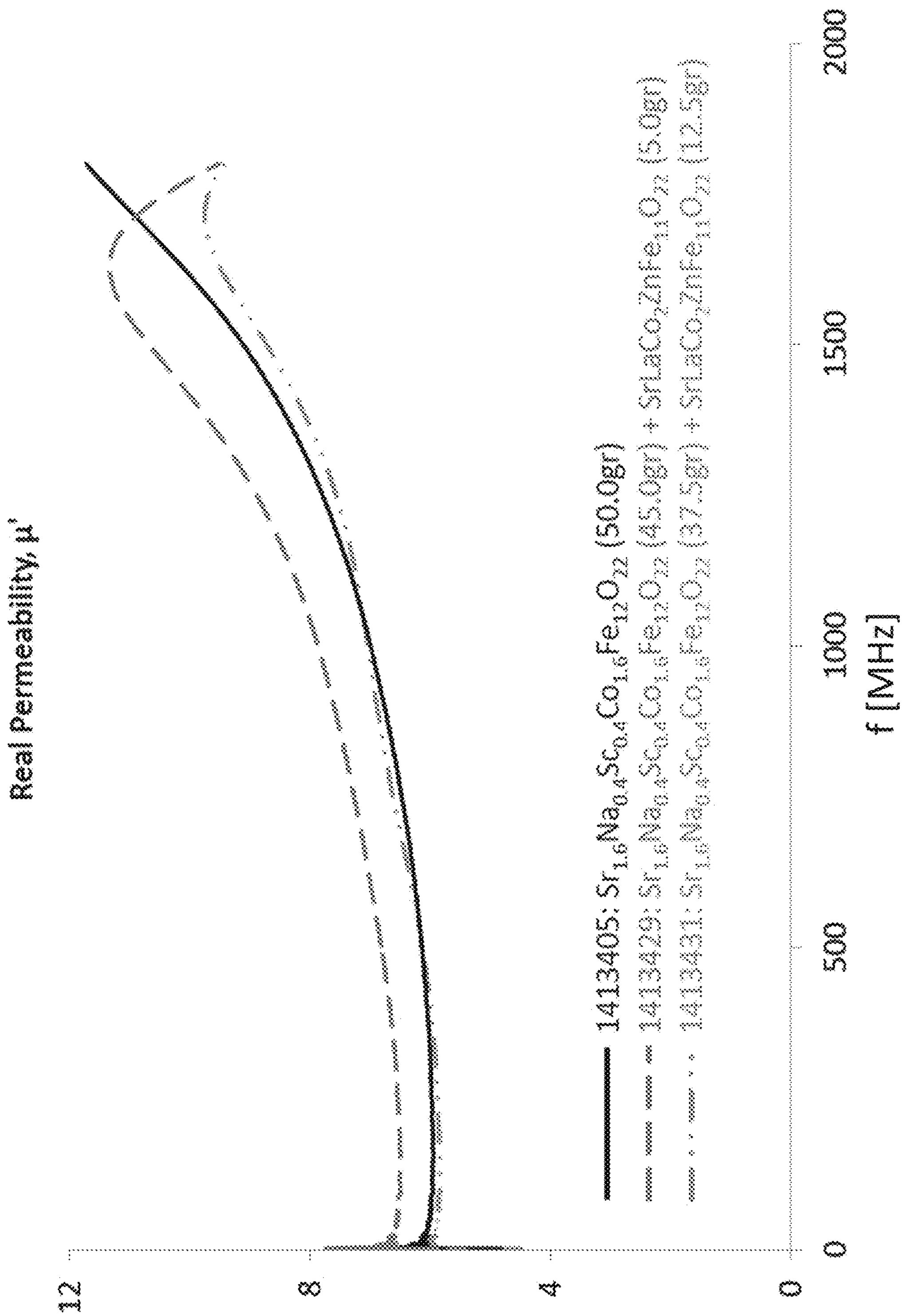
Figure 37B:
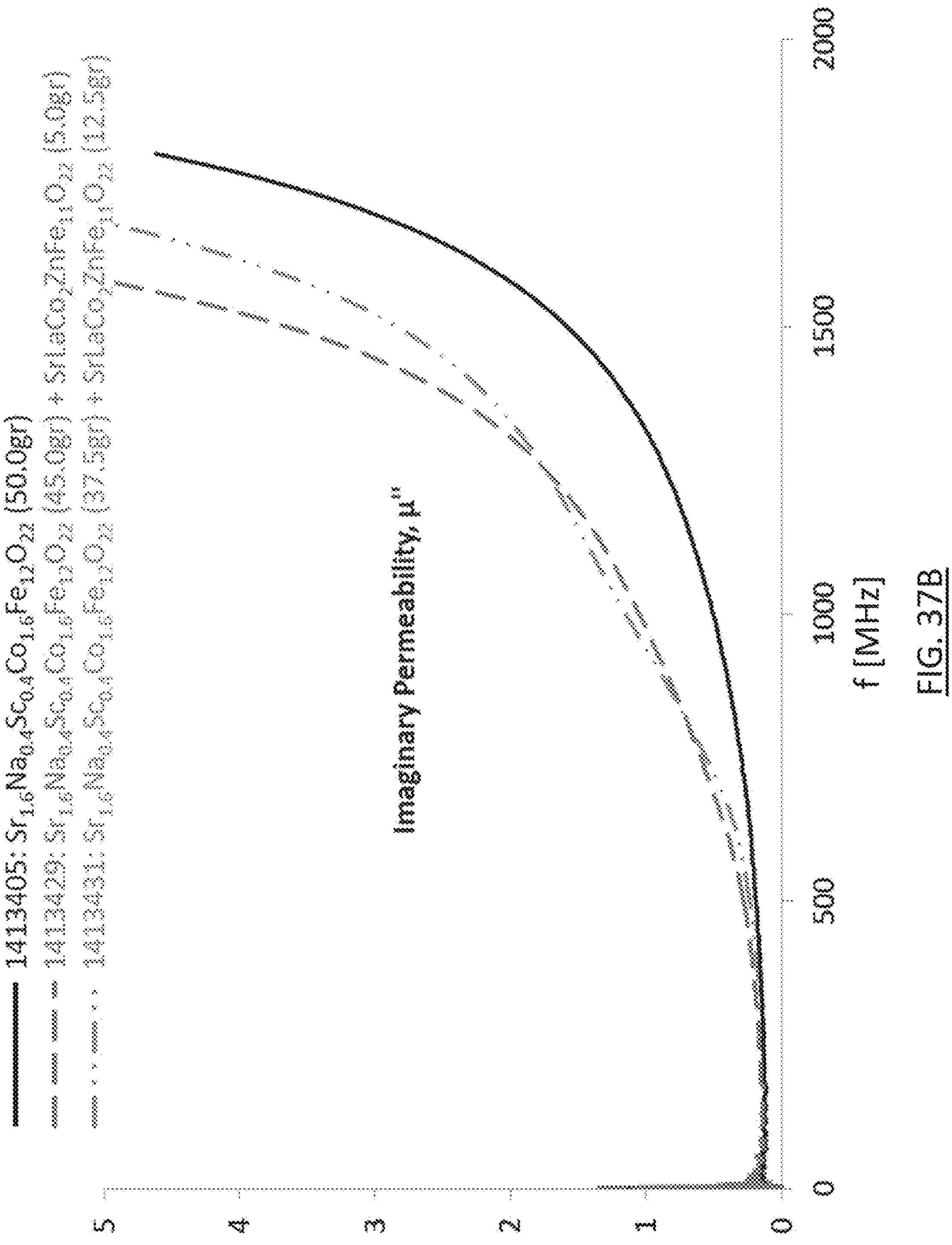
Figure 37C:
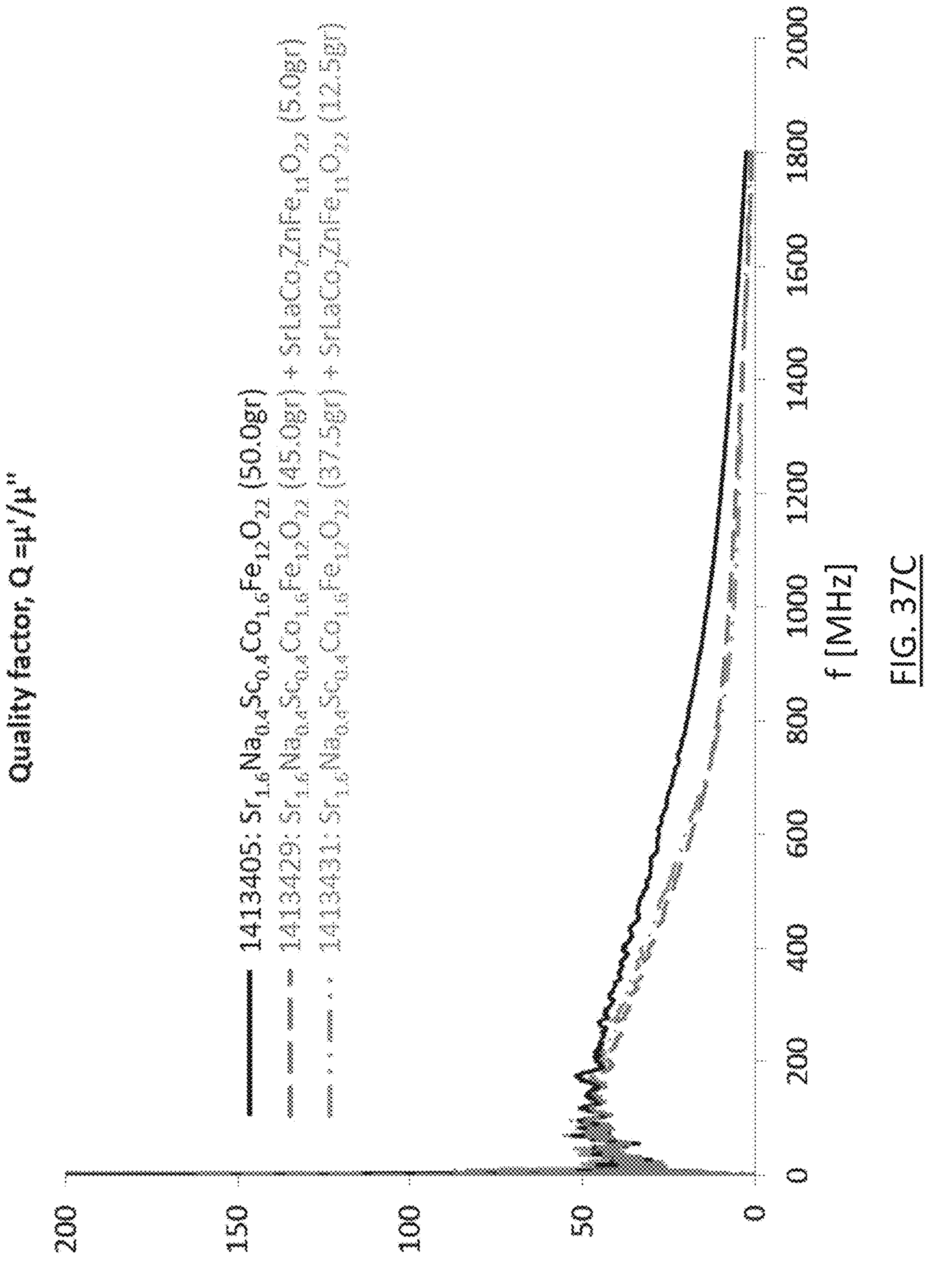
Figure 38A:
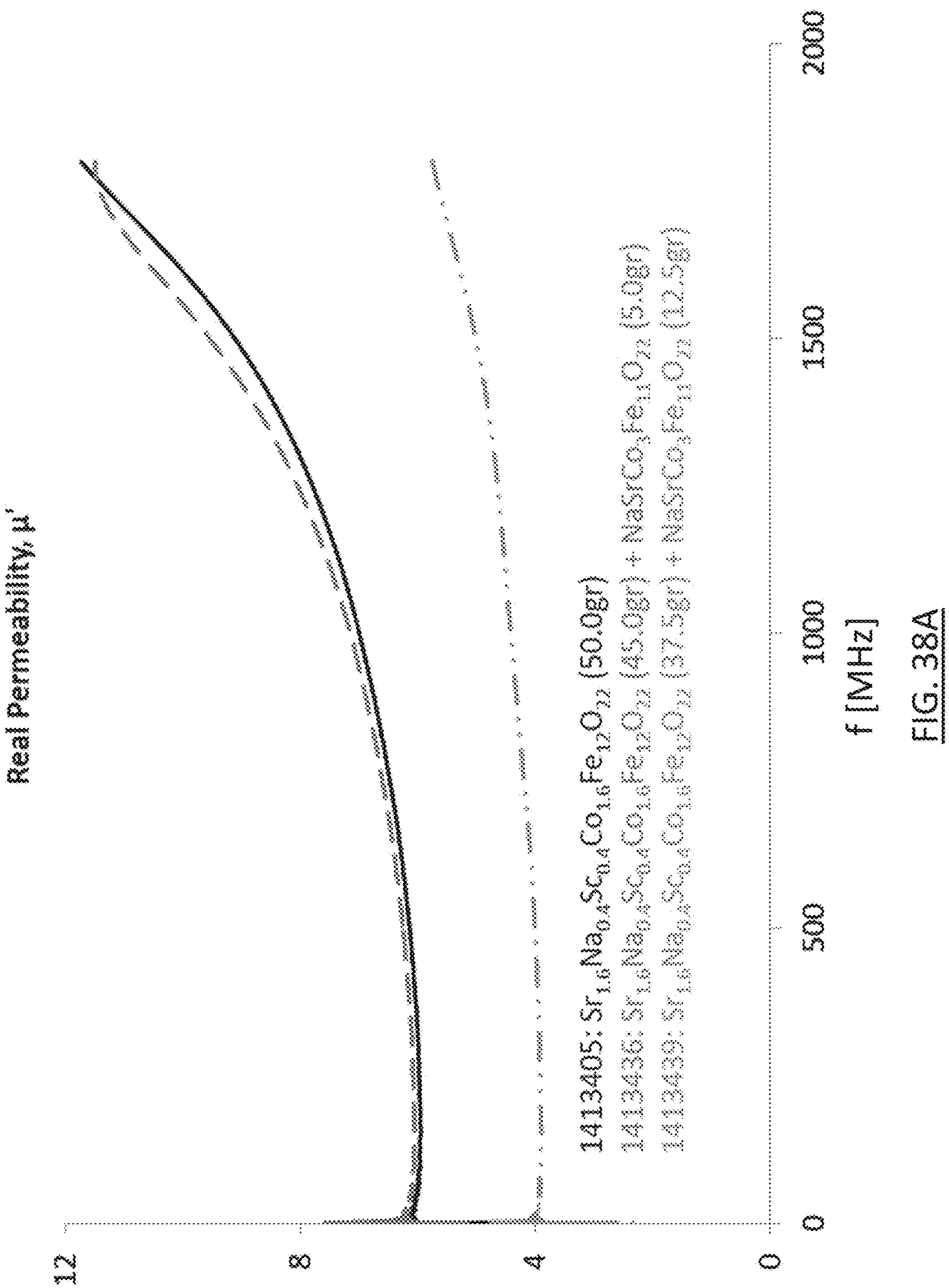
Figure 38B:
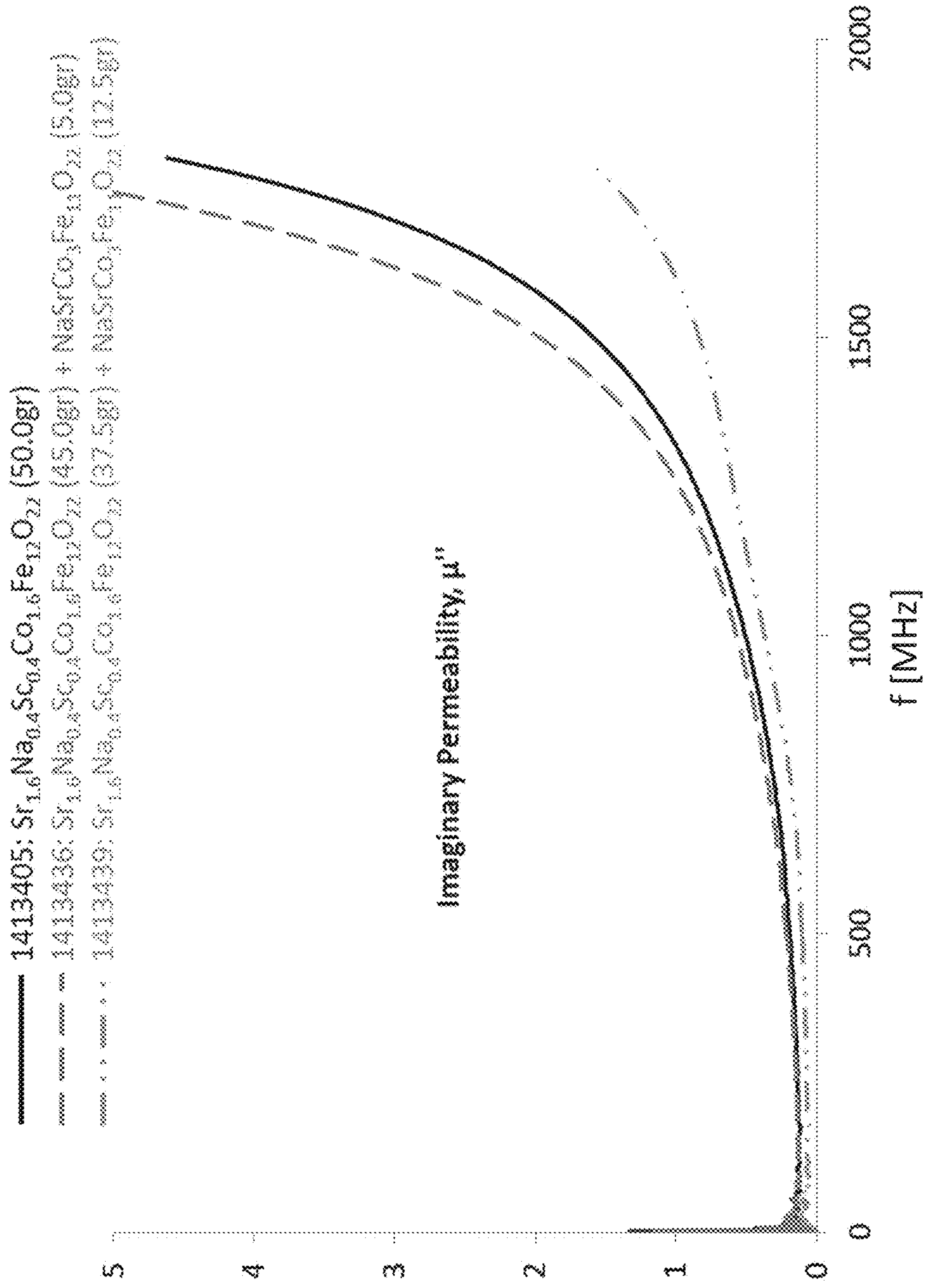
Figure 38C:
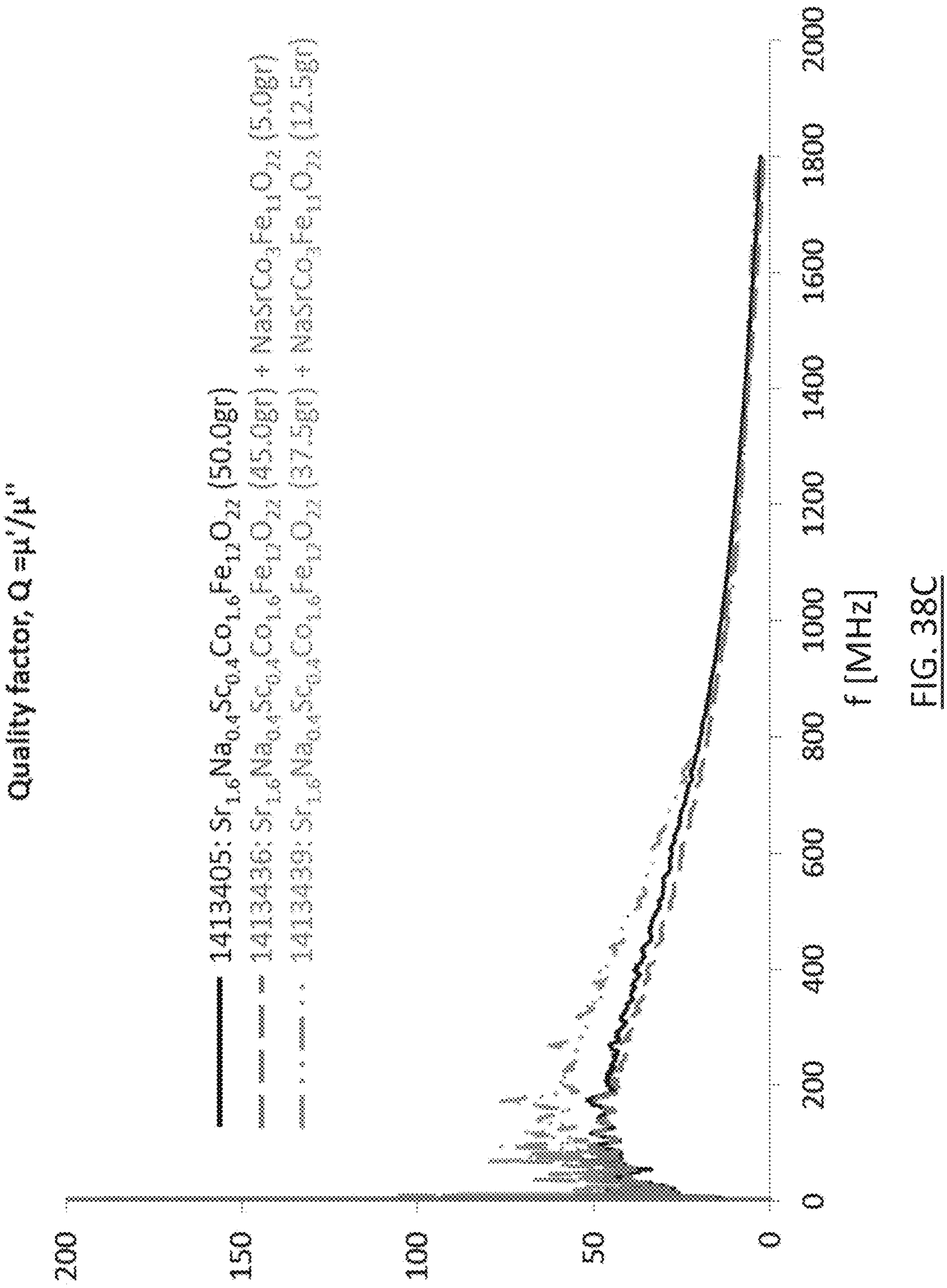
Figure 39A:
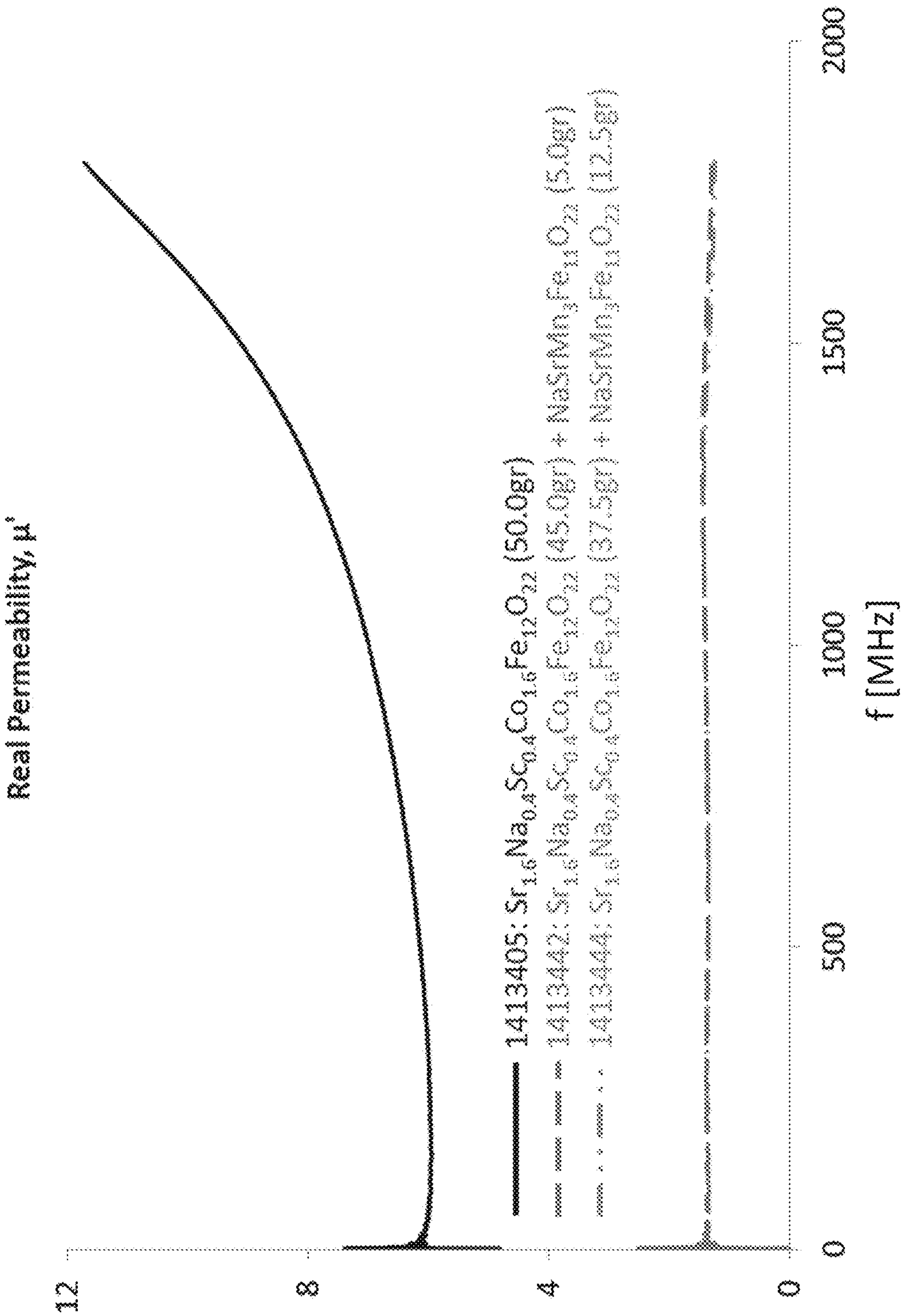
Figure 39B:
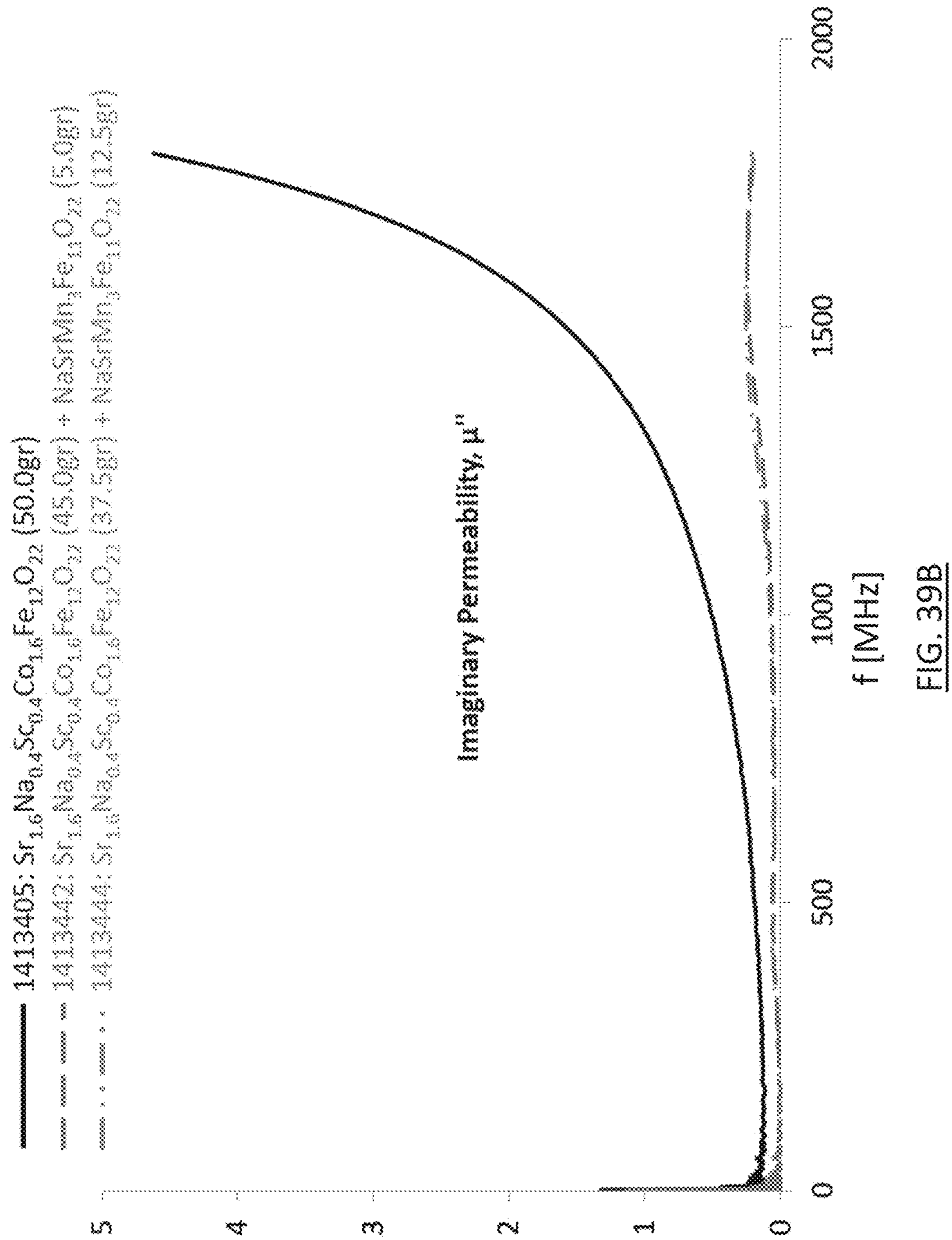
Figure 39C:
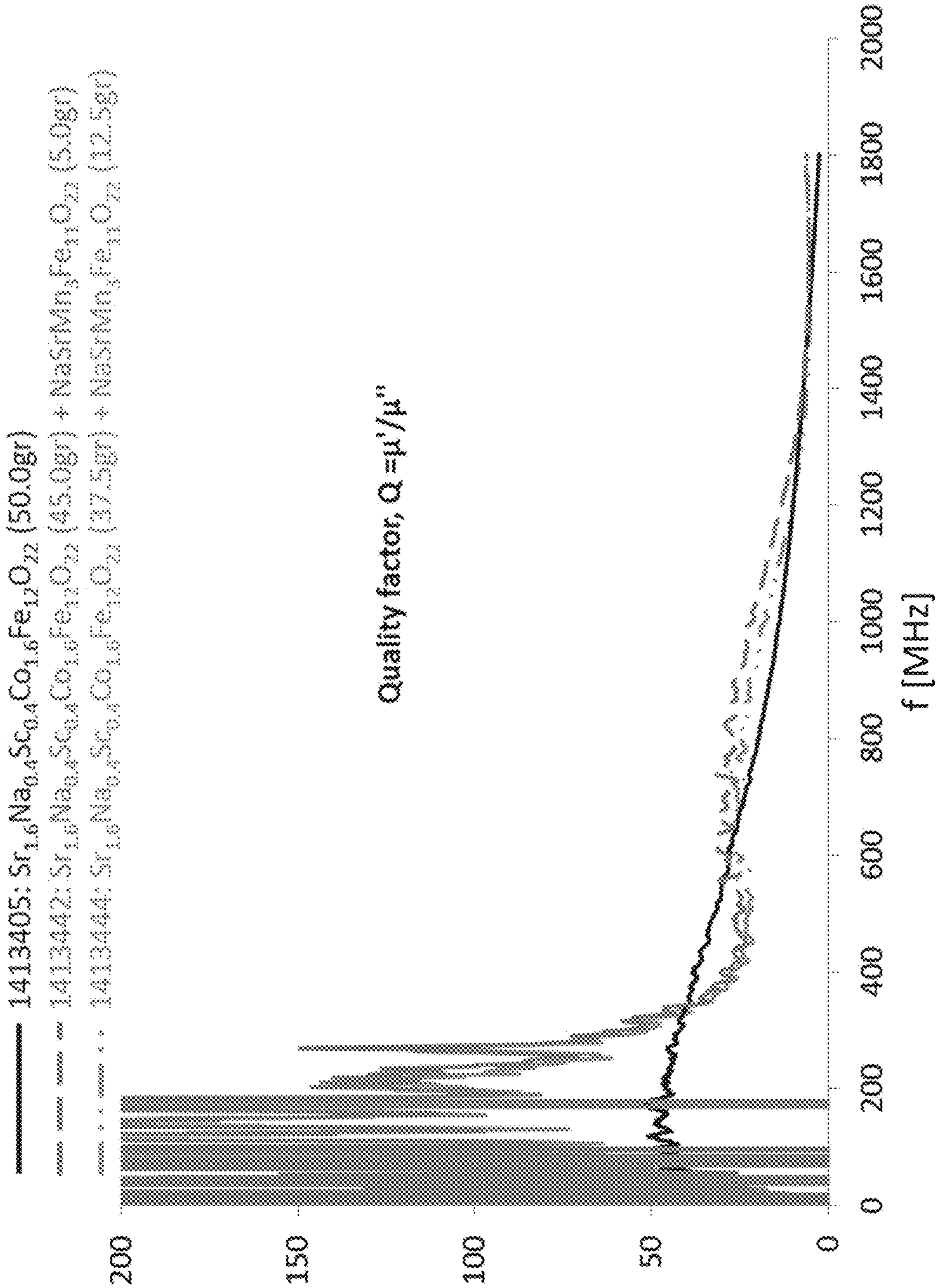
Figure 40A:
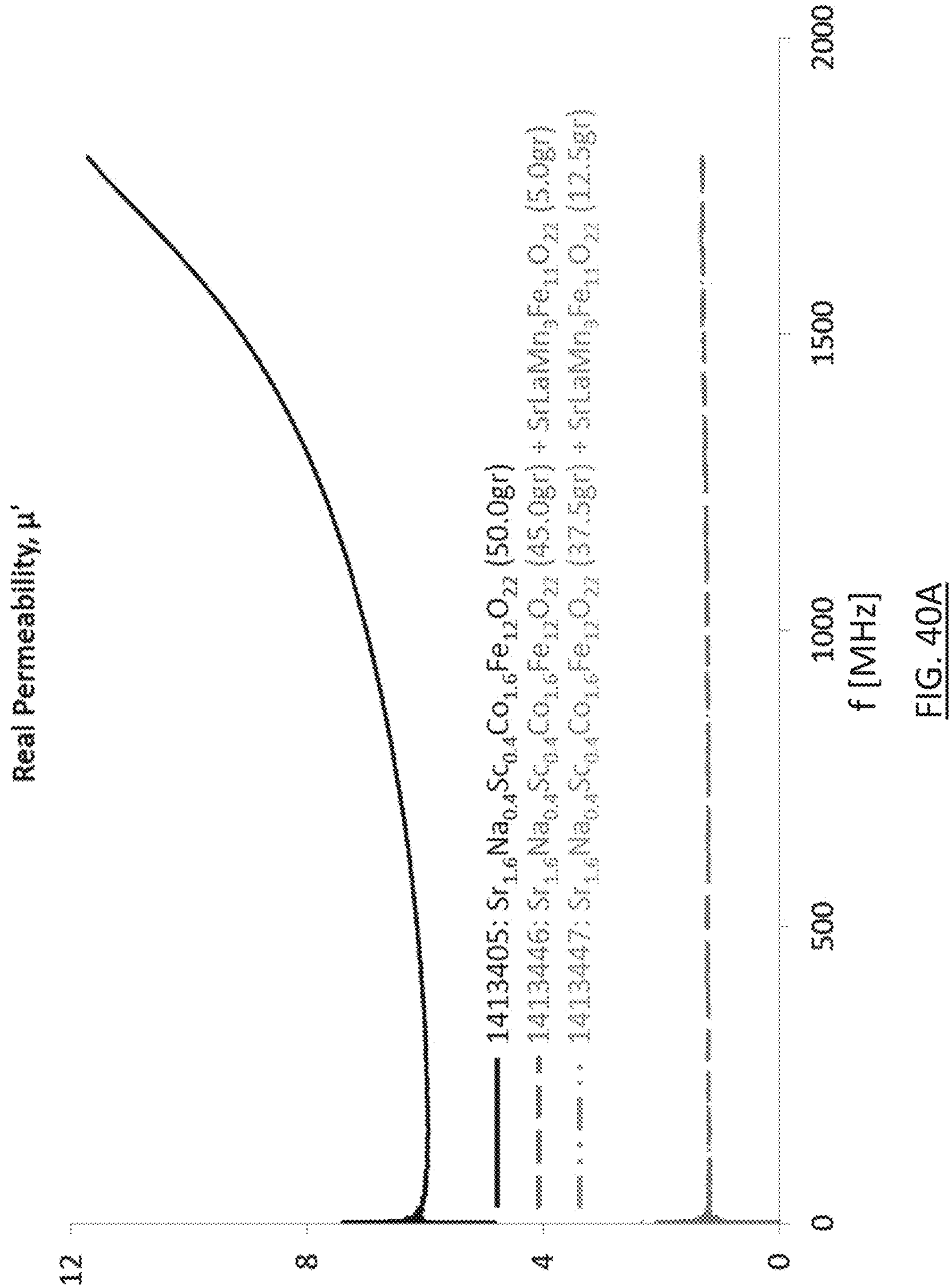
Figure 40B:
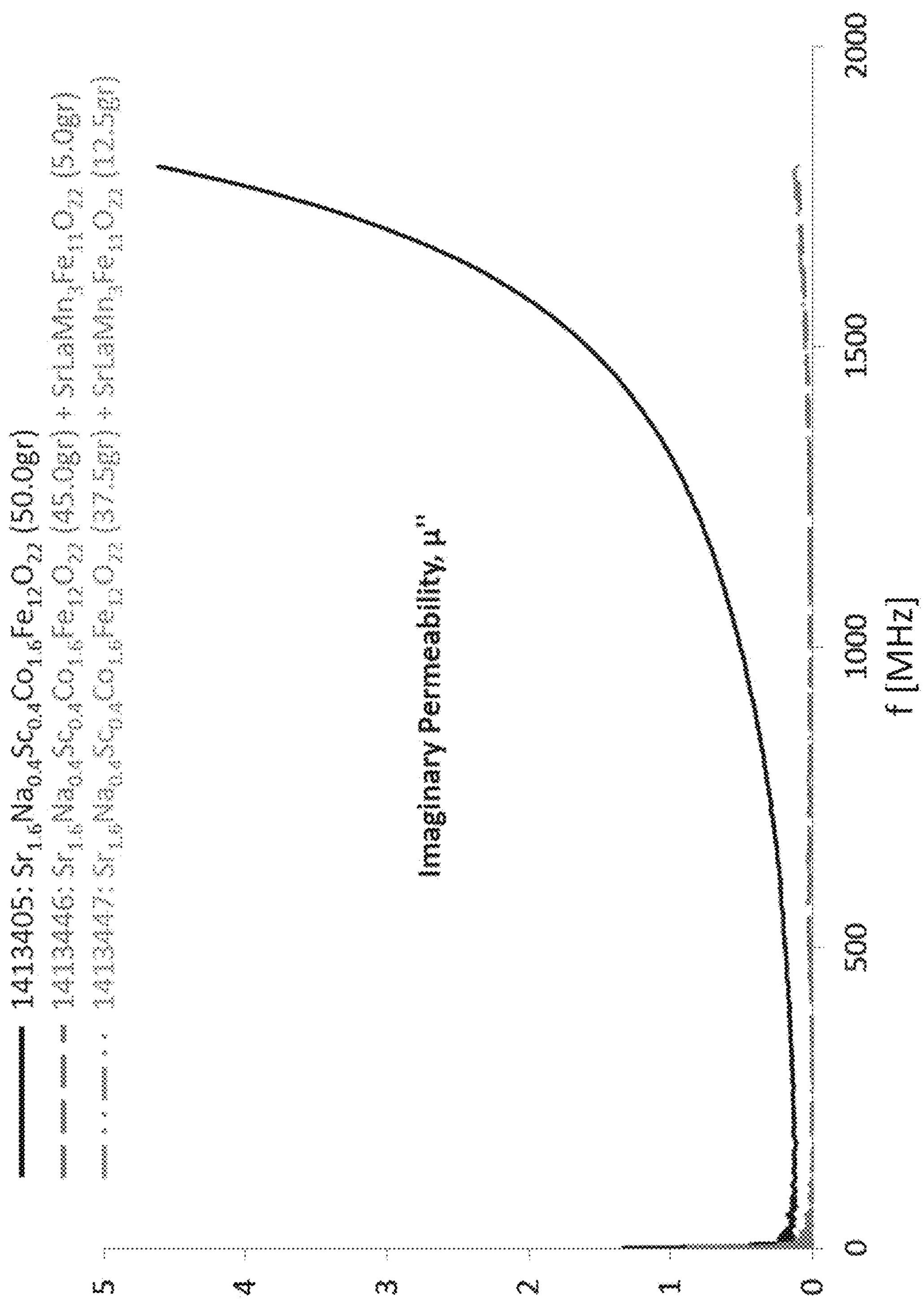
Figure 40C:
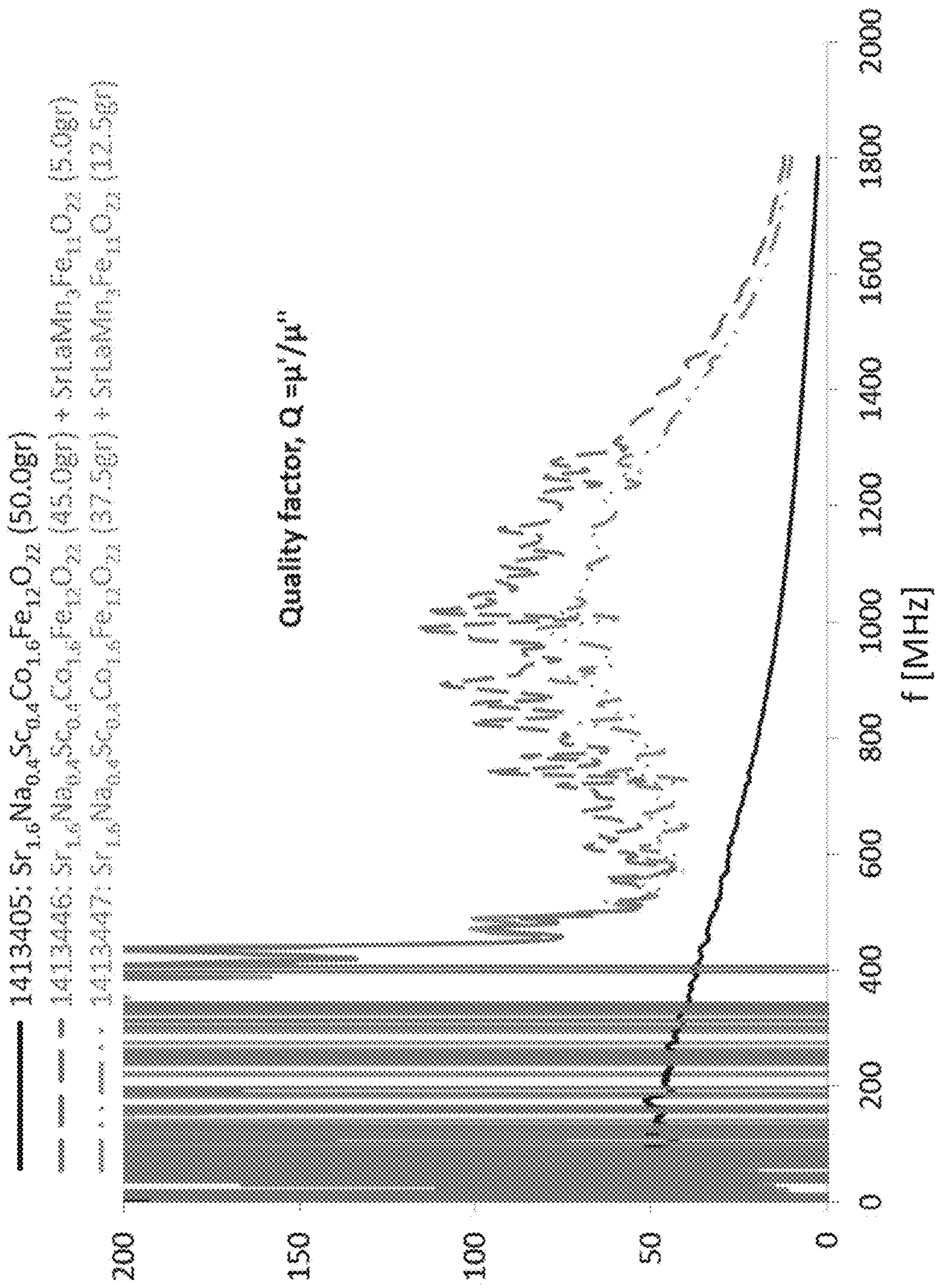
Figure 41A:
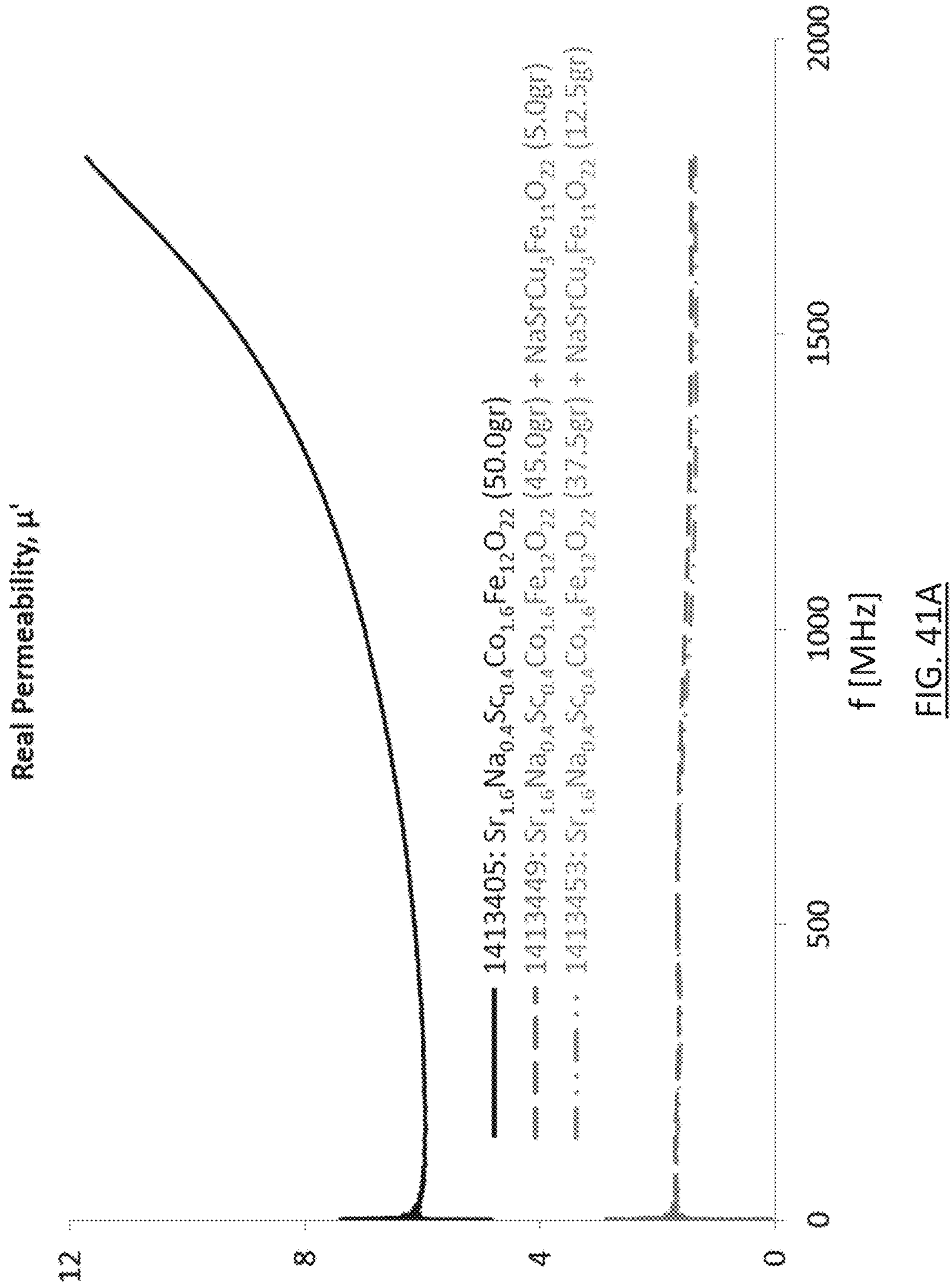
Figure 41B:
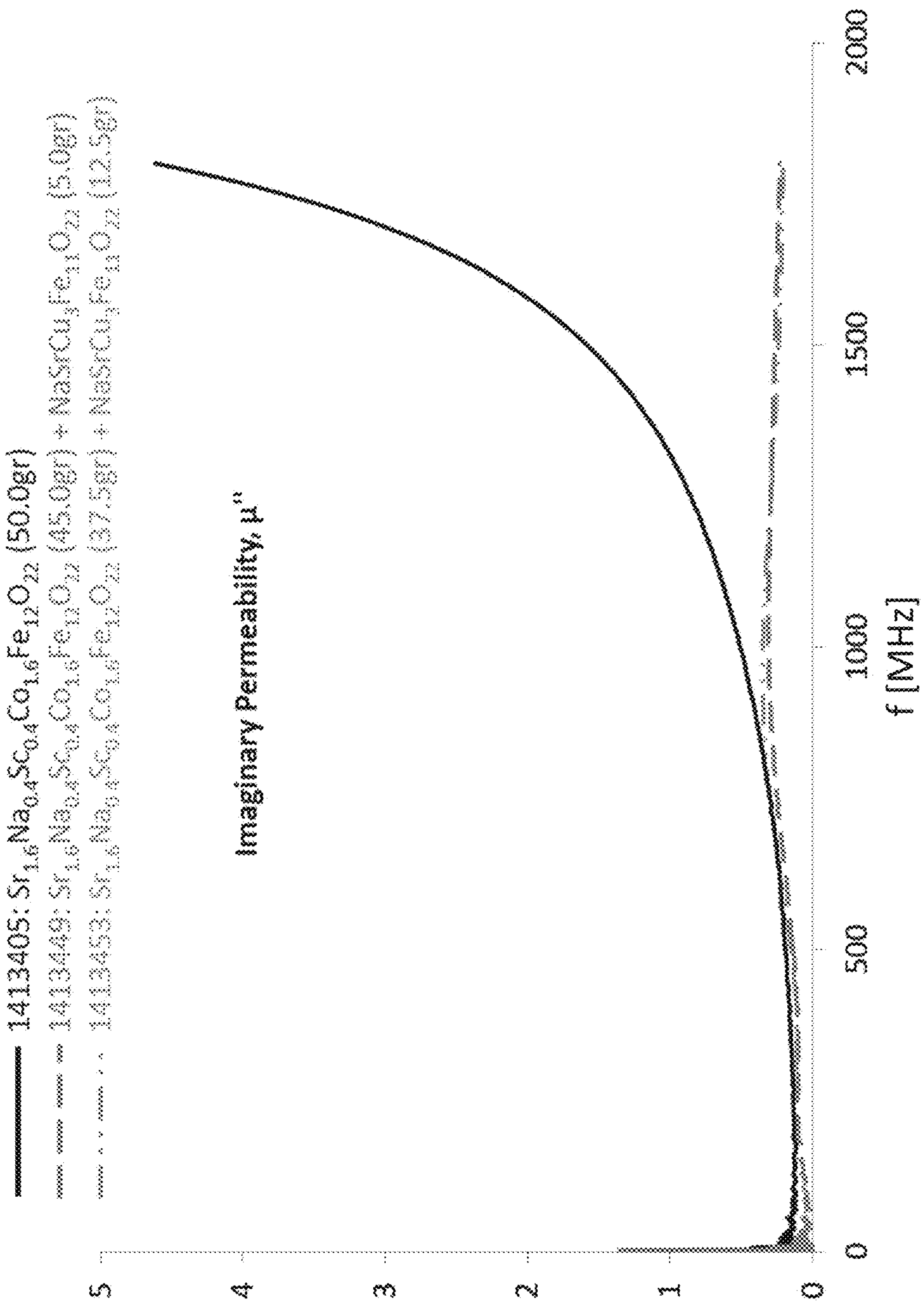
Figure 41C:
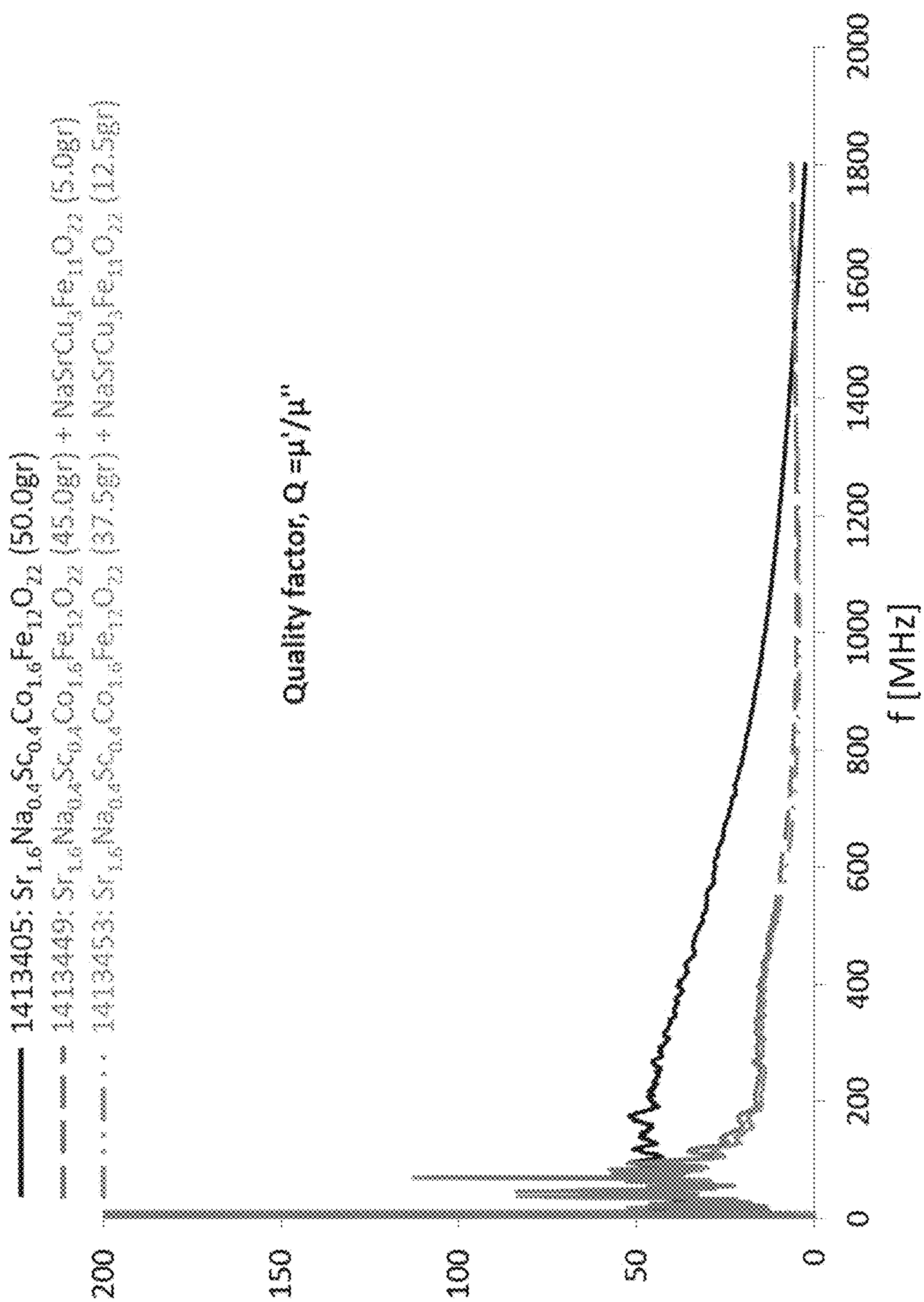
Figure 42A:
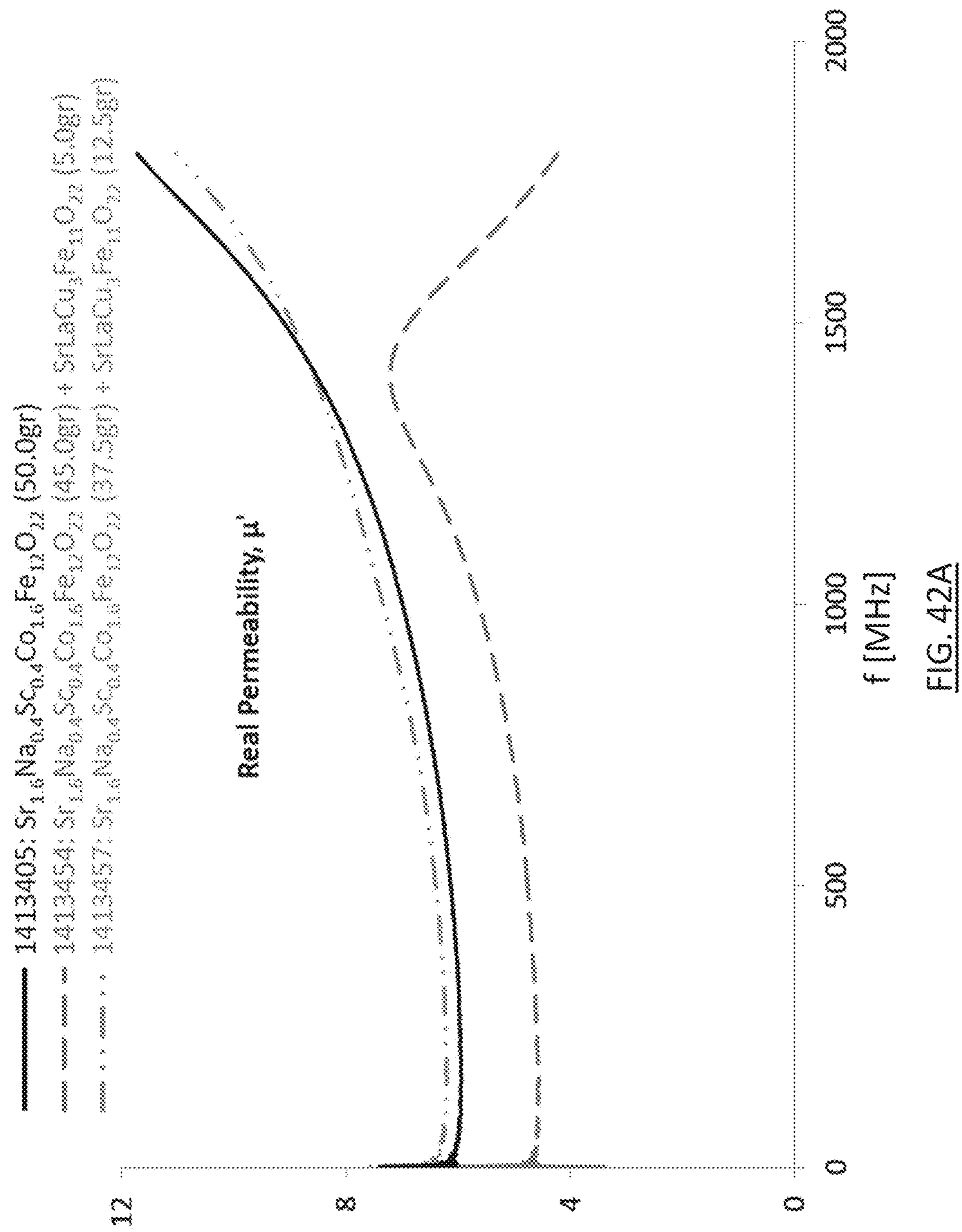
Figure 42B:
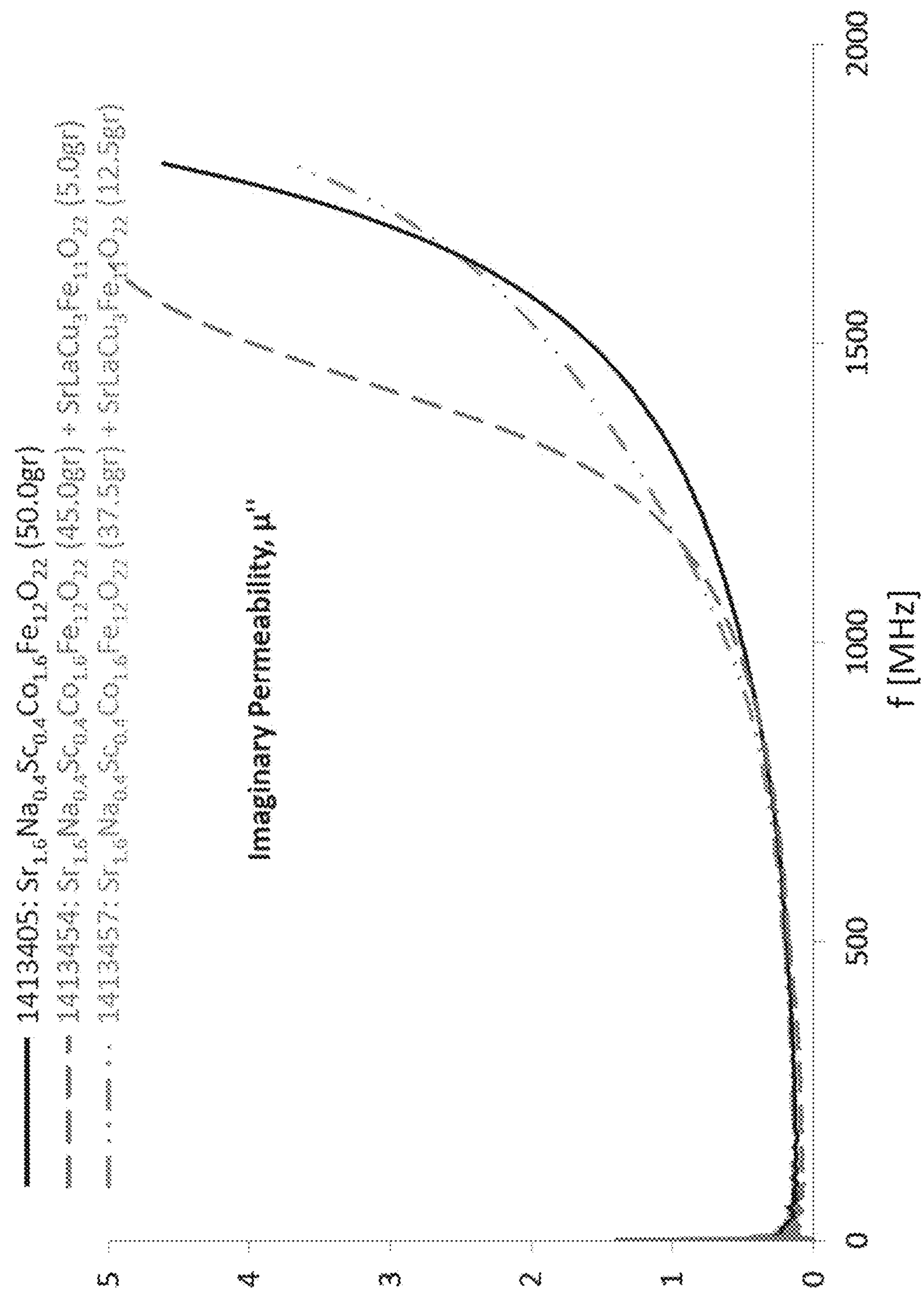
Figure 42C:
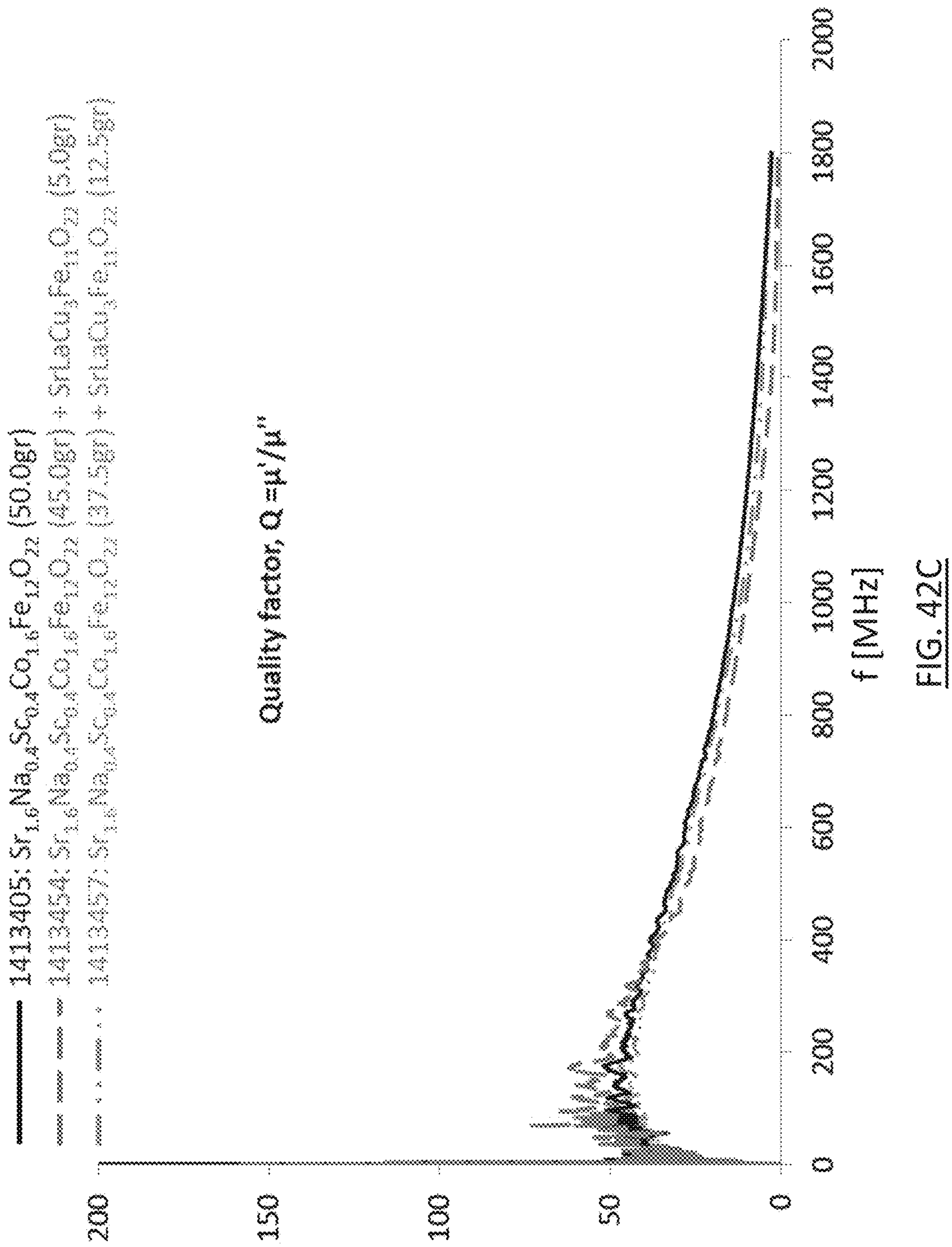
Figure 43A:
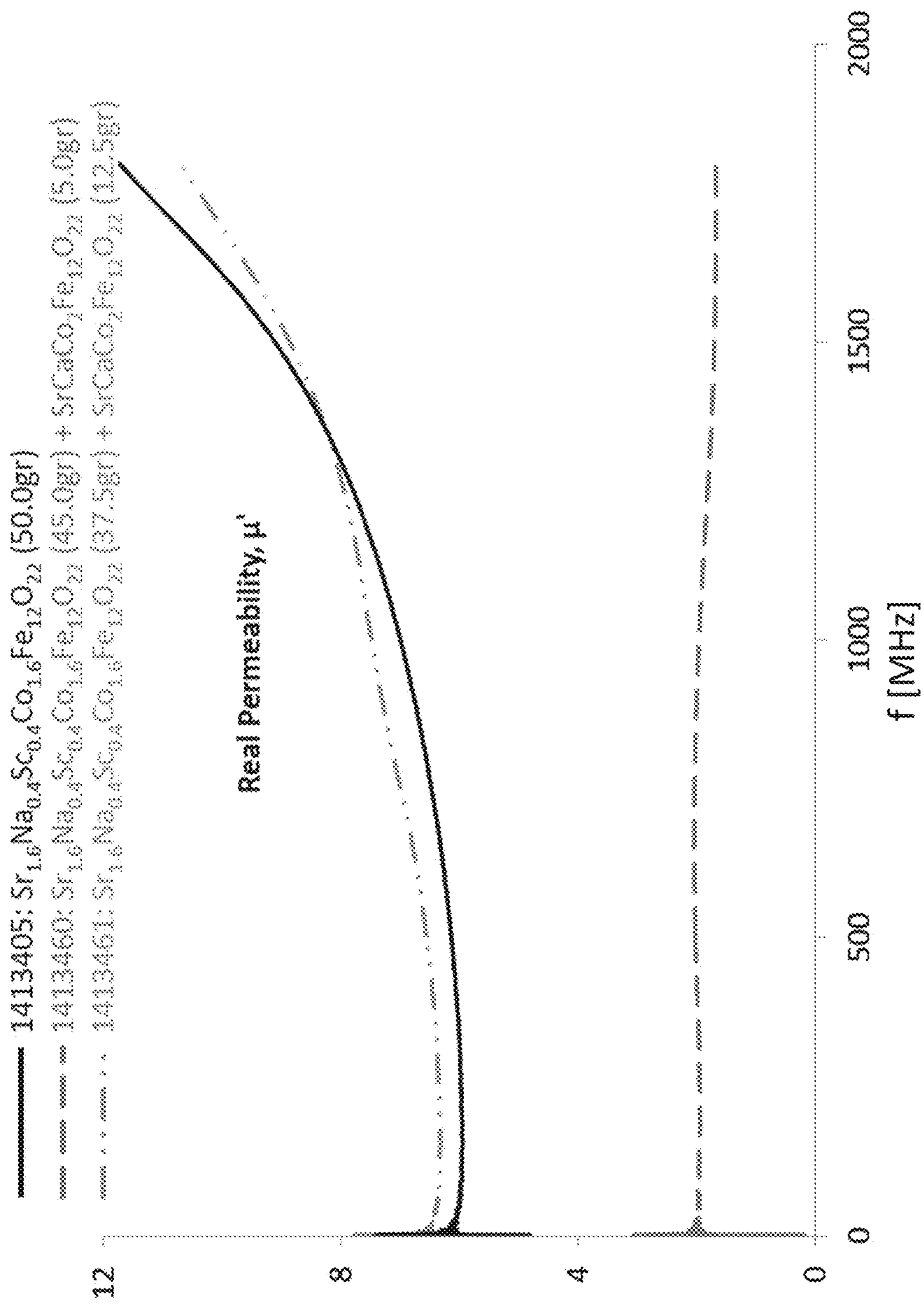
Figure 43B:
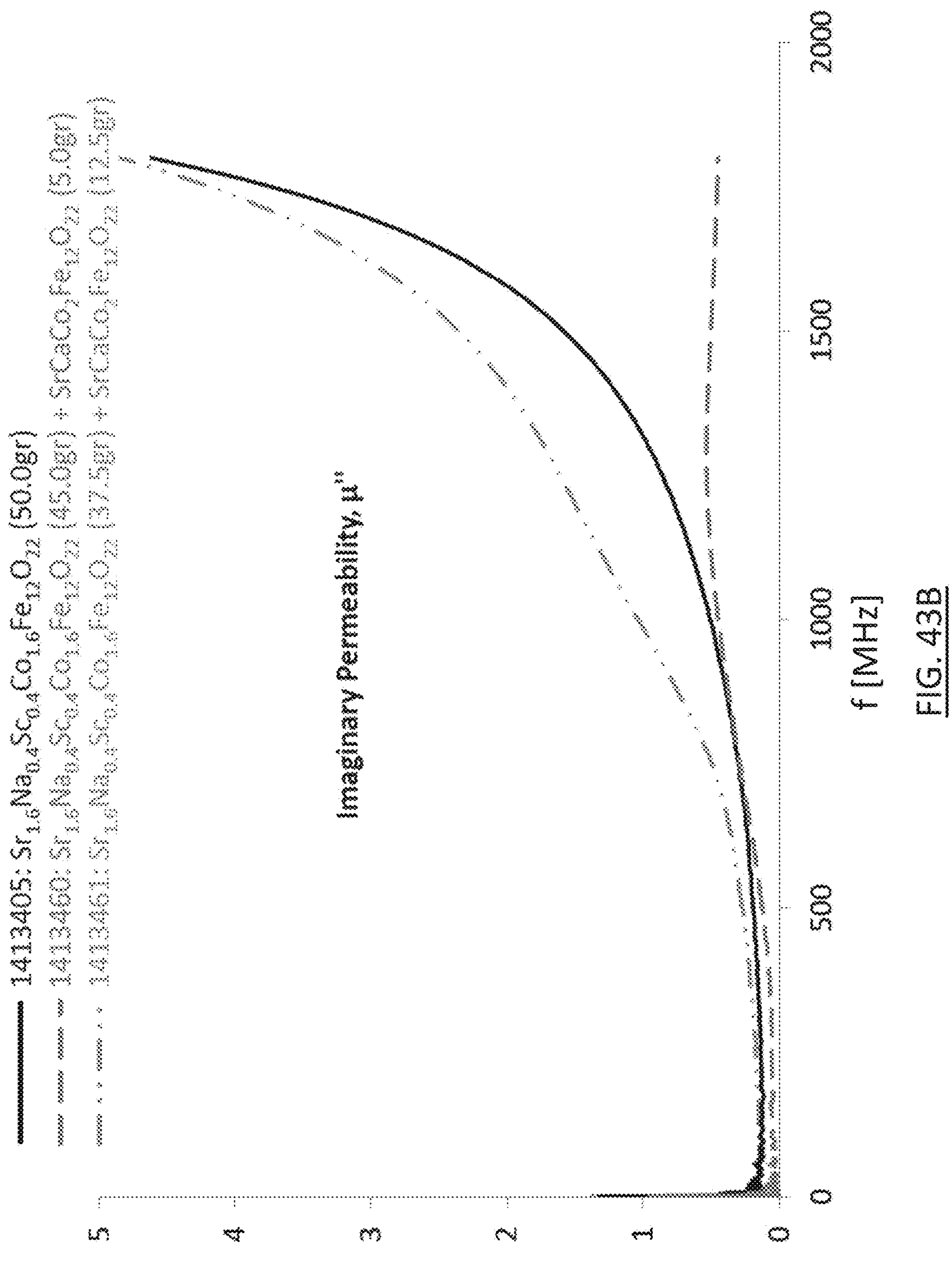
Figure 43C:
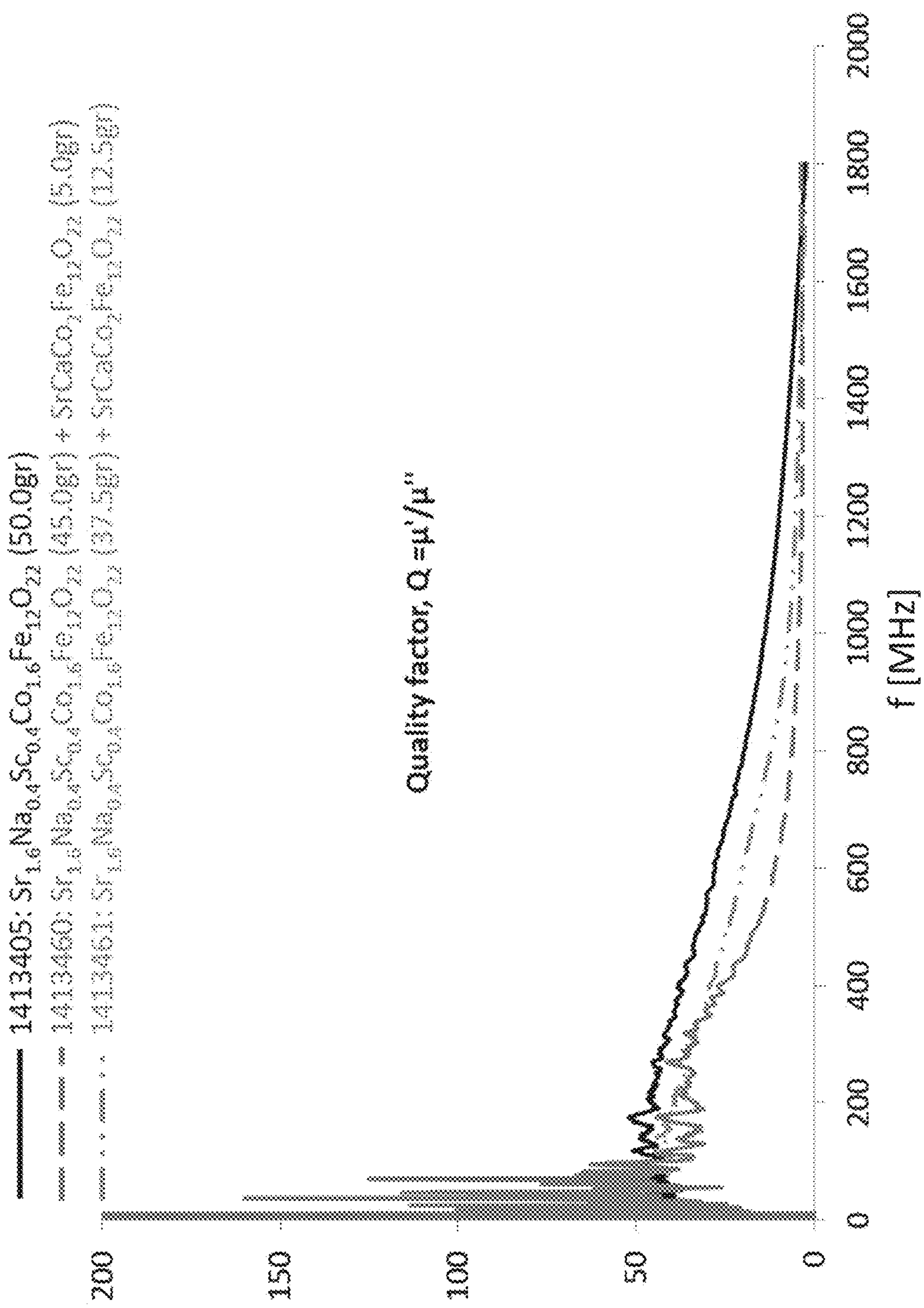

For example, FIGS. 19A, 19B, and 19C illustrate the real permeability (μ'), the loss factor (imaginary permeability μ") and quality factor (Q=μ'/μ"), respectively, for hexaferrites formed by the addition of various amounts of $Na_2Co_2Si_2Fe_{10}O_{22}$ to a base $Sr_2Co_2Fe_{12}O_{22}$ material. FIGS. 20A-31C, 55A-57C, and 72A-73C illustrate the real permeability (μ'), the loss factor (imaginary permeability μ") and quality factor (Q=μ'/μ"), respectively, for hexaferrites formed by the addition of various amounts of other compounds to a base $Sr_2Co_2Fe_{12}O_{22}$ material. Various examples of these modified hexaferrite materials exhibit permeabilities comparable or superior to that of unmodified $Sr_2Co_2Fe_{12}O_{22}$ while retaining acceptable quality factors at frequencies higher than 500 MHz or up to about 1 GHz or above.

FIGS. 32A-43C, 69A-71C, and 77A-78C illustrate the real permeability (μ'), the loss factor (imaginary permeability μ") and quality factor (Q=μ'/μ"), respectively, for hexaferrites formed by the addition of various amounts of different compounds to a modified hexaferrite having the formula $Sr_{1.6}Na_{0.4}Sc_{0.4}Co_{1.6}Fe_{12}O_{22}$, where the Sr in $Sr_2Co_2Fe_{12}O_{22}$ has been partially replaced with Na and the Co has been partially replaced with Sc. Various ones of these modified hexaferrite materials exhibit quality factors comparable or superior to that of unmodified $Sr_2Co_2Fe_{12}O_{22}$ or $Sr_{1.6}Na_{0.4}Sc_{0.4}Co_{1.6}Fe_{12}O_{22}$ while retaining acceptable permeabilities at frequencies higher than 500 MHz or up to about 1 GHz or above.

Figure 44A:
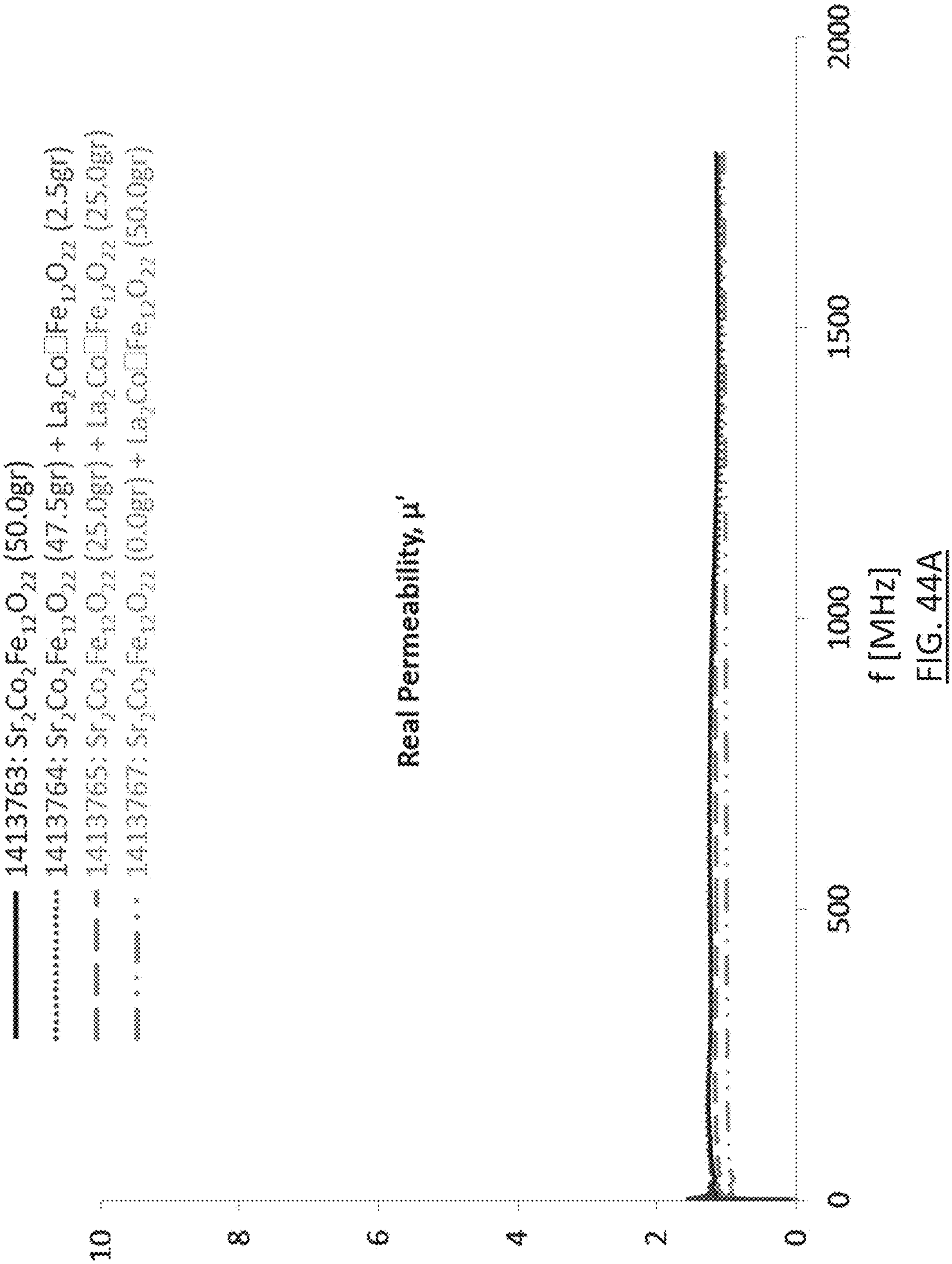
Figure 44B:
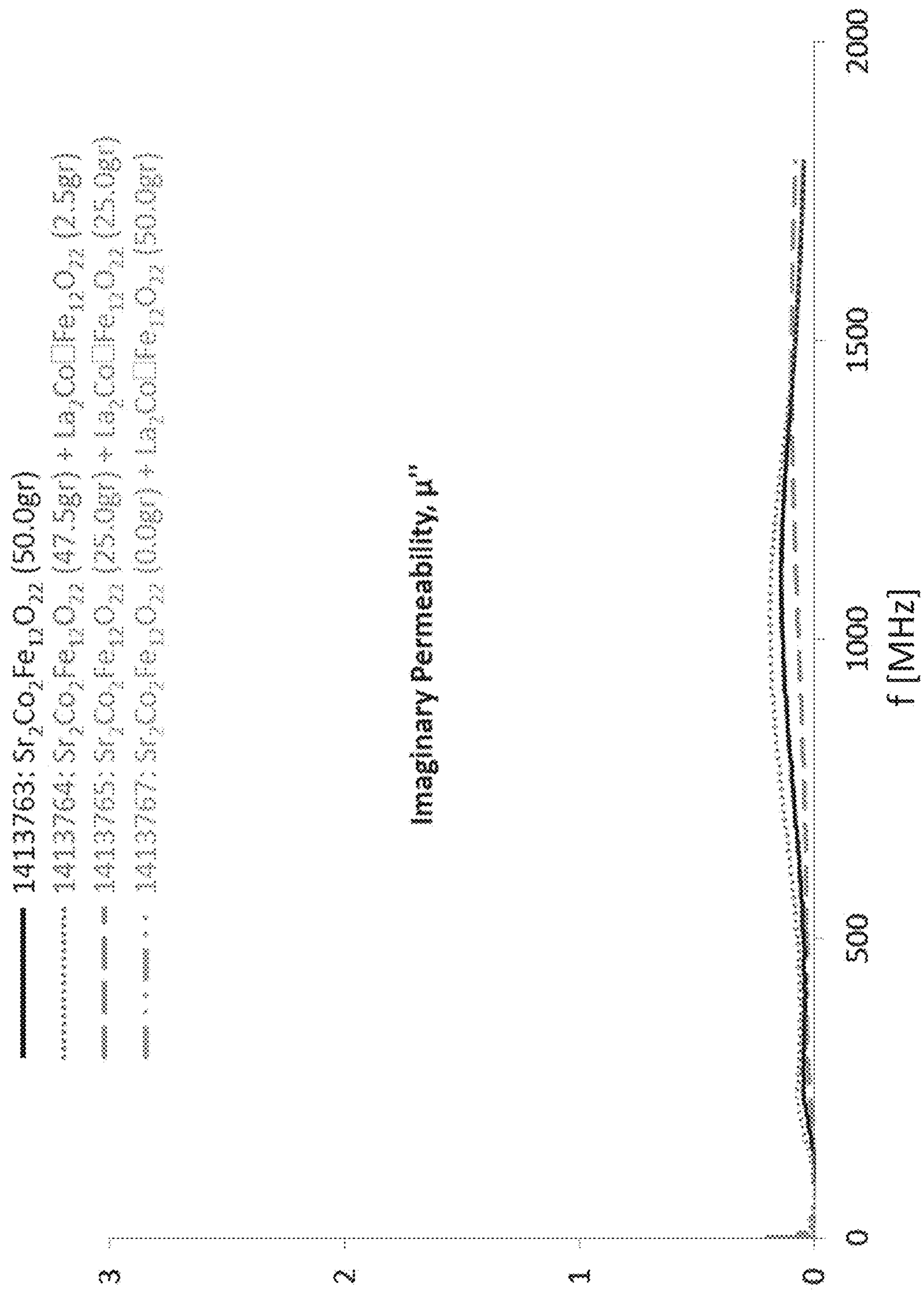
Figure 44C:
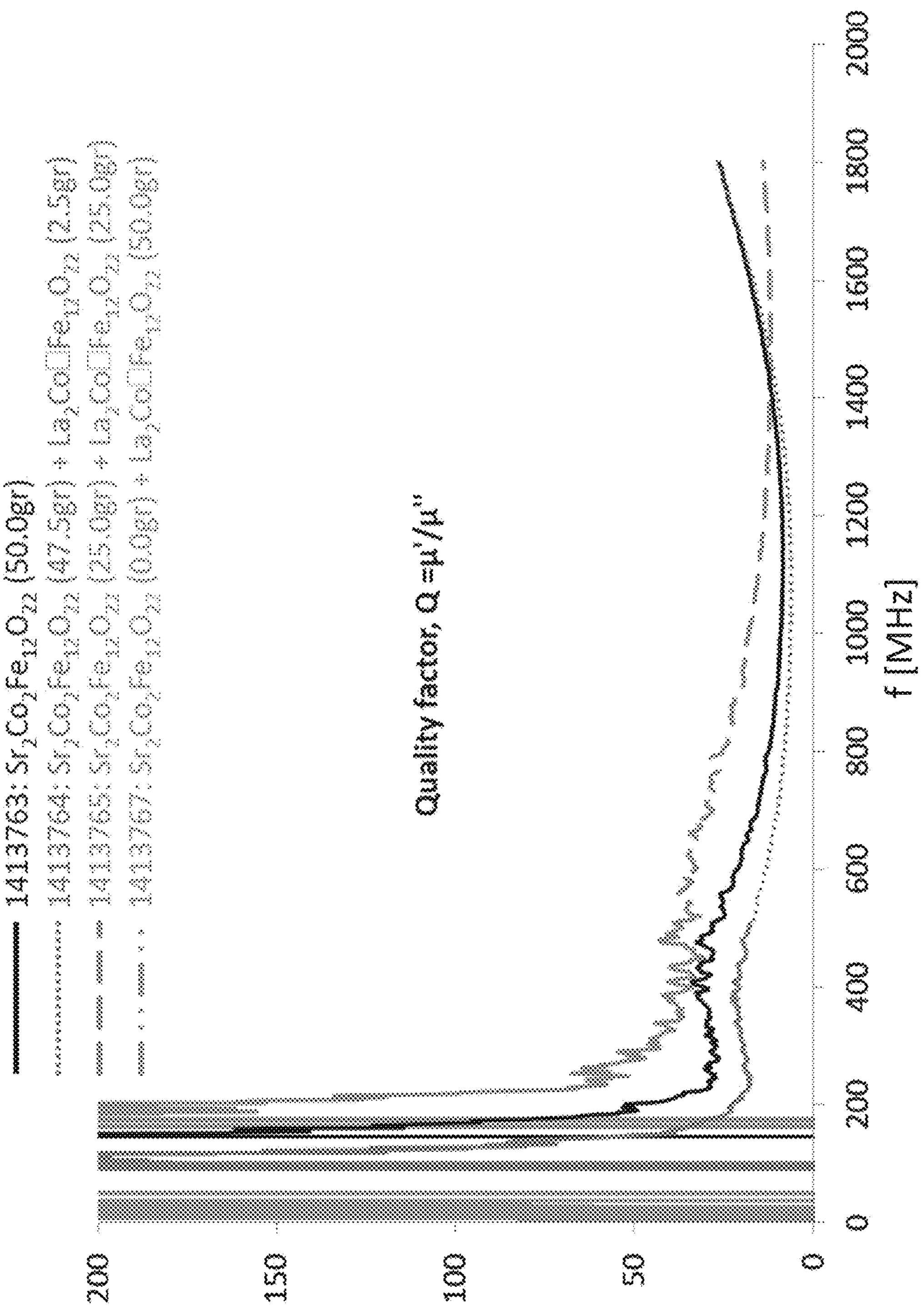
Figure 45A:
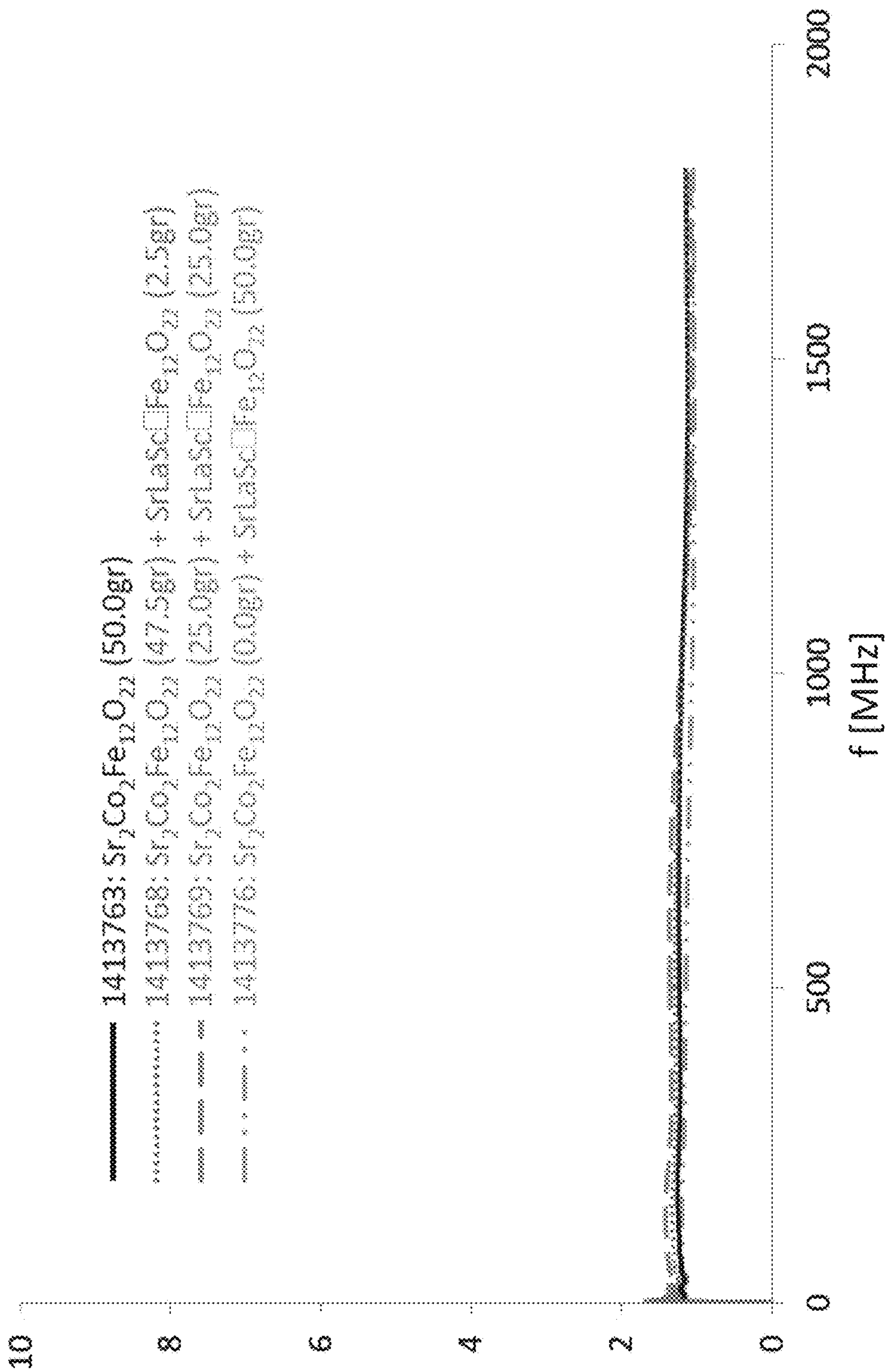
Figure 45B:
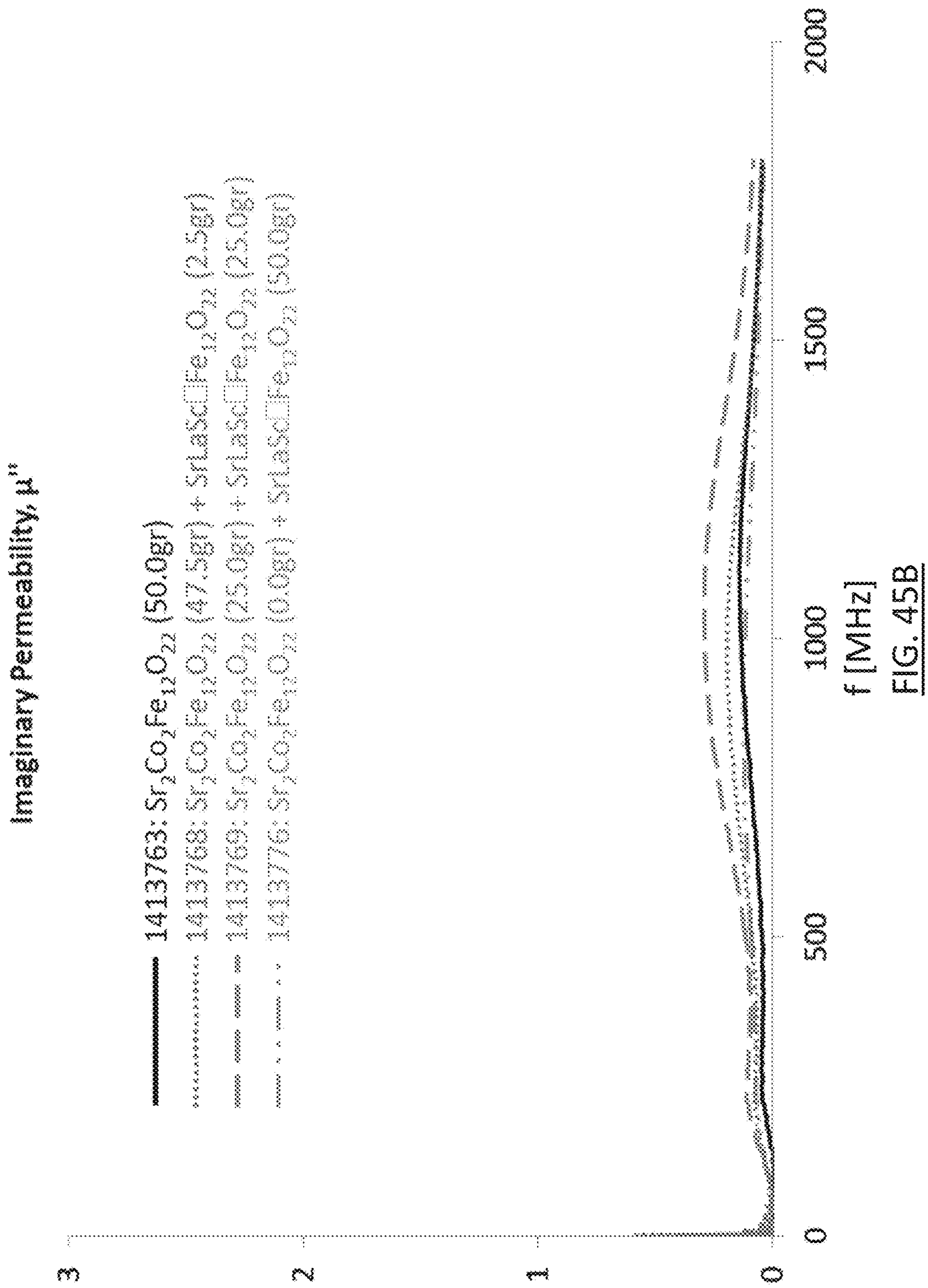
Figure 45C:
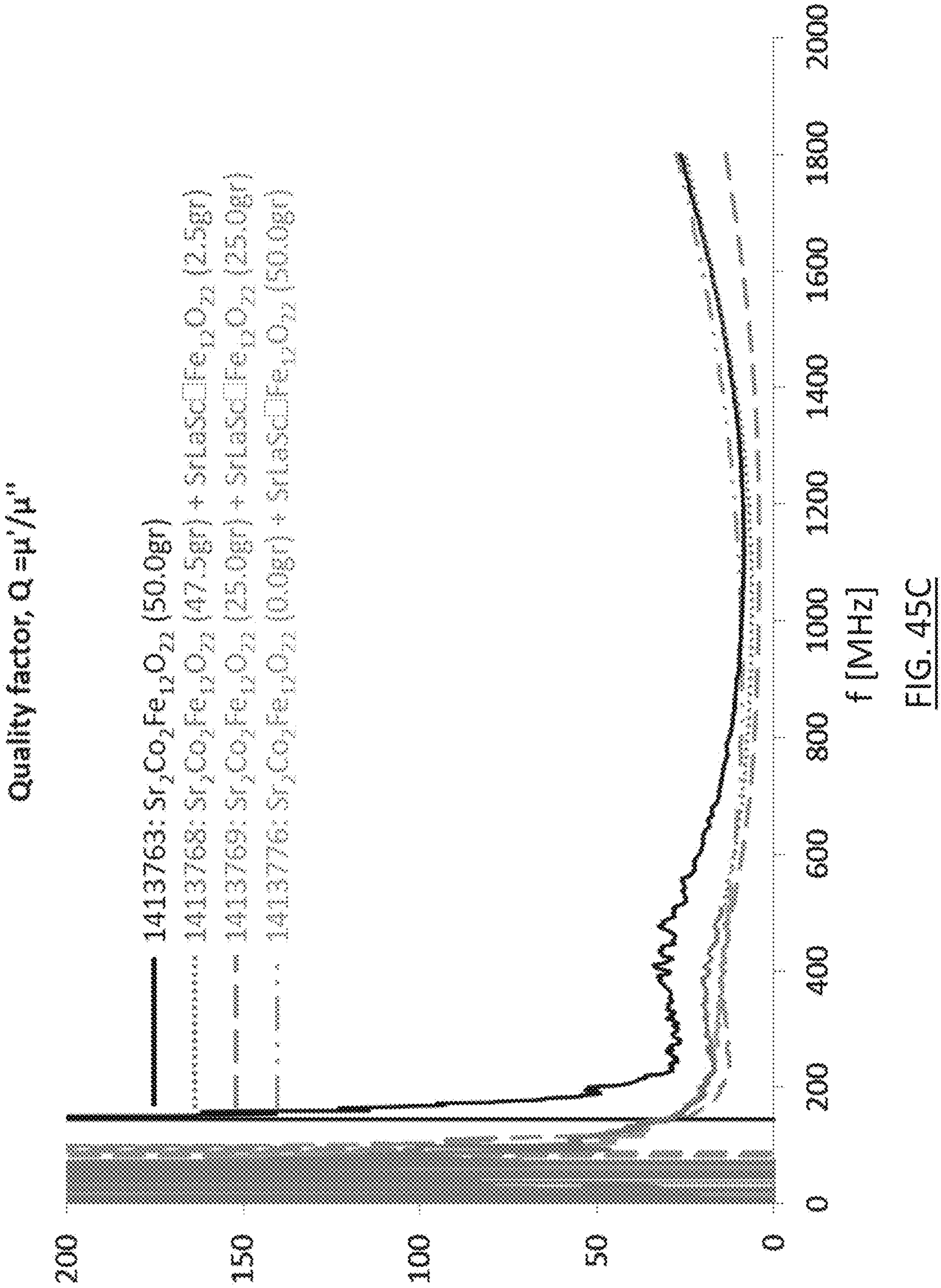
Figure 46A:
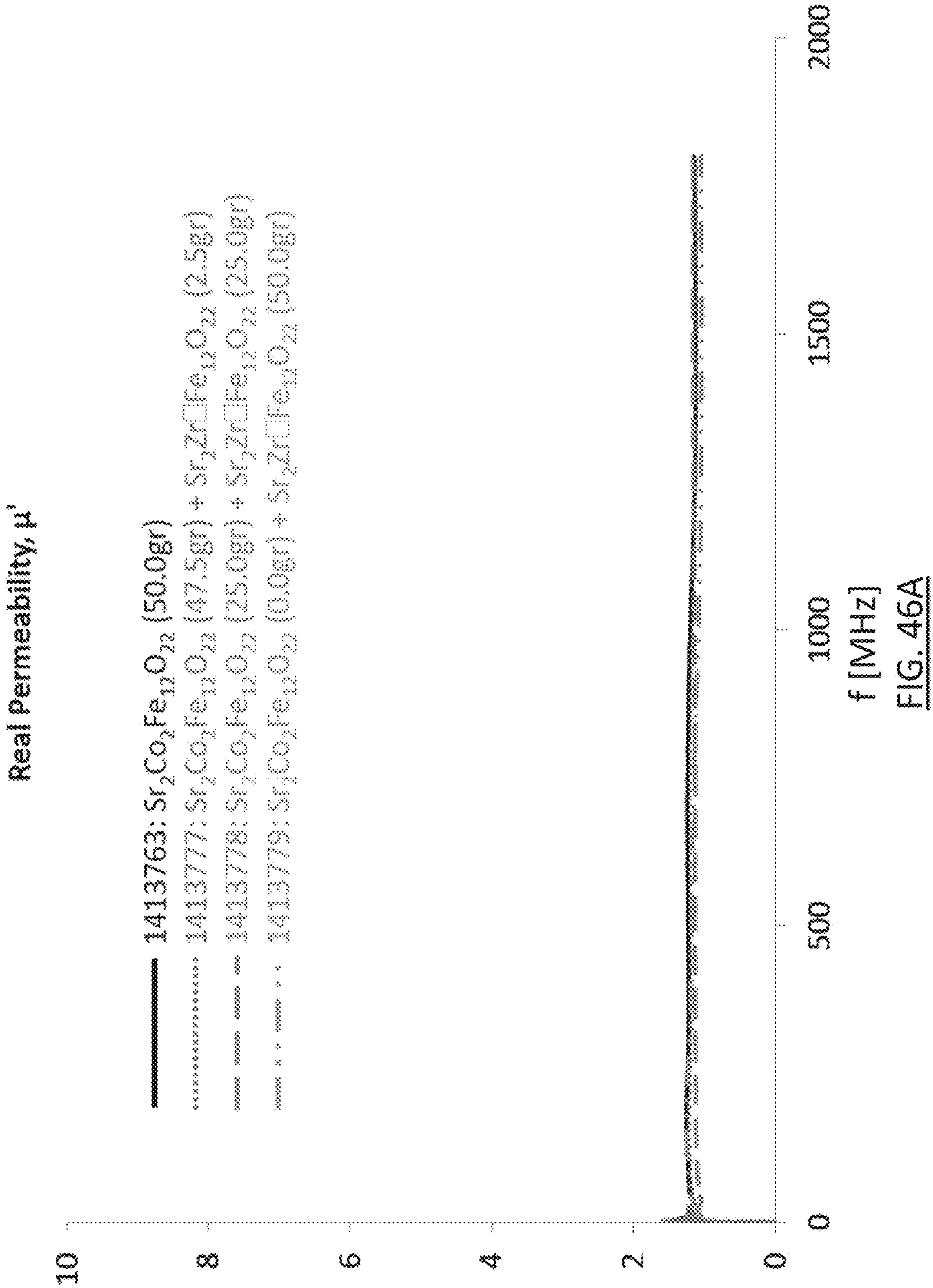
Figure 46B:
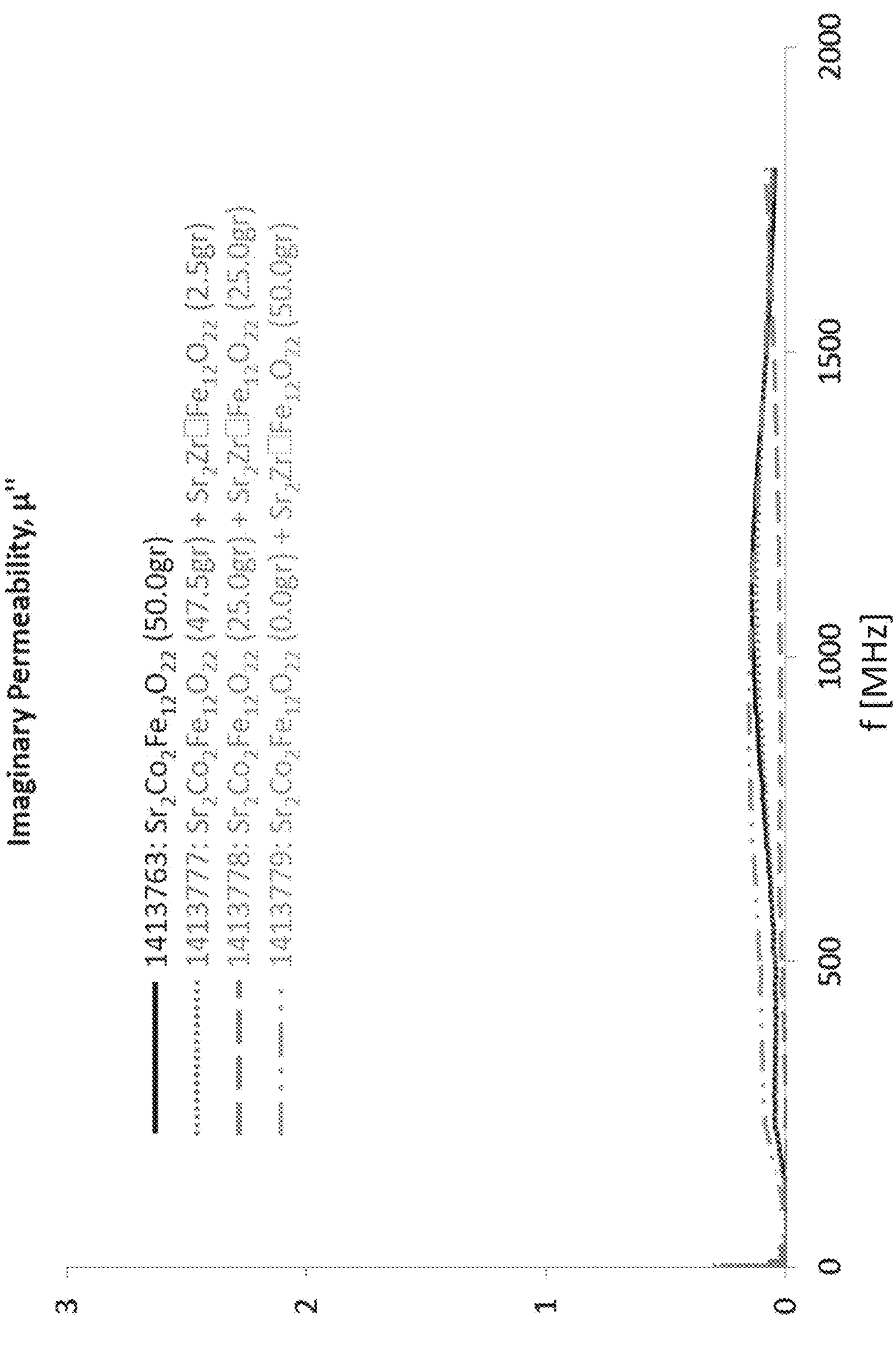
Figure 46C:
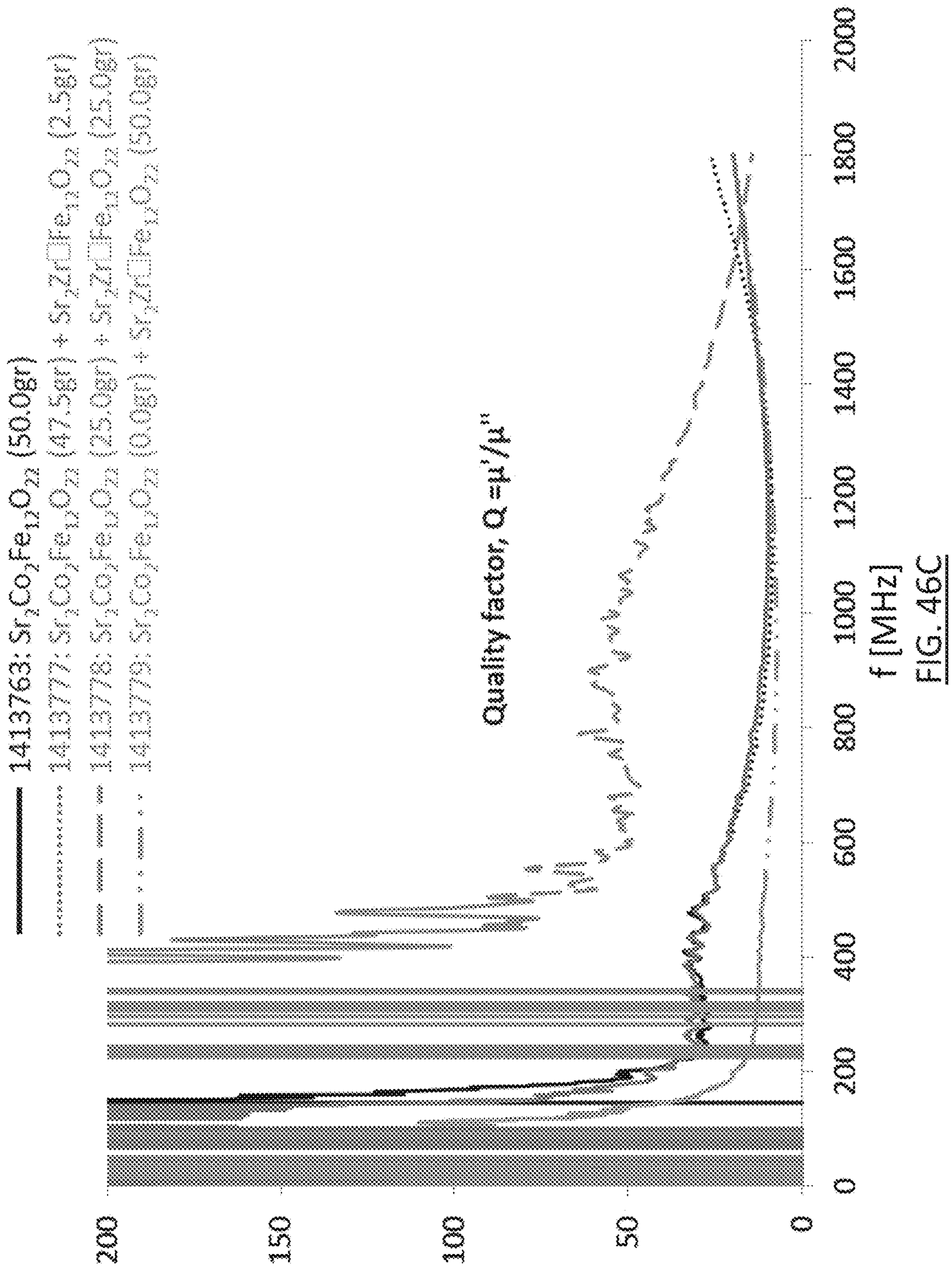
Figure 47A:
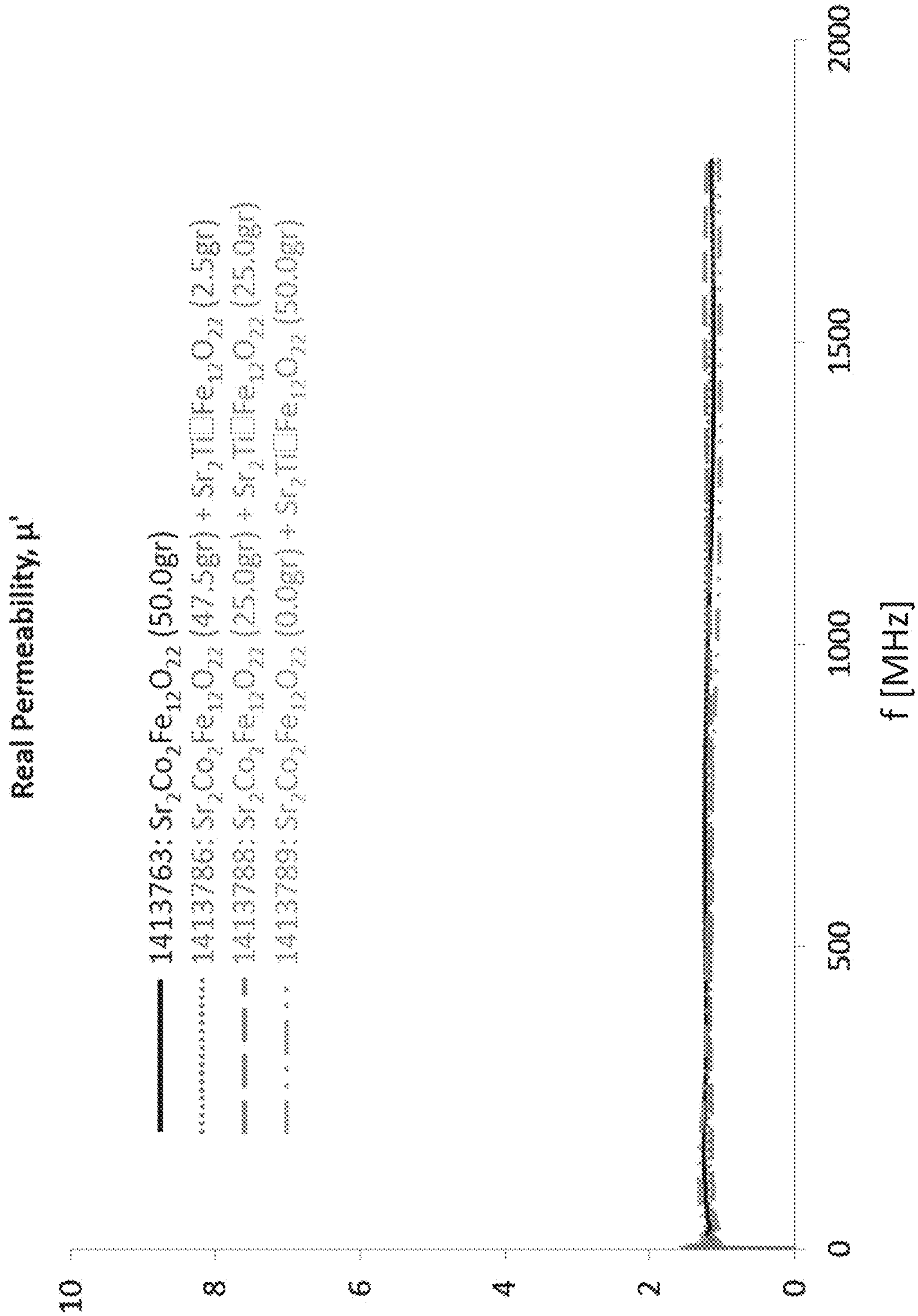
Figure 47B:
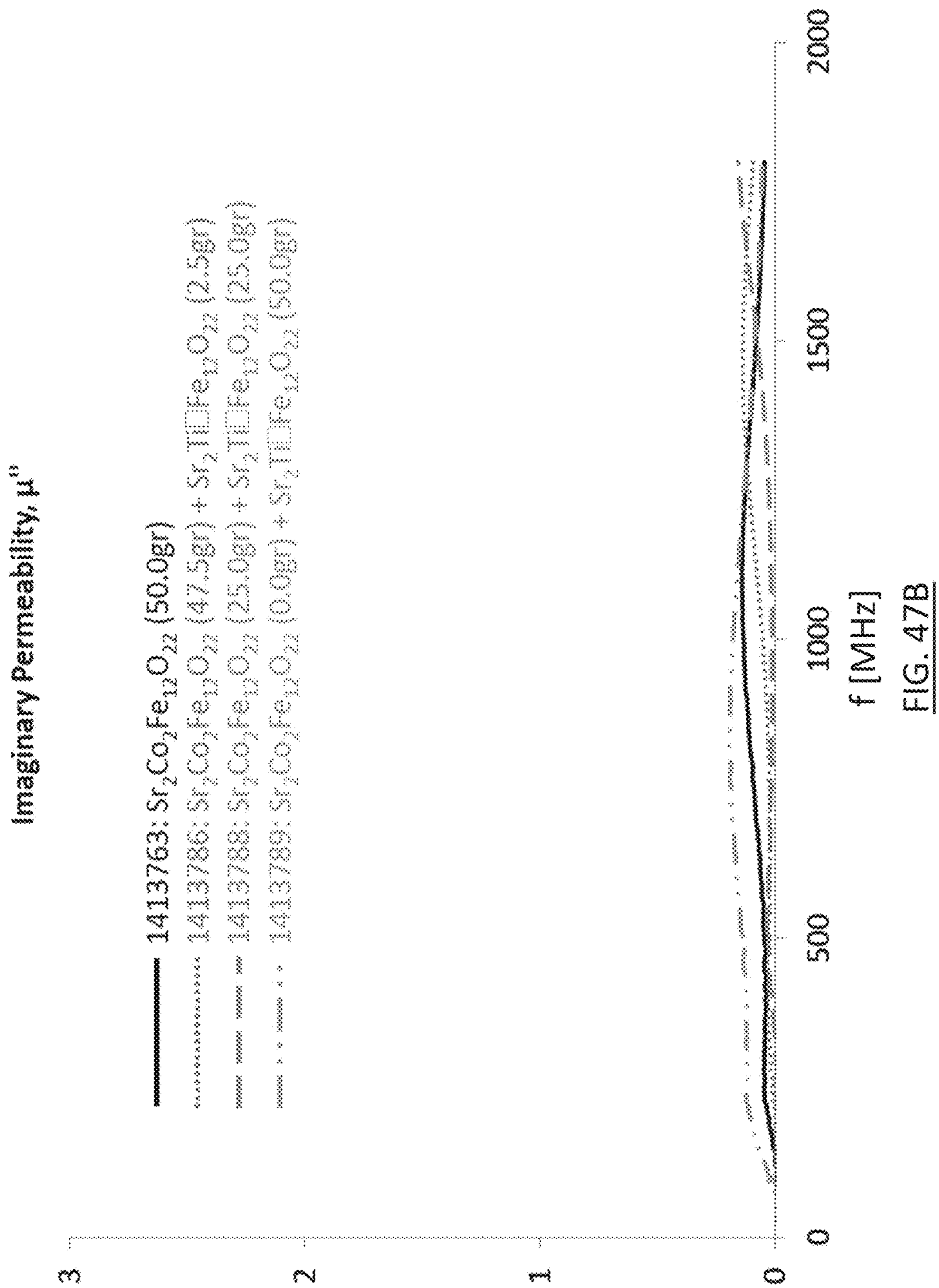
Figure 47C:
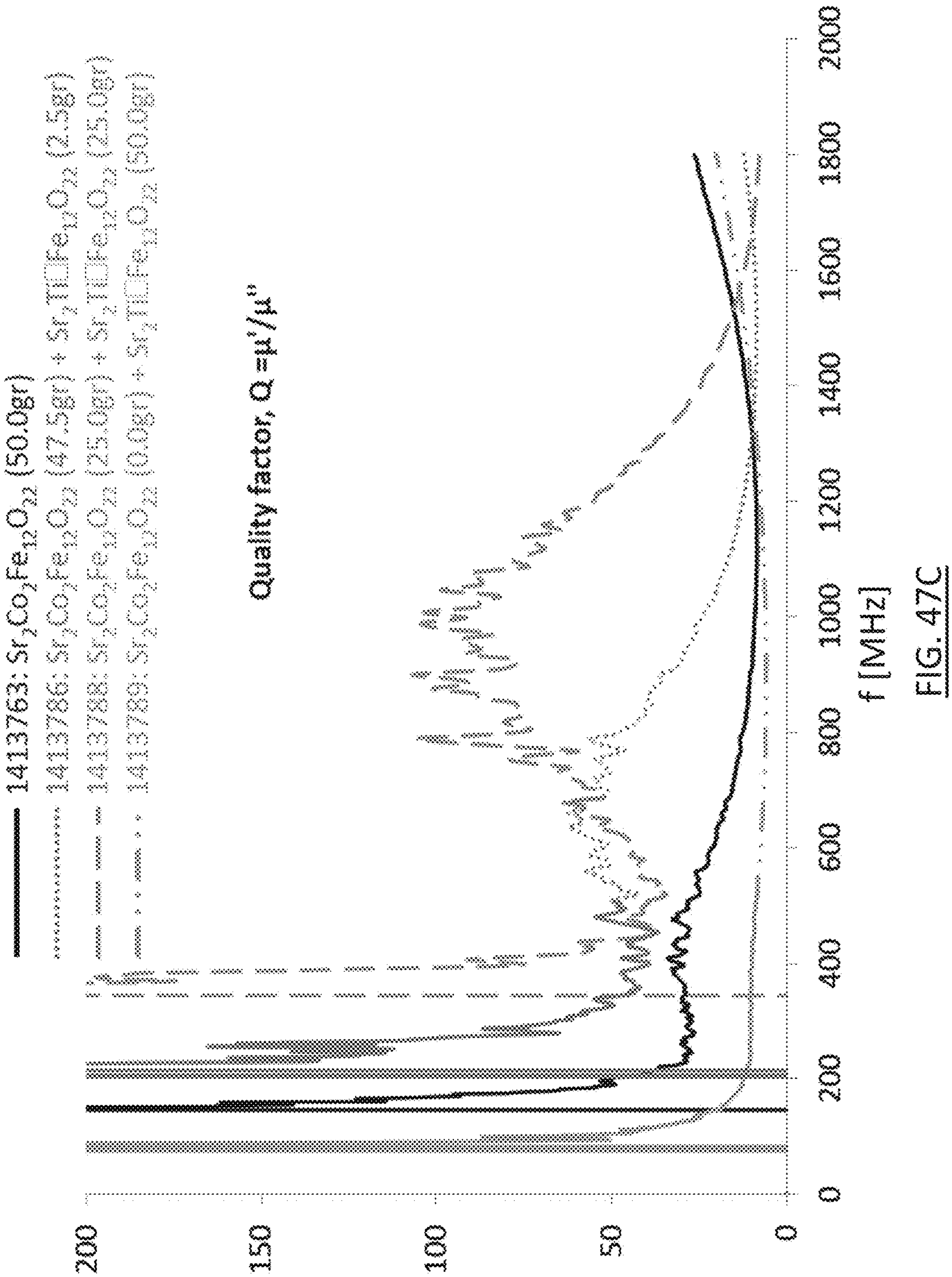
Figure 48A:
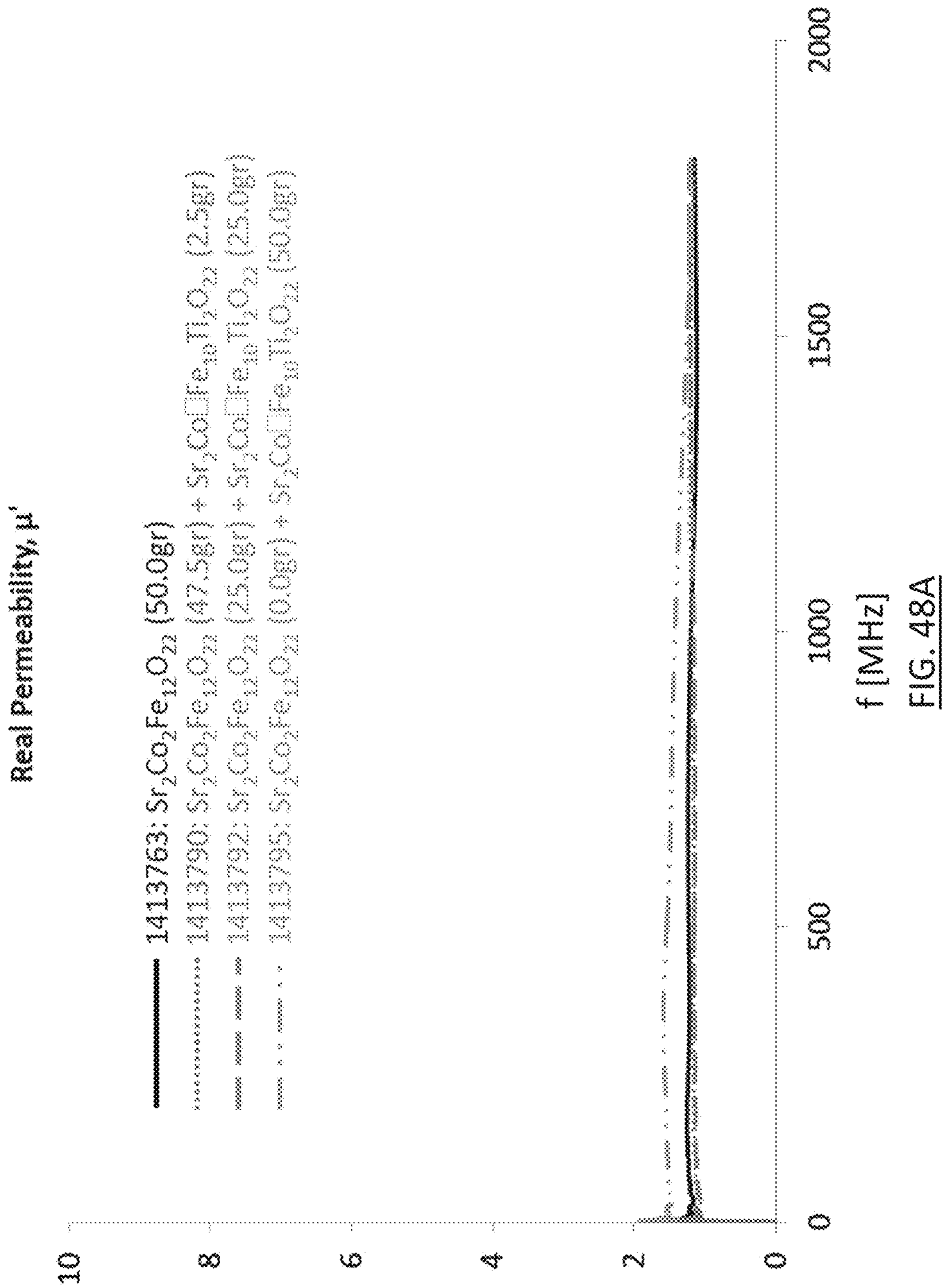
Figure 48B:
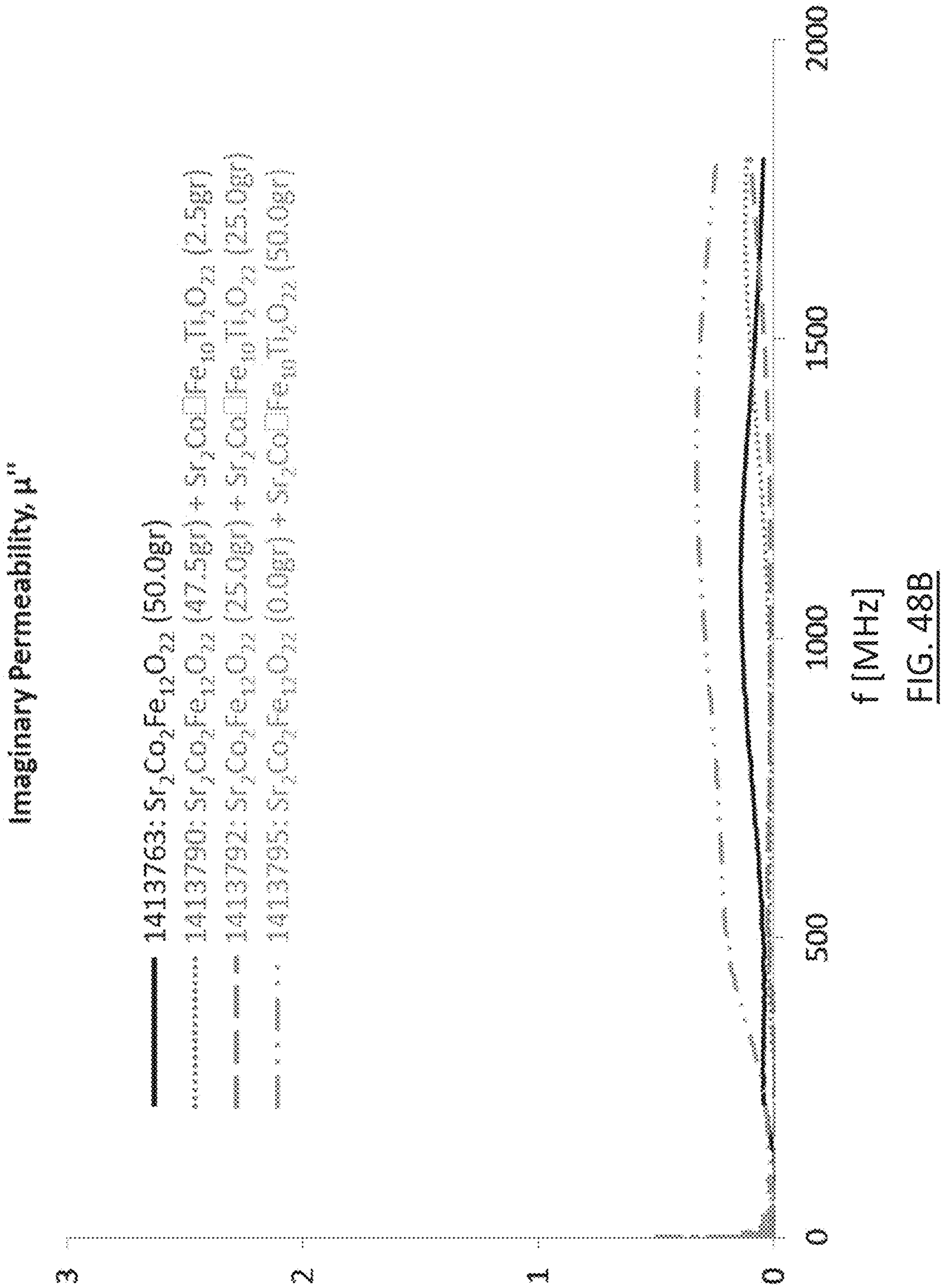
Figure 48C:
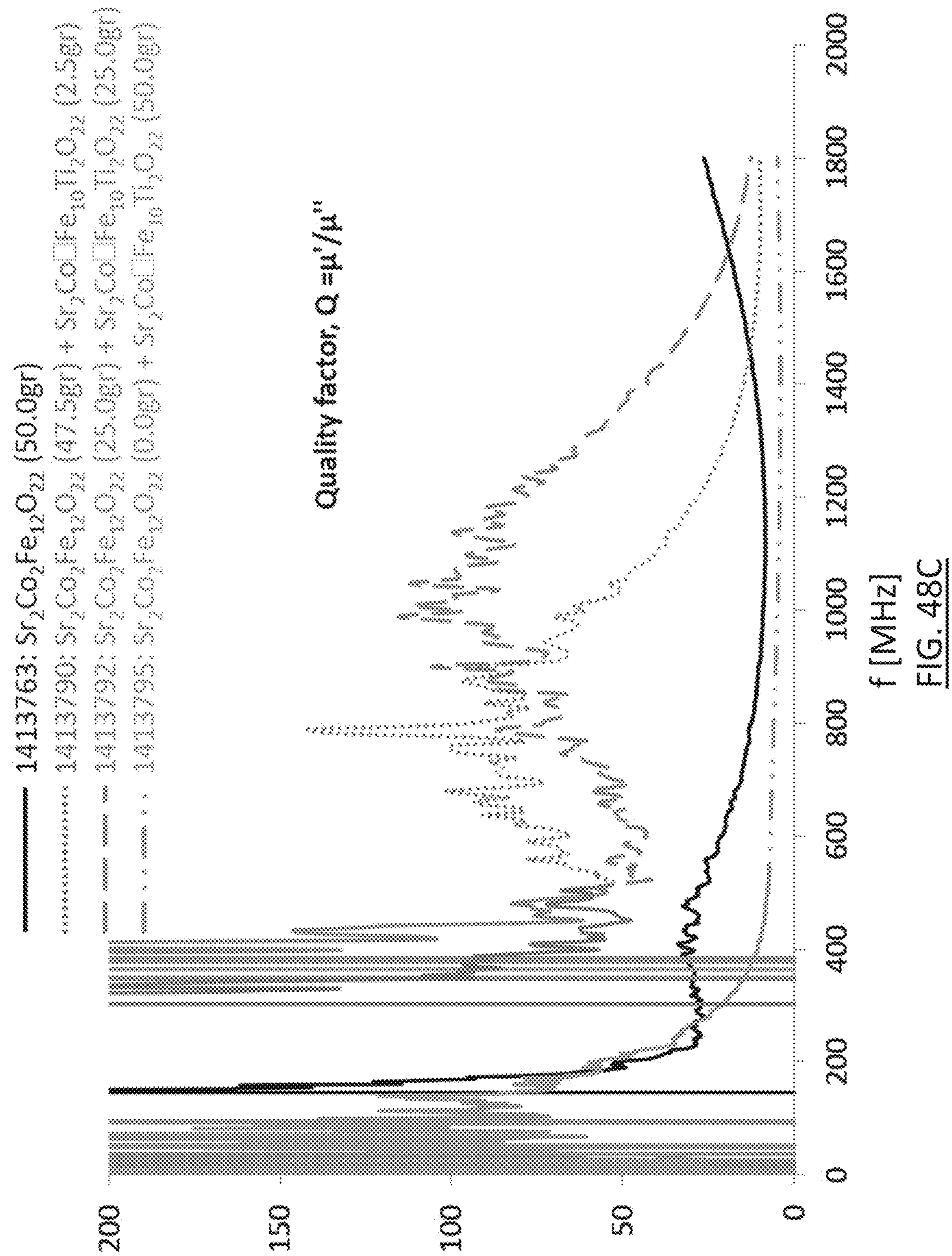
Figure 49A:
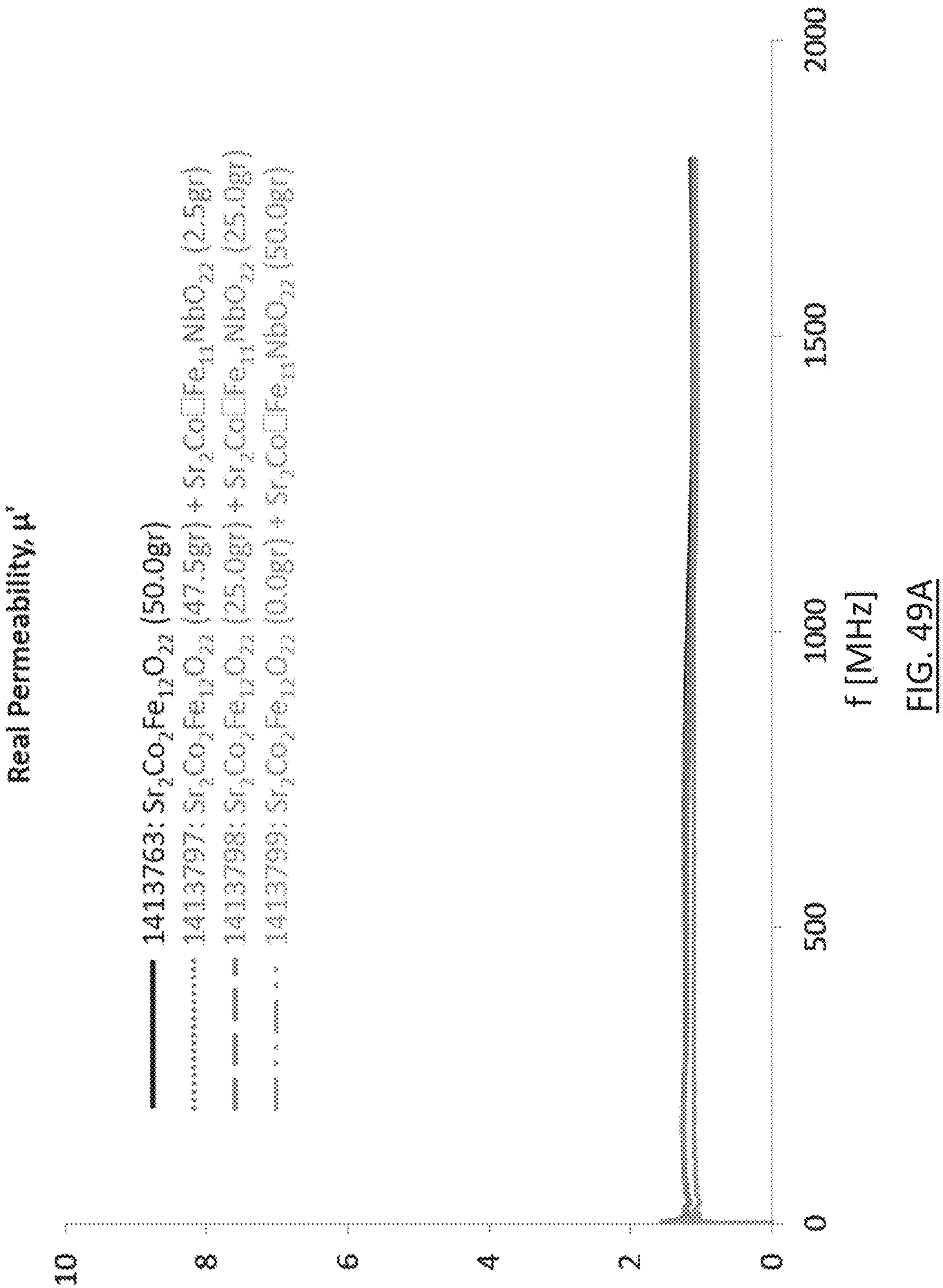
Figure 49B:
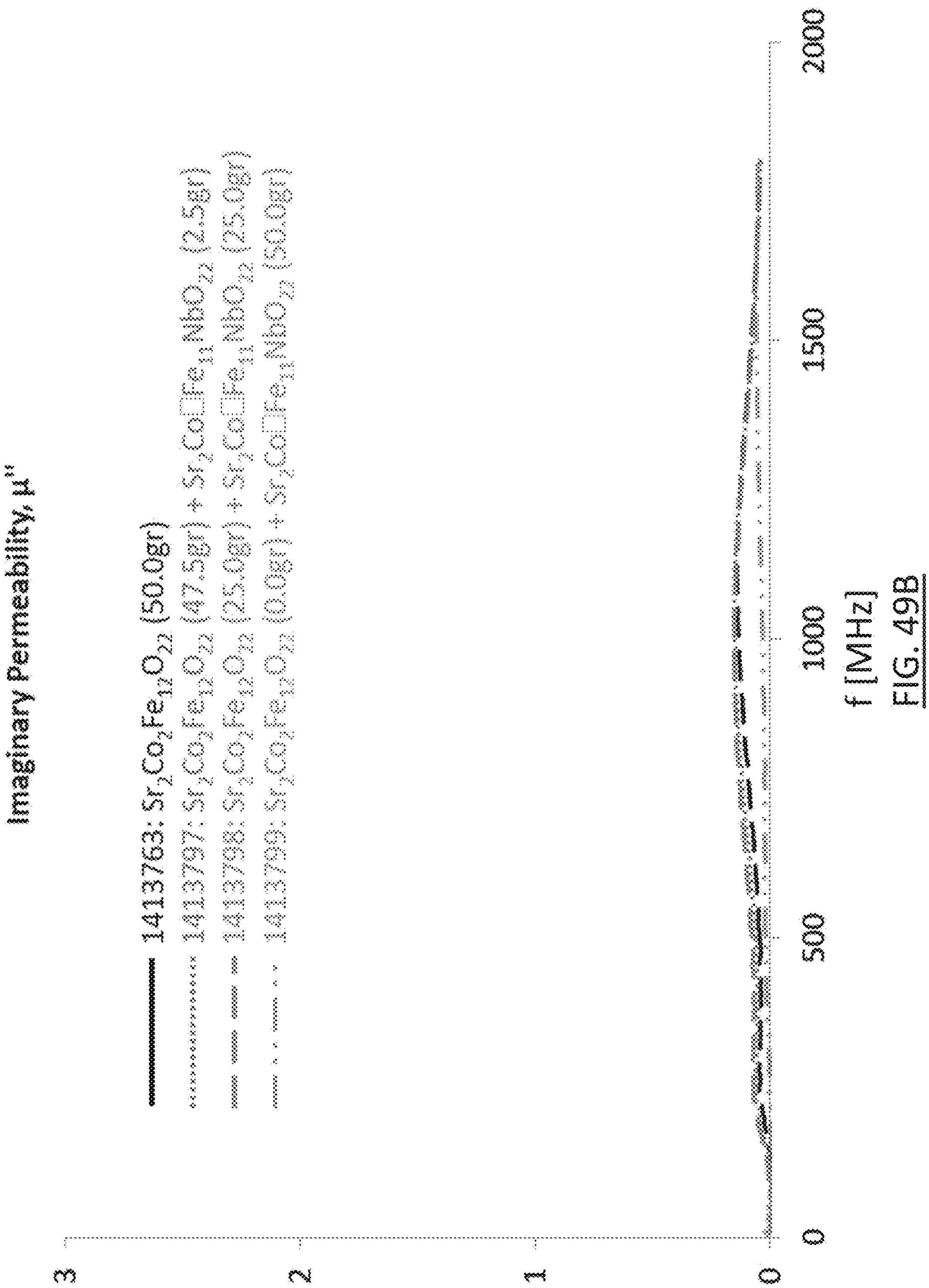
Figure 49C:
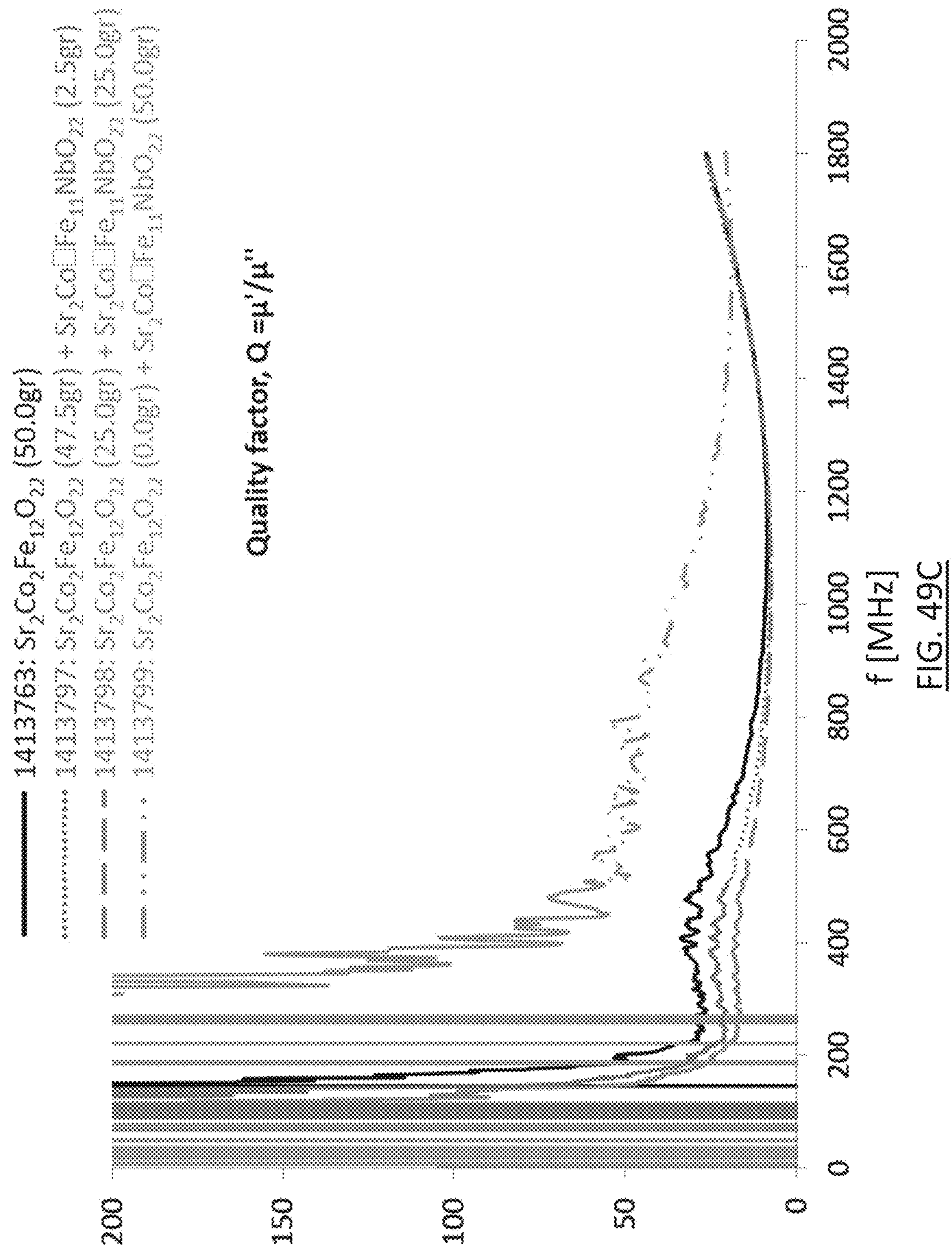
Figure 50A:
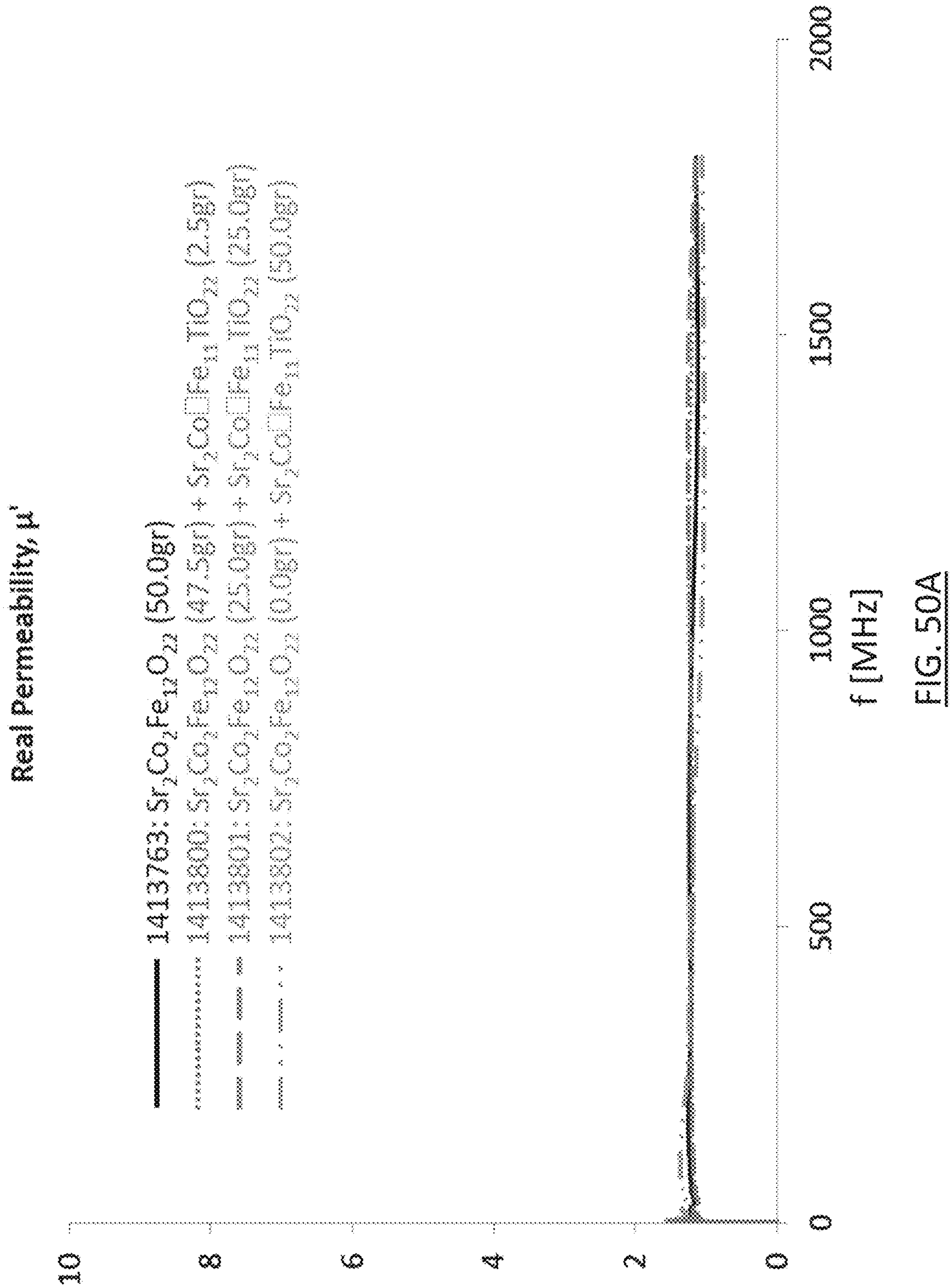
Figure 50B:
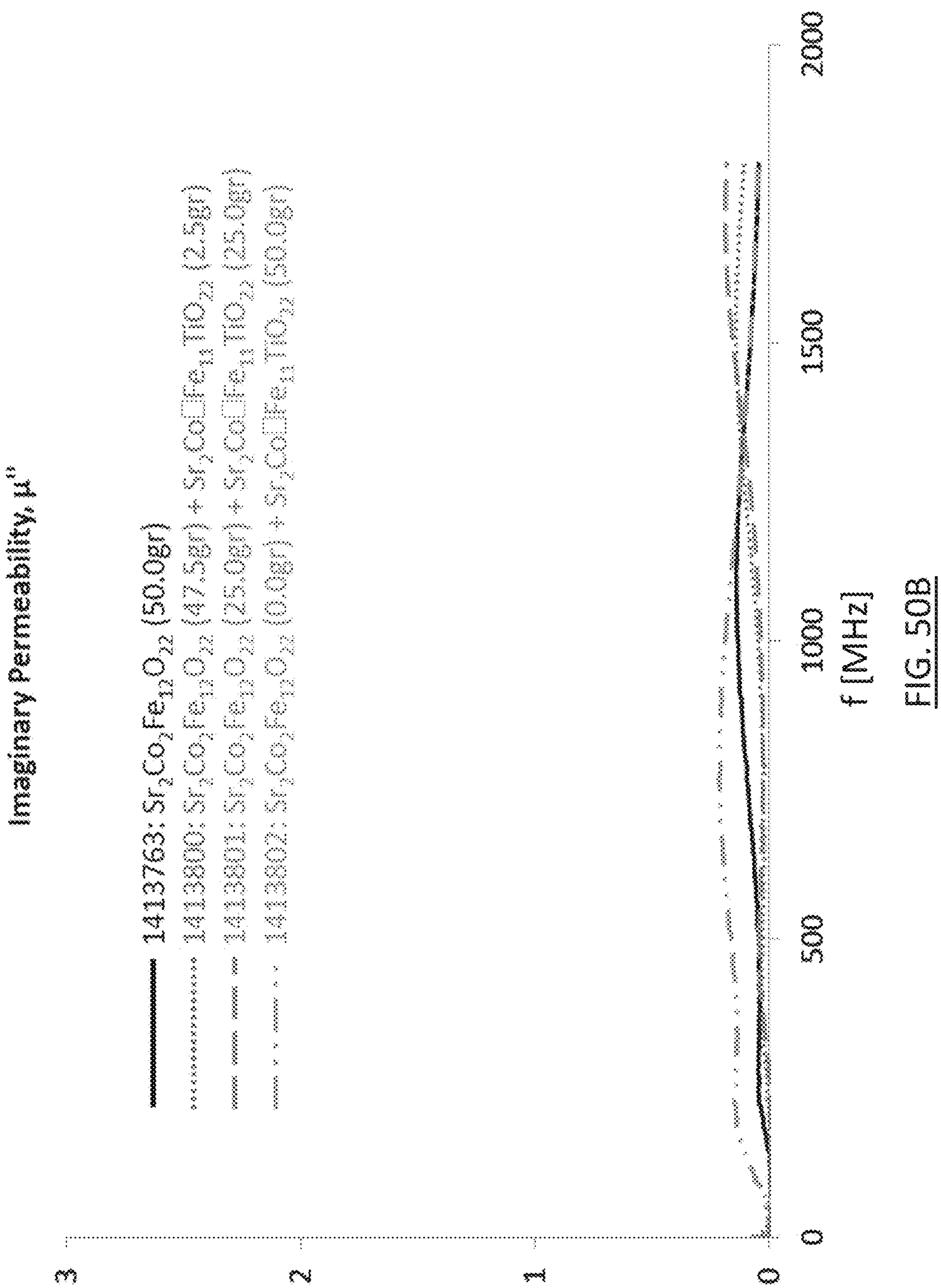
Figure 50C:
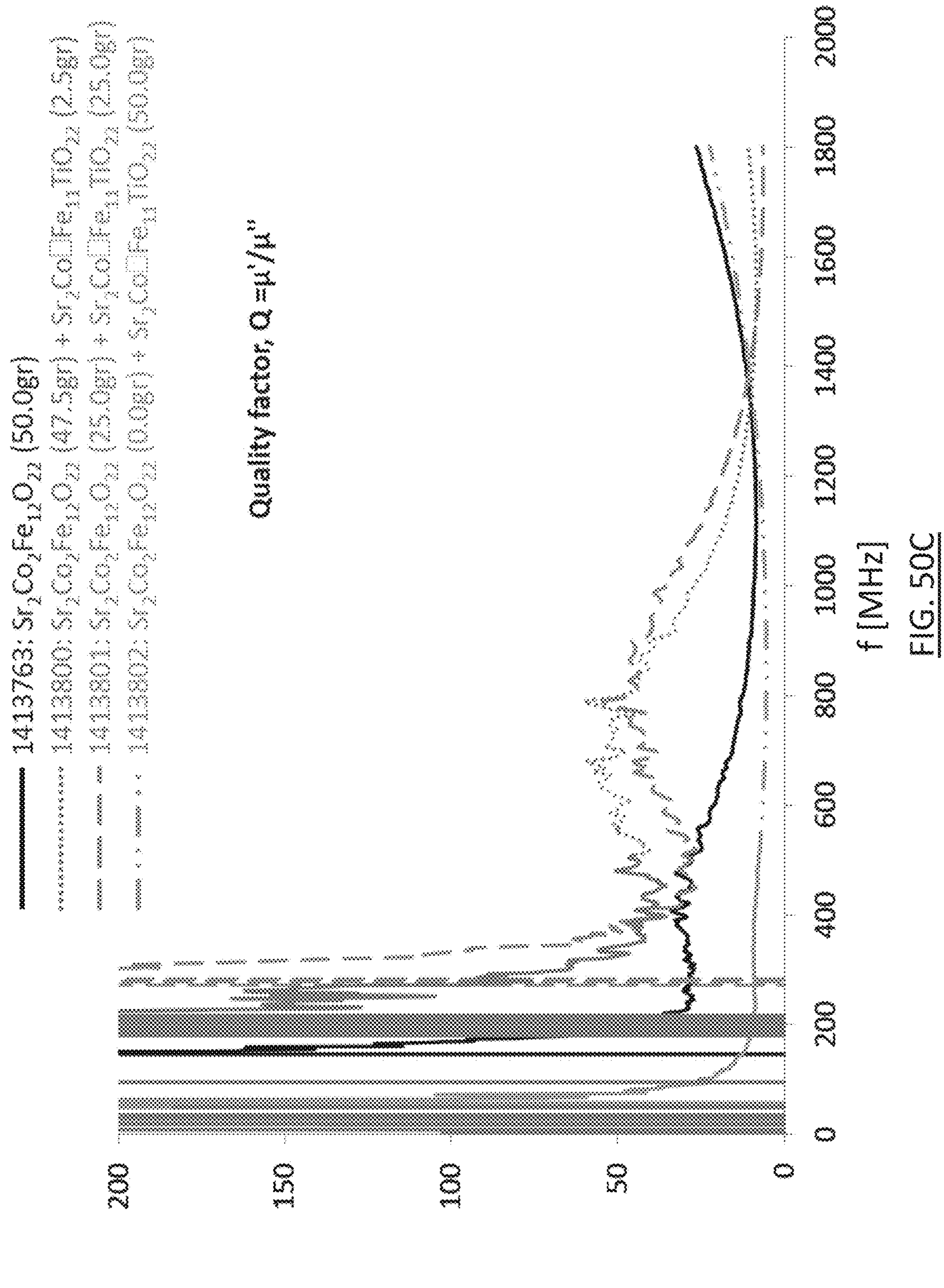
Figure 51A:
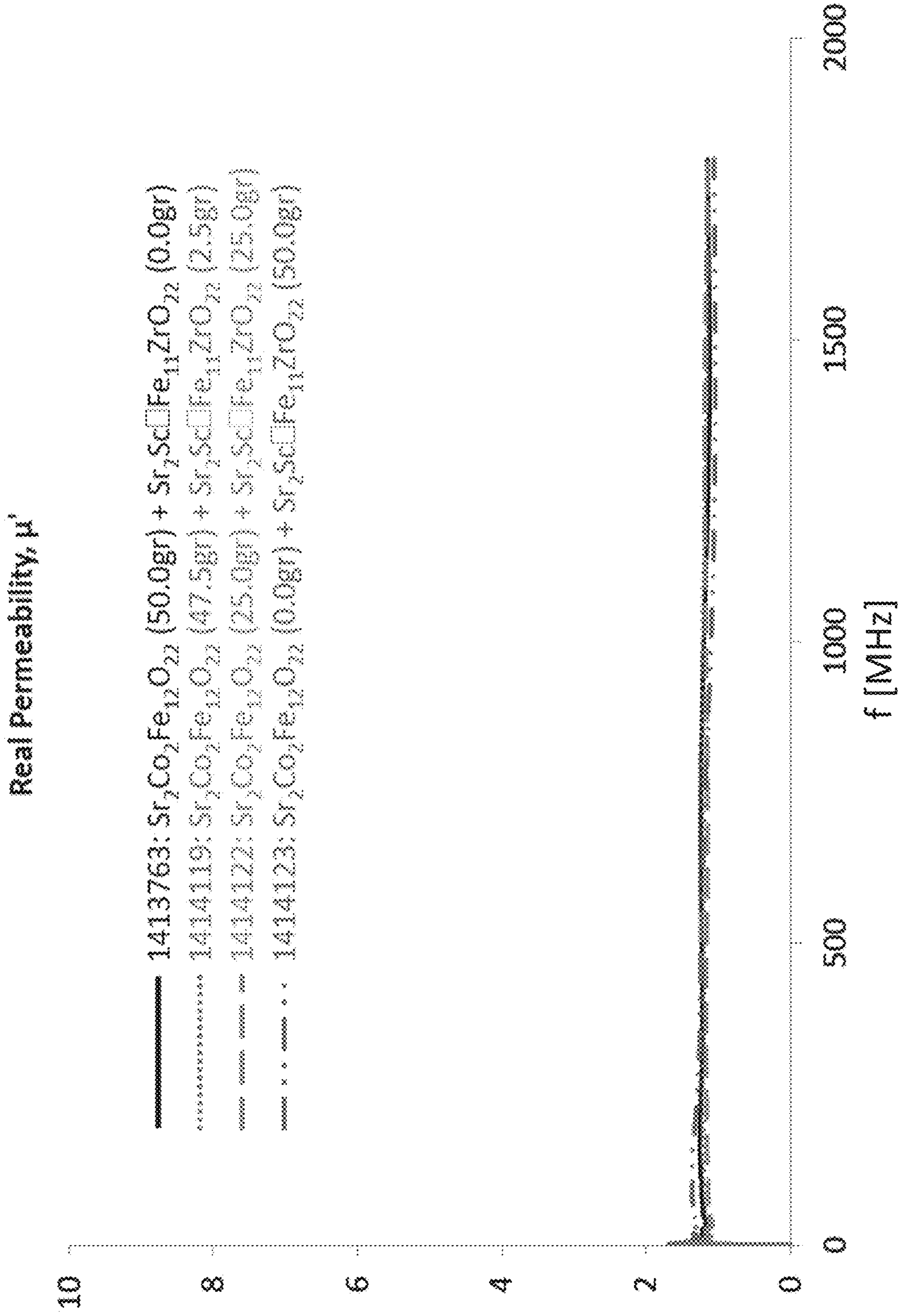
Figure 51B:
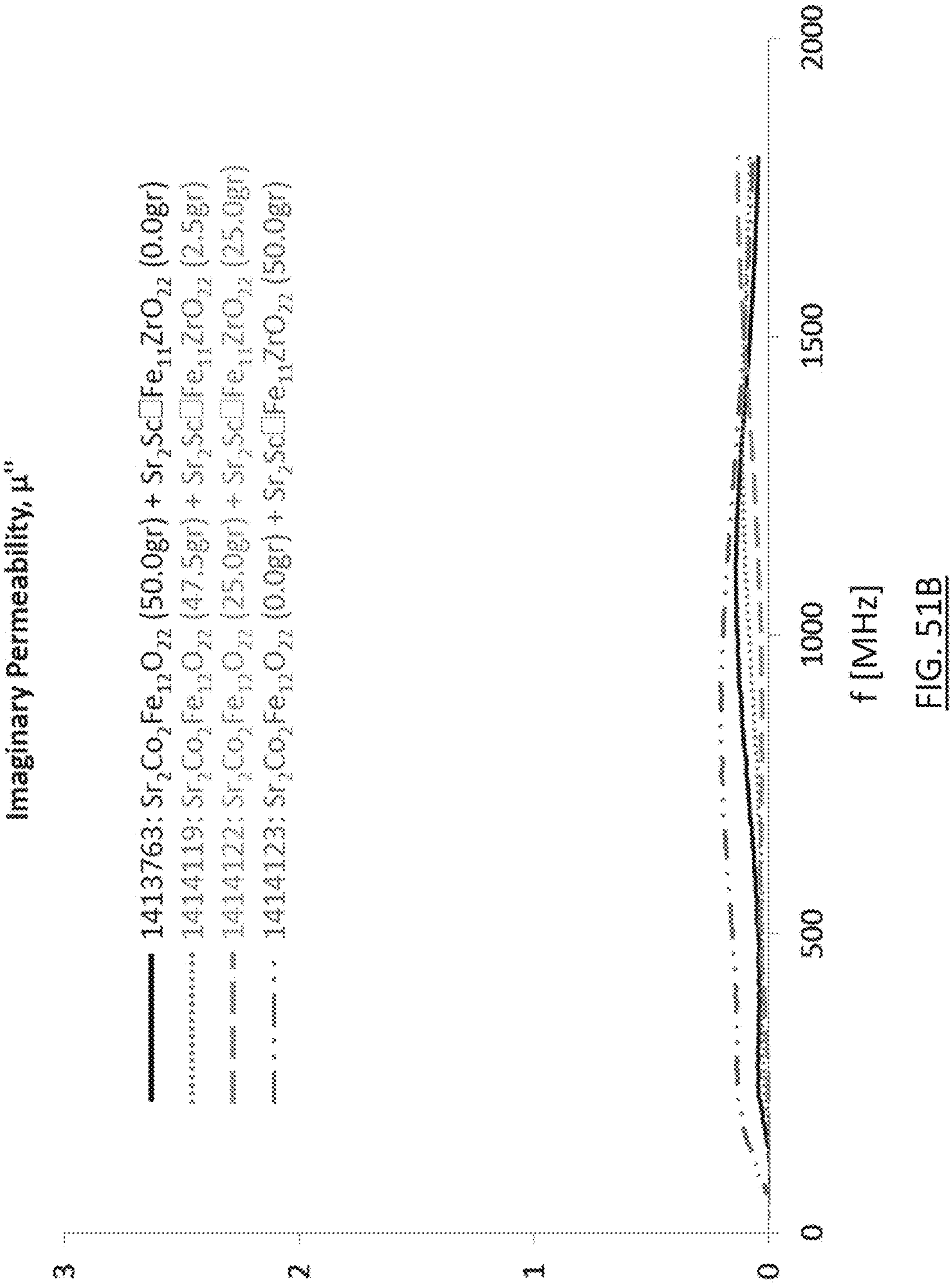
Figure 51C:
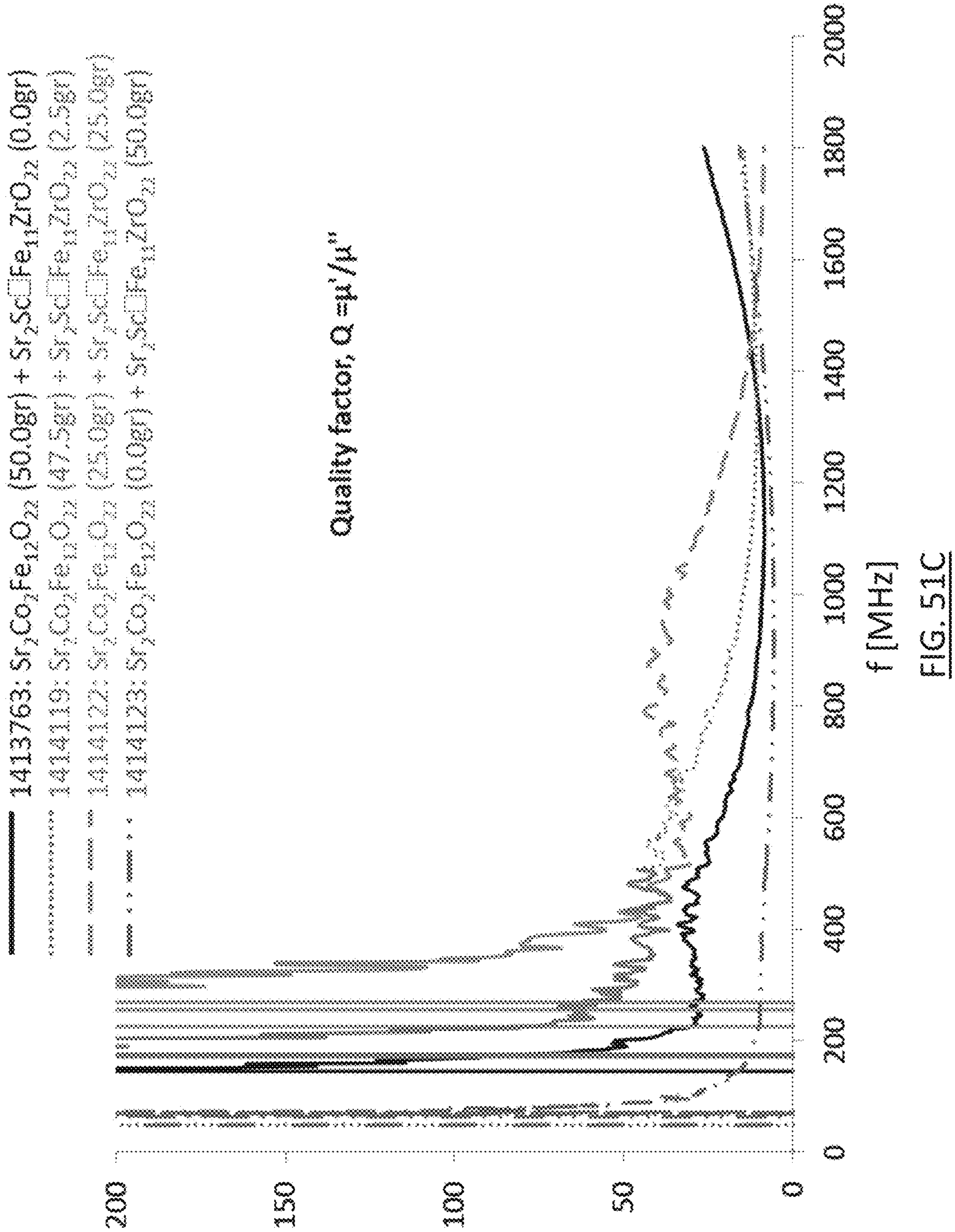
Figure 52A:
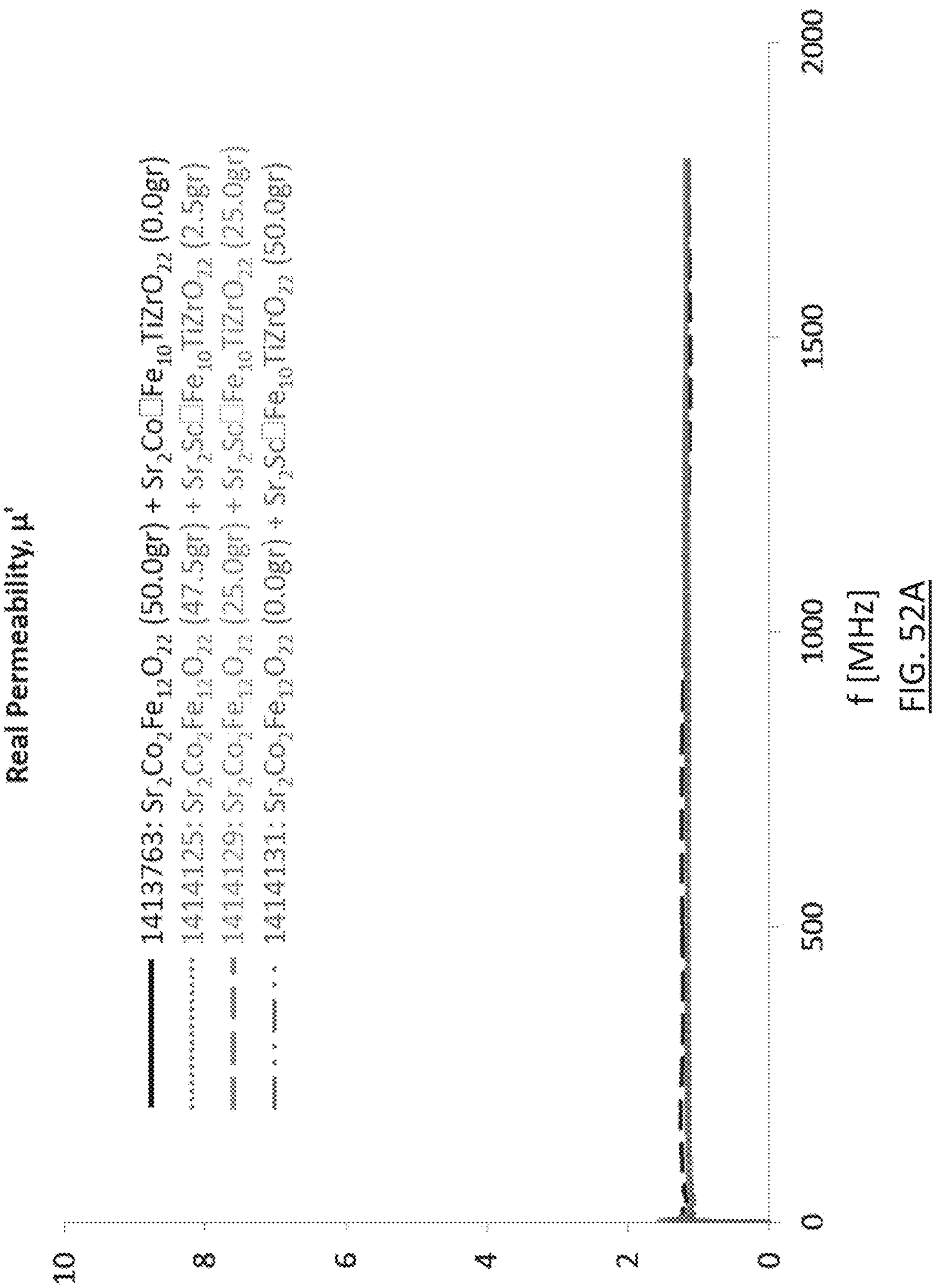
Figure 52B:
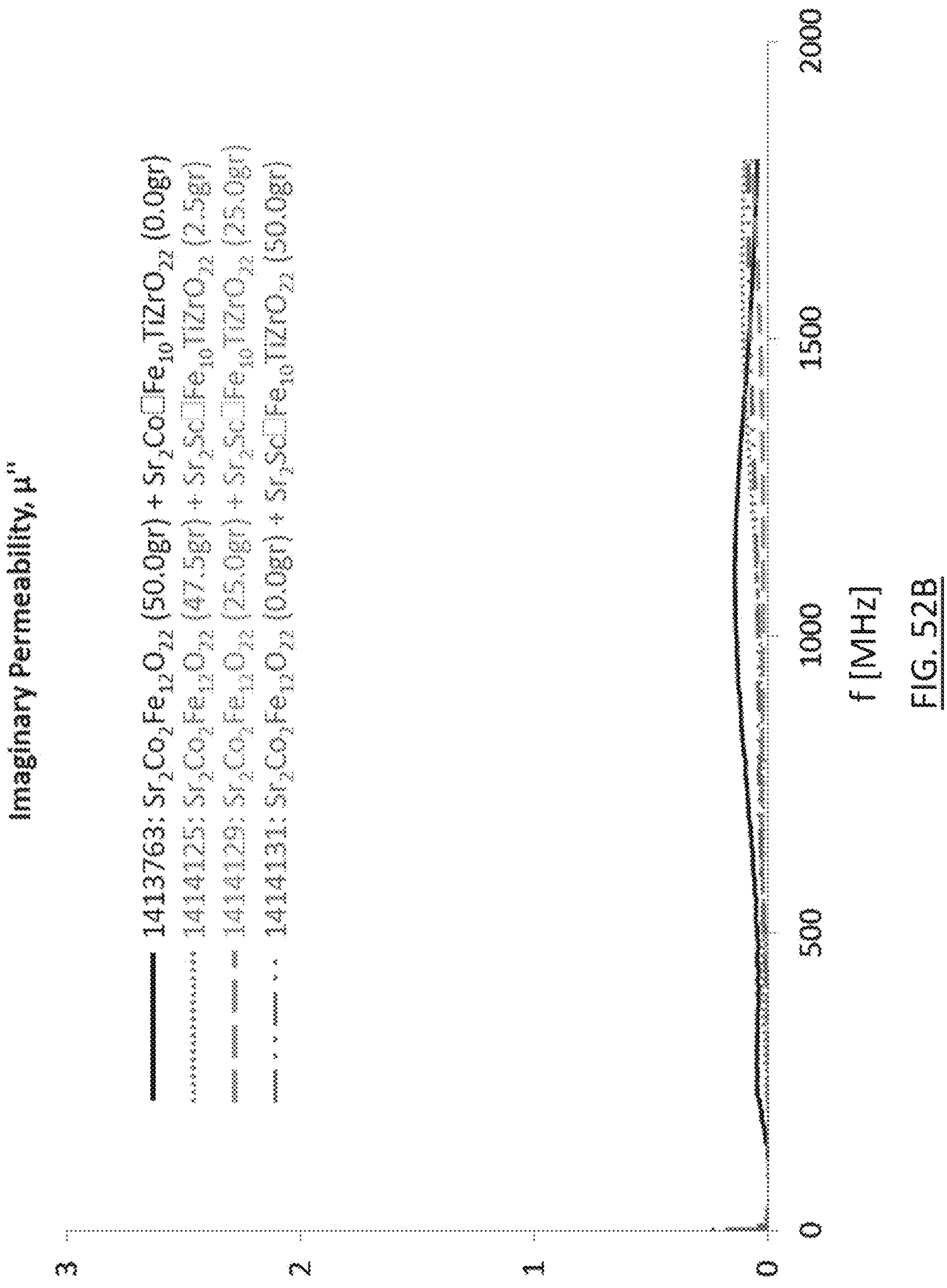
Figure 52C:
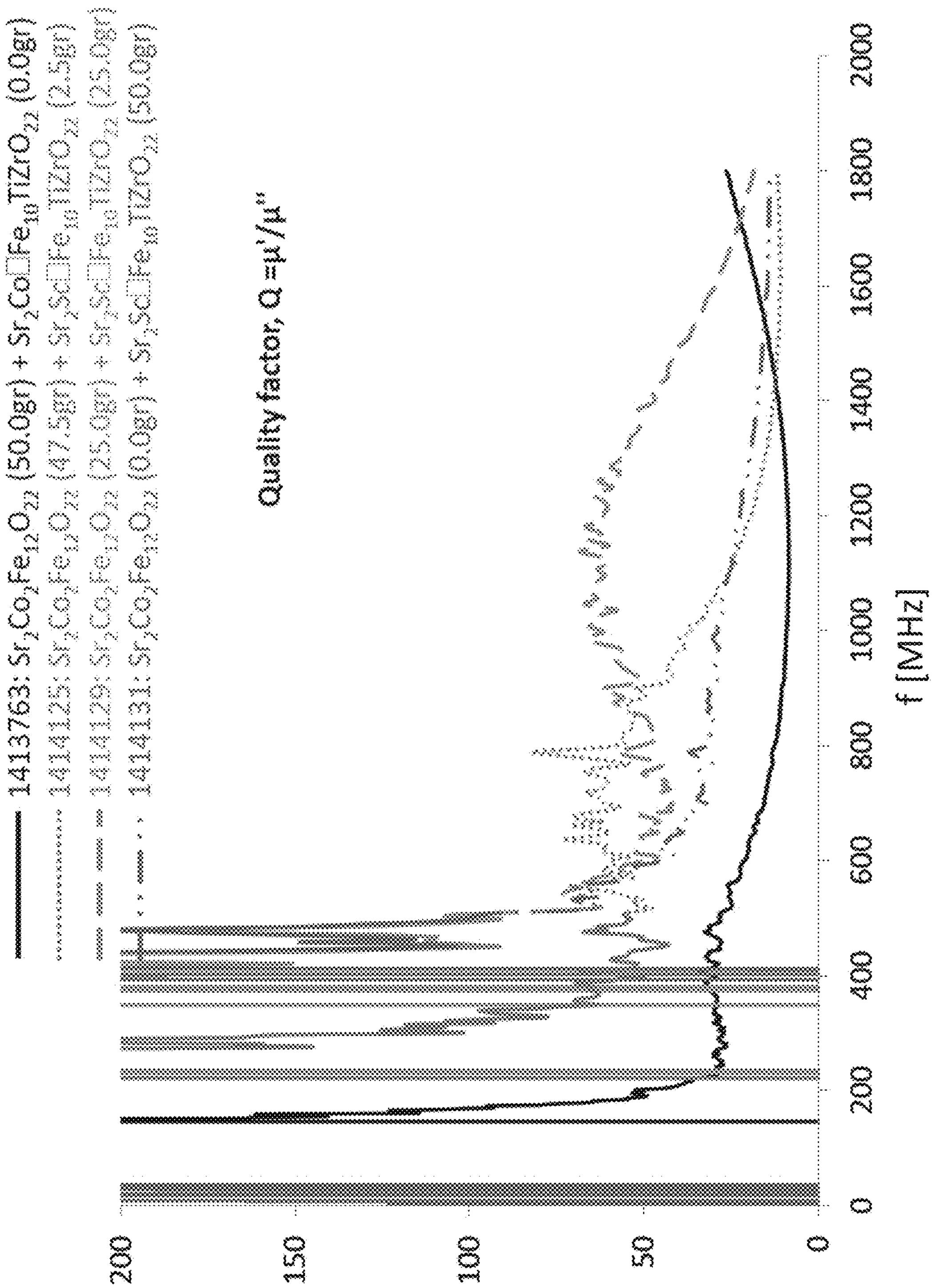
Figure 53A:
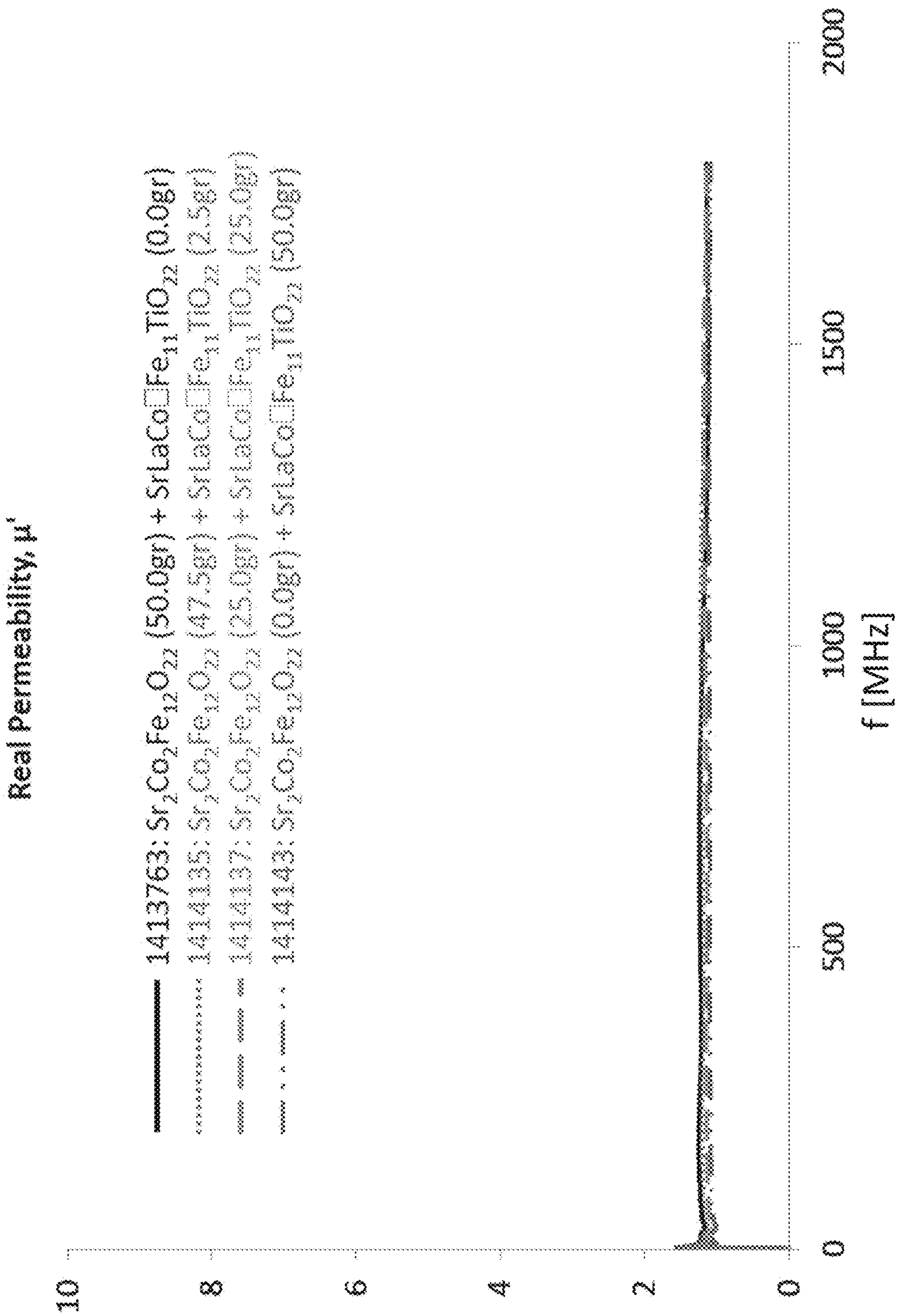
Figure 53B:
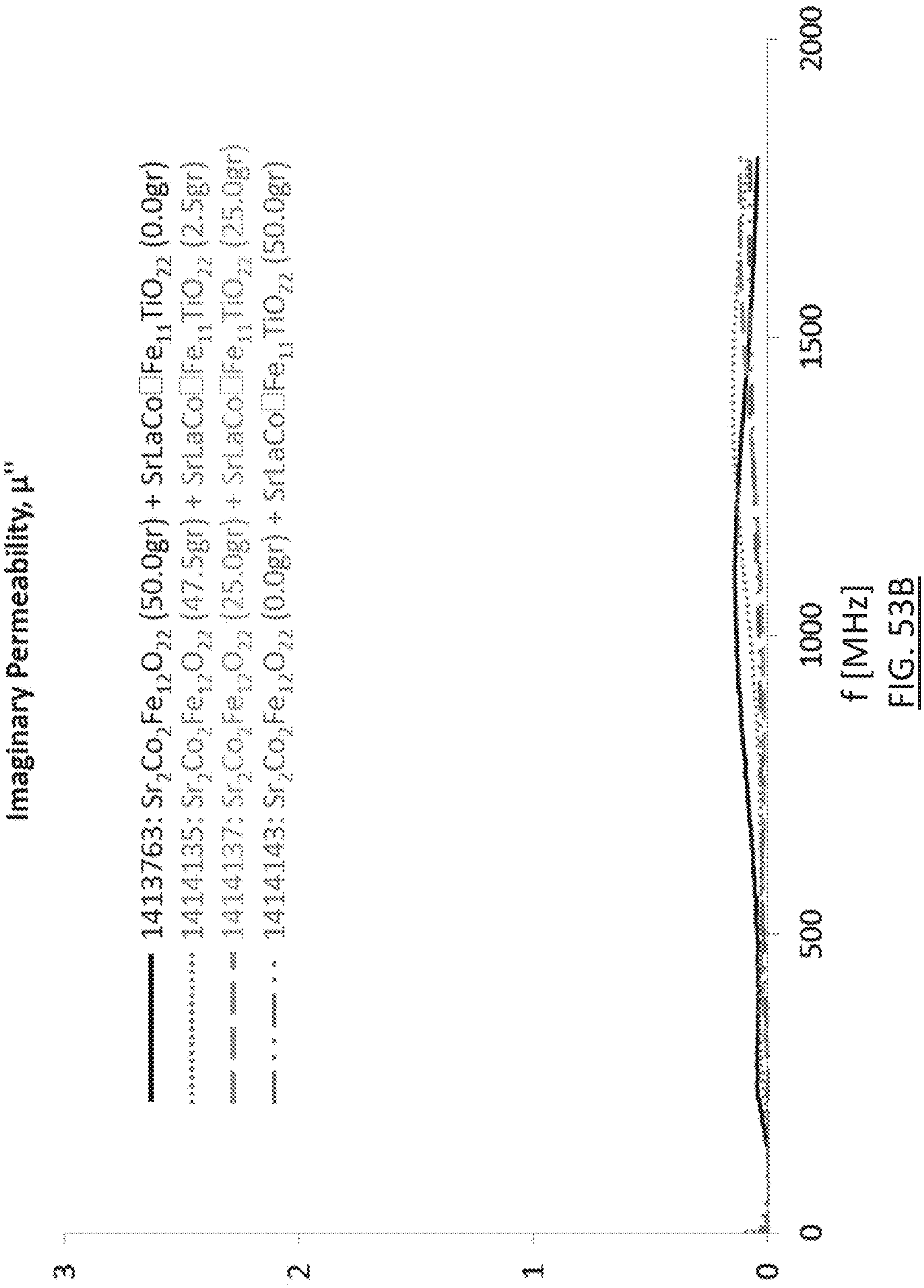
Figure 53C:
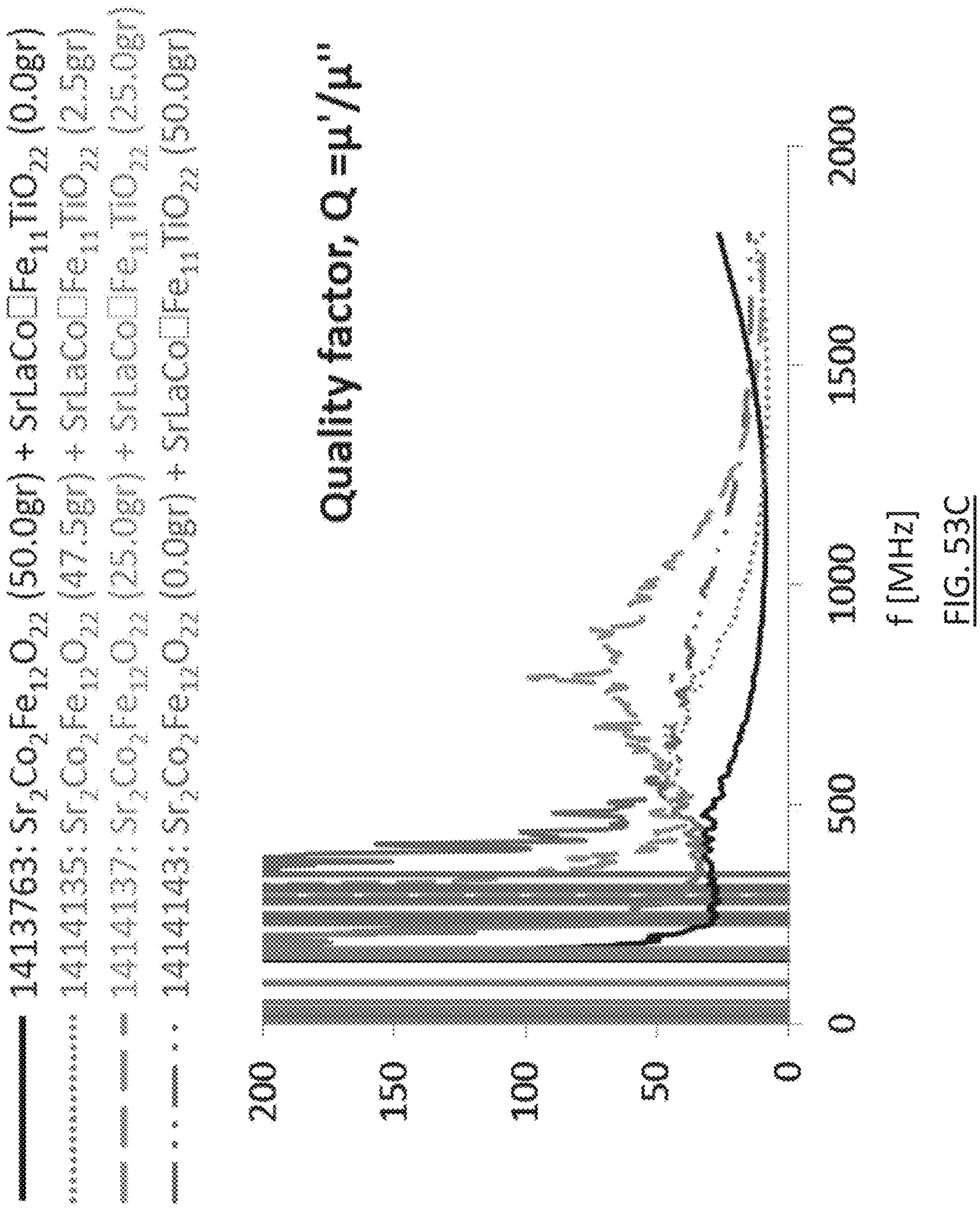
Figure 54A:
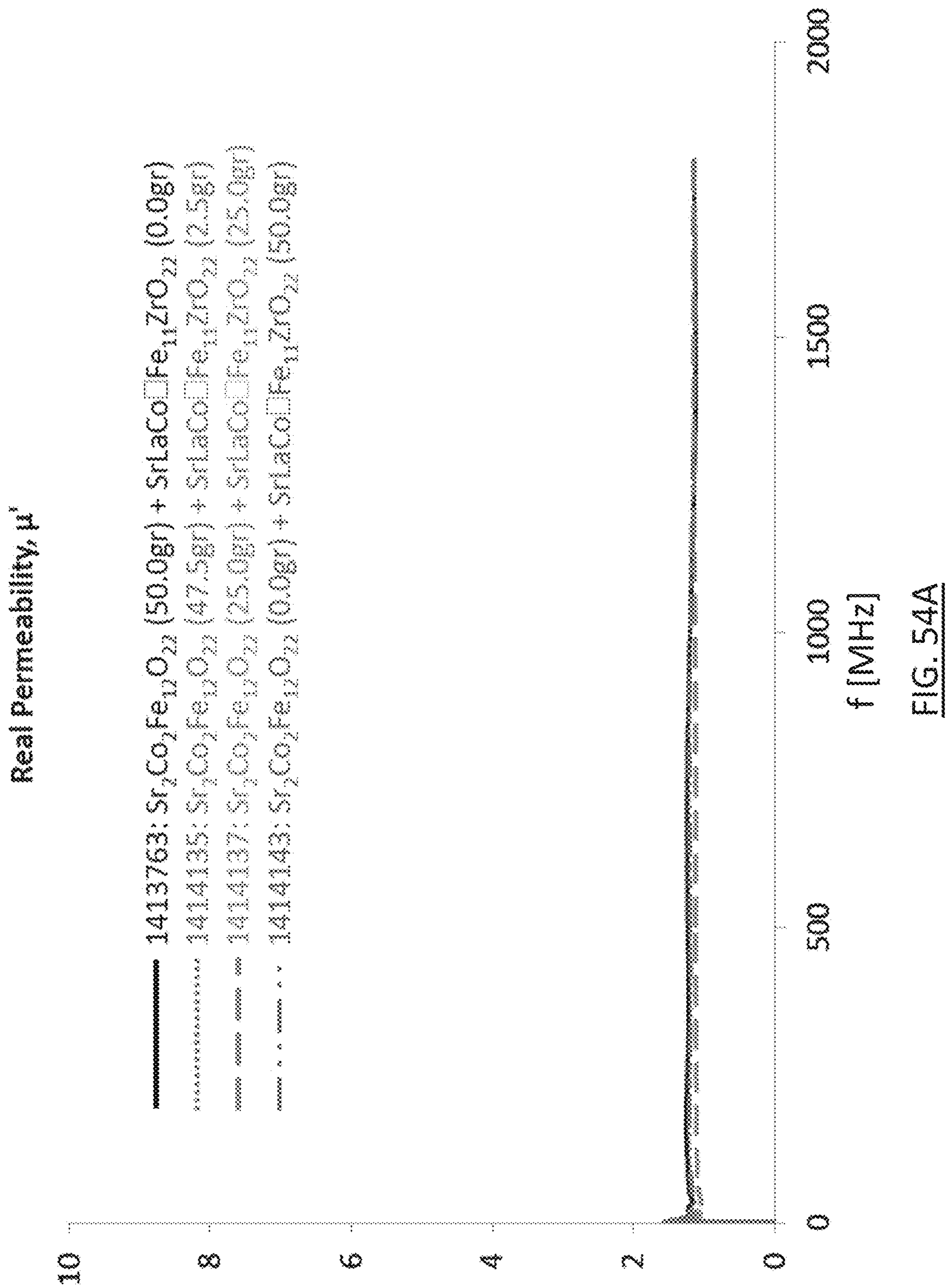
Figure 54B:
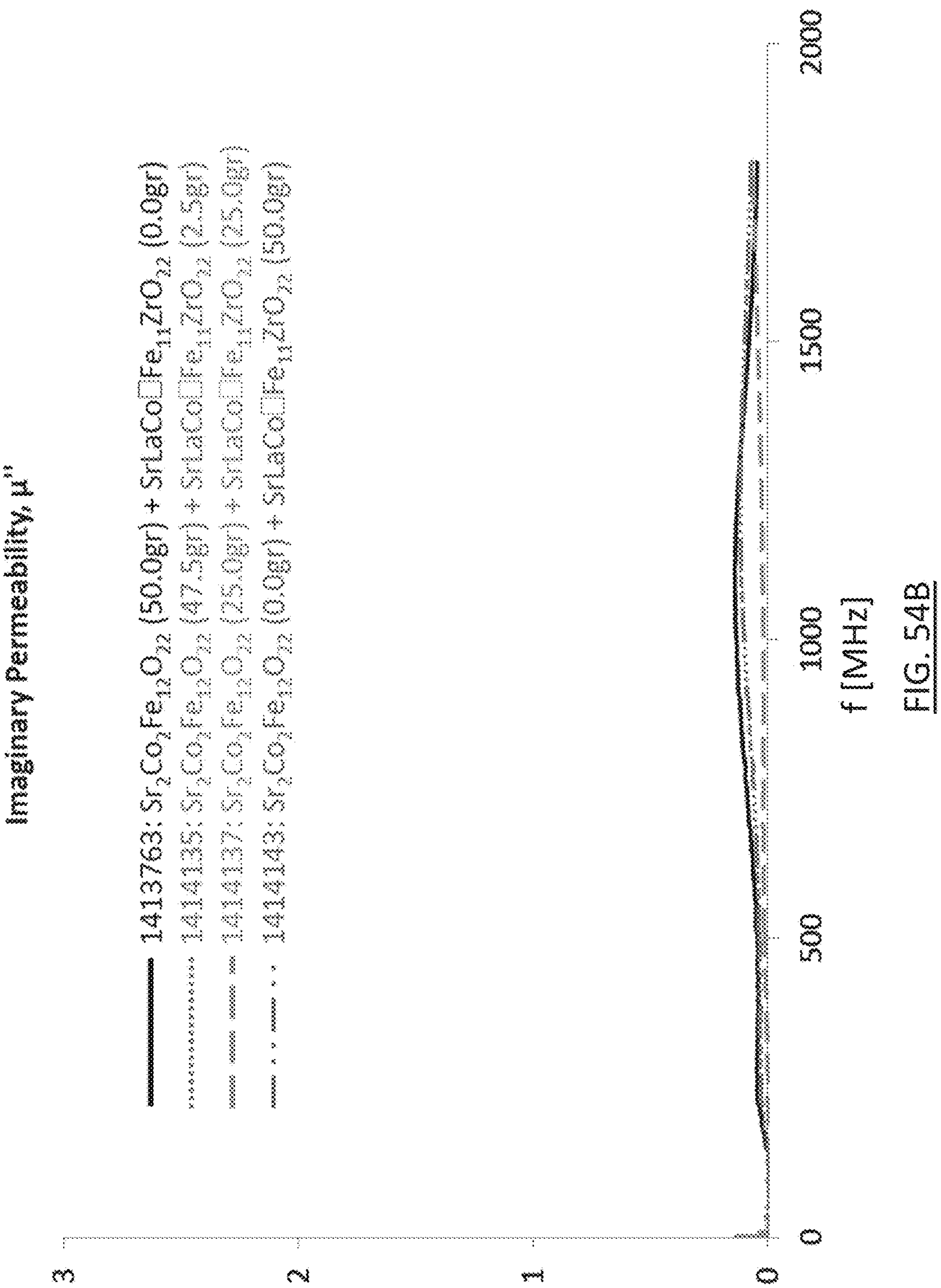
Figure 54C:
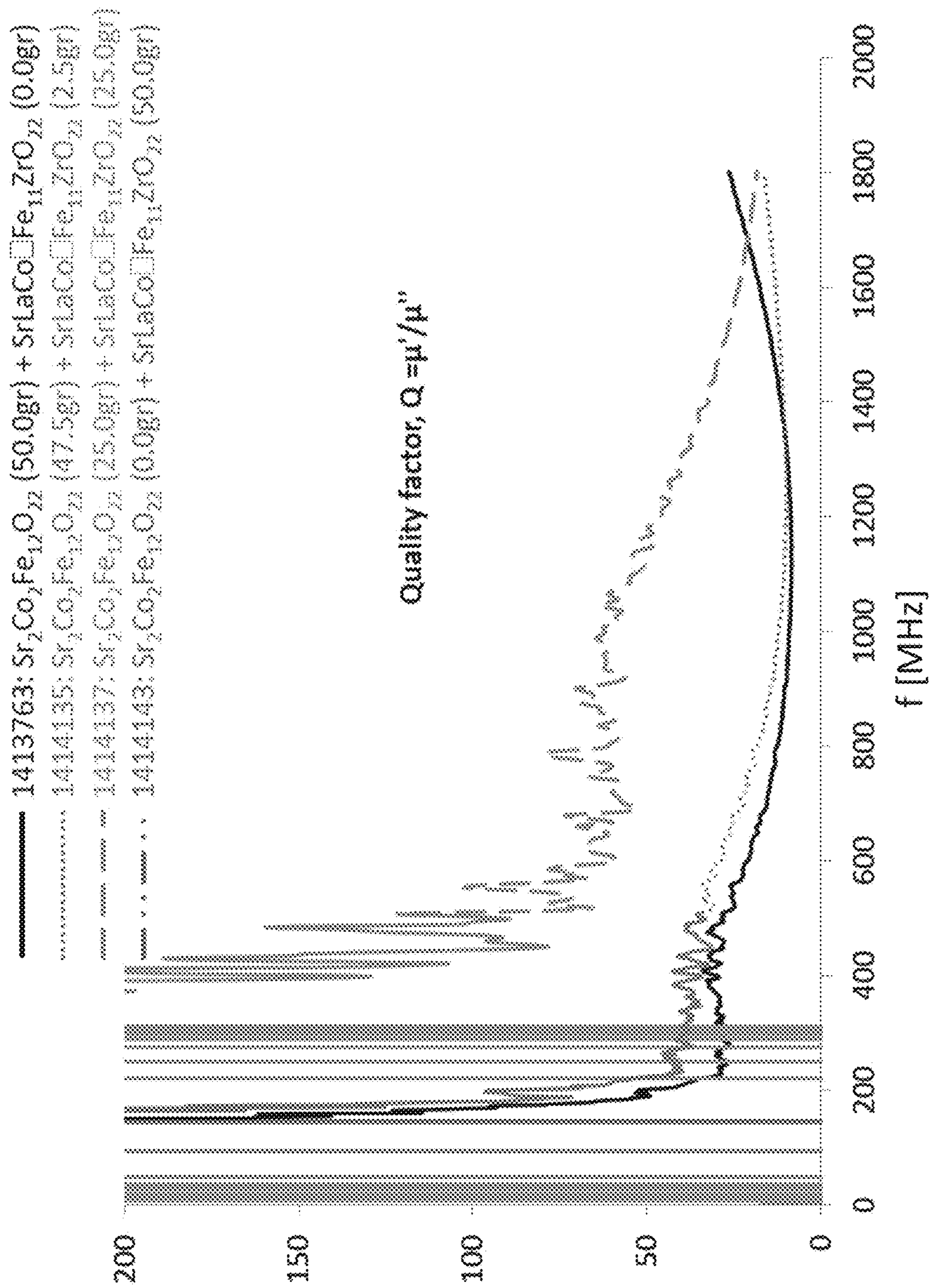
Figure 55A:
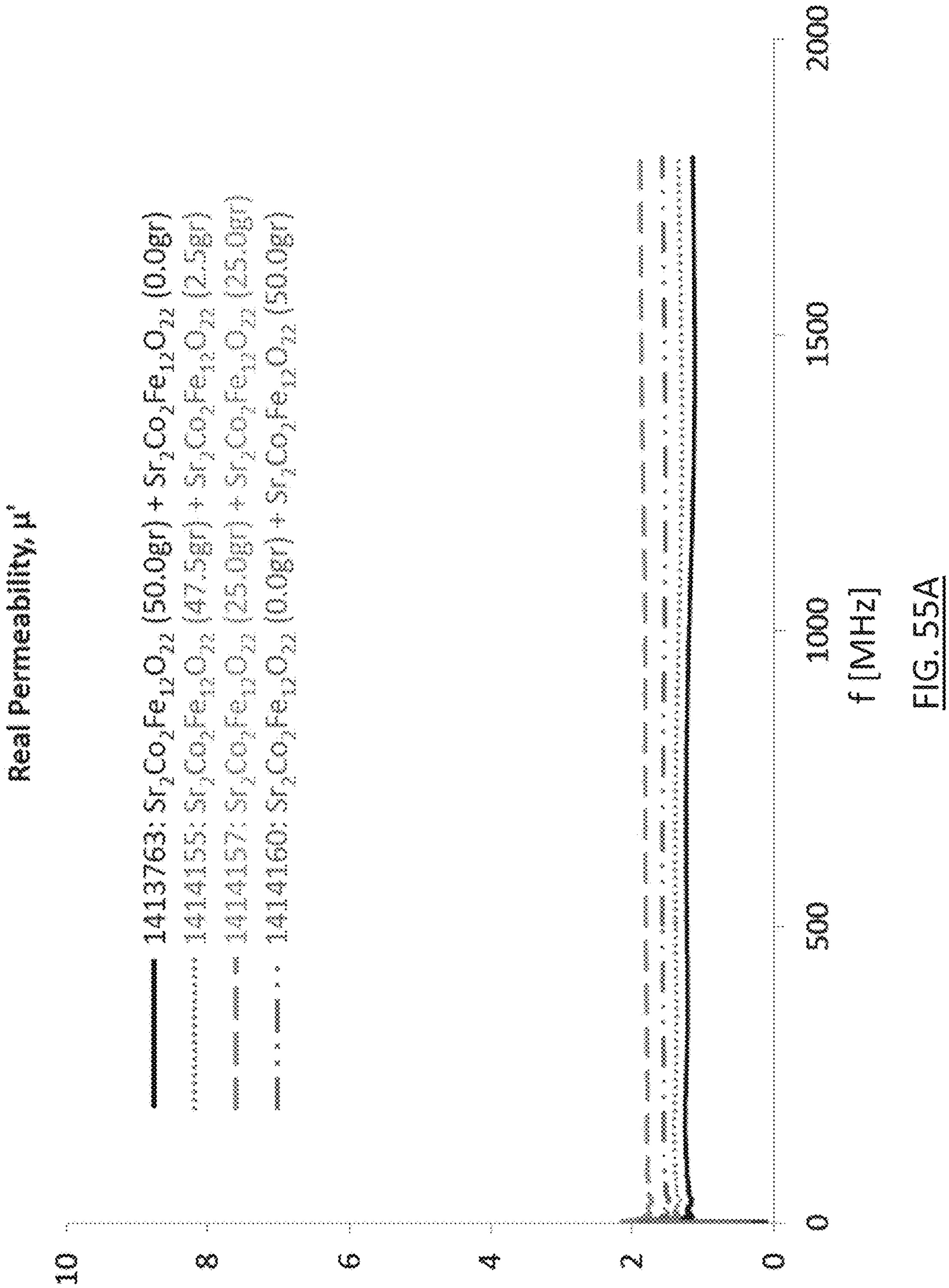
Figure 55B:
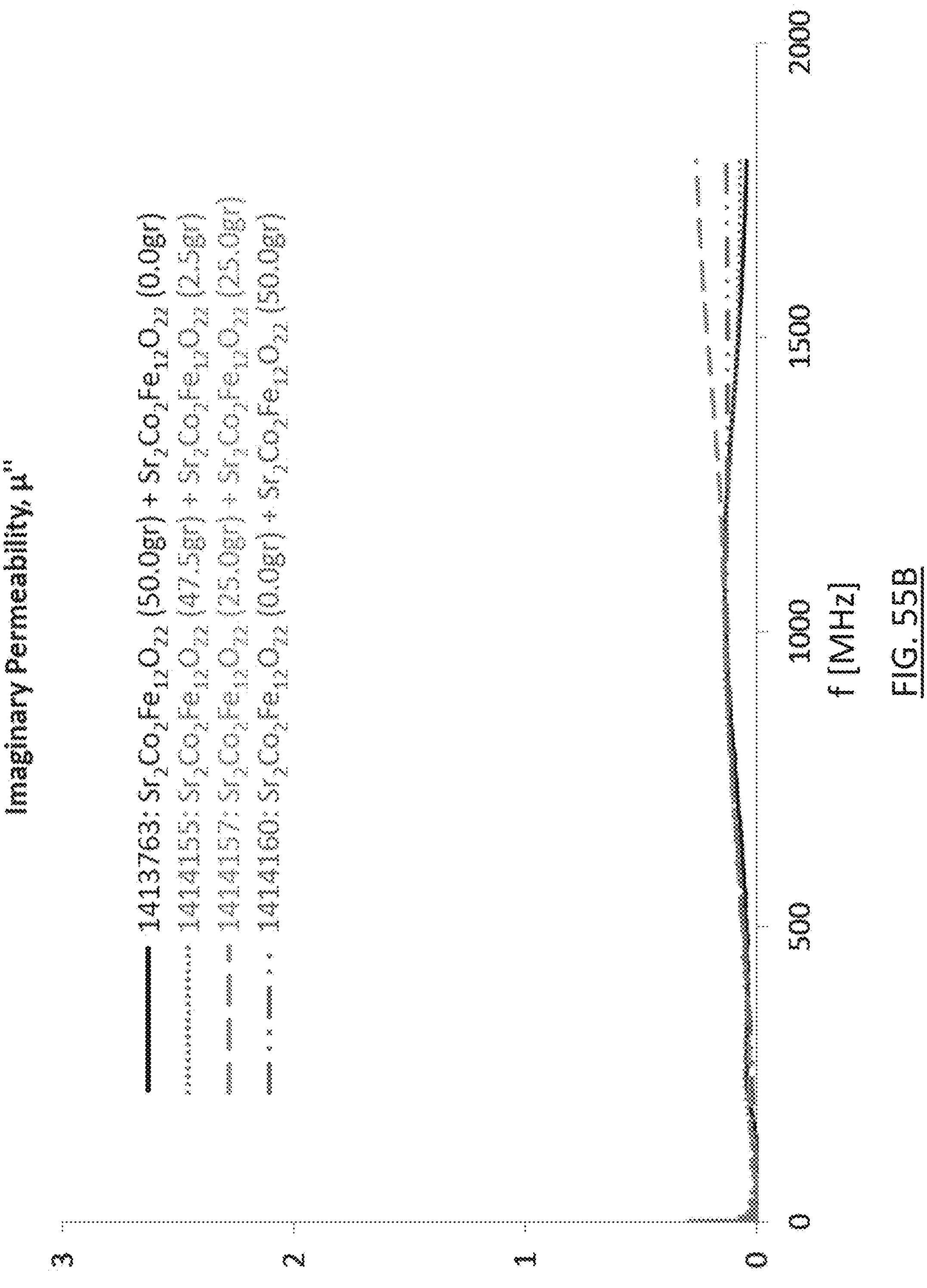
Figure 55C:
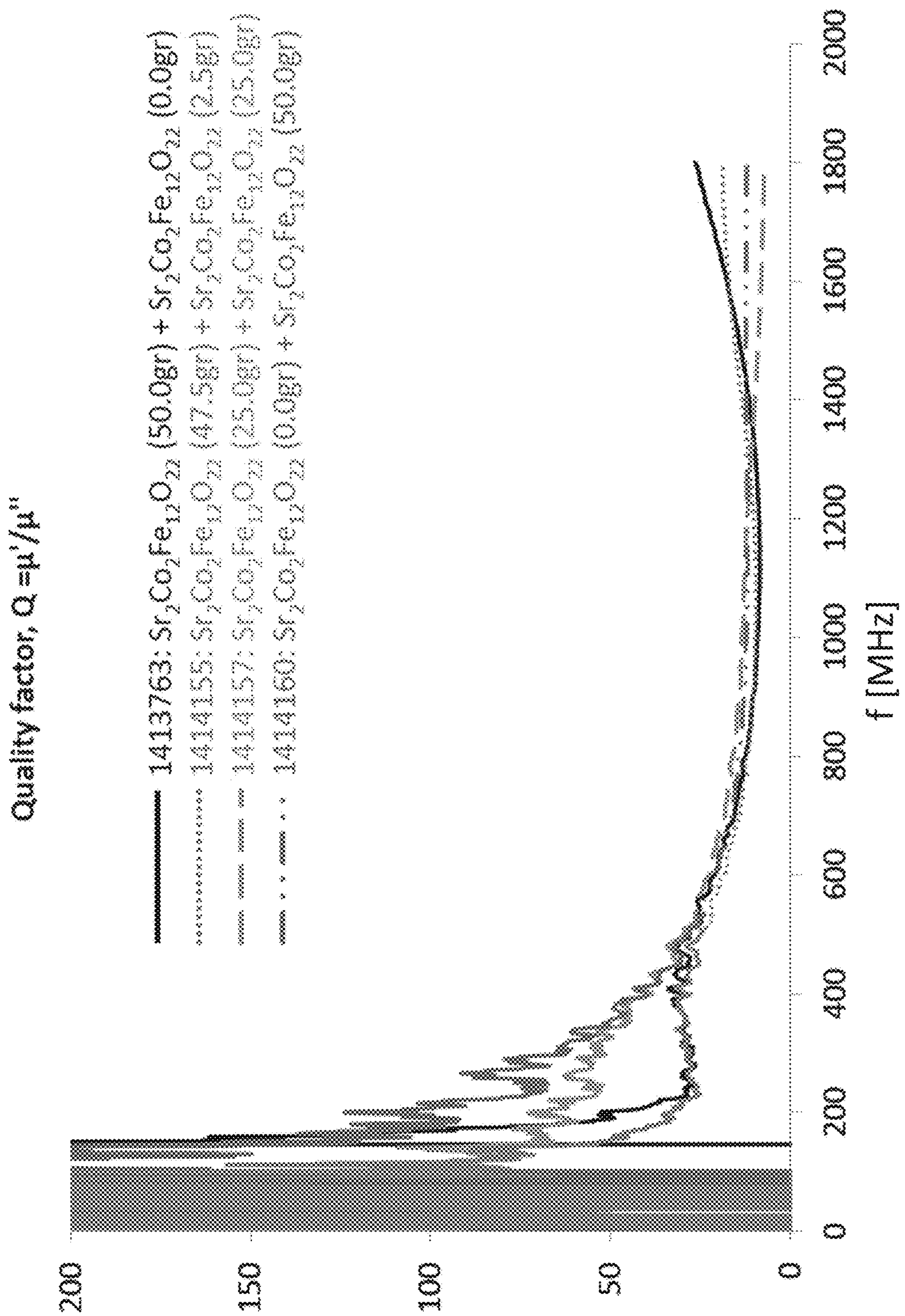
Figure 56A:
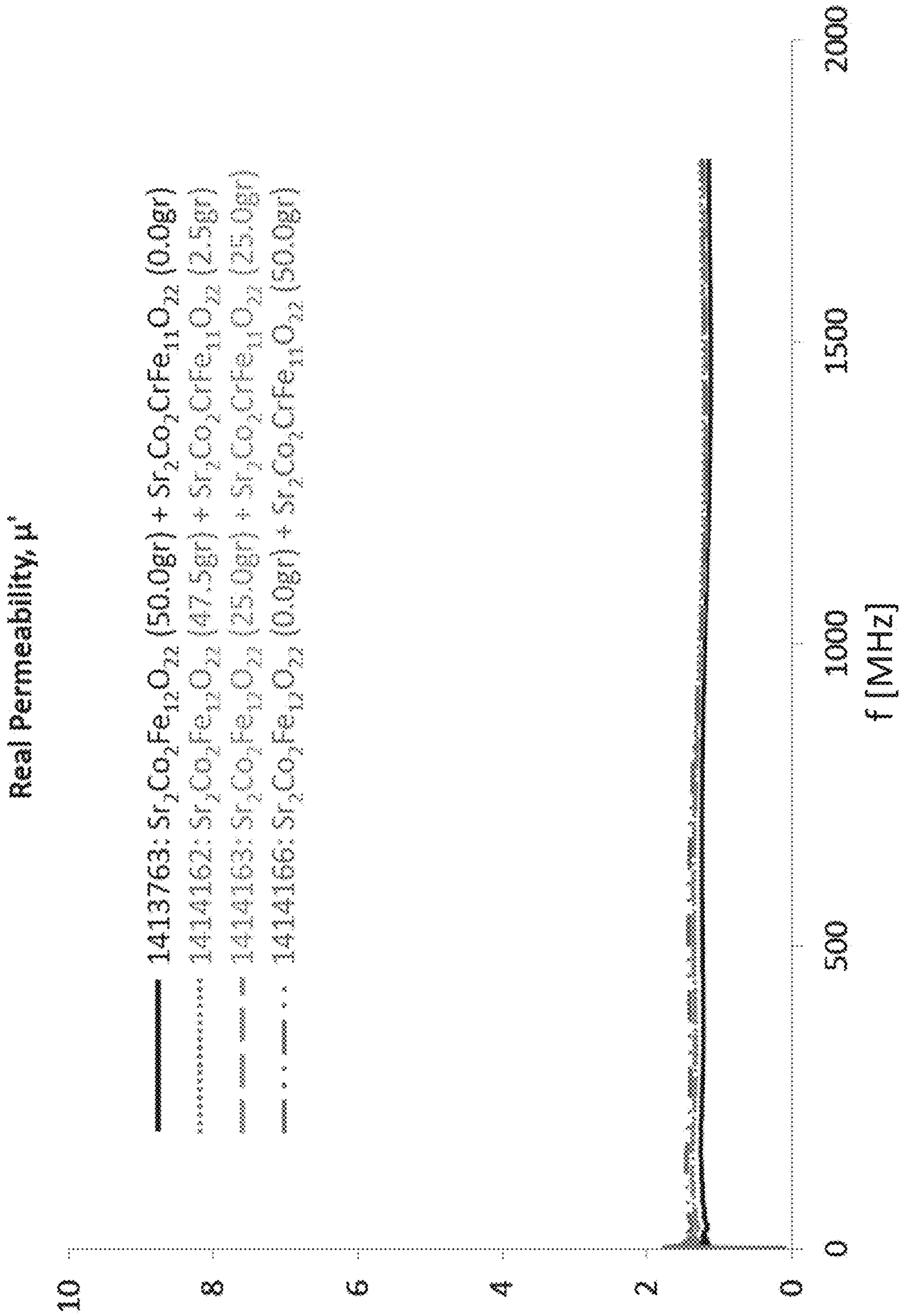
Figure 56B:
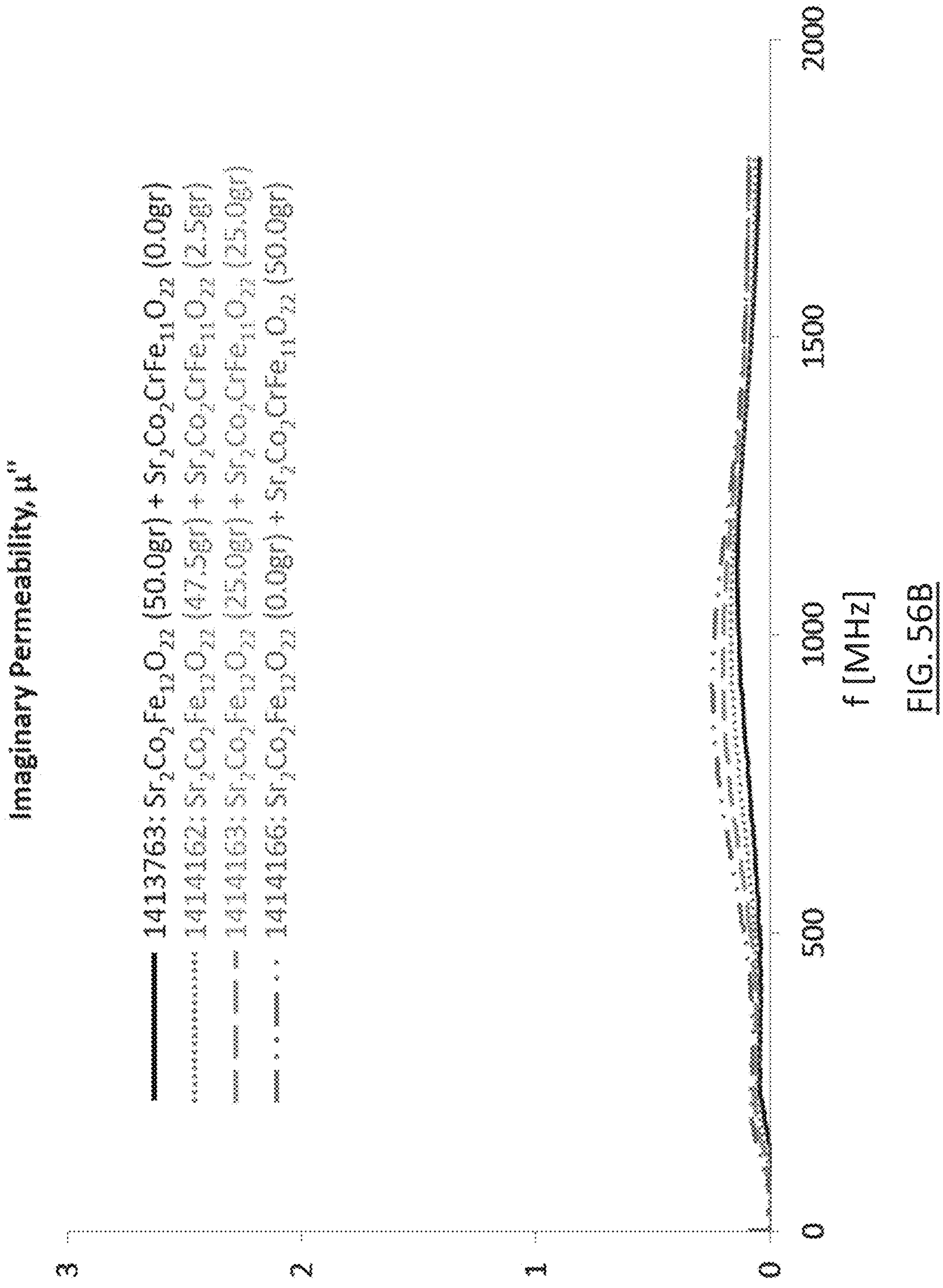
Figure 56C:
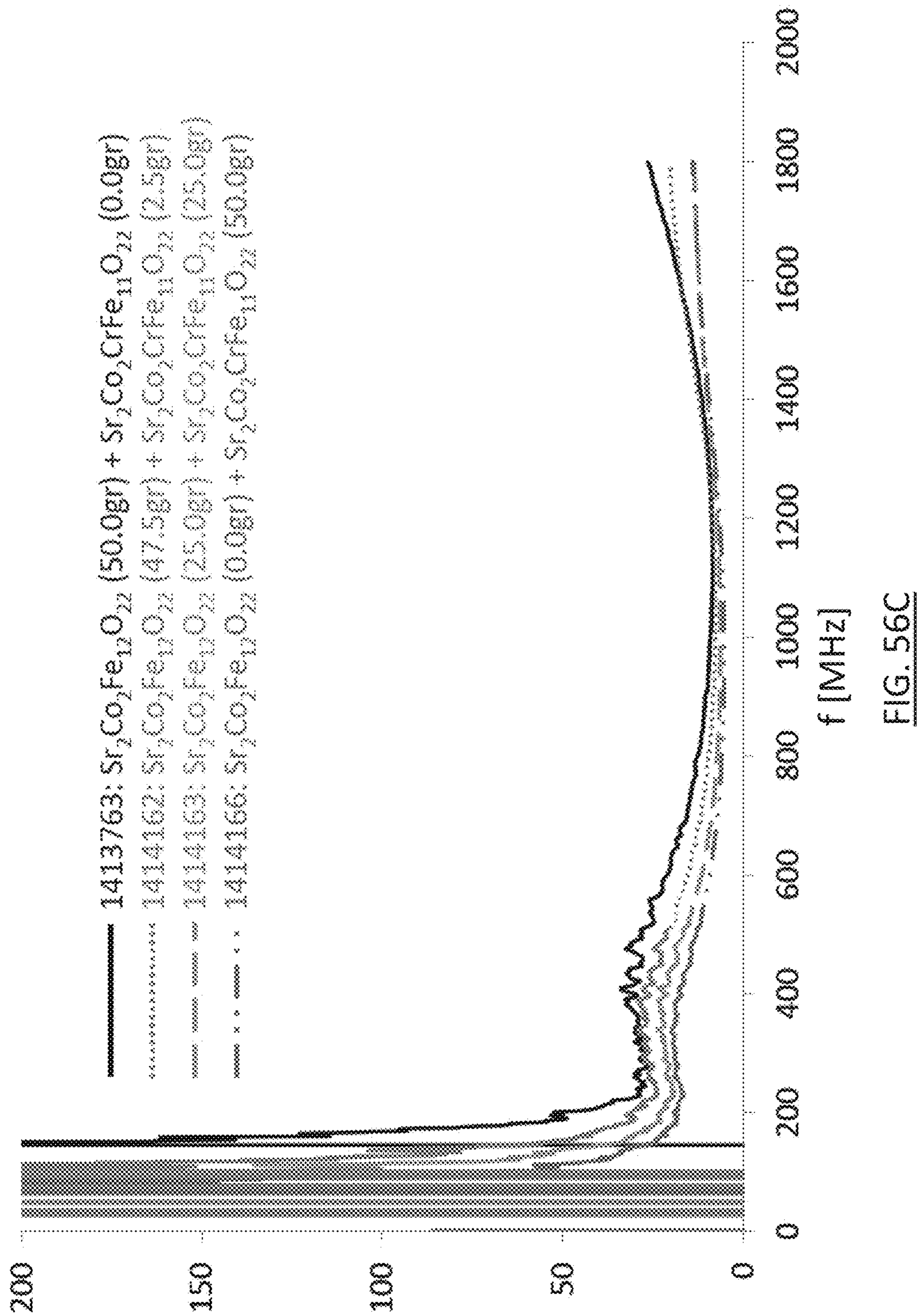
Figure 57A:
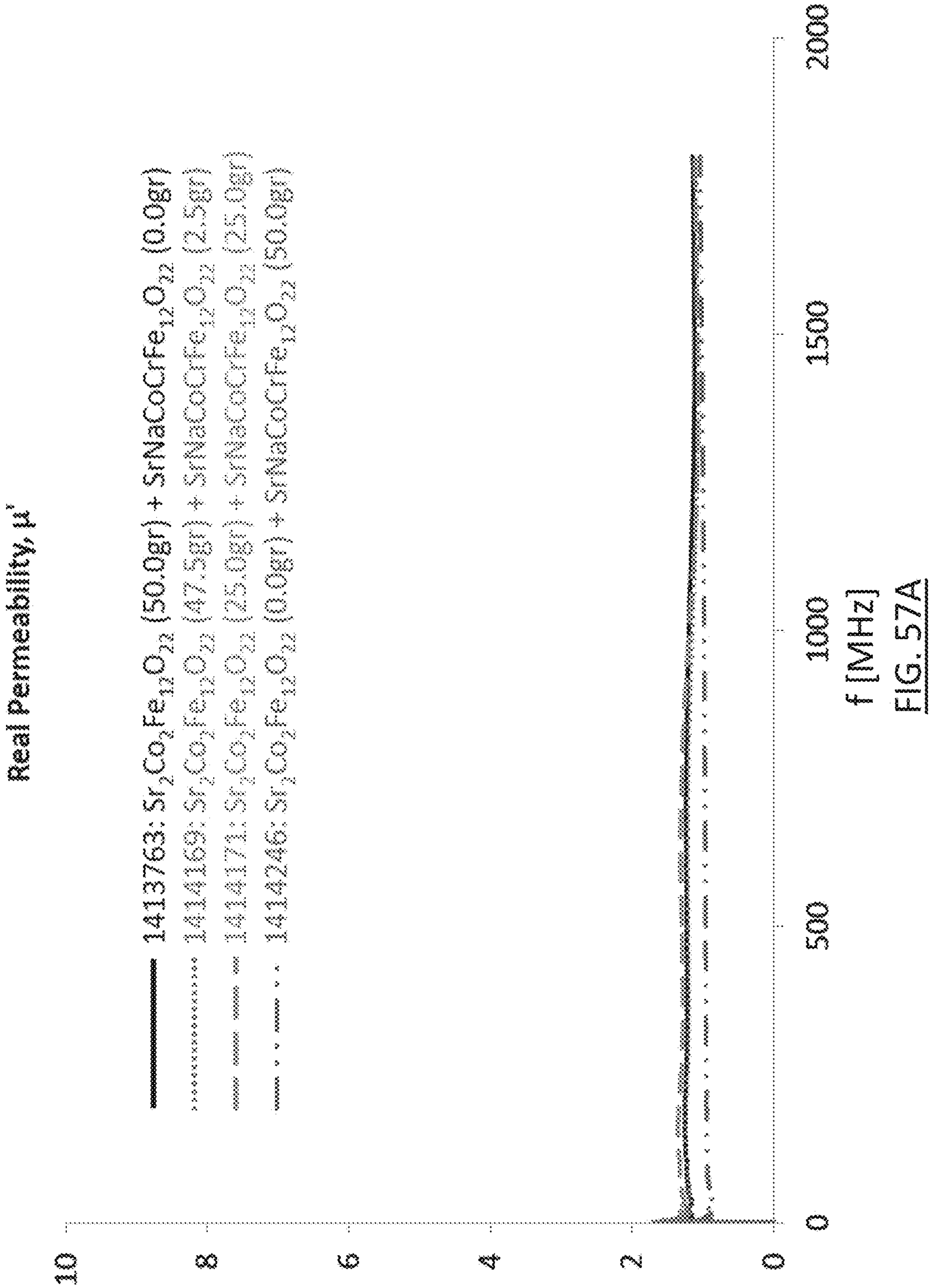
Figure 57B:
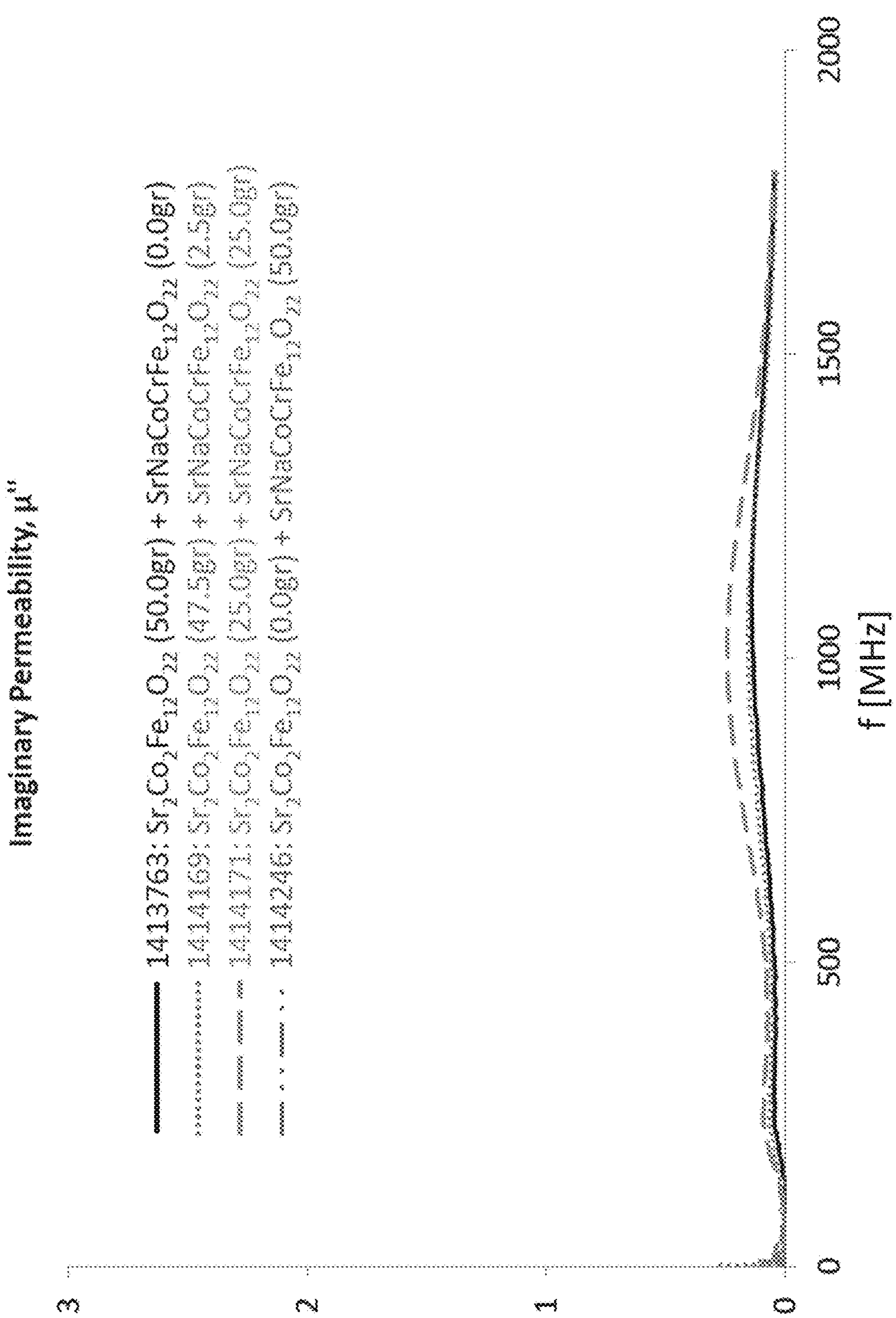
Figure 57C:
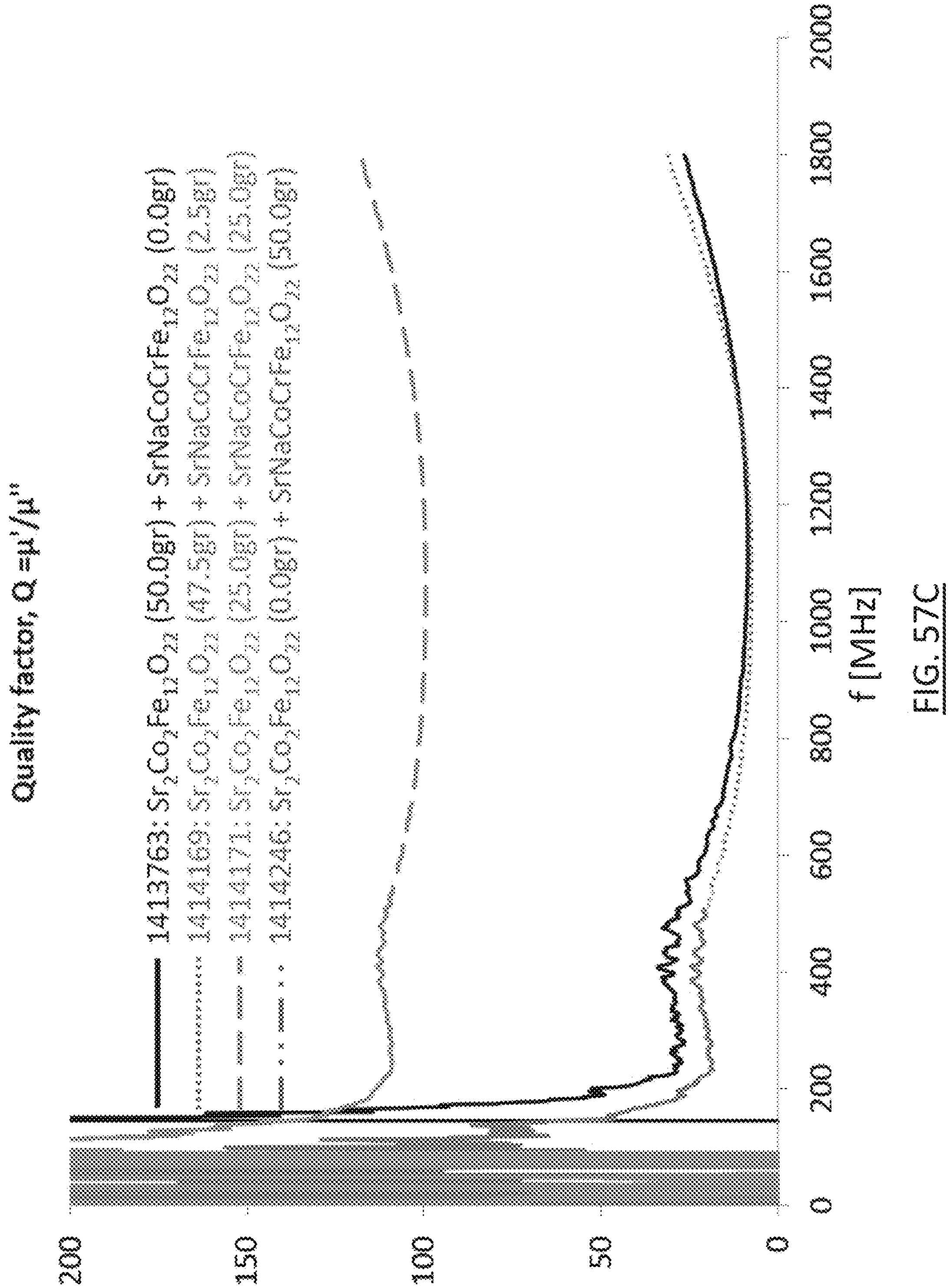
Figure 58A:
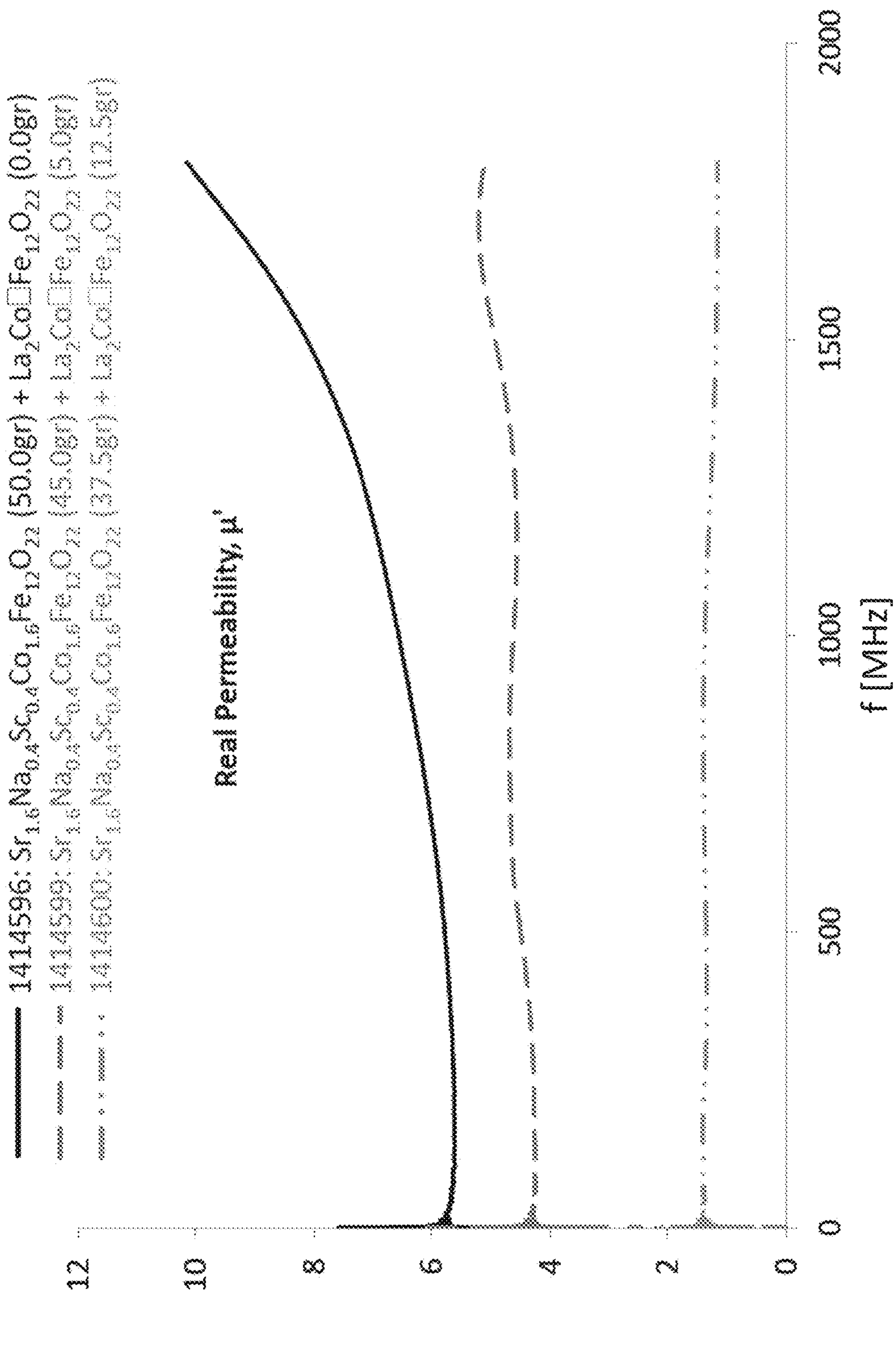
Figure 58B:
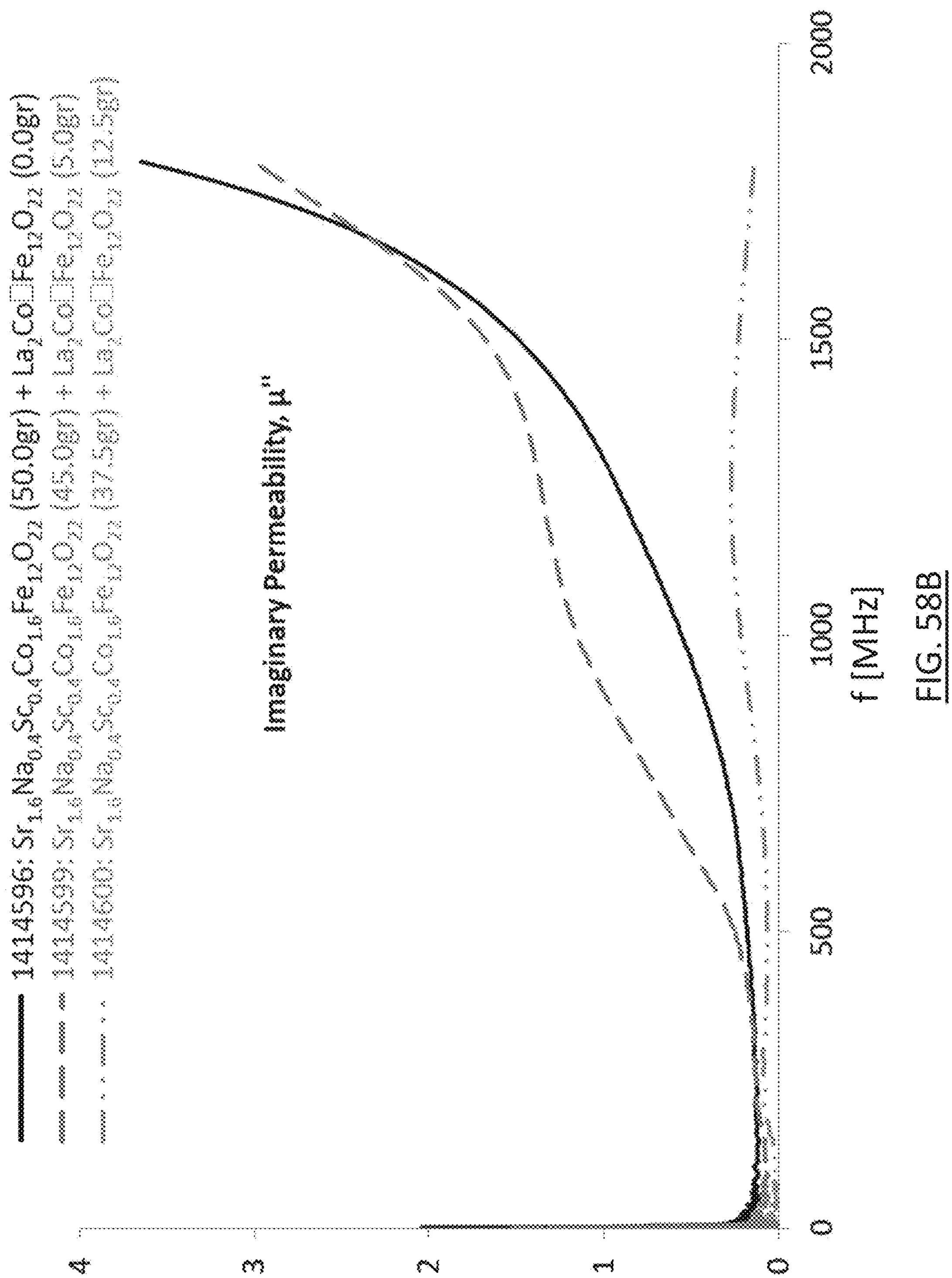
Figure 58C:
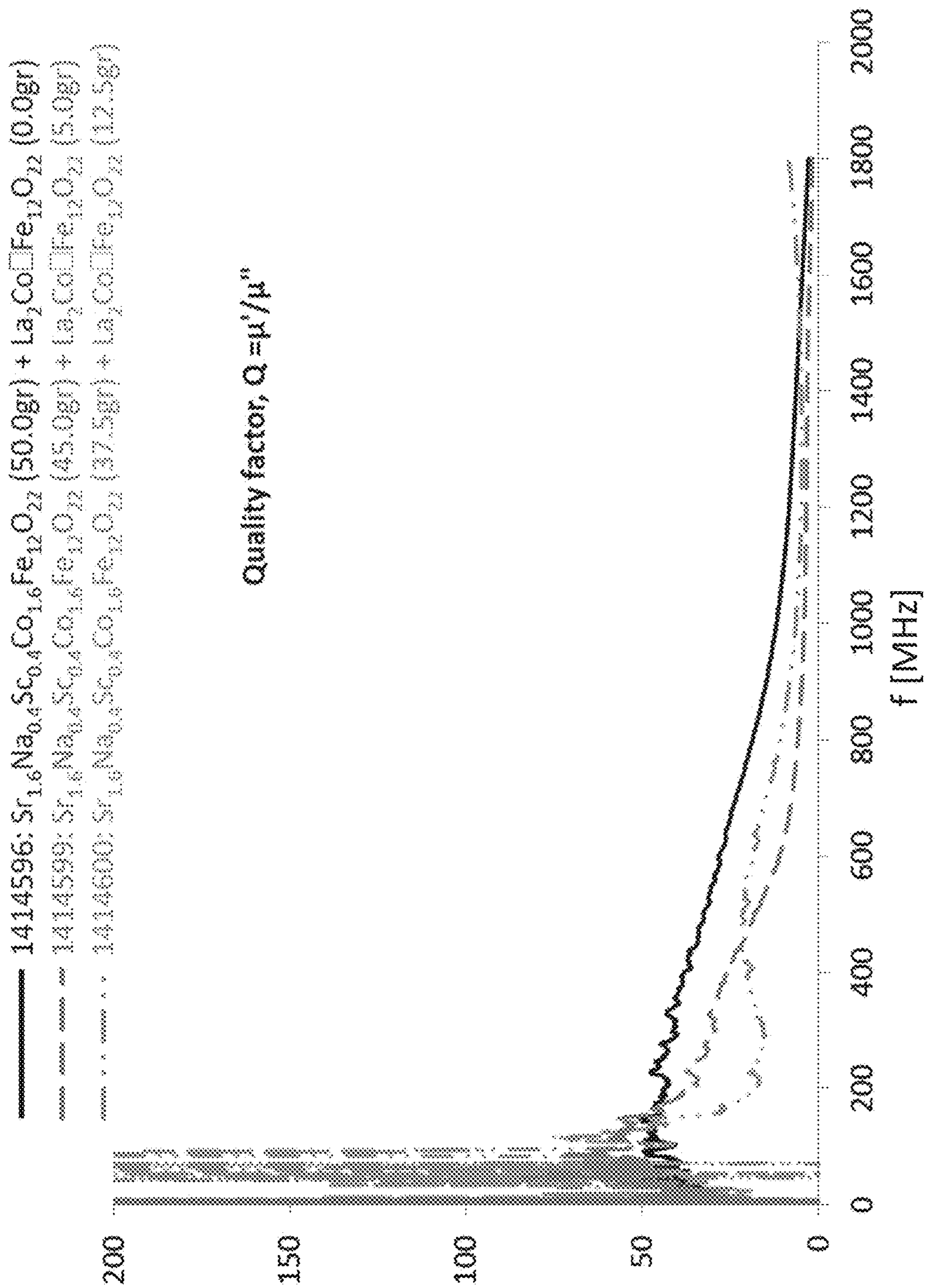
Figure 59A:
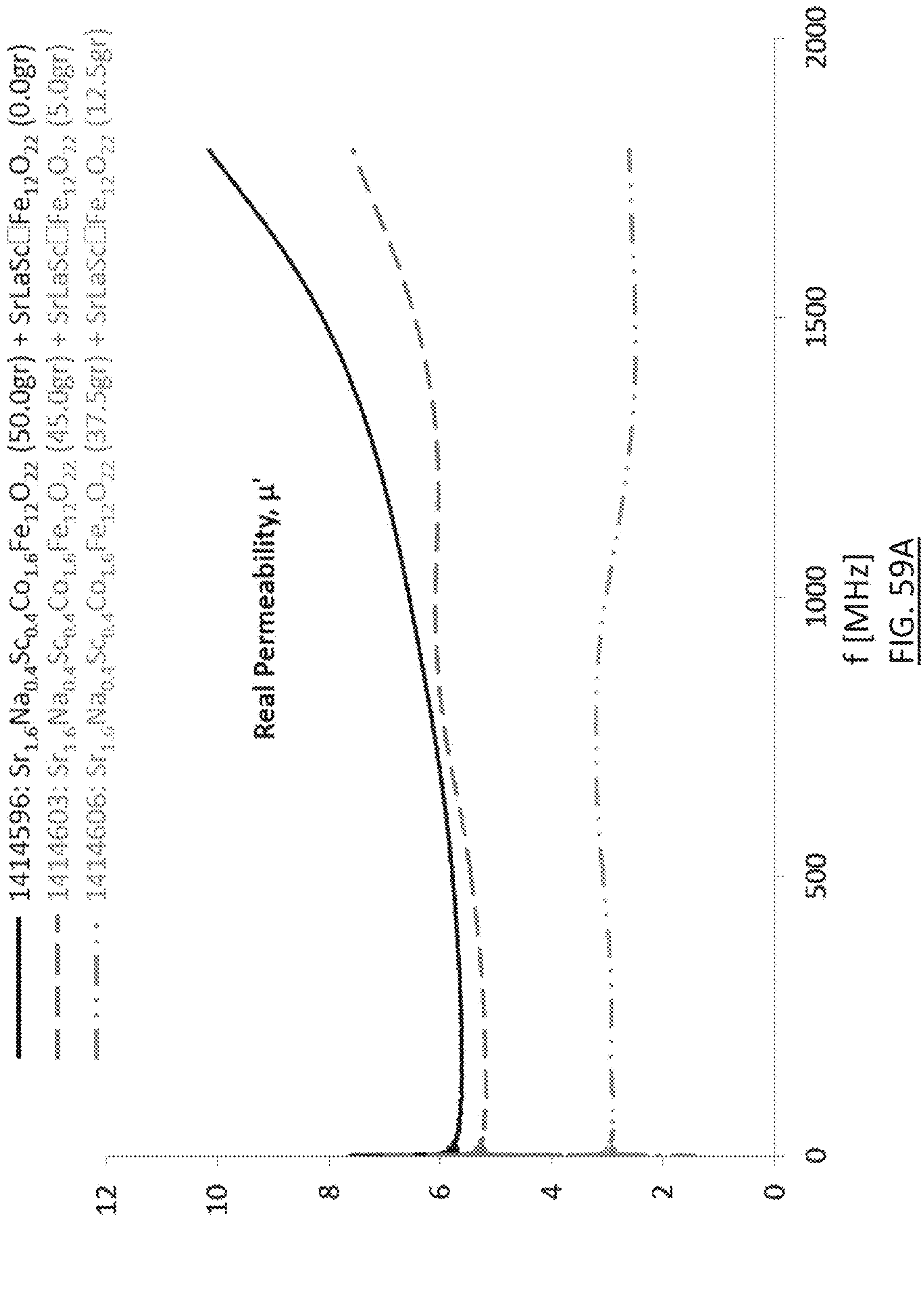
Figure 59B:
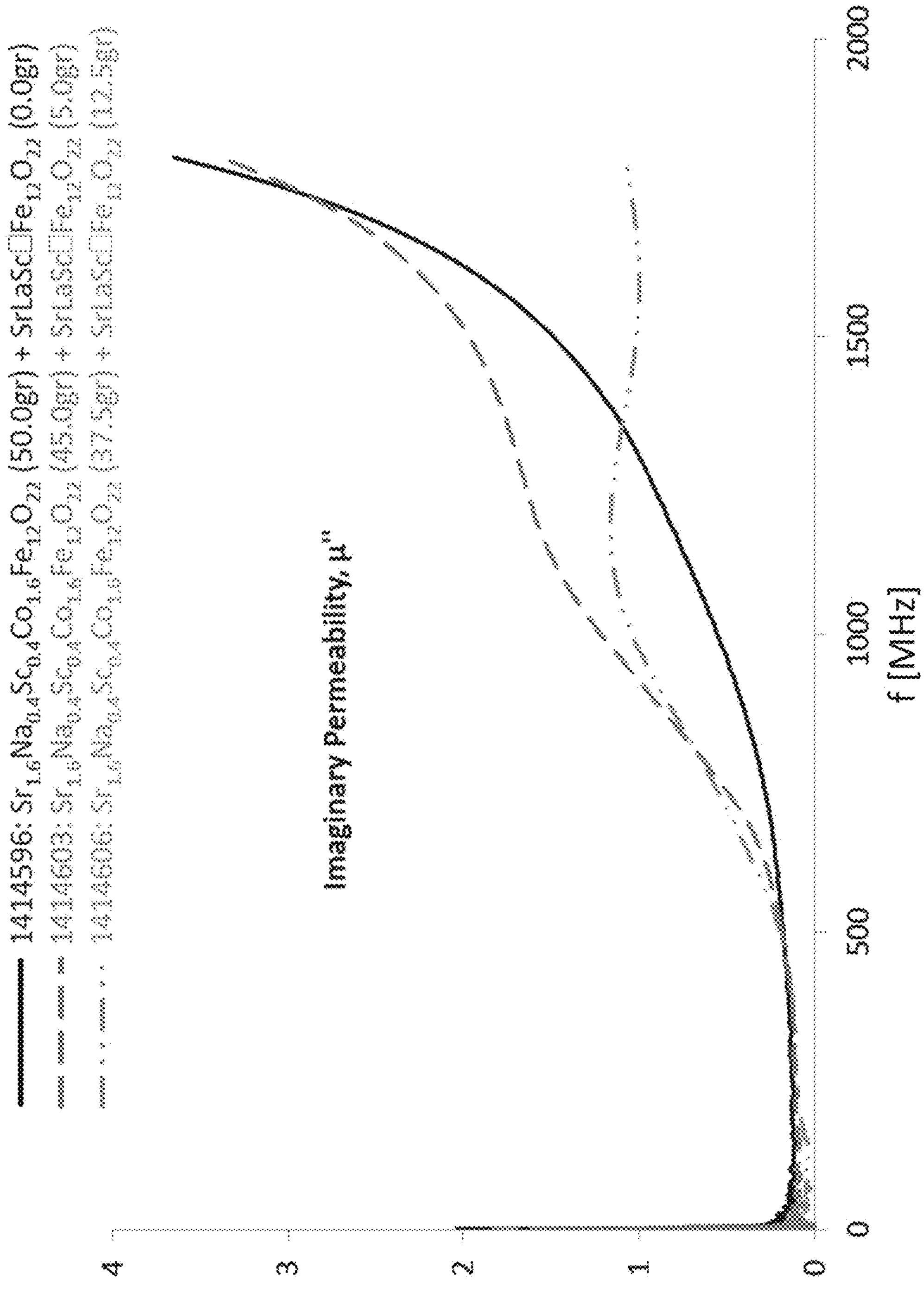
Figure 59C:
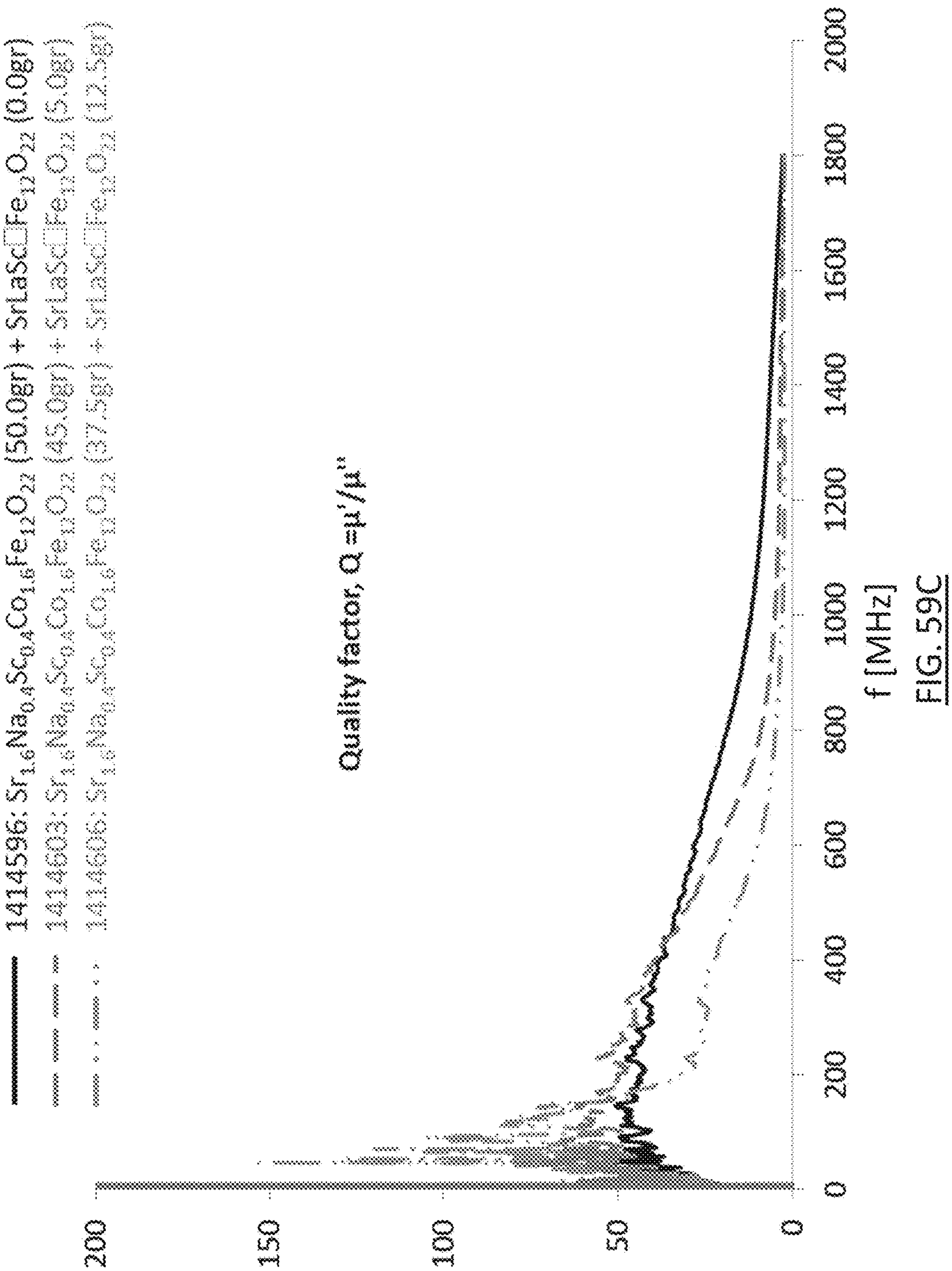
Figure 60A:
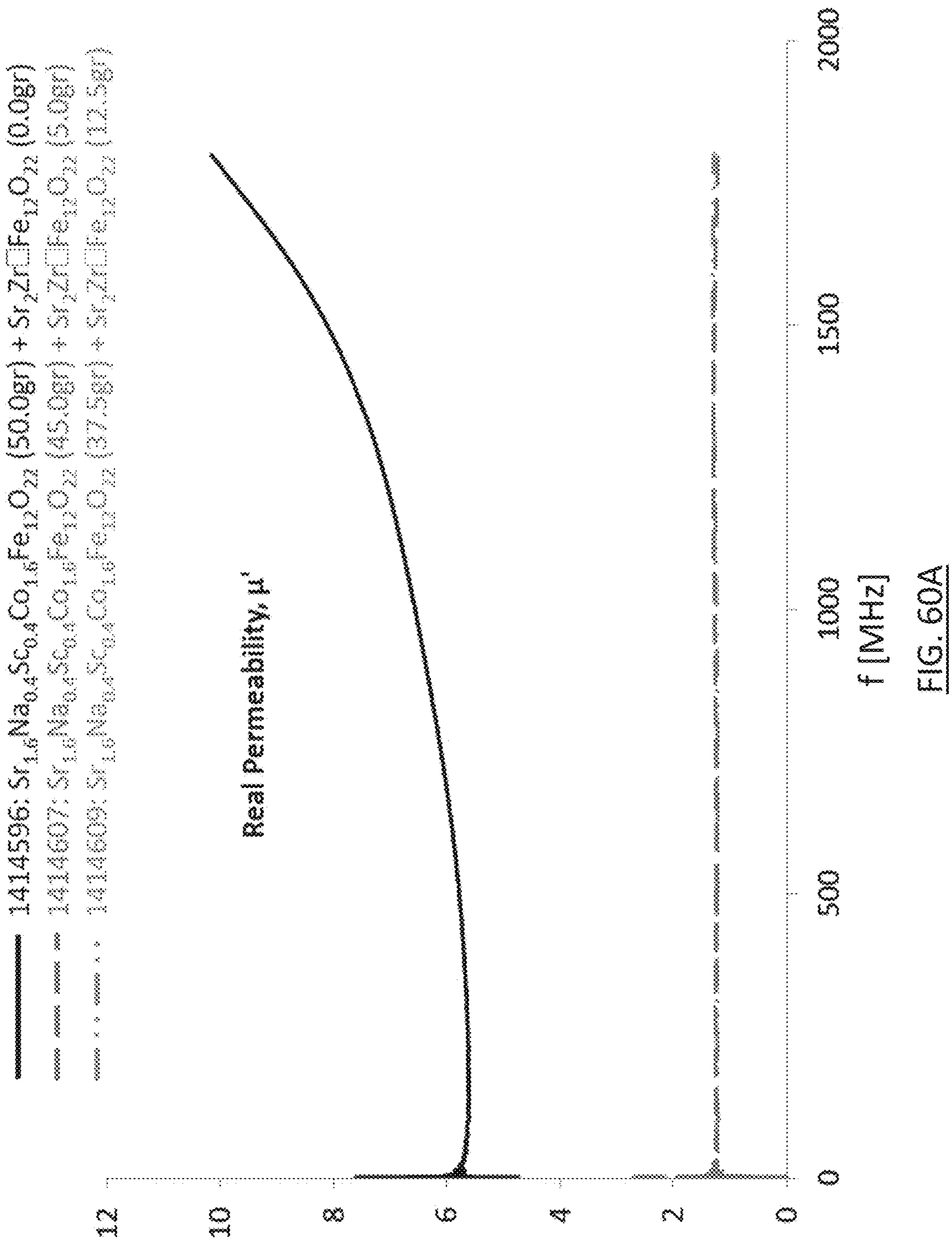
Figure 60B:
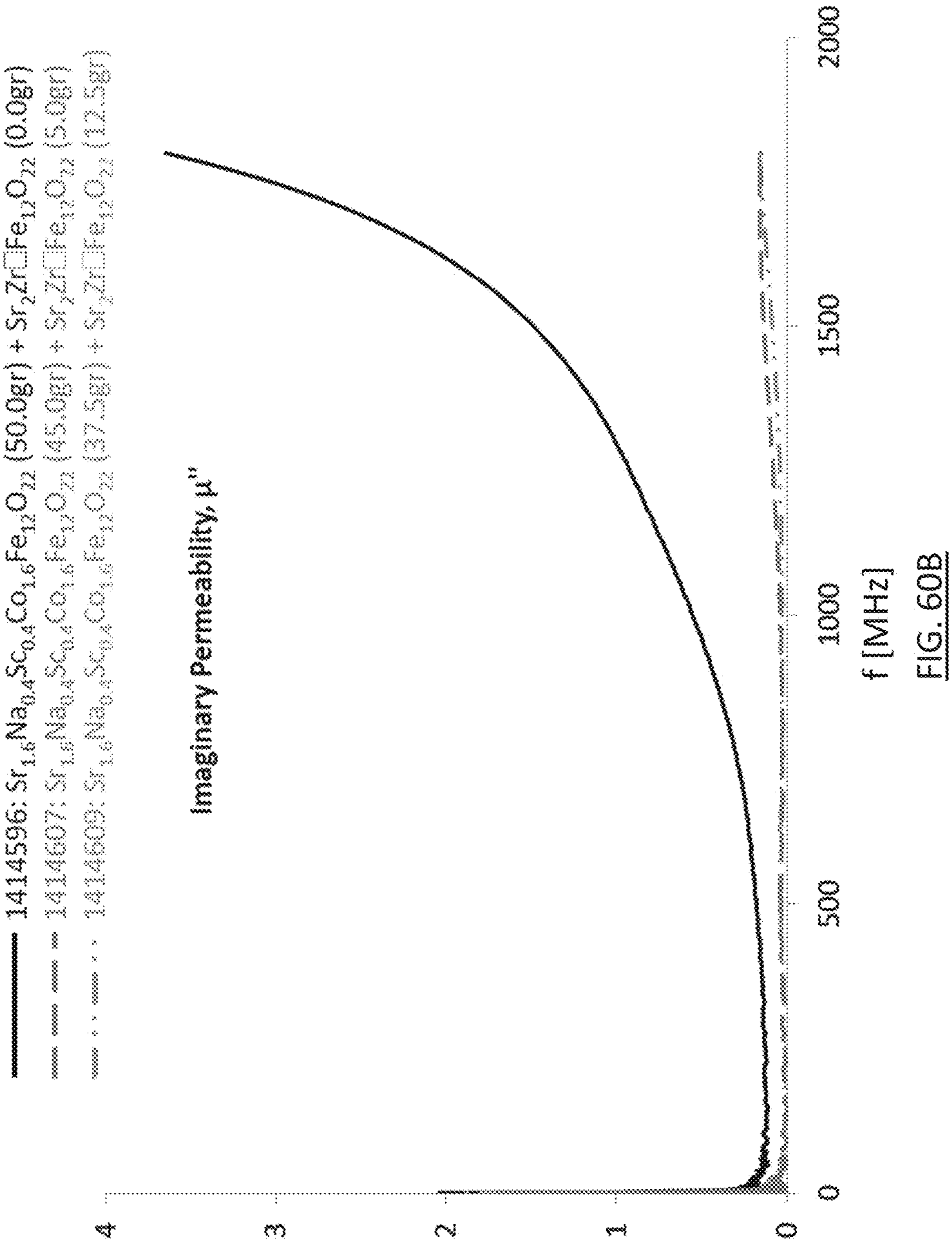
Figure 60C:
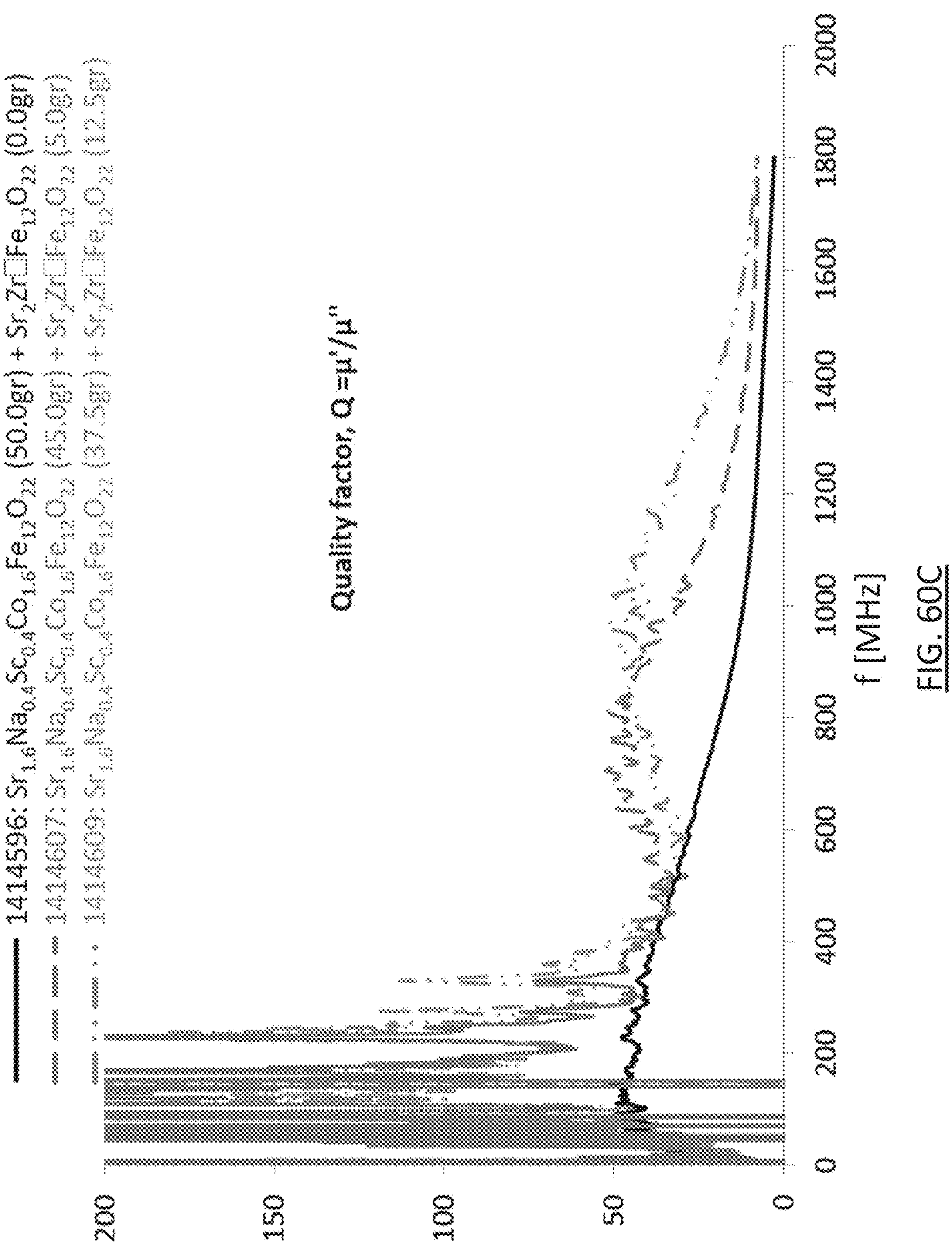
Figure 61A:
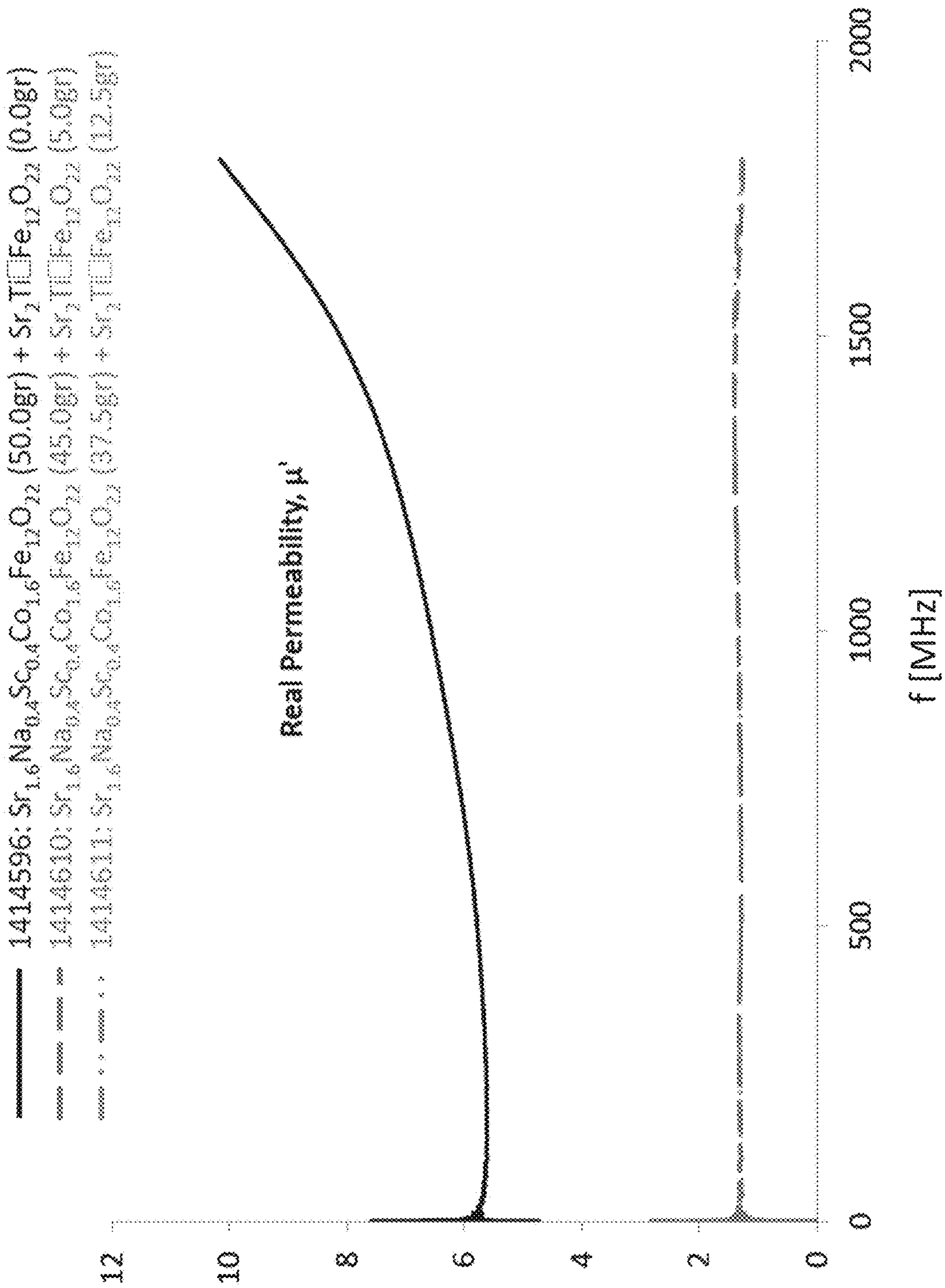
Figure 61B:
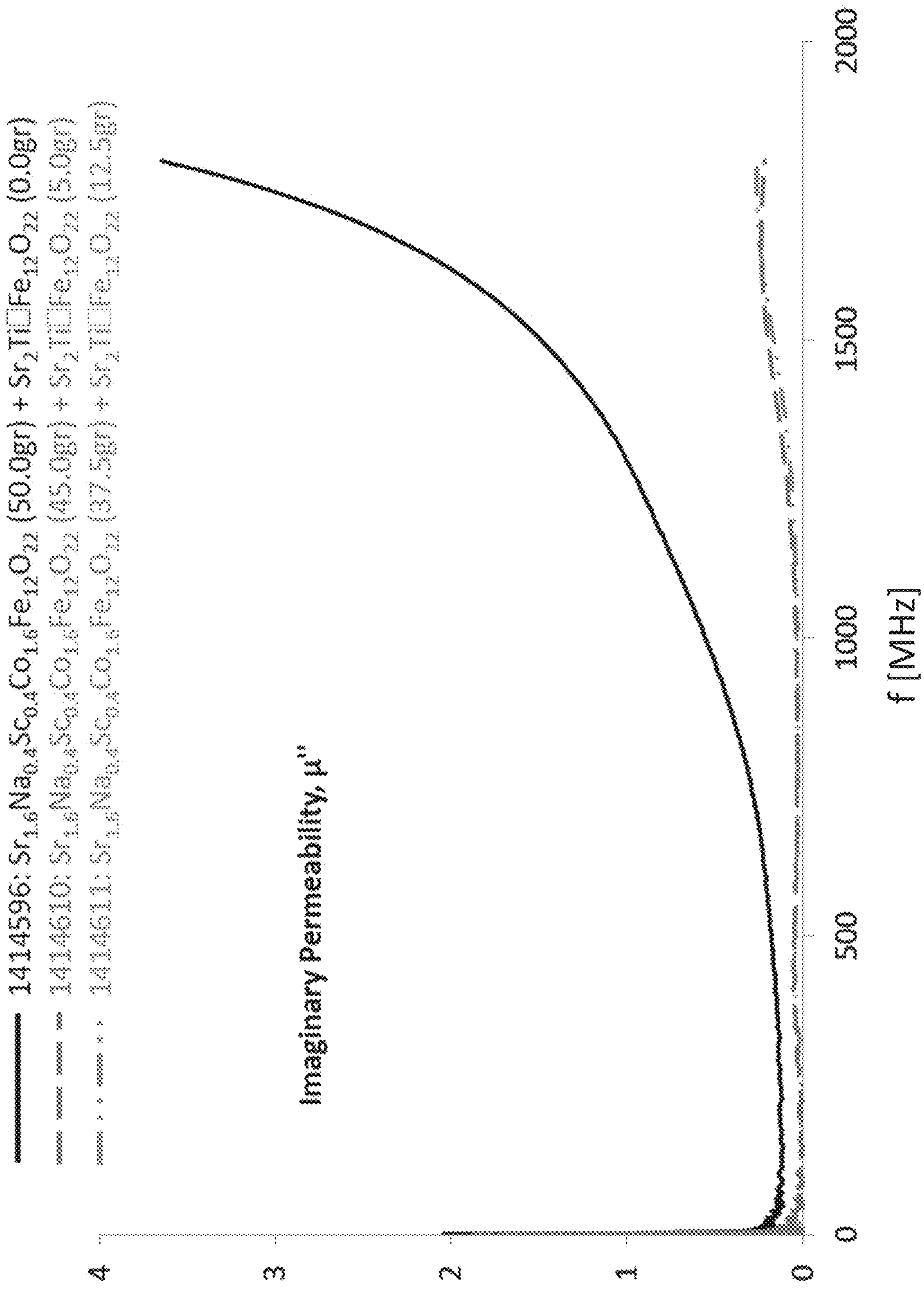
Figure 61C:
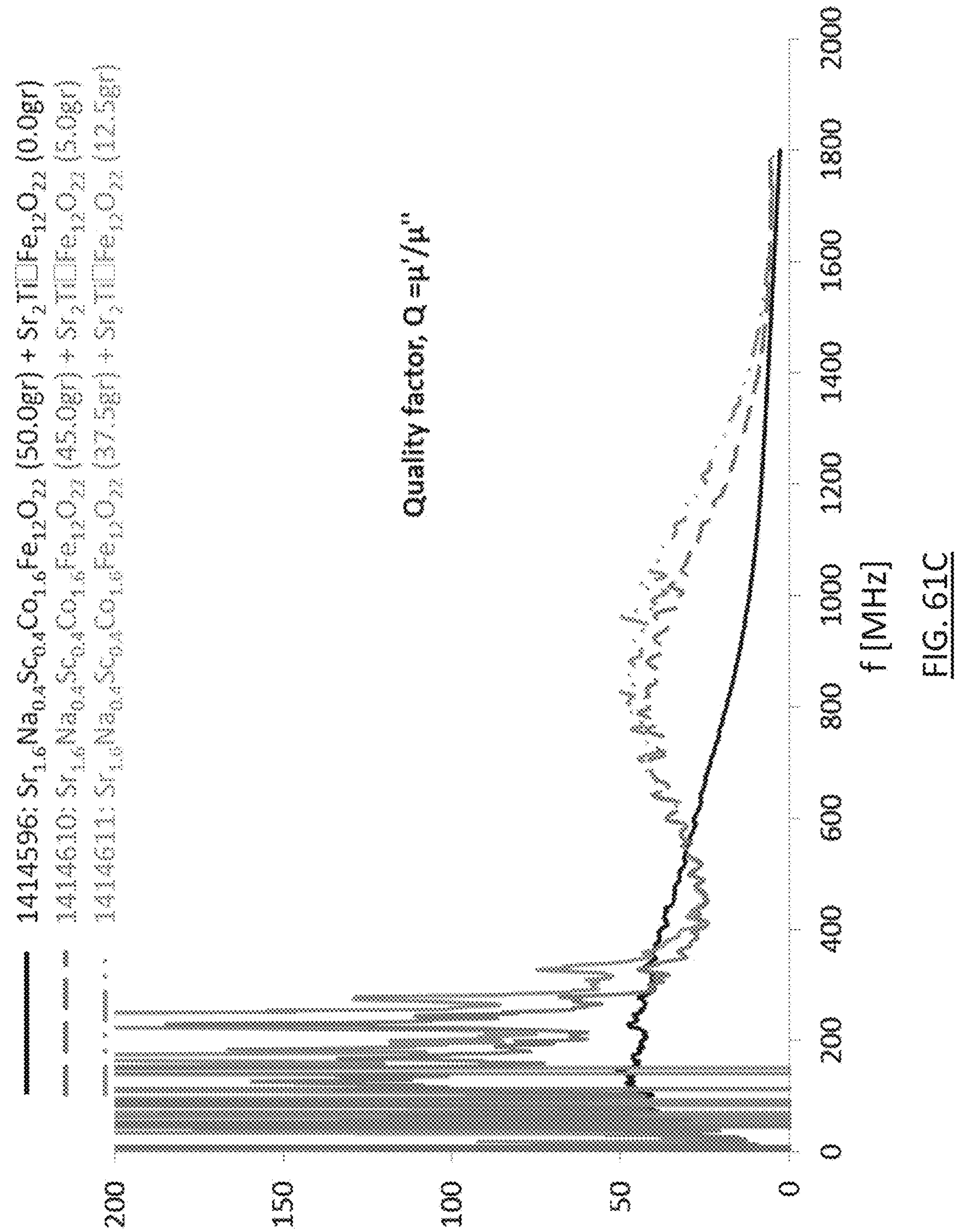
Figure 62A:
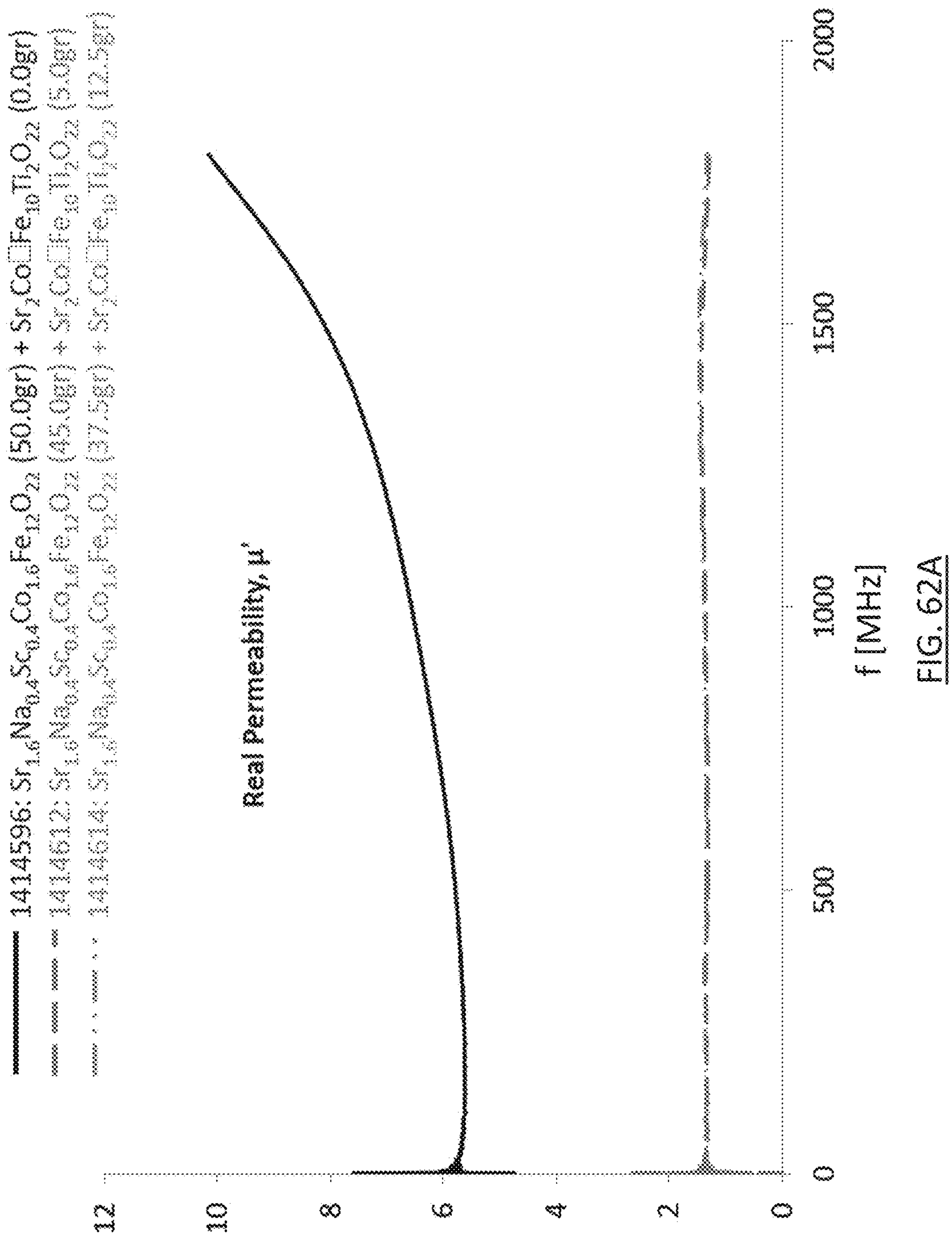
Figure 62B:
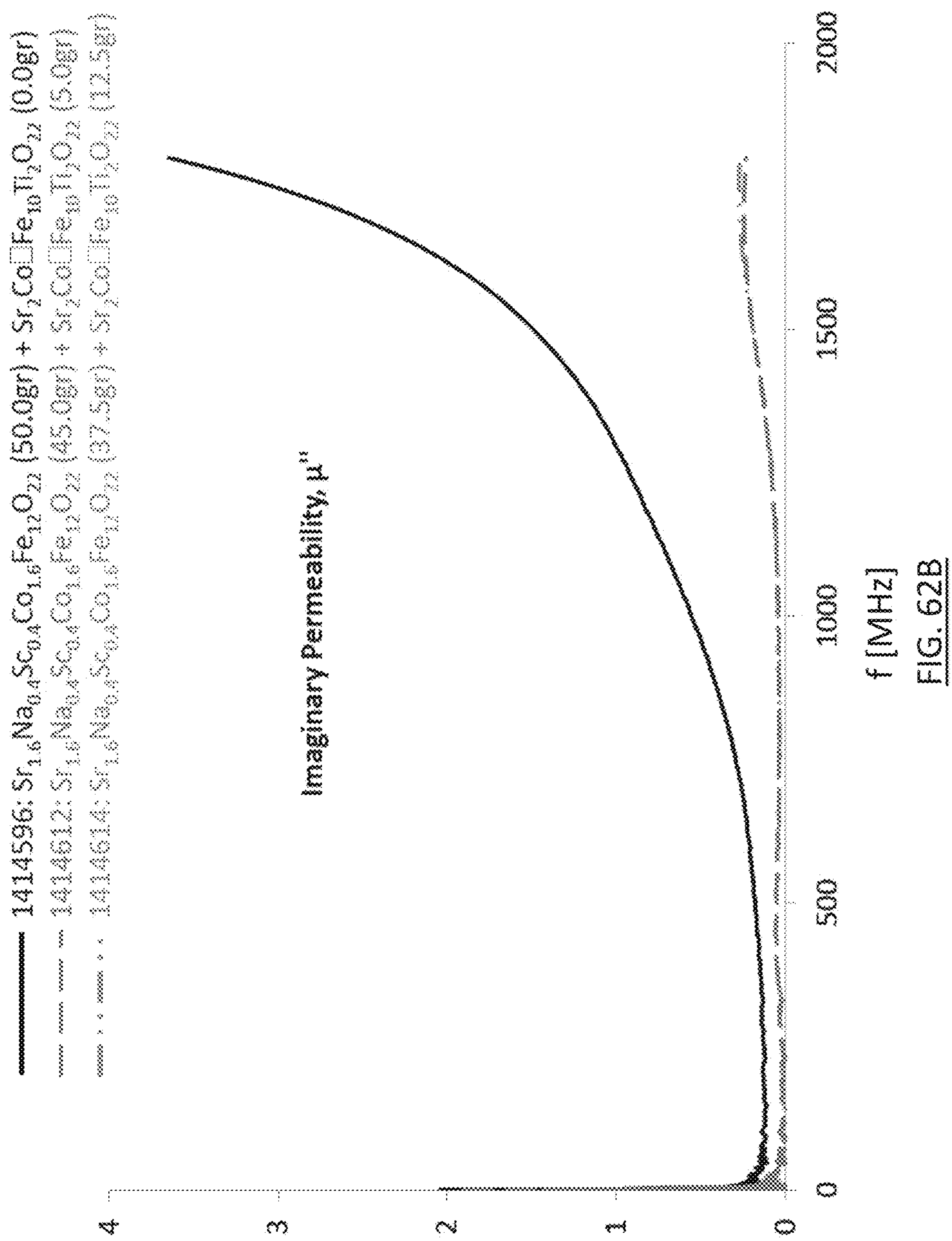
Figure 62C:
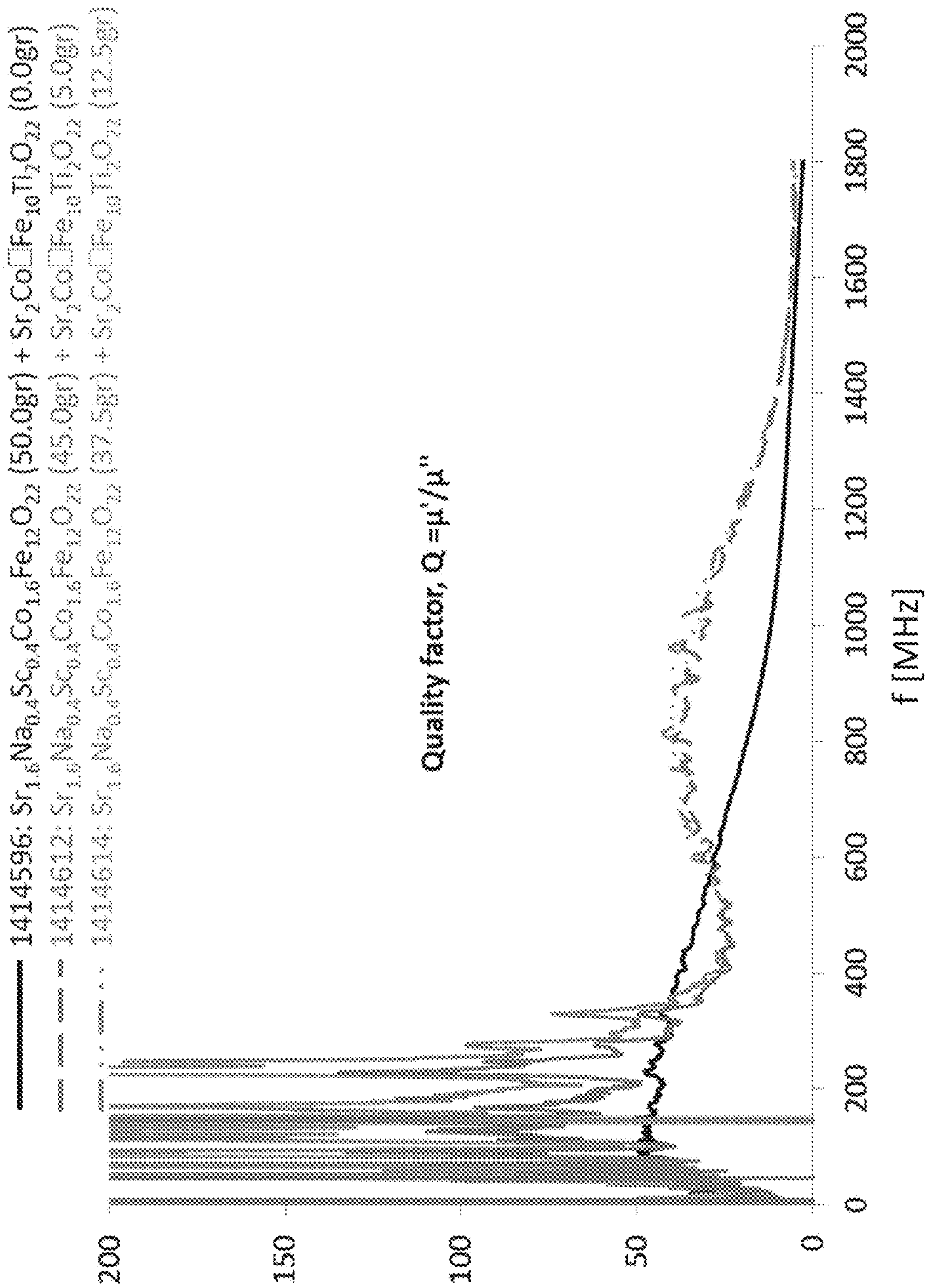
Figure 63A:
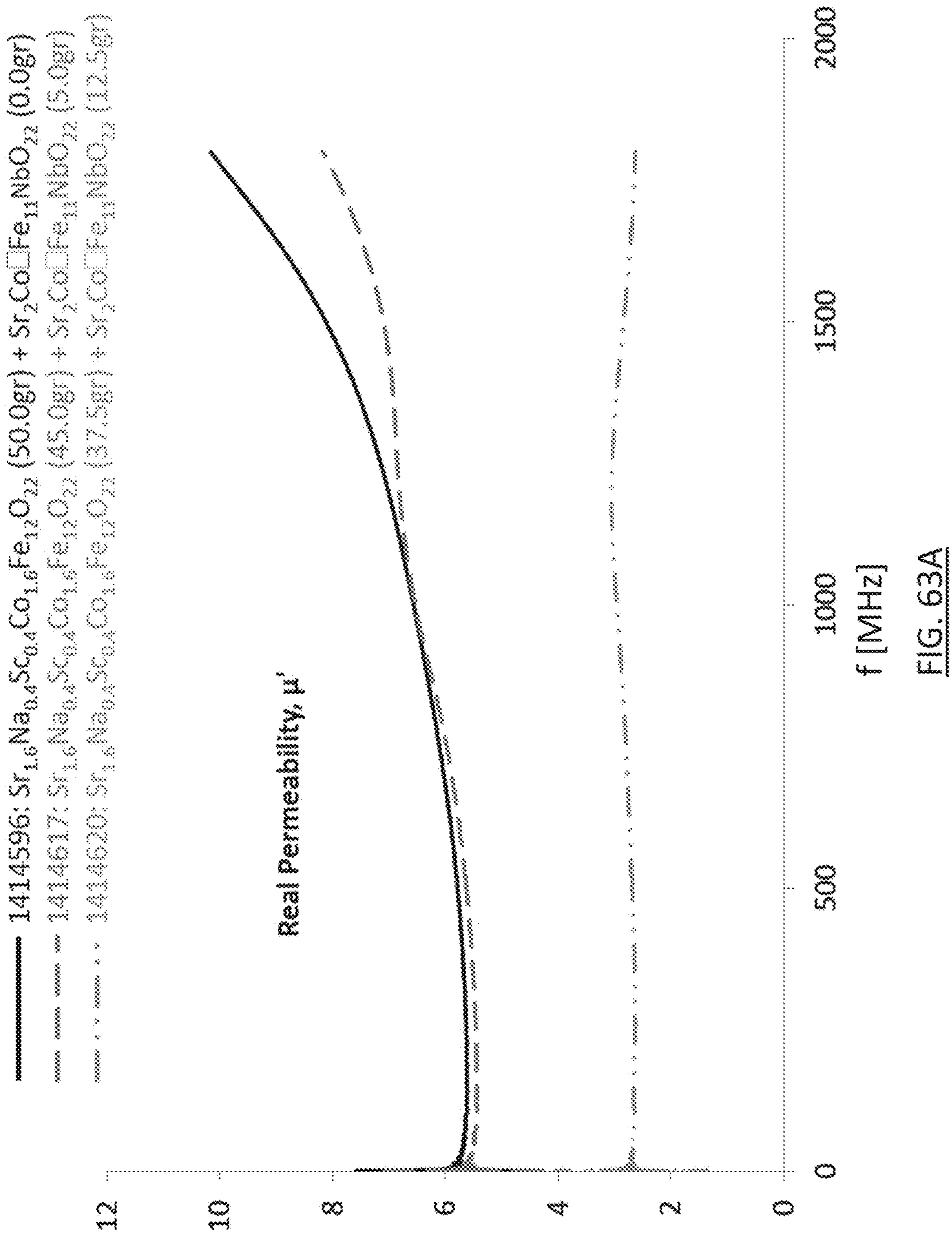
Figure 63B:
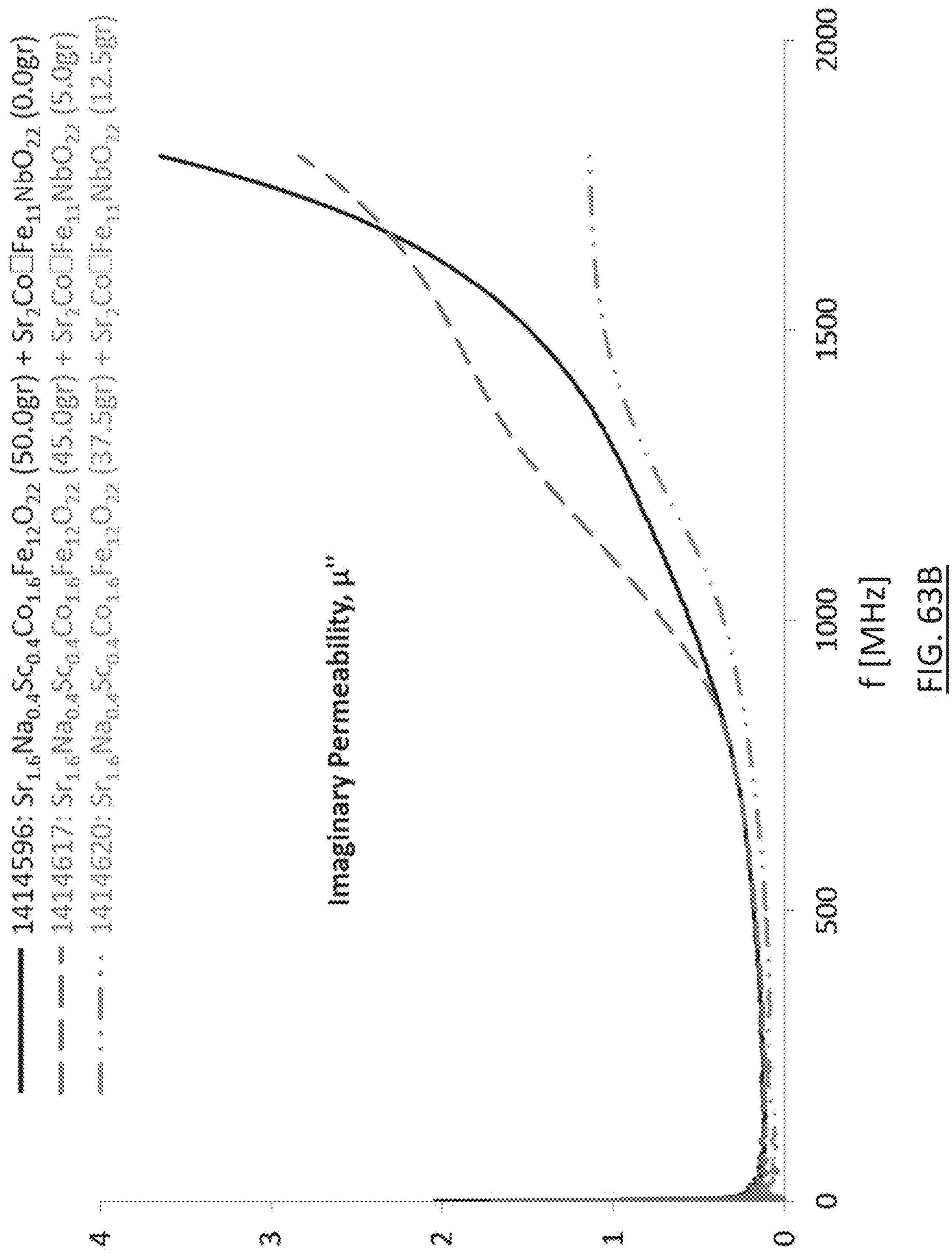
Figure 63C:
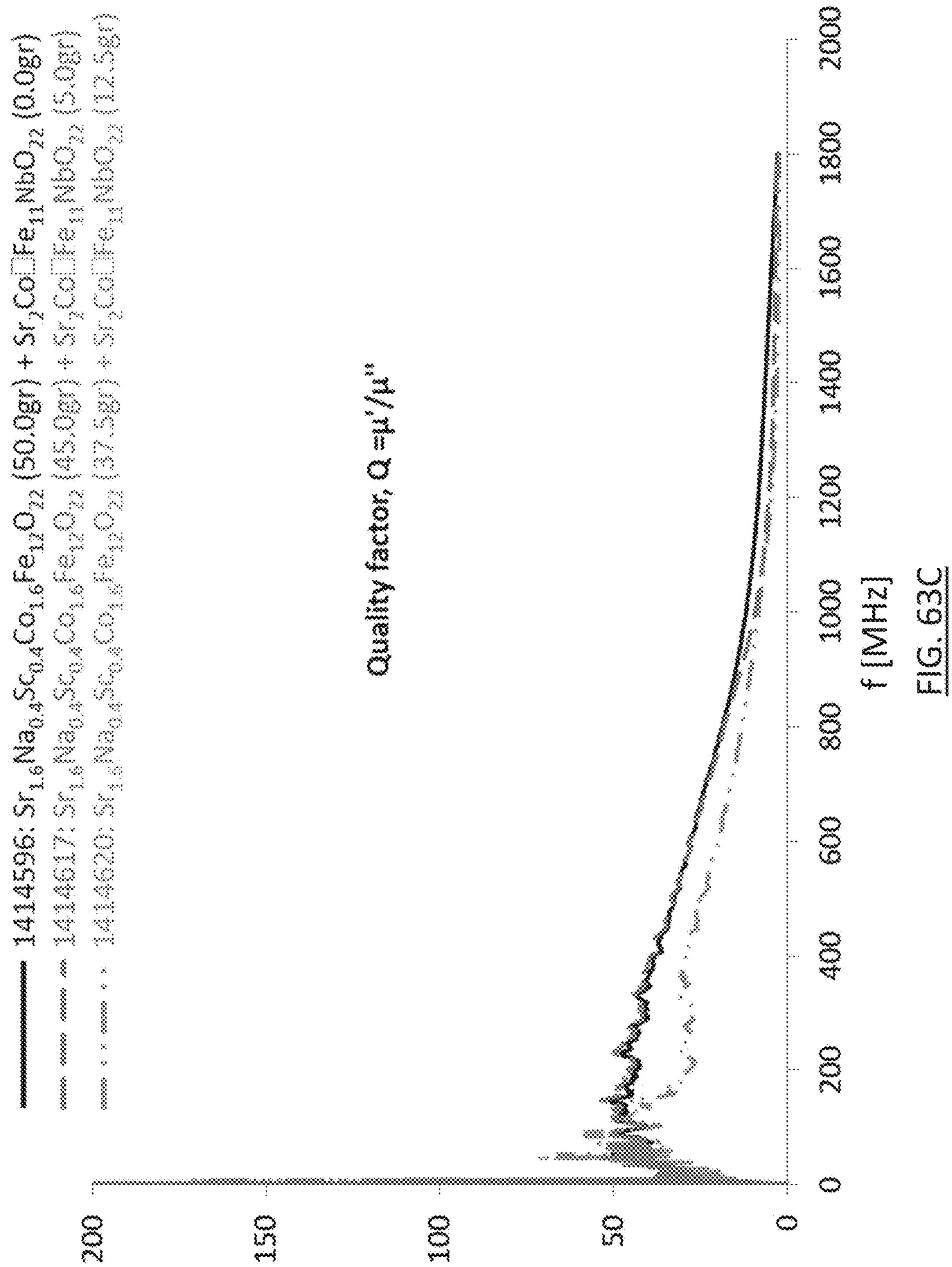
Figure 64A:
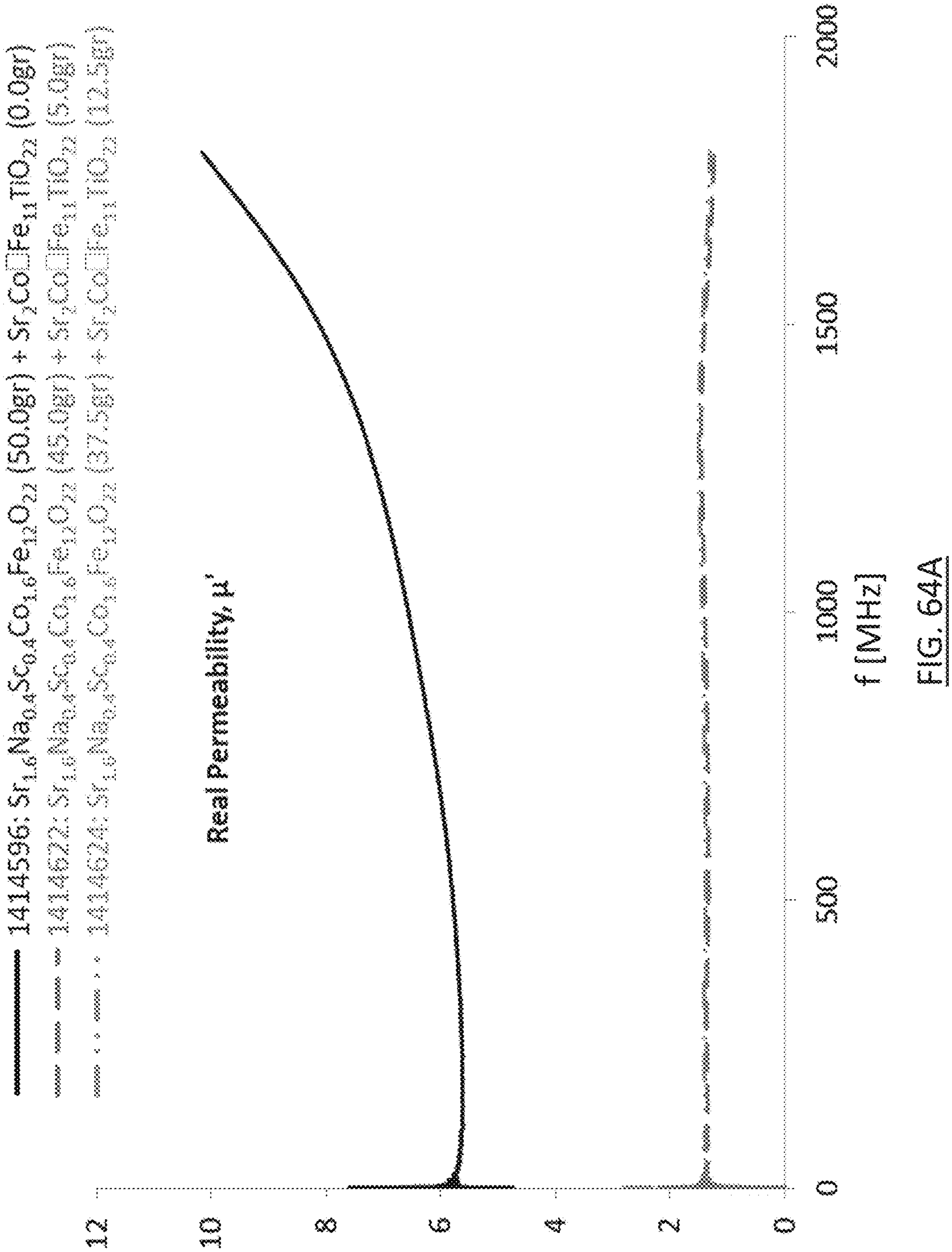
Figure 64B:
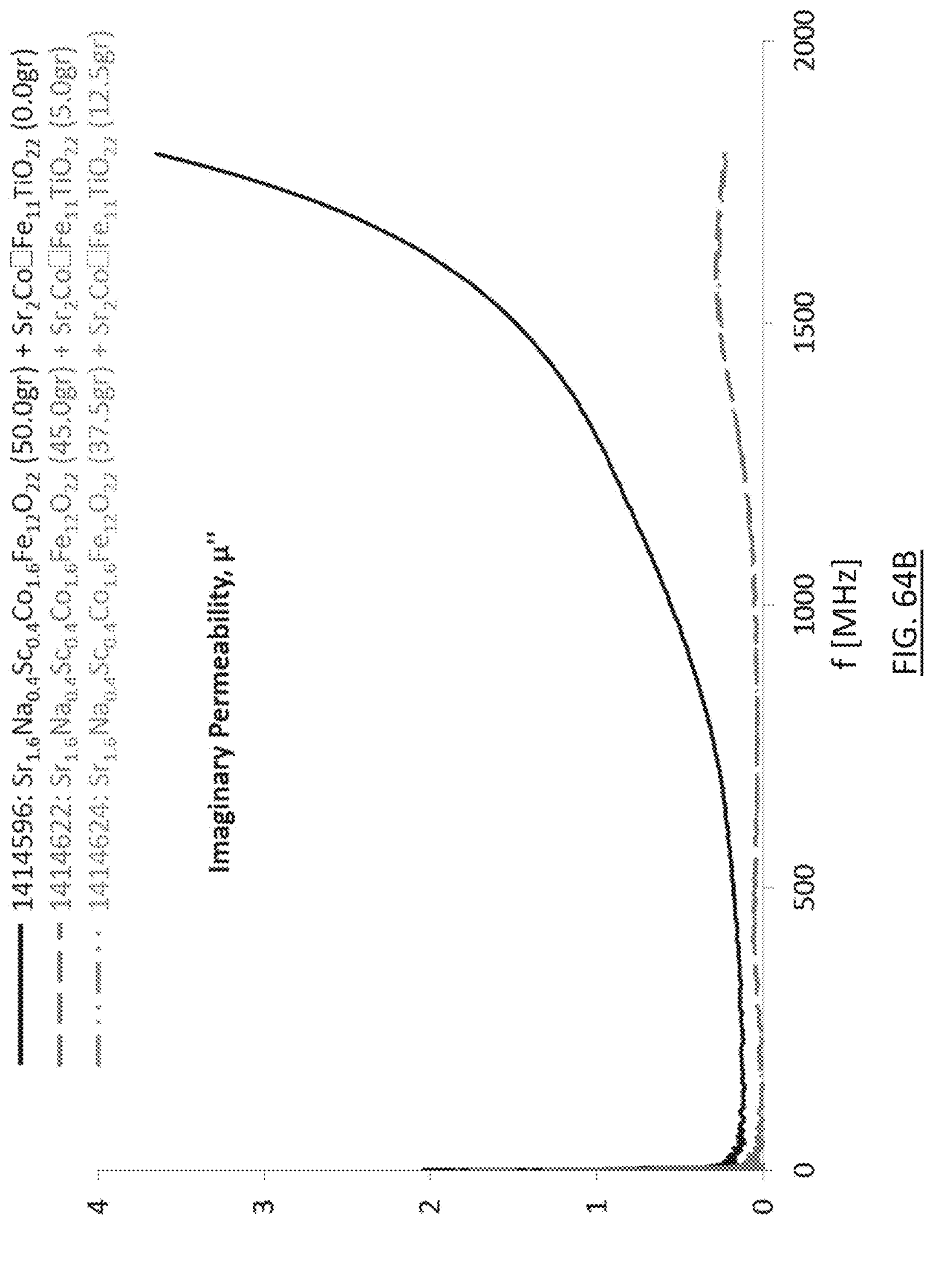
Figure 64C:
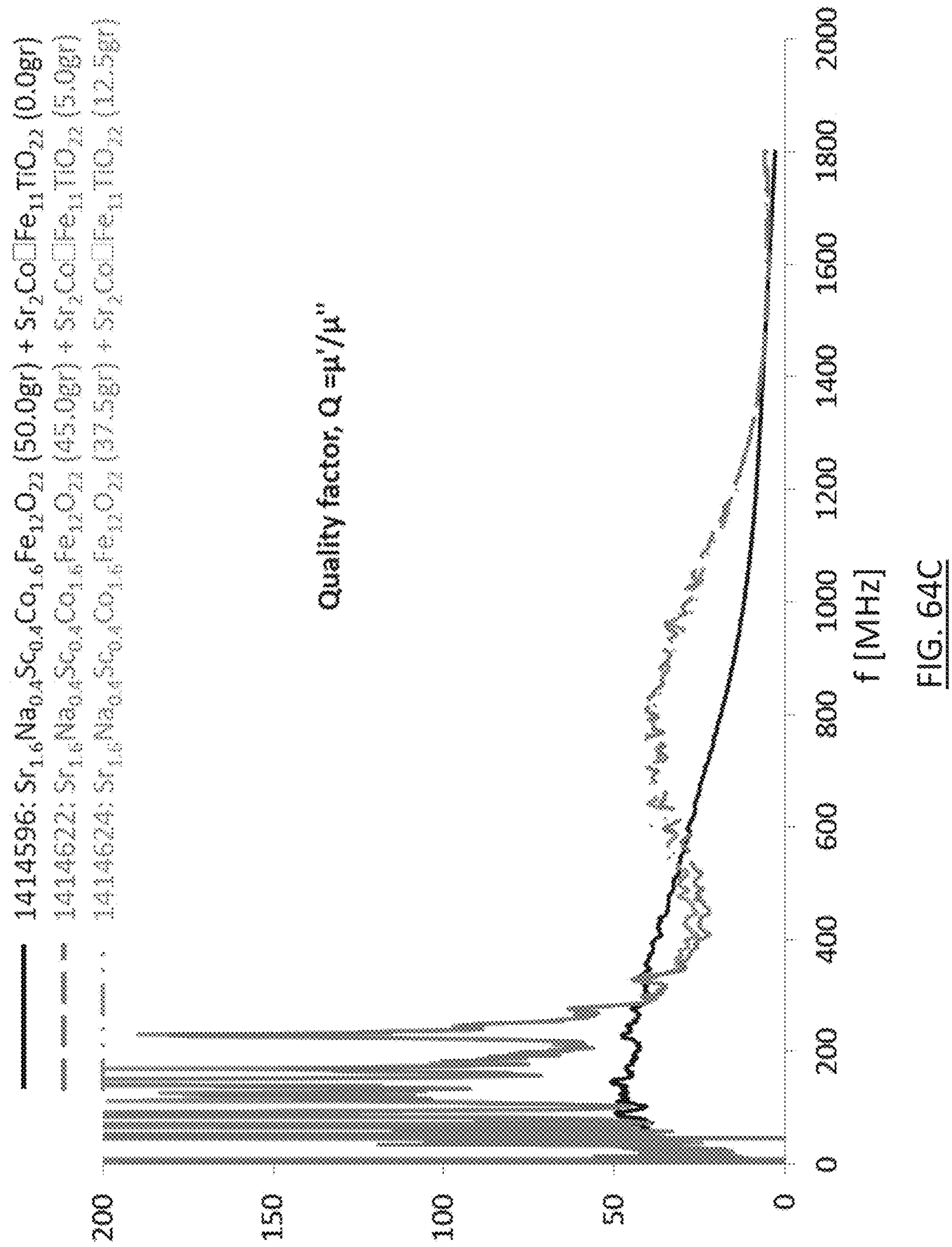
Figure 65A:
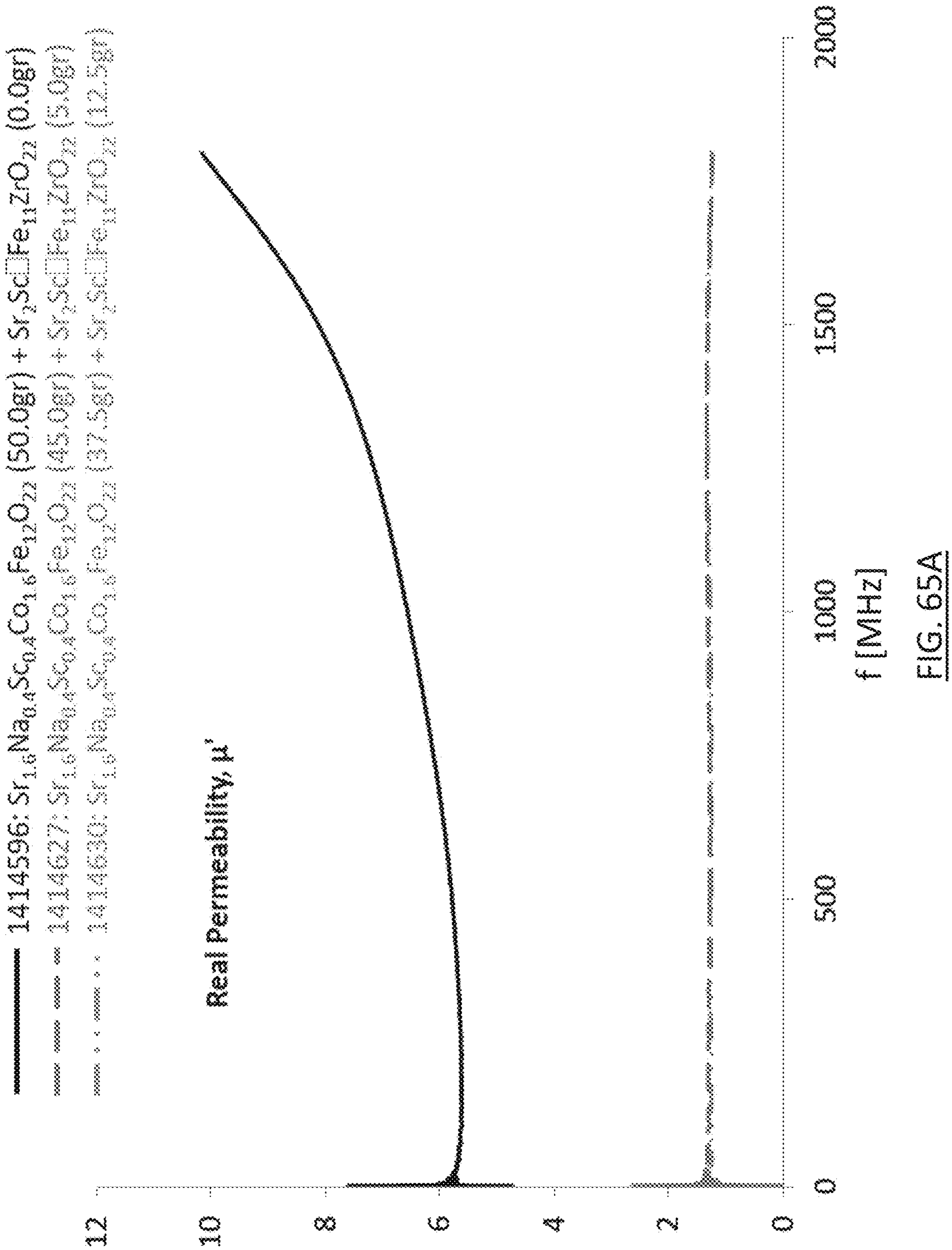
Figure 65B:
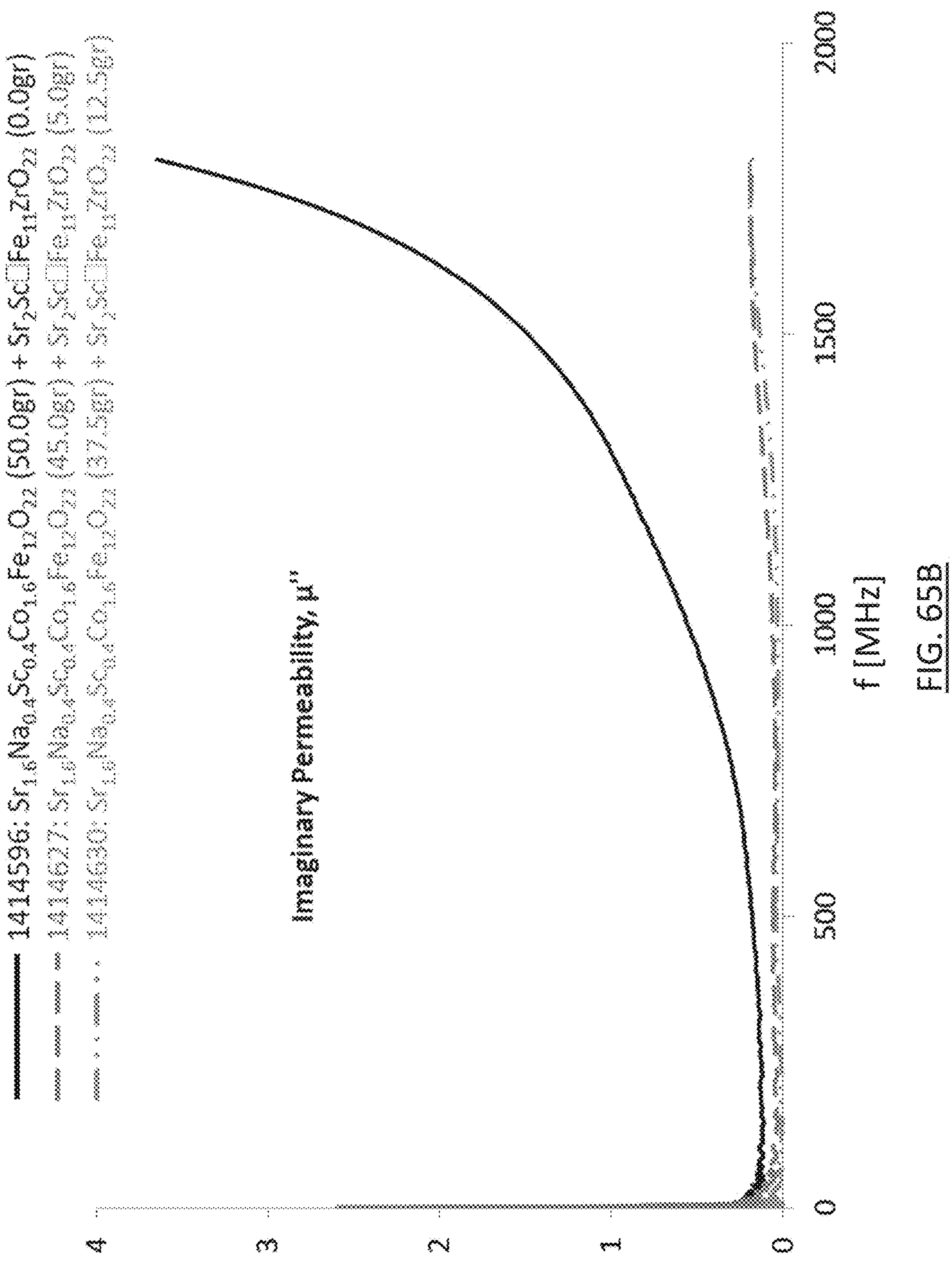
Figure 65C:
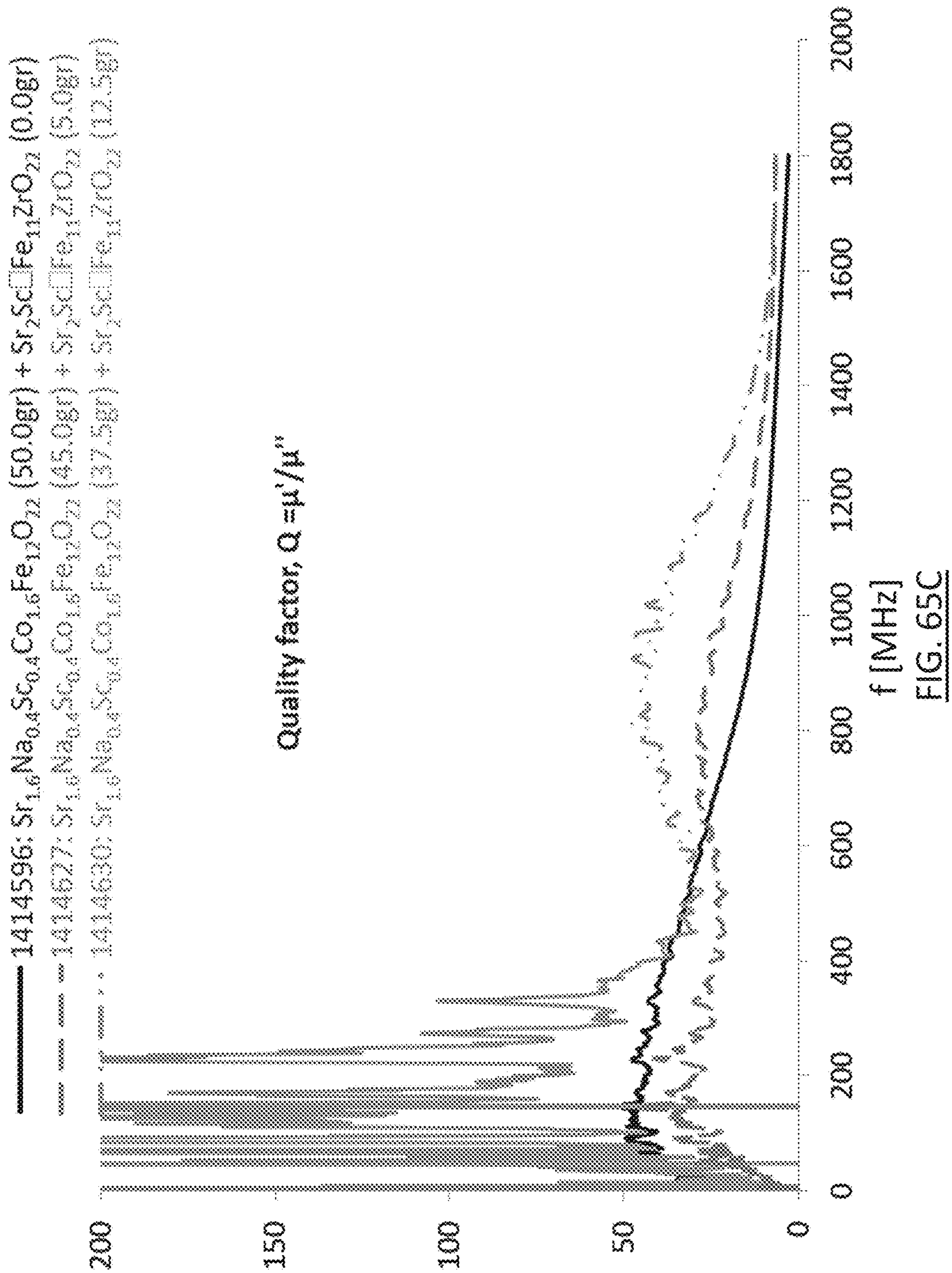
Figure 66A:
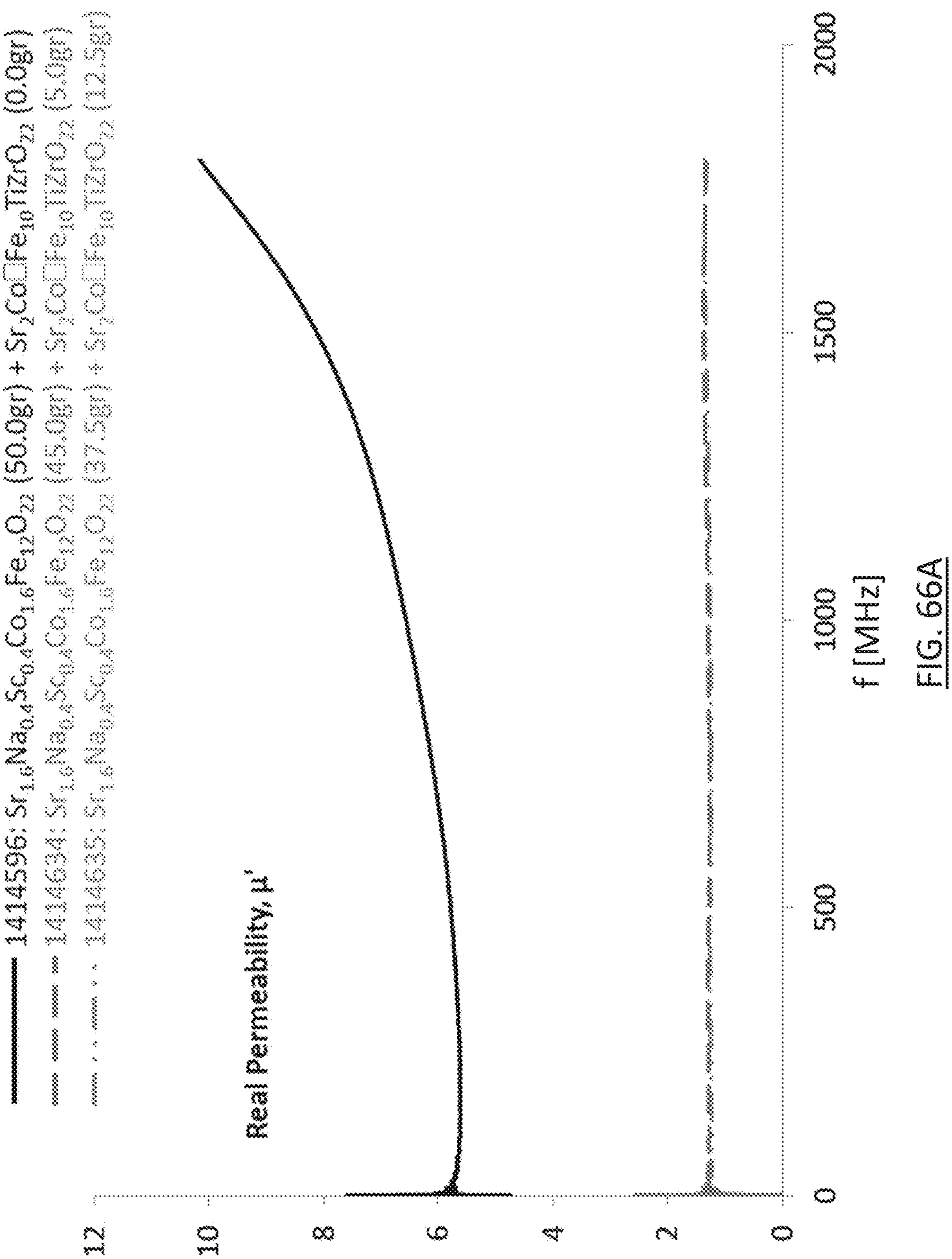
Figure 66B:
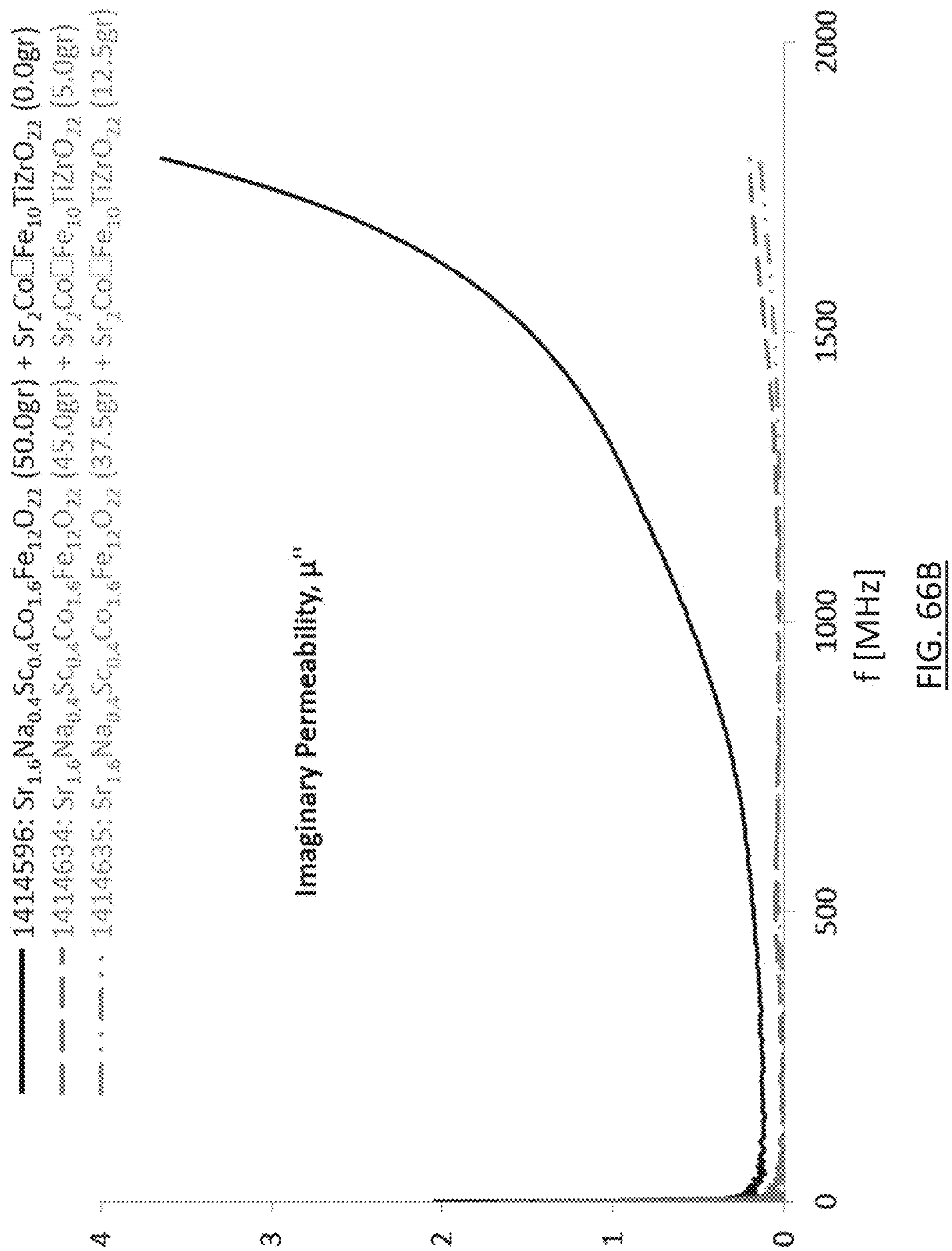
Figure 66C:
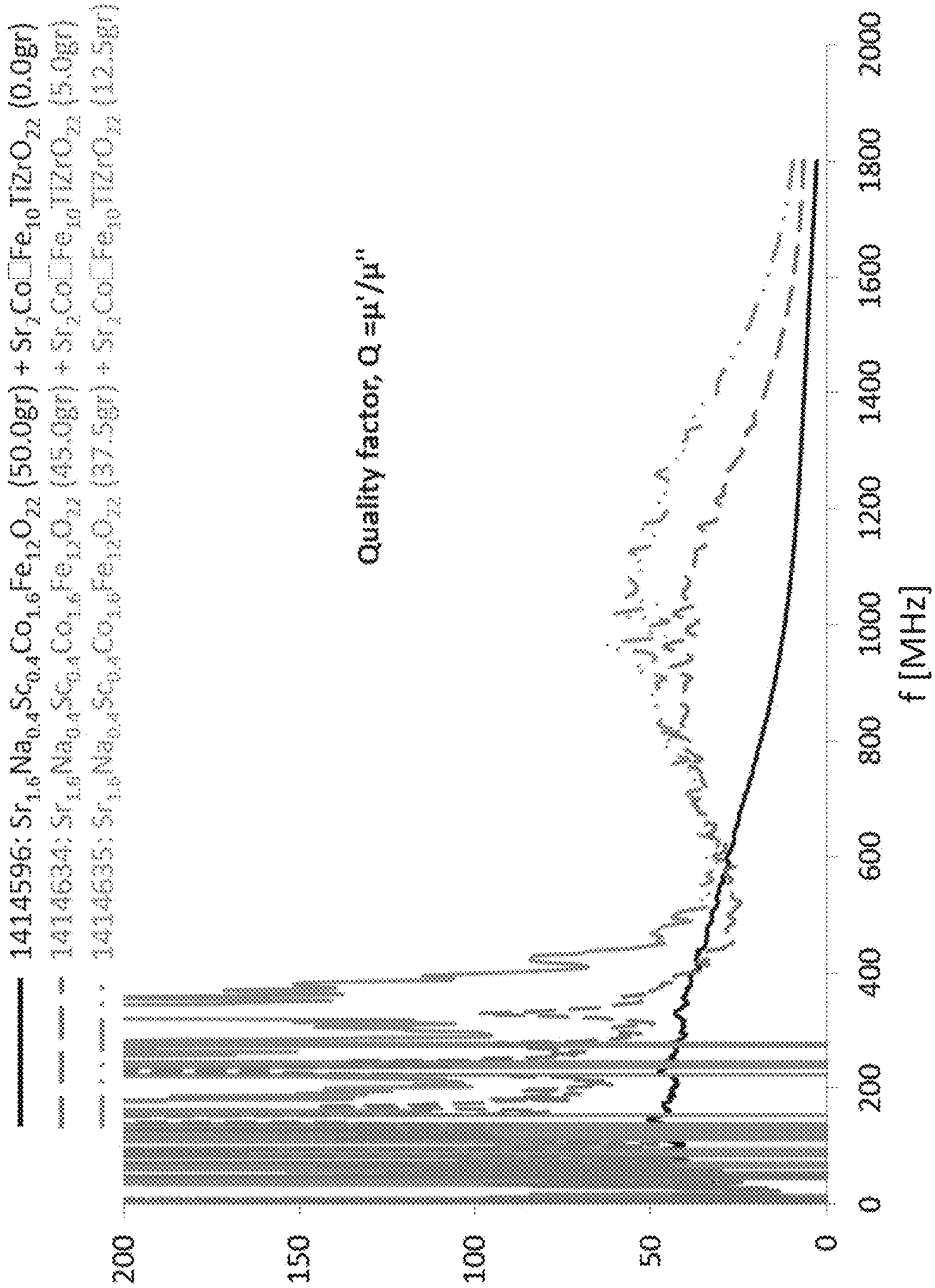
Figure 67A:
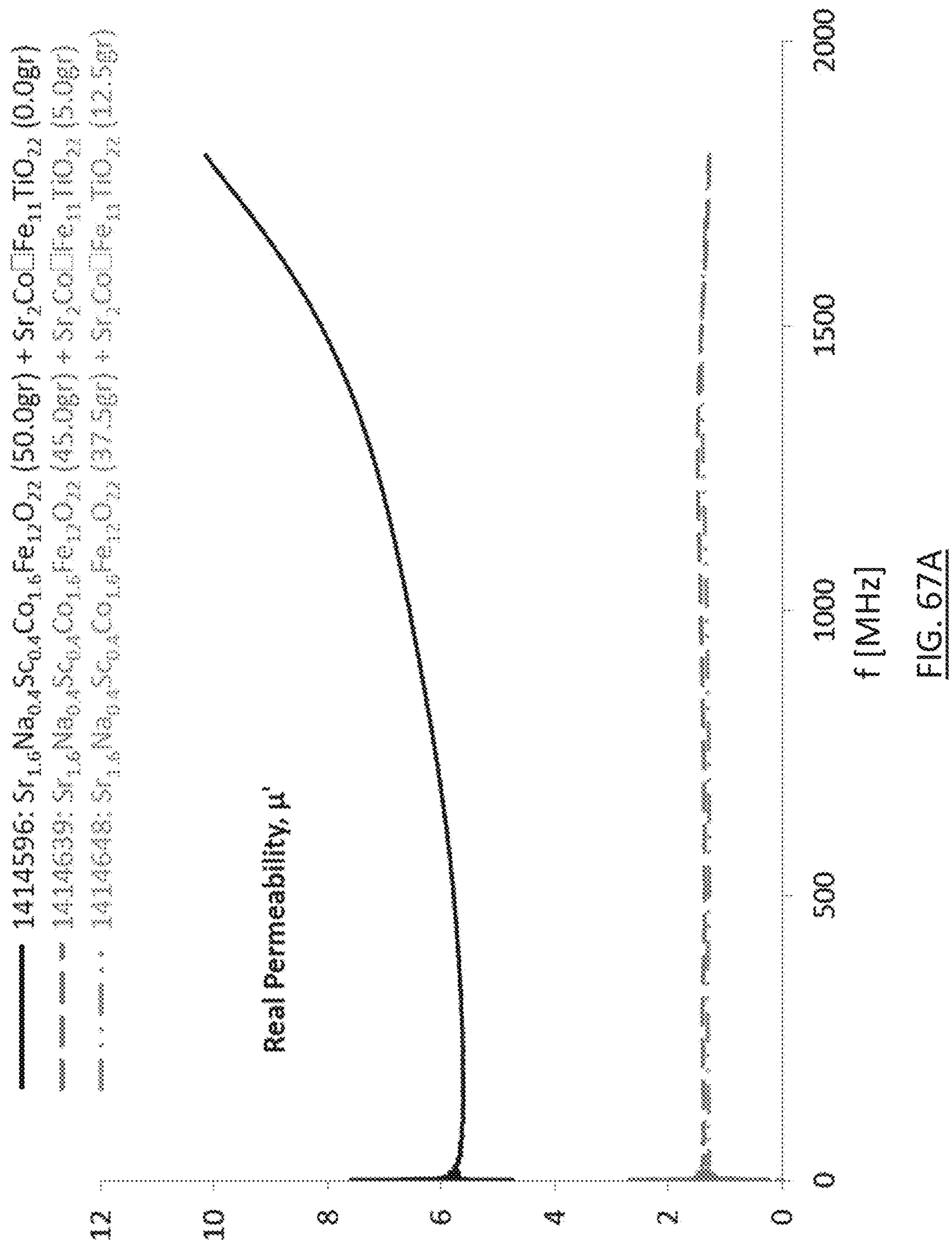
Figure 67B:
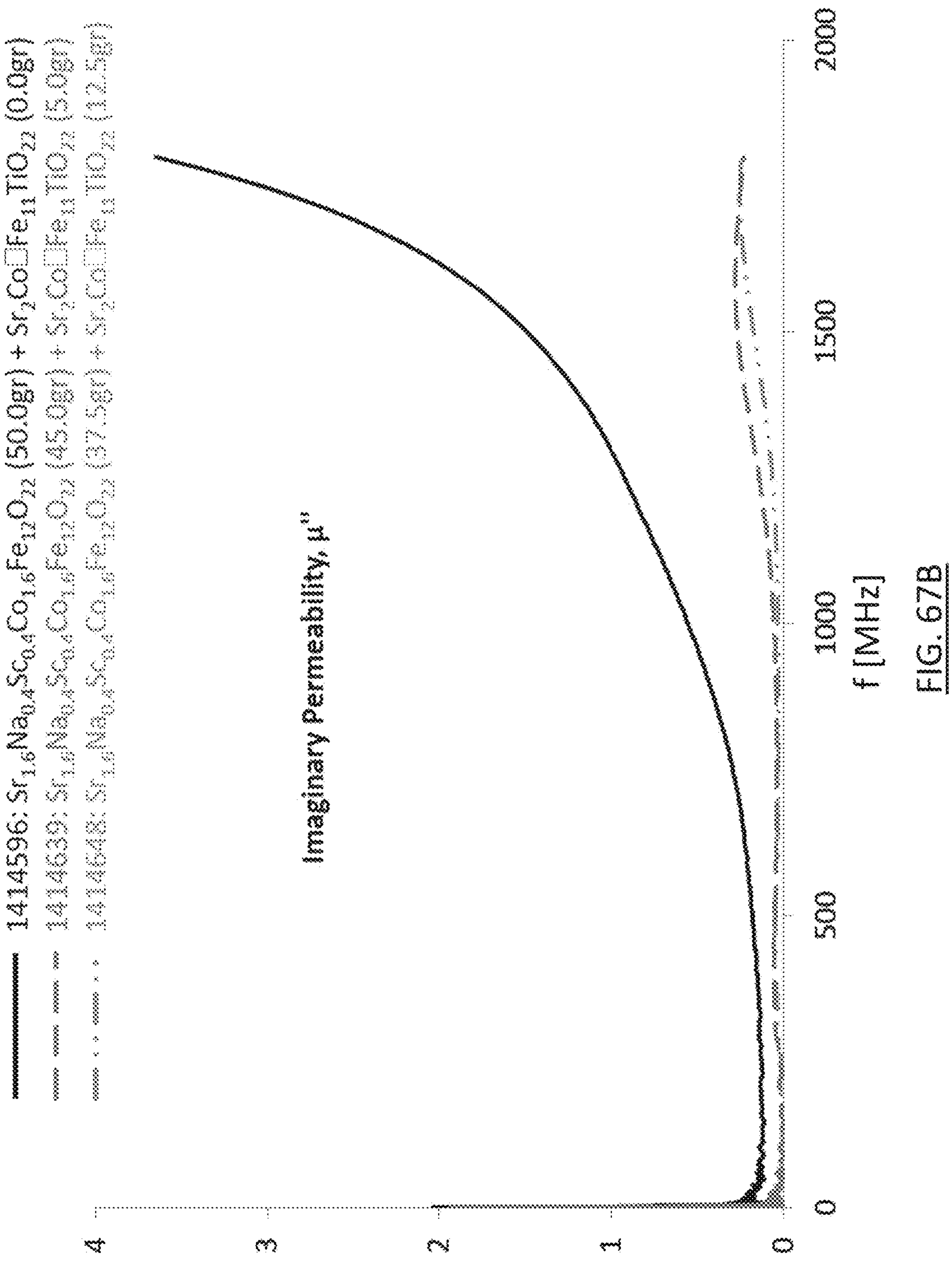
Figure 67C:
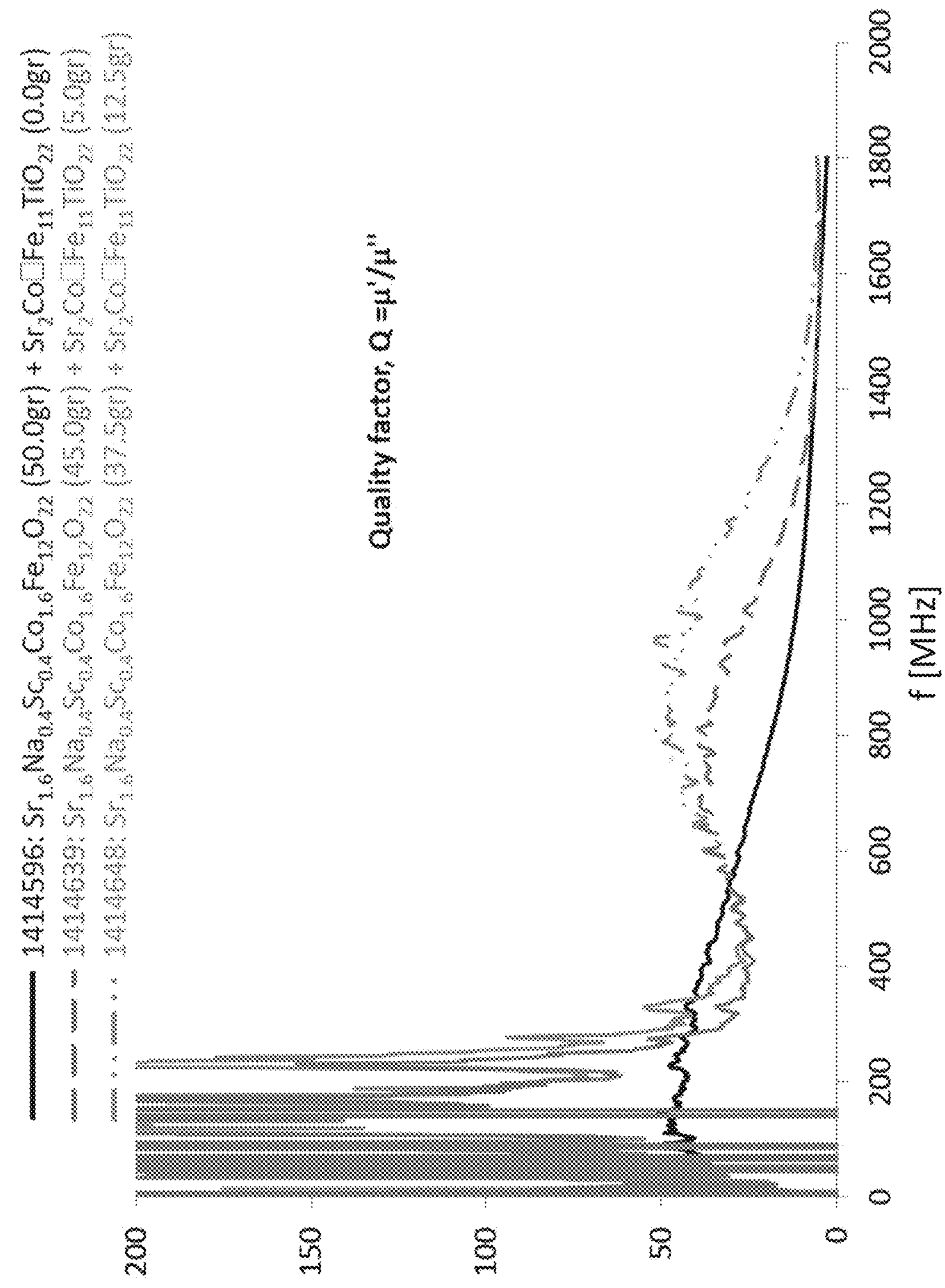
Figure 68A:
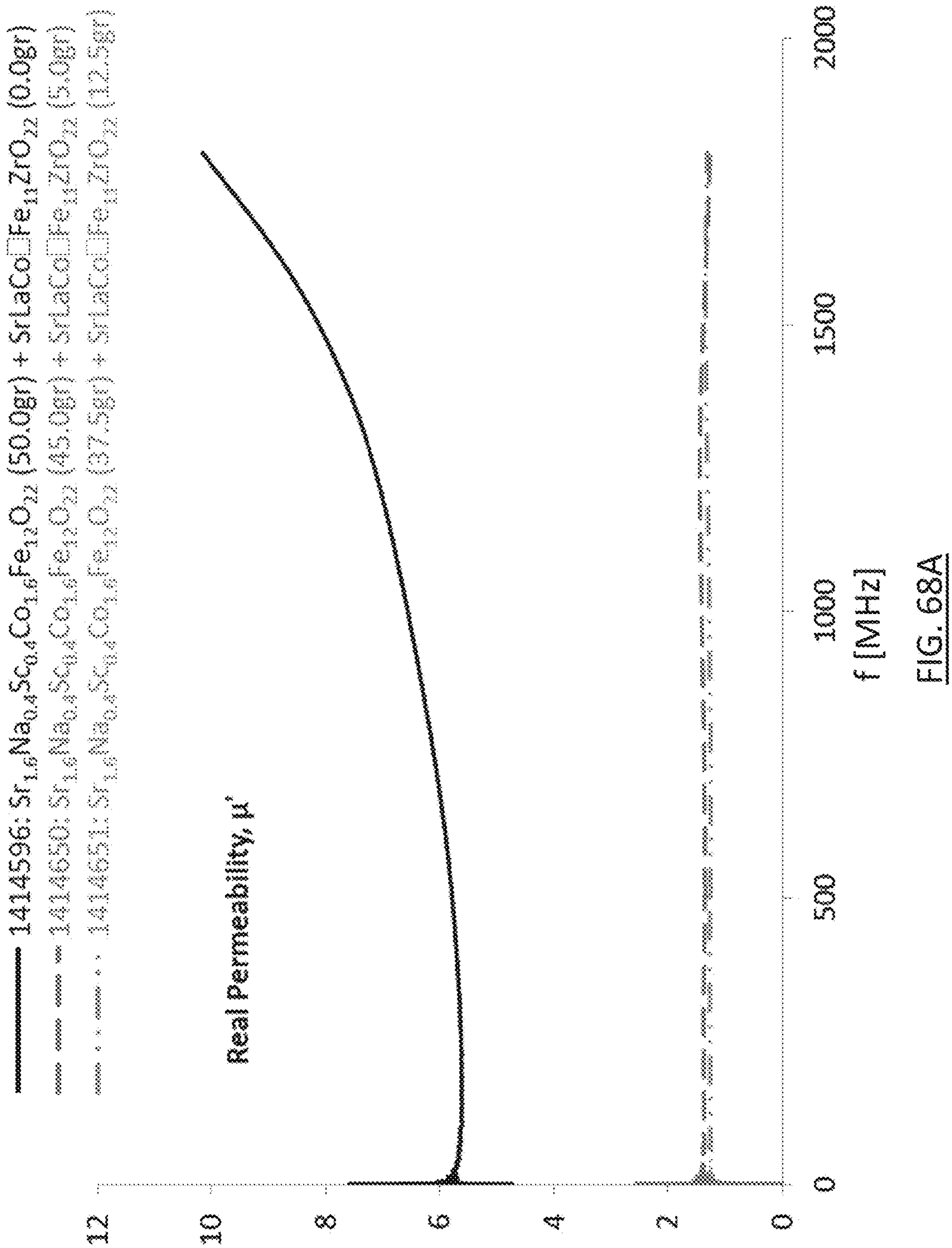
Figure 68B:
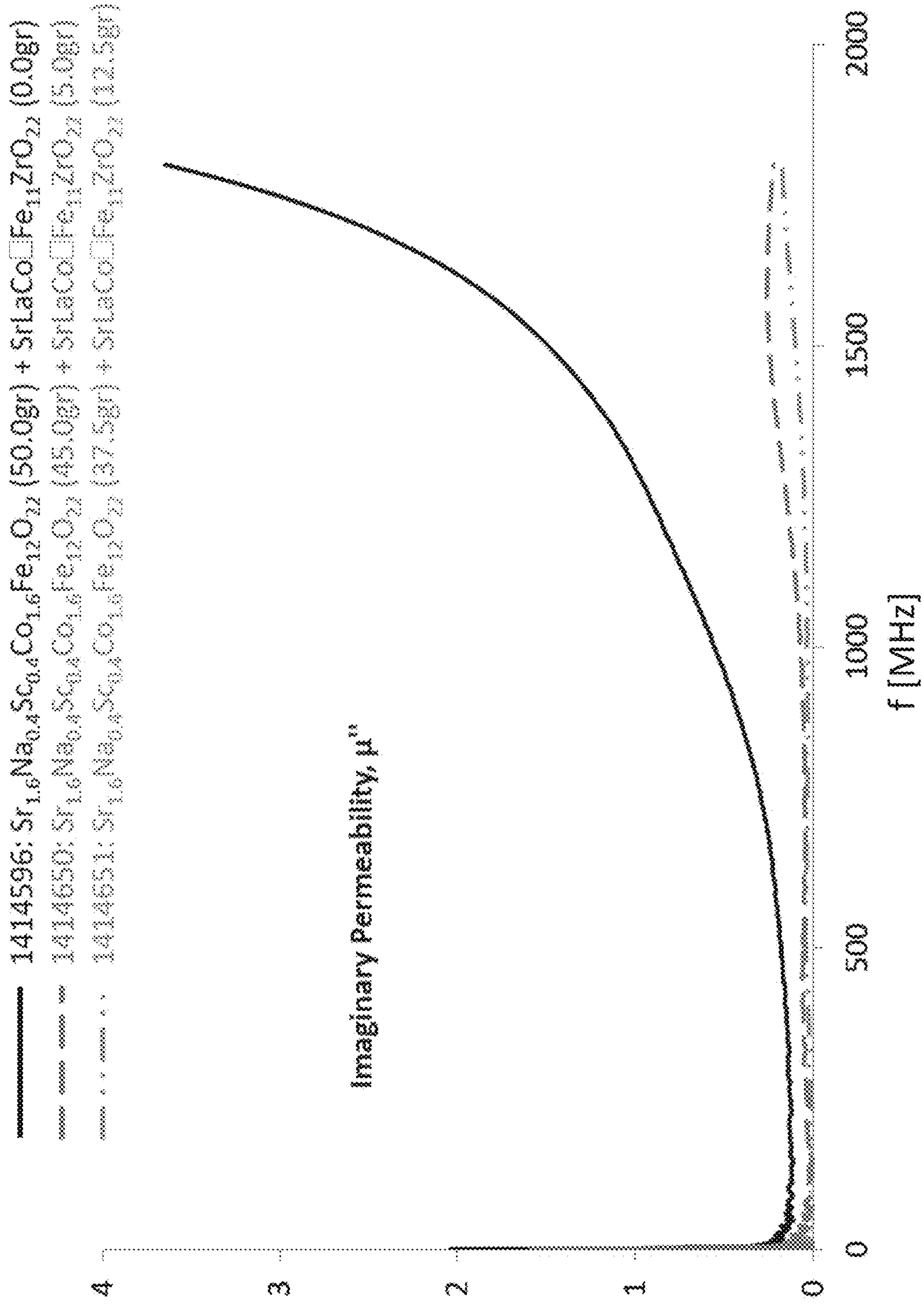
Figure 68C:
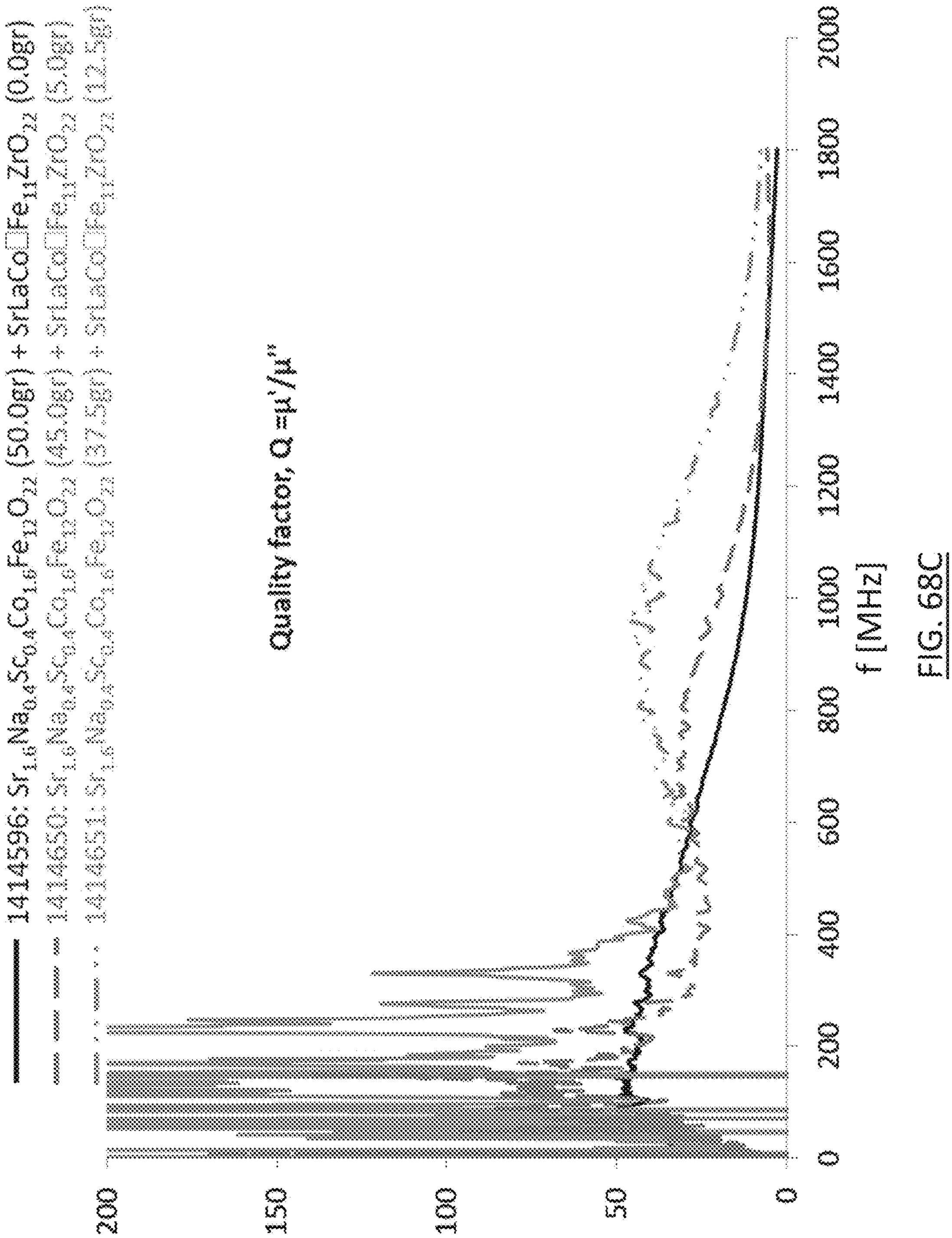
Figure 69A:
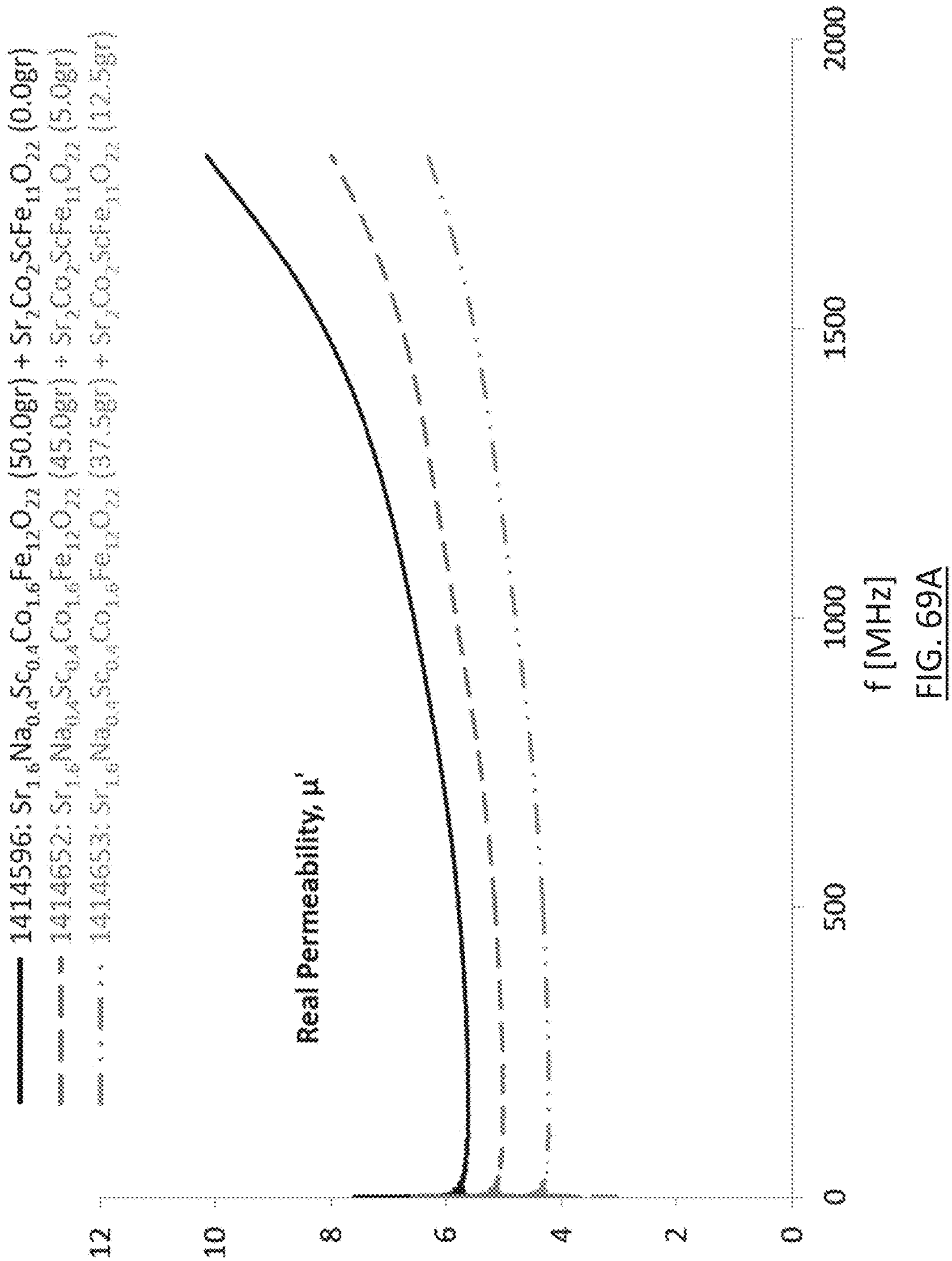
Figure 69B:
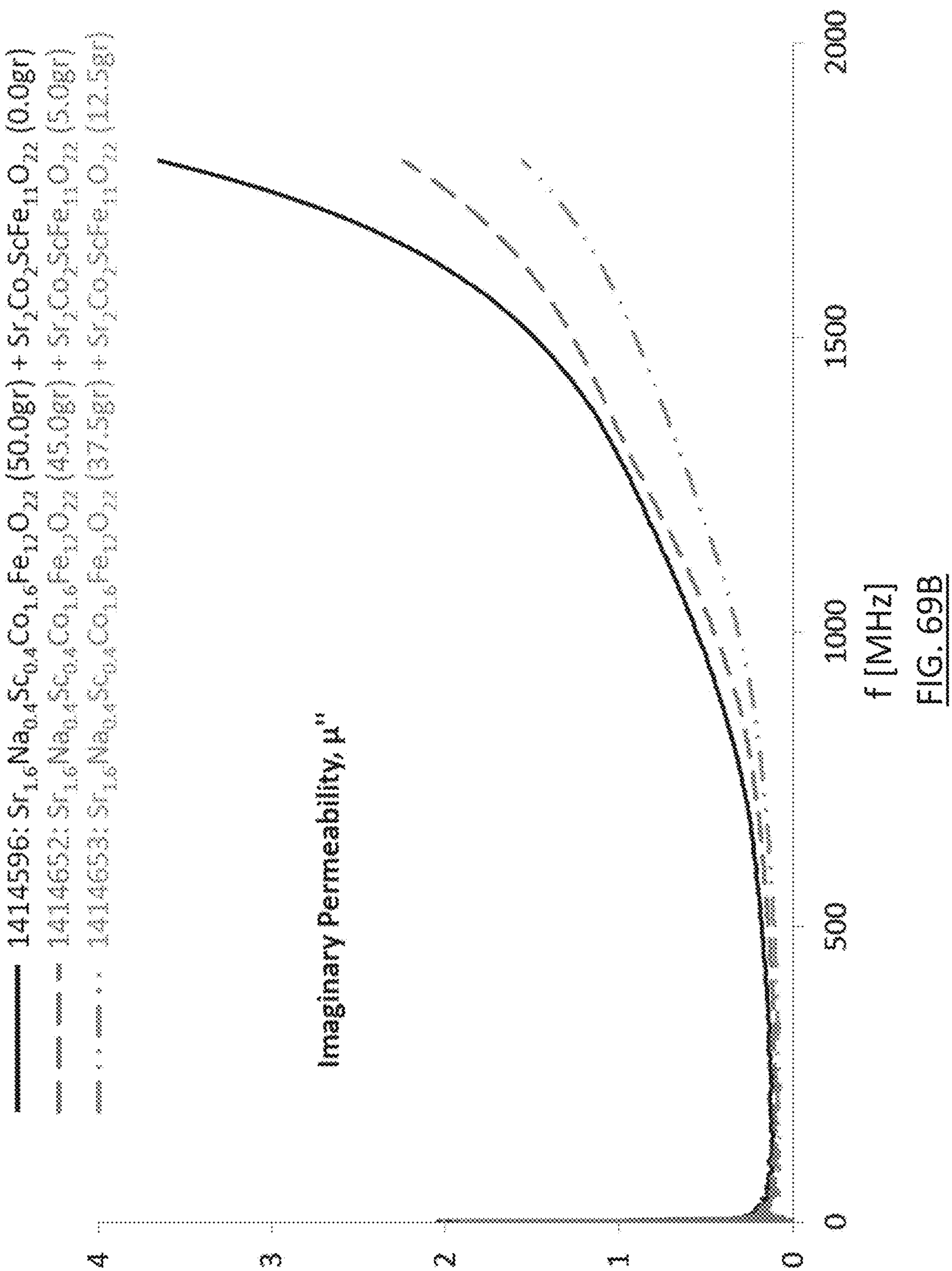
Figure 69C:
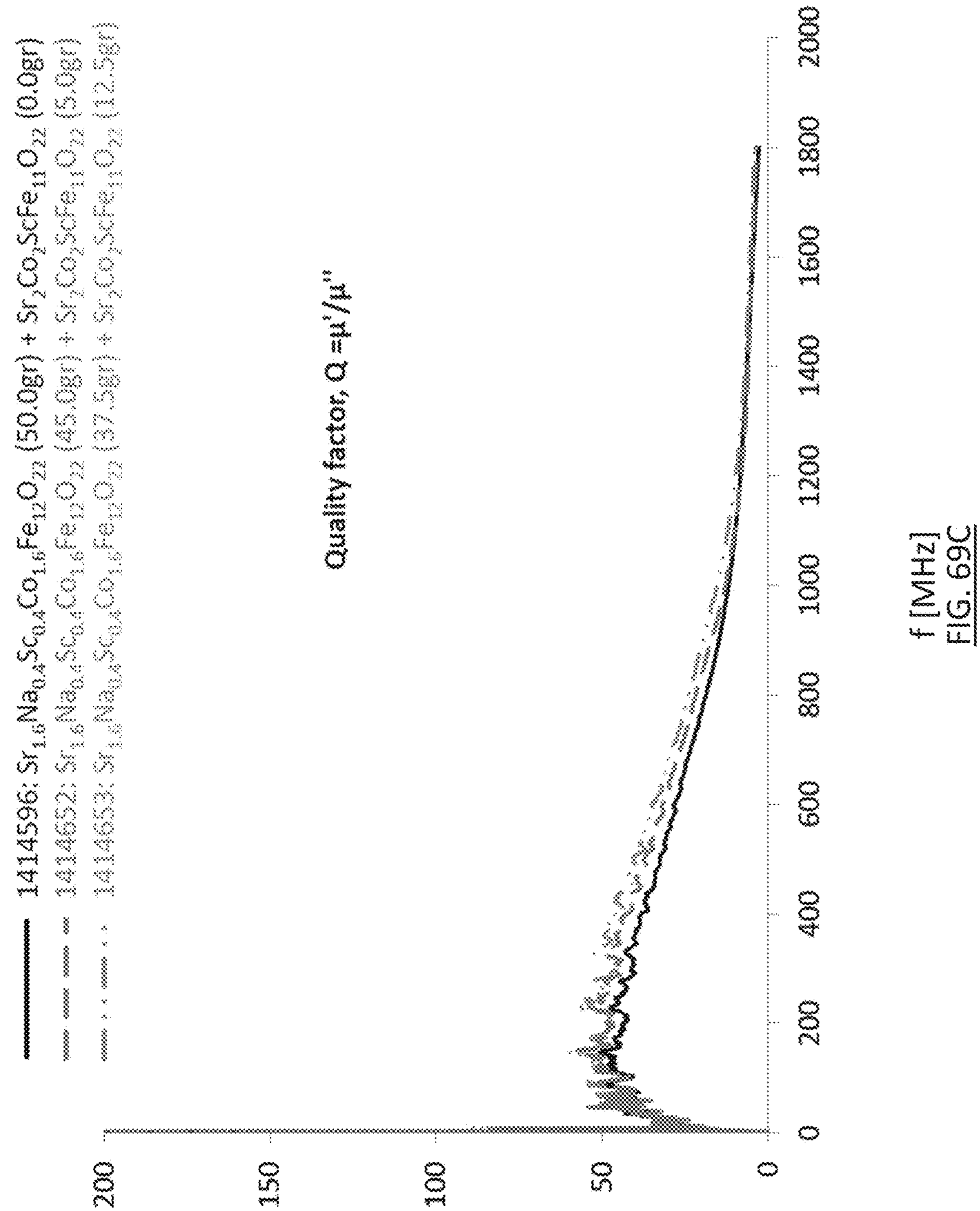
Figure 70A:
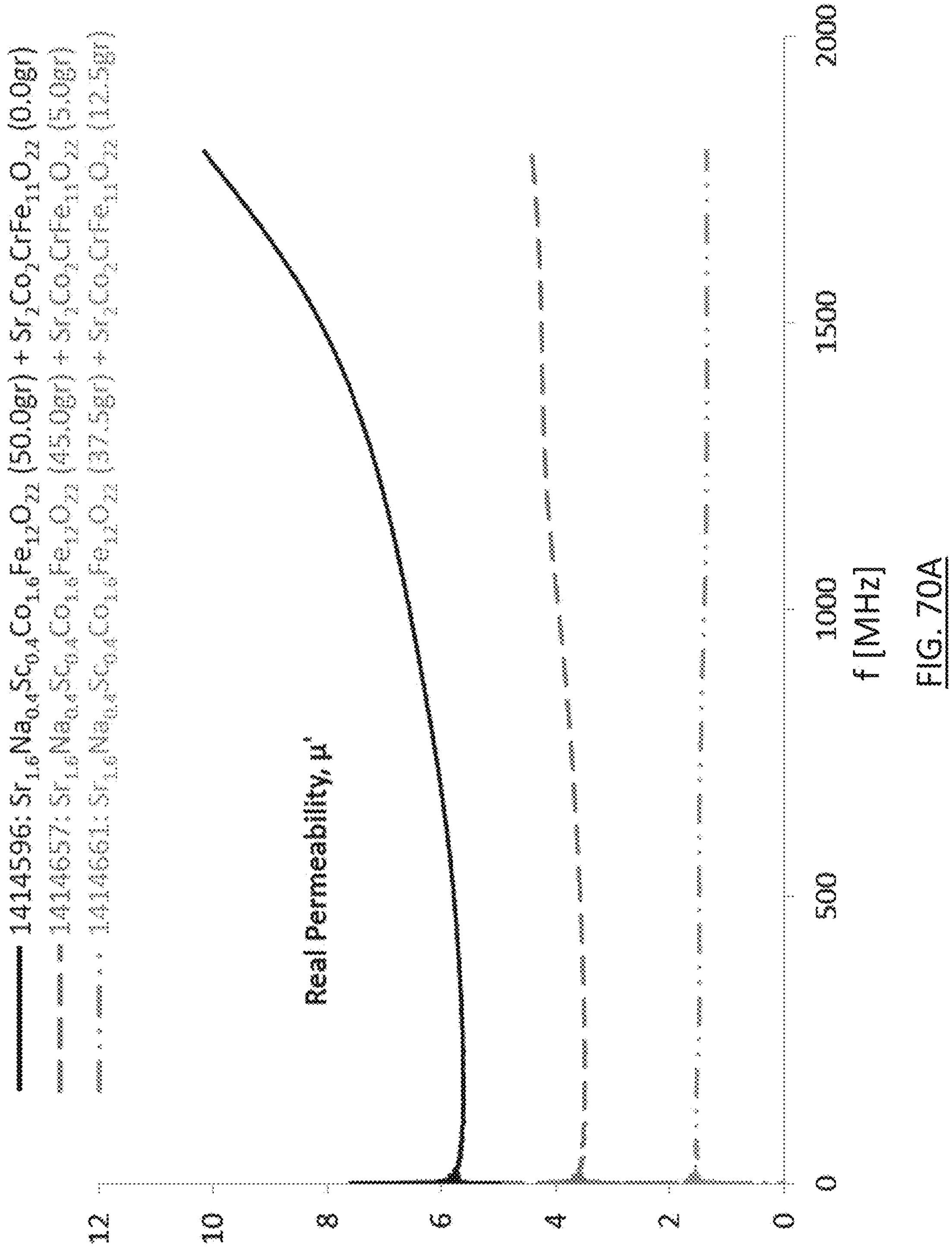
Figure 70B:
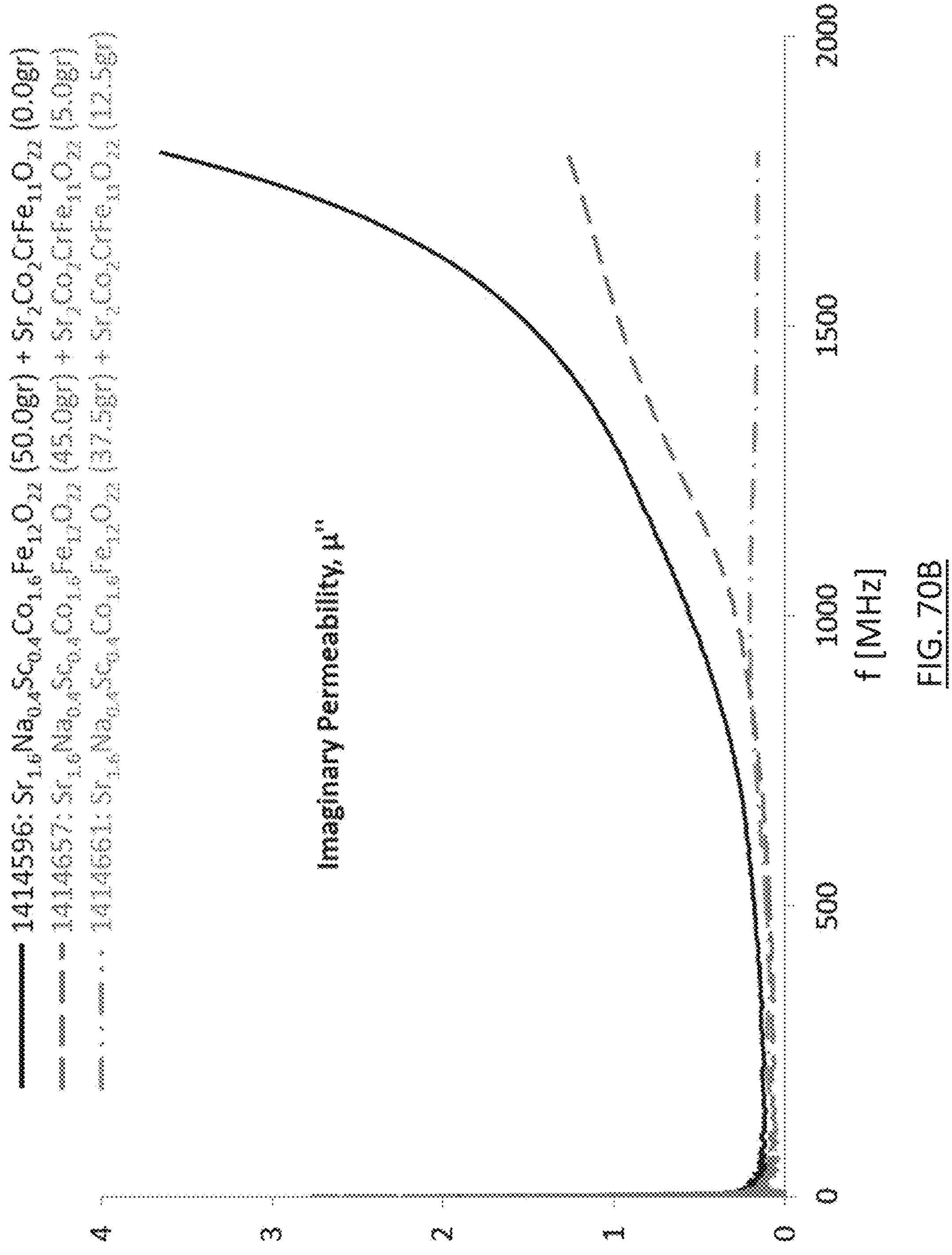
Figure 70C:
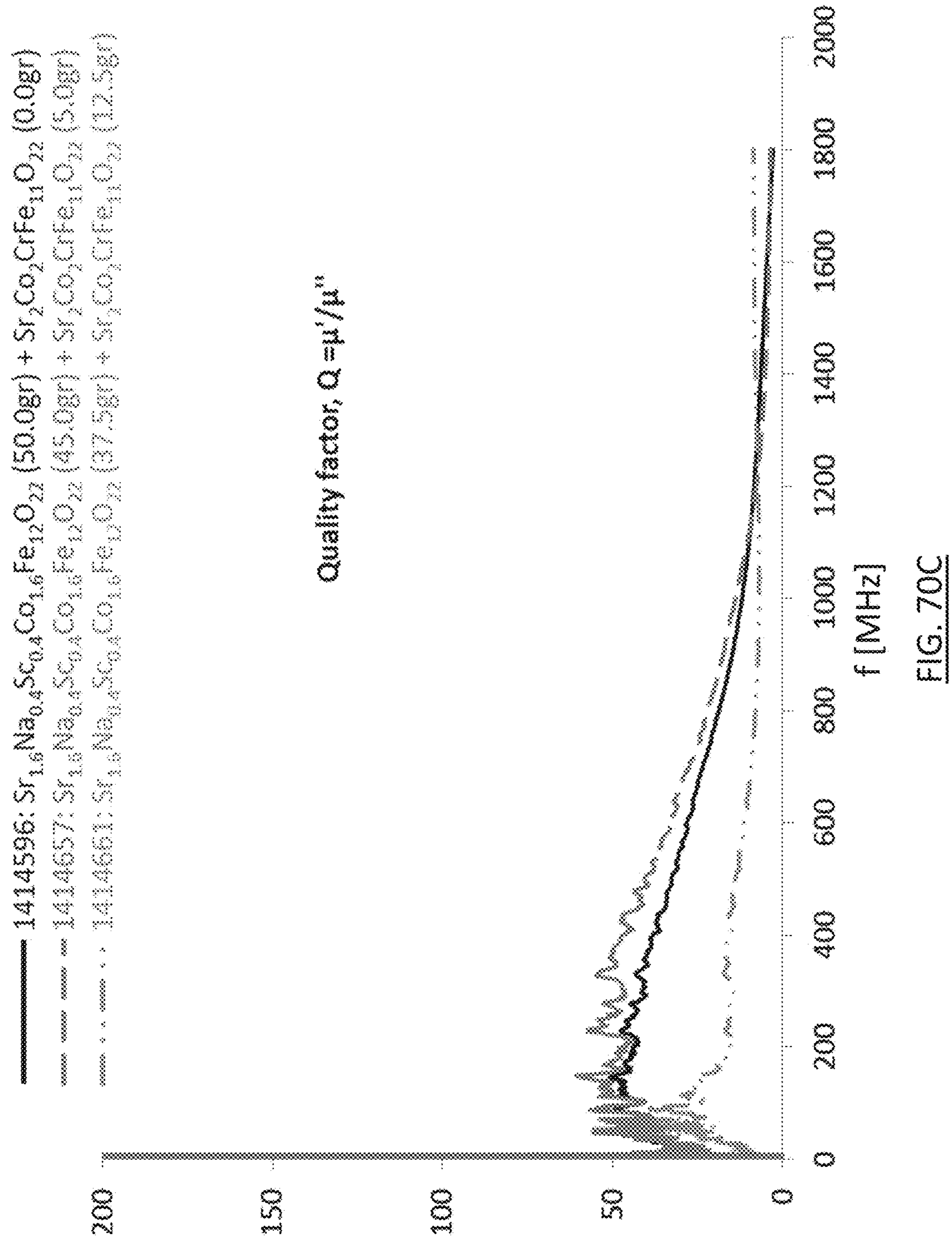
Figure 71A:
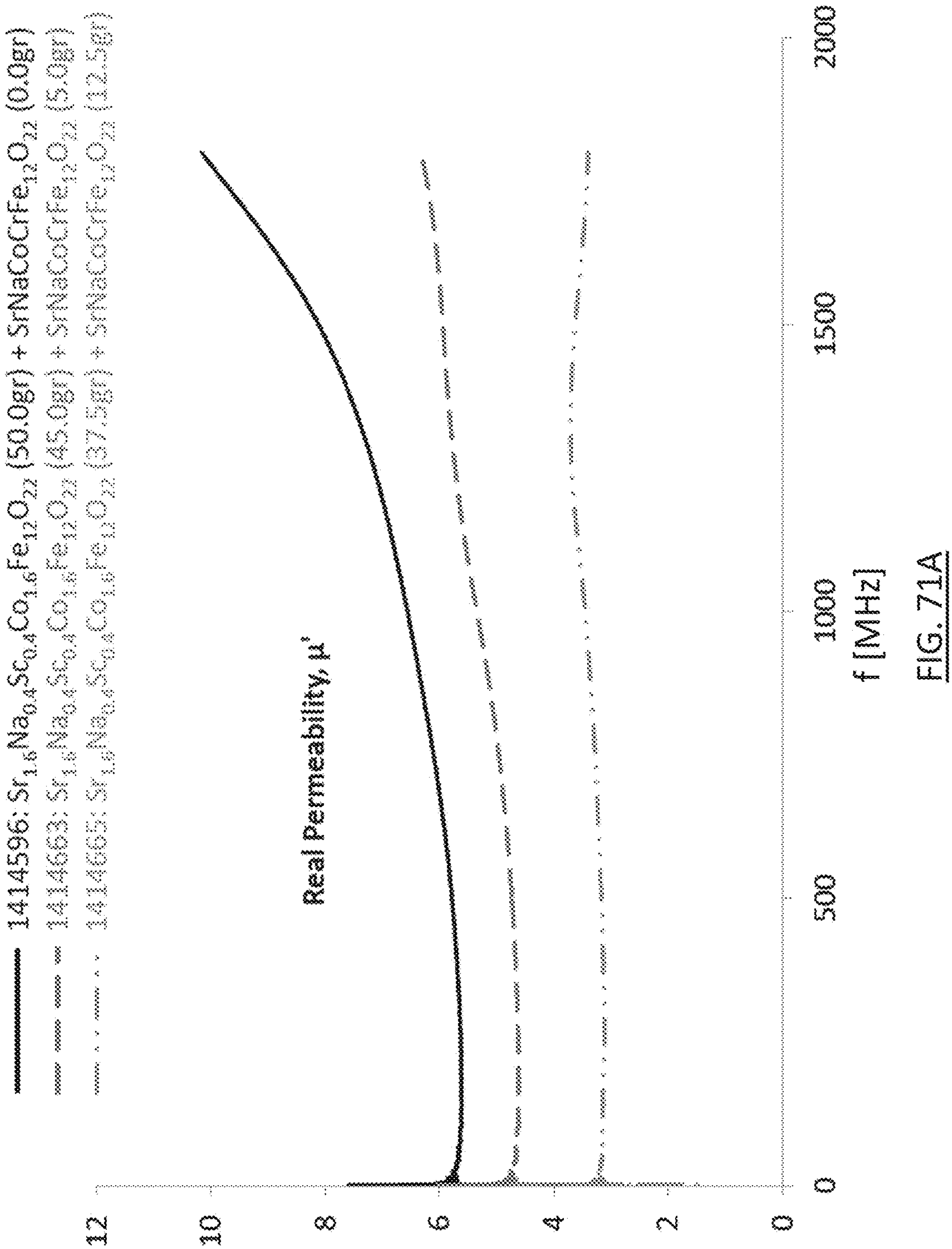
Figure 71B:
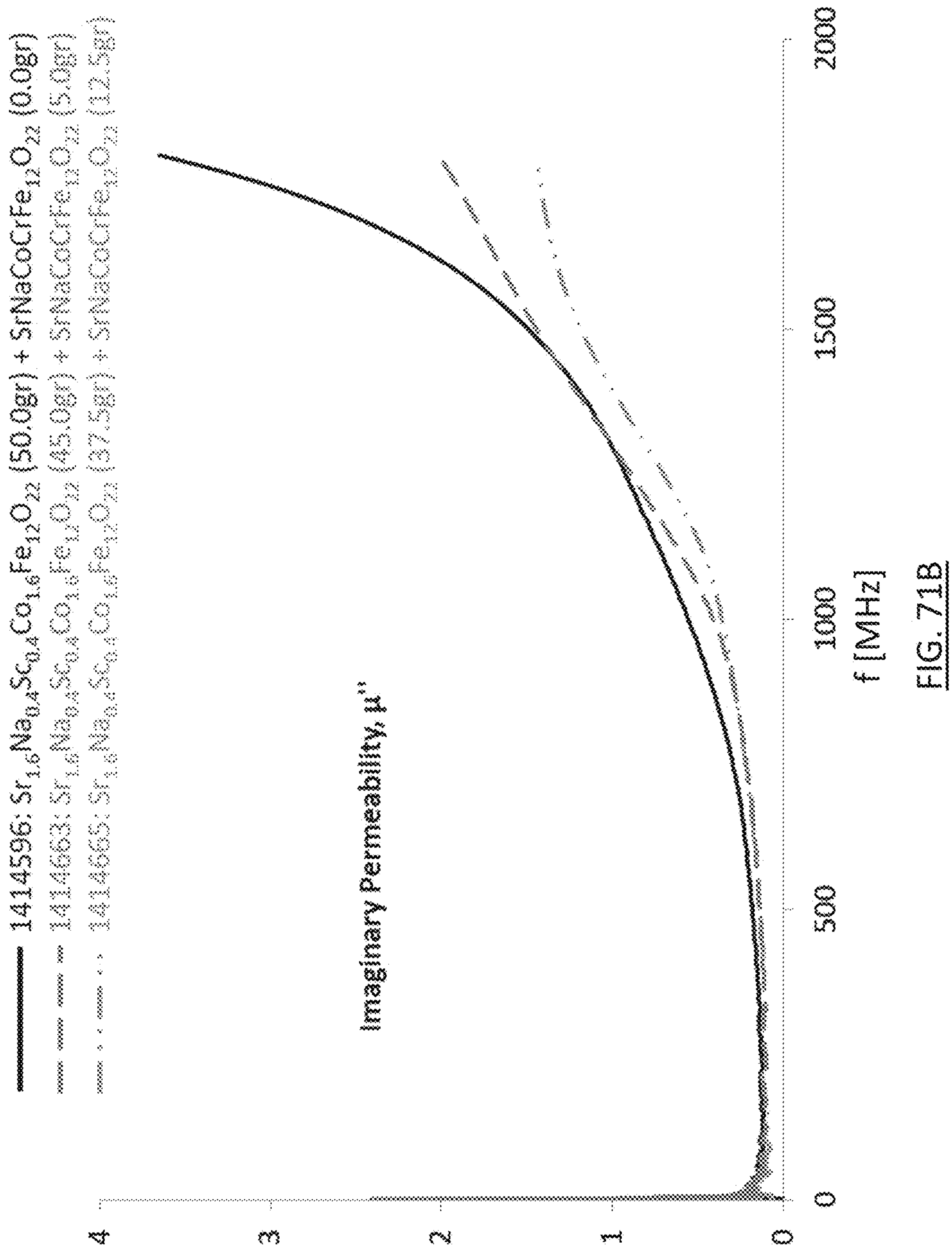
Figure 71C:
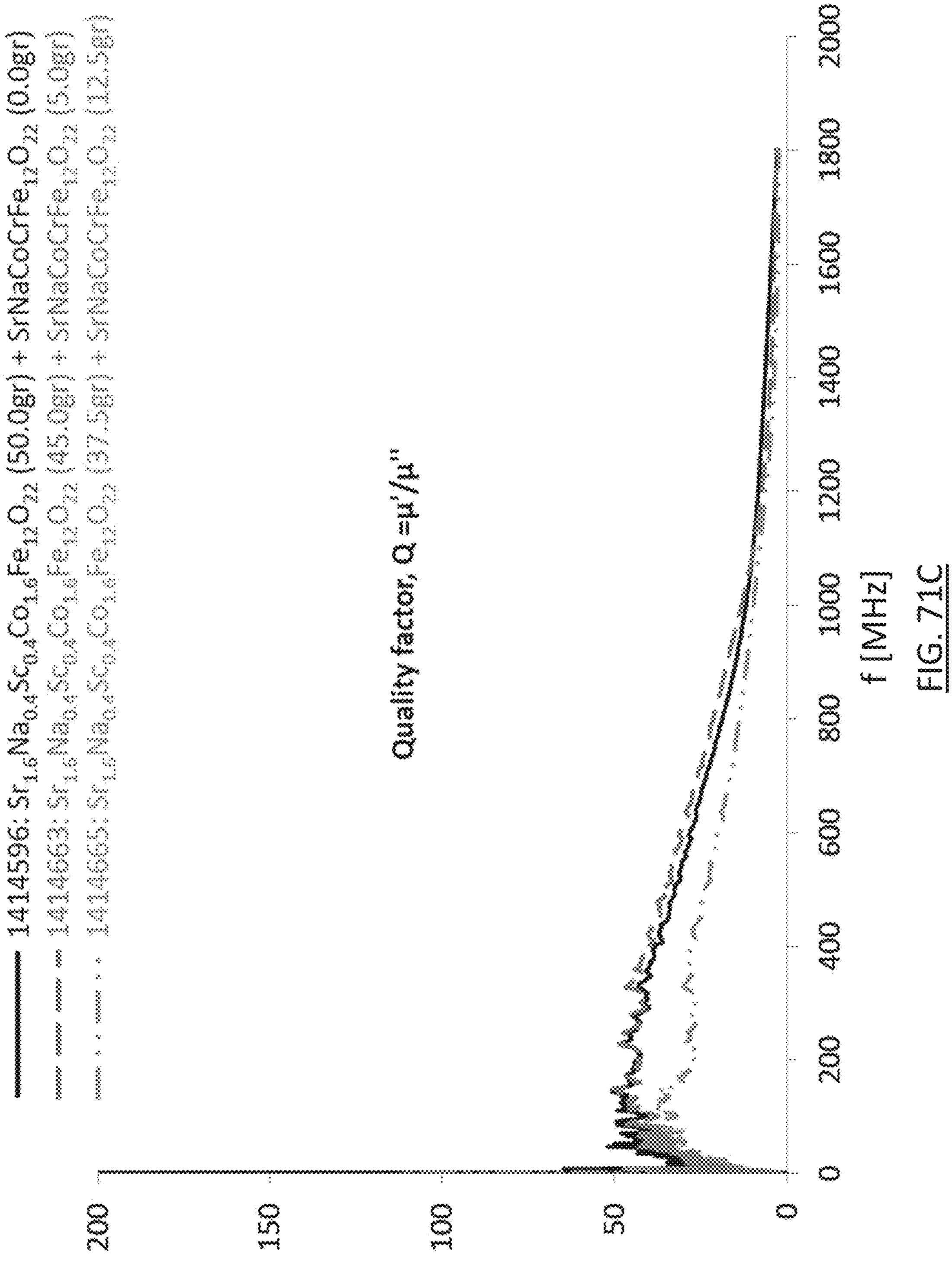
Figure 72A:
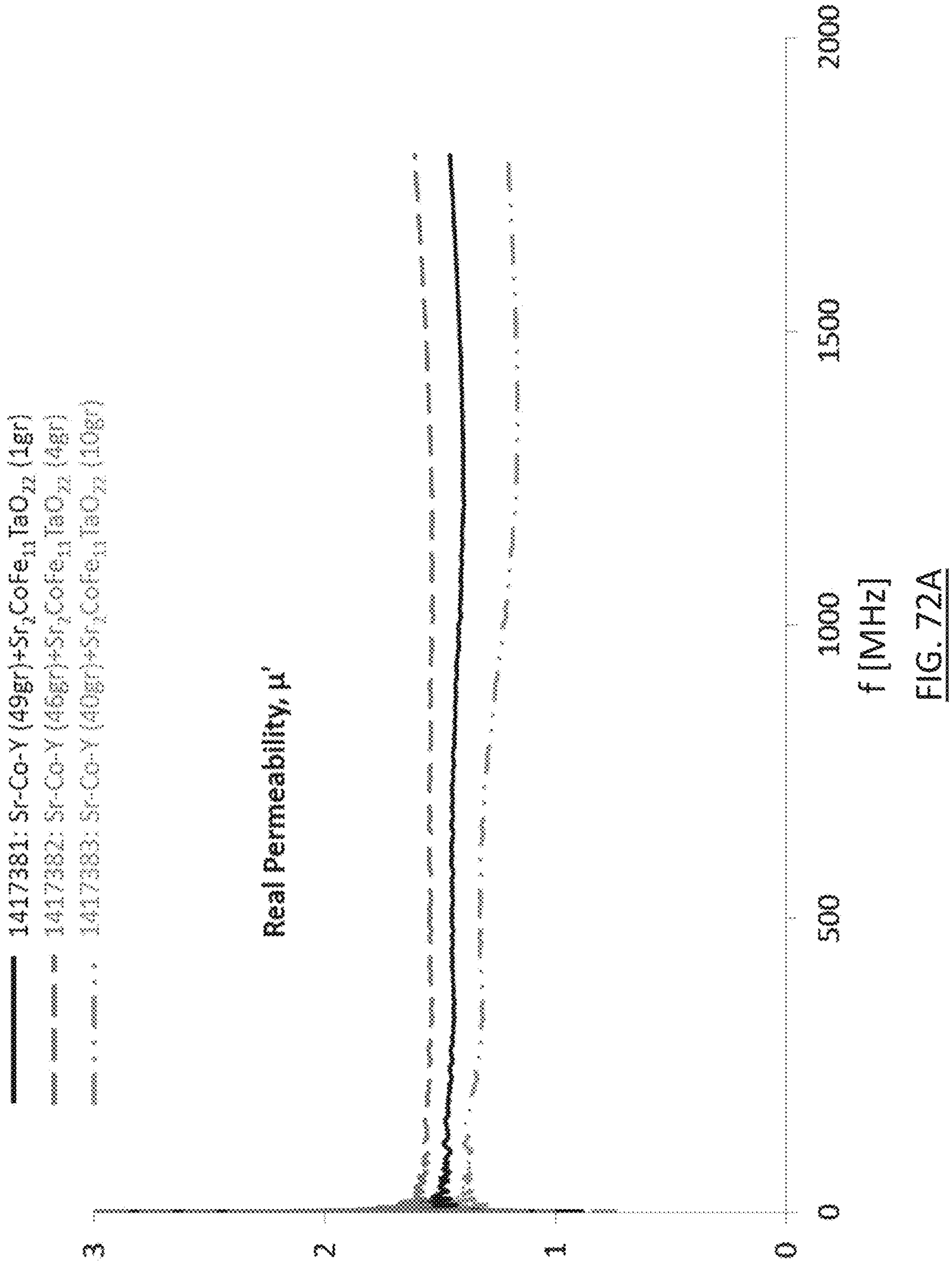
Figure 72B:
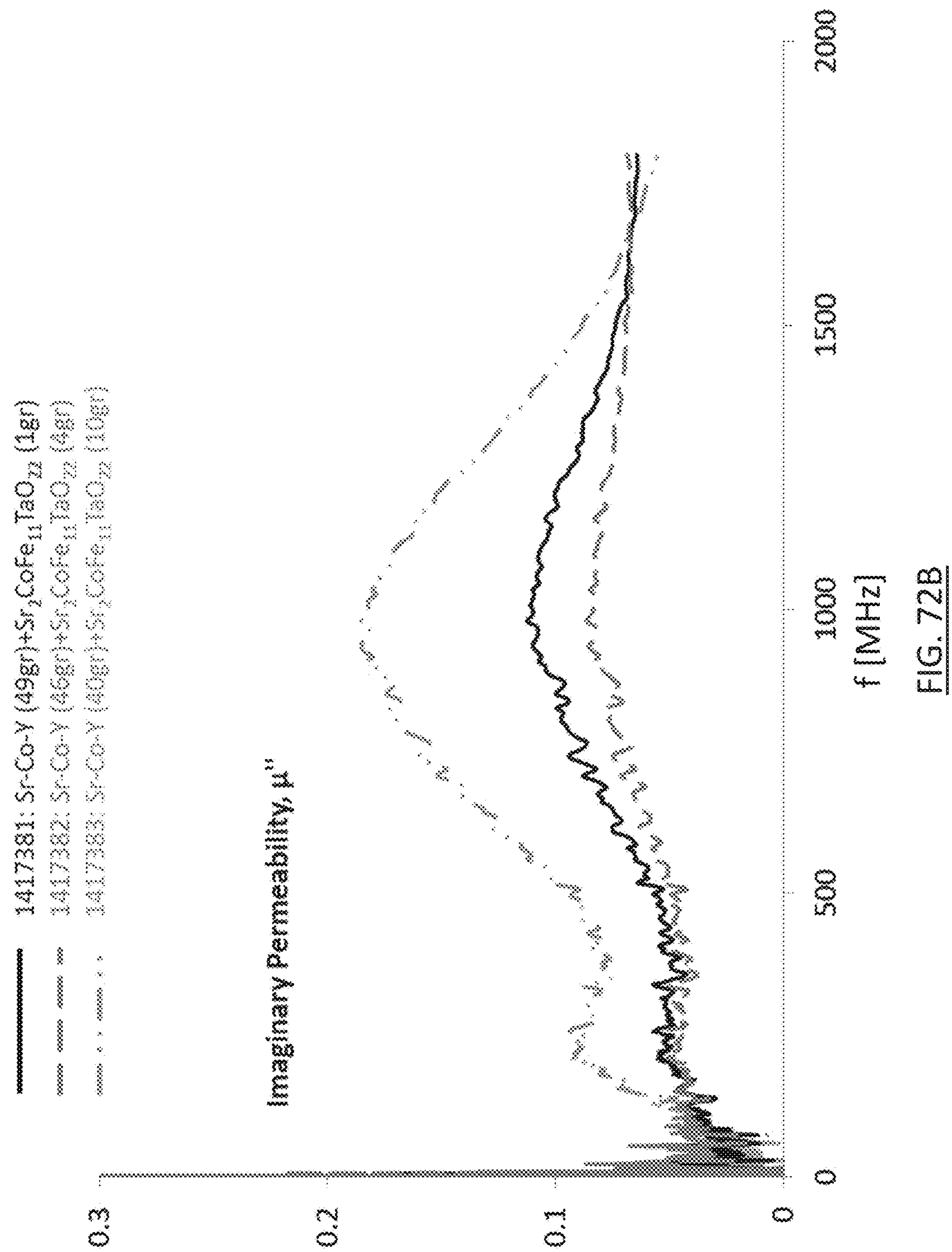
Figure 72C:
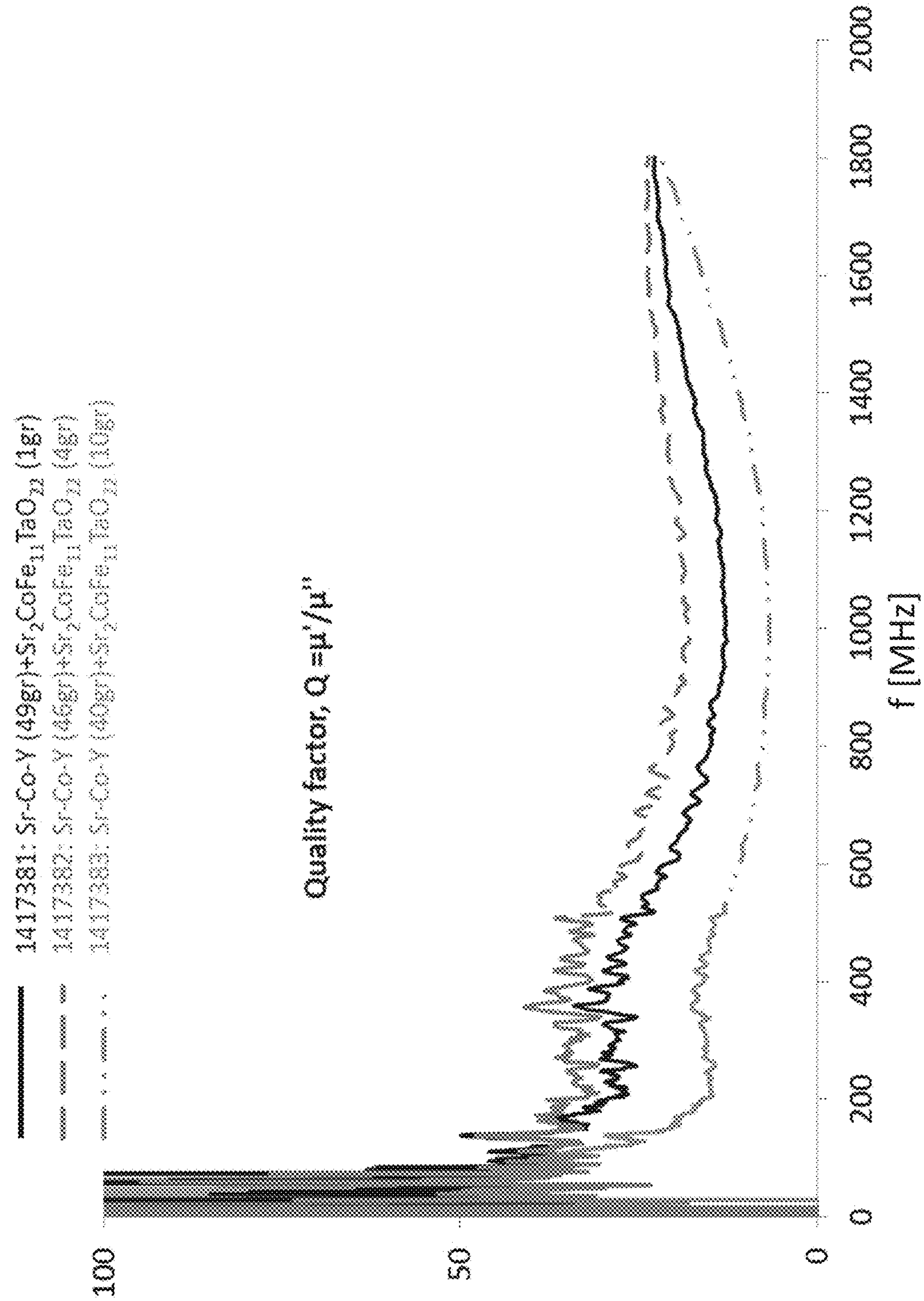
Figure 73A:
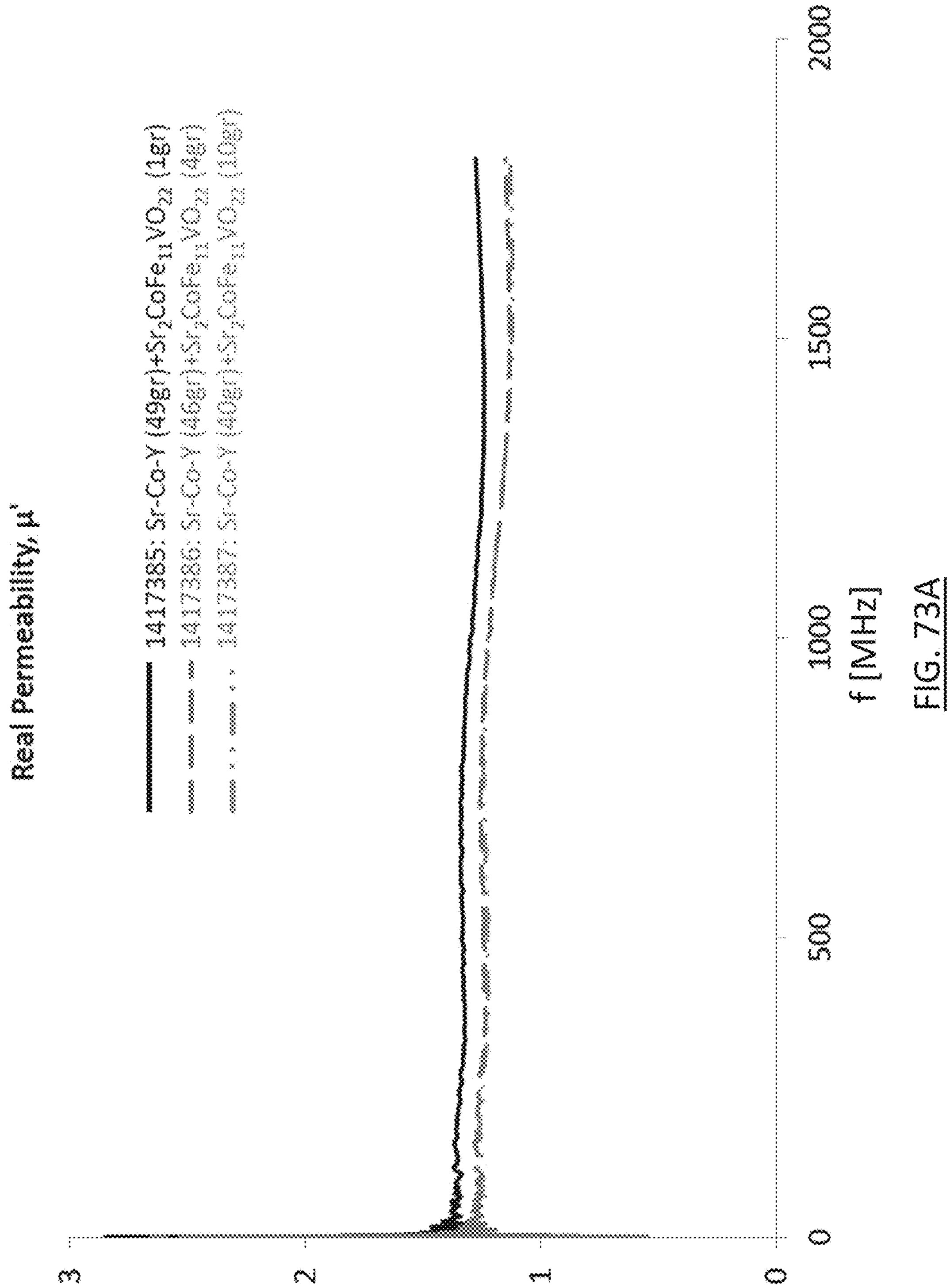
Figure 73B:
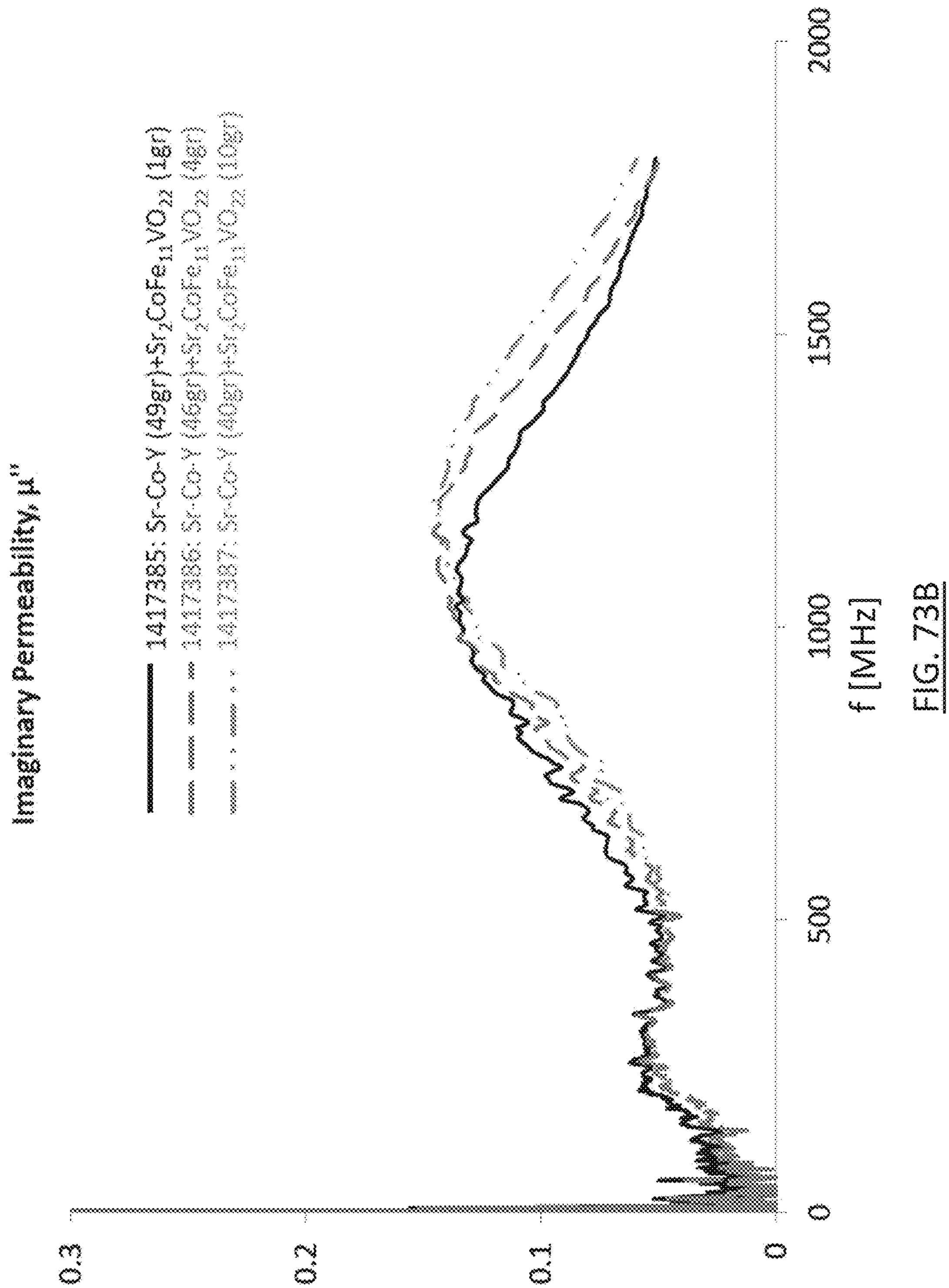
Figure 73C:
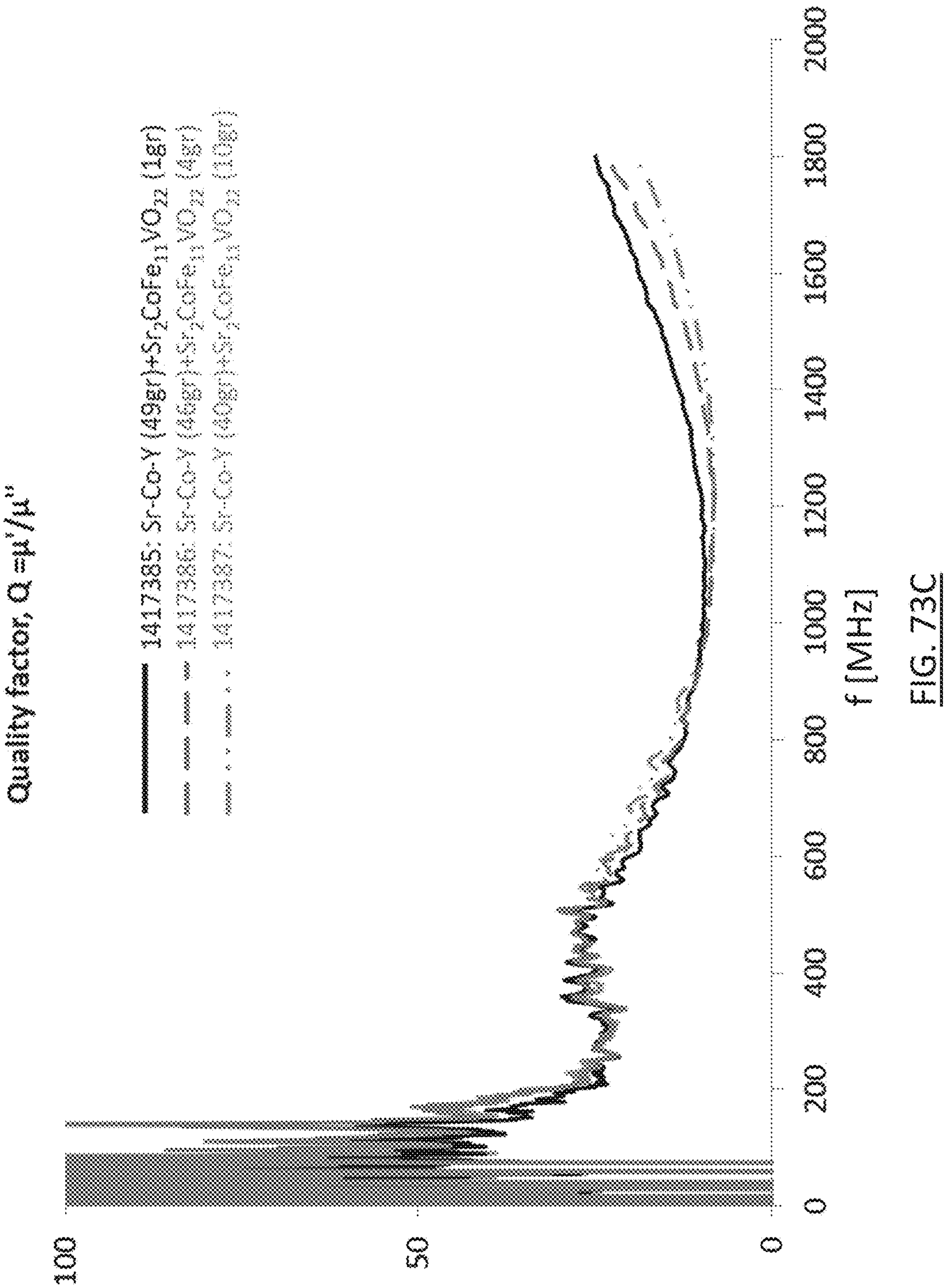
Figure 74A:
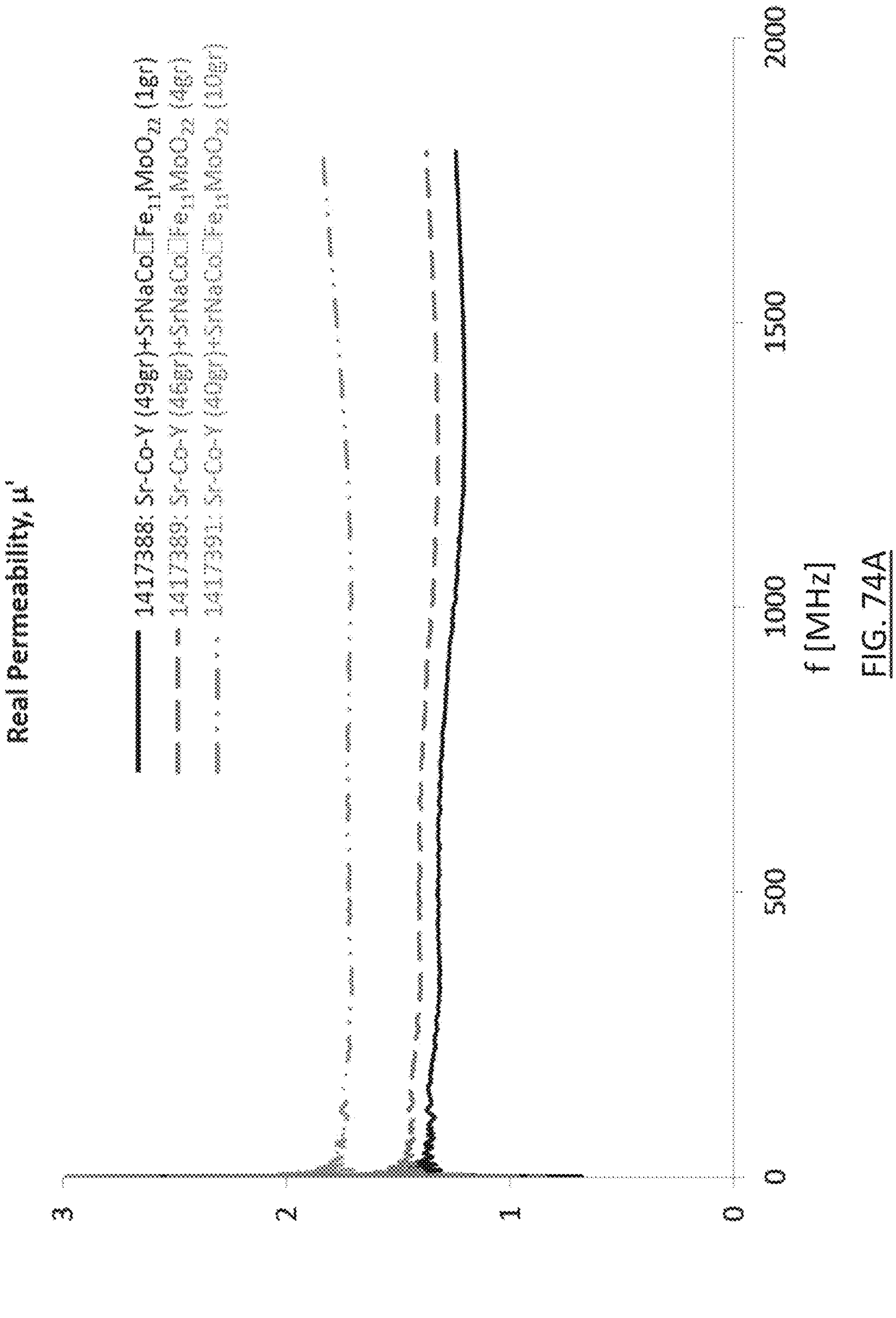
Figure 74B:
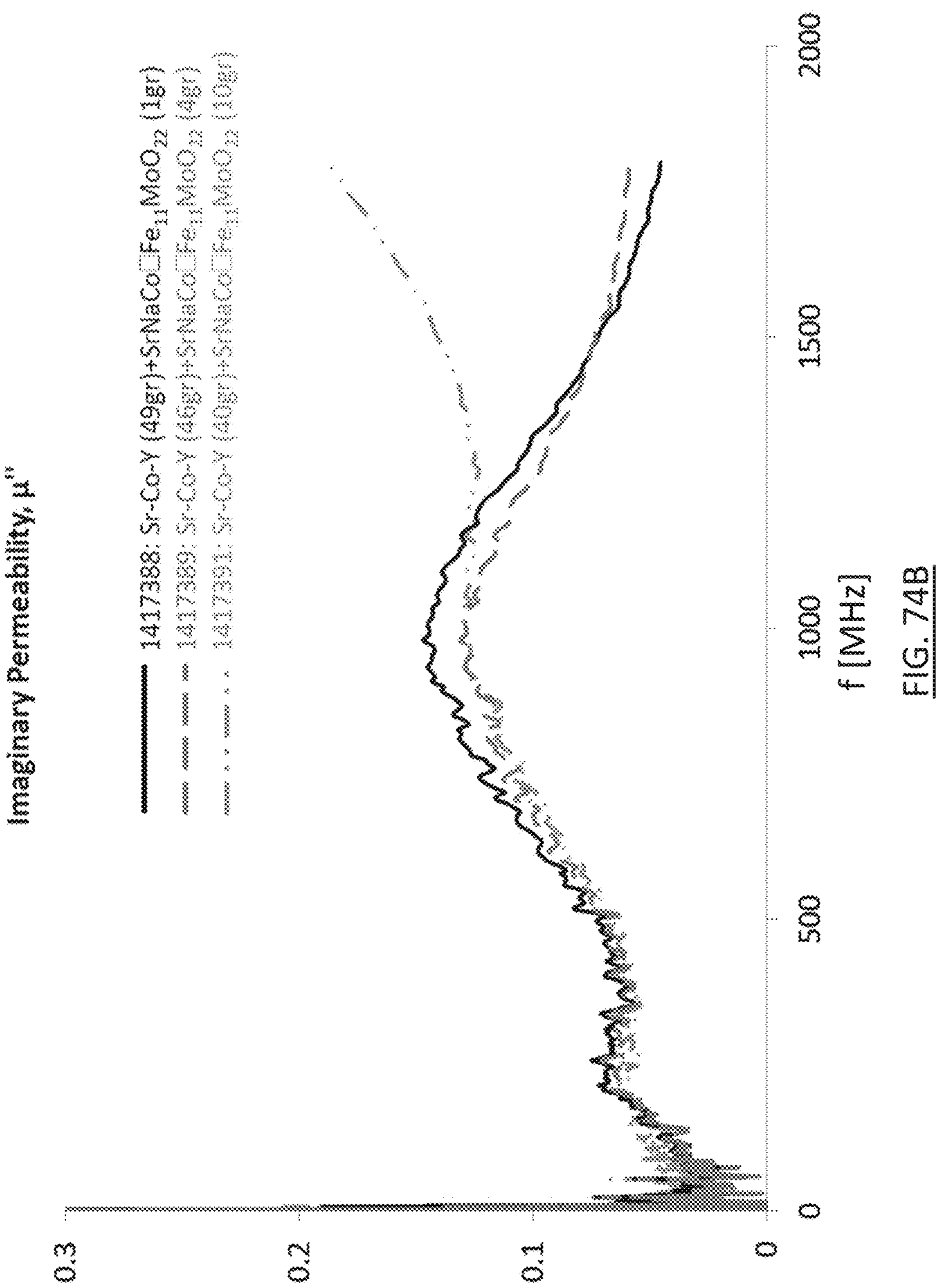
Figure 74C:
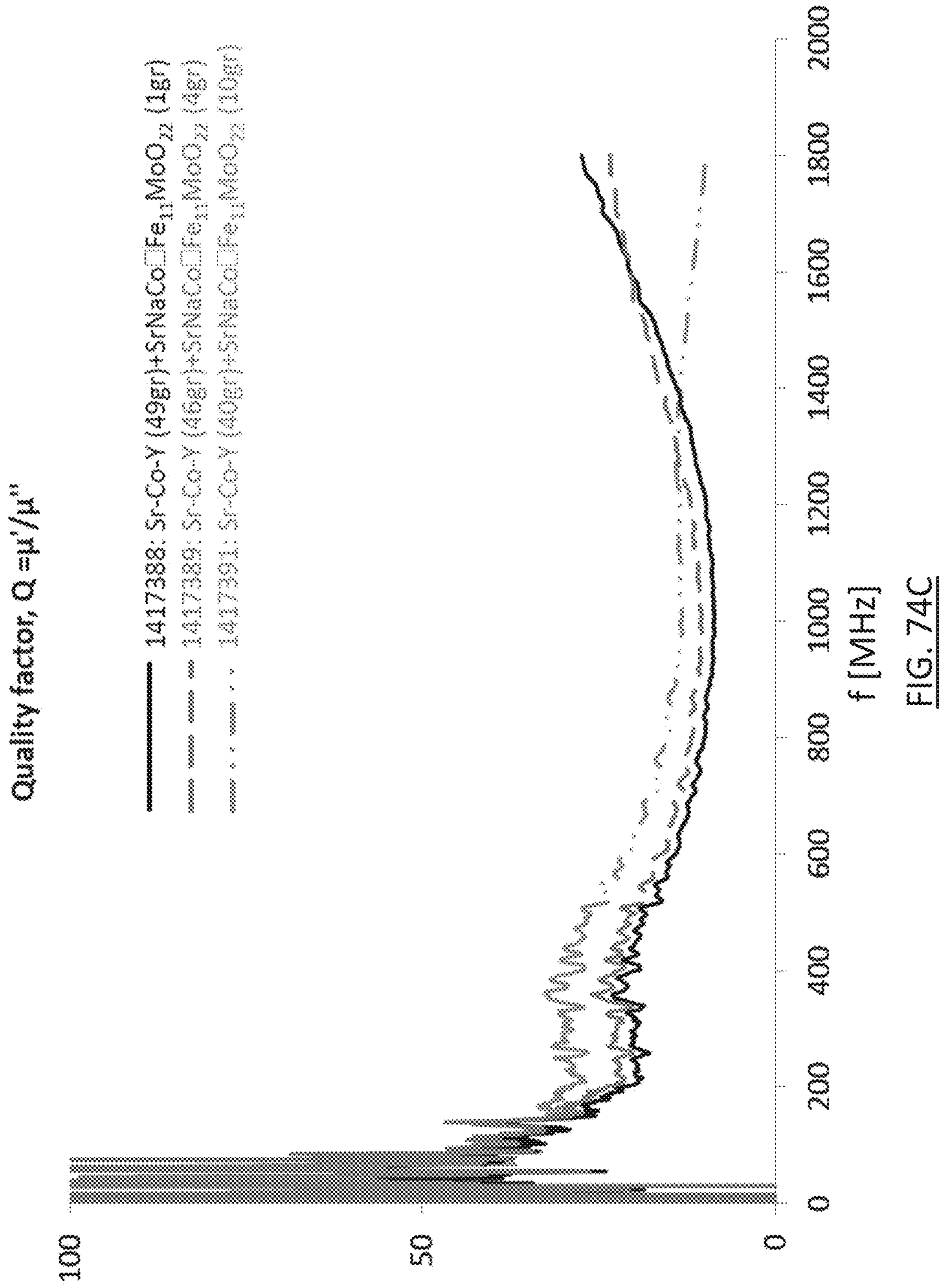
Figure 75A:
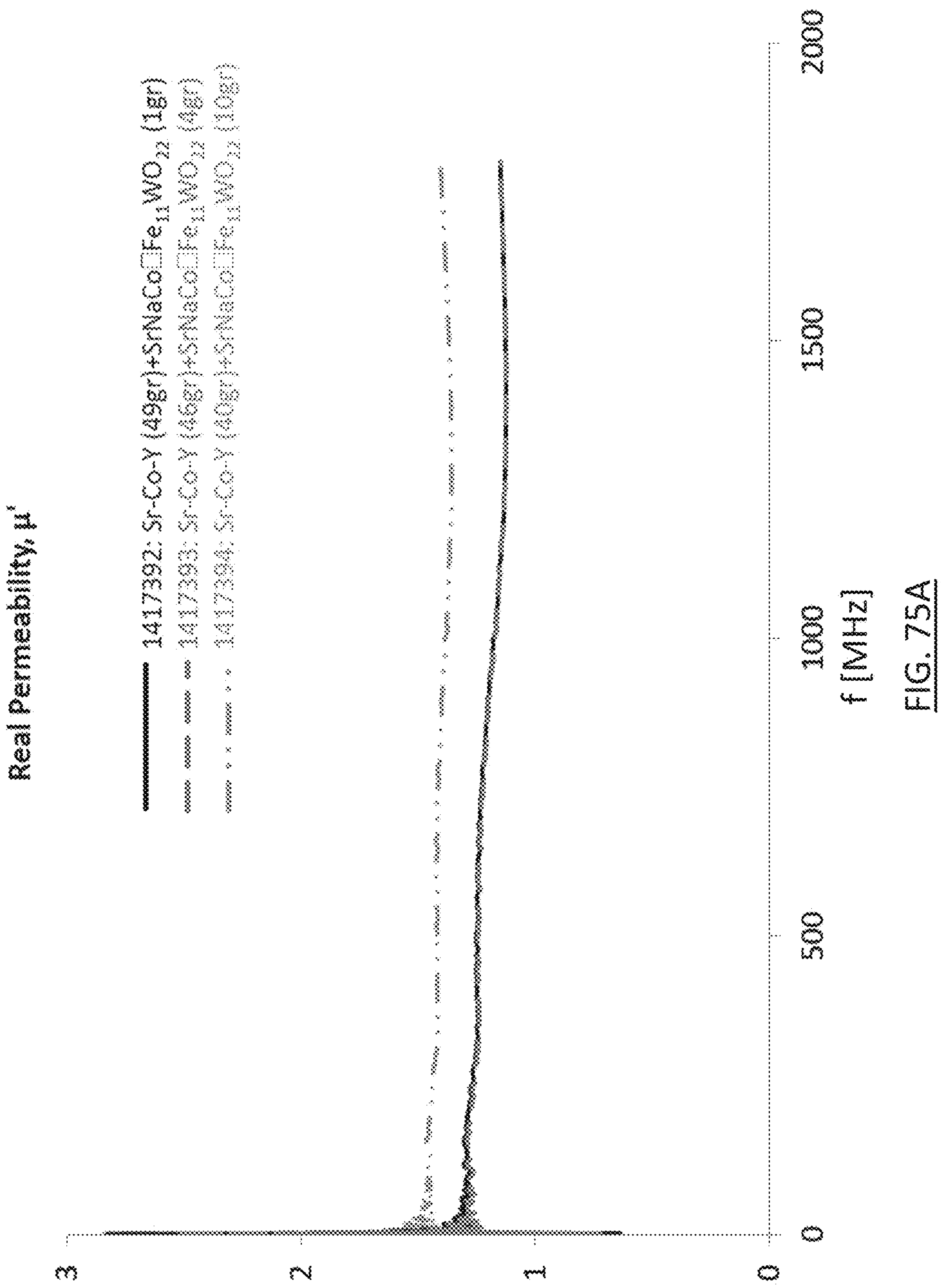
Figure 75B:
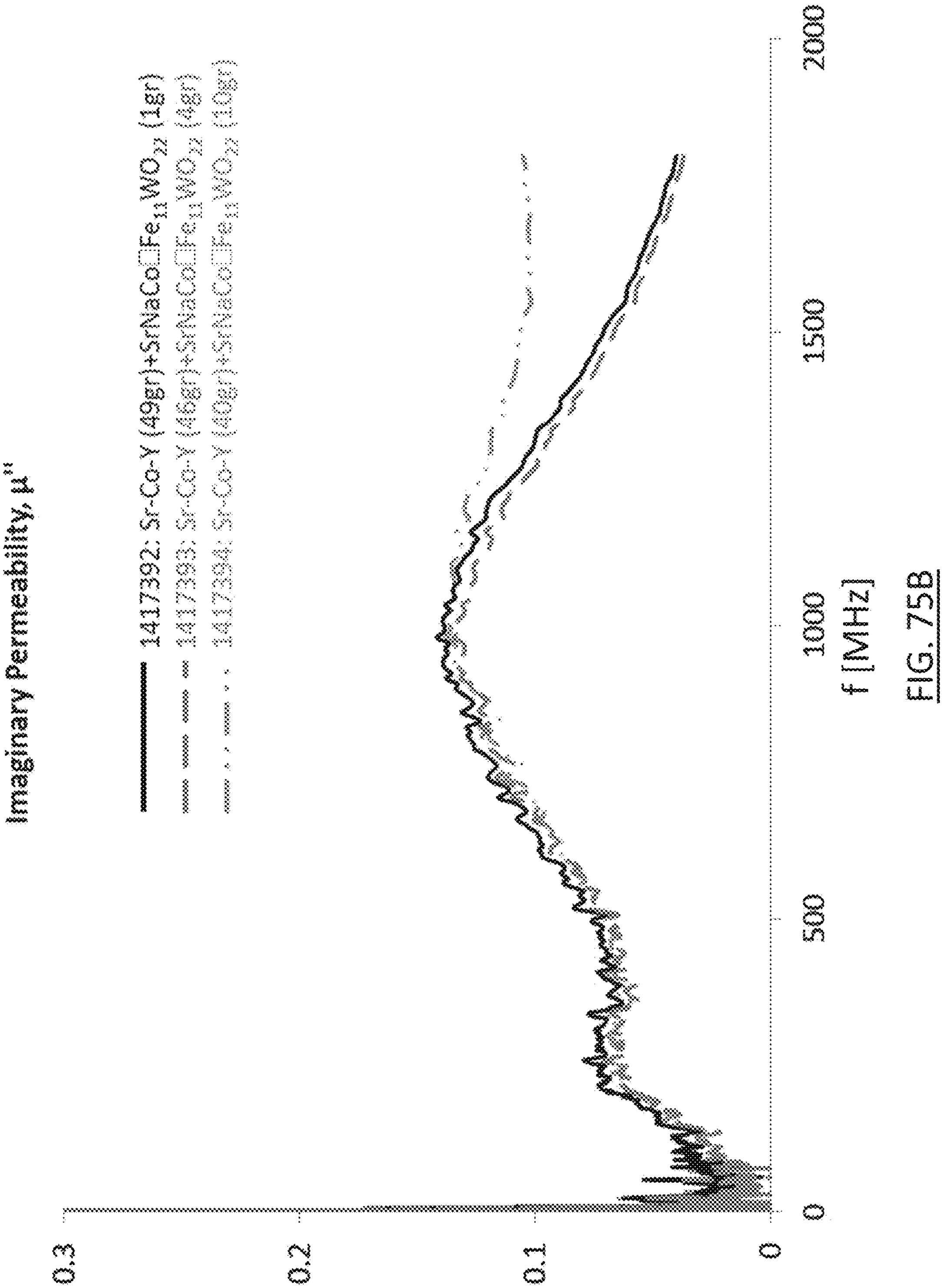
Figure 75C:
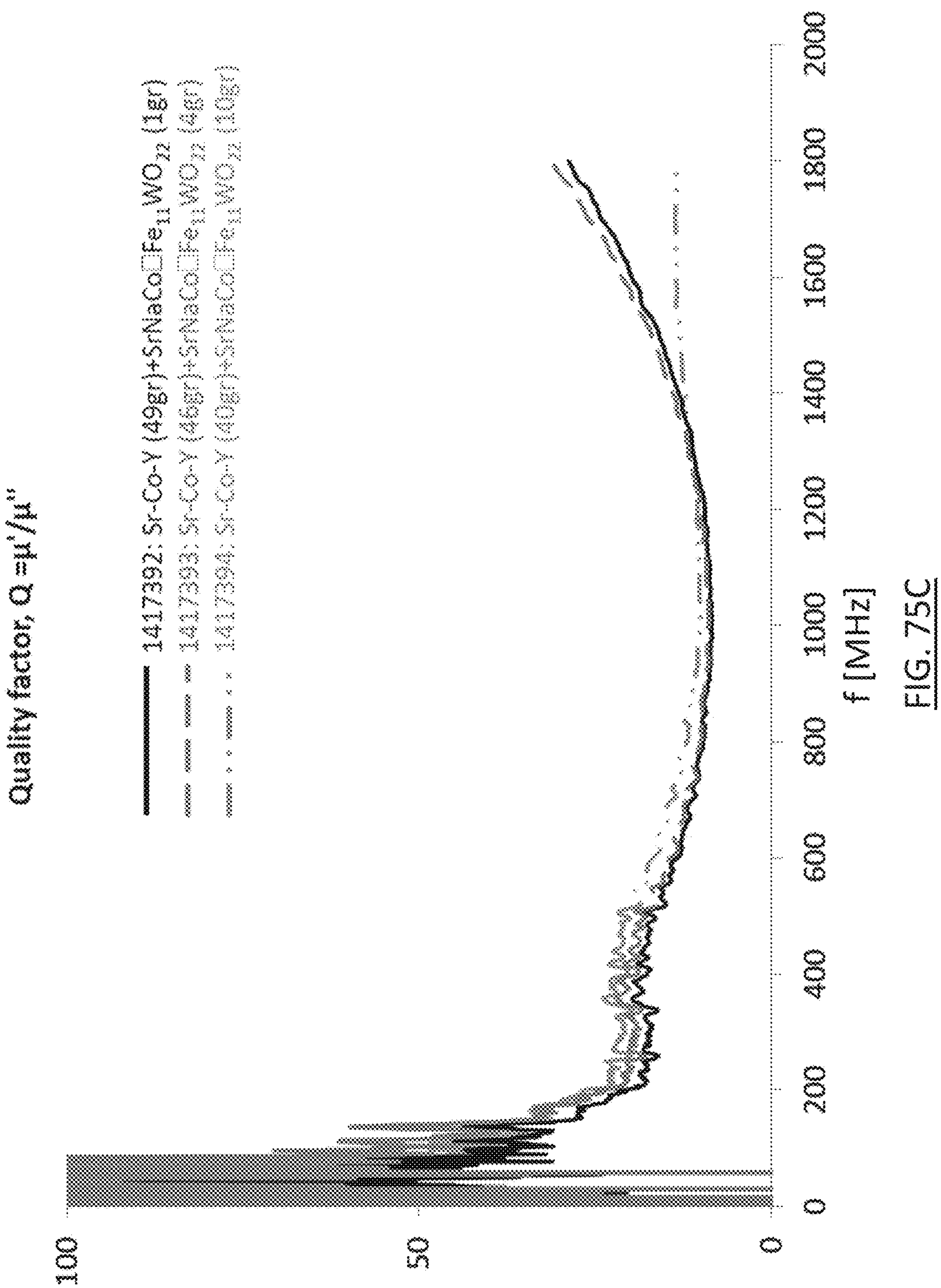
Figure 76A:
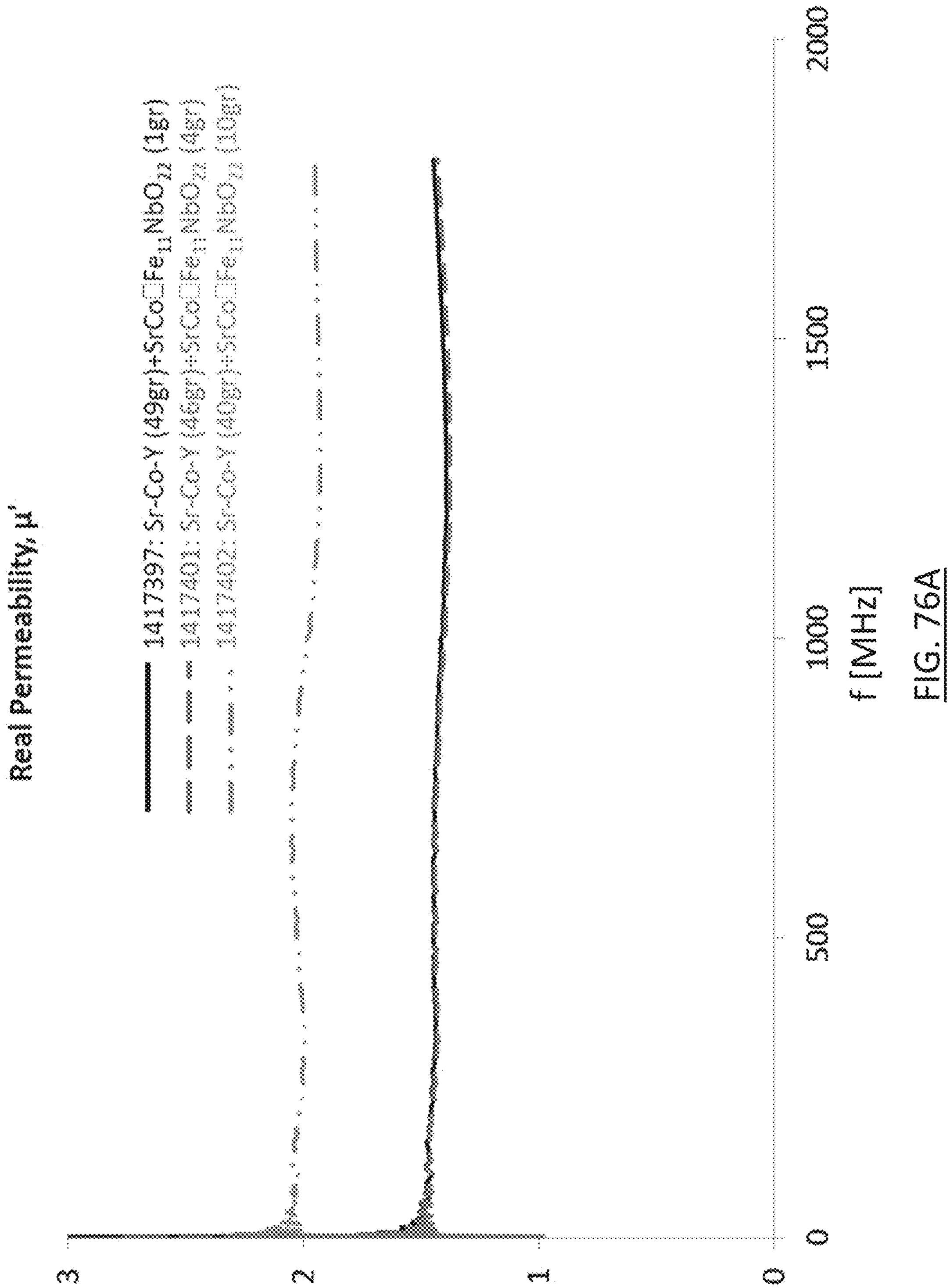
Figure 76B:
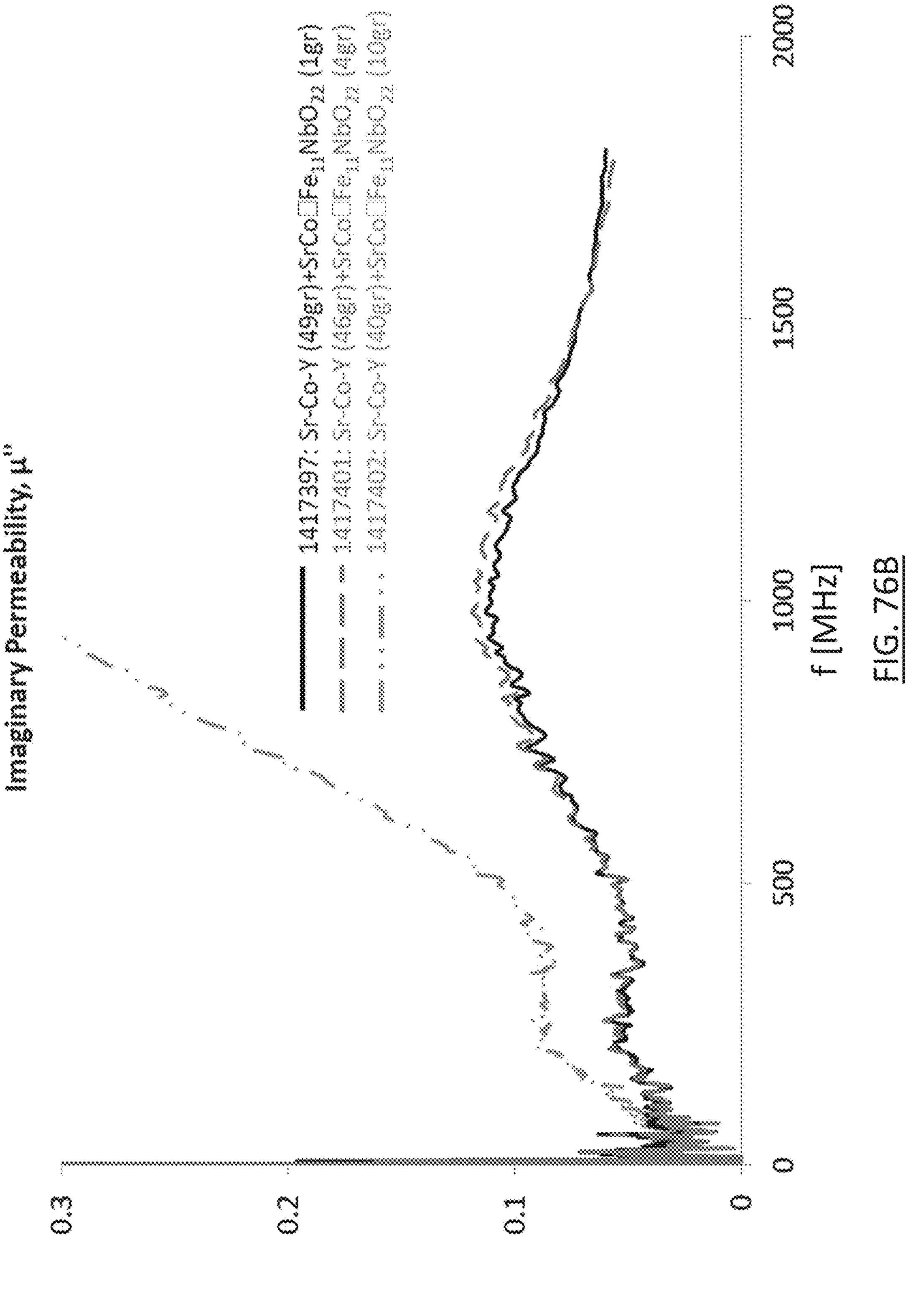
Figure 76C:
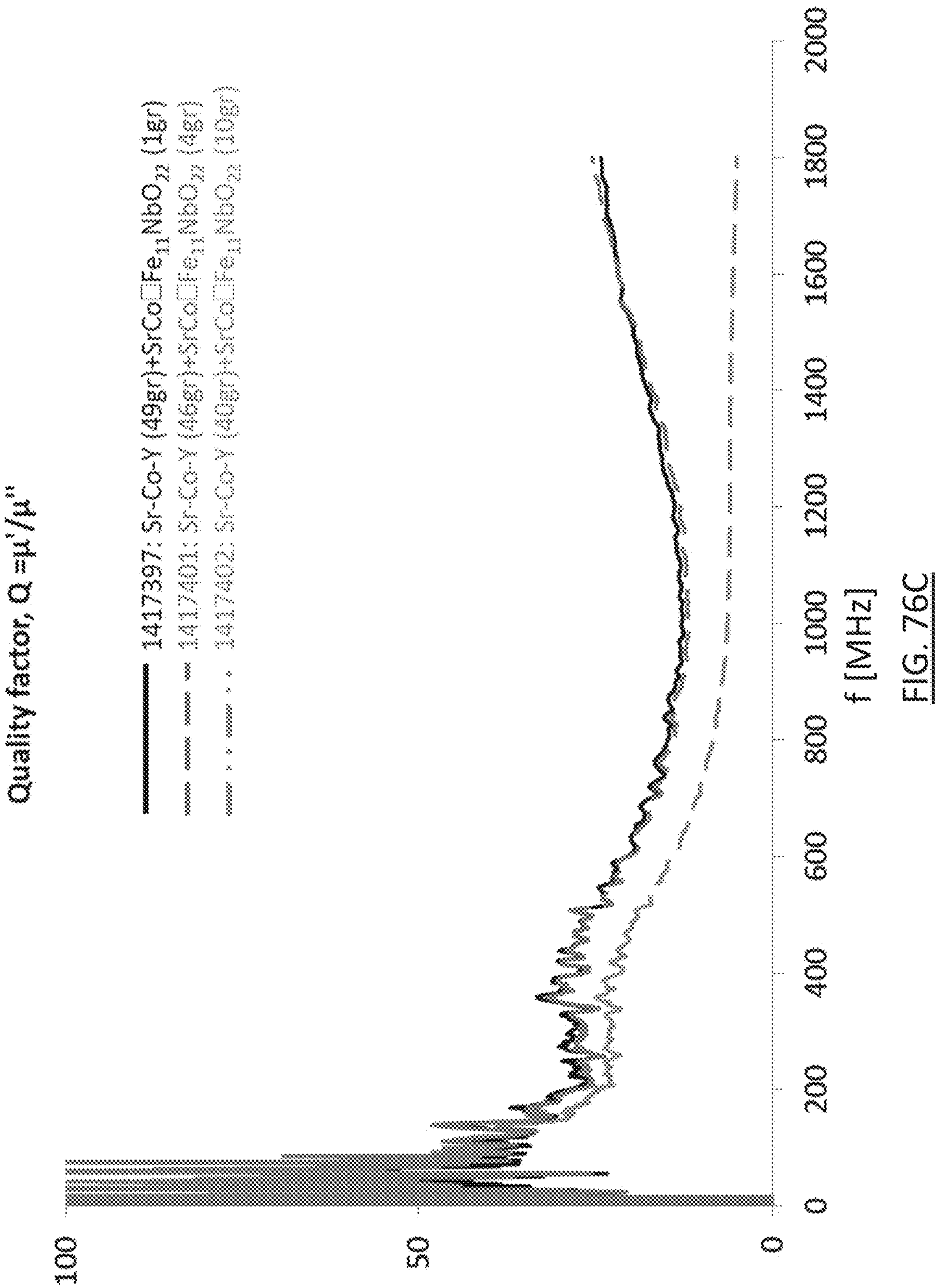
Figure 77A:
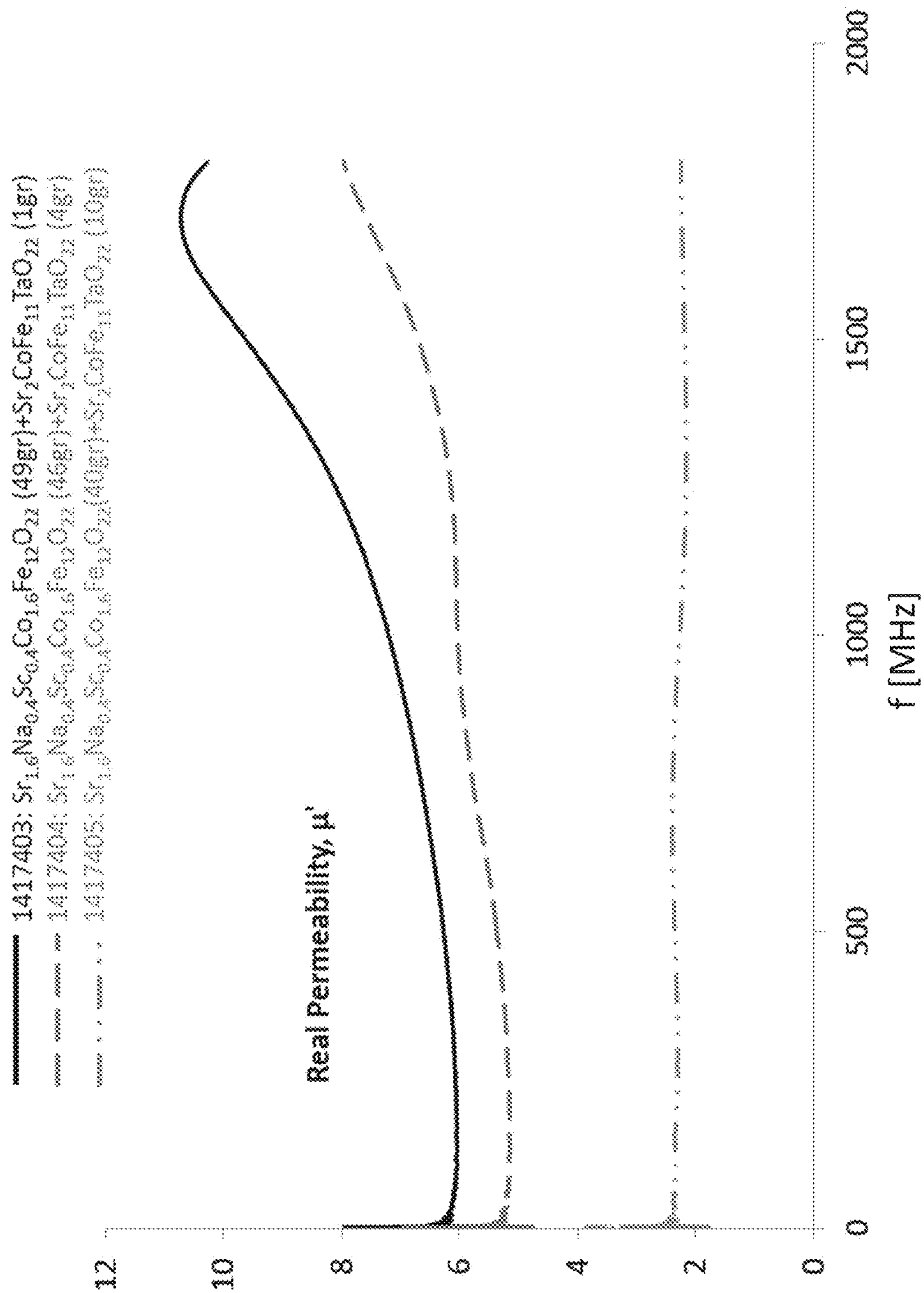
Figure 77B:
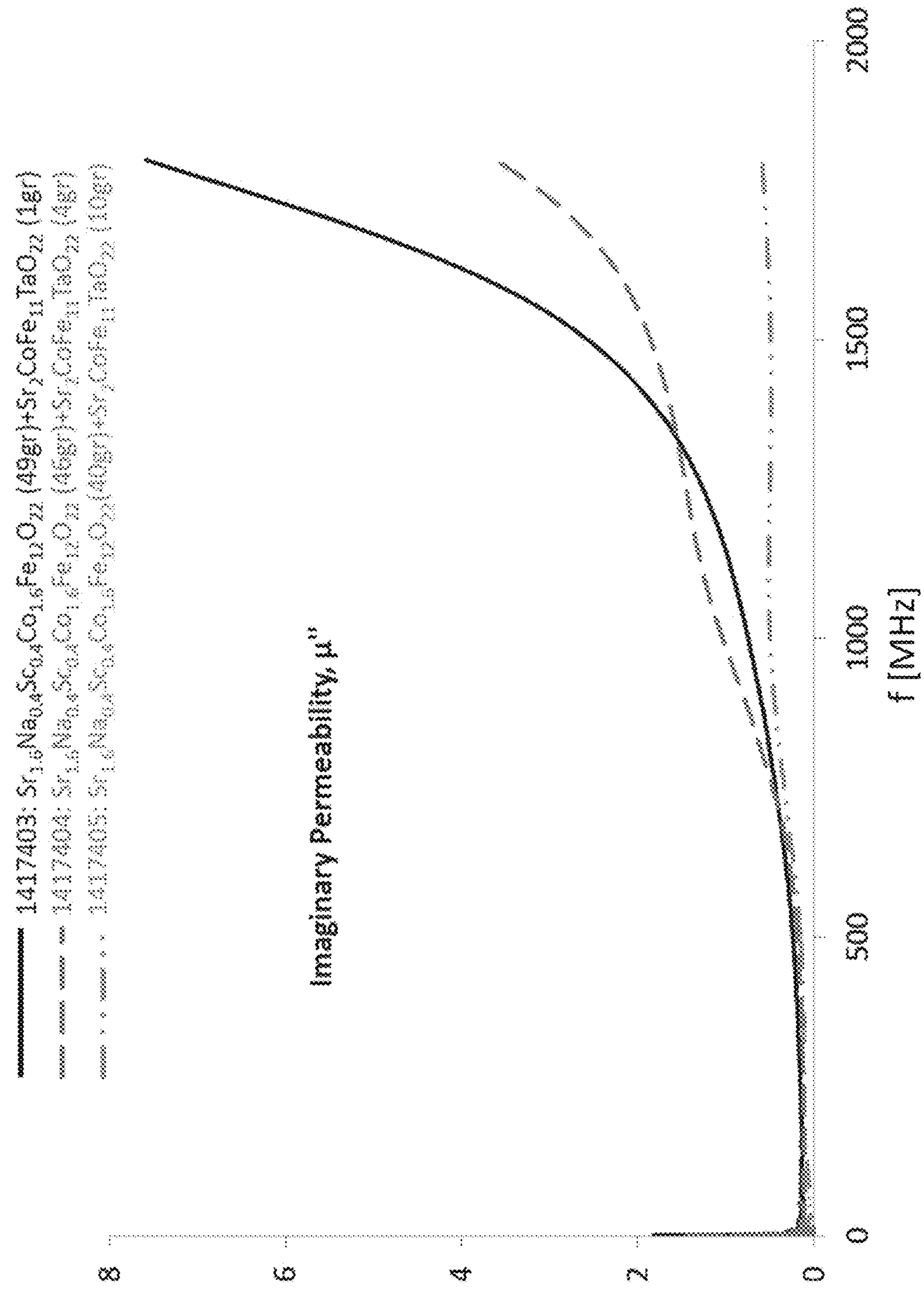
Figure 77C:
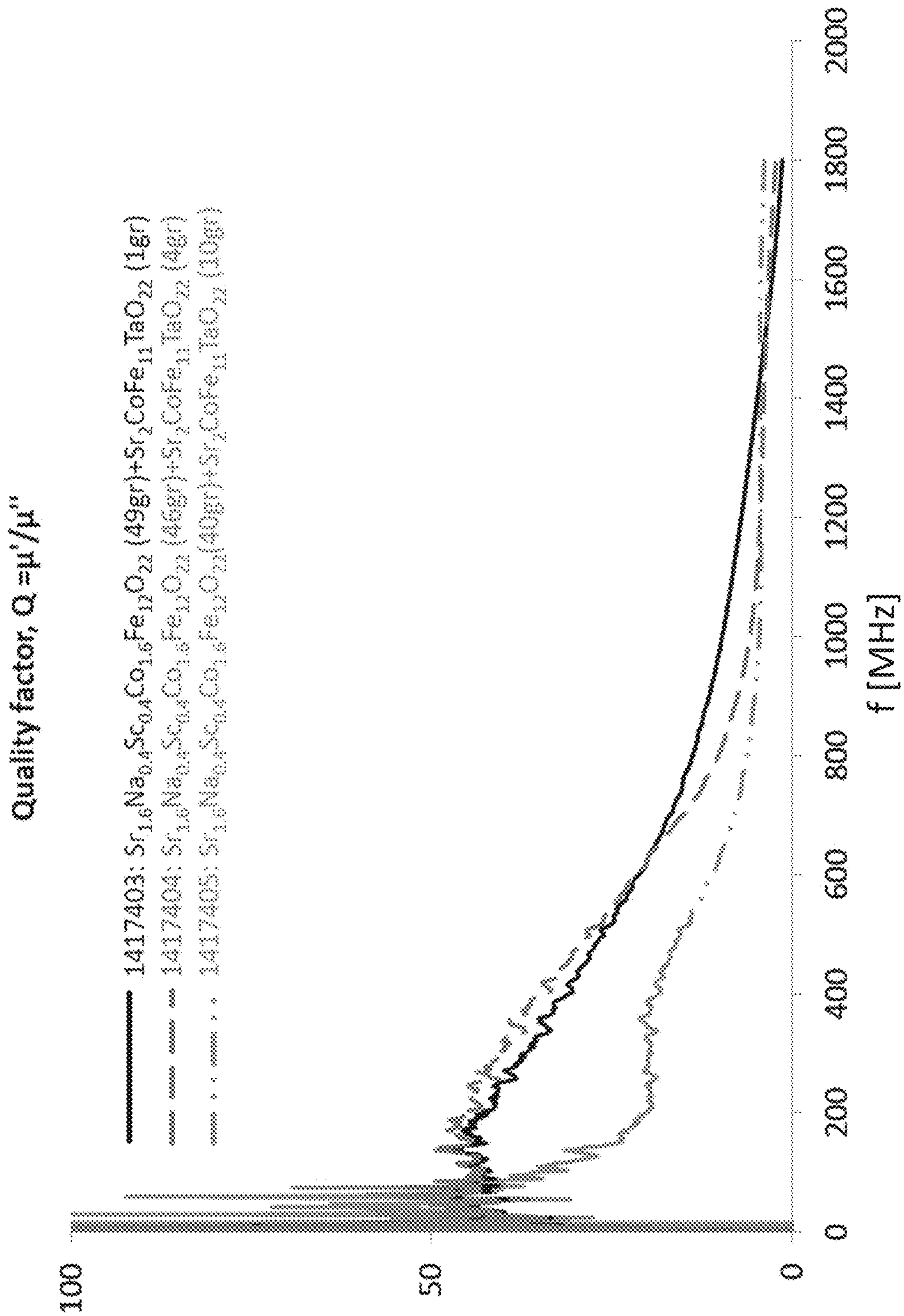
Figure 78A:
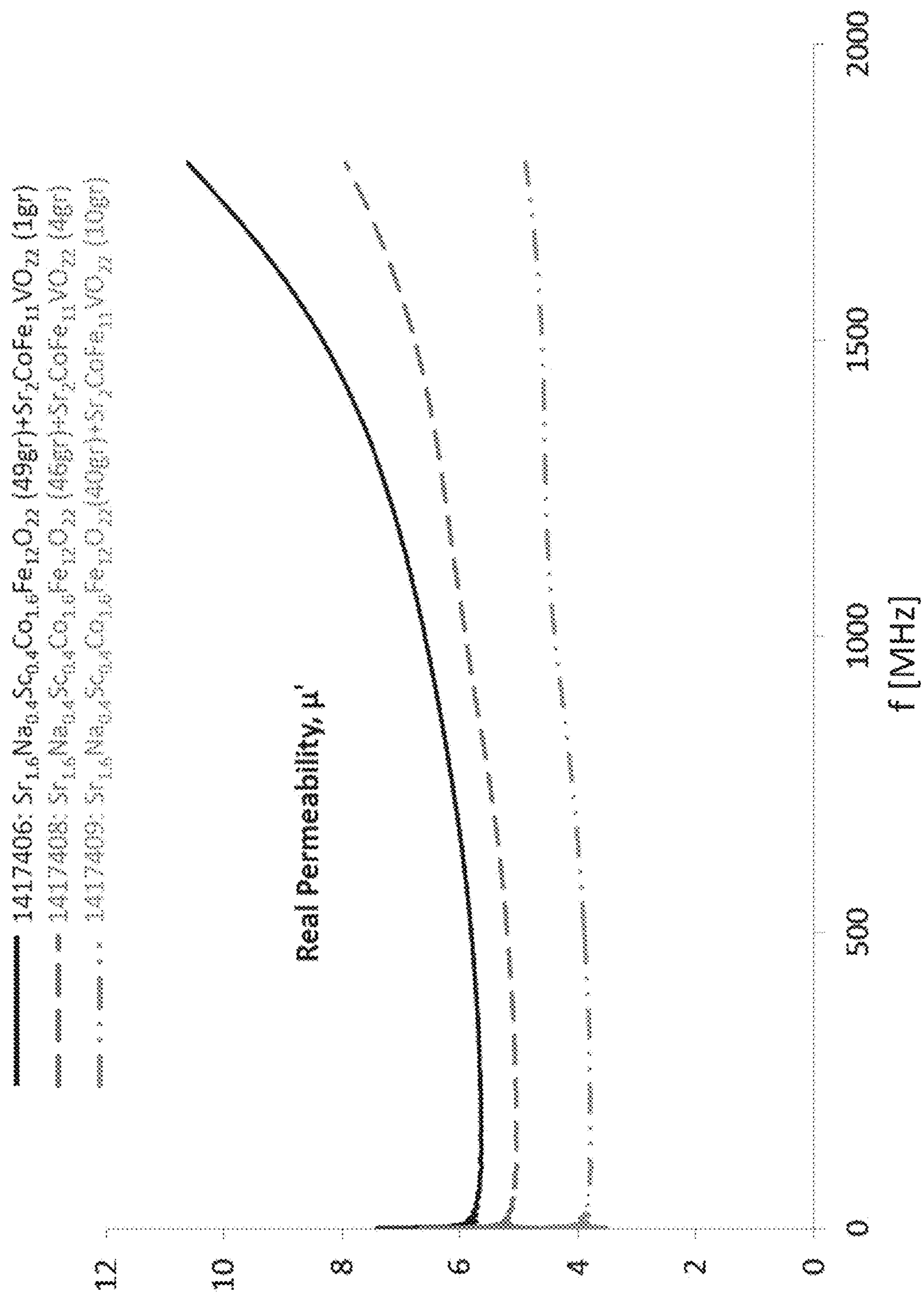
Figure 78B:
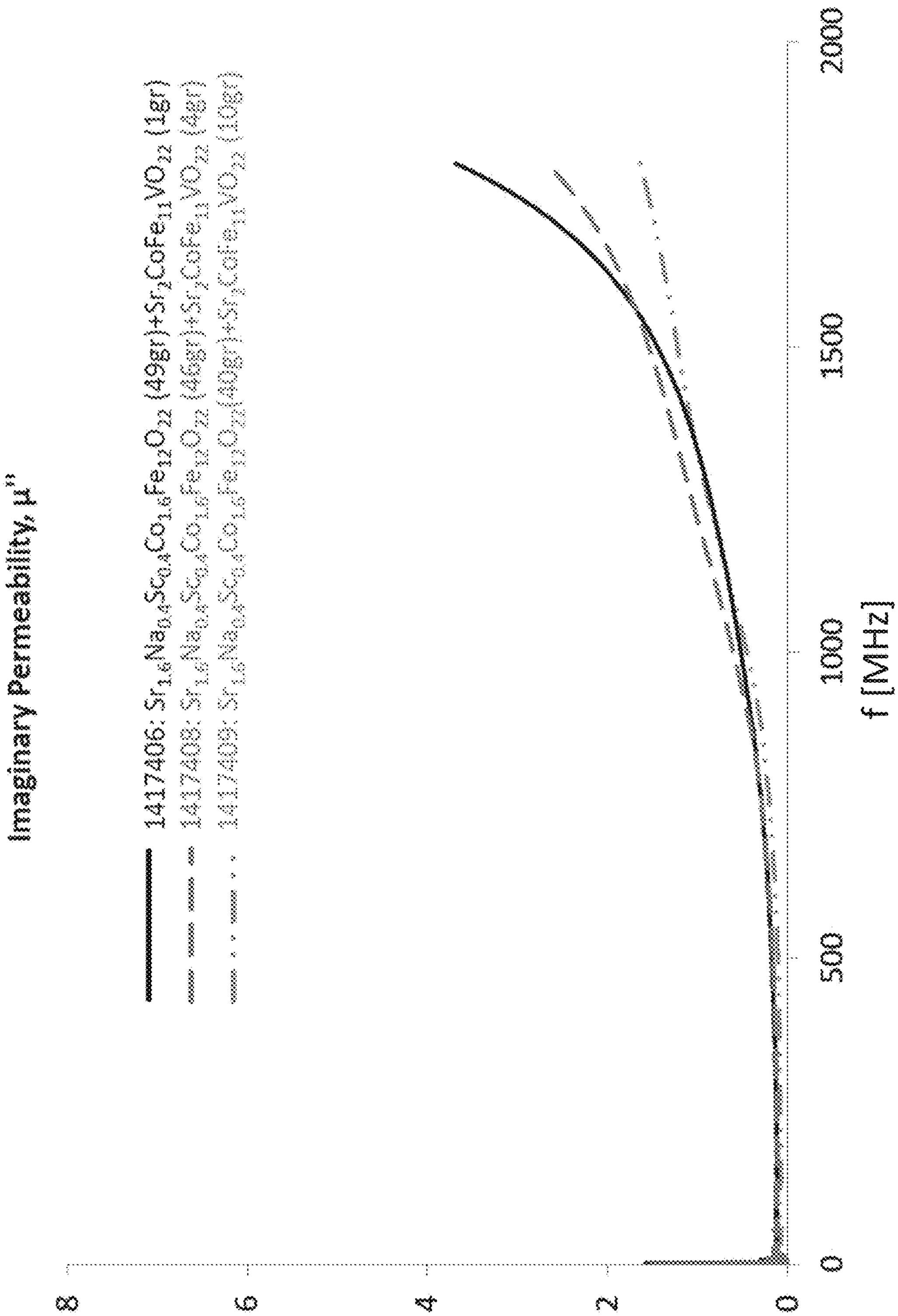
Figure 78C:
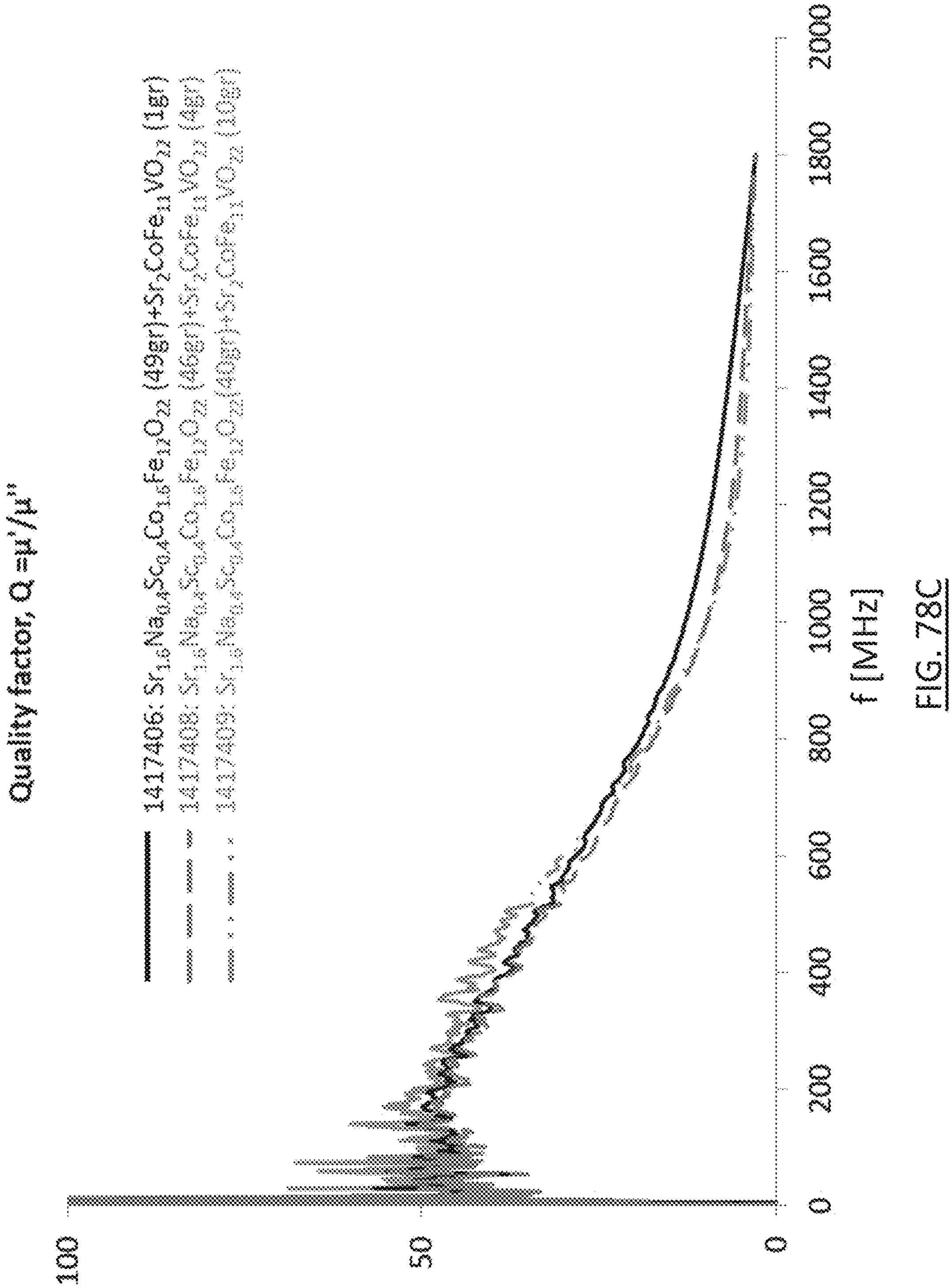
Figure 79A:
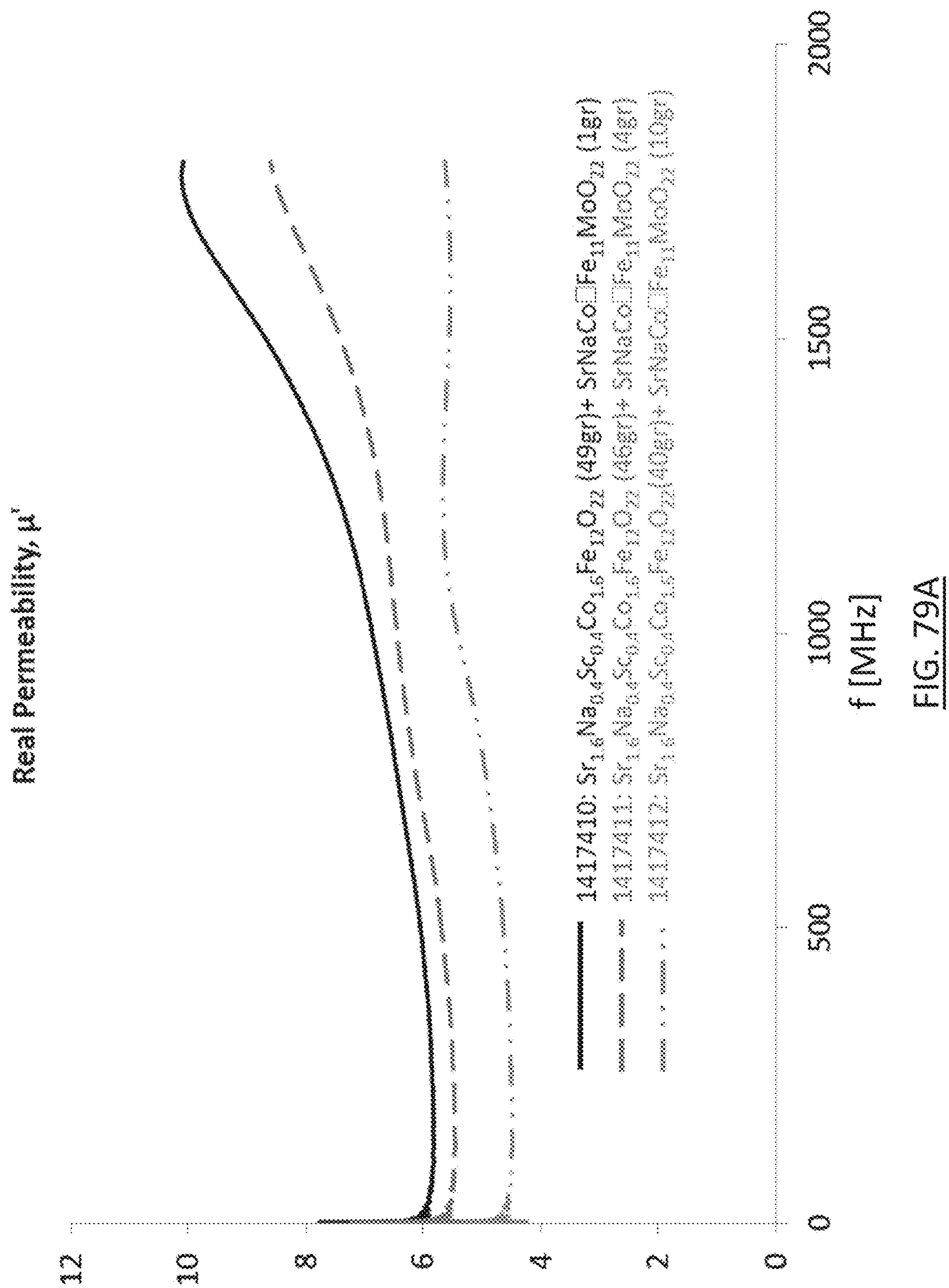
Figure 79B:
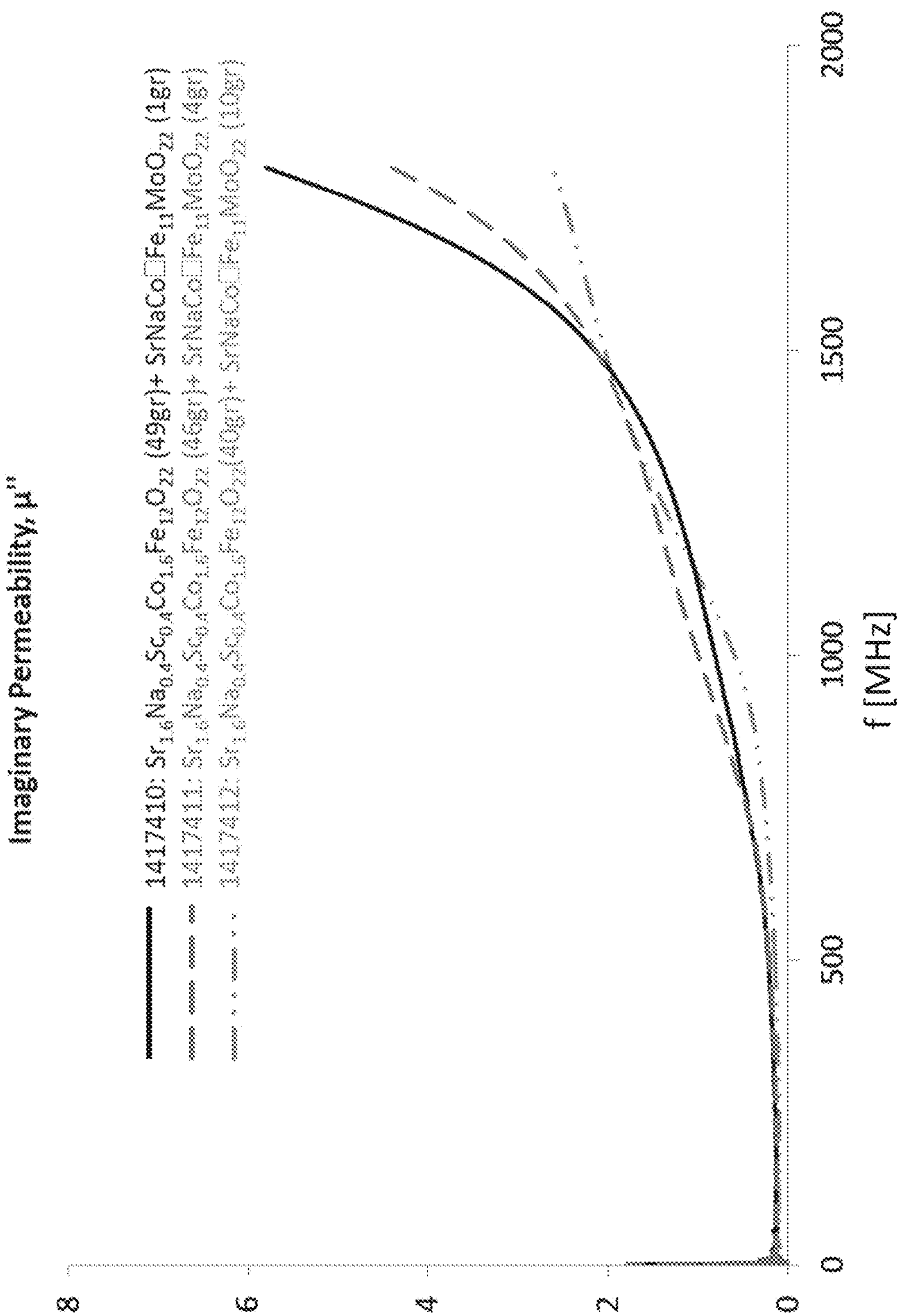
Figure 79C:
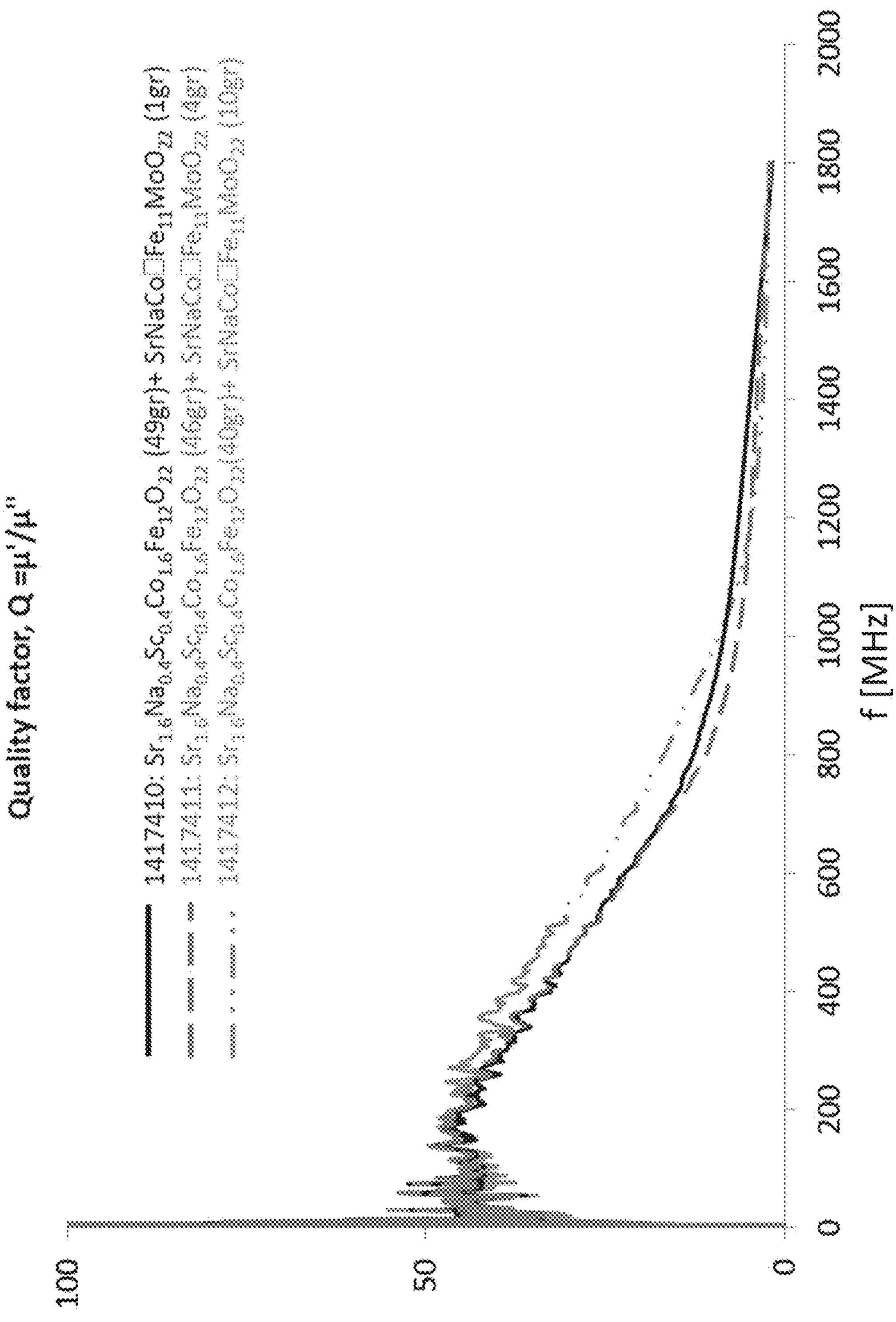
Figure 80A:
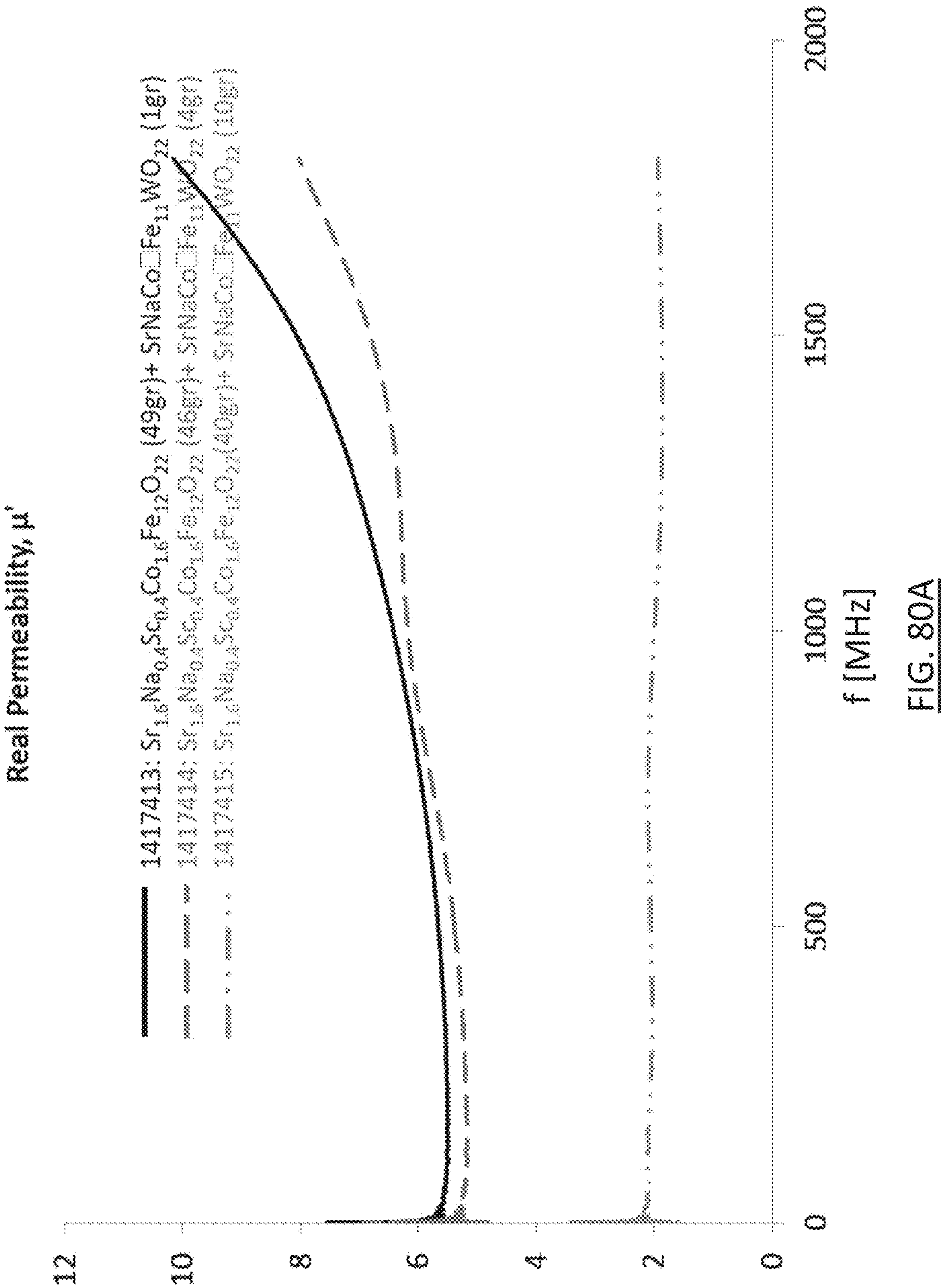
Figure 80B:
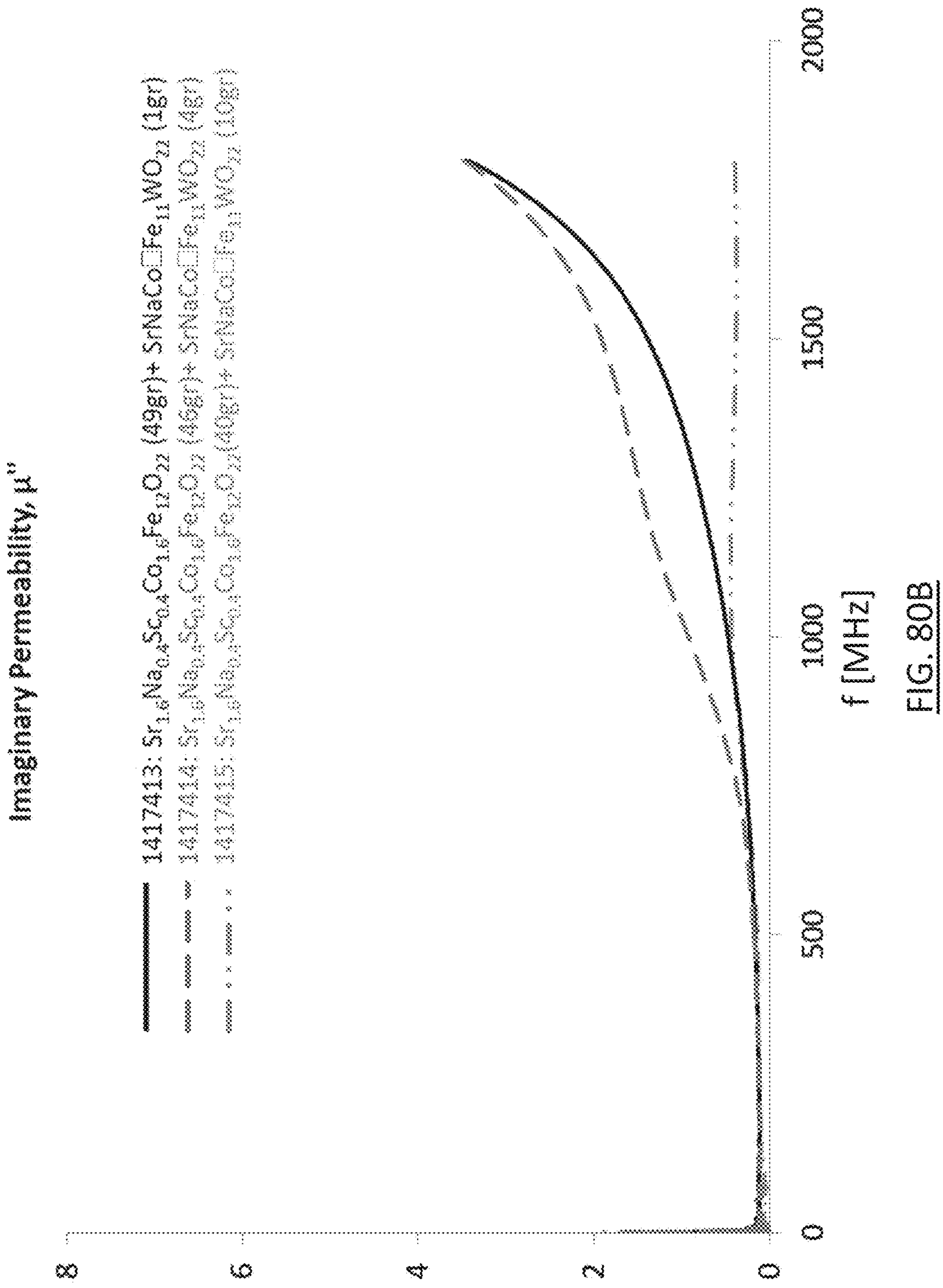
Figure 80C:
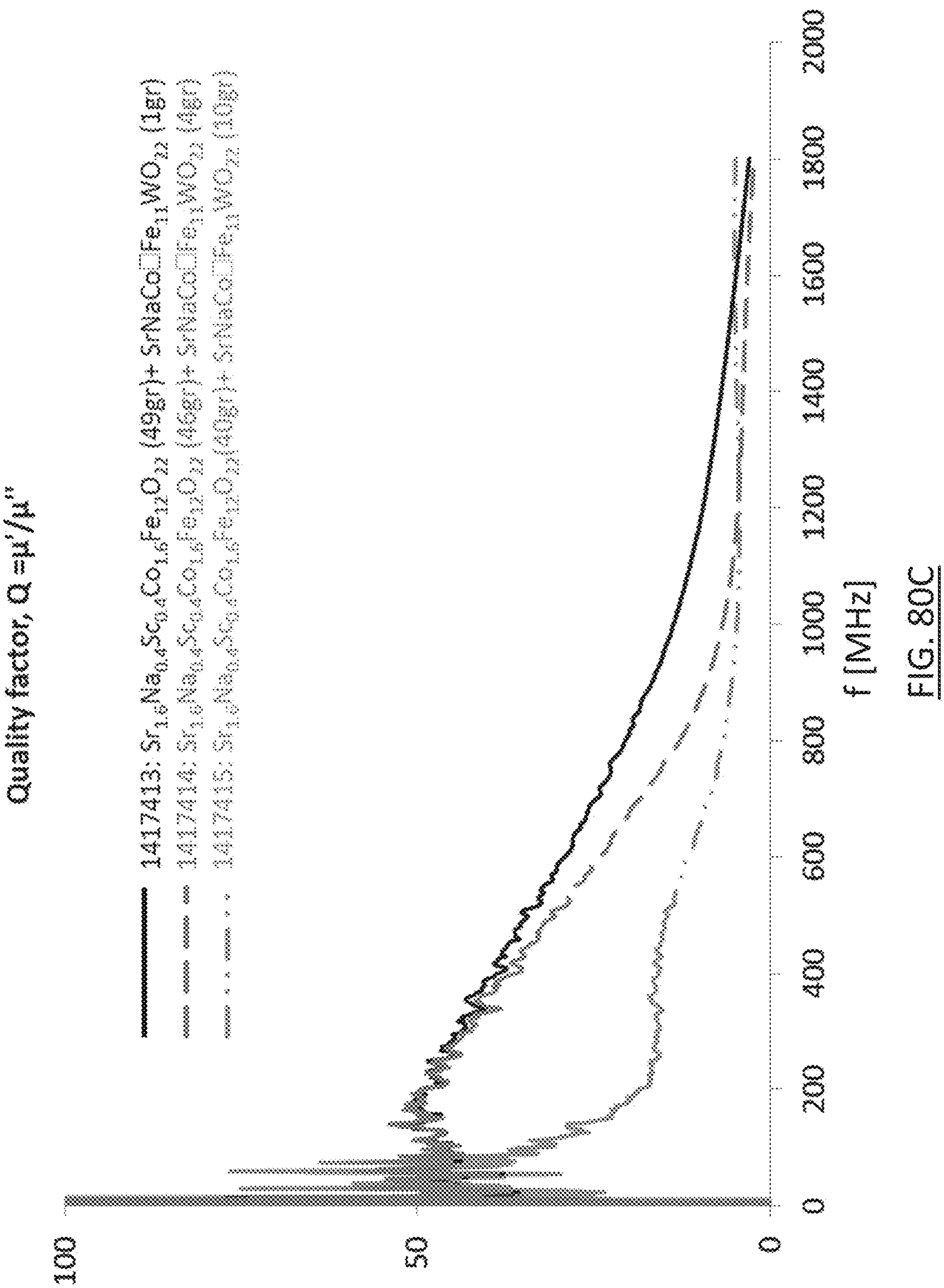
Figure 81A:
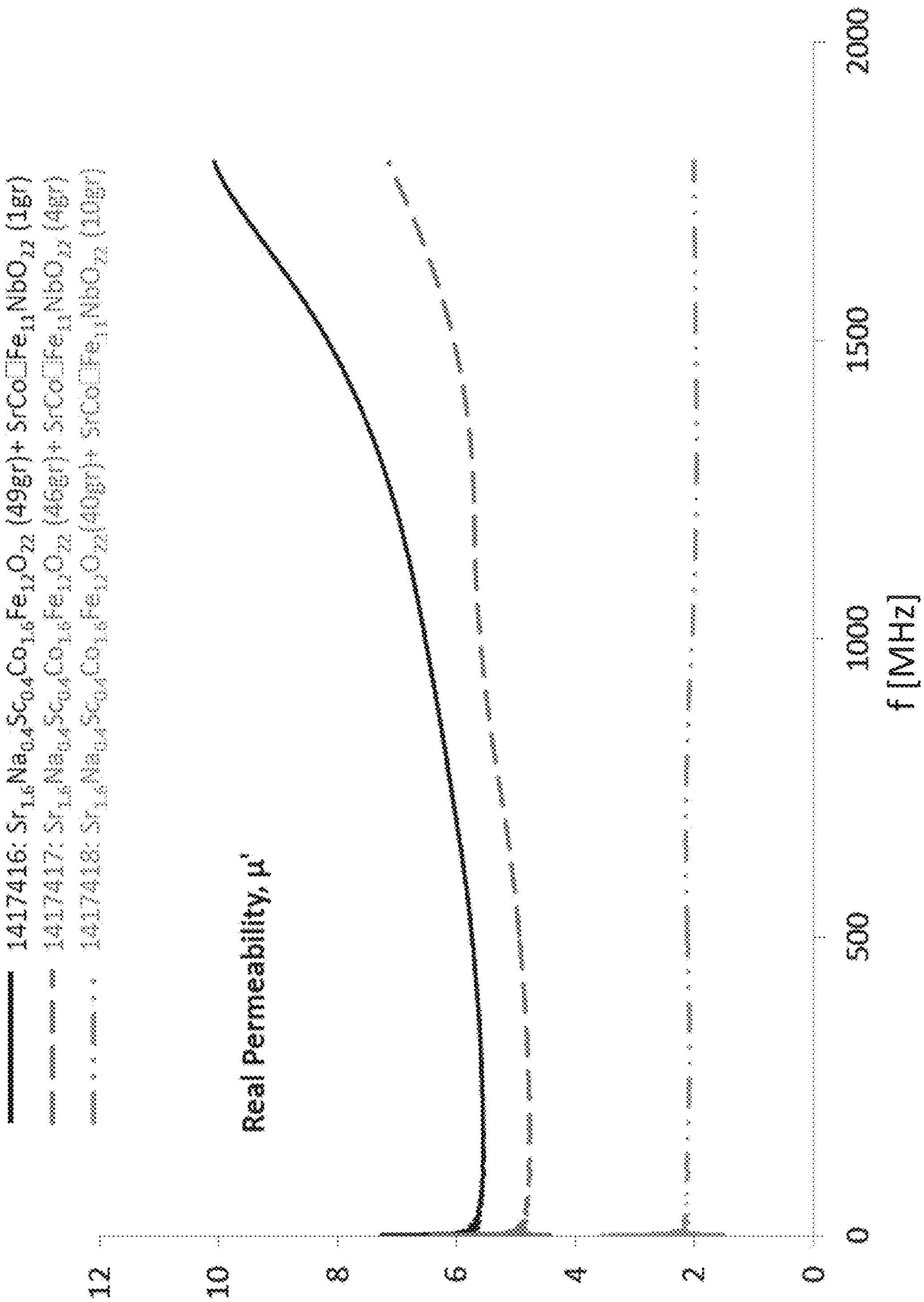
Figure 81B:
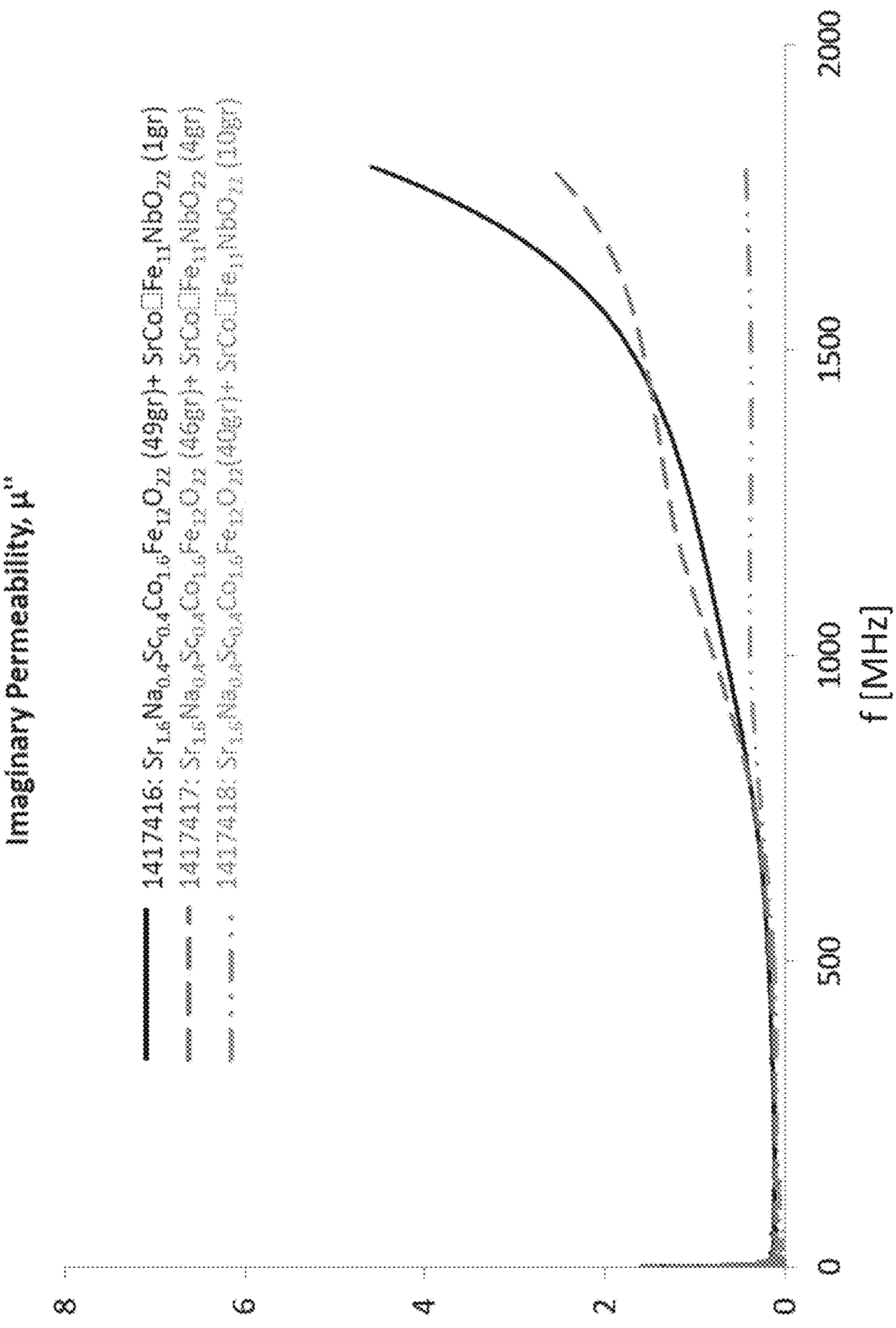
Figure 81C:
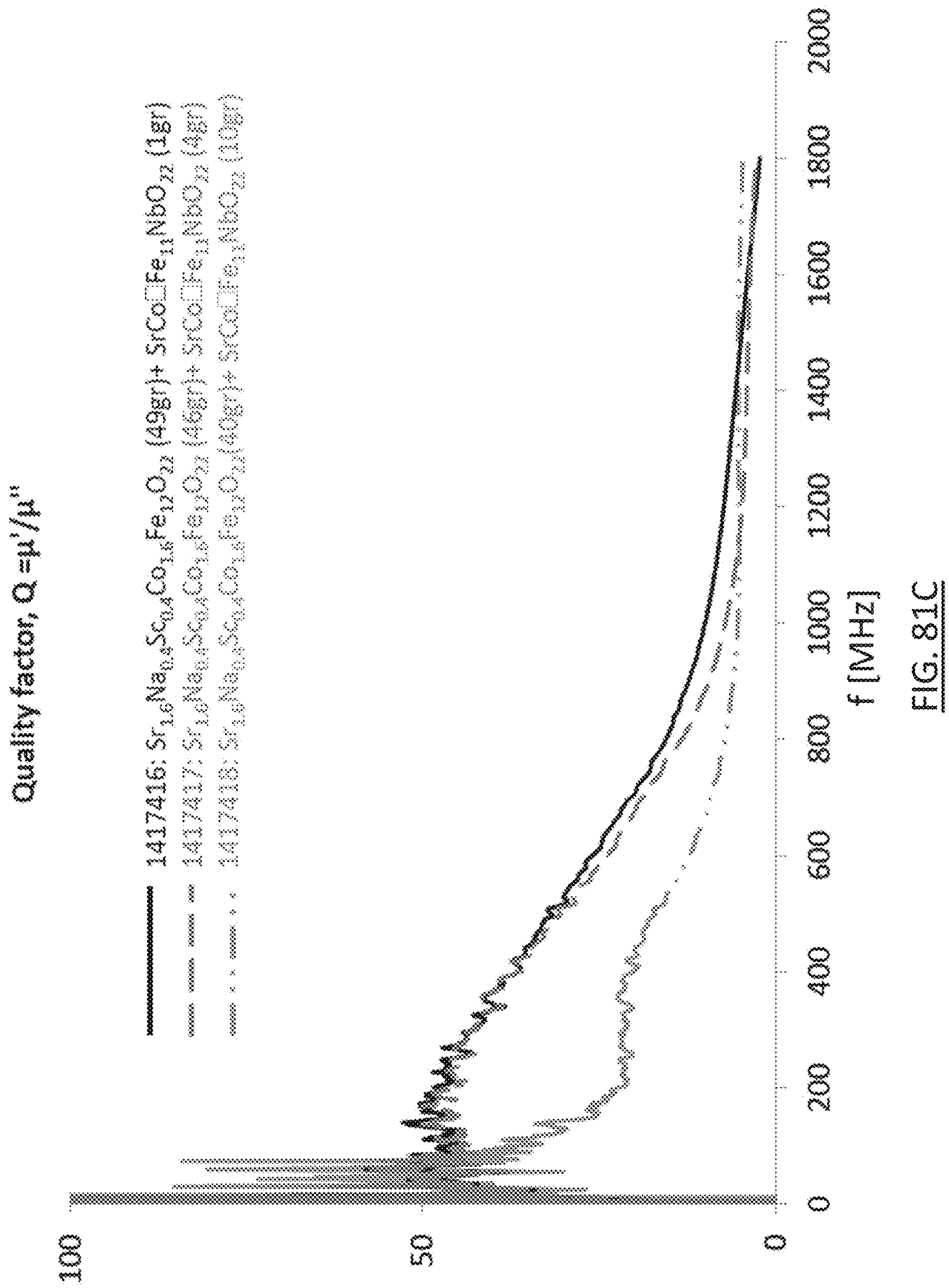
Figure 82A:
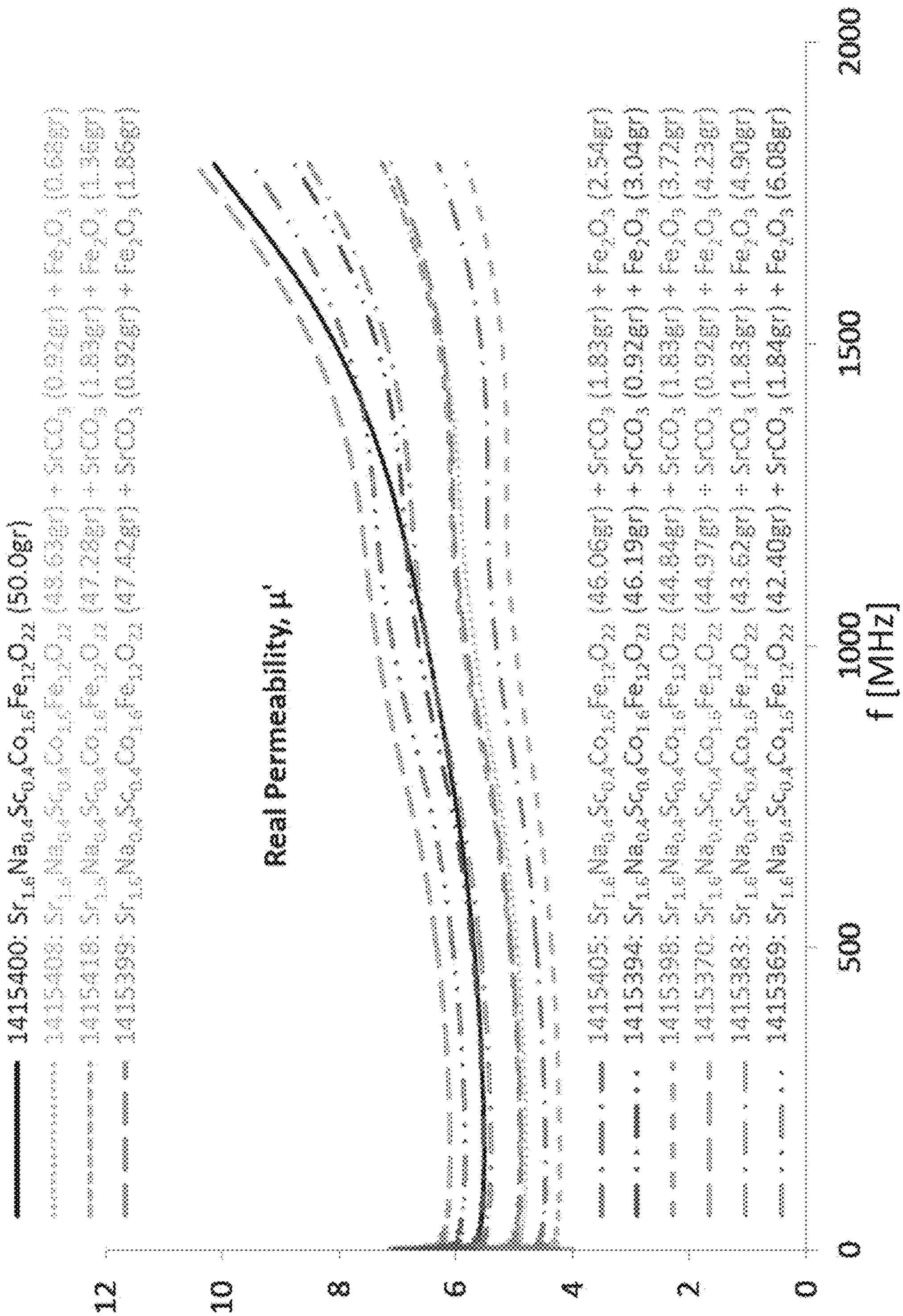
Figure 82B:
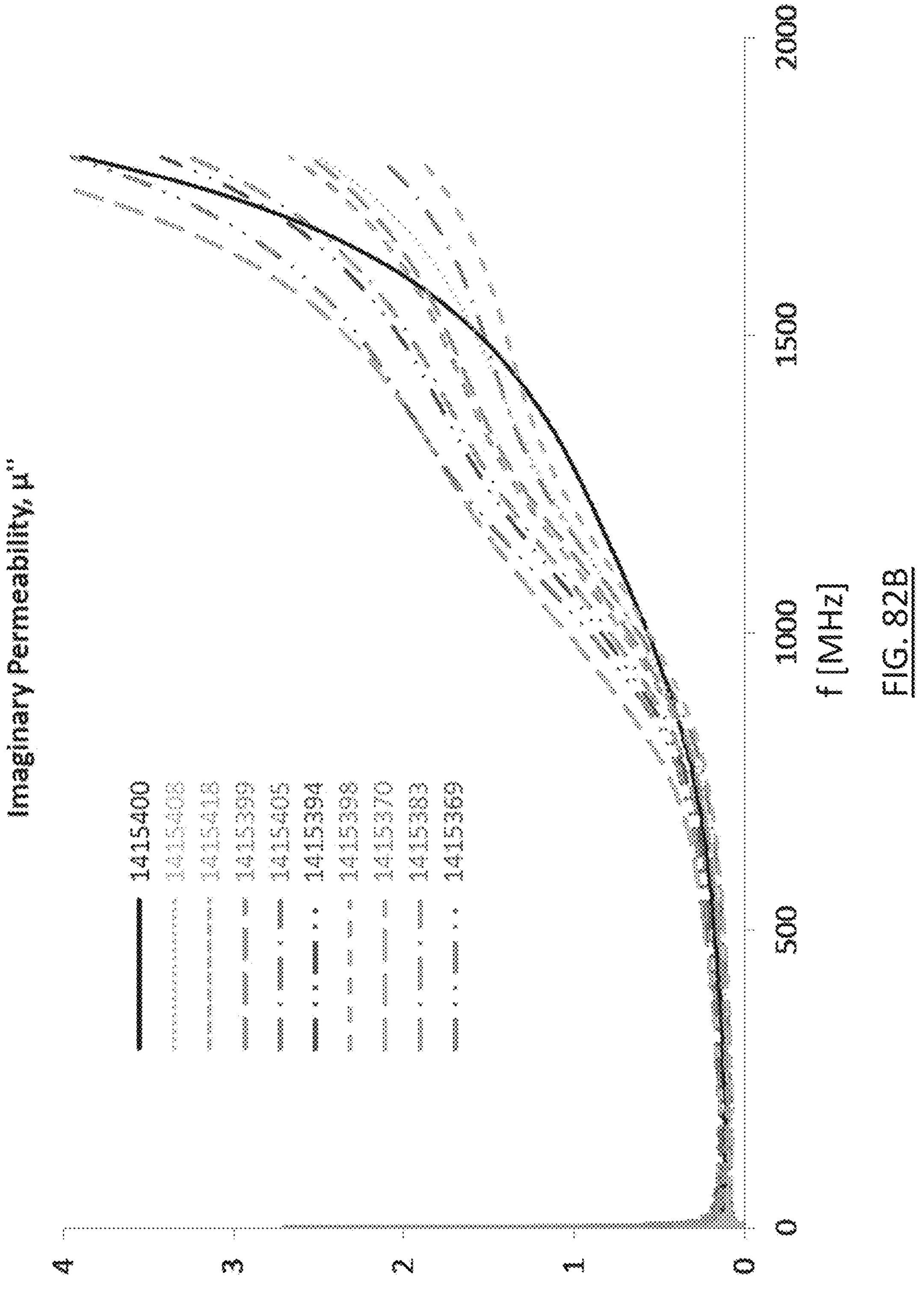
Figure 82C:
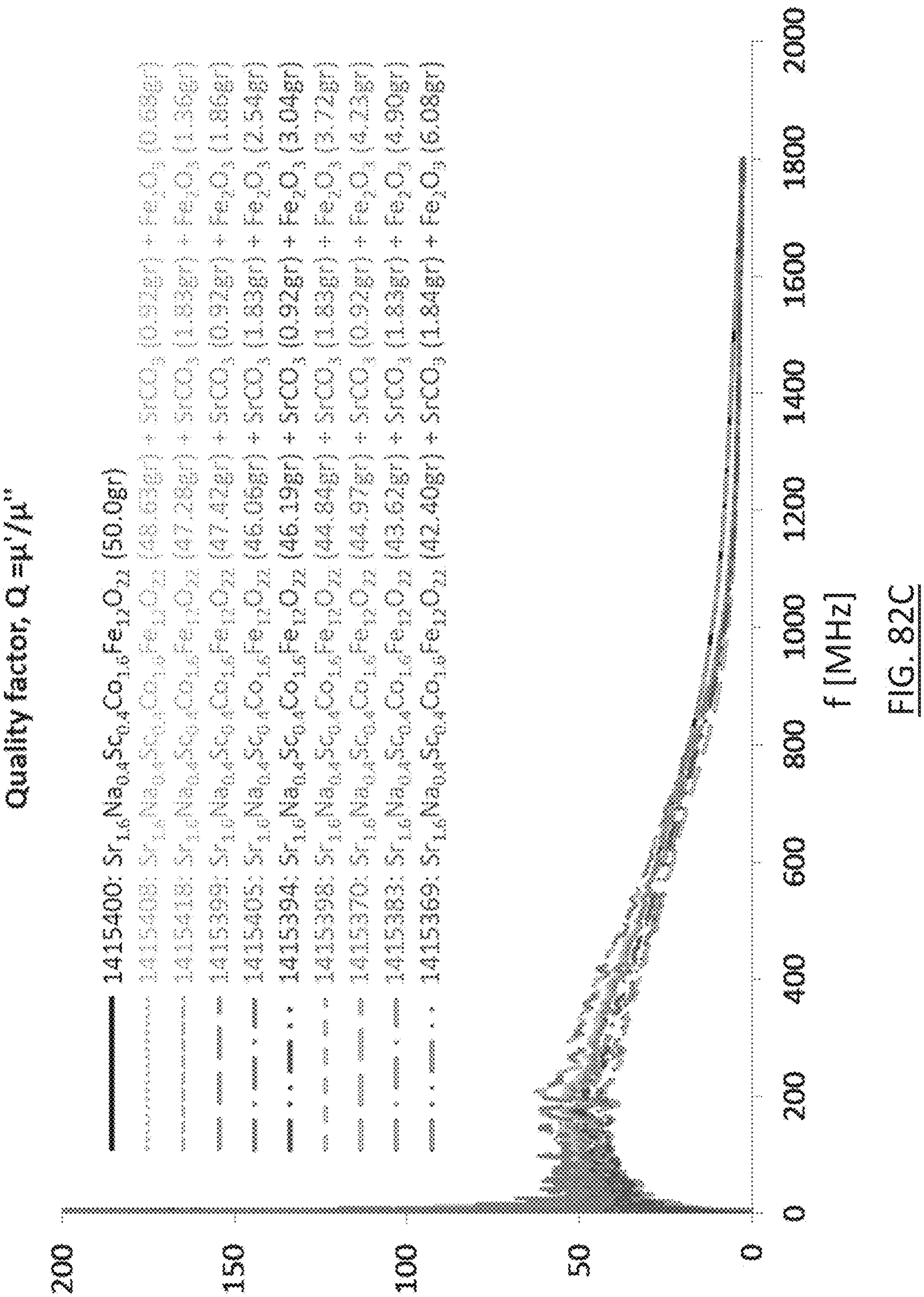
Figure 83A:
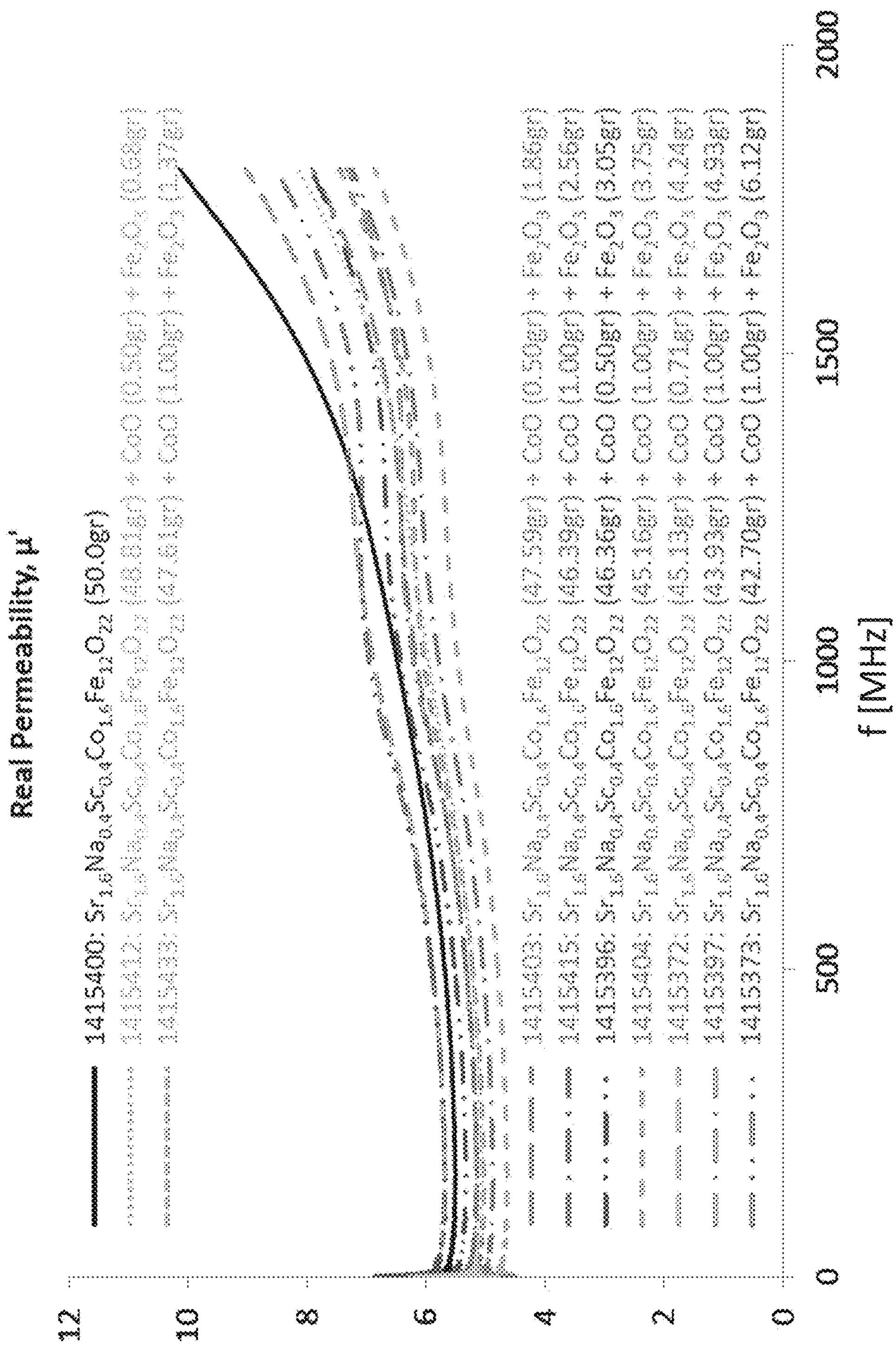
Figure 83B:
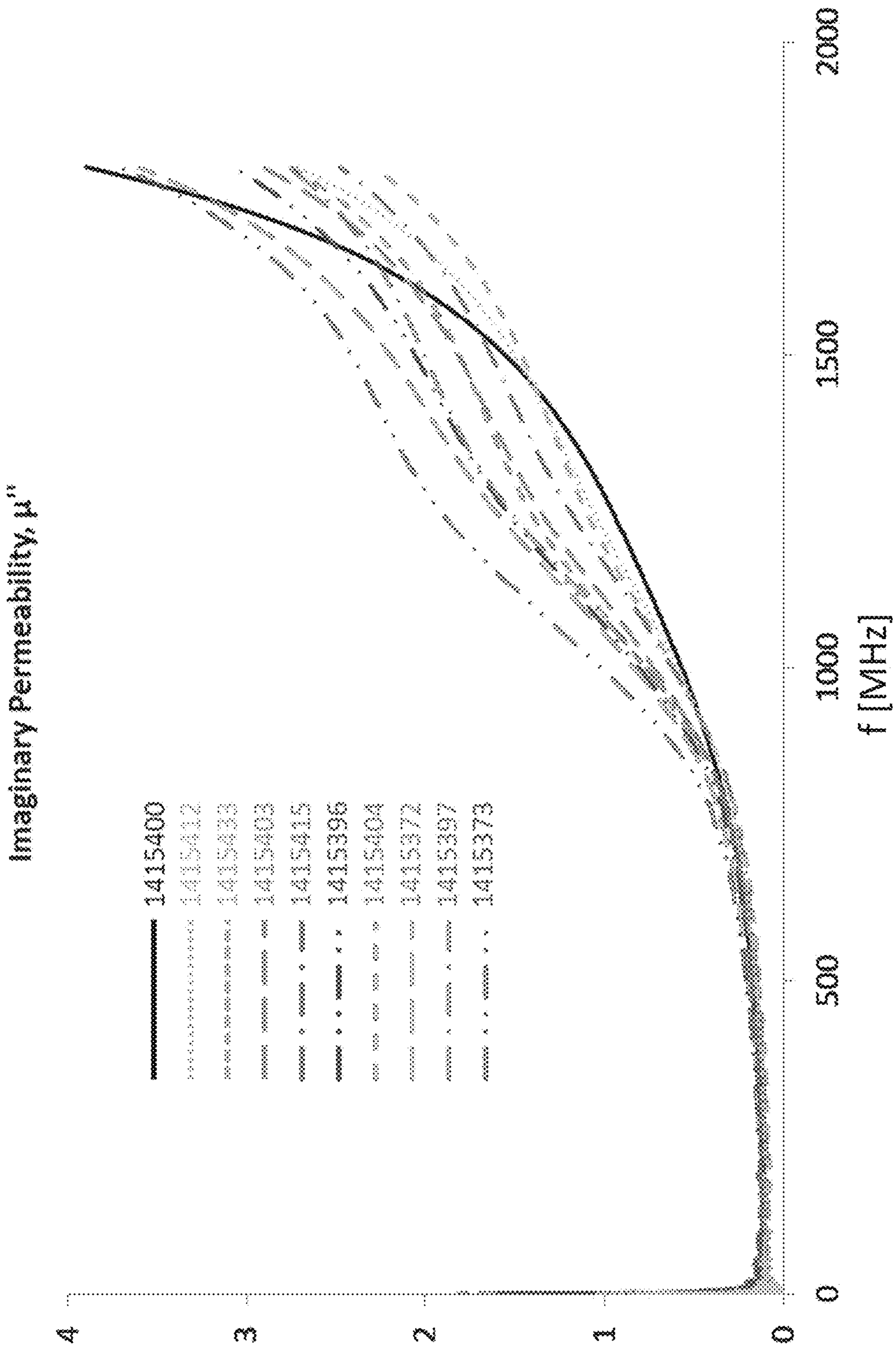
Figure 83C:
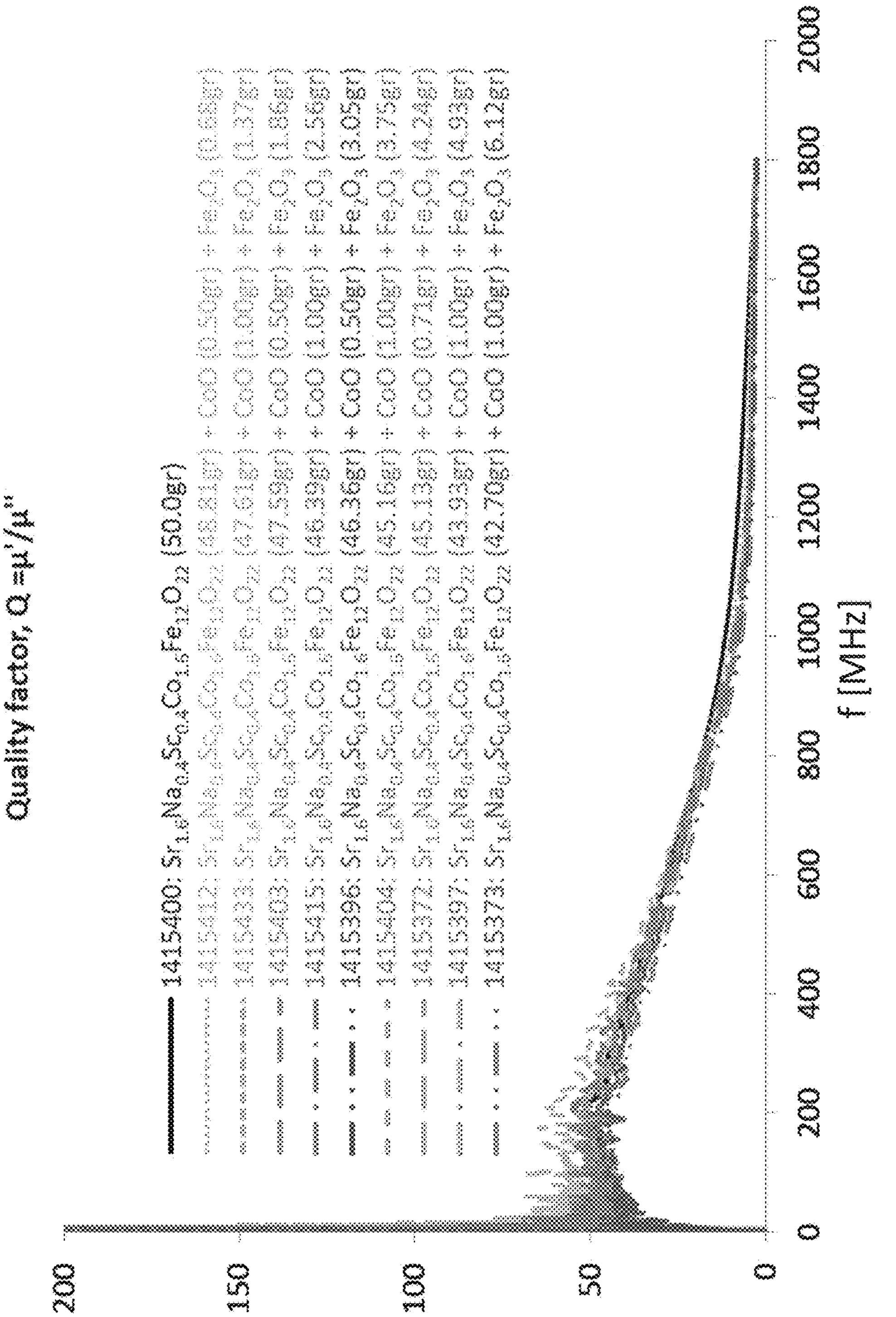
Figure 84A:
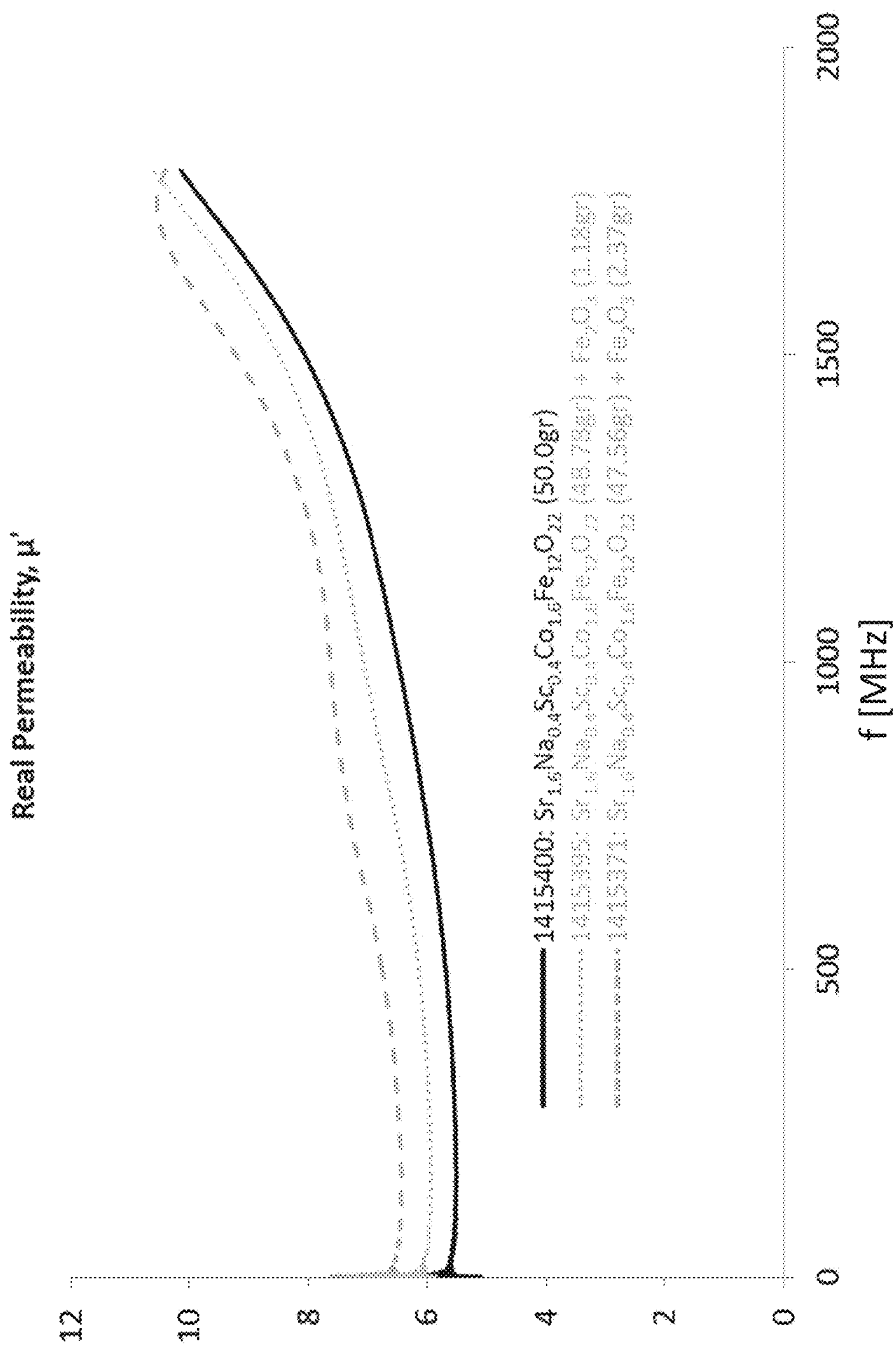
Figure 84B:
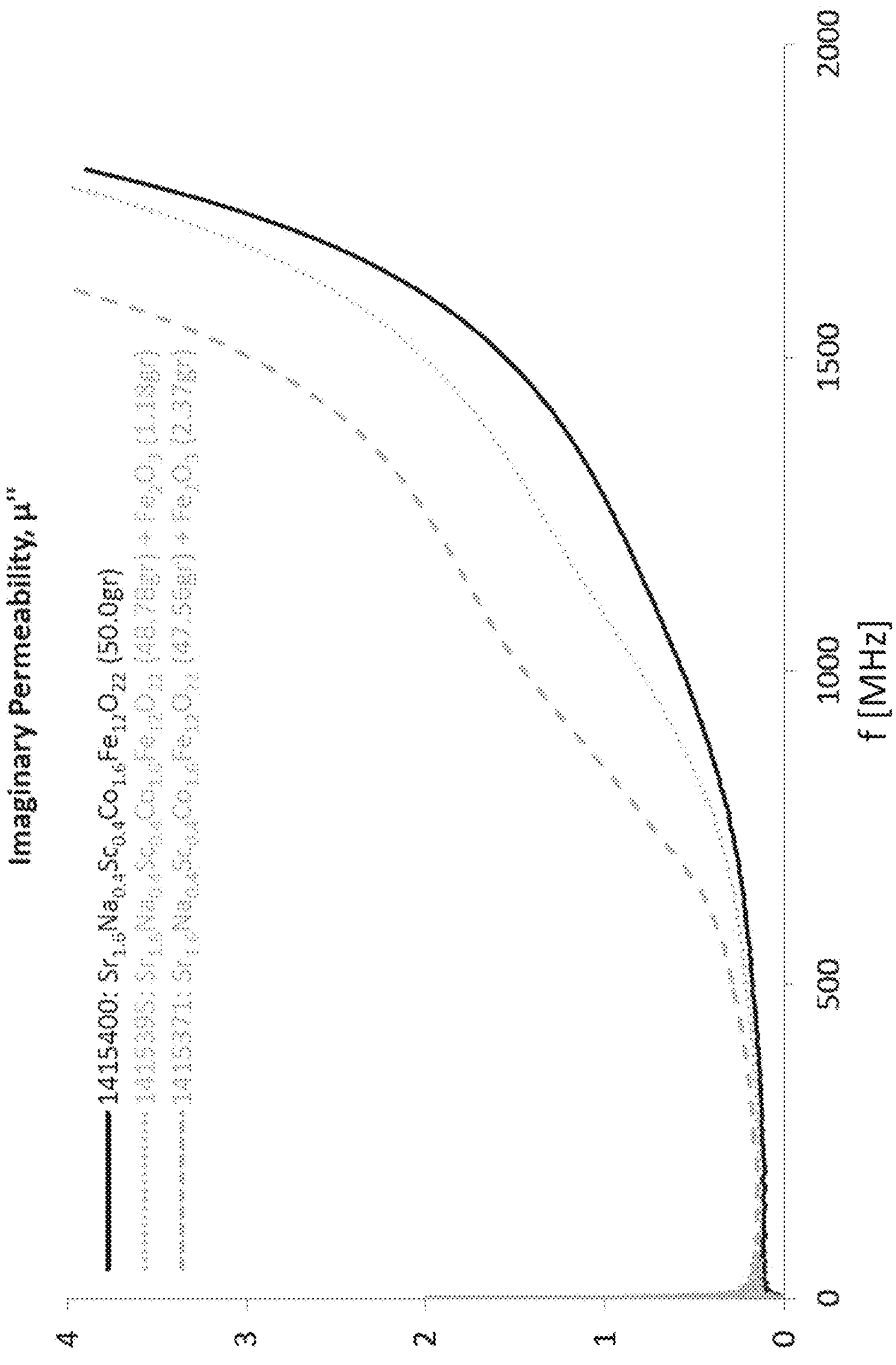
Figure 84C:
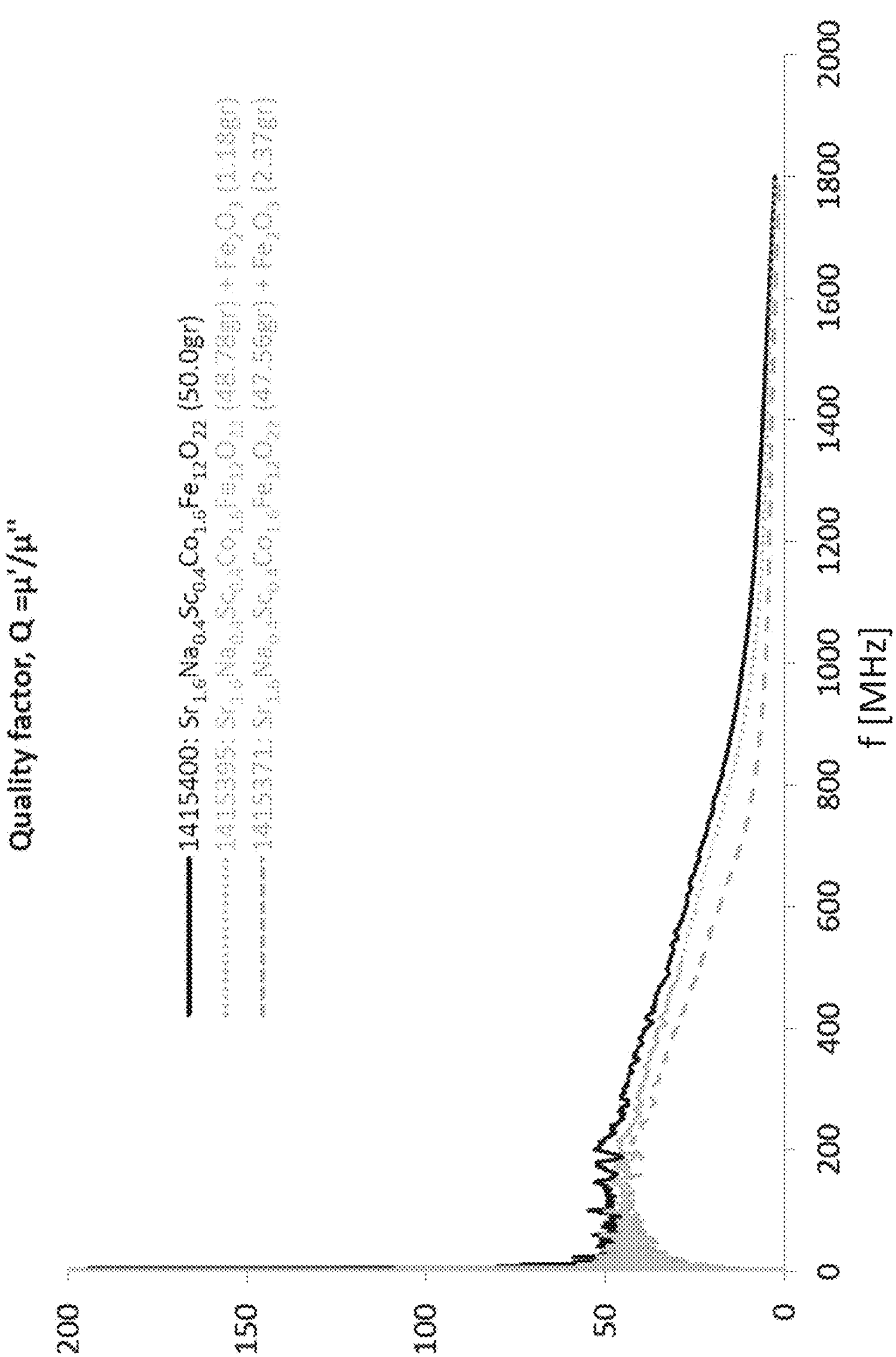
Figure 85A:
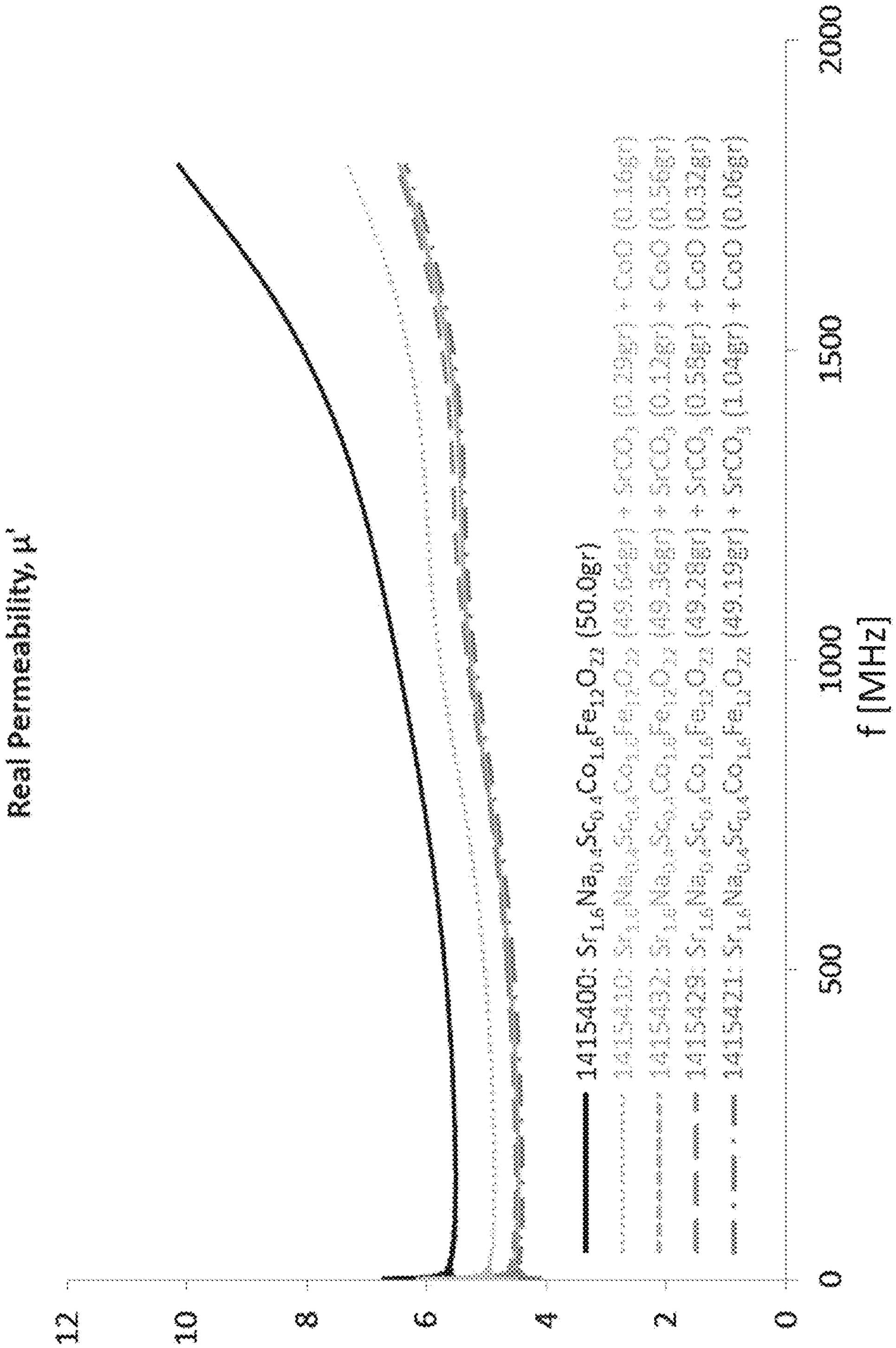
Figure 85B:
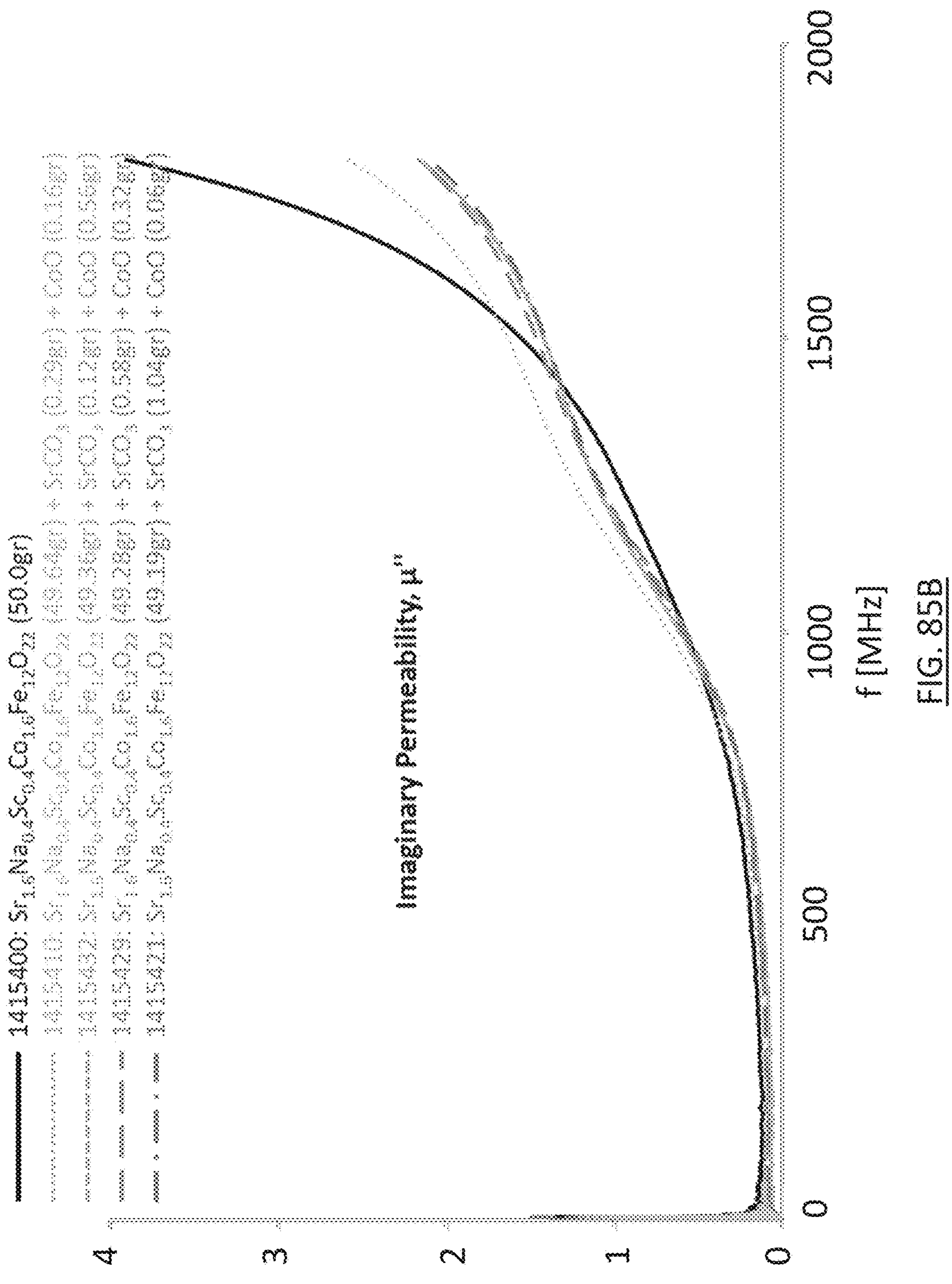
Figure 85C:
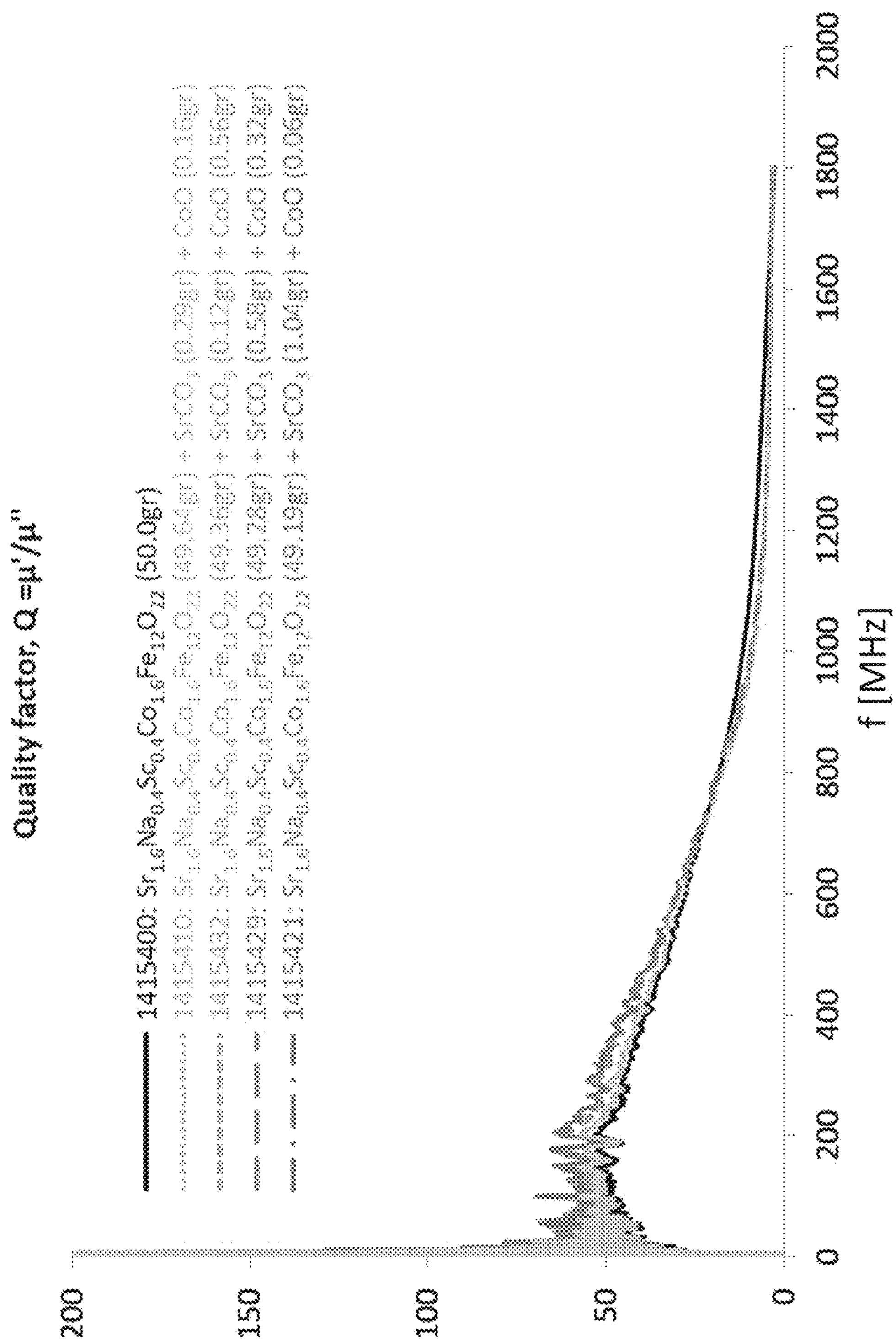
Figure 86A:
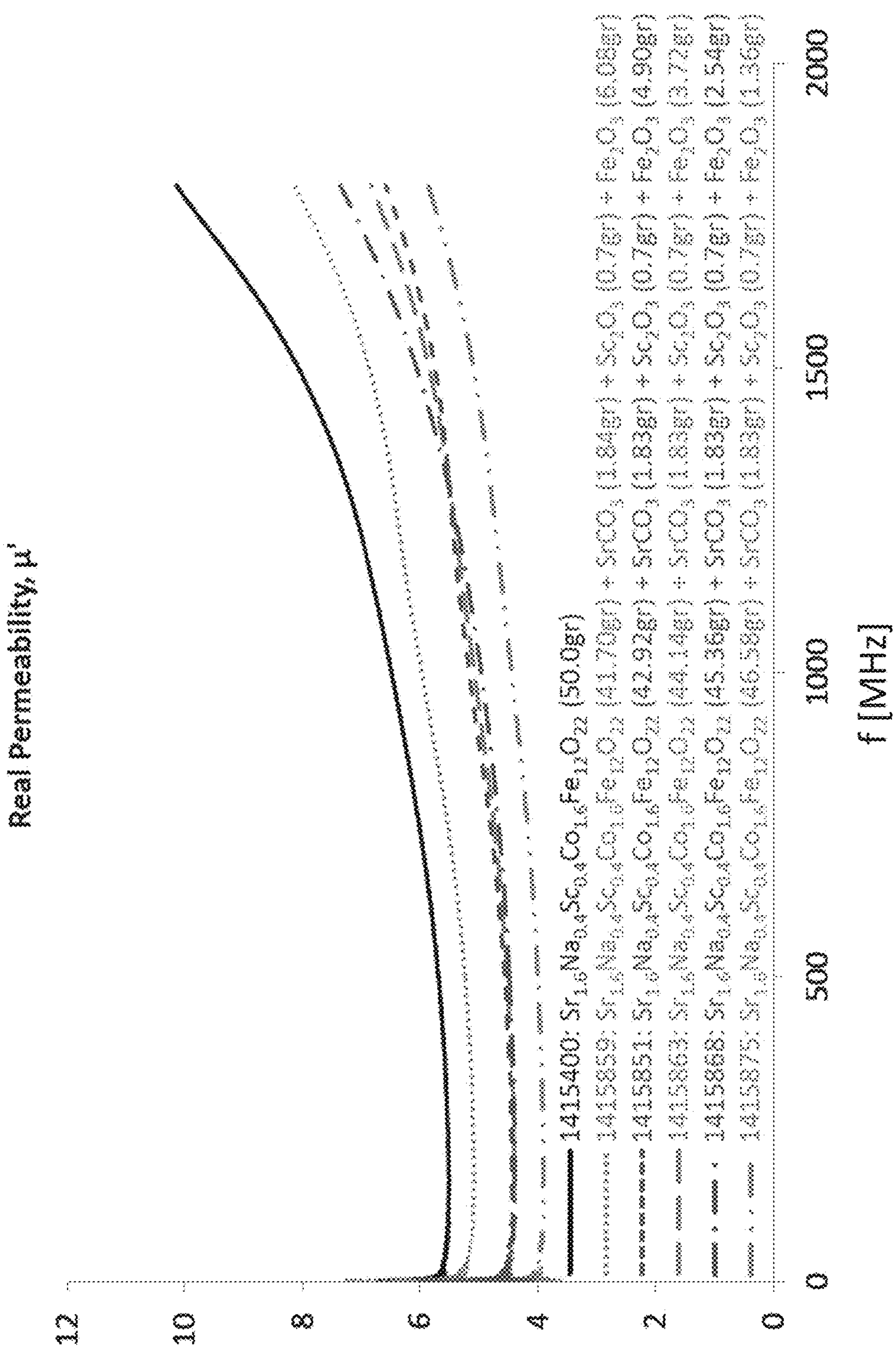
Figure 86B:
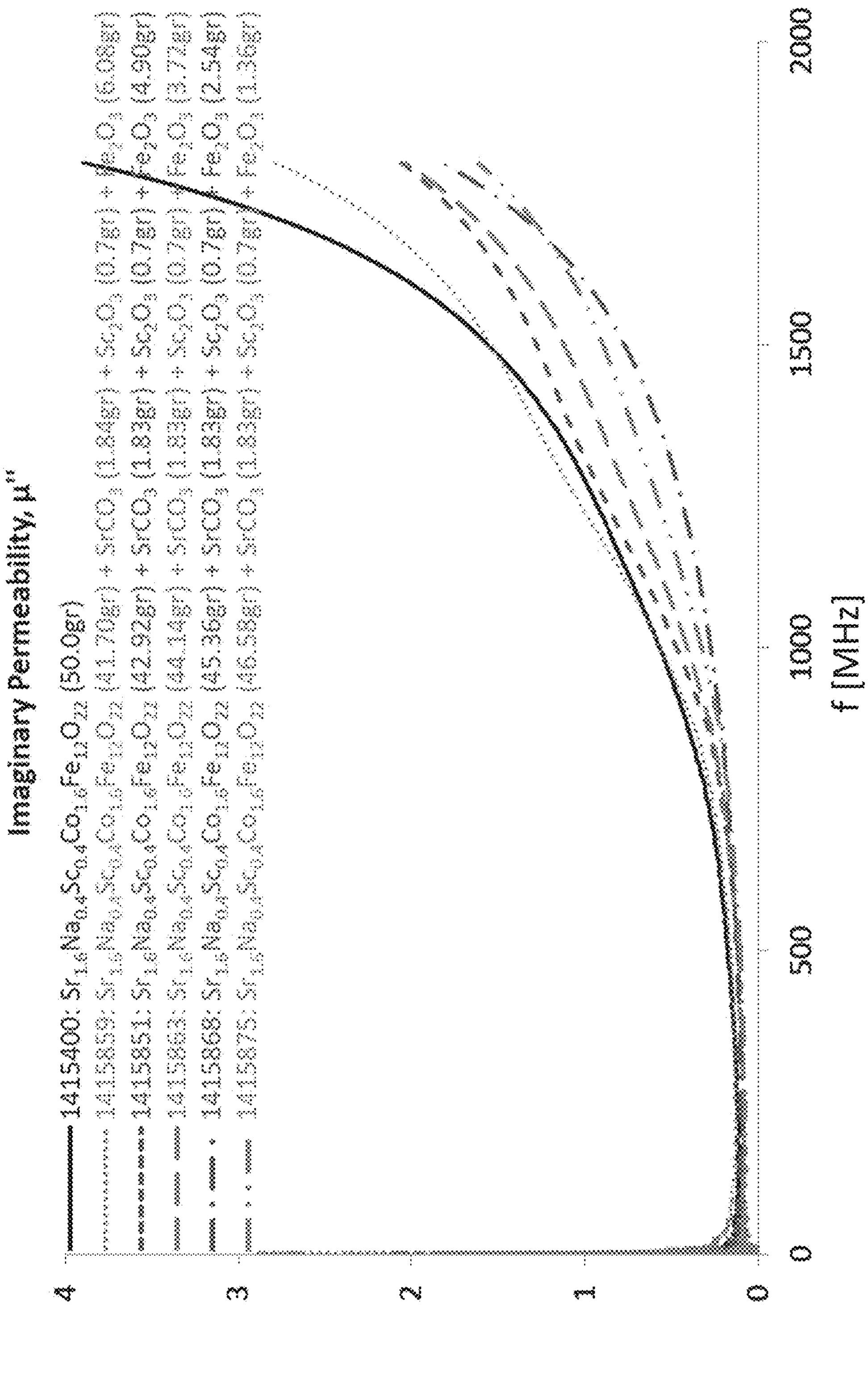
Figure 86C:
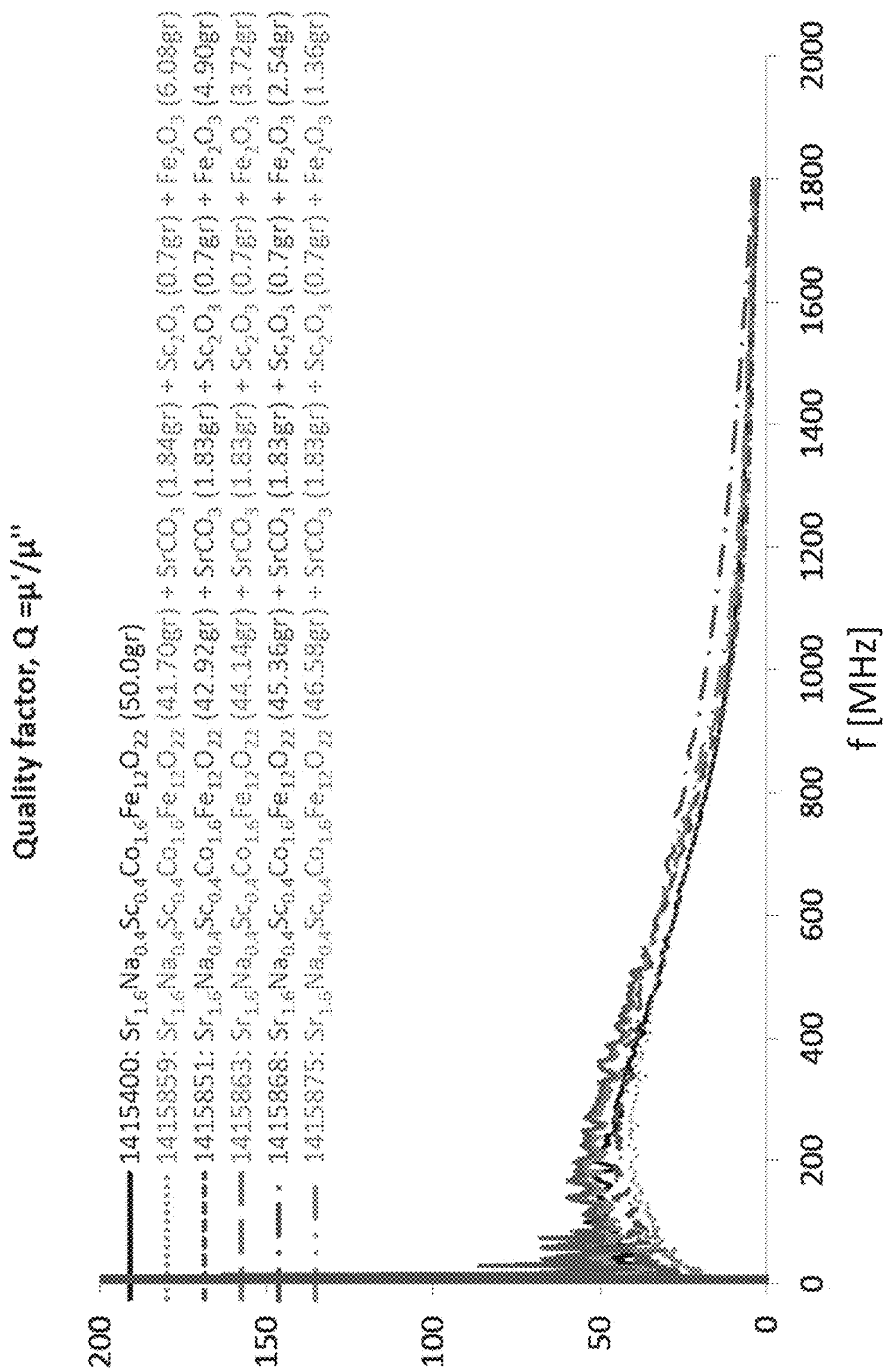
Figure 87A:
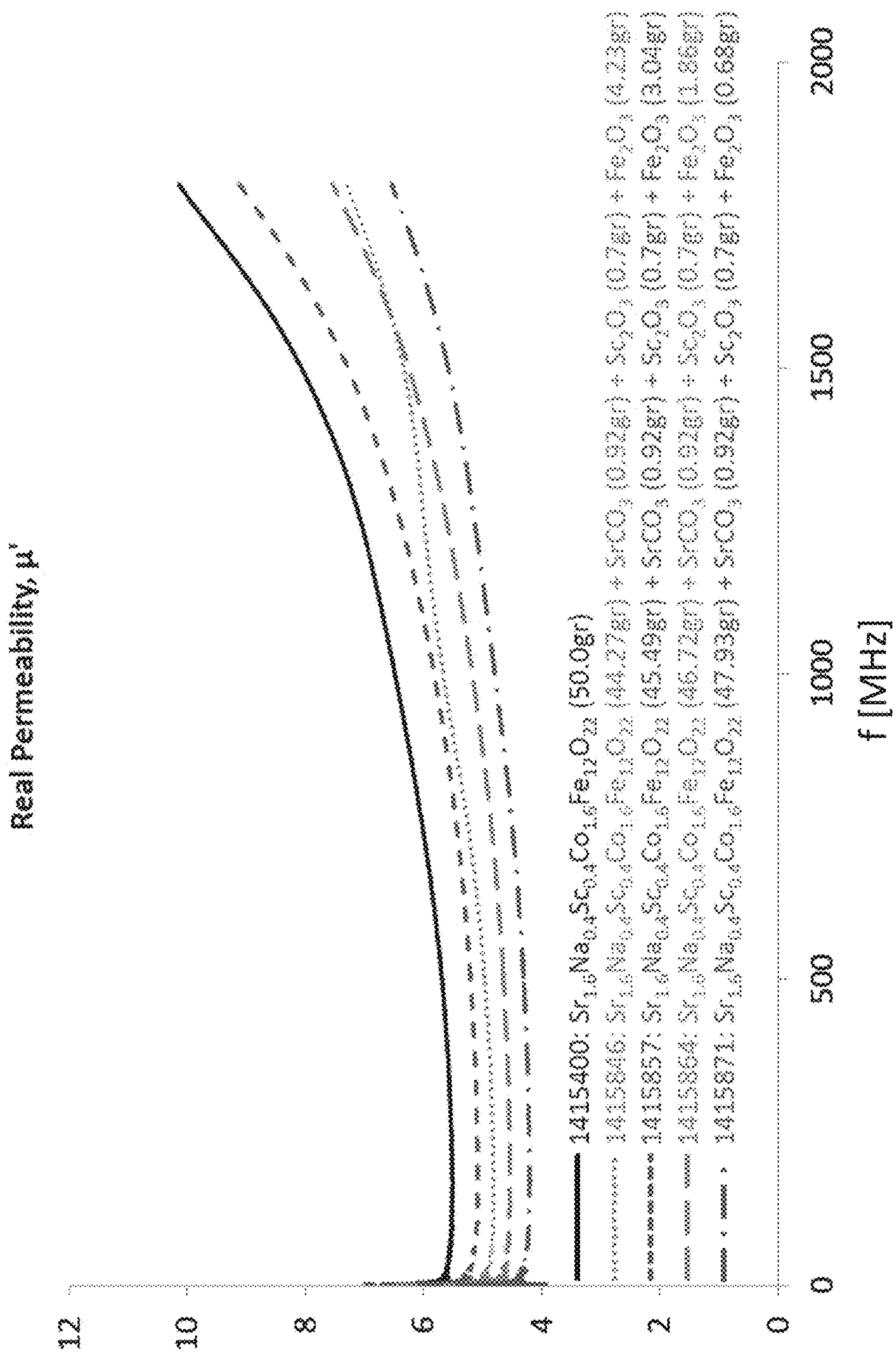
Figure 87B:
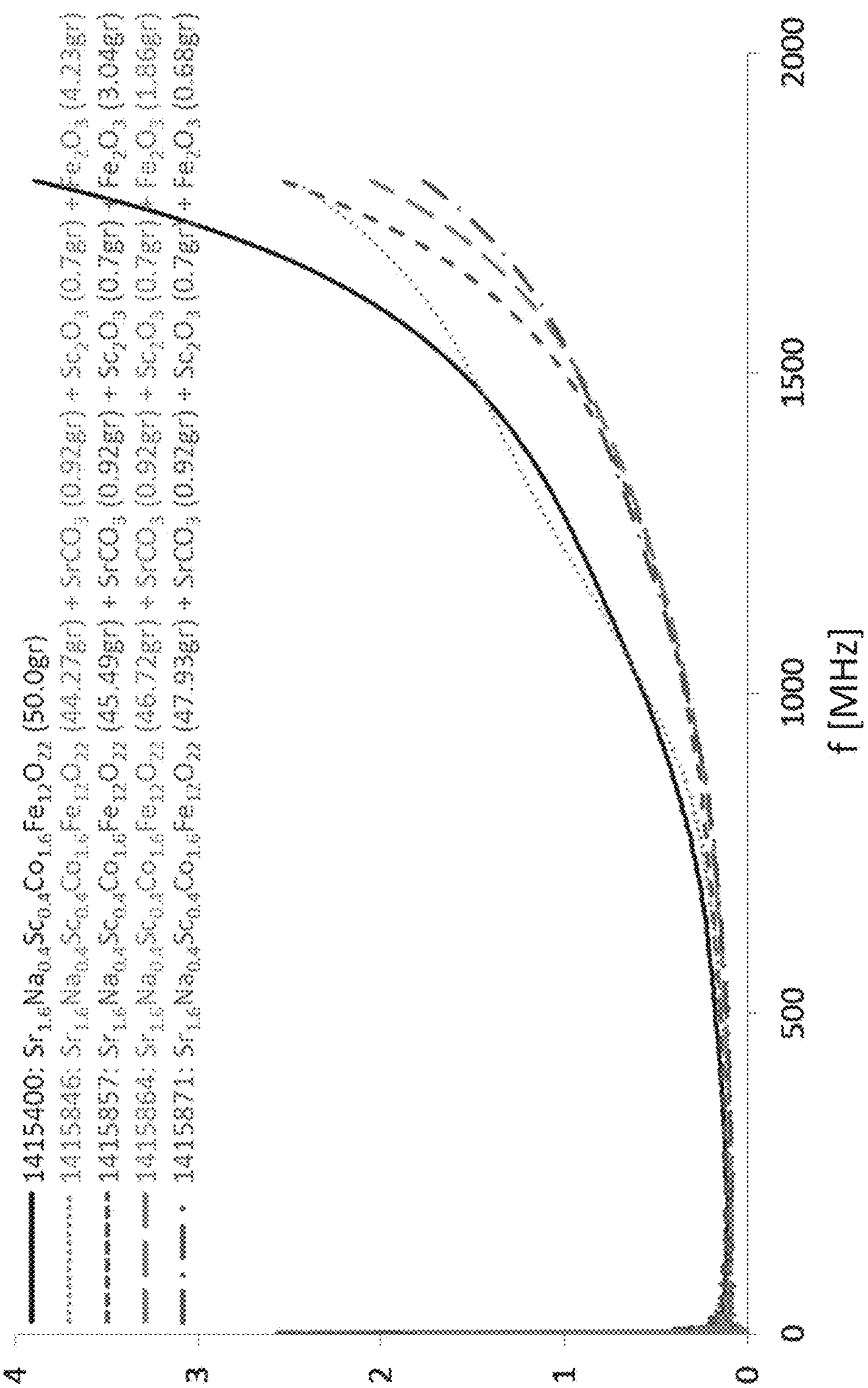
Figure 87C:
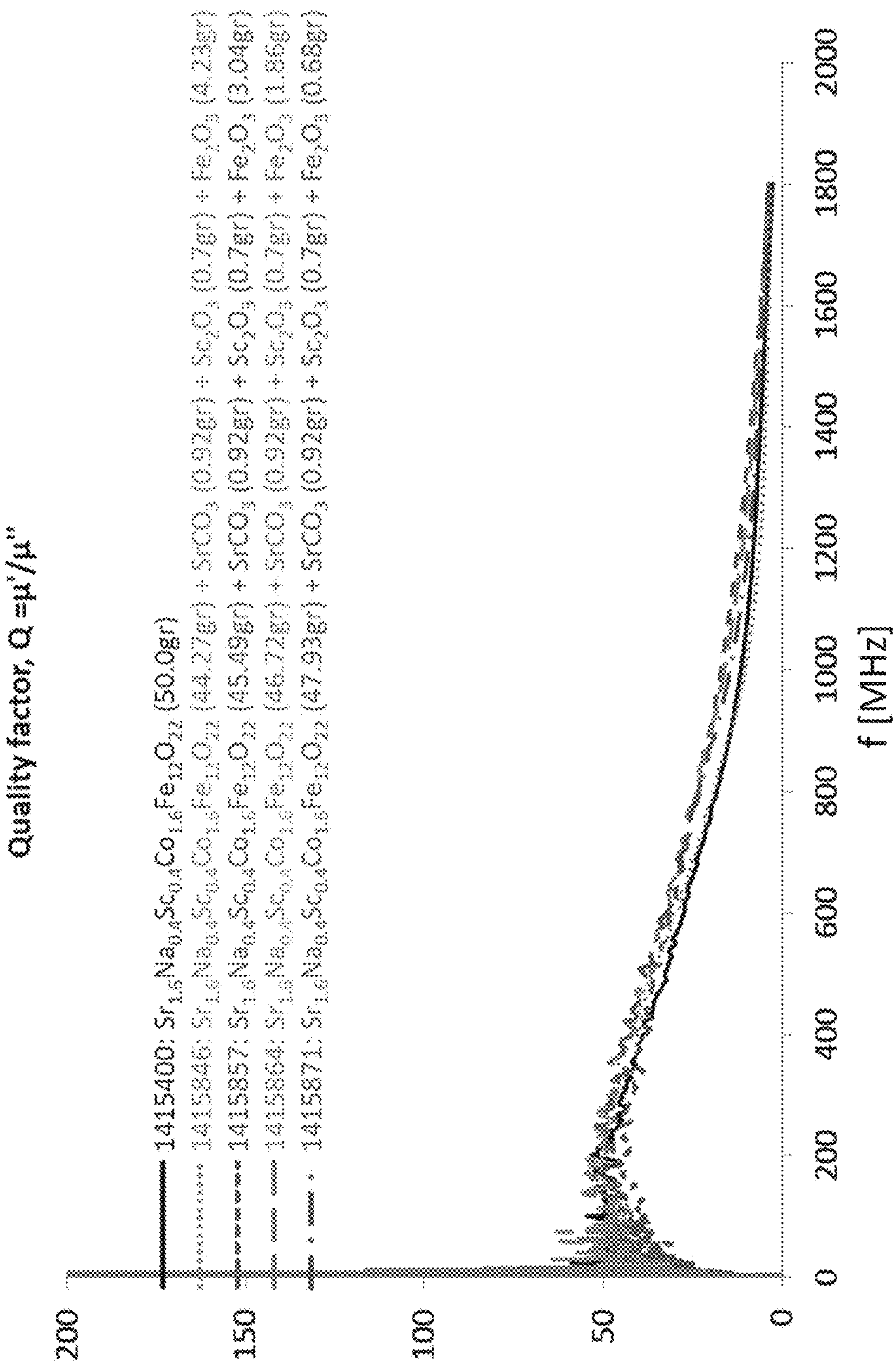
Figure 88A:
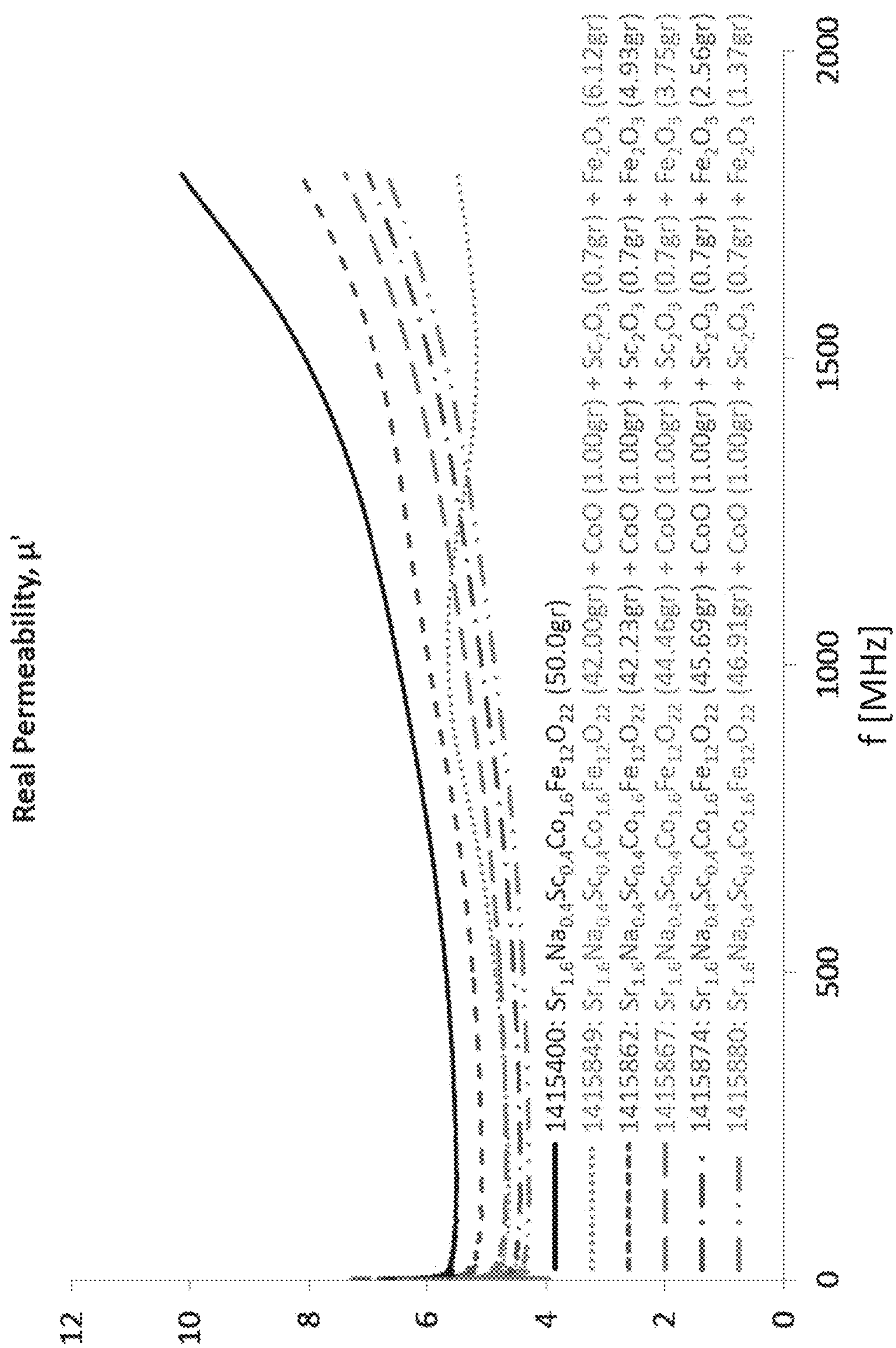
Figure 88B:
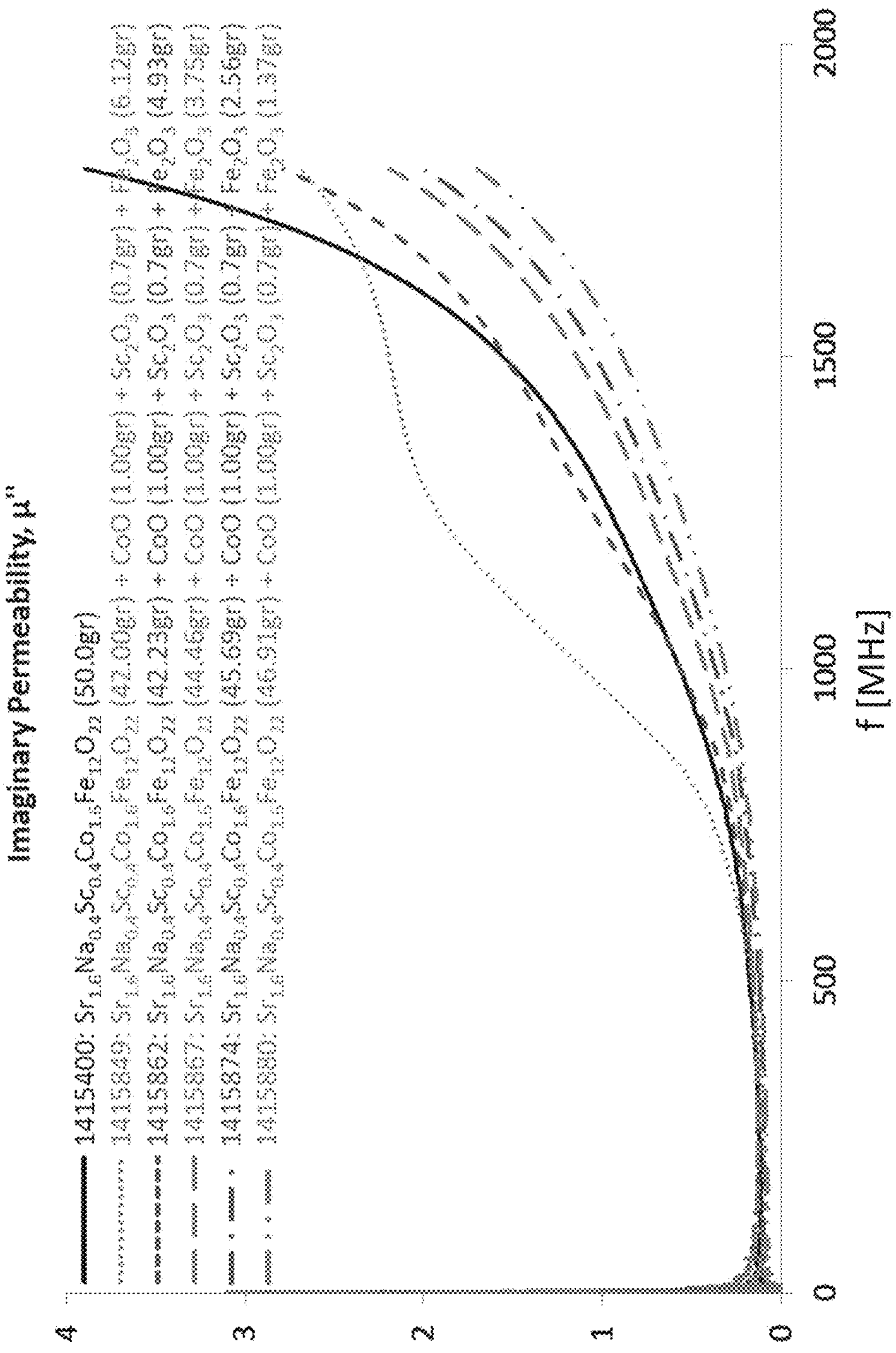
Figure 88C:
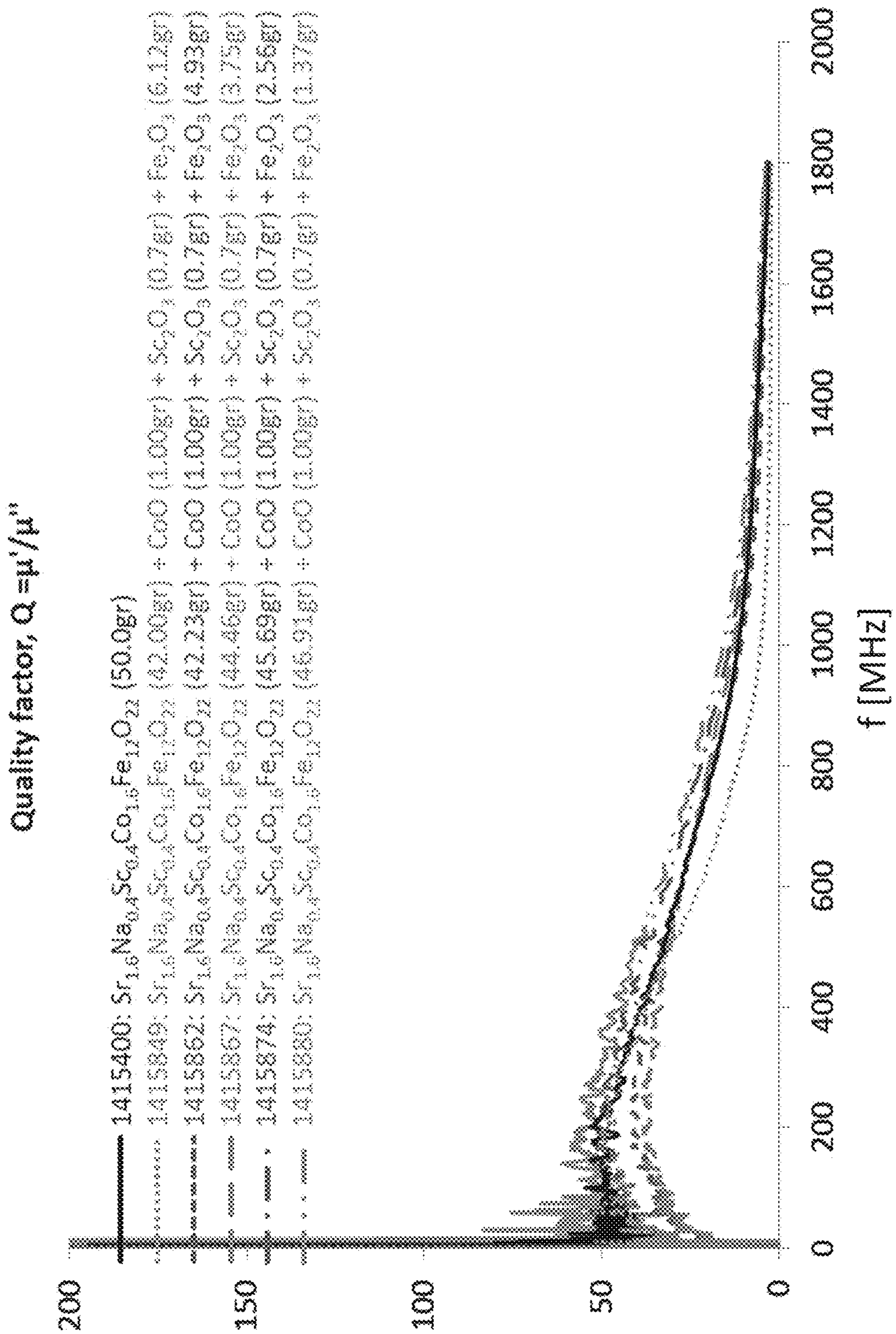
Figure 89A:
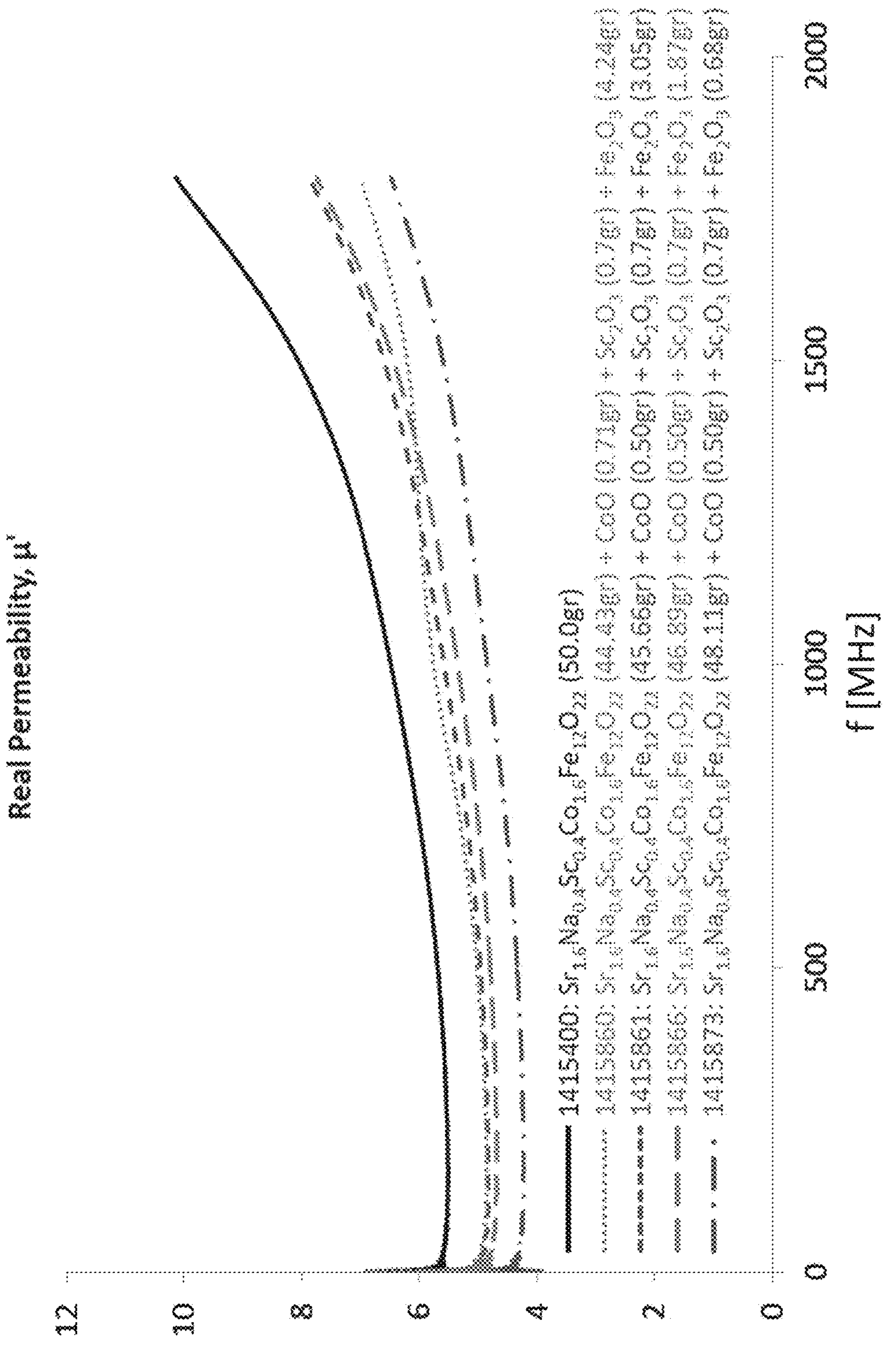
Figure 89B:
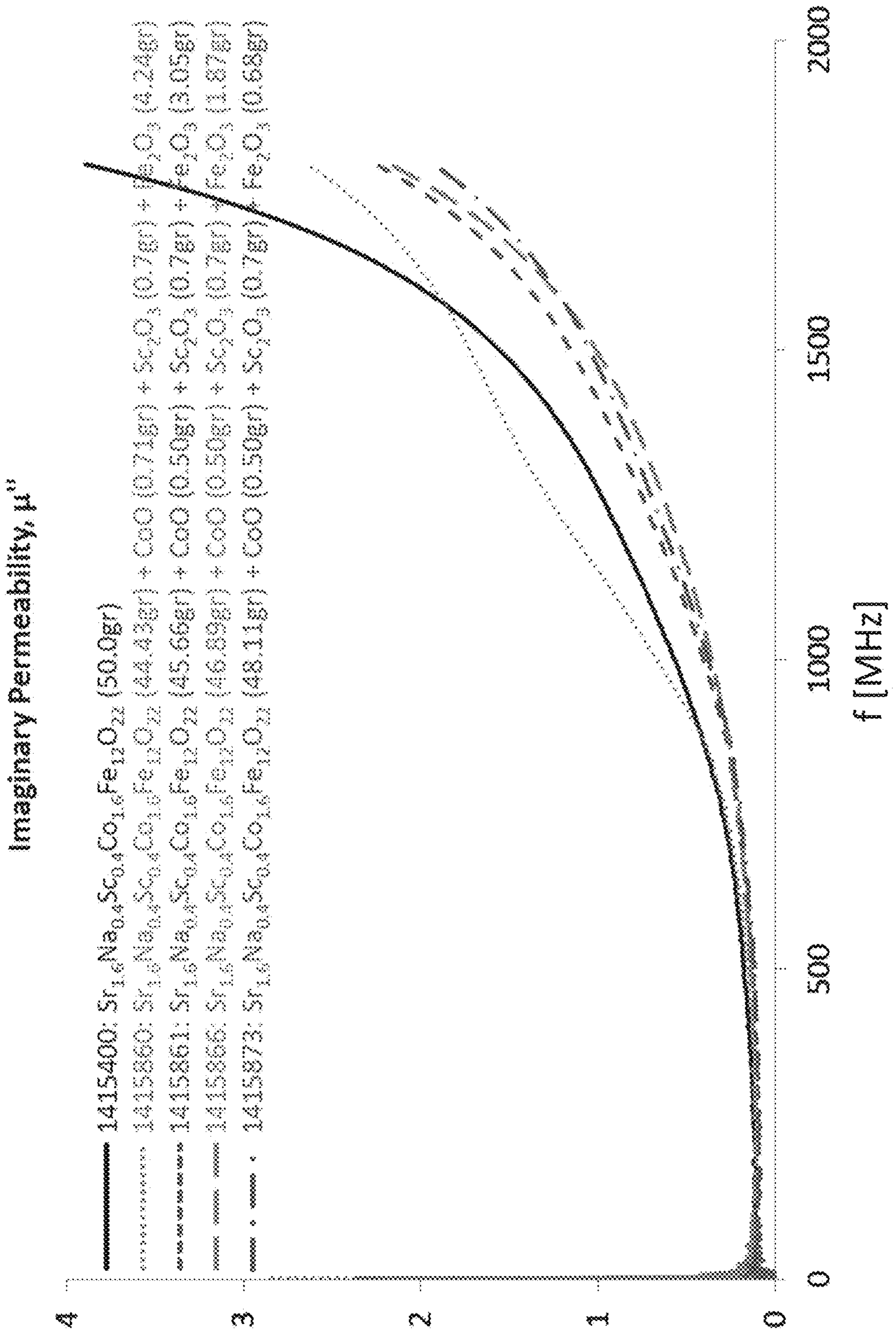
Figure 89C:
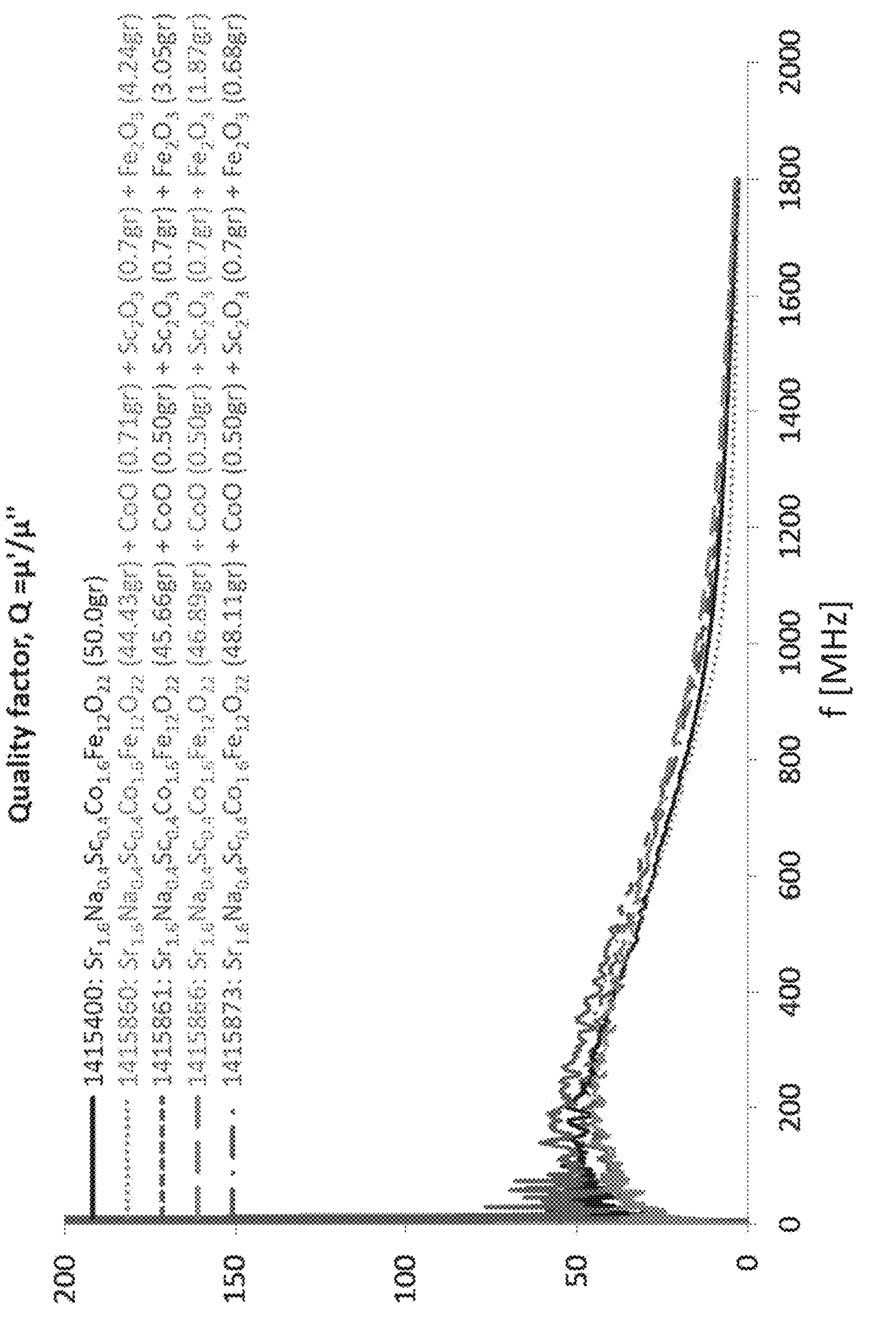
Figure 90A:
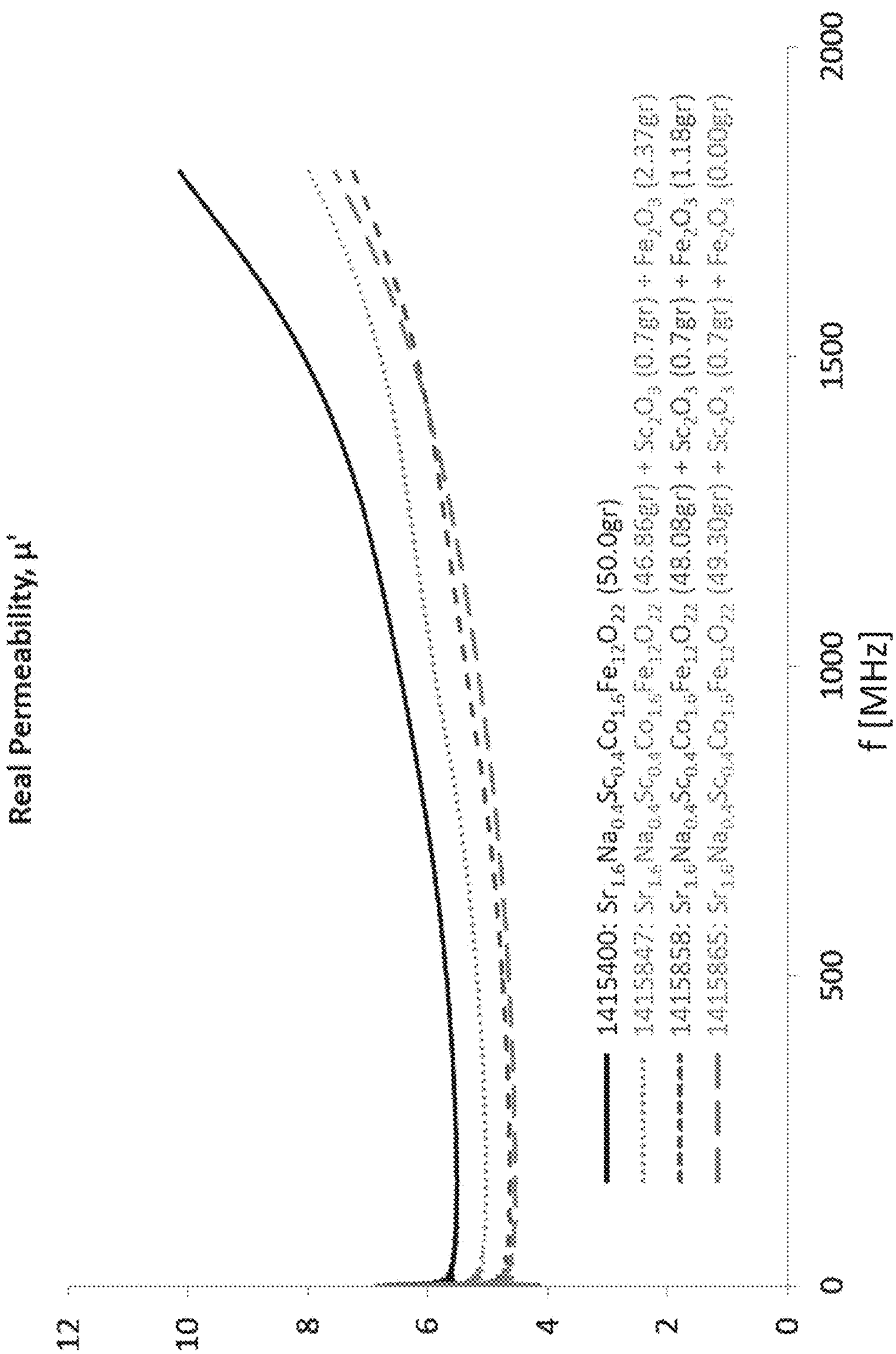
Figure 90B:
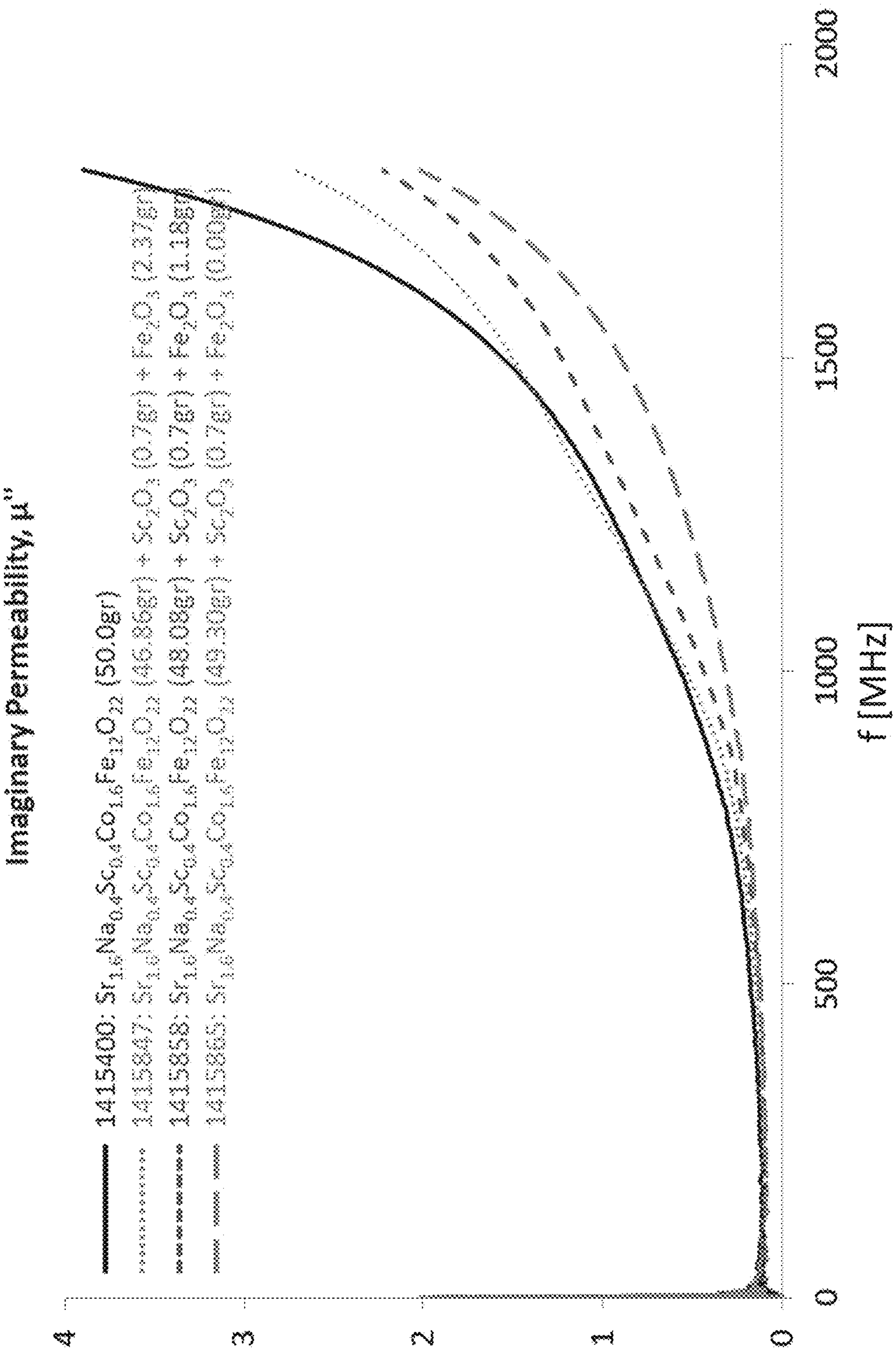
Figure 90C:
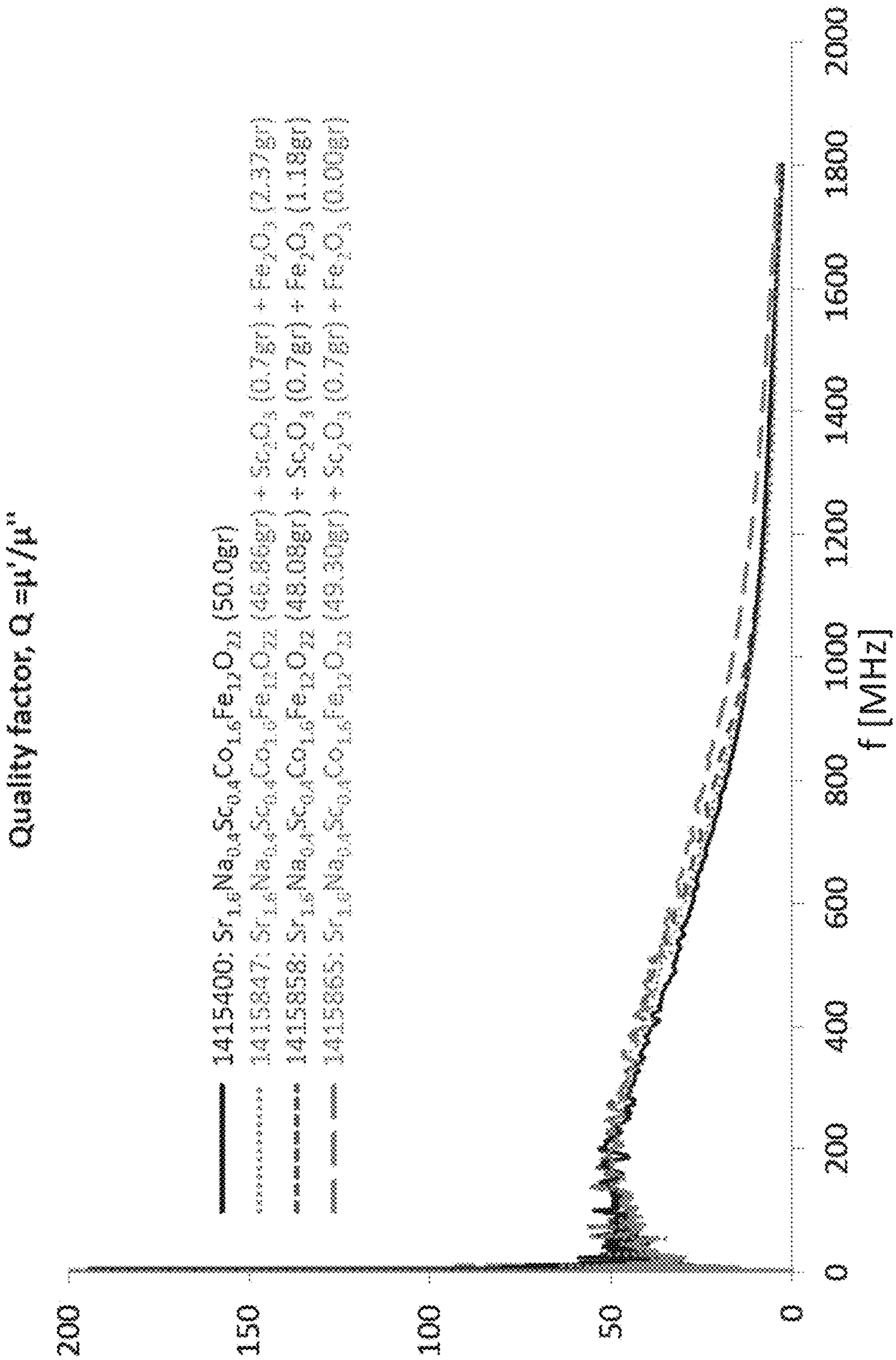
Figure 91A:
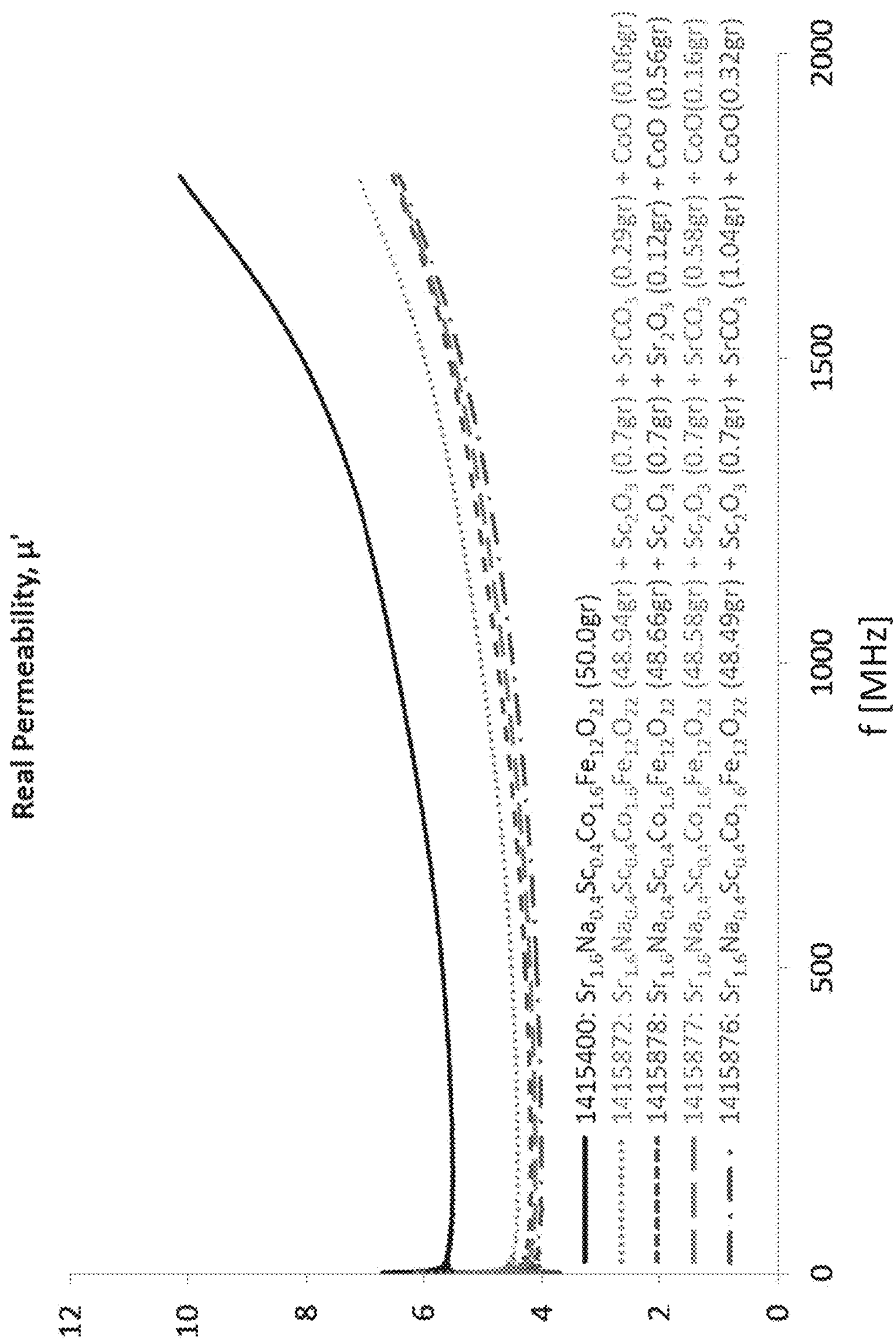
Figure 91B:
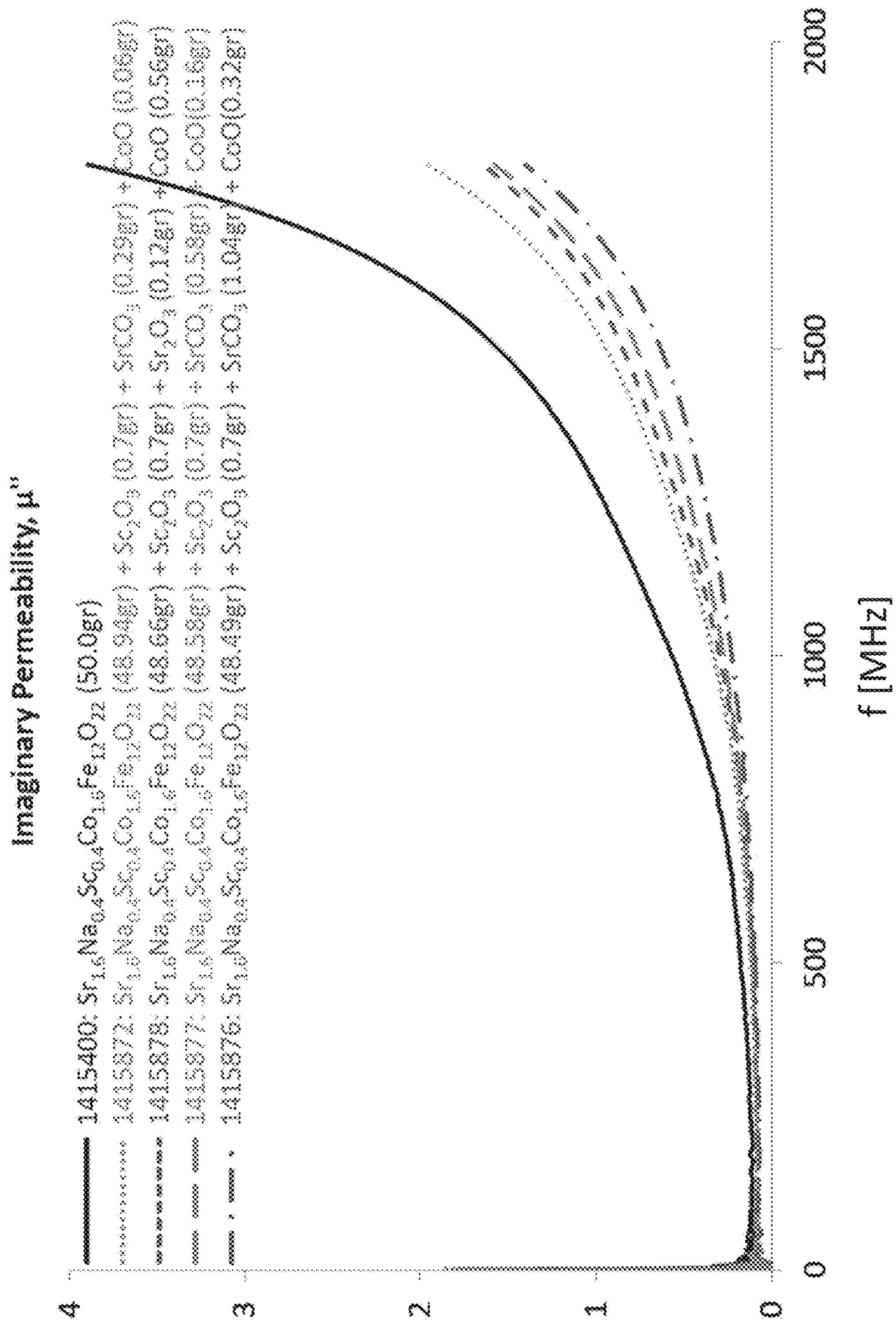
Figure 91C:
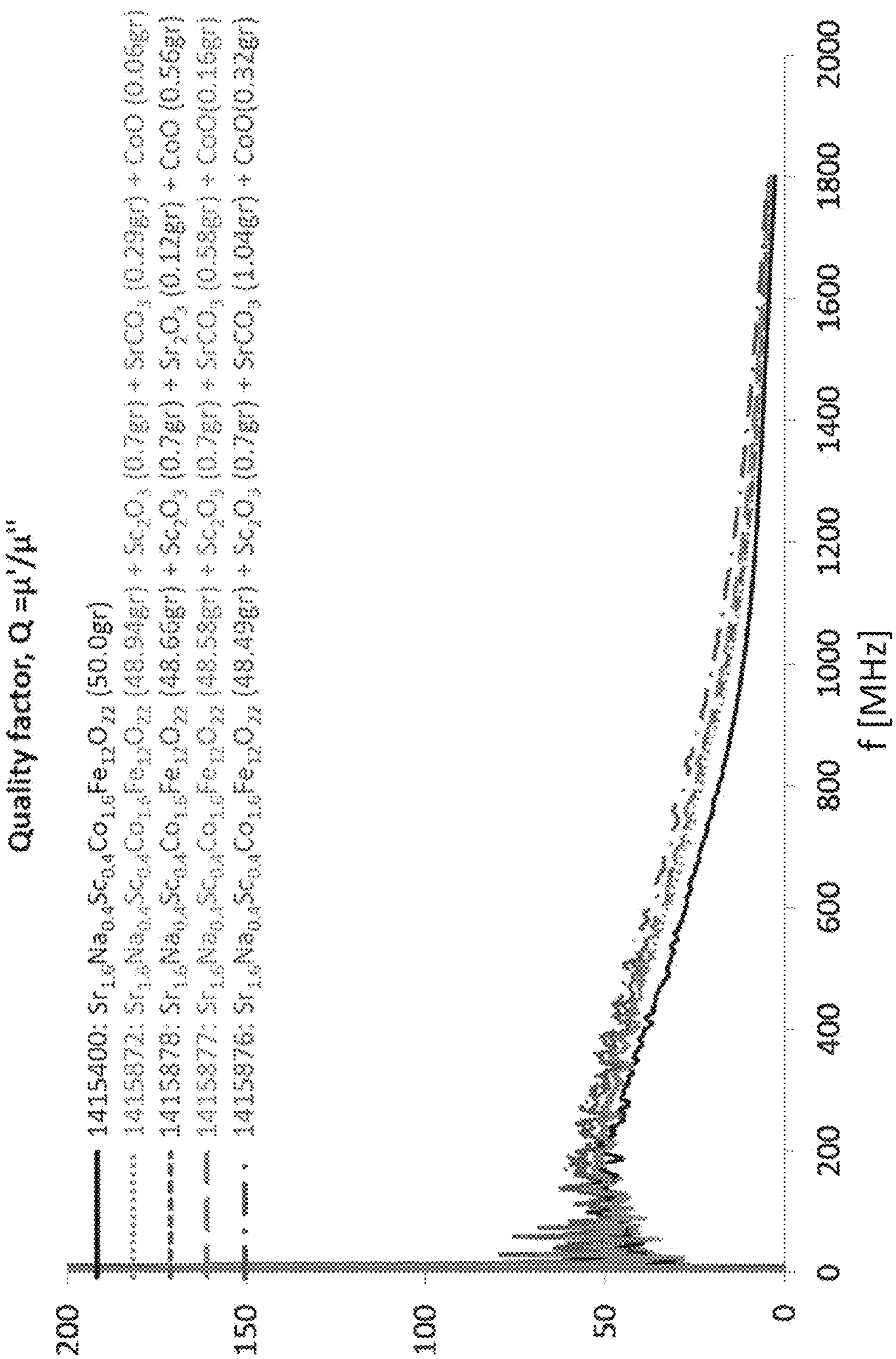
Figure 92A:
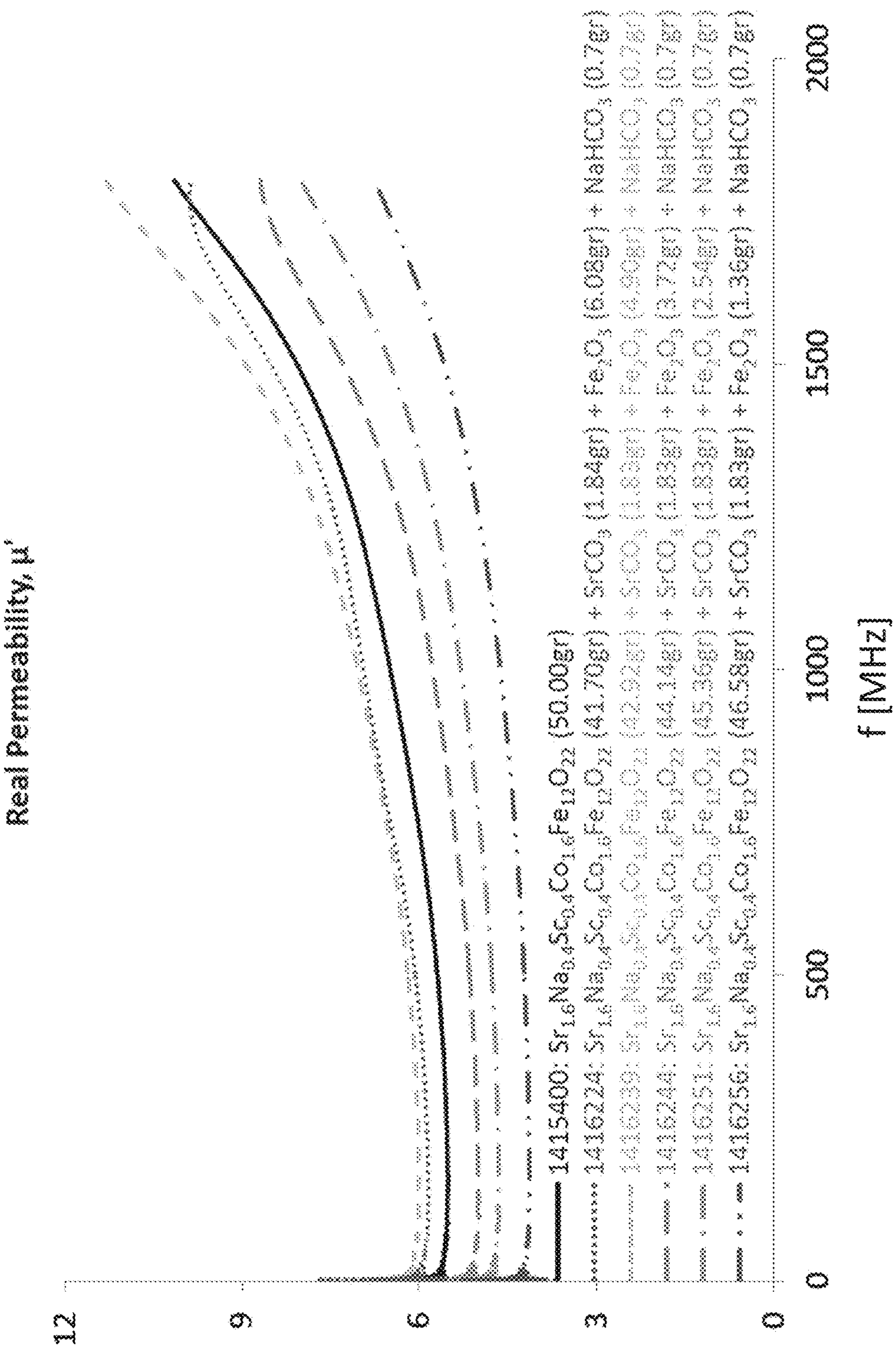
Figure 92B:
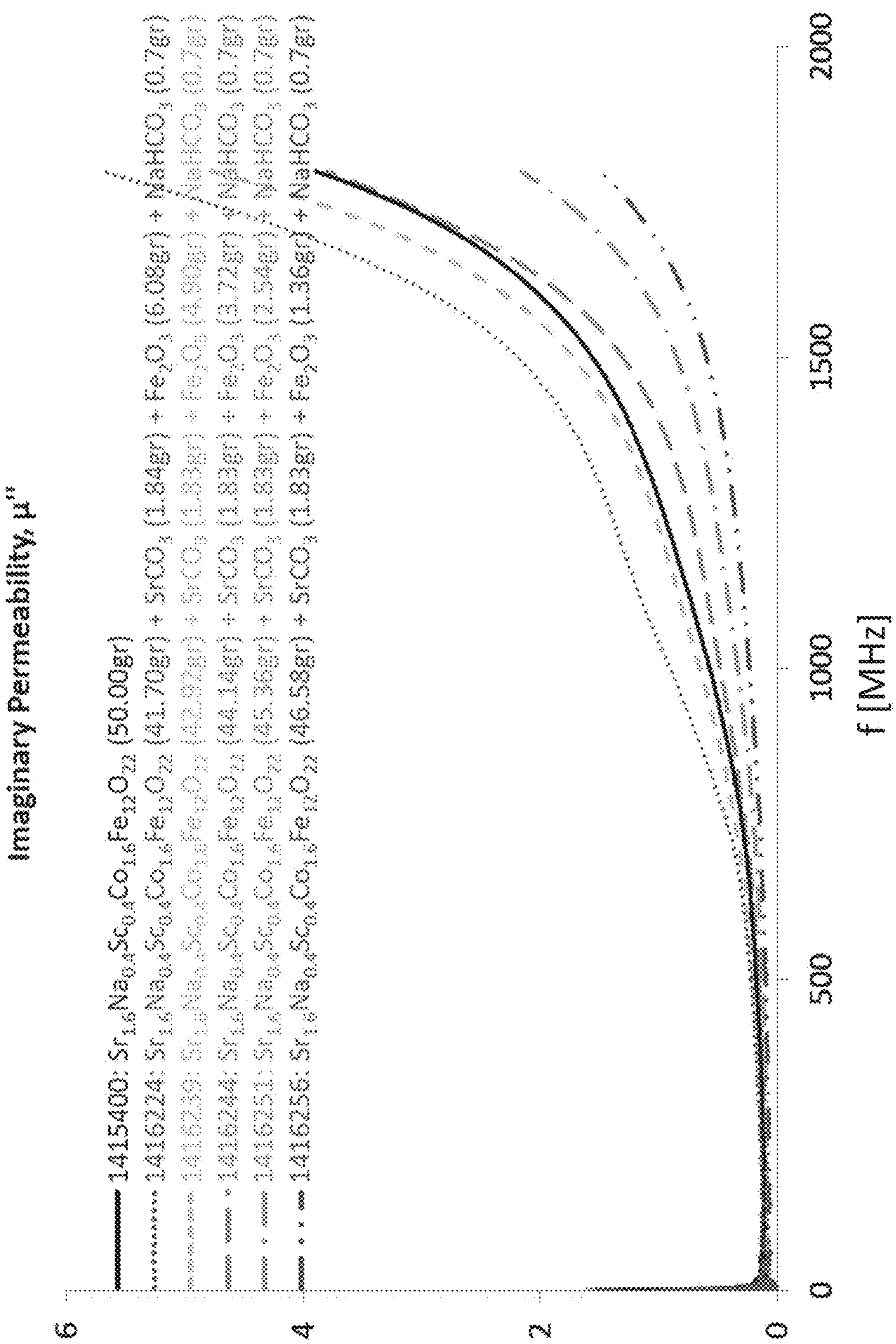
Figure 92C:
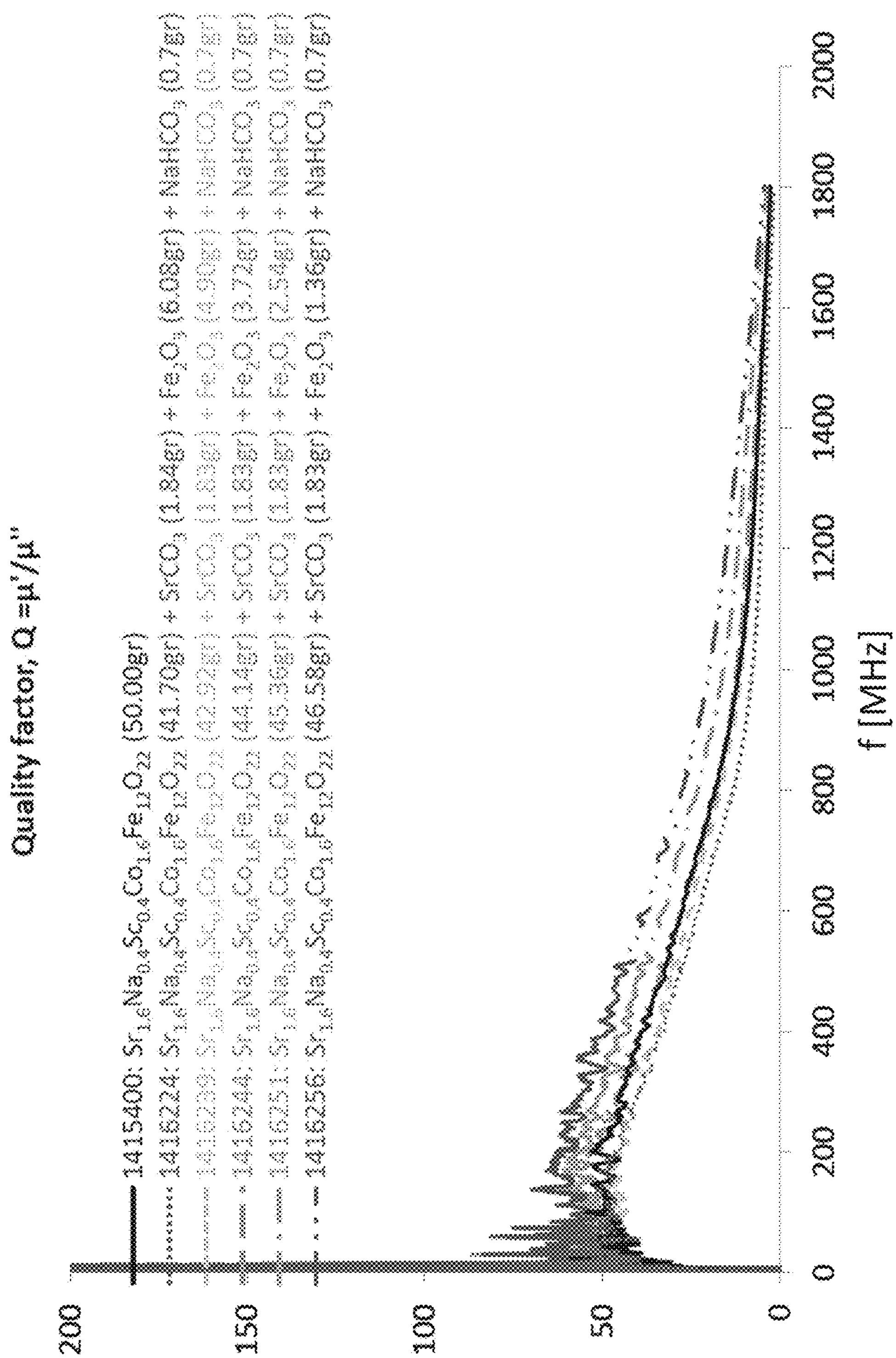
Figure 93A:
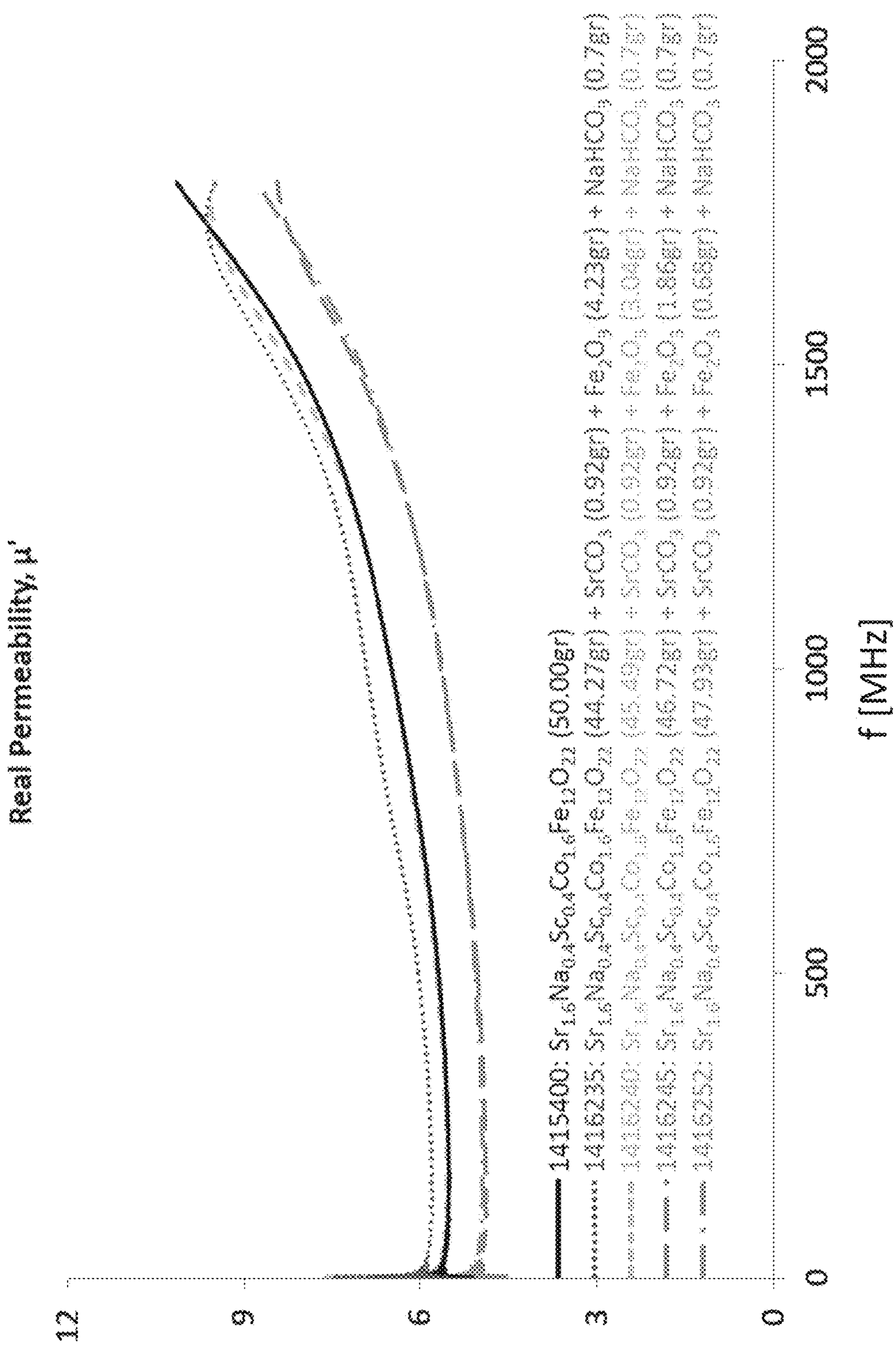
Figure 93B:
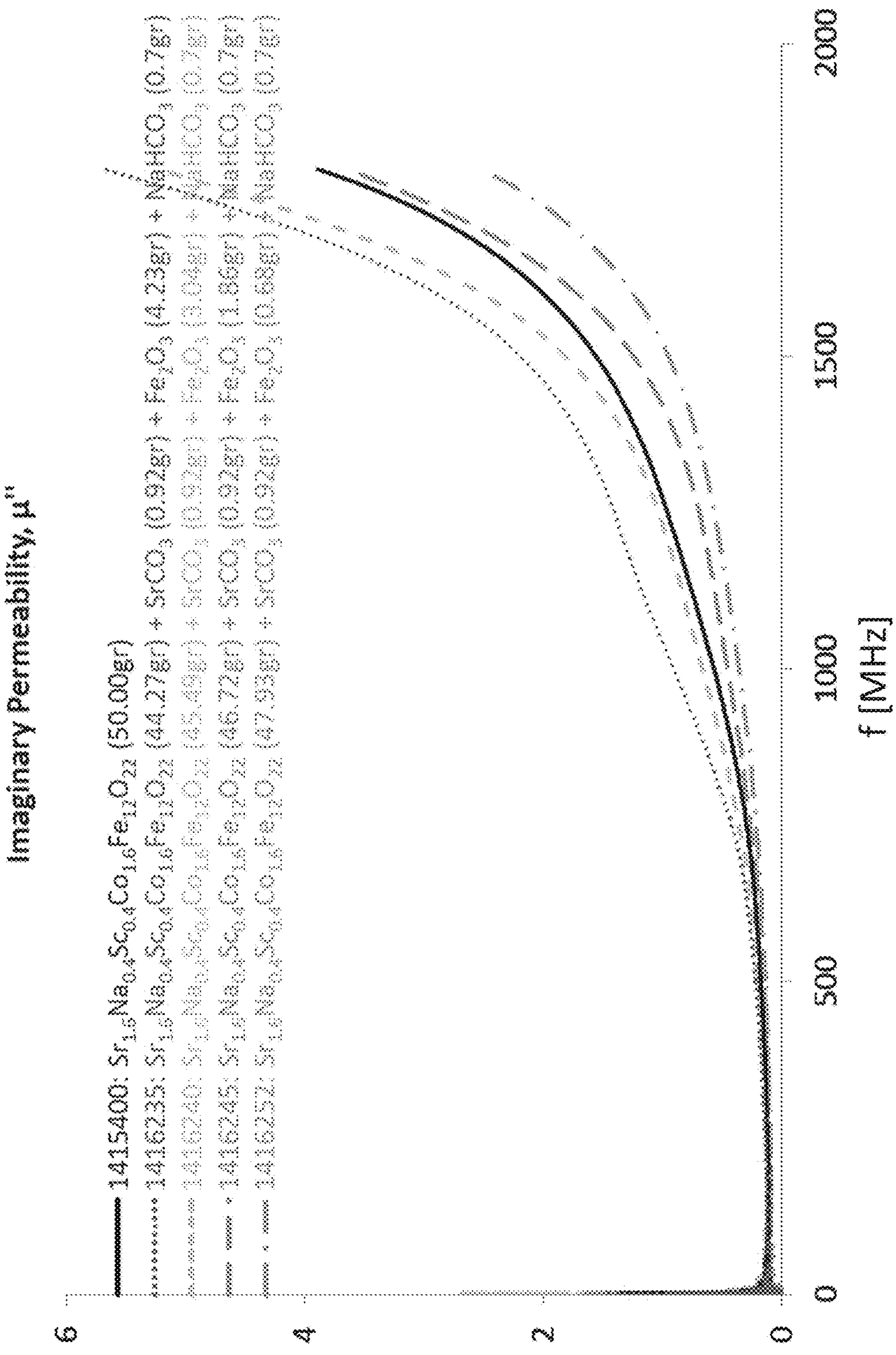
Figure 93C:
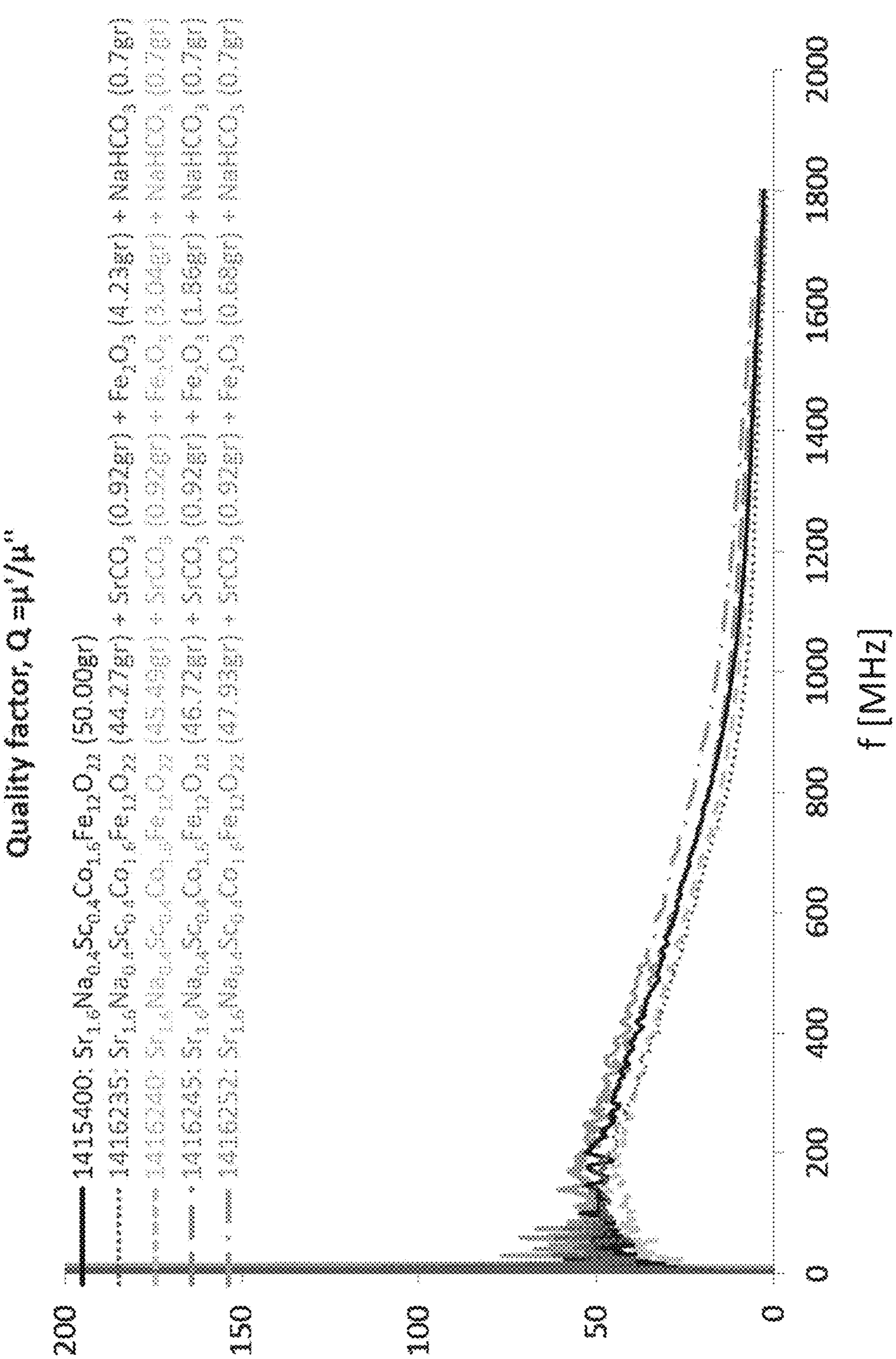
Figure 94A:
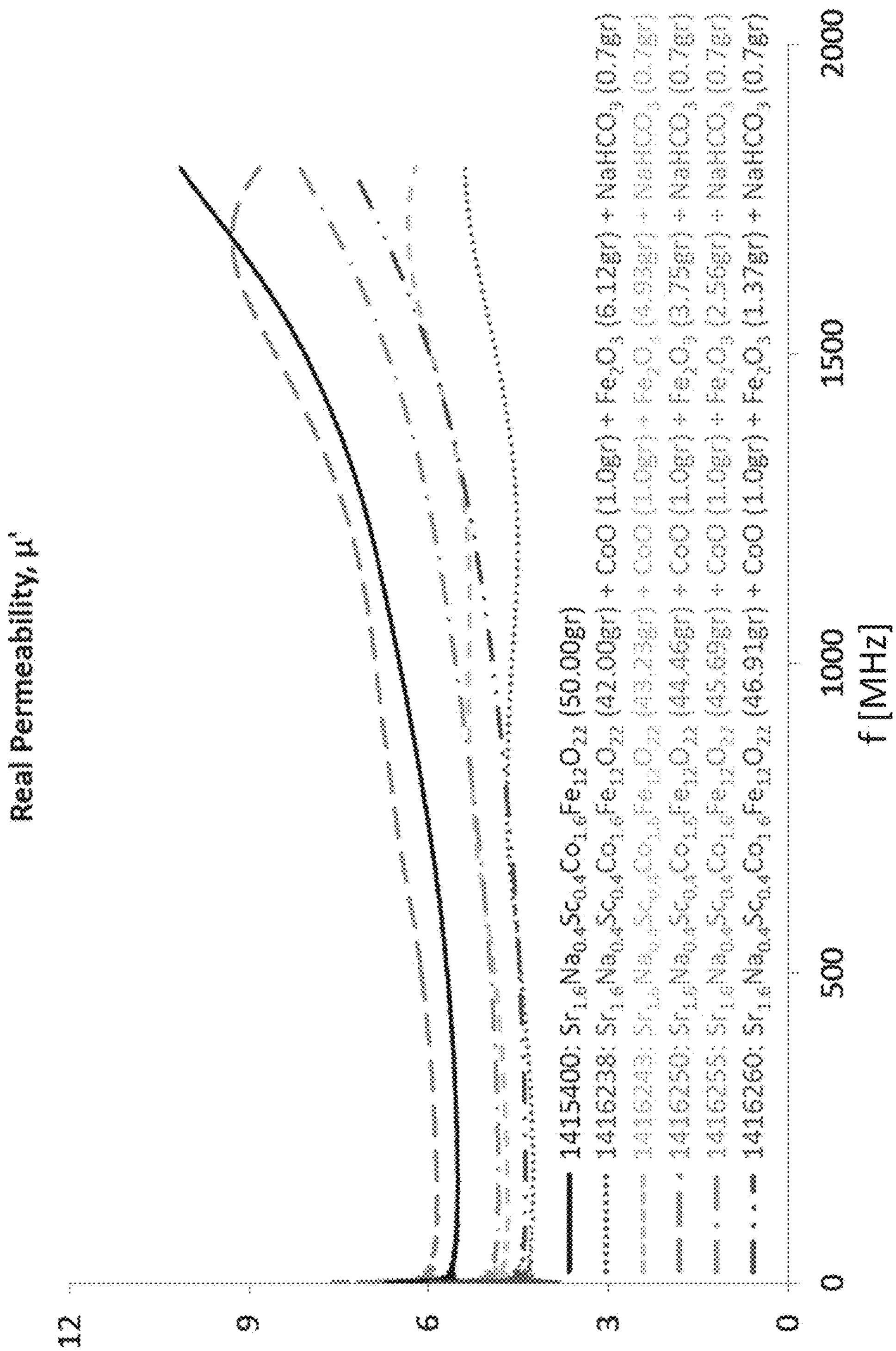
Figure 94B:
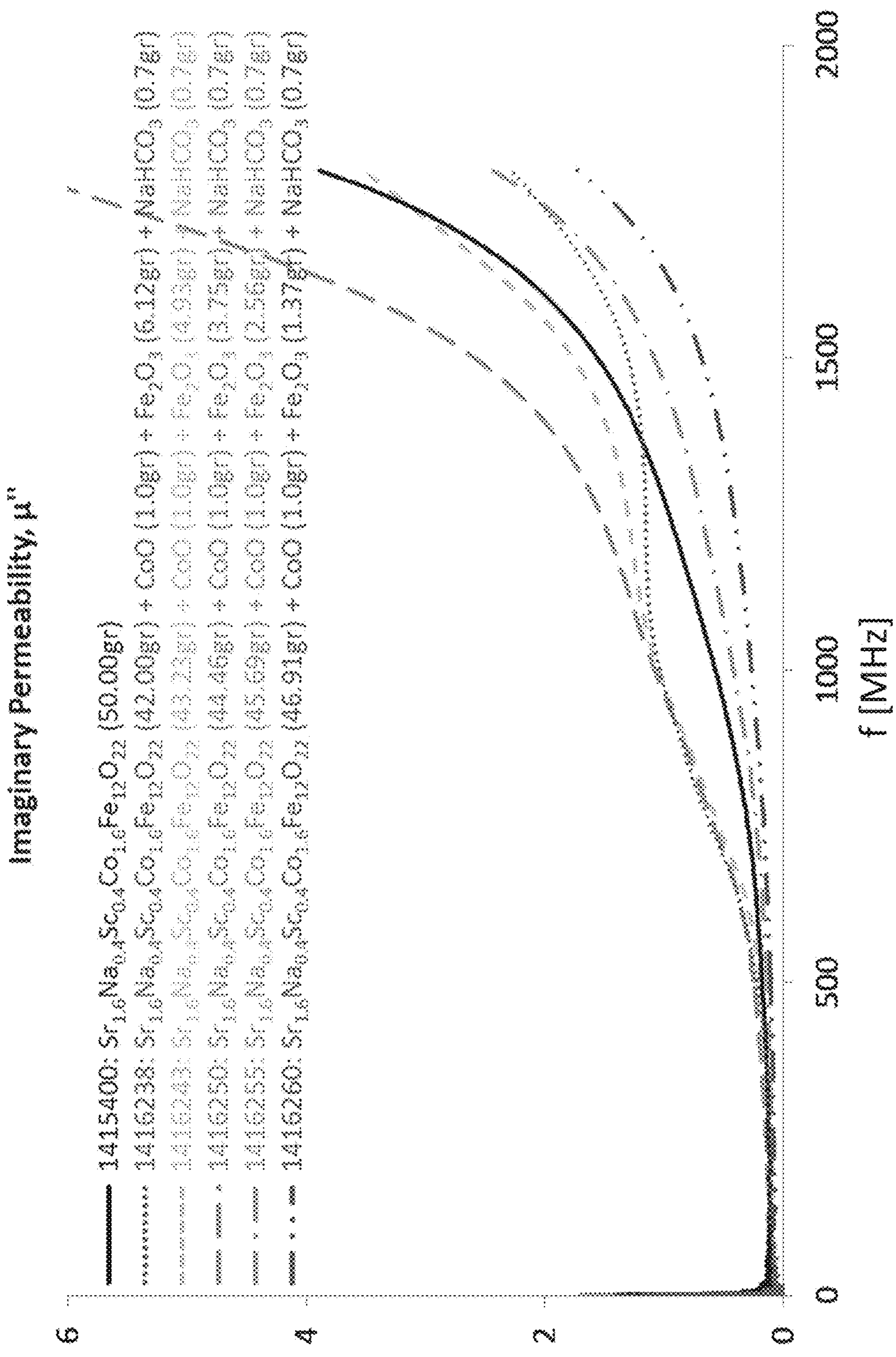
Figure 94C:
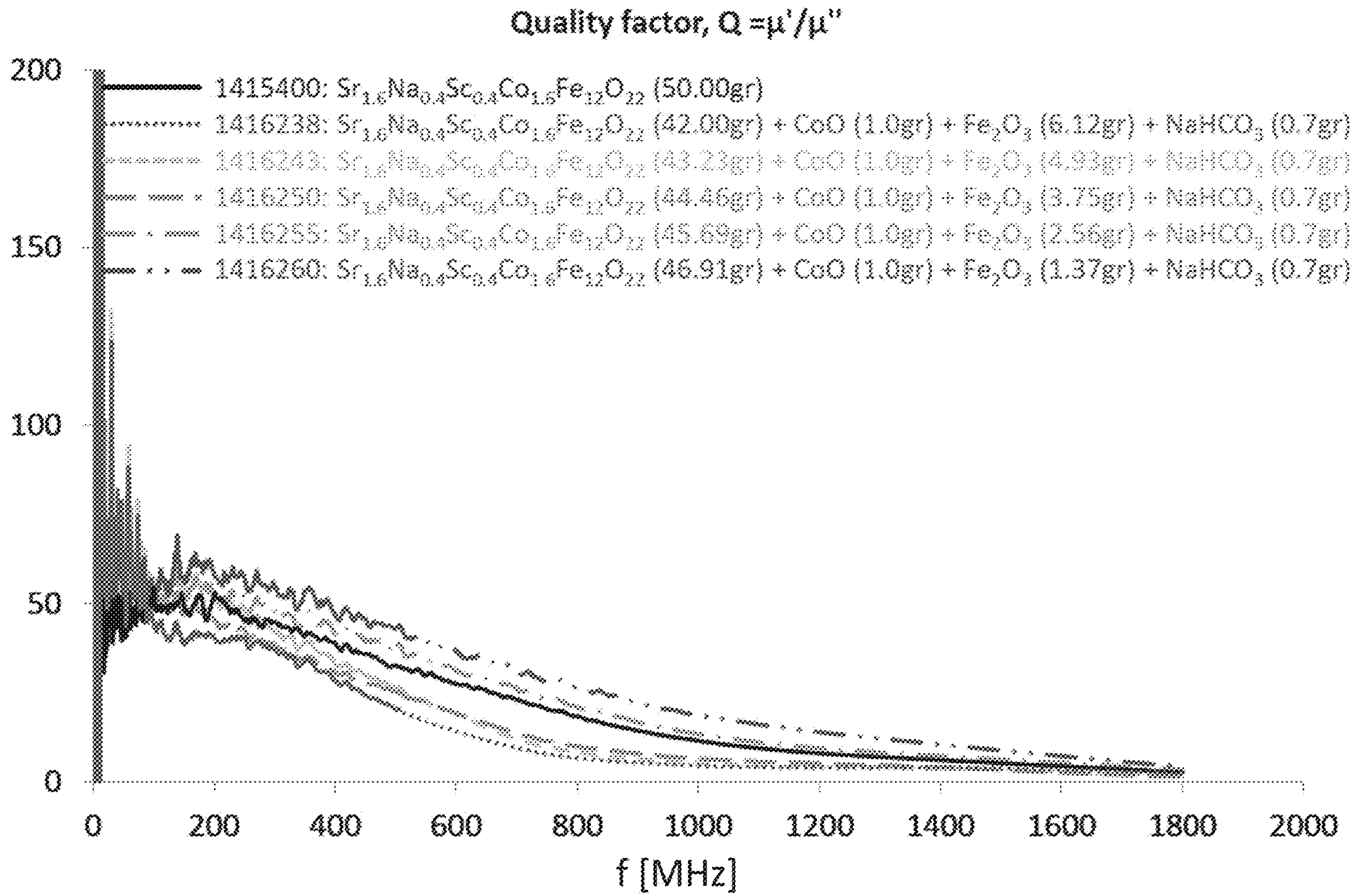
Figure 95A:
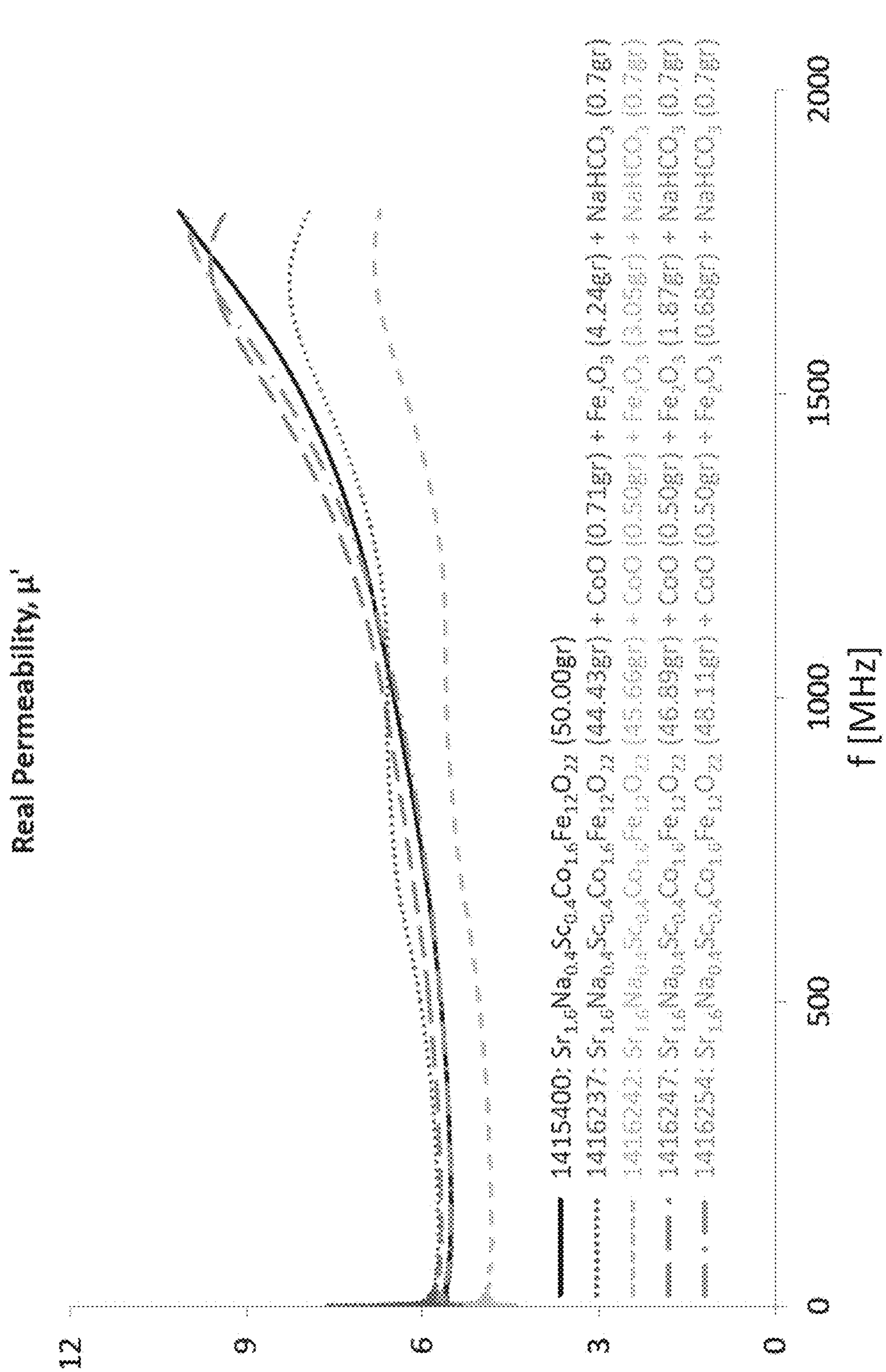
Figure 95B:
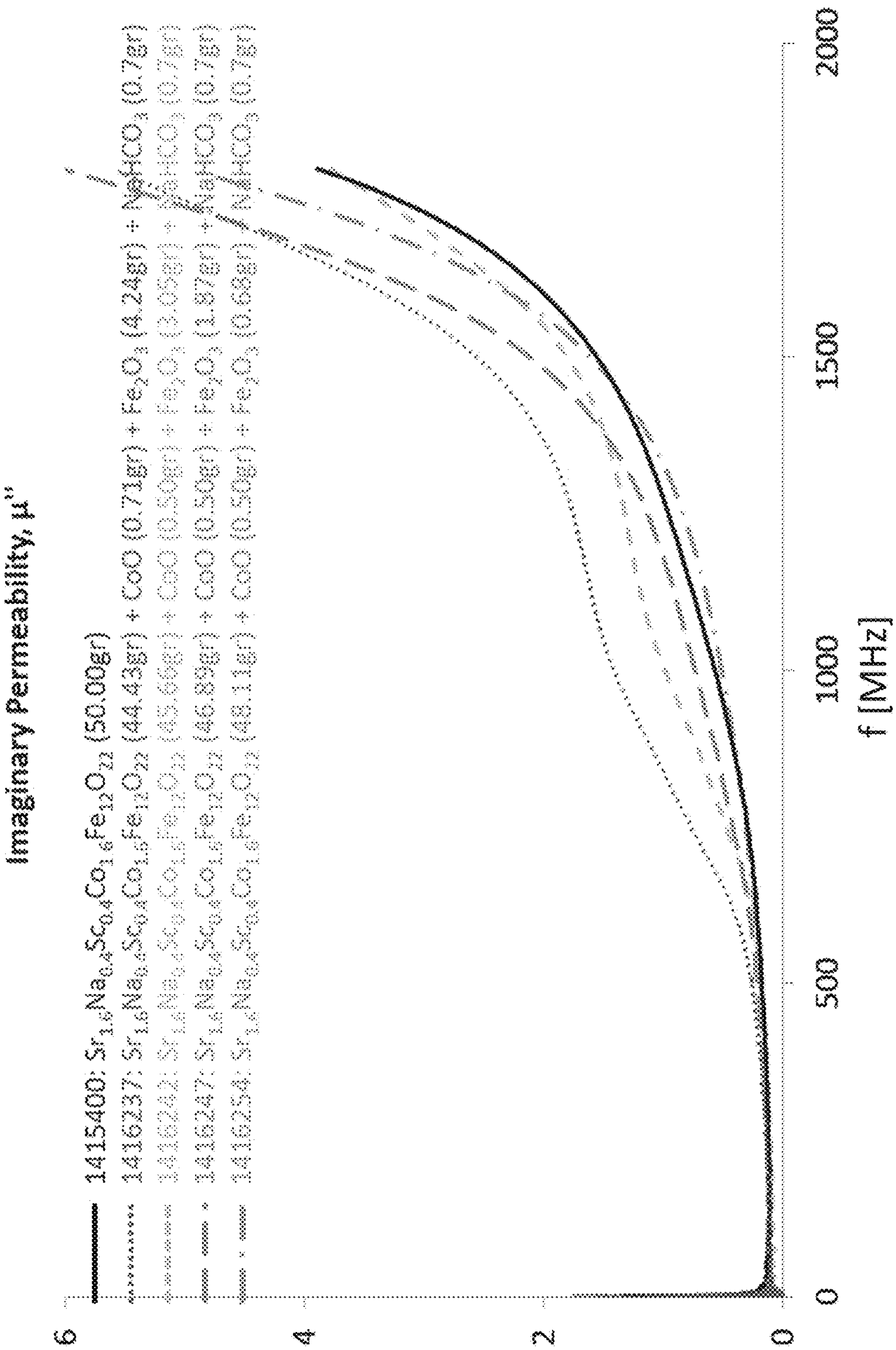
Figure 95C:
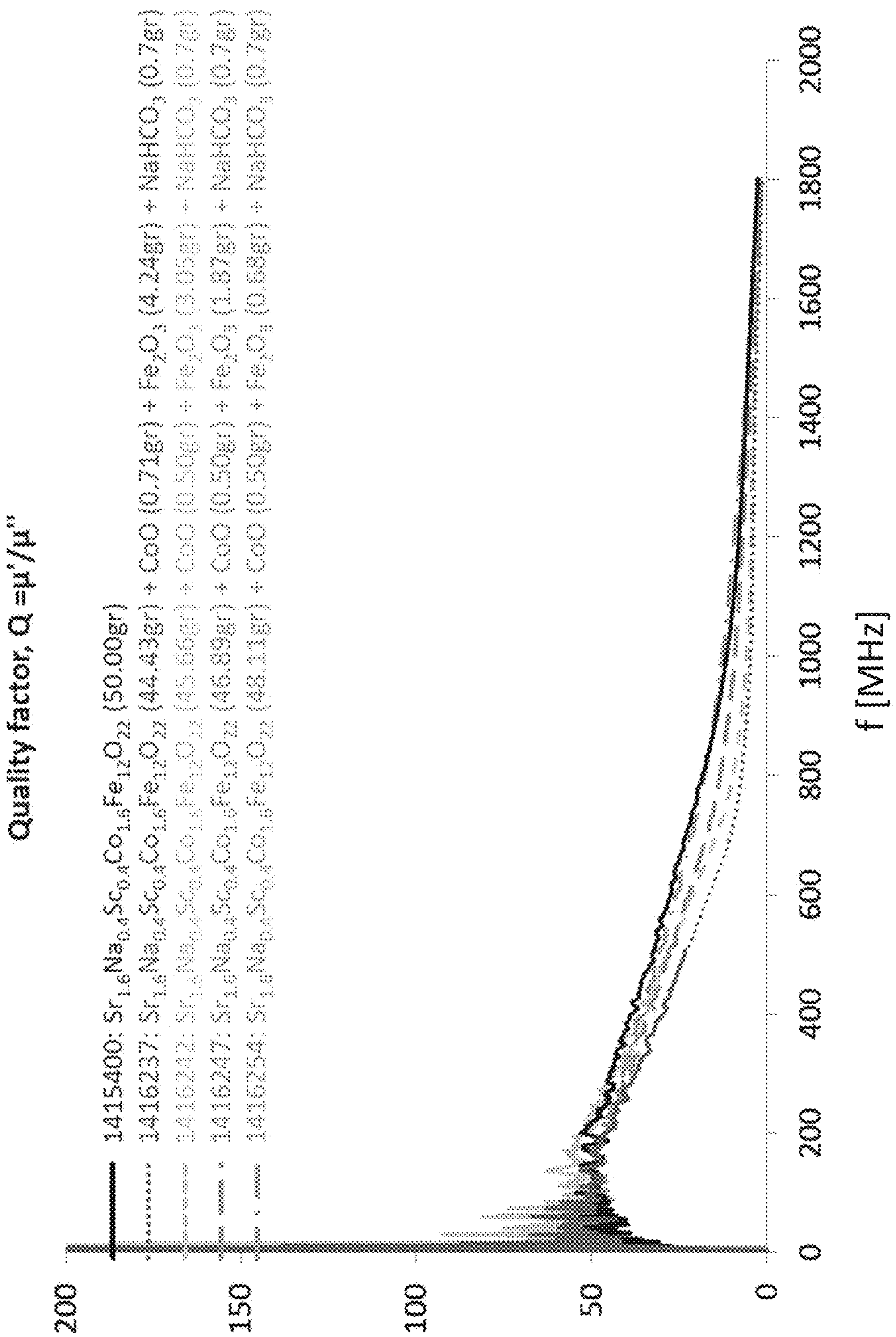
Figure 96A:
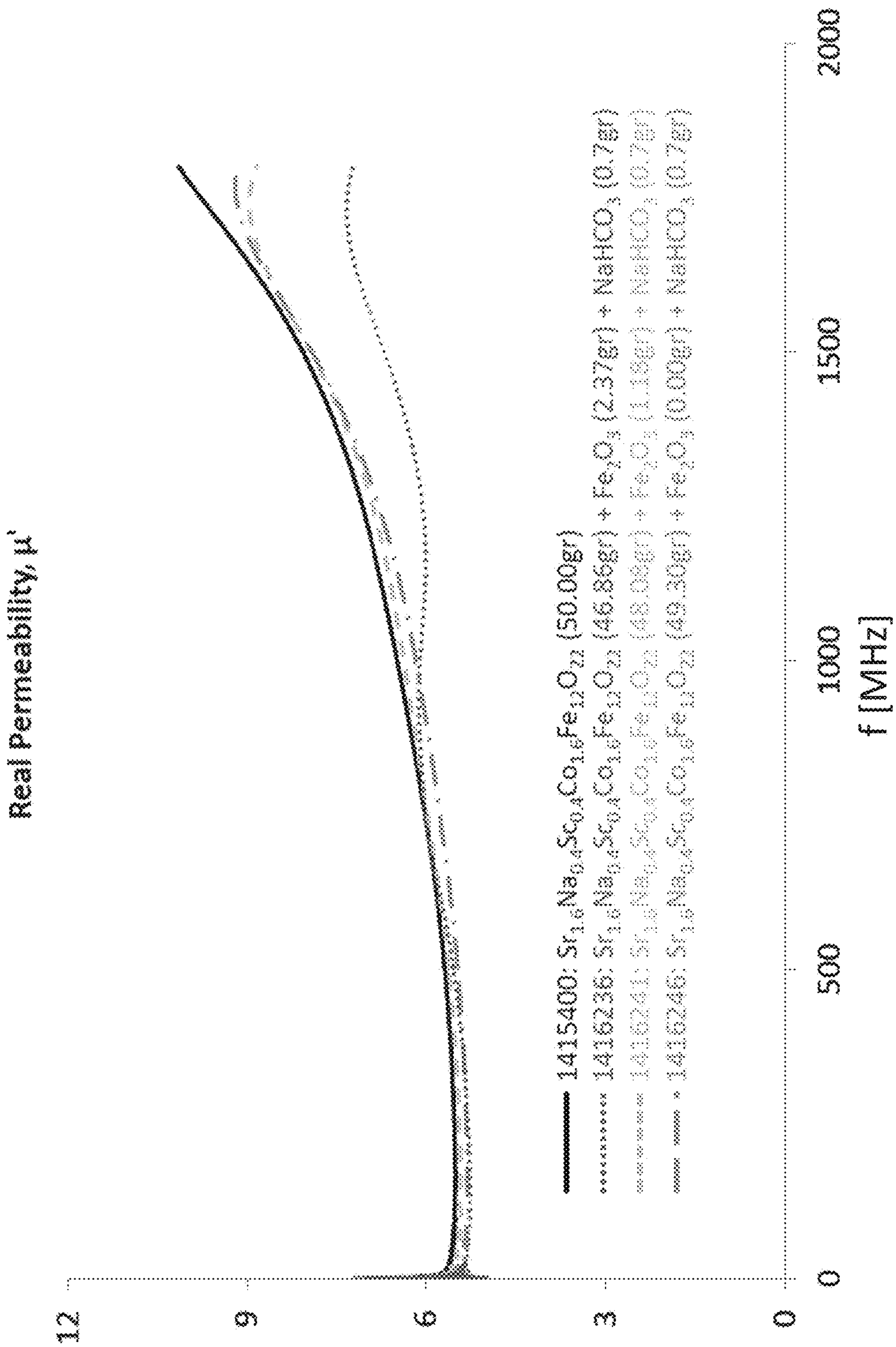
Figure 96B:
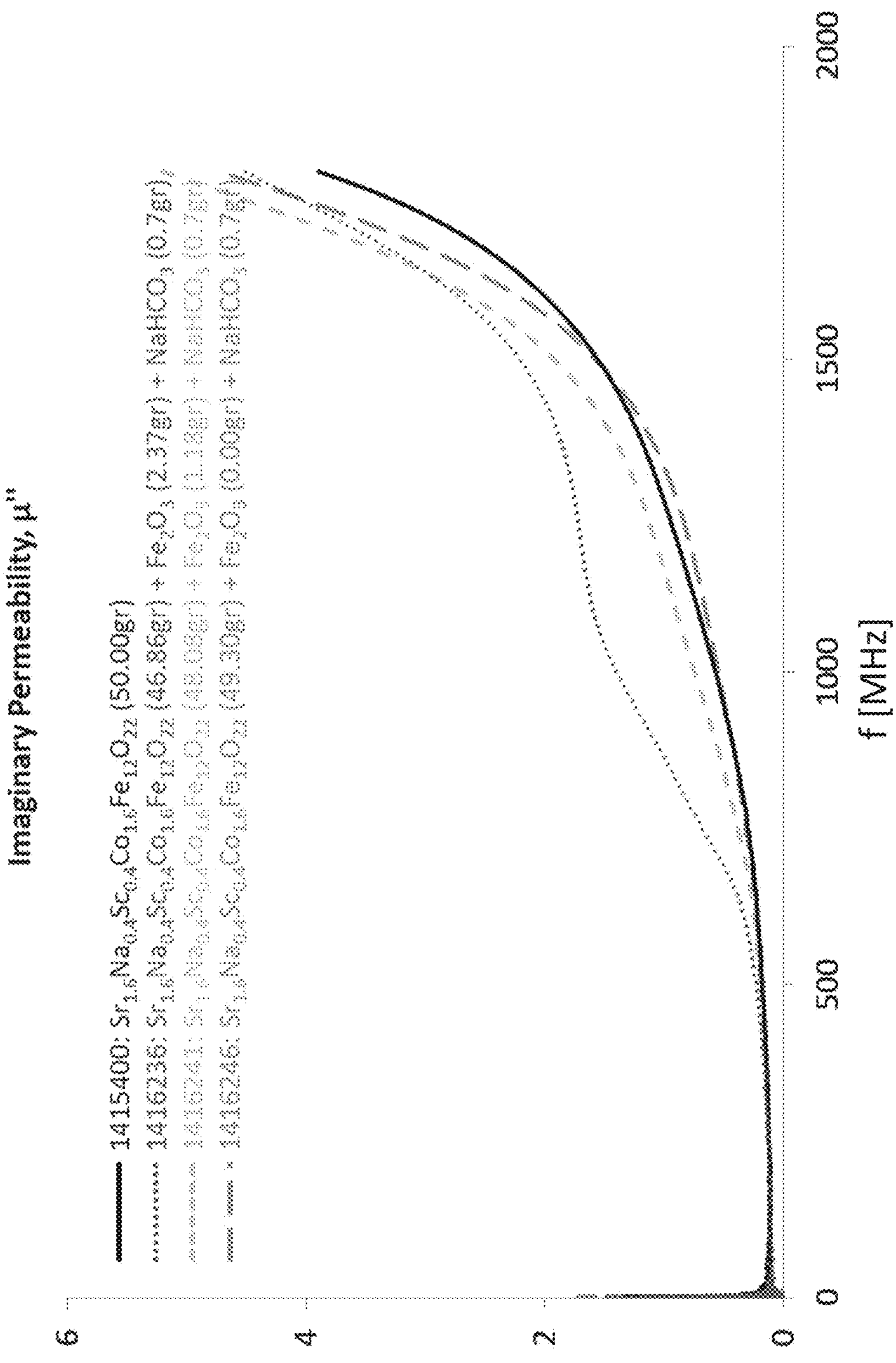
Figure 96C:
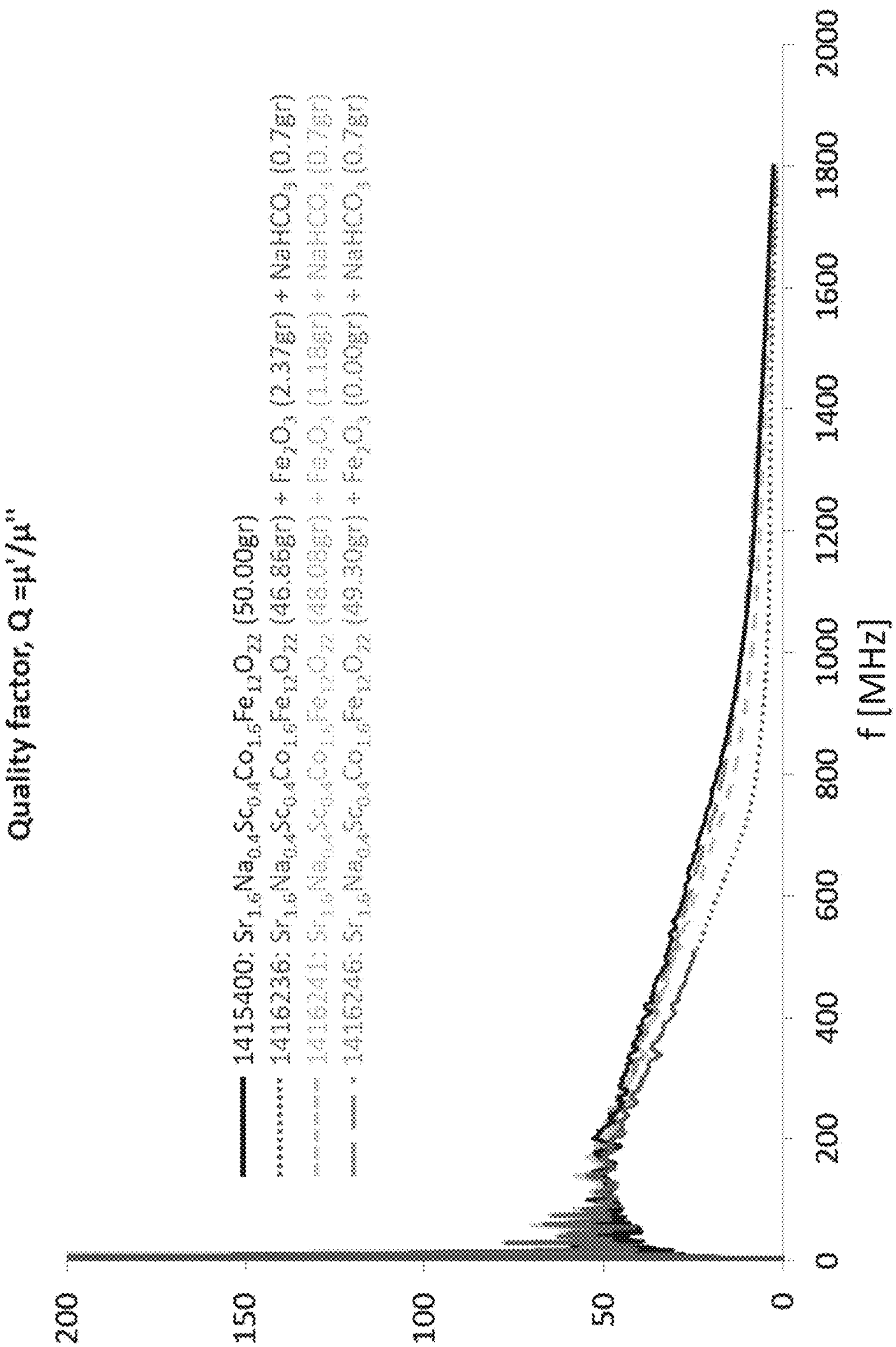
Figure 97A:
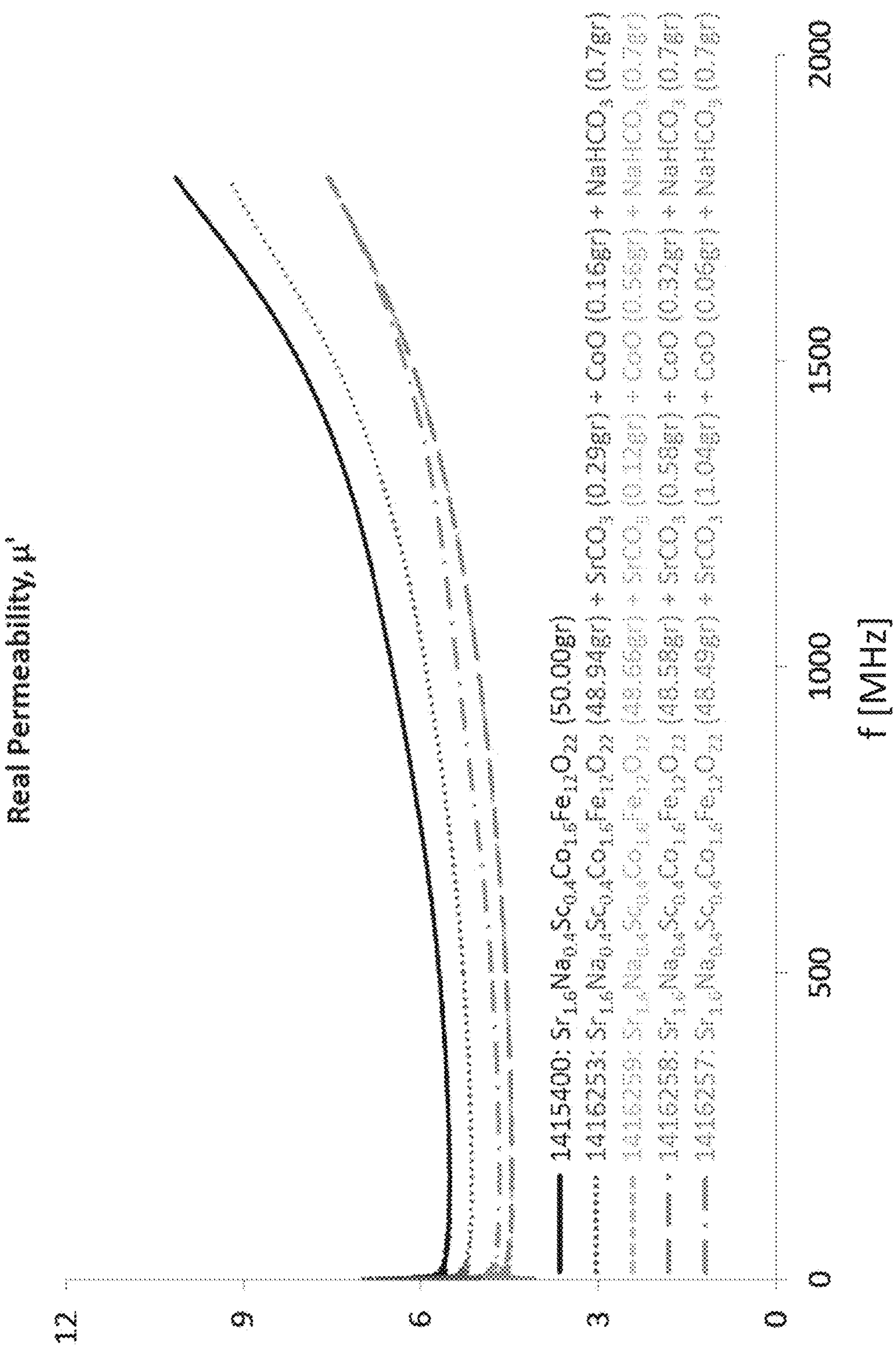
Figure 97B:
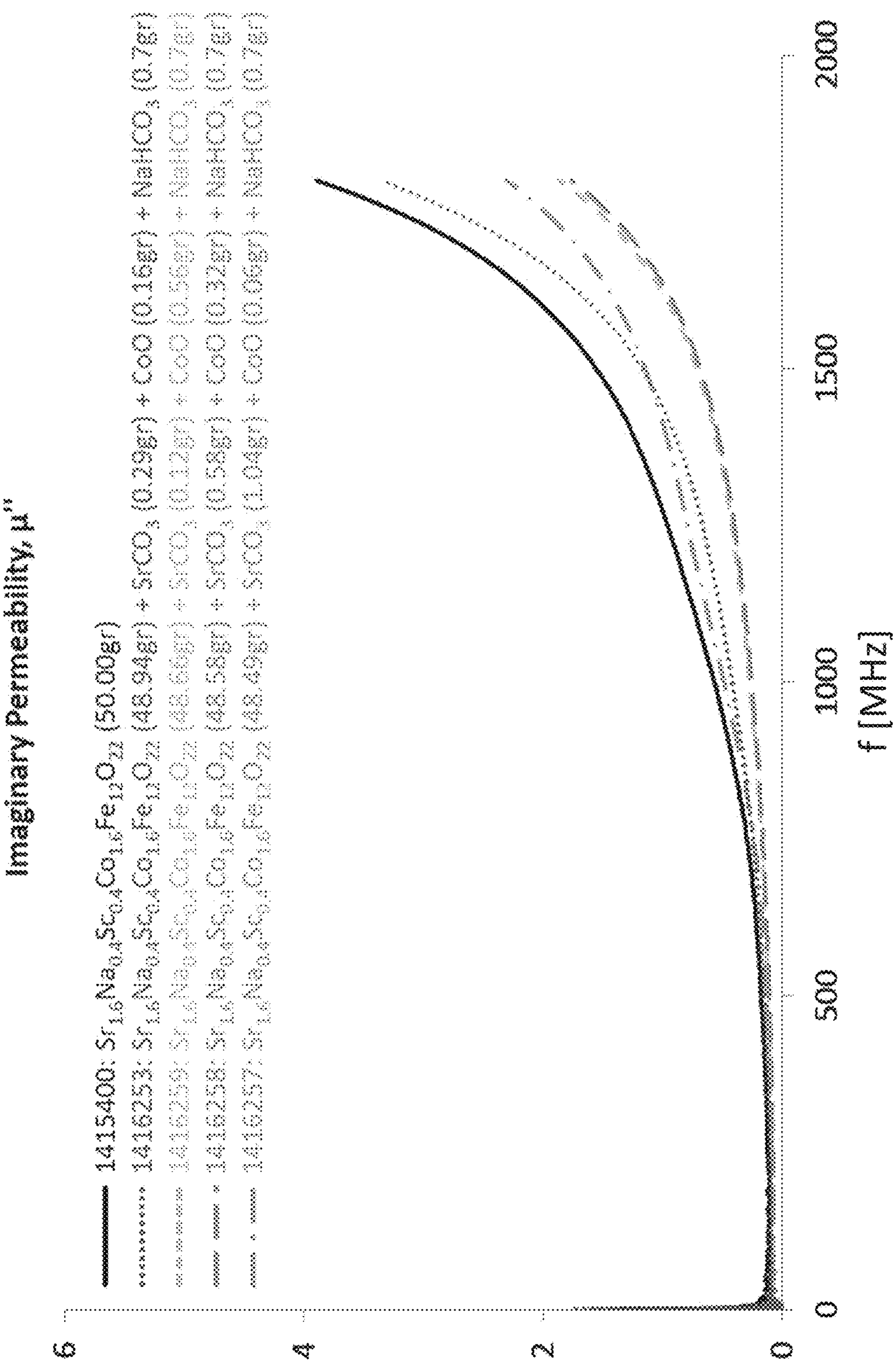
Figure 97C:
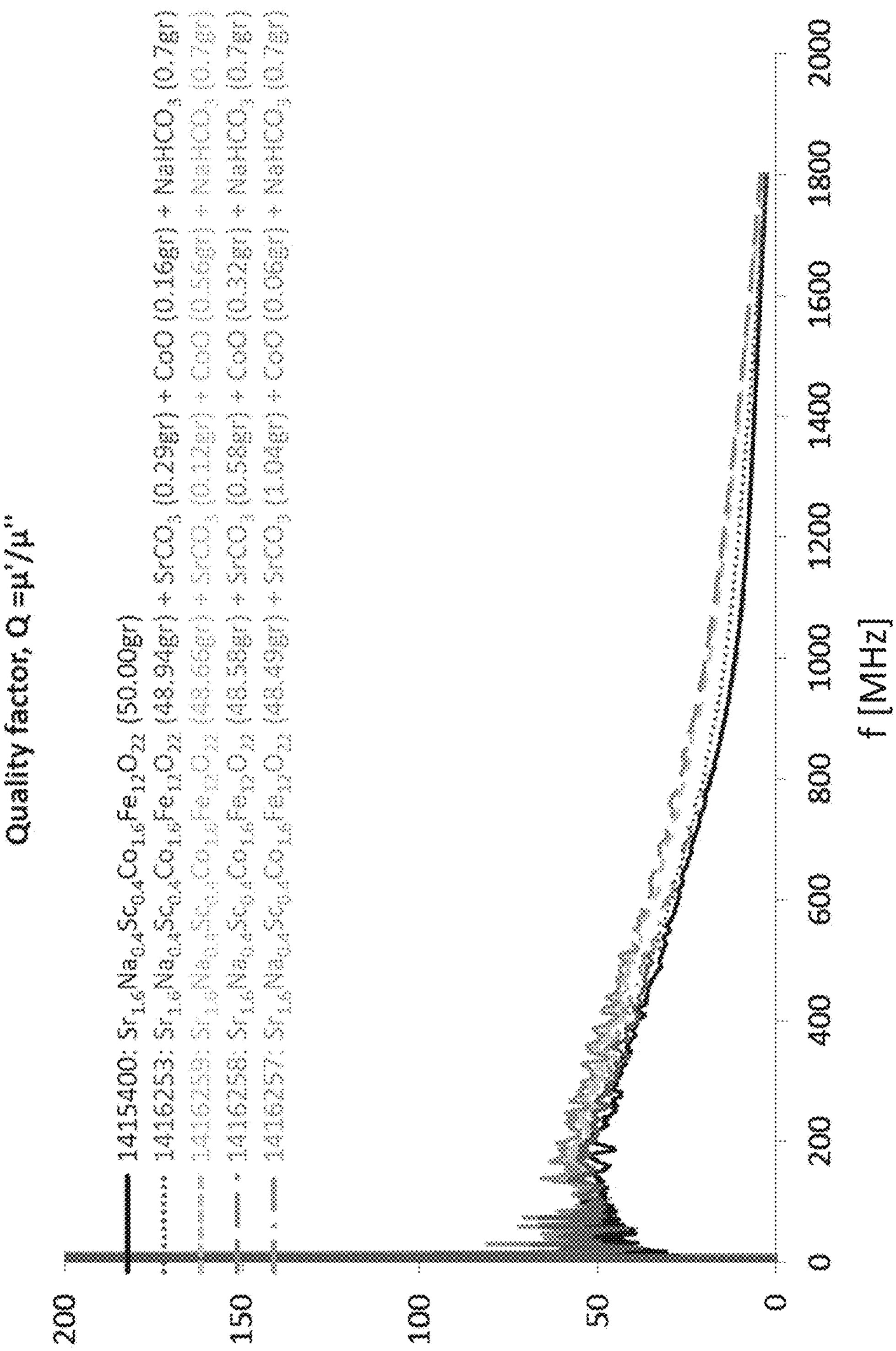

FIGS. 44A-54C and 74A-76C illustrate the real permeability (μ'), the loss factor (imaginary permeability μ") and quality factor (Q=μ'/μ"), respectively, for hexaferrites formed by the addition of various amounts of other compounds to a base $Sr_2Co_2Fe_{12}O_{22}$ material in which at least one element in the other compounds is provided in an amount that is less than the stoichiometric amount of the element in the other compounds, as indicated by the open square in the chemical formulas for the other compounds, such that the resultant hexaferrite includes a vacant cobalt site as compared to the base $Sr_2Co_2Fe_{12}O_{22}$ material, for example, $La_2Sr_2CoFe_{12}O_{22}$ vs. $Sr_2Co_2Fe_{12}O_{22}$ in compound number 1413767 in FIGS. 44A-44C. Various examples of these modified hexaferrite materials exhibit permeabilities comparable or superior to that of unmodified $Sr_2Co_2Fe_{12}O_{22}$ while retaining acceptable quality factors at frequencies higher than 500 MHz or up to about 1 GHz or above.

FIGS. 58A-68C and 79A-81C illustrate the real permeability (μ'), the loss factor (imaginary permeability μ") and quality factor (Q=μ'/μ"), respectively, for hexaferrites formed by the addition of various amounts of different compounds to a modified hexaferrite having the formula $Sr_{1.6}Na_{0.4}Sc_{0.4}Co_{1.6}Fe_{12}O_{22}$, where the Sr in $Sr_2Co_2Fe_{12}O_{22}$ has been partially replaced with Na and the Co has been partially replaced with Sc and at least one element in the other compounds is provided in an amount that is less than the stoichiometric amount of the element in the other compounds, as indicated by the open square in the chemical formulas for the other compounds. Various examples of these modified hexaferrite materials exhibit permeabilities comparable or superior to that of unmodified $Sr_2Co_2Fe_{12}O_{22}$ while retaining acceptable quality factors at frequencies higher than 500 MHz or up to about 1 GHz or above.

FIGS. 82A-85C illustrate the real permeability (μ'), the loss factor (imaginary permeability μ") and quality factor (Q=μ'/μ"), respectively, for hexaferrites formed by the addition of various amounts of different compounds to a modified hexaferrite having the formula $Sr_{1.6}Na_{0.4}Sc_{0.4}Co_{1.6}Fe_{12}O_{22}$, where the Sr in $Sr_2Co_2Fe_{12}O_{22}$ has been partially replaced with Na and the Co has been partially replaced with Sc and the modified hexaferrite has the same atomic percentage of Sc as Na. Various examples of these modified hexaferrite materials exhibit permeabilities comparable or superior to that of unmodified $Sr_2Co_2Fe_{12}O_{22}$ while retaining acceptable quality factors at frequencies higher than 500 MHz or up to about 1 GHz or above.

FIGS. 86A-91A illustrate the real permeability (μ'), the loss factor (imaginary permeability μ") and quality factor (Q=μ'/μ"), respectively, for hexaferrites formed by the addition of various amounts of different compounds to a modified hexaferrite having the formula $Sr_{1.6}Na_{0.4}Sc_{0.4}Co_{1.6}Fe_{12}O_{22}$, where the Sr in $Sr_2Co_2Fe_{12}O_{22}$ has been partially replaced with Na and the Co has been partially replaced with Sc and the modified hexaferrite has a greater atomic percentage of Sc than Na. Various ones of these modified hexaferrite materials exhibit quality factors comparable or superior to that of unmodified $Sr_2Co_2Fe_{12}O_{22}$ or $Sr_{1.6}Na_{0.4}Sc_{0.4}Co_{1.6}Fe_{12}O_{22}$ while retaining acceptable permeabilities at frequencies higher than 500 MHz or up to about 1 GHz or above. For example, compound number 1415876 (FIGS. 91A-91C), formed by the combination of $Sr_{1.6}Na_{0.4}Sc_{0.4}Co_{1.6}Fe_{12}O_{22}$ (48.49 g)+$Sc_2O_3$ (0.7 g)+$SrCO_3$ (1.04 g)+CoO (0.32 g) is notable in that it has a Q factor of about 25 and a permeability μ' slightly above 4 at 1 GHz.

FIGS. 92A-97C illustrate the real permeability (μ'), the loss factor (imaginary permeability μ") and quality factor (Q=μ'/μ"), respectively, for hexaferrites formed by the addition of various amounts of different compounds to a modified hexaferrite having the formula $Sr_{1.6}Na_{0.4}Sc_{0.4}Co_{1.6}Fe_{12}O_{22}$, where the Sr in $Sr_2Co_2Fe_{12}O_{22}$ has been partially replaced with Na and the Co has been partially replaced with Sc and the modified hexaferrite has a greater atomic percentage of Na than Sc. Various examples of these modified hexaferrite materials exhibit permeabilities comparable or superior to that of unmodified $Sr_2Co_2Fe_{12}O_{22}$ while retaining acceptable quality factors at frequencies higher than 500 MHz or up to about 1 GHz or above.

Figure 98A:
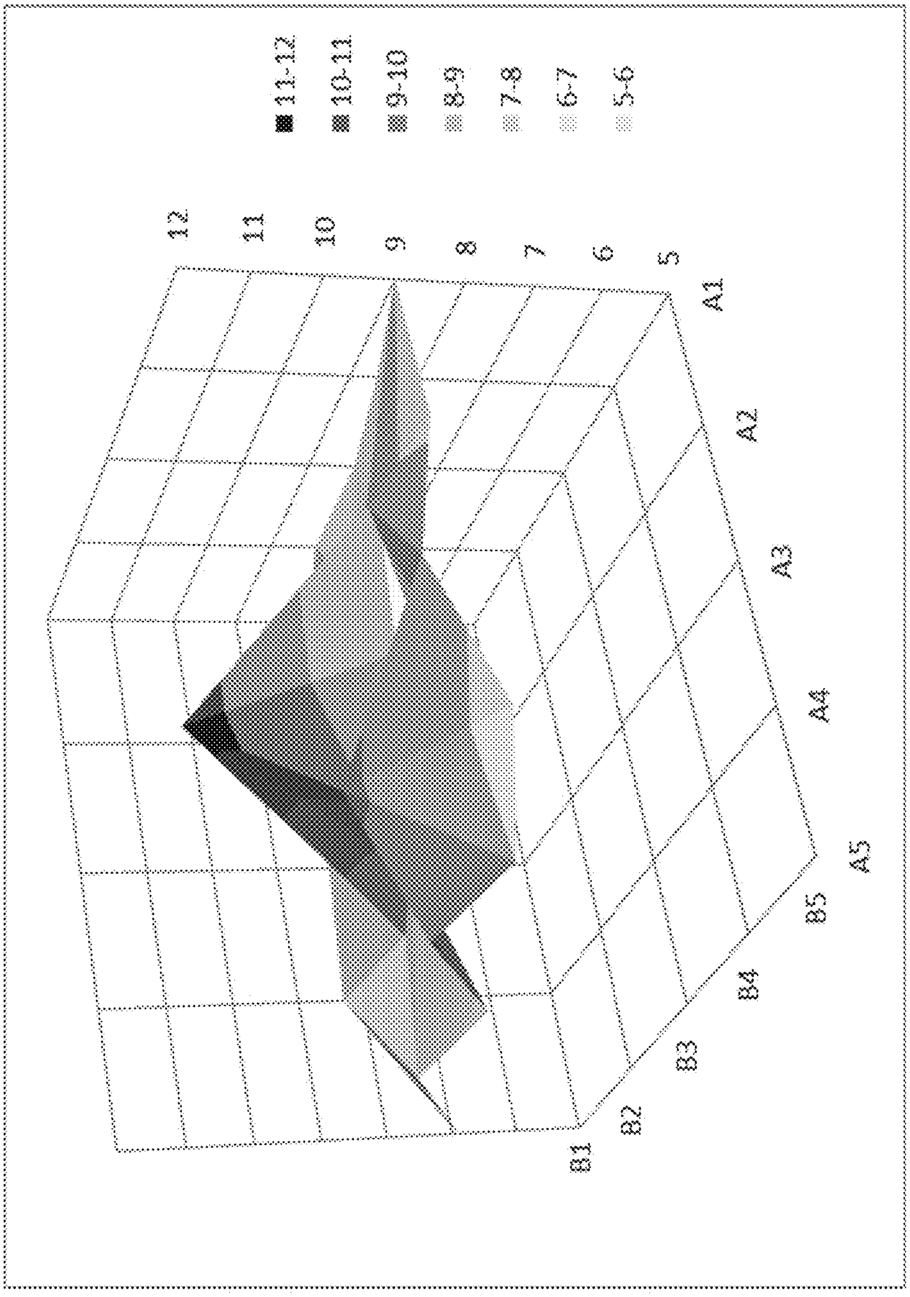
Figure 98B:
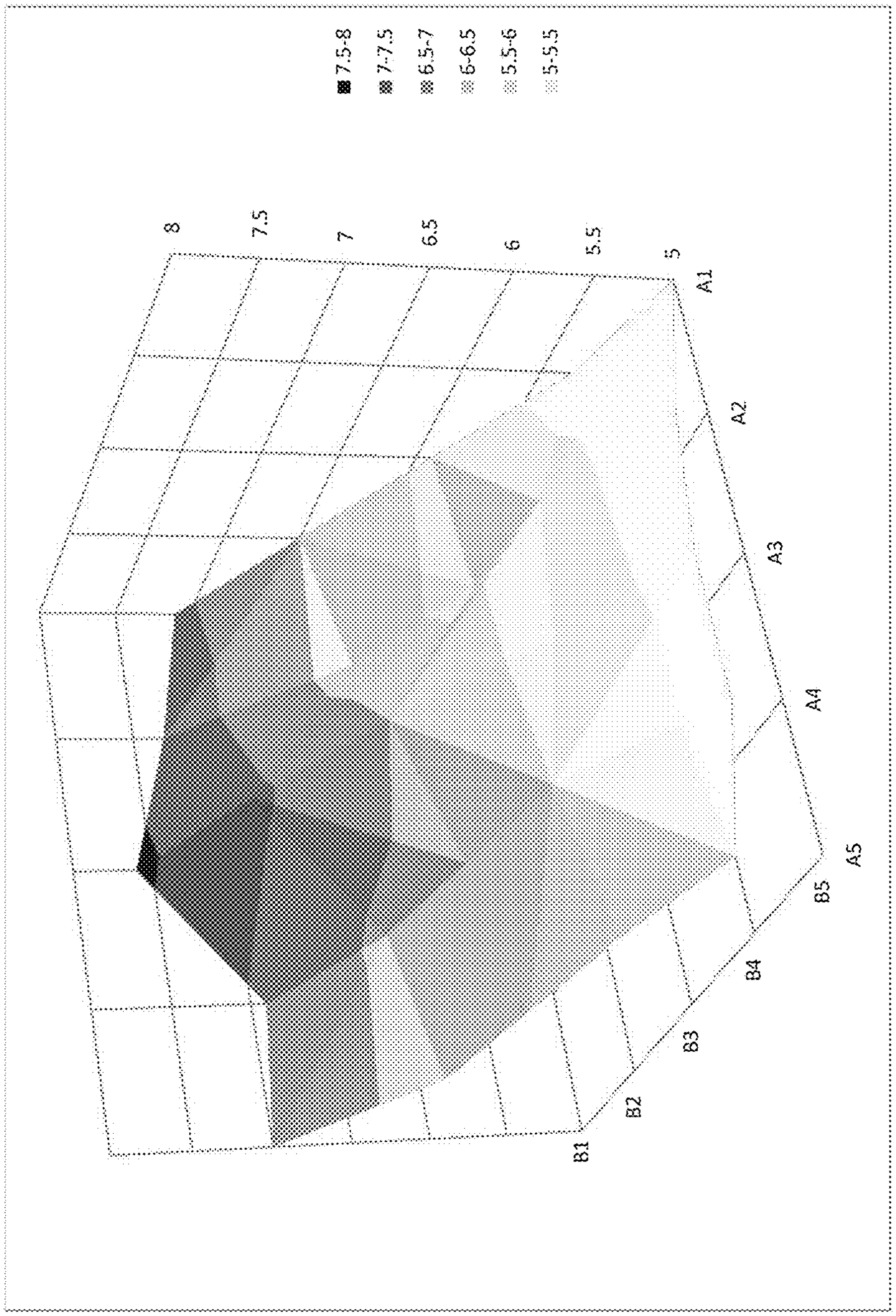

The quality factor and permeability data at 1 GHz for various of the hexaferrite compositions shown in FIGS. 82A-85C is illustrated as surface charts in FIGS. 98A-98C. FIG. 98A illustrates quality factor Q for various hexaferrites formed by the addition of various amounts of different compounds to a hexaferrite having the formula $Sr_{1.6}Na_{0.4}Sc_{0.4}Co_{1.6}Fe_{12}O_2$, where the Sr in $Sr_2Co_2Fe_{12}O_{22}$ has been partially replaced with Na, the Co has been partially replaced with Sc, and the modified hexaferrites have a same atomic percentage of Sc as Na. FIG. 98B illustrates the real permeability (μ') for these same hexaferrites. FIG. 98C is a table showing the compounds that were combined to form these hexaferrites. In FIG. 98C, the left hand column represents the grid coordinate of the data in FIGS. 98A and 98B. From the data illustrated in FIGS. 98A-98C, it can be seen that some examples of hexaferrites formed by the addition of various amounts of different compounds to a hexaferrite having the formula $Sr_{1.6}Na_{0.4}Sc_{0.4}Co_{1.6}Fe_{12}O_{22}$, where the Sr in $Sr_2Co_2Fe_{12}O_{22}$ has been partially replaced with Na, the Co has been partially replaced with Sc, and the modified hexaferrites have a same atomic percentage of Sc as Na may exhibit a quality factor of over 10 while retaining a permeability over 6 at 1 GHz.

Figure 99A:
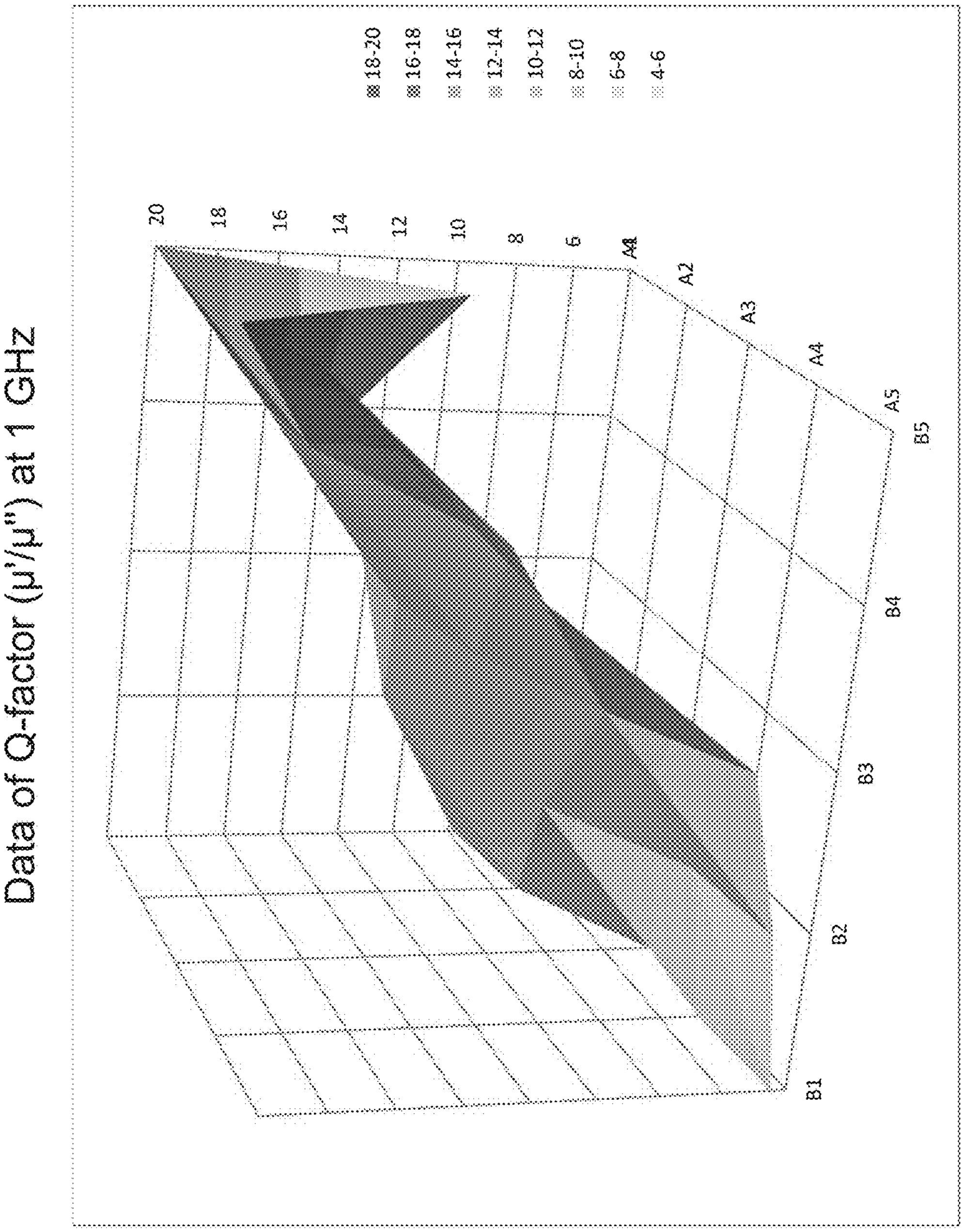
Figure 99B:
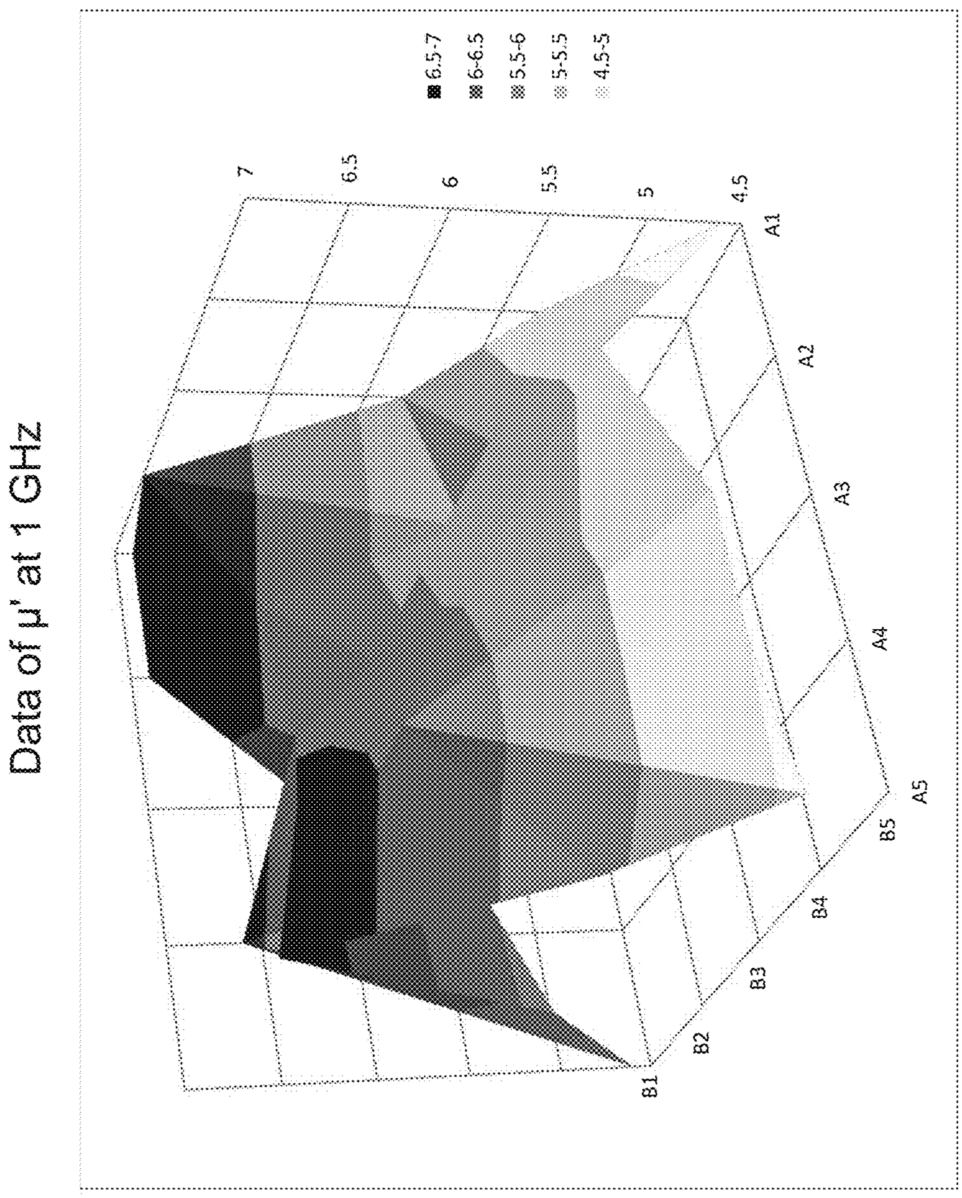

The quality factor and permeability data at 1 GHz for various ones of the hexaferrite compositions shown in FIGS. 86A-91A is illustrated as surface charts in FIGS. 99A-99C. FIG. 99A illustrates quality factor Q for various hexaferrites formed by the addition of various amounts of different compounds to a hexaferrite having the formula $Sr_{1.6}Na_{0.4}Sc_{0.4}Co_{1.6}Fe_{12}O_{22}$, where the Sr in $Sr_2Co_2Fe_{12}O_{22}$ has been partially replaced with Na, the Co has been partially replaced with Sc, and the modified hexaferrites have a greater atomic percentage of Sc than Na. FIG. 99B illustrates the real permeability (μ') for these same hexaferrites. FIG. 99C is a table showing the compounds that were combined to form these hexaferrites. In FIG. 99C, the left hand column represents the grid coordinate of the data in FIGS. 99A and 99B. From the data illustrated in FIGS. 99A-99C, it can be seen that some examples of hexaferrites formed by the addition of various amounts of different compounds to a hexaferrite having the formula $Sr_{1.6}Na_{0.4}Sc_{0.4}Co_{1.6}Fe_{12}O_{22}$, where the Sr in $Sr_2Co_2Fe_{12}O_{22}$ has been partially replaced with Na, the Co has been partially replaced with Sc, and the modified hexaferrites a greater atomic percentage of Sc than Na may exhibit a quality factor of up to about 20 while retaining a permeability up to about 5 at 1 GHz, for example, for the compounds whose data is shown at coordinates A1-B5 (46.58 g $Sr_{1.6}Na_{0.4}Sc_{0.4}Co_{1.6}Fe_{12}O_{22}$+1.83 g $SrCO_3$+1.36 g $Fe_2O_3$+0.7 g $Sc_2O_3$), A3-B5 (48.58 g $Sr_{1.6}Na_{0.4}Sc_{0.4}Co_{1.6}Fe_{12}O_{22}$+0.58 g $SrCO_3$+0.32 g CoO+0.7 g $Sc_2O_3$), A4-B5 (48.66 g $Sr_{1.6}Na_{0.4}Sc_{0.4}Co_{1.6}Fe_{12}O_{22}$+0.12 g $SrCO_3$+0.056 g CoO+0.7 g $Sc_2O_3$), and A5-B5 (46.91 g $Sr_{1.6}Na_{0.4}Sc_{0.4}Co_{1.6}Fe_{12}O_{22}$+1 g CoO+1.37 g $Fe_2O_3$+0.7 g $Sc_2O_3$) in FIGS. 99A and 99B.

Figure 100A:
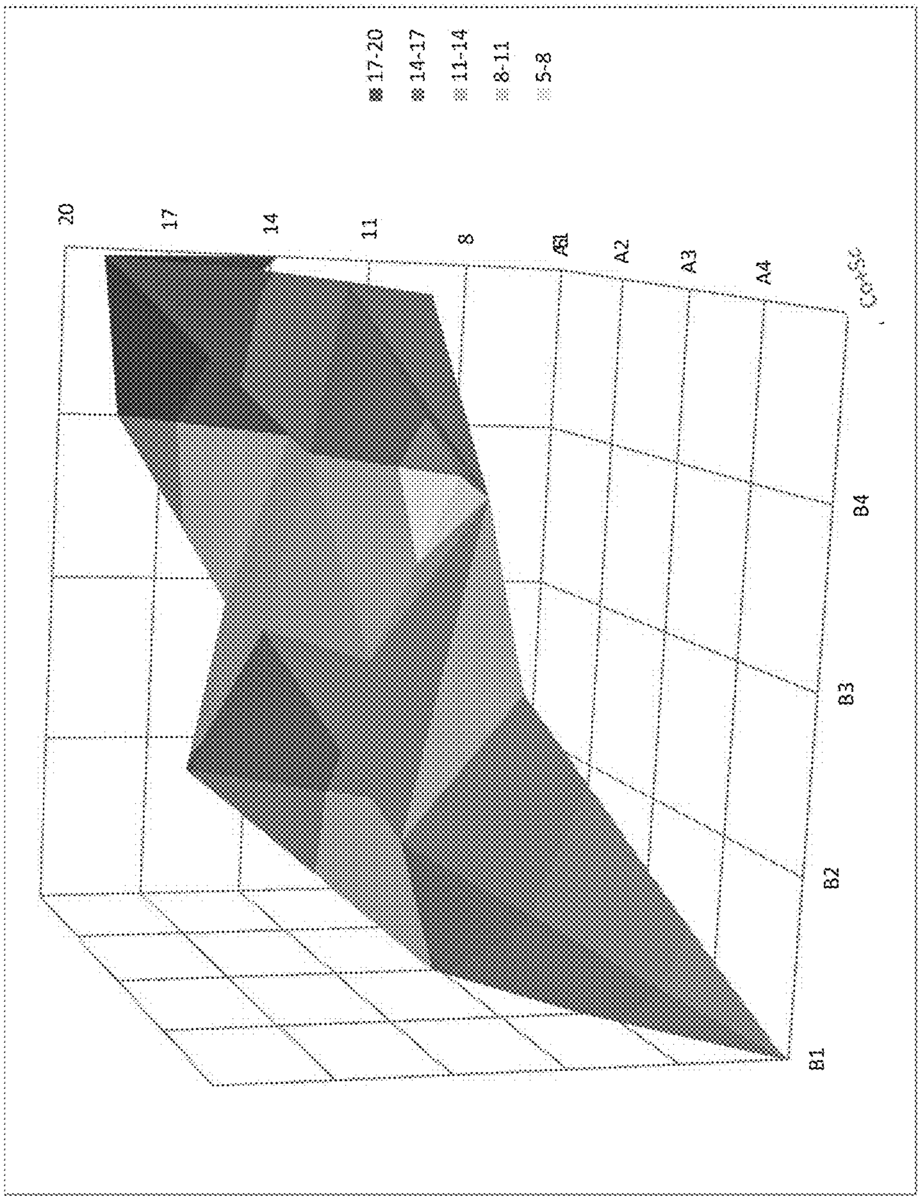
Figure 100B:
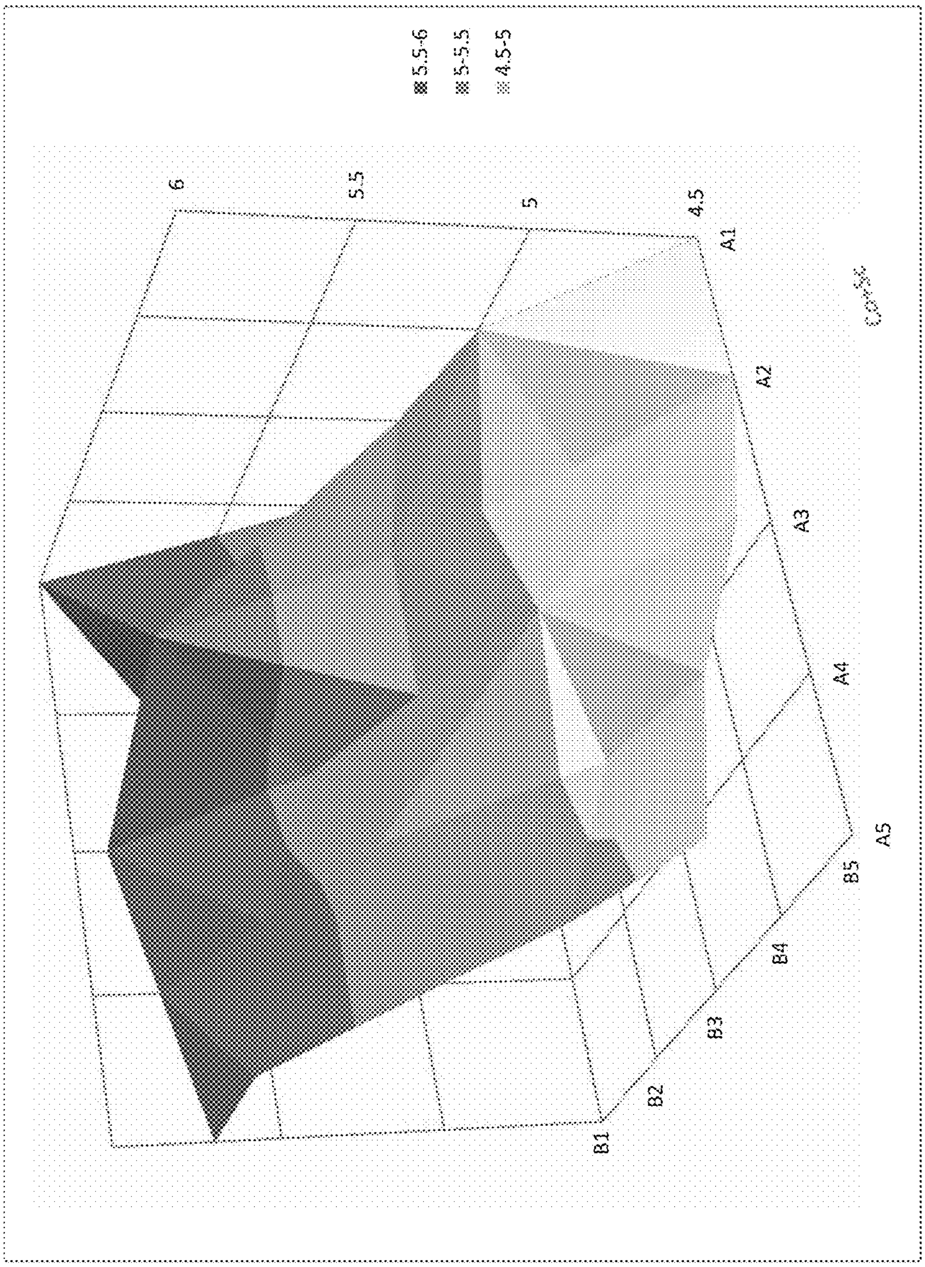

The quality factor and permeability data at 1 GHz for various ones of the hexaferrite compositions shown in FIGS. 92A-97C is illustrated as surface charts in FIGS. 100A-100C. FIG. 100A illustrates quality factor Q for various hexaferrites formed by the addition of various amounts of different compounds to a hexaferrite having the formula $Sr_{1.6}Na_{0.4}Sc_{0.4}Co_{1.6}Fe_{12}O_2$, where the Sr in $Sr_2Co_2Fe_{12}O_{22}$ has been partially replaced with Na, the Co has been partially replaced with Sc, and the modified hexaferrites have a greater atomic percentage of Na than Sc. FIG. 100B illustrates the real permeability (μ') for these same hexaferrites. FIG. 100C is a table showing the compounds that were combined to form these hexaferrites. In FIG. 100C, the left hand column represents the grid coordinate of the data in FIGS. 100A and 100B. From the data illustrated in FIGS. 100A-100C, it can be seen that some examples of hexaferrites formed by the addition of various amounts of different compounds to a hexaferrite having the formula $Sr_{1.6}Na_{0.4}Sc_{0.4}Co_{1.6}Fe_{12}O_{22}$, where the Sr in $Sr_2Co_2Fe_{12}O_{22}$ has been partially replaced with Na, the Co has been partially replaced with Sc, and the modified hexaferrites a greater atomic percentage of Na than Sc may exhibit a quality factor of up to about 20 while retaining a permeability up to about 42 at 1 GHz, for example, for the compound whose data is shown at coordinate A2-B5 (48.49 g $Sr_{1.6}Na_{0.4}Sc_{0.4}Co_{1.6}Fe_{12}O_{22}$+1.04 g $SrCO_3$+0.6 g CoO+0.7 g $NaHCO_3$) in FIGS. 100A and 100B.

Processing

Certain aspects of the present disclosure provide processing techniques for increasing the permeability of Y phase hexaferrites at higher frequencies. In one implementation, the processing techniques involve methods of magnetic texturing of Y phase hexaferrites to result in a textured ceramic with improved magnetic properties. In one embodiment, the method of magnetic texturing used in forming involves using a reaction sintering method, which includes the steps of aligning M-phase ($BaFe_{12}O_{19}$ uniaxial magnetization) with non-magnetic additives in a static magnetic field and reacting with BaO and CoO to form the Y-phase ($Sr_2Me_2Fe_2O_{22}$). In another embodiment, the method of magnetic texturing used in forming Sr—$Co_2$Y involves using a rotating magnetic field method, which includes the steps of aligning Sr—$Co_2$Y phase (planar magnetization) with magnetic texturing occurring in a rotating magnetic field. The inventor has found that the degree of alignment, thus permeability gain, is far superior in a rotating magnetic field.

In some embodiments, the processing technique for forming the Y phase material includes making Y phase Fe deficient to inhibit reduction of Fe as the inventor believes that dielectric and magnetic loss is increased by reduction of Fe ($Fe^{3+}$→$Fe^{2+}$) at high temperatures. The processing technique includes the step of heat treatment or annealing in oxygen to inhibit reduction of Fe and cause $Fe^{2+}$→$Fe^{3}$.

In some other embodiments, the processing technique for forming Sr—$Co_2$Y includes forming fine grain hexagonal ferrite particles. The process involves using high energy milling to reduce the particle size.

Figure 101:
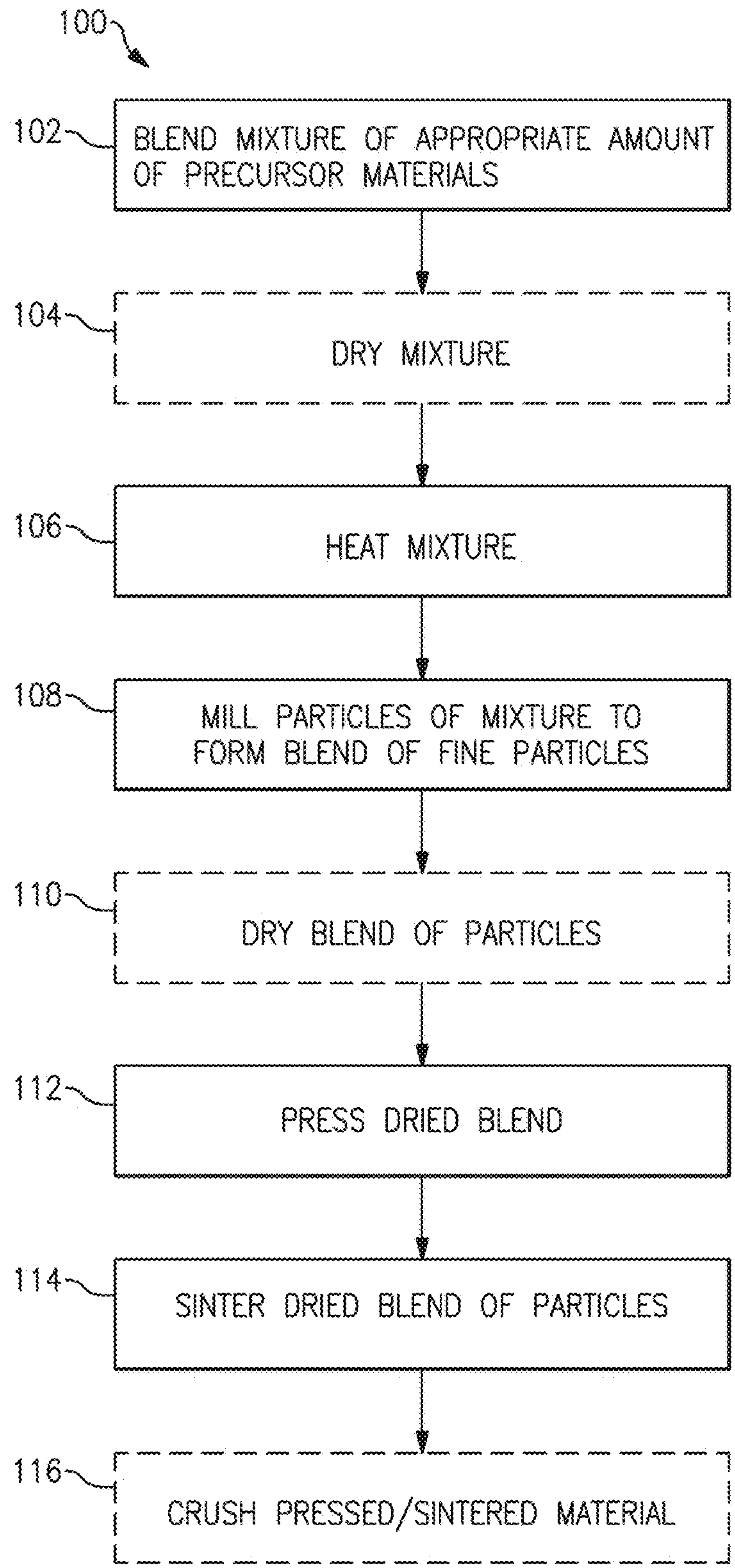
FIG. 101 is a flow chart illustrating an embodiment of a method of forming a hexagonal ferrite material.

FIG. 101 illustrates a method 100 of forming a Sr—$Co_2$Y material in accordance with one or more embodiments of the present invention. As shown in FIG. 101, appropriate amounts of precursor materials—reactants that may provide strontium, cobalt, iron, one or more alkali metals, scandium, indium, aluminum, silica, manganese and oxygen that can form the magnetic material—are mixed together in Step 102. In some embodiments, at least a portion of the oxygen may be provided in the form of an oxygen-containing compound of strontium (Sr), cobalt (Co), iron (Fe), or one or more alkali metals. For example, these elements may be provided in carbonate or oxide forms, or in other oxygen-containing precursor forms known in the art. In one or more embodiments, one or more precursor materials may be provided in a non-oxygen-containing compound, or in a pure elemental form. In other embodiments, oxygen could be supplied from a separate compound, such as, for example, $H_2O_2$ or from gaseous oxygen or air. For example, in one embodiment, $SrCO_3$, $Co_3O_4$, $NaHCO_3$, $Sc_2O_3$ and $Fe_2O_3$ precursors are mixed in a ratio appropriate for the formation of the Y phase material. These precursor compounds may be mixed or blended in water or alcohol using, for example, a Cowles mixer, a ball mill, or a vibratory mill. These precursors may also be blended in a dry form.

The blended mixture may then be dried if necessary in Step 104. The mixture may be dried in any of a number of ways, including, for example, pan drying or spray drying. The dried mixture may then be heated in Step 106 at a temperature and for a period of time to promote calcination. For example, the temperature in the heating system used in heating Step 106 may increase at a rate of between about 20° C. per hour and about 200° C. per hour to achieve a soak temperature of about 1000° C.-1300° C., or about 1100° C. to 1250° C., which may be maintained for about two hours to about twelve hours. The heating system may be, for example, an oven or a kiln. The mixture may experience a loss of moisture, and/or reduction or oxidation of one or more components, and/or the decomposition of carbonates and/or organic compounds which may be present. At least a portion of the mixture may form a hexaferrite solid solution The temperature ramp rate, the soak temperature, and the time for which the mixture is heated may be chosen depending on the requirements for a particular application. For example, if small crystal grains are desired in the material after heating, a faster temperature ramp, and/or lower soak temperature, and/or shorter heating time may be selected as opposed to an application where larger crystal grains are desired. In addition, the use of different amounts and/or forms of precursor materials may result in different requirements for parameters such as temperature ramp rate and soaking temperature and/or time to provide desired characteristics to the post-heated mixture.

After heating, the mixture, which may have formed agglomerated particles of hexaferrite solid solution, may be cooled to room temperature, or to any other temperature that would facilitate further processing. The cooling rate of the heating system may be, for example, 80° C. per hour. In step 108, the agglomerated particles may be milled. Milling may take place in water, in alcohol, in a ball mill, a vibratory mill, or other milling apparatus. In some embodiments, the milling is continued until the median particle diameter of the resulting powdered material is from about one to about four microns, although other particle sizes, for example, from about one to about ten microns in diameter, may be acceptable in some applications. In a preferred embodiment, high energy milling is used to mill the particles to a fine particle size of 0.2 to 0.9 microns in diameter. This particle size may be measured using, for example, a sedigraph or a laser scattering technique. A target median particle size may be selected to provide sufficient surface area of the particles to facilitate sintering in a later step. Particles with a smaller median diameter may be more reactive and more easily sintered than larger particles. In some methods, one or more alkali metals or alkali metal precursors or other dopant materials may be added at this point rather than, or in addition to, in step 102.

The powdered material may be dried if necessary in step 110 and blended, and the dried powder may be pressed into a desired shape using, for example, a uniaxial press or an isostatic press in step 112. The pressure used to press the material may be, for example, up to 80,000 $N/m^2$, and is typically in the range of from about 20,000 $N/m^2$ to about 60,000 $N/m^2$. A higher pressing pressure may result in a more dense material subsequent to further heating than a lower pressing pressure.

In step 114, the pressed powdered material may be sintered to form a solid mass of doped hexaferrite. The solid mass of doped hexaferrite may be sintered in a mold having the shape of a component desired to be formed from the doped hexaferrite. Sintering of the doped hexaferrite may be performed at a suitable or desired temperature and for a time period sufficient to provide one or more desired characteristics, such as, but not limited to, crystal grain size, level of impurities, compressibility, tensile strength, porosity, and in some cases, magnetic permeability. Preferably, the sintering conditions promote one or more desired material characteristics without affecting, or at least with acceptable changes to other undesirable properties. For example, the sintering conditions may promote formation of the sintered doped hexaferrite with little or minimal iron reduction. In one embodiment, the temperature used in the sintering step 114 is between 1100° C. to 1250° C. According to some embodiments, the temperature in the heating system used in the sintering step 114 may be increased at a rate of between about 20° C. per hour and about 200° C. per hour to achieve a soak temperature of about 1000° C.-1450° C. or about 1100° C. to 1150° C. or about 1100° C.-1250° C. which may be maintained for about two hours to about twelve hours. The heating system may be, for example, an oven or a kiln. A slower ramp, and/or higher soak temperature, and/or longer sintering time may result in a more dense sintered material than might be achieved using a faster temperature ramp, and/or lower soak temperature, and/or shorter heating time. Increasing the density of the final sintered material by making adjustments, for example, to the sintering process can be performed to provide a material with a desired magnetic permeability, saturation magnetization, and/or magnetostriction coefficient. According to some embodiments of methods according to the present disclosure, the density range of the sintered hexaferrite may be between about 4.50 $g/cm^3$ and about 5.36 $g/cm^3$. A desired magnetic permeability of the doped hexaferrite may also be achieved by tailoring the heat treatment of the material to produce grains with desired sizes. The hexaferrite may also be crush pressed and further sintered in step 116 to form a final hexaferrite product.

The grain size of material produced by embodiments of the above method may vary from between about five micrometers and one millimeter in diameter depending upon the processing conditions, with even larger grain sizes possible in some aspects of methods according to the present disclosure. In some aspects, each crystal of the material may comprise a single magnetic domain. Both doped Sr—$Co_2Y$ and chemically substituted (for example, Na and Sc) Sr—$Co_2Y$ may be members of the planar hexaferrite family called ferroxplana, having a Y-type ferrite crystal structure.

Figure 102:
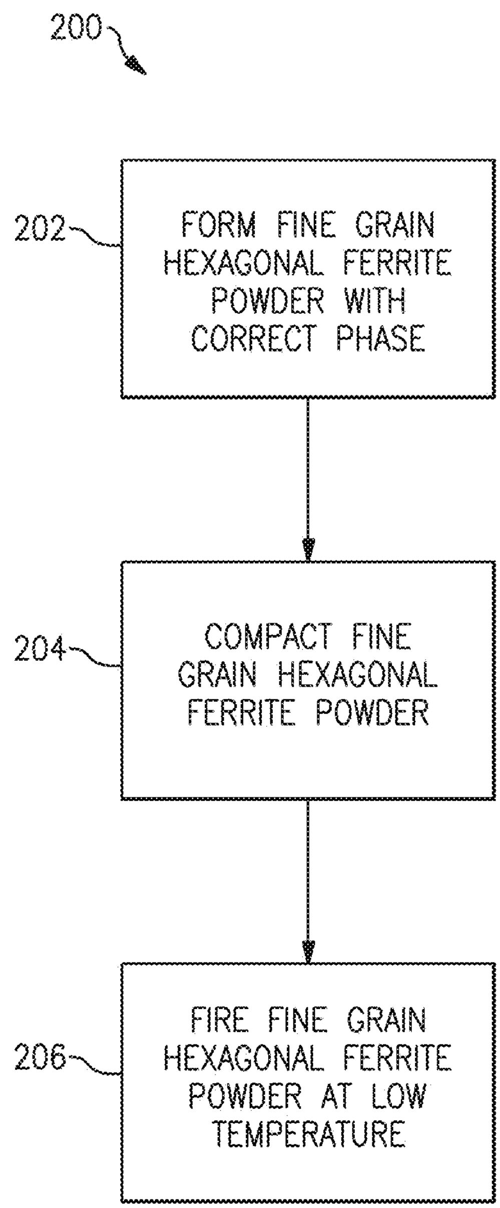
FIG. 102 is a flow chart illustrating an embodiment of a method of forming a hexagonal ferrite material.

FIG. 102 illustrates a method 200 of forming textured Sr—$Co_2Y$ according to another embodiment adapted to reduce the magnetorestriction and improve the resonant frequency of the material. The method 200 begins with step 202 in which a fine grain hexagonal ferrite powder is formed. In one implementation, the fine grain hexagonal ferrite powder is a strontium cobalt ferrite Y-phase powder. This powder can be synthesized using a chemical process known in the art such as co-precipitation. The Sr—$Co_2Y$ can also be synthesized via sol-gel, calcining, and mechanical milling using a Netzsch zeta-mill or the like. In one embodiment, the Sr—$Co_2Y$ powder has particle sizes of less than about 1 micron and surface areas of greater than about 6 $m^2/g$. In another embodiment, the Sr—$Co_2Y$ powder has an average particle size of less than about 1 micron and an average surface area of greater than about 6 $m^2/g$.

As FIG. 102 further shows, the method 200 further comprises step 204 in which the hexagonal ferrite powder is compacted by a known process such as cold isostatic pressing, uniaxial pressing, extrusion, or the like. As also shown in FIG. 102, the hexagonal powder is subsequently fired at step 206 at a temperature between about 1100° C. to 1250° C., which is lower than the standard, conventional sintering temperature for similar materials. The resulting material is preferably a fine grained hexagonal ferrite material.

From the foregoing description, it will be appreciated that inventive hexagonal ferrites and manufacturing methods are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z or any of the various permutations of X, Y, and Z, for example, X, Y or X, Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. While some of the figures are drawn to scale, such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A hexagonal ferrite material comprising a Y phase hexagonal ferrite material having the composition $Sr_{2-x}Na_xCo_{2-x}Sc_xFe_{12}O_{22}$, 0<x<2, doped with up to 10 weight percent of a tetravalent element.

2. The hexagonal ferrite material of claim 1 wherein the tetravalent element substitutes for $Fe^{3+}$ ions on tetrahedral sites of the Y phase hexagonal ferrite material.

3. A hexagonal ferrite material comprising a Y phase hexagonal ferrite material having the composition $Sr_2Co_2Fe_{12}O_{22}$ doped with up to 10 weight percent of a tetravalent element that substitutes for $Fe^{3+}$ ions on tetrahedral sites of the Y phase hexagonal ferrite material.

4. A hexagonal ferrite material comprising a Y phase hexagonal ferrite material having the composition $Sr_2Co_2Fe_{12}O_{22}$ doped with up to 10 weight percent of a tetravalent element that is one of Si and Ge.

5. A hexagonal ferrite material comprising a Y phase hexagonal ferrite material having the composition $Sr_{2-x}Na_xCo_{2-x}Sc_xFe_{12}O_{22}$, 0<x<2, doped with up to 10 weight percent of a transition metal or Zn.

6. The hexagonal ferrite material of claim 5 wherein the transition metal is one of Mn and Ni.

7. The hexagonal ferrite material of claim 6 wherein the transition metal or Zn substitutes for Co ions on octahedral sites of the Y phase hexagonal ferrite material.

8. A hexagonal ferrite material comprising a Y phase hexagonal ferrite material having the composition $Sr_2Co_2Fe_{12}O_{22}$ doped with up to 10 weight percent of one or more of Nb, Ta, W, and Mo.

9. A hexagonal ferrite material comprising a Y phase hexagonal ferrite material having the composition $Sr_{2-x}Na_xCo_{2-x}Sc_xFe_{12}O_{22}$, 0<x<2, doped with up to 10 weight percent of one or more of Nb, Ta, V, W and Mo.

10. The hexagonal ferrite material of claim 9 wherein the one or more of Nb, Ta, V, W, and Mo substitutes for one of Co ions and Fe ions in the Y phase hexagonal ferrite material.

11. A hexagonal ferrite material comprising a Y phase hexagonal ferrite material having the composition $Sr_2Co_2Fe_{12}O_{22}$ doped with up to 10 weight percent of one of a trivalent dopant selected from the group including Sc, Mn, In, Cr, Ga, Co, Ni, Fe, Yb, or a lanthanide ion and a tetravalent dopant selected from the group consisting of Si, Ge, Ti, Zr, Sn, Ce, Pr, Hf, or Tb.

12. A hexagonal ferrite material comprising a Y phase hexagonal ferrite material having the composition $Sr_{2-x}Na_xCo_{2-x}Sc_xFe_{12}O_{22}$, 0<x<2, doped with up to 10 weight percent of at least one of a trivalent dopant selected from the group including Sc, Mn, In, Cr, Ga, Co, Ni, Fe, Yb, or a lanthanide ion and a tetravalent dopant selected from the group consisting of Si, Ge, Ti, Zr, Sn, Ce, Pr, Hf, or Tb.

13. The material of claim 12 having a deviation from the Y-phase stoichiometry of between about zero and about five weight percent of one or more of Sr, Co, or Fe and/or one or more of the dopant components.

14. The material of claim 12 wherein x is about 0.4.

15. The material of claim 14 having a quality factor of up to about 20 at about 1 GHz.

16. The material of claim 15 having a real permeability of greater than about four at about 1 GHz.

17. A radio frequency circuit element formed from the material of claim 16.

18. The radio frequency circuit element of claim 17 including one or more of an antenna, a circulator, an isolator, and an inductor.

19. A radio frequency circuit module including the radio frequency circuit element of claim 17.

20. An electronic device including the radio frequency circuit module of claim 19.

* * * * *